US012554325B2

(12) United States Patent
Hussami et al.

(10) Patent No.: US 12,554,325 B2
(45) Date of Patent: Feb. 17, 2026

(54) METHODS AND APPARATUSES FOR LOW LATENCY BODY STATE PREDICTION BASED ON NEUROMUSCULAR DATA

(71) Applicant: Meta Platforms Technologies, LLC, Menlo Park, CA (US)

(72) Inventors: Nadine Hussami, Brooklyn, NY (US); Patrick William John Kaifosh, New York, NY (US); Alexandre Barachant, Brooklyn, NY (US); Daniel Wetmore, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 479 days.

(21) Appl. No.: 17/741,263

(22) Filed: May 10, 2022

(65) Prior Publication Data

US 2022/0269346 A1 Aug. 25, 2022

Related U.S. Application Data

(60) Continuation-in-part of application No. 17/555,064, filed on Dec. 17, 2021, now abandoned, and a (Continued)

(51) Int. Cl.

| | |
|---|---|
| ***G06F 3/01*** | (2006.01) |
| ***G06F 3/02*** | (2006.01) |
| ***G06F 3/0487*** | (2013.01) |

(52) U.S. Cl.

CPC .............. *G06F 3/015* (2013.01); *G06F 3/017* (2013.01); *G06F 3/02* (2013.01); *G06F 3/0487* (2013.01)

(58) Field of Classification Search

CPC .......... G06F 3/011; G06F 3/014; G06F 3/015; G06F 3/016; G06F 3/017; G06F 3/012;

(Continued)

(56) References Cited

U.S. PATENT DOCUMENTS

| | | | |
|---|---|---|---|
| 1,411,995 | A | 4/1922 | Dull |
| 3,408,133 | A | 10/1968 | Lee |

(Continued)

FOREIGN PATENT DOCUMENTS

| | | | |
|---|---|---|---|
| CA | 2902045 | A1 | 8/2014 |
| CA | 2921954 | A1 | 2/2015 |

(Continued)

OTHER PUBLICATIONS

Notice of Allowance mailed Aug. 22, 2022 for U.S. Appl. No. 15/882,858, filed Jan. 29, 2018, 9 pages.

(Continued)

*Primary Examiner* — Robin J Mishler

(74) *Attorney, Agent, or Firm* — Morgan, Lewis & Bockius LLP

(57) ABSTRACT

The disclosed method may include receiving neuromuscular activity data over a first time series from a first sensor on a wearable device donned by a user receiving ground truth data over a second time series from a second sensor that indicates a body part state of a body part of the user, generating one or more training datasets by time-shifting at least a portion of the neuromuscular activity data over the first time series relative to the second time series, to associate the neuromuscular activity data with at least a portion of the ground truth data, and training one or more inferential models based on the one or more training datasets. Various other related methods and systems are also disclosed.

20 Claims, 78 Drawing Sheets

Related U.S. Application Data continuation-in-part of application No. 17/487,695, filed on Sep. 28, 2021, now abandoned, and a continuation-in-part of application No. 17/485,200, filed on Sep. 24, 2021, now abandoned, and a continuation-in-part of application No. 17/409,371, filed on Aug. 23, 2021, now abandoned, and a continuation-in-part of application No. 17/409,375, filed on Aug. 23, 2021, now abandoned, and a continuation-in-part of application No. 17/389,899, filed on Jul. 30, 2021, now abandoned, and a continuation-in-part of application No. 17/297,449, filed as application No. PCT/US2019/063587 on Nov. 27, 2019, now Pat. No. 11,797,087, and a continuation-in-part of application No. 17/293,472, filed as application No. PCT/US2019/061759 on Nov. 15, 2019, now abandoned, and a continuation-in-part of application No. 17/228,351, filed on Apr. 12, 2021, now abandoned, and a continuation-in-part of application No. 16/995,859, filed on Aug. 18, 2020, now abandoned, said application No. 17/409,371 is a division of application No. 16/890,352, filed on Jun. 2, 2020, now Pat. No. 11,129,569, said application No. 17/409,375 is a division of application No. 16/890,352, filed on Jun. 2, 2020, now Pat. No. 11,129,569, application No. 17/741,263 is a continuation-in-part of application No. 16/862,050, filed on Apr. 29, 2020, now Pat. No. 11,331,045, and a continuation-in-part of application No. 16/833,309, filed on Mar. 27, 2020, now Pat. No. 11,327,566, said application No. 17/485,200 is a continuation of application No. 16/671,066, filed on Oct. 31, 2019, now Pat. No. 11,163,361, application No. 17/741,263 is a continuation-in-part of application No. 16/657,029, filed on Oct. 18, 2019, now Pat. No. 11,361,522, said application No. 17/487,695 is a continuation of application No. 16/557,342, filed on Aug. 30, 2019, now abandoned, said application No. 17/389,899 is a continuation of application No. 16/539,755, filed on Aug. 13, 2019, now Pat. No. 11,179,066, said application No. 16/890,352 is a continuation of application No. 16/424,144, filed on May 28, 2019, now Pat. No. 10,687,759, said application No. 16/995,859 is a continuation of application No. 16/389,419, filed on Apr. 19, 2019, now Pat. No. 10,772,519, said application No. 16/657,029 is a continuation of application No. 16/258,409, filed on Jan. 25, 2019, now Pat. No. 10,489,986, said application No. 16/671,066 is a continuation of application No. 16/257,979, filed on Jan. 25, 2019, now Pat. No. 10,496,168, said application No. 16/862,050 is a continuation-in-part of application No. 16/258,279, filed on Jan. 25, 2019, now abandoned, application No. 17/741,263 is a continuation-in-part of application No. 16/165,806, filed on Oct. 19, 2018, now Pat. No. 11,635,736, and a continuation-in-part of application No. 16/165,841, filed on Oct. 19, 2018, said application No. 17/555,064 is a continuation of application No. 15/974,430, filed on May 8, 2018, now Pat. No. 11,216,069, application No. 17/741,263 is a continuation-in-part of application No. 15/659,504, filed on Jul. 25, 2017, now Pat. No. 11,337,652, said application No. 17/228,351 is a continuation of application No. 15/659,072, filed on Jul. 25, 2017, now Pat. No. 10,990,174.

(60) Provisional application No. 62/841,061, filed on Apr. 30, 2019, provisional application No. 62/841,054, filed on Apr. 30, 2019, provisional application No. 62/826,516, filed on Mar. 29, 2019, provisional application No. 62/771,957, filed on Nov. 27, 2018, provisional application No. 62/768,741, filed on Nov. 16, 2018, provisional application No. 62/726,159, filed on Aug. 31, 2018, provisional application No. 62/718,337, filed on Aug. 13, 2018, provisional application No. 62/696,242, filed on Jul. 10, 2018, provisional application No. 62/677,574, filed on May 29, 2018, provisional application No. 62/676,567, filed on May 25, 2018, provisional application No. 62/621,838, filed on Jan. 25, 2018, provisional application No. 62/621,829, filed on Jan. 25, 2018, provisional application No. 62/621,770, filed on Jan. 25, 2018, provisional application No. 62/574,496, filed on Oct. 19, 2017, provisional application No. 62/366,426, filed on Jul. 25, 2016, provisional application No. 62/366,421, filed on Jul. 25, 2016.

(58) Field of Classification Search

CPC .......... G06F 3/013; G06F 3/02; G06F 3/0487; A61B 2560/0228; A61B 2562/043; A61B 5/1116; A61B 5/316; A61B 5/389; A61B 5/6802; A61B 5/681; A61B 5/7207; A61B 5/7264; A61B 5/7267

See application file for complete search history.

(56) References Cited

U.S. PATENT DOCUMENTS

| | | | |
|---|---|---|---|
| 3,580,243 | A | 5/1971 | Johnson |
| 3,620,208 | A | 11/1971 | Wayne et al. |
| 3,712,716 | A | 1/1973 | Cornsweet et al. |
| 3,735,425 | A | 5/1973 | Hoshall et al. |
| 3,880,146 | A | 4/1975 | Everett et al. |
| 4,055,168 | A | 10/1977 | Miller et al. |
| 4,602,639 | A | 7/1986 | Hoogendoorn et al. |
| 4,705,408 | A | 11/1987 | Jordi |
| 4,817,064 | A | 3/1989 | Milles |
| 4,896,120 | A | 1/1990 | Kamil |
| 4,978,213 | A | 12/1990 | El Hage |
| 5,003,978 | A | 4/1991 | Dunseath, Jr. |
| D322,227 | S | 12/1991 | Warhol |
| 5,081,852 | A | 1/1992 | Cox |
| 5,103,323 | A | 4/1992 | Magarinos et al. |
| 5,231,674 | A | 7/1993 | Cleveland et al. |
| 5,251,189 | A | 10/1993 | Thorp |
| D348,660 | S | 7/1994 | Parsons |
| 5,445,869 | A | 8/1995 | Ishikawa et al. |
| 5,462,065 | A | 10/1995 | Cusimano |
| 5,467,104 | A | 11/1995 | Furness, III et al. |
| 5,482,051 | A | 1/1996 | Reddy et al. |
| 5,589,956 | A | 12/1996 | Morishima et al. |
| 5,596,339 | A | 1/1997 | Furness, III et al. |
| 5,605,059 | A | 2/1997 | Woodward |
| 5,625,577 | A | 4/1997 | Kunii et al. |
| 5,683,404 | A | 11/1997 | Johnson |
| 5,742,421 | A | 4/1998 | Wells et al. |
| 6,005,548 | A | 12/1999 | Latypov et al. |
| 6,008,781 | A | 12/1999 | Furness, III et al. |
| 6,009,210 | A | 12/1999 | Kang |
| 6,027,216 | A | 2/2000 | Guyton et al. |
| 6,032,530 | A | 3/2000 | Hock |
| D422,617 | S | 4/2000 | Simioni |
| 6,066,794 | A | 5/2000 | Longo |
| 6,184,847 | B1 | 2/2001 | Fateh et al. |
| 6,236,476 | B1 | 5/2001 | Son et al. |
| 6,238,338 | B1 | 5/2001 | DeLuca et al. |
| 6,244,873 | B1 | 6/2001 | Hill et al. |
| 6,317,103 | B1 | 11/2001 | Furness, III et al. |
| 6,377,277 | B1 | 4/2002 | Yamamoto |
| D459,352 | S | 6/2002 | Giovanniello |
| 6,411,843 | B1 | 6/2002 | Zarychta |

(56) References Cited

U.S. PATENT DOCUMENTS

| | | | |
|---|---|---|---|
| 6,487,906 | B1 | 12/2002 | Hock |
| 6,510,333 | B1 | 1/2003 | Licata et al. |
| 6,527,711 | B1 | 3/2003 | Stivoric et al. |
| 6,619,836 | B1 | 9/2003 | Silvant et al. |
| 6,639,570 | B2 | 10/2003 | Furness, III et al. |
| 6,658,287 | B1 | 12/2003 | Litt et al. |
| 6,720,984 | B1 | 4/2004 | Jorgensen et al. |
| 6,743,982 | B2 | 6/2004 | Biegelsen et al. |
| 6,771,294 | B1 | 8/2004 | Pulli et al. |
| 6,774,885 | B1 | 8/2004 | Even-Zohar |
| 6,807,438 | B1 | 10/2004 | Brun Del Re et al. |
| D502,661 | S | 3/2005 | Rapport |
| D502,662 | S | 3/2005 | Rapport |
| 6,865,409 | B2 | 3/2005 | Getsla et al. |
| D503,646 | S | 4/2005 | Rapport |
| 6,880,364 | B1 | 4/2005 | Mdolin et al. |
| 6,901,286 | B1 | 5/2005 | Sinderby et al. |
| 6,927,343 | B2 | 8/2005 | Watanabe et al. |
| 6,942,621 | B2 | 9/2005 | Avinash et al. |
| 6,965,842 | B2 | 11/2005 | Rekimoto |
| 6,972,734 | B1 | 12/2005 | Ohshima et al. |
| 6,984,208 | B2 | 1/2006 | Zheng |
| 7,022,919 | B2 | 4/2006 | Brist et al. |
| 7,028,507 | B2 | 4/2006 | Rapport |
| 7,086,218 | B1 | 8/2006 | Pasach |
| 7,089,148 | B1 | 8/2006 | Bachmann et al. |
| D535,401 | S | 1/2007 | Travis et al. |
| 7,173,437 | B2 | 2/2007 | Hervieux et al. |
| 7,209,114 | B2 | 4/2007 | Radley-Smith |
| D543,212 | S | 5/2007 | Marks |
| 7,265,298 | B2 | 9/2007 | Maghribi et al. |
| 7,271,774 | B2 | 9/2007 | Puuri |
| 7,333,090 | B2 | 2/2008 | Tanaka et al. |
| 7,351,975 | B2 | 4/2008 | Brady et al. |
| 7,450,107 | B2 | 11/2008 | Radley-Smith |
| 7,473,888 | B2 | 1/2009 | Wine et al. |
| 7,491,892 | B2 | 2/2009 | Wagner et al. |
| 7,517,725 | B2 | 4/2009 | Reis |
| 7,558,622 | B2 | 7/2009 | Tran |
| 7,574,253 | B2 | 8/2009 | Edney et al. |
| 7,580,742 | B2 | 8/2009 | Tan et al. |
| 7,596,393 | B2 | 9/2009 | Jung et al. |
| 7,618,260 | B2 | 11/2009 | Daniel et al. |
| 7,636,549 | B2 | 12/2009 | Ma et al. |
| 7,640,007 | B2 | 12/2009 | Chen et al. |
| 7,660,126 | B2 | 2/2010 | Cho et al. |
| 7,684,105 | B2 | 3/2010 | Lamontagne et al. |
| 7,747,113 | B2 | 6/2010 | Mukawa et al. |
| 7,761,390 | B2 | 7/2010 | Ford |
| 7,773,111 | B2 | 8/2010 | Cleveland et al. |
| 7,787,946 | B2 | 8/2010 | Stahmann et al. |
| 7,805,386 | B2 | 9/2010 | Greer |
| 7,809,435 | B1 | 10/2010 | Ettare et al. |
| 7,844,310 | B2 | 11/2010 | Anderson |
| D628,616 | S | 12/2010 | Yuan |
| 7,850,306 | B2 | 12/2010 | Uusitalo et al. |
| 7,870,211 | B2 | 1/2011 | Pascal et al. |
| D633,939 | S | 3/2011 | Puentes et al. |
| D634,771 | S | 3/2011 | Fuchs |
| 7,901,368 | B2 | 3/2011 | Flaherty et al. |
| 7,925,100 | B2 | 4/2011 | Howell et al. |
| 7,948,763 | B2 | 5/2011 | Chuang |
| D640,314 | S | 6/2011 | Yang |
| D643,428 | S | 8/2011 | Janky et al. |
| D646,192 | S | 10/2011 | Woode |
| D649,177 | S | 11/2011 | Cho et al. |
| 8,054,061 | B2 | 11/2011 | Prance et al. |
| D654,622 | S | 2/2012 | Hsu |
| 8,120,828 | B2 | 2/2012 | Schwerdtner |
| 8,170,656 | B2 | 5/2012 | Tan et al. |
| 8,179,604 | B1 | 5/2012 | Prada Gomez et al. |
| 8,188,937 | B1 | 5/2012 | Amafuji et al. |
| 8,190,249 | B1 | 5/2012 | Gharieb et al. |
| D661,613 | S | 6/2012 | Demeglio |
| 8,203,502 | B1 | 6/2012 | Chi et al. |
| 8,207,473 | B2 | 6/2012 | Axisa et al. |
| 8,212,859 | B2 | 7/2012 | Tang et al. |
| D667,482 | S | 9/2012 | Healy et al. |
| D669,522 | S | 10/2012 | Klinar et al. |
| D669,523 | S | 10/2012 | Wakata et al. |
| D671,590 | S | 11/2012 | Klinar et al. |
| 8,311,623 | B2 | 11/2012 | Sanger |
| 8,348,538 | B2 | 1/2013 | Van Loenen et al. |
| 8,351,651 | B2 | 1/2013 | Lee |
| 8,355,671 | B2 | 1/2013 | Kramer et al. |
| 8,384,683 | B2 | 2/2013 | Luo |
| 8,386,025 | B2 | 2/2013 | Hoppe |
| 8,389,862 | B2 | 3/2013 | Arora et al. |
| 8,421,634 | B2 | 4/2013 | Tan et al. |
| 8,427,977 | B2 | 4/2013 | Workman et al. |
| D682,343 | S | 5/2013 | Waters |
| D682,727 | S | 5/2013 | Bulgari |
| 8,435,191 | B2 | 5/2013 | Barboutis et al. |
| 8,437,844 | B2 | 5/2013 | Syed Momen et al. |
| 8,447,704 | B2 | 5/2013 | Tan et al. |
| D685,019 | S | 6/2013 | Li |
| 8,467,270 | B2 | 6/2013 | Gossweiler, III et al. |
| 8,469,741 | B2 | 6/2013 | Oster et al. |
| D687,087 | S | 7/2013 | Iurilli |
| 8,484,022 | B1 | 7/2013 | Vanhoucke |
| D689,862 | S | 9/2013 | Liu |
| D692,941 | S | 11/2013 | Klinar et al. |
| 8,591,411 | B2 | 11/2013 | Banet et al. |
| D695,333 | S | 12/2013 | Farnam et al. |
| D695,454 | S | 12/2013 | Moore |
| 8,620,361 | B2 | 12/2013 | Bailey et al. |
| 8,624,124 | B2 | 1/2014 | Koo et al. |
| 8,634,119 | B2 | 1/2014 | Bablumyan et al. |
| D701,555 | S | 3/2014 | Markovitz et al. |
| 8,666,212 | B1 | 3/2014 | Amirparviz |
| 8,702,629 | B2 | 4/2014 | Giuffrida et al. |
| 8,704,882 | B2 | 4/2014 | Turner |
| D704,248 | S | 5/2014 | DiChiara |
| 8,718,980 | B2 | 5/2014 | Garudadri et al. |
| 8,743,052 | B1 | 6/2014 | Keller et al. |
| 8,744,543 | B2 | 6/2014 | Li et al. |
| 8,754,862 | B2 | 6/2014 | Zaliva |
| 8,777,668 | B2 | 7/2014 | Ikeda et al. |
| D716,457 | S | 10/2014 | Brefka et al. |
| D717,685 | S | 11/2014 | Bailey et al. |
| 8,879,276 | B2 | 11/2014 | Wang |
| 8,880,163 | B2 | 11/2014 | Barachant et al. |
| 8,883,287 | B2 | 11/2014 | Boyce et al. |
| 8,890,875 | B2 | 11/2014 | Jammes et al. |
| 8,892,479 | B2 | 11/2014 | Tan et al. |
| 8,895,865 | B2 | 11/2014 | Lenahan et al. |
| D719,568 | S | 12/2014 | Heinrich et al. |
| D719,570 | S | 12/2014 | Heinrich et al. |
| 8,912,094 | B2 | 12/2014 | Koo et al. |
| 8,914,472 | B1 | 12/2014 | Lee et al. |
| 8,922,481 | B1 | 12/2014 | Kauffmann et al. |
| D723,093 | S | 2/2015 | Li |
| 8,954,135 | B2 | 2/2015 | Yuen et al. |
| D724,647 | S | 3/2015 | Rohrbach |
| 8,970,571 | B1 | 3/2015 | Wong et al. |
| 8,971,023 | B2 | 3/2015 | Olsson et al. |
| 9,018,532 | B2 | 4/2015 | Wesselmann et al. |
| 9,037,530 | B2 | 5/2015 | Tan et al. |
| 9,086,687 | B2 | 7/2015 | Park et al. |
| 9,092,664 | B2 | 7/2015 | Forutanpour et al. |
| D736,664 | S | 8/2015 | Paradise et al. |
| 9,107,586 | B2 | 8/2015 | Tran |
| D738,373 | S | 9/2015 | Davies et al. |
| 9,135,708 | B2 | 9/2015 | Ebisawa |
| 9,146,730 | B2 | 9/2015 | Lazar |
| D741,855 | S | 10/2015 | Park et al. |
| 9,170,674 | B2 | 10/2015 | Forutanpour et al. |
| D742,272 | S | 11/2015 | Bailey et al. |
| D742,874 | S | 11/2015 | Cheng et al. |
| D743,963 | S | 11/2015 | Osterhout |
| 9,182,826 | B2 | 11/2015 | Powledge et al. |
| 9,211,417 | B2 | 12/2015 | Heldman et al. |
| 9,218,574 | B2 | 12/2015 | Phillipps et al. |
| D747,714 | S | 1/2016 | Erbeus |

(56) References Cited

U.S. PATENT DOCUMENTS

| | | | |
|---|---|---|---|
| D747,759 | S | 1/2016 | Ho |
| 9,235,934 | B2 | 1/2016 | Mandella et al. |
| 9,240,069 | B1 | 1/2016 | Li |
| D750,623 | S | 3/2016 | Park et al. |
| D751,065 | S | 3/2016 | Magi |
| 9,278,453 | B2 | 3/2016 | Assad |
| 9,299,248 | B2 | 3/2016 | Lake et al. |
| D756,359 | S | 5/2016 | Bailey et al. |
| 9,329,694 | B2 | 5/2016 | Slonneger |
| 9,341,659 | B2 | 5/2016 | Poupyrev et al. |
| 9,349,280 | B2 | 5/2016 | Baldwin et al. |
| 9,351,653 | B1 | 5/2016 | Harrison |
| D758,476 | S | 6/2016 | Ho |
| D760,313 | S | 6/2016 | Ho et al. |
| 9,367,139 | B2 | 6/2016 | Ataee et al. |
| 9,372,535 | B2 | 6/2016 | Bailey et al. |
| 9,389,694 | B2 | 7/2016 | Ataee et al. |
| 9,393,418 | B2 | 7/2016 | Giuffrida et al. |
| 9,402,582 | B1 | 8/2016 | Parviz et al. |
| 9,408,316 | B2 | 8/2016 | Bailey et al. |
| 9,418,927 | B2 | 8/2016 | Axisa et al. |
| D766,895 | S | 9/2016 | Choi |
| 9,439,566 | B2 | 9/2016 | Arne et al. |
| D768,627 | S | 10/2016 | Rochat et al. |
| 9,459,697 | B2 | 10/2016 | Bedikian et al. |
| 9,472,956 | B2 | 10/2016 | Michaelis et al. |
| 9,477,313 | B2 | 10/2016 | Mistry et al. |
| D771,735 | S | 11/2016 | Lee et al. |
| 9,483,123 | B2 | 11/2016 | Aleem et al. |
| 9,529,434 | B2 | 12/2016 | Choi et al. |
| D780,828 | S | 3/2017 | Bonaventura et al. |
| D780,829 | S | 3/2017 | Bonaventura et al. |
| 9,597,015 | B2 | 3/2017 | McNames et al. |
| 9,600,030 | B2 | 3/2017 | Bailey et al. |
| 9,612,661 | B2 | 4/2017 | Wagner et al. |
| 9,613,262 | B2 | 4/2017 | Holz |
| 9,652,047 | B2 | 5/2017 | Mullins et al. |
| 9,654,477 | B1 | 5/2017 | Kotamraju |
| 9,659,403 | B1 | 5/2017 | Horowitz |
| 9,687,168 | B2 | 6/2017 | John |
| 9,696,795 | B2 | 7/2017 | Marcolina et al. |
| 9,720,515 | B2 | 8/2017 | Wagner et al. |
| 9,741,169 | B1 | 8/2017 | Holz |
| 9,766,709 | B2 | 9/2017 | Holz |
| 9,785,247 | B1 | 10/2017 | Horowitz et al. |
| 9,788,789 | B2 | 10/2017 | Bailey |
| 9,807,221 | B2 | 10/2017 | Bailey et al. |
| 9,864,431 | B2 | 1/2018 | Keskin et al. |
| 9,867,548 | B2 | 1/2018 | Le et al. |
| 9,880,632 | B2 | 1/2018 | Ataee et al. |
| 9,891,718 | B2 | 2/2018 | Connor |
| 9,921,641 | B1 | 3/2018 | Worley, III et al. |
| 10,042,422 | B2 | 8/2018 | Morun et al. |
| 10,070,799 | B2 | 9/2018 | Ang et al. |
| 10,078,435 | B2 | 9/2018 | Noel |
| 10,101,809 | B2 | 10/2018 | Morun et al. |
| 10,152,082 | B2 | 12/2018 | Bailey |
| 10,185,416 | B2 | 1/2019 | Mistry et al. |
| 10,188,309 | B2 | 1/2019 | Morun et al. |
| 10,198,871 | B1 | 2/2019 | Hariton |
| 10,199,008 | B2 | 2/2019 | Aleem et al. |
| 10,203,751 | B2 | 2/2019 | Keskin et al. |
| 10,216,274 | B2 | 2/2019 | Chapeskie et al. |
| 10,251,577 | B2 | 4/2019 | Morun et al. |
| 10,310,601 | B2 | 6/2019 | Morun et al. |
| 10,331,210 | B2 | 6/2019 | Morun et al. |
| 10,362,958 | B2 | 7/2019 | Morun et al. |
| 10,409,371 | B2 | 9/2019 | Kaifosh et al. |
| 10,429,928 | B2 | 10/2019 | Morun et al. |
| 10,437,335 | B2 | 10/2019 | Daniels |
| 10,460,455 | B2 | 10/2019 | Giurgica-Tiron et al. |
| 10,489,986 | B2 | 11/2019 | Kaifosh et al. |
| 10,496,168 | B2 | 12/2019 | Kaifosh et al. |
| 10,504,286 | B2 | 12/2019 | Kaifosh et al. |
| 10,520,378 | B1 | 12/2019 | Brown et al. |
| 10,528,135 | B2 | 1/2020 | Bailey et al. |
| 10,558,273 | B2 | 2/2020 | Park et al. |
| 10,592,001 | B2 | 3/2020 | Berenzweig et al. |
| 10,610,737 | B1 | 4/2020 | Crawford |
| 10,676,083 | B1 | 6/2020 | De Sapio et al. |
| 10,687,759 | B2 | 6/2020 | Guo et al. |
| 10,905,350 | B2 | 2/2021 | Berenzweig et al. |
| 10,905,383 | B2 | 2/2021 | Barachant |
| 10,937,414 | B2 | 3/2021 | Berenzweig et al. |
| 10,990,174 | B2 | 4/2021 | Kaifosh et al. |
| 11,009,951 | B2 | 5/2021 | Bailey et al. |
| 11,150,730 | B1 | 10/2021 | Anderson et al. |
| 11,327,566 | B2 | 5/2022 | Hussami et al. |
| 11,635,736 | B2 | 4/2023 | Kaifosh et al. |
| 11,644,799 | B2 | 5/2023 | Lake et al. |
| 12,299,196 | B2 | 5/2025 | Edelson et al. |
| 2001/0033402 | A1 | 10/2001 | Popovich |
| 2002/0003627 | A1 | 1/2002 | Rieder |
| 2002/0009972 | A1 | 1/2002 | Amento et al. |
| 2002/0030636 | A1 | 3/2002 | Richards |
| 2002/0032386 | A1 | 3/2002 | Sackner et al. |
| 2002/0077534 | A1 | 6/2002 | DuRousseau |
| 2002/0094701 | A1 | 7/2002 | Biegelsen et al. |
| 2002/0120415 | A1 | 8/2002 | Millott et al. |
| 2002/0120916 | A1 | 8/2002 | Snider, Jr. |
| 2002/0198472 | A1 | 12/2002 | Kramer |
| 2003/0030595 | A1 | 2/2003 | Radley-Smith |
| 2003/0036691 | A1 | 2/2003 | Stanaland et al. |
| 2003/0051505 | A1 | 3/2003 | Robertson et al. |
| 2003/0144586 | A1 | 7/2003 | Tsubata |
| 2003/0144829 | A1 | 7/2003 | Geatz et al. |
| 2003/0171921 | A1 | 9/2003 | Manabe et al. |
| 2003/0182630 | A1 | 9/2003 | Saund et al. |
| 2003/0184544 | A1 | 10/2003 | Prudent |
| 2004/0010210 | A1 | 1/2004 | Avinash et al. |
| 2004/0024312 | A1 | 2/2004 | Zheng |
| 2004/0054273 | A1 | 3/2004 | Finneran et al. |
| 2004/0068409 | A1 | 4/2004 | Tanaka et al. |
| 2004/0073104 | A1 | 4/2004 | Brun del Re et al. |
| 2004/0073414 | A1 | 4/2004 | Bienenstock et al. |
| 2004/0080499 | A1 | 4/2004 | Lui |
| 2004/0092839 | A1 | 5/2004 | Shin et al. |
| 2004/0138580 | A1 | 7/2004 | Frei et al. |
| 2004/0194500 | A1 | 10/2004 | Rapport |
| 2004/0210165 | A1 | 10/2004 | Marmaropoulos et al. |
| 2004/0243342 | A1 | 12/2004 | Rekimoto |
| 2004/0254617 | A1 | 12/2004 | Hemmerling et al. |
| 2005/0005637 | A1 | 1/2005 | Rapport |
| 2005/0012715 | A1 | 1/2005 | Ford |
| 2005/0070227 | A1 | 3/2005 | Shen et al. |
| 2005/0070791 | A1 | 3/2005 | Edney et al. |
| 2005/0115561 | A1 | 6/2005 | Stahmann et al. |
| 2005/0119701 | A1 | 6/2005 | Lauter et al. |
| 2005/0177038 | A1 | 8/2005 | Kolpin et al. |
| 2005/0179644 | A1 | 8/2005 | Alsio et al. |
| 2006/0018833 | A1 | 1/2006 | Murphy et al. |
| 2006/0037359 | A1 | 2/2006 | Stinespring |
| 2006/0058699 | A1 | 3/2006 | Mtiello et al. |
| 2006/0061544 | A1 | 3/2006 | Min et al. |
| 2006/0121958 | A1 | 6/2006 | Jung et al. |
| 2006/0129057 | A1 | 6/2006 | Maekawa et al. |
| 2006/0132705 | A1 | 6/2006 | Li |
| 2006/0149338 | A1 | 7/2006 | Flaherty et al. |
| 2006/0211956 | A1 | 9/2006 | Sankai |
| 2006/0238707 | A1 | 10/2006 | Elvesjo et al. |
| 2007/0009151 | A1 | 1/2007 | Pittman et al. |
| 2007/0016265 | A1 | 1/2007 | Davoodi et al. |
| 2007/0023662 | A1 | 2/2007 | Brady et al. |
| 2007/0078308 | A1 | 4/2007 | Daly |
| 2007/0132785 | A1 | 6/2007 | Ebersole, Jr. et al. |
| 2007/0148624 | A1 | 6/2007 | Nativ |
| 2007/0172797 | A1 | 7/2007 | Hada et al. |
| 2007/0177770 | A1 | 8/2007 | Derchak et al. |
| 2007/0185697 | A1 | 8/2007 | Tan et al. |
| 2007/0196033 | A1 | 8/2007 | Russo |
| 2007/0256494 | A1 | 11/2007 | Nakamura et al. |
| 2007/0276270 | A1 | 11/2007 | Tran |
| 2007/0279852 | A1 | 12/2007 | Daniel et al. |
| 2007/0285399 | A1 | 12/2007 | Lund |

(56) References Cited

U.S. PATENT DOCUMENTS

| | | | |
|---|---|---|---|
| 2008/0001735 | A1 | 1/2008 | Tran |
| 2008/0032638 | A1 | 2/2008 | Anderson |
| 2008/0051673 | A1 | 2/2008 | Kong et al. |
| 2008/0052643 | A1 | 2/2008 | Ike et al. |
| 2008/0058668 | A1 | 3/2008 | Seyed Momen et al. |
| 2008/0103639 | A1 | 5/2008 | Troy et al. |
| 2008/0103769 | A1 | 5/2008 | Schultz et al. |
| 2008/0136775 | A1 | 6/2008 | Conant |
| 2008/0152217 | A1 | 6/2008 | Greer |
| 2008/0163130 | A1 | 7/2008 | Westerman |
| 2008/0214360 | A1 | 9/2008 | Stirling et al. |
| 2008/0221487 | A1 | 9/2008 | Zohar et al. |
| 2008/0262772 | A1 | 10/2008 | Luinge et al. |
| 2008/0278497 | A1 | 11/2008 | Jammes et al. |
| 2008/0285805 | A1 | 11/2008 | Luinge et al. |
| 2009/0005700 | A1 | 1/2009 | Joshi et al. |
| 2009/0007597 | A1 | 1/2009 | Hanevold |
| 2009/0027337 | A1 | 1/2009 | Hildreth |
| 2009/0031757 | A1 | 2/2009 | Harding |
| 2009/0040016 | A1 | 2/2009 | Ikeda |
| 2009/0051544 | A1 | 2/2009 | Niknejad |
| 2009/0079607 | A1 | 3/2009 | Denison et al. |
| 2009/0079813 | A1 | 3/2009 | Hildreth |
| 2009/0082692 | A1 | 3/2009 | Hale et al. |
| 2009/0082701 | A1 | 3/2009 | Zohar et al. |
| 2009/0085864 | A1 | 4/2009 | Kutliroff et al. |
| 2009/0102580 | A1 | 4/2009 | Uchaykin |
| 2009/0109241 | A1 | 4/2009 | Tsujimoto |
| 2009/0112080 | A1 | 4/2009 | Matthews |
| 2009/0124881 | A1 | 5/2009 | Rytky |
| 2009/0147004 | A1 | 6/2009 | Ramon et al. |
| 2009/0179824 | A1 | 7/2009 | Tsujimoto et al. |
| 2009/0189864 | A1 | 7/2009 | Walker et al. |
| 2009/0189867 | A1 | 7/2009 | Krah et al. |
| 2009/0195497 | A1 | 8/2009 | Fitzgerald et al. |
| 2009/0204031 | A1 | 8/2009 | McNames et al. |
| 2009/0207464 | A1 | 8/2009 | Wiltshire et al. |
| 2009/0209878 | A1 | 8/2009 | Sanger |
| 2009/0251407 | A1 | 10/2009 | Flake et al. |
| 2009/0258669 | A1 | 10/2009 | Nie et al. |
| 2009/0265671 | A1 | 10/2009 | Sachs et al. |
| 2009/0318785 | A1 | 12/2009 | Ishikawa et al. |
| 2009/0319230 | A1 | 12/2009 | Case, Jr. et al. |
| 2009/0322653 | A1 | 12/2009 | Putilin et al. |
| 2009/0326406 | A1 | 12/2009 | Tan et al. |
| 2009/0327171 | A1 | 12/2009 | Tan et al. |
| 2010/0030532 | A1 | 2/2010 | Arora et al. |
| 2010/0041974 | A1 | 2/2010 | Ting et al. |
| 2010/0045619 | A1 | 2/2010 | Birnbaum et al. |
| 2010/0063794 | A1 | 3/2010 | Hernandez-Rebollar |
| 2010/0066664 | A1 | 3/2010 | Son et al. |
| 2010/0106044 | A1 | 4/2010 | Linderman |
| 2010/0113910 | A1 | 5/2010 | Brauers et al. |
| 2010/0142015 | A1 | 6/2010 | Kuwahara et al. |
| 2010/0149073 | A1 | 6/2010 | Chaum et al. |
| 2010/0150415 | A1 | 6/2010 | Atkinson et al. |
| 2010/0228487 | A1 | 9/2010 | Leuthardt et al. |
| 2010/0234696 | A1 | 9/2010 | Li et al. |
| 2010/0240981 | A1 | 9/2010 | Barboutis et al. |
| 2010/0249635 | A1 | 9/2010 | Van Der Reijden |
| 2010/0280628 | A1 | 11/2010 | Sankai |
| 2010/0292595 | A1 | 11/2010 | Paul |
| 2010/0292606 | A1 | 11/2010 | Prakash et al. |
| 2010/0292617 | A1 | 11/2010 | Lei et al. |
| 2010/0293115 | A1 | 11/2010 | Seyed Momen |
| 2010/0306713 | A1 | 12/2010 | Geisner et al. |
| 2010/0315266 | A1 | 12/2010 | Gunawardana et al. |
| 2010/0317958 | A1 | 12/2010 | Beck et al. |
| 2011/0007035 | A1 | 1/2011 | Shai |
| 2011/0018754 | A1 | 1/2011 | Tojima et al. |
| 2011/0025982 | A1 | 2/2011 | Takahashi |
| 2011/0054360 | A1 | 3/2011 | Son et al. |
| 2011/0065319 | A1 | 3/2011 | Oster et al. |
| 2011/0066381 | A1 | 3/2011 | Garudadri et al. |
| 2011/0072510 | A1 | 3/2011 | Cheswick |
| 2011/0077484 | A1 | 3/2011 | Van Slyke et al. |
| 2011/0082838 | A1 | 4/2011 | Niemela |
| 2011/0092826 | A1 | 4/2011 | Lee et al. |
| 2011/0105859 | A1 | 5/2011 | Popovic et al. |
| 2011/0119216 | A1 | 5/2011 | Wigdor |
| 2011/0133934 | A1 | 6/2011 | Tan et al. |
| 2011/0134026 | A1 | 6/2011 | Kang et al. |
| 2011/0151974 | A1 | 6/2011 | Deaguero |
| 2011/0166434 | A1 | 7/2011 | Gargiulo |
| 2011/0172503 | A1 | 7/2011 | Knepper et al. |
| 2011/0173204 | A1 | 7/2011 | Murillo et al. |
| 2011/0173574 | A1 | 7/2011 | Clavin et al. |
| 2011/0181527 | A1 | 7/2011 | Capela et al. |
| 2011/0202493 | A1 | 8/2011 | Li |
| 2011/0205242 | A1 | 8/2011 | Friesen |
| 2011/0213278 | A1 | 9/2011 | Horak et al. |
| 2011/0221656 | A1 | 9/2011 | Haddick et al. |
| 2011/0221672 | A1 | 9/2011 | Osterhout et al. |
| 2011/0224507 | A1 | 9/2011 | Banet et al. |
| 2011/0224556 | A1 | 9/2011 | Moon et al. |
| 2011/0224564 | A1 | 9/2011 | Moon et al. |
| 2011/0230782 | A1 | 9/2011 | Bartol et al. |
| 2011/0248914 | A1 | 10/2011 | Sherr |
| 2011/0262002 | A1 | 10/2011 | Lee |
| 2011/0270135 | A1 | 11/2011 | Dooley et al. |
| 2011/0295100 | A1 | 12/2011 | Hegde et al. |
| 2011/0313762 | A1 | 12/2011 | Ben-David et al. |
| 2012/0002256 | A1 | 1/2012 | Lacoste et al. |
| 2012/0007821 | A1 | 1/2012 | Zaliva |
| 2012/0029322 | A1 | 2/2012 | Wartena et al. |
| 2012/0051005 | A1 | 3/2012 | Vanfleteren et al. |
| 2012/0052268 | A1 | 3/2012 | Axisa et al. |
| 2012/0053439 | A1 | 3/2012 | Ylostalo et al. |
| 2012/0066163 | A1 | 3/2012 | Balls et al. |
| 2012/0071092 | A1 | 3/2012 | Pasquero et al. |
| 2012/0071780 | A1 | 3/2012 | Barachant et al. |
| 2012/0101357 | A1 | 4/2012 | Hoskuldsson et al. |
| 2012/0117514 | A1 | 5/2012 | Kim et al. |
| 2012/0139817 | A1 | 6/2012 | Freeman |
| 2012/0157789 | A1 | 6/2012 | Kangas et al. |
| 2012/0157886 | A1 | 6/2012 | Tenn et al. |
| 2012/0165695 | A1 | 6/2012 | Kidmose et al. |
| 2012/0182309 | A1 | 7/2012 | Griffin et al. |
| 2012/0184838 | A1 | 7/2012 | John |
| 2012/0188158 | A1 | 7/2012 | Tan et al. |
| 2012/0203076 | A1 | 8/2012 | Fatta et al. |
| 2012/0209134 | A1 | 8/2012 | Morita et al. |
| 2012/0226130 | A1 | 9/2012 | De Graff et al. |
| 2012/0249797 | A1 | 10/2012 | Haddick et al. |
| 2012/0265090 | A1 | 10/2012 | Fink et al. |
| 2012/0265480 | A1 | 10/2012 | Oshima |
| 2012/0275621 | A1 | 11/2012 | Elko |
| 2012/0283526 | A1 | 11/2012 | Gommesen et al. |
| 2012/0283896 | A1 | 11/2012 | Persaud et al. |
| 2012/0293548 | A1 | 11/2012 | Perez et al. |
| 2012/0302858 | A1 | 11/2012 | Kidmose et al. |
| 2012/0320532 | A1 | 12/2012 | Wang |
| 2012/0323521 | A1 | 12/2012 | De Foras et al. |
| 2013/0004033 | A1 | 1/2013 | Trugenberger |
| 2013/0005303 | A1 | 1/2013 | Song et al. |
| 2013/0016292 | A1 | 1/2013 | Miao et al. |
| 2013/0016413 | A1 | 1/2013 | Saeedi et al. |
| 2013/0020948 | A1 | 1/2013 | Han et al. |
| 2013/0027341 | A1 | 1/2013 | Mastandrea |
| 2013/0038707 | A1 | 2/2013 | Cunningham et al. |
| 2013/0077820 | A1 | 3/2013 | Marais et al. |
| 2013/0080794 | A1 | 3/2013 | Hsieh |
| 2013/0106686 | A1 | 5/2013 | Bennett |
| 2013/0123656 | A1 | 5/2013 | Heck |
| 2013/0123666 | A1 | 5/2013 | Giuffrida et al. |
| 2013/0127708 | A1 | 5/2013 | Jung et al. |
| 2013/0131538 | A1 | 5/2013 | Gaw et al. |
| 2013/0135223 | A1 | 5/2013 | Shai |
| 2013/0135722 | A1 | 5/2013 | Yokoyama |
| 2013/0141375 | A1 | 6/2013 | Ludwig et al. |
| 2013/0144629 | A1 | 6/2013 | Johnston et al. |
| 2013/0165813 | A1 | 6/2013 | Chang et al. |
| 2013/0191741 | A1 | 7/2013 | Dickinson et al. |
| 2013/0198694 | A1 | 8/2013 | Rahman et al. |

(56) References Cited

U.S. PATENT DOCUMENTS

| | | | |
|---|---|---|---|
| 2013/0207889 A1 | 8/2013 | Chang et al. |
| 2013/0207963 A1 | 8/2013 | Stirbu et al. |
| 2013/0215235 A1 | 8/2013 | Russell |
| 2013/0217998 A1 | 8/2013 | Mahfouz et al. |
| 2013/0221996 A1 | 8/2013 | Poupyrev et al. |
| 2013/0222384 A1 | 8/2013 | Futterer |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285901 A1 | 10/2013 | Lee et al. |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2013/0335302 A1 | 12/2013 | Crane et al. |
| 2014/0005743 A1 | 1/2014 | Giuffrida et al. |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0051946 A1 | 2/2014 | Arne et al. |
| 2014/0052150 A1 | 2/2014 | Taylor et al. |
| 2014/0074179 A1 | 3/2014 | Heldman et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0132512 A1 | 5/2014 | Gomez Sainz-Garcia |
| 2014/0139422 A1 | 5/2014 | Mistry et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0157168 A1 | 6/2014 | Albouyeh et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0202643 A1 | 7/2014 | Hikmet et al. |
| 2014/0204455 A1 | 7/2014 | Popovich et al. |
| 2014/0207017 A1 | 7/2014 | Gilmore et al. |
| 2014/0223462 A1 | 8/2014 | Aimone et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0258864 A1 | 9/2014 | Shenoy et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0285429 A1 | 9/2014 | Simmons |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368424 A1 | 12/2014 | Choi et al. |
| 2014/0368428 A1 | 12/2014 | Pinault |
| 2014/0368474 A1 | 12/2014 | Kim et al. |
| 2014/0368896 A1 | 12/2014 | Nakazono et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0036221 A1 | 2/2015 | Stephenson |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1 | 5/2015 | Sallum et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0185838 A1 | 7/2015 | Camacho-Perez et al. |
| 2015/0185853 A1 | 7/2015 | Clausen et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0205126 A1 | 7/2015 | Schowengerdt |
| 2015/0205134 A1 | 7/2015 | Bailey et al. |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0234477 A1 | 8/2015 | Abovitz et al. |
| 2015/0237716 A1 | 8/2015 | Su et al. |
| 2015/0242009 A1 | 8/2015 | Xiao et al. |
| 2015/0242120 A1 | 8/2015 | Rodriguez |
| 2015/0242575 A1 | 8/2015 | Abovitz et al. |
| 2015/0261306 A1 | 9/2015 | Lake |

(56) References Cited

U.S. PATENT DOCUMENTS

2015/0261318 A1 9/2015 Scavezze et al.
2015/0272483 A1 10/2015 Etemad et al.
2015/0277575 A1 10/2015 Ataee et al.
2015/0288944 A1 10/2015 Nistico et al.
2015/0289995 A1 10/2015 Wilkinson et al.
2015/0293592 A1 10/2015 Cheong et al.
2015/0296553 A1 10/2015 DiFranco et al.
2015/0302168 A1 10/2015 De Sapio et al.
2015/0305672 A1 10/2015 Grey et al.
2015/0309563 A1 10/2015 Connor
2015/0309582 A1 10/2015 Gupta
2015/0310766 A1 10/2015 Alshehri et al.
2015/0312175 A1 10/2015 Langholz
2015/0313496 A1 11/2015 Connor
2015/0323998 A1 11/2015 Kudekar et al.
2015/0325202 A1 11/2015 Lake et al.
2015/0332013 A1 11/2015 Lee et al.
2015/0346701 A1 12/2015 Gordon et al.
2015/0351690 A1 12/2015 Toth et al.
2015/0355716 A1 12/2015 Balasubramanian et al.
2015/0355718 A1 12/2015 Slonneger
2015/0362734 A1 12/2015 Moser et al.
2015/0366504 A1 12/2015 Connor
2015/0370326 A1 12/2015 Chapeskie et al.
2015/0370333 A1 12/2015 Ataee et al.
2015/0378161 A1 12/2015 Bailey et al.
2015/0378162 A1 12/2015 Bailey et al.
2015/0378164 A1 12/2015 Bailey et al.
2015/0379770 A1 12/2015 Haley, Jr. et al.
2016/0011668 A1 1/2016 Gilad-Bachrach et al.
2016/0020500 A1 1/2016 Matsuda
2016/0026853 A1 1/2016 Wexler et al.
2016/0033771 A1 2/2016 Tremblay et al.
2016/0049073 A1 2/2016 Lee
2016/0050037 A1 2/2016 Webb
2016/0071319 A1 3/2016 Fallon et al.
2016/0080897 A1 3/2016 Moore et al.
2016/0092504 A1 3/2016 Mitri et al.
2016/0093106 A1 3/2016 Black
2016/0099010 A1 4/2016 Sainath et al.
2016/0107309 A1 4/2016 Walsh et al.
2016/0113587 A1 4/2016 Kothe et al.
2016/0144172 A1 5/2016 Hsueh et al.
2016/0150636 A1 5/2016 Otsubo
2016/0156762 A1 6/2016 Bailey et al.
2016/0162604 A1 6/2016 Xiaoli et al.
2016/0170710 A1 6/2016 Kim et al.
2016/0187992 A1 6/2016 Yamamoto et al.
2016/0195928 A1 7/2016 Wagner et al.
2016/0199699 A1 7/2016 Klassen
2016/0202081 A1 7/2016 Debieuvre et al.
2016/0206206 A1 7/2016 Avila et al.
2016/0207201 A1 7/2016 Herr et al.
2016/0217614 A1 7/2016 Kraver et al.
2016/0235323 A1 8/2016 Tadi et al.
2016/0238845 A1 8/2016 Alexander et al.
2016/0239080 A1 8/2016 Marcolina et al.
2016/0242646 A1 8/2016 Obma
2016/0259407 A1 9/2016 Schick
2016/0262687 A1 9/2016 Vaidyanathan et al.
2016/0263458 A1 9/2016 Mather et al.
2016/0274365 A1 9/2016 Bailey et al.
2016/0274732 A1 9/2016 Bang et al.
2016/0274758 A1 9/2016 Bailey
2016/0275726 A1 9/2016 Mullins
2016/0282947 A1 9/2016 Schwarz et al.
2016/0291768 A1 10/2016 Cho et al.
2016/0292497 A1 10/2016 Kehtarnavaz et al.
2016/0309249 A1 10/2016 Wu et al.
2016/0313798 A1 10/2016 Connor
2016/0313801 A1 10/2016 Wagner et al.
2016/0313890 A1 10/2016 Walline et al.
2016/0313899 A1 10/2016 Noel
2016/0314623 A1 10/2016 Coleman et al.
2016/0327796 A1 11/2016 Bailey et al.
2016/0327797 A1 11/2016 Bailey et al.
2016/0342227 A1 11/2016 Natzke et al.
2016/0349514 A1 12/2016 Alexander et al.
2016/0349515 A1 12/2016 Alexander et al.
2016/0349516 A1 12/2016 Alexander et al.
2016/0350973 A1 12/2016 Shapira et al.
2016/0377865 A1 12/2016 Alexander et al.
2016/0377866 A1 12/2016 Alexander et al.
2017/0025026 A1* 1/2017 Ortiz Catalan ......... G06F 3/017
2017/0031502 A1 2/2017 Rosenberg et al.
2017/0035313 A1 2/2017 Hong et al.
2017/0061817 A1 3/2017 Mettler May
2017/0068095 A1 3/2017 Holland et al.
2017/0068445 A1 3/2017 Lee et al.
2017/0075426 A1 3/2017 Camacho Perez et al.
2017/0079828 A1 3/2017 Pedtke et al.
2017/0080346 A1 3/2017 Abbas
2017/0090604 A1 3/2017 Barbier
2017/0091567 A1 3/2017 Wang et al.
2017/0095178 A1 4/2017 Schoen et al.
2017/0097753 A1 4/2017 Bailey et al.
2017/0115483 A1 4/2017 Aleem et al.
2017/0119472 A1 5/2017 Herrmann et al.
2017/0123487 A1 5/2017 Hazra et al.
2017/0124474 A1 5/2017 Kashyap
2017/0124816 A1 5/2017 Yang et al.
2017/0127354 A1 5/2017 Garland et al.
2017/0147077 A1 5/2017 Park et al.
2017/0153701 A1 6/2017 Mahon et al.
2017/0161635 A1 6/2017 Oono et al.
2017/0188878 A1 7/2017 Lee
2017/0188980 A1 7/2017 Ash
2017/0197142 A1 7/2017 Stafford et al.
2017/0205876 A1 7/2017 Vidal et al.
2017/0209055 A1 7/2017 Pantelopoulos et al.
2017/0212290 A1 7/2017 Alexander et al.
2017/0212349 A1 7/2017 Bailey et al.
2017/0219829 A1 8/2017 Bailey
2017/0220923 A1 8/2017 Bae et al.
2017/0237789 A1 8/2017 Harner et al.
2017/0237901 A1 8/2017 Lee et al.
2017/0259167 A1 9/2017 Cook et al.
2017/0262064 A1 9/2017 Ofir et al.
2017/0277282 A1 9/2017 Go
2017/0285744 A1 10/2017 Juliato
2017/0285756 A1 10/2017 Wang et al.
2017/0285757 A1 10/2017 Robertson et al.
2017/0285848 A1 10/2017 Rosenberg et al.
2017/0296363 A1 10/2017 Yetkin et al.
2017/0299956 A1 10/2017 Holland et al.
2017/0301630 A1 10/2017 Nguyen et al.
2017/0308118 A1 10/2017 Ito
2017/0312614 A1 11/2017 Tran et al.
2017/0329392 A1 11/2017 Keskin et al.
2017/0329404 A1 11/2017 Keskin et al.
2017/0340506 A1 11/2017 Zhang et al.
2017/0344706 A1 11/2017 Torres et al.
2017/0347908 A1 12/2017 Watanabe et al.
2017/0371403 A1 12/2017 Wetzler et al.
2018/0000367 A1 1/2018 Longinotti-Buitoni
2018/0018825 A1 1/2018 Kim et al.
2018/0020285 A1 1/2018 Zass
2018/0020951 A1 1/2018 Kaifosh et al.
2018/0020978 A1 1/2018 Kaifosh et al.
2018/0020990 A1 1/2018 Park et al.
2018/0024634 A1 1/2018 Kaifosh et al.
2018/0024635 A1 1/2018 Kaifosh et al.
2018/0024641 A1 1/2018 Mao et al.
2018/0064363 A1 3/2018 Morun et al.
2018/0067553 A1 3/2018 Morun et al.
2018/0068489 A1 3/2018 Kim et al.
2018/0074332 A1 3/2018 Li et al.
2018/0081439 A1 3/2018 Daniels
2018/0088675 A1 3/2018 Vogel et al.
2018/0088765 A1 3/2018 Bailey
2018/0092599 A1 4/2018 Kerth et al.
2018/0093181 A1 4/2018 Goslin et al.
2018/0095542 A1 4/2018 Mallinson
2018/0095630 A1 4/2018 Bailey

(56) References Cited

U.S. PATENT DOCUMENTS

| | | | |
|---|---|---|---|
| 2018/0101235 | A1 | 4/2018 | Bodensteiner et al. |
| 2018/0101289 | A1 | 4/2018 | Bailey |
| 2018/0101599 | A1 | 4/2018 | Arnold et al. |
| 2018/0107275 | A1 | 4/2018 | Chen et al. |
| 2018/0120948 | A1 | 5/2018 | Aleem et al. |
| 2018/0133551 | A1 | 5/2018 | Chang et al. |
| 2018/0140441 | A1 | 5/2018 | Poirters |
| 2018/0150033 | A1 | 5/2018 | Lake et al. |
| 2018/0153430 | A1 | 6/2018 | Ang et al. |
| 2018/0153444 | A1 | 6/2018 | Yang et al. |
| 2018/0154140 | A1 | 6/2018 | Bouton et al. |
| 2018/0168905 | A1 | 6/2018 | Goodall et al. |
| 2018/0178008 | A1 | 6/2018 | Bouton et al. |
| 2018/0217249 | A1 | 8/2018 | La Salla et al. |
| 2018/0239430 | A1 | 8/2018 | Tadi et al. |
| 2018/0240459 | A1 | 8/2018 | Weng et al. |
| 2018/0247443 | A1 | 8/2018 | Briggs et al. |
| 2018/0279919 | A1 | 10/2018 | Bansbach et al. |
| 2018/0301057 | A1 | 10/2018 | Hargrove et al. |
| 2018/0307303 | A1 | 10/2018 | Powderly et al. |
| 2018/0307314 | A1 | 10/2018 | Connor |
| 2018/0314879 | A1 | 11/2018 | Khwaja et al. |
| 2018/0321745 | A1 | 11/2018 | Morun et al. |
| 2018/0321746 | A1 | 11/2018 | Morun et al. |
| 2018/0330549 | A1 | 11/2018 | Brenton |
| 2018/0333575 | A1 | 11/2018 | Bouton |
| 2018/0344195 | A1 | 12/2018 | Morun et al. |
| 2018/0356890 | A1 | 12/2018 | Zhang et al. |
| 2018/0360379 | A1 | 12/2018 | Harrison et al. |
| 2019/0008453 | A1 | 1/2019 | Spoof |
| 2019/0025919 | A1 | 1/2019 | Tadi et al. |
| 2019/0027141 | A1 | 1/2019 | Strong et al. |
| 2019/0033967 | A1 | 1/2019 | Morun et al. |
| 2019/0033974 | A1 | 1/2019 | Mu et al. |
| 2019/0038166 | A1 | 2/2019 | Tavabi et al. |
| 2019/0056422 | A1 | 2/2019 | Park et al. |
| 2019/0076716 | A1 | 3/2019 | Chiou et al. |
| 2019/0089898 | A1 | 3/2019 | Kim et al. |
| 2019/0113973 | A1 | 4/2019 | Coleman et al. |
| 2019/0121305 | A1 | 4/2019 | Kaifosh et al. |
| 2019/0121306 | A1 | 4/2019 | Kaifosh et al. |
| 2019/0121522 | A1 | 4/2019 | Davis et al. |
| 2019/0146809 | A1 | 5/2019 | Lee et al. |
| 2019/0150777 | A1 | 5/2019 | Guo et al. |
| 2019/0192037 | A1 | 6/2019 | Morun et al. |
| 2019/0196585 | A1 | 6/2019 | Laszlo et al. |
| 2019/0196586 | A1 | 6/2019 | Laszlo et al. |
| 2019/0197778 | A1 | 6/2019 | Sachdeva et al. |
| 2019/0209034 | A1 | 7/2019 | Deno et al. |
| 2019/0212817 | A1 | 7/2019 | Kaifosh et al. |
| 2019/0216619 | A1 | 7/2019 | McDonnall et al. |
| 2019/0223748 | A1 | 7/2019 | Al-Natsheh et al. |
| 2019/0227627 | A1 | 7/2019 | Kaifosh et al. |
| 2019/0228330 | A1 | 7/2019 | Kaifosh et al. |
| 2019/0228533 | A1 | 7/2019 | Giurgica-Tiron et al. |
| 2019/0228579 | A1 | 7/2019 | Kaifosh et al. |
| 2019/0228590 | A1 | 7/2019 | Kaifosh et al. |
| 2019/0228591 | A1 | 7/2019 | Giurgica-Tiron et al. |
| 2019/0247650 | A1 | 8/2019 | Tran |
| 2019/0279407 | A1 | 9/2019 | McHugh et al. |
| 2019/0294243 | A1 | 9/2019 | Laszlo et al. |
| 2019/0324549 | A1 | 10/2019 | Araki et al. |
| 2019/0332140 | A1 | 10/2019 | Wang et al. |
| 2019/0348026 | A1 | 11/2019 | Berenzweig et al. |
| 2019/0348027 | A1 | 11/2019 | Berenzweig et al. |
| 2019/0357787 | A1 | 11/2019 | Barachant et al. |
| 2019/0362557 | A1 | 11/2019 | Lacey et al. |
| 2020/0042089 | A1 | 2/2020 | Ang et al. |
| 2020/0057661 | A1 | 2/2020 | Bendfeldt |
| 2020/0065569 | A1 | 2/2020 | Nduka et al. |
| 2020/0069210 | A1 | 3/2020 | Berenzweig et al. |
| 2020/0069211 | A1 | 3/2020 | Berenzweig et al. |
| 2020/0073483 | A1 | 3/2020 | Berenzweig et al. |
| 2020/0077955 | A1 | 3/2020 | Shui et al. |
| 2020/0097081 | A1 | 3/2020 | Stone et al. |
| 2020/0097083 | A1 | 3/2020 | Mao et al. |
| 2020/0111260 | A1 | 4/2020 | Osborn et al. |
| 2020/0125171 | A1 | 4/2020 | Morun et al. |
| 2020/0142490 | A1 | 5/2020 | Xiong et al. |
| 2020/0143795 | A1 | 5/2020 | Park et al. |
| 2020/0159322 | A1 | 5/2020 | Morun et al. |
| 2020/0163562 | A1 | 5/2020 | Neaves |
| 2020/0205932 | A1 | 7/2020 | Zar et al. |
| 2020/0225320 | A1 | 7/2020 | Belskikh et al. |
| 2020/0245873 | A1 | 8/2020 | Frank et al. |
| 2020/0249752 | A1 | 8/2020 | Parshionikar |
| 2020/0275895 | A1 | 9/2020 | Barachant |
| 2020/0301509 | A1 | 9/2020 | Liu et al. |
| 2020/0305795 | A1 | 10/2020 | Floyd et al. |
| 2020/0310540 | A1 | 10/2020 | Hussami et al. |
| 2020/0320335 | A1 | 10/2020 | Shamun et al. |
| 2021/0109598 | A1 | 4/2021 | Zhang et al. |
| 2021/0117523 | A1 | 4/2021 | Kim et al. |
| 2021/0290159 | A1 | 9/2021 | Bruinsma et al. |
| 2021/0311546 | A1 * | 10/2021 | Kodama ................. G06F 3/011 |
| 2022/0019284 | A1 | 1/2022 | Kaifosh et al. |
| 2022/0134219 | A1 | 5/2022 | Stafford et al. |
| 2022/0256706 | A1 | 8/2022 | Xiong et al. |
| 2024/0302899 | A1 | 9/2024 | Edelson et al. |
| 2025/0095302 | A1 | 3/2025 | Wetmore |

FOREIGN PATENT DOCUMENTS

| | | | |
|---|---|---|---|
| CA | 2939644 | A1 | 8/2015 |
| CN | 1838933 | A | 9/2006 |
| CN | 101310242 | A | 11/2008 |
| CN | 102129343 | A | 7/2011 |
| CN | 102246125 | A | 11/2011 |
| CN | 102349037 | A | 2/2012 |
| CN | 102566756 | A | 7/2012 |
| CN | 103501694 | A | 1/2014 |
| CN | 103720470 | A | 4/2014 |
| CN | 103764021 | A | 4/2014 |
| CN | 103777752 | A | 5/2014 |
| CN | 103858073 | A | 6/2014 |
| CN | 103886215 | A | 6/2014 |
| CN | 104107134 | A | 10/2014 |
| CN | 104205015 | A | 12/2014 |
| CN | 104951069 | A | 9/2015 |
| CN | 105009031 | A | 10/2015 |
| CN | 105190477 | A | 12/2015 |
| CN | 105190578 | A | 12/2015 |
| CN | 105511615 | A | 4/2016 |
| CN | 106061369 | A | 10/2016 |
| CN | 106067178 | A | 11/2016 |
| CN | 106102504 | A | 11/2016 |
| CN | 106108898 | A | 11/2016 |
| CN | 107203272 | A | 9/2017 |
| CN | 107209566 | A | 9/2017 |
| CN | 107589782 | A | 1/2018 |
| CN | 107864440 | A | 3/2018 |
| CN | 107928980 | A | 4/2018 |
| CN | 108431736 | A | 8/2018 |
| CN | 108463271 | A | 8/2018 |
| CN | 108665956 | A | 10/2018 |
| CN | 109243572 | A | 1/2019 |
| CN | 109620651 | A | 4/2019 |
| CN | 110300542 | A | 10/2019 |
| CN | 111616847 | A | 9/2020 |
| CN | 111902077 | A | 11/2020 |
| CN | 112074225 | A | 12/2020 |
| CN | 112469469 | A | 3/2021 |
| CN | 112789577 | A | 5/2021 |
| CN | 112822992 | A | 5/2021 |
| CN | 113632176 | A | 11/2021 |
| DE | 4412278 | A1 | 10/1995 |
| EP | 0301790 | A2 | 2/1989 |
| EP | 1345210 | A2 | 9/2003 |
| EP | 1408443 | B1 | 10/2006 |
| EP | 2198521 | B1 | 6/2012 |
| EP | 2541763 | A1 | 1/2013 |
| EP | 2733578 | A2 | 5/2014 |
| EP | 2959394 | A1 | 12/2015 |
| EP | 3104737 | A1 | 12/2016 |

(56) References Cited

FOREIGN PATENT DOCUMENTS

| | | | |
|---|---|---|---|
| EP | 3200051 | A1 | 8/2017 |
| EP | 3487395 | A1 | 5/2019 |
| EP | 3697297 | A4 | 12/2020 |
| EP | 2959394 | B1 | 5/2021 |
| EP | 3948881 | A1 | 2/2022 |
| JP | S61198892 | A | 9/1986 |
| JP | H05277080 | A | 10/1993 |
| JP | H0639754 | A | 2/1994 |
| JP | H07248873 | A | 9/1995 |
| JP | 3103427 | B2 | 10/2000 |
| JP | 2001051726 | A | 2/2001 |
| JP | 2001054507 | A | 2/2001 |
| JP | 2002287869 | A | 10/2002 |
| JP | 2003303047 | A | 10/2003 |
| JP | 2005095561 | A | 4/2005 |
| JP | 2005352739 | A | 12/2005 |
| JP | 2008192004 | A | 8/2008 |
| JP | 2009050679 | A | 3/2009 |
| JP | 2010520561 | A | 6/2010 |
| JP | 2013160905 | A | 8/2013 |
| JP | 2015512550 | A | 4/2015 |
| JP | 2015514467 | A | 5/2015 |
| JP | 2016507098 | A | 3/2016 |
| JP | 2016507851 | A | 3/2016 |
| JP | 2016150118 | A | 8/2016 |
| JP | 2016540276 | A | 12/2016 |
| JP | 2017509386 | A | 4/2017 |
| JP | 2018511122 | A | 4/2018 |
| JP | 2018190127 | A | 11/2018 |
| JP | 2019023941 | A | 2/2019 |
| JP | 2019185531 | A | 10/2019 |
| JP | 2021072136 | A | 5/2021 |
| KR | 20110040165 | A | 4/2011 |
| KR | 20120094870 | A | 8/2012 |
| KR | 20120097997 | A | 9/2012 |
| KR | 20150123254 | A | 11/2015 |
| KR | 20160121552 | A | 10/2016 |
| KR | 20170067873 | A | 6/2017 |
| KR | 20170107283 | A | 9/2017 |
| KR | 101790147 | B1 | 10/2017 |
| KR | 20190022329 | A | 3/2019 |
| WO | 9527341 | A1 | 10/1995 |
| WO | 2006086504 | A2 | 8/2006 |
| WO | 2008109248 | A2 | 9/2008 |
| WO | 2009042313 | A1 | 4/2009 |
| WO | 2010095636 | A1 | 8/2010 |
| WO | 2010104879 | A2 | 9/2010 |
| WO | WO-2011011750 | A1 | 1/2011 |
| WO | 2011070554 | A2 | 6/2011 |
| WO | 2012155157 | A1 | 11/2012 |
| WO | 2013154864 | A1 | 10/2013 |
| WO | 2014130871 | A1 | 8/2014 |
| WO | WO-2014155288 | A2 | 10/2014 |
| WO | 2014186370 | A1 | 11/2014 |
| WO | 2014194257 | A1 | 12/2014 |
| WO | 2014197443 | A1 | 12/2014 |
| WO | 2015027089 | A1 | 2/2015 |
| WO | 2015073713 | A1 | 5/2015 |
| WO | WO-2015063520 | A1 | 5/2015 |
| WO | 2015081113 | A1 | 6/2015 |
| WO | 2015100172 | A1 | 7/2015 |
| WO | 2015123445 | A1 | 8/2015 |
| WO | WO-2015123775 | A1 | 8/2015 |
| WO | 2015184760 | A1 | 12/2015 |
| WO | 2015192117 | A1 | 12/2015 |
| WO | 2015199747 | A1 | 12/2015 |
| WO | 2016041088 | A1 | 3/2016 |
| WO | 2017062544 | A1 | 4/2017 |
| WO | 2017075611 | A1 | 5/2017 |
| WO | 2017092225 | A1 | 6/2017 |
| WO | 2017120669 | A1 | 7/2017 |
| WO | 2017172185 | A1 | 10/2017 |
| WO | 2017208167 | A1 | 12/2017 |
| WO | 2018022602 | A1 | 2/2018 |
| WO | 2018098046 | A2 | 5/2018 |
| WO | 2018175257 | A1 | 9/2018 |
| WO | 2019099758 | A1 | 5/2019 |
| WO | 2019147953 | A1 | 8/2019 |
| WO | 2019147958 | A1 | 8/2019 |
| WO | 2019147996 | A1 | 8/2019 |
| WO | 2019217419 | A2 | 11/2019 |
| WO | 2019226259 | A1 | 11/2019 |
| WO | 2019231911 | A1 | 12/2019 |
| WO | 2020047429 | A1 | 3/2020 |
| WO | 2020061440 | A1 | 3/2020 |
| WO | 2020061451 | A1 | 3/2020 |
| WO | 2020072915 | A1 | 4/2020 |

OTHER PUBLICATIONS

International Preliminary Report on Patentability for International Application No. PCT/US2020/049274, mailed Mar. 17, 2022, 14 pages.

International Search Report and Written Opinion for International Application No. PCT/US2014/052143, mailed Nov. 21, 2014, 8 Pages.

International Search Report and Written Opinion for International Application No. PCT/US2014/067443, mailed Feb. 27, 2015, 8 pages.

International Search Report and Written Opinion for International Application No. PCT/US2015/015675, mailed May 27, 2015, 9 Pages.

International Search Report and Written Opinion for International Application No. PCT/US2017/043686, mailed Oct. 6, 2017, 9 Pages.

International Search Report and Written Opinion for International Application No. PCT/US2017/043693, mailed Oct. 6, 2017, 7 Pages.

International Search Report and Written Opinion for International Application No. PCT/US2017/043791, mailed Oct. 5, 2017, 10 Pages.

International Search Report and Written Opinion for International Application No. PCT/US2018/056768, mailed Jan. 15, 2019, 8 pages.

International Search Report and Written Opinion for International Application No. PCT/US2018/061409, mailed Mar. 12, 2019, 11 pages.

International Search Report and Written Opinion for International Application No. PCT/US2018/063215, mailed Mar. 21, 2019, 17 Pages.

International Search Report and Written Opinion for International Application No. PCT/US2019/015167, mailed May 21, 2019, 7 Pages.

International Search Report and Written Opinion for International Application No. PCT/US2019/015174, mailed May 21, 2019, 8 pages.

International Search Report and Written Opinion for International Application No. PCT/US2019/015244, mailed May 16, 2019, 8 Pages.

International Search Report and Written Opinion for International Application No. PCT/US2019/020065, mailed May 16, 2019, 10 Pages.

International Search Report and Written Opinion for International Application No. PCT/US2019/028299, mailed Aug. 9, 2019, 12 pages.

International Search Report and Written Opinion for International Application No. PCT/US2019/031114, mailed Dec. 20, 2019, 18 Pages.

International Search Report and Written Opinion for International Application No. PCT/US2019/034173, mailed Sep. 18, 2019, 10 Pages.

International Search Report and Written Opinion for International Application No. PCT/US2019/037302, mailed Oct. 11, 2019, 13 Pages.

International Search Report and Written Opinion for International Application No. PCT/US2019/042579, mailed Oct. 31, 2019, 8 Pages.

(56) References Cited

OTHER PUBLICATIONS

International Search Report and Written Opinion for International Application No. PCT/US2019/046351, mailed Nov. 7, 2019, 9 pages.
International Search Report and Written Opinion for International Application No. PCT/US2019/049094, mailed Jan. 9, 2020, 27 Pages.
International Search Report and Written Opinion for International Application No. PCT/US2019/052131, mailed on Dec. 6, 2019, 8 pages.
International Search Report and Written Opinion for International Application No. PCT/US2019/052151, mailed Jan. 15, 2020, 10 pages.
International Search Report and Written Opinion for International Application No. PCT/US2019/054716, mailed Dec. 20, 2019, 11 Pages.
International Search Report and Written Opinion for International Application No. PCT/US2019/061759, mailed Jan. 29, 2020, 12 pages.
International Search Report and Written Opinion for International Application No. PCT/US2020/025735, mailed Jun. 22, 2020, 10 pages.
International Search Report and Written Opinion for International Application No. PCT/US2020/025772, mailed Aug. 3, 2020, 11 pages.
International Search Report and Written Opinion for International Application No. PCT/US2020/025797, mailed Jul. 9, 2020, 10 pages.
International Search Report and Written Opinion for International Application No. PCT/US2020/049274, mailed Feb. 1, 2021, 17 pages.
International Search Report and Written Opinion for International Application No. PCT/US2020/061392, mailed Mar. 12, 2021, 12 pages.
International Search Report and Written Opinion for International Application No. PCT/US2017/043792, mailed Oct. 5, 2017, 9 Pages.
International Search Report and Written Opinion for International Application No. PCT/US2019/015134, mailed May 15, 2019, 11 Pages.
International Search Report and Written Opinion for International Application No. PCT/US2019/015180, mailed May 28, 2019, 10 Pages.
International Search Report and Written Opinion for International Application No. PCT/US2019/015183, mailed May 3, 2019, 8 Pages.
International Search Report and Written Opinion for International Application No. PCT/US2019/015238, mailed May 16, 2019, 8 Pages.
Invitation to Pay Additional Fees for International Application No. PCT/US2019/031114, mailed Aug. 6, 2019, 7 pages.
Invitation to Pay Additional Fees for International Application No. PCT/US2019/049094, mailed Oct. 24, 2019, 2 Pages.
Jiang H., "Effective and Interactive Interpretation of Gestures by Individuals with Mobility Impairments," Thesis/ Dissertation Acceptance, Purdue University Graduate School, Graduate School Form 30, Updated on Jan. 15, 2015, 24 pages.
Kainz et al., "Approach to Hand Tracking and Gesture Recognition Based on Depth-Sensing Cameras and EMG Monitoring," Acta Informatica Pragensia, vol. 3, Jan. 1, 2014, pp. 104-112, Retrieved from the Internet: URL: https://aip.vse.cz/pdfs/aip/2014/01/08.pdf.
Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.
Kim H., et al., "Real-Time Human Pose Estimation and Gesture Recognition from Depth Images Using Superpixels and SVM Classifier," Sensors, 2015, vol. 15, pp. 12410-12427.
Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11 (2), 5 pages, Retrieved on Oct. 7, 2019 [Jul. 10, 2019] Retrieved from the Internet: URL: https://www.ece.uvic.ca/-bctill/papers/neurimp/Kipke_etal_2003_01214707.pdf.
Koerner M.D., "Design and Characterization of the Exo-Skin Haptic Device: A Novel Tendon Actuated Textile Hand Exoskeleton," Abstract of thesis for Drexel University Masters Degree [online], Nov. 2, 2017, 5 pages, Retrieved from the Internet: URL: https://dialog.proquest.com/professional/docview/1931047627?accountid=153692.
Lee D.C., et al., "Motion and Force Estimation System of Human Fingers," Journal of Institute of Control, Robotics and Systems, 2011, vol. 17 (10), pp. 1014-1020.
Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.
Lopes J., et al., "Hand/Arm Gesture Segmentation by Motion Using IMU and EMG Sensing," ScienceDirect, Jun. 27-30, 2017, vol. 11, pp. 107-113.
Marcard T.V., et al., "Sparse Inertial Poser: Automatic 3D Human Pose Estimation from Sparse IMUs, " arxiv.org, Computer Graphics Forum, 2017, vol. 36 (2), 12 pages, XP080759137.
Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.
McIntee S.S., "A Task Model of Free-Space Movement-Based Geastures," Dissertation, Graduate Faculty of North Carolina State University, Computer Science, 2016, 129 pages.
Mendes Jr.J.J.A., et al., "Sensor Fusion and Smart Sensor in Sports and Biomedical Applications," Sensors, 2016, vol. 16 (1569), pp. 1-31.
Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.
Morris D., et al., "Emerging Input Technologies for Always-Available Mobile Interaction," Foundations and Trends in Human-Computer Interaction, 2010, vol. 4 (4), pp. 245-316.
Naik G.R., et al., "Source Separation and Identification issues in Bio Signals: A Solution using Blind Source Separation," Chapter 4 of Recent Advances in Biomedical Engineering, Intech, 2009, 23 pages.
Naik G.R., et al., "Real-Time Hand Gesture Identification for Human Computer Interaction Based on ICA of Surface Electromyogram," IADIS International Conference Interfaces and Human Computer Interaction, 2007, pp. 83-90.
Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.
Negro F., et al., "Multi-Channel Intramuscular and Surface EMG Decomposition by Convolutive Blind Source Separation," Journal of Neural Engineering, Feb. 29, 2016, vol. 13, 18 Pages.
Non-Final Office Action mailed Mar. 2, 2021 for U.S. Appl. No. 15/974,430, filed May 8, 2018, 32 Pages.
Non-Final Office Action mailed Sep. 2, 2020 for U.S. Appl. No. 15/882,858, filed Jan. 29, 2018, 66 Pages.
Non-Final Office Action mailed Aug. 3, 2020 for U.S. Appl. No. 16/593,446, filed Oct. 4, 2019, 44 pages.
Non-Final Office Action mailed Jun. 3, 2021 for U.S. Appl. No. 15/816,435, filed Nov. 17, 2017, 32 Pages.
Non-Final Office Action mailed Jun. 5, 2020 for U.S. Appl. No. 15/659,072, filed Jul. 25, 2017, 59 Pages.
Non-Final Office Action mailed Feb. 8, 2021 for U.S. Appl. No. 16/557,342, filed Aug. 30, 2019, 11 Pages.
Non-Final Office Action mailed Oct. 8, 2020 for U.S. Appl. No. 16/577,207, filed Sep. 20, 2019, 51 Pages.
Non-Final Office Action mailed Aug. 11, 2021 for U.S. Appl. No. 16/577,207, filed Sep. 20, 2019, 35 Pages.
Non-Final Office Action mailed Jun. 13, 2019 for U.S. Appl. No. 16/258,279, filed Jan. 25, 2019, 38 Pages.

(56) References Cited

OTHER PUBLICATIONS

Non-Final Office Action mailed Jun. 15, 2020 for U.S. Appl. No. 16/557,342, filed Aug. 30, 2019, 46 Pages.
Non-Final Office Action mailed Jan. 16, 2020 for U.S. Appl. No. 16/389,419, filed Apr. 19, 2019, 26 Pages.
Non-Final Office Action mailed May 16, 2019 for U.S. Appl. No. 15/974,384, filed May 8, 2018, 13 Pages.
Non-Final Office Action mailed May 16, 2019 for U.S. Appl. No. 15/974,430, filed May 8, 2018, 12 Pages.
Non-Final Office Action mailed Nov. 19, 2019 for U.S. Appl. No. 16/577,207, filed Sep. 20, 2019, 32 Pages.
Non-Final Office Action mailed Aug. 20, 2020 for U.S. Appl. No. 15/974,454, filed May 8, 2018, 59 Pages.
Non-Final Office Action mailed Dec. 20, 2019 for U.S. Appl. No. 15/974,454, filed May 8, 2018, 41 Pages.
Non-Final Office Action mailed Jan. 22, 2020 for U.S. Appl. No. 15/816,435, filed Nov. 17, 2017, 35 Pages.
Non-Final Office Action mailed Oct. 22, 2019 for U.S. Appl. No. 16/557,342, filed Aug. 30, 2019, 16 Pages.
Non-Final Office Action mailed Dec. 23, 2019 for U.S. Appl. No. 16/557,383, filed Aug. 30, 2019, 53 Pages.
Non-Final Office Action mailed Dec. 23, 2019 for U.S. Appl. No. 16/557,427, filed Aug. 30, 2019, 52 Pages.
Non-Final Office Action mailed Feb. 23, 2017 for U.S. Appl. No. 14/505,836, filed Oct. 3, 2014, 54 Pages.
Non-Final Office Action mailed Jul. 23, 2020 for U.S. Appl. No. 16/593,446, filed Oct. 4, 2019, 28 pages.
Non-Final Office Action mailed May 24, 2019 for U.S. Appl. No. 16/353,998, filed Mar. 14, 2019, 20 Pages.
Non-Final Office Action mailed May 26, 2020 for U.S. Appl. No. 16/353,998, filed Mar. 14, 2019, 60 Pages.
Non-Final Office Action mailed Nov. 27, 2020 for U.S. Appl. No. 16/258,279, filed Jan. 25, 2019, 44 Pages.
Non-Final Office Action mailed Apr. 30, 2019 for U.S. Appl. No. 15/659,072, filed Jul. 25, 2017, 99 Pages.
Non-Final Office Action mailed Apr. 30, 2020 for U.S. Appl. No. 15/974,430, filed May 8, 2018, 57 Pages.
Non-Final Office Action mailed Dec. 30, 2019 for U.S. Appl. No. 16/593,446, filed Oct. 4, 2019, 43 pages.
Non-Final Office Action mailed Jun. 30, 2016 for U.S. Appl. No. 14/505,836, filed Oct. 3, 2014, 37 Pages.
Non-Final Office Action mailed Oct. 30, 2019 for U.S. Appl. No. 15/882,858, filed Jan. 29, 2018, 22 Pages.
Notice of Allowance mailed Nov. 2, 2020 for U.S. Appl. No. 15/974,454, filed May 8, 2018, 24 Pages.
Notice of Allowance mailed Nov. 4, 2019 for U.S. Appl. No. 15/974,384, filed May 8, 2018, 39 Pages.
Notice of Allowance mailed Feb. 9, 2022 for U.S. Appl. No. 15/882,858, filed Jan. 29, 2018, 9 pages.
Notice of Allowance mailed Nov. 10, 2021 for U.S. Appl. No. 15/882,858, filed Jan. 29, 2018, 6 pages.
Notice of Allowance mailed Jul. 15, 2021 for U.S. Appl. No. 15/882,858, filed Jan. 29, 2018, 2 pages.
Notice of Allowance mailed Dec. 16, 2020 for U.S. Appl. No. 16/593,446, filed Oct. 4, 2019, 44 pages.
Notice of Allowance mailed May 18, 2020 for U.S. Appl. No. 16/258,279, filed Jan. 25, 2019, 42 Pages.
Notice of Allowance mailed Aug. 19, 2020 for U.S. Appl. No. 16/557,427, filed Aug. 30, 2019, 22 Pages.
Notice of Allowance mailed May 20, 2020 for U.S. Appl. No. 16/389,419, filed Apr. 19, 2019, 28 Pages.
Notice of Allowance mailed Oct. 22, 2021 for U.S. Appl. No. 15/882,858, filed Jan. 29, 2018 , 8 pages.
Notice of Allowance mailed Aug. 23, 2021 for U.S. Appl. No. 15/974,430, filed May 8, 2018, 12 pages.
Notice of Allowance mailed Dec. 23, 2020 for U.S. Appl. No. 15/659,072, filed Jul. 25, 2017, 26 Pages.
Notice of Allowance mailed Jun. 28, 2021 for U.S. Appl. No. 15/882,858, filed Jan. 29, 2018, 18 pages.
Office action for European Application No. 17835112.8, dated Feb. 11, 2022, 11 Pages.
International Preliminary Report on Patentability for International Application No. PCT/US2020/061392, mailed Jun. 9, 2022, 11 pages.
Gargiulo G., et al., "Giga-Ohm High-Impedance FET Input Amplifiers for Dry Electrode Biosensor Circuits and Systems," Integrated Microsystems: Electronics, Photonics, and Biotechnology, Jan. 2011, 41 pages.
Machine Translation of CN102238282A, 2011, 42 pages.
Office Action mailed Jan. 3, 2024 for Chinese Application No. 201980061965.2, filed Sep. 20, 2019, 11 pages.
Office Action mailed Feb. 6, 2024 for Japanese Patent Application No. 2021 -534135, filed on Mar. 30, 2020, 8 pages.
Office Action mailed Mar. 7, 2024 for Chinese Application No. 202080025699.0, filed Mar. 30, 2020, 9 pages.
Office Action mailed Feb. 9, 2024 for Chinese Application No. 201980049646.X, filed Apr. 19, 2019, 9 pages.
Office Action mailed Jan. 12, 2024 for Chinese Application No. 201980072093.X, filed Aug. 30, 2019, 13 pages.
Office /Action mailed Jan. 23, 2024 for Japanese Patent Application No. 2021533832, filed on Mar. 30, 2020, 5 pages.
Office Action mailed Jan. 24, 2024 for Chinese Application No. 201980065646.9, filed Oct. 4, 2019, 11 pages.
Office Action mailed Dec. 27, 2023 for Chinese Application No. 201980053249 X, filed Aug. 13, 2019, 10 pages.
Office Action mailed Nov. 28, 2023 for Japanese Patent Application No. 2021-534144, filed on Jun. 14, 2021, 5 pages.
Office Action mailed Sep. 28, 2023 for Chinese Application No. 201980022051.5, filed Jan. 25, 2019, 18 pages.
Office Action mailed Dec. 29, 2023 for Chinese Application No. 201980089431.0, filed Nov. 15, 2019, 26 pages.
Office Action mailed Dec. 29, 2023 for Chinese Application No. 201980090473.6, filed Jul. 27, 2021, 7 pages.
Office Action mailed Jun. 12, 2024 for Chinese Application No. 202080025169.6, filed Mar. 30, 2020, 8 pages.
Tibold R., et al., "Prediction of Muscle Activity during Loaded Movements of The Upper Limb," Journal of NeuroEngineering Rehabilitation, 2015 vol. 12, No. 6, DOI: https://doi.org/10.1186/1743-0003-12-6, 12 pages.
Notice of Allowance mailed May 18, 2022 for U.S. Appl. No. 15/882,858, filed Jan. 29, 2018, 10 pages.
Office Action mailed Jan. 20, 2023 for Chinese Application No. 201780059093.7, filed Jul. 25, 2017, 16 pages.
Farina D., et al., "The Extraction of Neural Information from the Surface EMG for the Control of Upper-Limb Prostheses: Emerging Avenues and Challenges," IEEE Transactions On Neural Systems Andrehabilitation Engineering, vol. 22, No. 4, Jul. 1, 2014, pp. 797-809.
Office Action for European Application No. 19806723.3, mailed Oct. 27, 2022, 8 pages.
Extended European Search Report for European Application No. 19850130.6, mailed Sep. 1, 2021, 14 Pages.
Extended European Search Report for European Application No. 19855191.3, dated Dec. 6, 2021, 11 pages.
Extended European Search Report for European Application No. 19883839.3, mailed Dec. 15, 2021, 7 pages.
Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.
Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.
Final Office Action mailed Jun. 2, 2020 for U.S. Appl. No. 15/882,858, filed Jan. 29, 2018, 127 Pages.
Final Office Action mailed Jun. 2, 2020 for U.S. Appl. No. 16/557,383, filed Aug. 30, 2019, 66 Pages.
Final Office Action mailed Nov. 3, 2020 for U.S. Appl. No. 15/974,430, filed May 8, 2018, 27 Pages.

(56) References Cited

OTHER PUBLICATIONS

Final Office Action mailed Feb. 4, 2020 for U.S. Appl. No. 16/577,207, filed Sep. 20, 2019, 76 Pages.
Final Office Action mailed Feb. 4, 2021 for U.S. Appl. No. 15/882,858, filed Jan. 29, 2018, 42 Pages.
Final Office Action mailed Jun. 5, 2020 for U.S. Appl. No. 16/557,427, filed Aug. 30, 2019, 95 Pages.
Final Office Action mailed Oct. 8, 2020 for U.S. Appl. No. 16/557,342, filed Aug. 30, 2019, 73 Pages.
Final Office Action mailed Apr. 9, 2020 for U.S. Appl. No. 15/974,454, filed May 8, 2018, 19 Pages.
Final Office Action mailed Dec. 11, 2019 for U.S. Appl. No. 15/974,430, filed May 8, 2018, 30 Pages.
Final Office Action mailed Jan. 13, 2021 for U.S. Appl. No. 16/577,207, filed Sep. 20, 2019, 91 Pages.
Final Office Action mailed Dec. 18, 2019 for U.S. Appl. No. 16/258,279, filed Jan. 25, 2019, 45 Pages.
Final Office Action mailed Feb. 19, 2021 for U.S. Appl. No. 16/258,279, filed Jan. 25, 2019, 58 Pages.
Final Office Action mailed Sep. 23, 2020 for U.S. Appl. No. 15/816,435, filed Nov. 17, 2017, 70 Pages.
Final Office Action mailed Jan. 28, 2020 for U.S. Appl. No. 16/557,342, filed Aug. 30, 2019, 15 Pages.
Final Office Action mailed Jul. 28, 2017 for U.S. Appl. No. 14/505,836, filed Oct. 3, 2014, 52 Pages.
Final Office Action mailed Jun. 28, 2021 for U.S. Appl. No. 16/557,342, filed Aug. 30, 2019, 11 Pages.
Final Office Action mailed Nov. 29, 2019 for U.S. Appl. No. 15/659,072, filed Jul. 25, 2017, 36 Pages.
Final Office Action mailed Nov. 29, 2019 for U.S. Appl. No. 16/353,998, filed Mar. 14, 2019, 33 Pages.
Fong H.C., et al., "PepperGram With Interactive Control," 22nd International Conference Onvirtual System & Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.
Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
Intemational Search Report and Written Opinion for International Application No. PCT/US2014/017799, mailed May 16, 2014, 9 pages.
Intemational Search Report and Written Opinion for International Application No. PCT/US2014/037863, mailed Aug. 21, 2014, 10 pages.
International Preliminary Report on Patentability for International Application No. PCT/US2017/043693, mailed Feb. 7, 2019, 7 Pages.
International Preliminary Report on Patentability for International Application No. PCT/US2017/043791, mailed Feb. 7, 2019, 9 Pages.
International Preliminary Report on Patentability for International Application No. PCT/US2019/031114, mailed Nov. 19, 2020, 16 pages.
International Preliminary Report on Patentability for International Application No. PCT/US2019/049094, mailed Mar. 11, 2021, 24 Pages.
International Preliminary Report on Patentability for International Application No. PCT/US2019/052151, mailed Apr. 1, 2021, 9 pages.
International Preliminary Report on Patentability for International Application No. PCT/US2014/017799, mailed Sep. 3, 2015, 8 Pages.
International Preliminary Report on Patentability for International Application No. PCT/US2014/037863, mailed Nov. 26, 2015, 8 pages.
International Preliminary Report on Patentability for International Application No. PCT/US2014/052143, mailed Mar. 3, 2016, 7 pages.
International Preliminary Report on Patentability for International Application No. PCT/US2014/067443, mailed Jun. 9, 2016, 7 pages.
International Preliminary Report on Patentability for International Application No. PCT/US2015/015675, mailed Aug. 25, 2016, 8 Pages.
International Preliminary Report on Patentability for International Application No. PCT/US2017/043686, mailed Feb. 7, 2019, 8 pages.
International Preliminary Report on Patentability for International Application No. PCT/US2017/043792, mailed Feb. 7, 2019, 8 Pages.
International Preliminary Report on Patentability for International Application No. PCT/US2018/061409, mailed May 28, 2020, 10 pages.
International Preliminary Report on Patentability for International Application No. PCT/US2019/015174, mailed Aug. 6, 2020, 7 pages.
International Preliminary Report on Patentability for International Application No. PCT/US2019/028299, mailed Dec. 10, 2020, 11 pages.
International Preliminary Report on Patentability for International Application No. PCT/US2019/046351, mailed Feb. 25, 2021, 8 pages.
International Preliminary Report on Patentability for International Application No. PCT/US2019/052131, mailed on Apr. 1, 2021, 8 pages.
International Preliminary Report on Patentability for International Application No. PCT/US2019/054716, mailed on Apr. 15, 2021, 10 pages.
International Preliminary Report on Patentability for International Application No. PCT/US2019/061759, mailed May 27, 2021, 12 pages.
European Search Report for European Patent Application No. 23186202.0. dated Aug. 2, 2023, 7 pages.
Khezri M., et al., "A Novel Approach to Recognize Hand Movements Via sEMG Patterns," 2007 Annual International Conference of the IEEE Engineering in Medicine and Biology Society, Aug. 22, 2007, pp. 4907-4910.
Naik G.R., et al., "SEMG for Identifying Hand Gestures using ICA," In Proceedings of the 2nd International Workshop on Biosignal Processing and Classification, Jan. 31, 2006, pp. 61-67.
Office Action mailed Sep. 14, 2023 for Chinese Application No. 201980035465.1, filed May 28, 2019, 9 pages.
Office Action mailed Aug. 15, 2023 for Japanese Patent Application No. 2021-507757, filed on Feb. 15, 2021,9 pages.
Office Action mailed Aug. 16, 2023 for Chinese Application No. 201880082887.X, filed Oct. 19, 2018, 17 pages.
Office Action malled Aug. 16, 2023 for Chinese Application No. 202080062417.4, filed Sep. 3, 2020, 11 pages.
Office Action mailed Aug. 21, 2023 for Chinese Patent Application No. 201980062920.7, filed Sep. 20, 2019, 21 pages.
Office Action mailed Jun. 22, 2023 for European Patent Application No. 19863248.1, filed on Sep. 20, 2019, 5 pages.
Office Action mailed Aug. 29, 2023 for Japanese Application No. 2021-506985, filed Feb. 9, 2021,6 pages.
Office Action mailed Aug. 31, 2023 for Chinese Application No. 201 980045972.3 filed May 7, 2021,20 pages.

(56) References Cited

OTHER PUBLICATIONS

Valero-Cuevas F. J., et al. "Computational Models for Neuromuscular Function," IEEE reviews in Biomedical Engineering, Dec. 31, 2009, vol. 2, pp. 110-135.
European Search Report for European Application No. 19890394.0, mailed Apr. 29, 2022, 9 pages.
Extended European Search Report for European Application No. 19743717.1, mailed Mar. 3, 2021, 12 pages.
Extended European Search Report for European Application No. 18869441.8, mailed Nov. 17, 2020, 20 Pages.
Extended European Search Report for European Application No. 19810524.9, mailed Mar. 17, 2021, 11 pages.
International Preliminary Report on Patentability for International Application No. PCT/US2018/056768, mailed Apr. 30, 2020, 7 pages.
International Preliminary Report on Patentability for International Application No. PCT/US2019/015183, mailed Aug. 6, 2020, 7 pages.
International Preliminary Report on Patentability for International Application No. PCT/US2019/015238, mailed Aug. 6, 2020, 7 pages.
International Preliminary Report on Patentability for International Application No. PCT/US2019/034173, mailed Dec. 10, 2020, 9 pages.
International Preliminary Report on Patentability for International Application No. PCT/US2019/063587, mailed Jun. 10, 2021, 13 pages.
International Search Report and Written Opinion for International Application No. PCT/US2019/063587, mailed Mar. 25, 2020, 16 pages.
Non-Final Office Action mailed Sep. 6, 2019 for U.S. Appl. No. 16/424,144, filed May 28, 2019, 11 Pages.
Non-Final Office Action mailed Apr. 9, 2019 for U.S. Appl. No. 16/258,409, filed Jan. 25, 2019, 71 Pages.
Non-Final Office Action mailed Apr. 29, 2019 for U.S. Appl. No. 16/257,979, filed Jan. 25, 2019, 63 Pages.
Notice of Allowance mailed Feb. 6, 2020 for U.S. Appl. No. 16/424,144, filed May 28, 2019, 28 Pages.
Notice of Allowance mailed Jul. 19, 2019 for U.S. Appl. No. 16/258,409, filed Jan. 25, 2019, 36 Pages.
Notice of Allowance mailed Jul. 31, 2019 for U.S. Appl. No. 16/257,979, filed Jan. 25, 2019, 22 Pages.
Office Action for European Patent Application No. 19743717.1, mailed Apr. 11, 2022, 10 pages.
Partial Supplementary European Search Report for European Application No. 18879156.0, mailed Dec. 7, 2020, 9 pages.
Picard R.W., et al., "Affective Wearables," Proceedings of the IEEE 1st International Symposium on Wearable Computers, ISWC, Cambridge, Ma, USA, Oct. 13-14, 1997, pp. 90-97.
Preinterview First Office Action mailed Jun. 24, 2020 for U.S. Appl. No. 16/785,680, filed Feb. 10, 2020, 90 Pages.
Rekimoto J., "GestureWrist and GesturePad: Unobtrusive Wearable Interaction Devices," ISWC Proceedings of the 5th IEEE International Symposium on Wearable Computers, 2001, 7 pages.
Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.
Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.
Saponas T.S., et al., "Making Muscle-Computer Interfaces More Practical," CHI, Atlanta, Georgia, USA, Apr. 10-15, 2010, 4 pages.
Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.
Sato M., et al., "Touche: Enhancing Touch Interaction on Humans, Screens, Liquids, and Everyday Objects," CHI, Austin, Texas, May 5-10, 2012, 10 pages.
Sauras-Perez P., et al., "A Voice and Pointing Gesture Interaction System for Supporting Human Spontaneous Decisions in Autonomous Cars," Clemson University, All Dissertations, May 2017, 174 pages.
Shen S., et al., "I Am a Smartwatch and I Can Track My User's Arm," University of Illinois at Urbana-Champaign, MobiSys, Jun. 25-30, 2016, 12 pages.
Son M., et al., "Evaluating the Utility of Two Gestural Discomfort Evaluation Methods," PLOS One, Apr. 19, 2017, 21 pages.
Strbac M., et al., "Microsoft Kinect-Based Artificial Perception System for Control of Functional Electrical Stimulation Assisted Grasping," Hindawi Publishing Corporation, BioMed Research International [online], 2014, Article No. 740469, 13 pages, Retrieved from the Internet: URL: https://dx.doi.org/10.1155/2014/740469.
Torres T., "Myo Gesture Control Armband," PCMag, Jun. 8, 2015, 9 pages, Retrieved from the Internet: URL: https://www.pcmag.com/article2/0,2817,2485462,00.asp.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.
Ueno A., et al., "Feasibility of Capacitive Sensing of Surface Electromyographic Potential through Cloth," Sensors and Materials, 2012, vol. 24 (6), pp. 335-346.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages, Retrieved from the Internet: URL: https://www.ncbi.nlm.nih.gov/pmc/articles/PMC3116649/.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 630, 13 Pages.
Wodzinski M., et al., "Sequential Classification of Palm Gestures Based on A* Algorithm and MLP Neural Network for Quadrocopter Control," Metrology and Measurement Systems, 2017, vol. 24 (2), pp. 265-276.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Xue Y., et al., "Multiple Sensors Based Hand Motion Recognition Using Adaptive Directed Acyclic Graph," Applied Sciences, MDPI, 2017, vol. 7 (358), pp. 1-14.
Yang Z., et al., "Surface EMG Based Handgrip Force Predictions Using Gene Expression Programming," Neurocomputing, 2016, vol. 207, pp. 568-579.
Zacharaki E.I., et al., "Spike Pattern Recognition by Supervised Classification in Low Dimensional Embedding Space," Brain Informatics, 2016, vol. 3, pp. 73-83.
Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.
Office Action mailed Feb. 7, 2023 for European Application No. 19810524.9, filed May 28, 2019, 7 pages.
Notice of Allowance mailed Dec. 14, 2022 for U.S. Appl. No. 15/882,858, filed Jan. 29, 2018, 10 pages.
Ali B., et al., "Spectral Collaborative Representation based Classification for Hand Gestures Recognition on Electromyography Signals," Biomedical Signal Processing and Control, 2016, vol. 24, pp. 11-18.
Al-Jumaily A., et al., "Electromyogram(EMG) Driven System based Virtual Reality for Prosthetic and Rehabilitation Devices," Proceed-

(56) References Cited

OTHER PUBLICATIONS ings of the 11th Internationalconference On Information Integration Andweb-Based Applications & Services, Jan. 1, 2009, pp. 582-586.
Al-Mashhadany Y.I., "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages.
Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Arkenbout E.A., et al., "Robust Hand Motion Tracking through Data Fusion of 5DT Data Glove and Nimble VR Kinect Camera Measurements," Sensors, 2015, vol. 15, pp. 31644-31671.
Benko H., et al., "Enhancing Input On and Above the Interactive Surface with Muscle Sensing," The ACM International Conference on Interactive Tabletops and Surfaces (ITS), Nov. 23-25, 2009, pp. 93-100.
Berenzweig A., et al., "Wearable Devices and Methods for Improved Speech Recognition," U.S. Appl. No. 16/785,680, filed Feb. 10, 2020, 67 pages.
Boyali A., et al., "Spectral Collaborative Representation based Classification for Hand Gestures Recognition on Electromyography Signals," Biomedical Signal Processing and Control, 2016, vol. 24, pp. 11-18.
Brownlee J., "Finite State Machines (FSM): Finite State Machines as a Control Technique in Artificial Intelligence (AI)," FSM, Jun. 2002, 12 pages.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.
Communication Pursuant to Article 94(3) for European Patent Application No. 17835112.8, dated Dec. 14, 2020, 6 Pages.
Communication Pursuant to Rule 164(1) EPC, Partial Supplementary European Search Report for European Application No. 14753949.8, mailed Sep. 30, 2016, 7 pages.
Co-pending U.S. Appl. No. 15/659,072, inventors Patrick; Kaifosh et al., filed Jul. 25, 2017.
Co-pending U.S. Appl. No. 15/816,435, inventors Ning; Guo et al., filed Nov. 17, 2017.
Co-pending U.S. Appl. No. 15/882,858, inventors Stephen; Lake et al., filed Jan. 29, 2018.
Co-pending U.S. Appl. No. 15/974,430, inventors Adam; Berenzweig et al., filed May 8, 2018.
Co-pending U.S. Appl. No. 16/353,998, inventors Patrick; Kaifosh et al., filed Mar. 14, 2019.
Co-pending U.S. Appl. No. 16/557,383, inventors Adam; Berenzweig et al., filed Aug. 30, 2019.
Co-pending U.S. Appl. No. 16/557,427, inventors Adam; Berenzweig et al., filed Aug. 30, 2019.
Co-Pending U.S. Appl. No. 15/974,430, filed May 8, 2018, 44 Pages.
Co-Pending U.S. Appl. No. 16/353,998, filed Mar. 14, 2019, 43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Corazza S., et al.,"A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved on Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Costanza E., et al., "EMG as a Subtle Input Interface for Mobile Computing," Mobile HCI, LNCS 3160, 2004, pp. 426-430.
Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.
Csapo A.B., et al., "Evaluation of Human-Myo Gesture Control Capabilities in Continuous Search and Select Operations," 7th IEEE International Conference on Cognitive Infocommunications, Oct. 16-18, 2016, pp. 000415-000420.
Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.
Delis A.L., et al., "Development of a Myoelectric Controller Based on Knee Angle Estimation," Biodevices, International Conference on Biomedical Electronics and Devices, Jan. 17, 2009, 7 pages.
Diener L., et al., "Direct Conversion From Facial Myoelectric Signals to Speech Using Deep Neural Networks," International Joint Conference on Neural Networks (IJCNN), Oct. 1, 2015, 7 pages.
Ding I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.
European Search Report for European Application No. 19861903.3, dated Oct. 12, 2021, 2 pages.
European Search Report for European Application No. 19863248.1, dated Oct. 19, 2021, 2 pages.
European Search Report for European Application No. 19868789.9, mailed May 9, 2022, 9 pages.
Extended European Search Report for European Application No. 18879156.0, mailed Mar. 12, 2021, 11 pages.
Extended European Search Report for European Application No. 19744404.5, mailed Mar. 29, 2021, 11 pages.
Extended European Search Report for European Application No. 19799947.7, mailed May 26, 2021, 10 pages.
Extended European Search Report for European Application No. 17835111.0, mailed Nov. 21, 2019, 6 pages.
Extended European Search Report for European Application No. 17835112.8, mailed Feb. 5, 2020, 17 pages.
Extended European Search Report for European Application No. 17835140.9, mailed Nov. 26, 2019, 10 Pages.
Extended European Search Report for European Application No. 19806723.3, mailed Jul. 7, 2021, 13 pages.
Amitai Y., "P-27: A Two-Dimensional Aperture Expander for Ultra-Compact, High-Performance Head-Worn Displays," SID Symposium Digest of Technical Papers, 2005, vol. 36 (1), pp. 360-363.
Ayras P., et al., "Exit Pupil Expander With a Large Field of View Based on Diffractive Optics," Journal of the SID, 2009, vol. 17 (8), pp. 659-664.

(56) References Cited

OTHER PUBLICATIONS

Bailey ct al., Wearable Muscle Interface Systems, Devices and Methods That Interact With Content Displayed on an Electronic Display, Office Action mailed Mar. 31, 2015, for U.S. Appl. No. 14/155,107, 17 pages.
Bailey et al., "Muscle Interface Device and Method for Interacting With Content Displayed on Wearable Head Mounted Displays," Amendment filed Aug. 25, 2015, for U.S. Appl. No. 14/155,087, 10 pages.
Bailey et al., "Muscle Interface Device and Method for Interacting With Content Displayed on Wearable Head Mounted Displays," Amendment filed Aug. 9, 2016, for U.S. Appl. No. 14/155,087, 8 pages.
Bailey et al., "Muscle Interface Device and Method for Interacting With Content Displayed on Wearable Head Mounted Displays," Amendment filed May 17, 2016, for U.S. Appl. No. 14/155,087, 13 pages.
Bailey et al., "Muscle Interface Device and Method for Interacting With Content Displayed on Wearable Head Mounted Displays," Office Action dated Feb. 17, 2016, for U.S. Appl. No. 14/155,087, 16 pages.
Bailey et al., "Muscle Interface Device and Method for Interacting With Content Displayed on Wearable Head Mounted Displays," Office Action dated Jul. 20, 2015, for U.S. Appl. No. 14/155,087, 14 pages.
Bailey et al., "Muscle Interface Device and Method for Interacting With Content Displayed on Wearable Head Mounted Displays," Office Action dated Jul. 8. 2016, for U.S. Appl. No. 14/155,087, 16 pages.
Bailey et al., "Muscle Interface Device and Method for Interacting With Content Displayed on Wearable Head Mounted Displays," Office Action dated Mar. 31, 2015, for U.S. Appl. No. 14/155,087, 15 pages.
Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.
Bailey et al., "Wearable Muscle Interface Systems, Devices and Methods That Interact With. Content Displayed on an Electronic Display," Amendment filed Aug. 9, 2016, for U.S. Appl. No. 14/155,107, 8 pages.
Bailey et al., "Wearable Muscle Interface Systems, Devices and Methods That Interact With Content Displayed on an Electronic Display," Amendment filed May 11, 2016, for U.S. Appl. No. 14/155,107, 15 pages.
Bailey et al., Wearable Muscle Interface Systems, Devices and Methods That Interact With Content Displayed on an Electronic Display/ Office Action mailed Feb. 11, 2016, for U.S. Appl. No. 14/155,107, 20 pages.
Bailey et al., Wearable Muscle Interface Systems, Devices and Methods That Interact With Content Displayed on an Electronic Display, Office Action mailed Jul. 16, 2015, forU.S. Appl. No. 14/155,107, 20 pages.
Bailey et al., Wearable Muscle Interface Systems, Devices and Methods That Interact With Content Displayed on an Electronic Display/ Office Action mailed Jul. 8, 2016, for U.S. Appl. No. 14/155,107, 21 pages.
Bailey., et al., "Wearable Muscle Interface Systems, Devices And Methods That Interact With Content Displayed On An Electronic Display," Office Action mailed Mar. 31, 2015, for U.S. Appl. No. 14/155,107, 17 pages.
Chellappan K.V., et al., "Laser-Based Displays: A Review," Applied Optics, Sep. 1, 2010, vol. 49 (25), pp. F79-F98.
Co-Pending U.S. Appl. No. 16/430,299, filed Jun. 3, 2019, 42 Pages.
Cui L., et al., "Diffraction From Angular Multiplexing Slanted Volume Hologram Gratings," Optik, 2005, vol. 116, pp. 118-122.
Curatu C., et al., "Dual Purpose Lens for an Eye-Tracked Projection Head-Mounted Display," International Optical Design Conference SPIE-OSA, 2006, vol. 6342, pp. 63420X-1-63420X-7.
Curatu C., et al., "Projection-Based Head-Mounted Display With Eye-Tracking Capabilities," Proceedings of SPIE, 2005, vol. 5875, pp. 58750J-1-58750J-9.
Essex D., "Tutorial on Optomechanical Beam Steering Mechanisms," OPTI 521 Tutorial, College of Optical Sciences, University of Arizona, 2006, 8 pages.
Fernandez E., et al., "Optimization of a Thick Polyvinyl Alcohol-Acrylamide Photopolymer for Data Storage Using a Combination of Angular and Peristrophic Holographic Multiplexing," Applied Optics, Oct. 10, 2009, vol. 45 (29), pp. 7661-7666.
Final Office Action mailed Jan. 3, 2019 for U.S. Appl. No. 14/465,194, filed Aug. 21, 2014, 61 Pages.
Final Office Action mailed Jan. 10, 2018 for U.S. Appl. No. 14/465,194, filed Aug. 21, 2014, 50 Pages.
Final Office Action mailed Nov. 18, 2020 for U.S. Appl. No. 14/461,044, filed Aug. 15, 2014, 14 Pages.
Final Office Action mailed Oct. 21, 2021 for U.S. Appl. No. 16/899,843, filed Jun. 12, 2020, 29 Pages.
Final Office Action mailed Jul. 23, 2021 for U.S. Appl. No. 14/461,044, filed Aug. 15, 2014, 15 Pages.
Final Office Action received for U.S. Appl. No. 14/155,087 dated Dec. 16, 2016, 32 pages.
Final Office Action received for U.S. Appl. No. 14/155,087 dated Jul. 20, 2015, 27 pages. .
Final Office Action received for U.S. Appl. No. 14/155,087 dated Jul. 8, 2016, 27 pages.
Final Office Action received for U.S. Appl. No. 14/155,087 dated Nov. 27, 2017, 40 pages.
Final Office Action received for U.S. Appl. No. 14/155,107 dated Dec. 19, 2016, 35 pages.
Final Office Action received for U.S. Appl. No. 14/155,107 dated Jan. 17, 2019, 46 pages.
Final Office Action received for U.S. Appl. No. 14/155,107 dated Jul. 16, 2015, 28 pages.
Final Office Action received for U.S. Appl. No. 14/155,107 dated Jul. 8, 2016, 31 pages.
Final Office Action received for U.S. Appl. No. 14/155, 107 dated Nov. 27, 2017, 44 pages.
First Office Action mailed Nov. 25, 2020, for Canadian Application No. 2921954, filed Aug. 21, 2014, 4 pages.
Hainich R.R., et al., "Chapter 10: Near-Eye Displays," Displays: Fundamentals & Applications, AK Peters/CRC Press, 2011, 65 pages.
Hornstein S., et al., "Maradin's Micro-Mirror—System Level Synchronization Notes," SID Digest, 2012, pp. 981-984.
"IEEE 100 The Authoritative Dictionary of IEEE Standards Terms," Seventh Edition, Standards Information Network IEEE Press, Dec. 2000, 3 pages.
International Search Report and Written Opinion for International Application No. PCT/US2016/018293, mailed Jun. 8, 2016, 17 Pages.
International Search Report and Written Opinion for International Application No. PCT/US2016/018298, mailed Jun. 8, 2016, 14 Pages.
International Search Report and Written Opinion for International Application No. PCT/US2016/018299, mailed Jun. 8, 2016, 12 Pages.
International Search Report and Written Opinion for International Application No. PCT/US2016/067246, mailed Apr. 25, 2017, 10 Pages.
Itoh Y., et al., "Interaction-Free Calibration for Optical See-Through Head-Mounted Displays based on 3D Eye Localization," IEEE Symposium on 3D User Interfaces (3DUI), 2014, pp. 75-82.
Janssen C., "Radio Frequency (RF)," 2013, [Retrieved on Jul. 12, 2017], 2 pages, Retrieved from the Internet: URL: https://web.archive.org/web/20130726153946/https://www.techopedia.com/definition/5083/radio-frequency-rf.
Kessler D., "Optics of Near to Eye Displays (NEDs)," Presentation—Oasis, Tel Aviv, Feb. 19, 2013, 37 pages.
Krees B.C., et al., "Diffractive and Holographic Optics as Optical Combiners in Head Mounted Displays," UbiComp, Zurich, Switzerland, Sep. 8-12, 2013, pp. 1479-1482.

(56) References Cited

OTHER PUBLICATIONS

Kress B., et al., "A Review of Head-Mounted Displays (HMD) Technologies and Applications for Consumer Electronics," Proceedings of SPIE, 2013, vol. 8720, pp. 87200A-1-87200A-13.
Kress B., "Optical Architectures for See-Through Wearable Displays," Presentation, Bay Area SID Seminar, Apr. 30, 2014, 156 pages.
Lake et al., "Method and Apparatus for Analyzing Capacitive EMG and IMU Sensor Signals for Gesture Control," Amendment filed Aug. 21, 2015, for U.S. Appl. No. 14/186,878, 13 pages.
Lake et al., "Method and Apparatus for Analyzing Capacitive EMG and IMU Sensor Signals for Gesture Control," Office Action dated Jun. 17, 2015, for U.S. Appl. No. 14/186,878, 13 pages.
Lake et al. "Method and Apparatus for Analyzing Capacitive EMG and IMU Sensor Signals for Gesture Control," Preliminary Amendment filed May 9, 2014, for U.S. Appl. No. 14/186,878, 9 pages.
Lake et al., "Method and Apparatus for Analyzing Capacitive EMG and IMU Sensor Signals for Gesture Control," U.S. Appl. No. 14/186,878, filed Feb. 21, 2014, 29 pages.
Lake et al., "Methods and Devices for Combining Muscle Activity Sensor Signals and Inertial Sensor Signals for Gesture-Based Control," Amendment filed Jan. 8, 2016, for U.S. Appl. No. 14/186,889, 16 pages.
Lake et al., "Methods and Devices for Combining Muscle Activity Sensor Signals and Inertial Sensor Signals for Gesture-Based Control," Amendment filed Jul. 13, 2016, for U.S. Appl. No. 14/186,889, 12 pages.
Lake et al., "Methods and Devices for Combining Muscle Activity Sensor Signals and Inertial Sensor Signals for Gesture-Based Control," Office Action dated Jun. 16, 2016, for U.S. Appl. No. 14/186,889, 13 pages.
Lake et al., "Methods and Devices for Combining Muscle Activity Sensor Signals and Inertial Sensor Signals for Gesture-Based Control," Office Action dated Nov. 5, 2015, for U.S. Appl. No. 14/186,889, 11 pages.
Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.
Levola T., "7.1: Invited Paper: Novel Diffractive Optical Components for Near to Eye Displays," SID Symposium Digest of Technical Papers, 2006, vol. 37 (1), pp. 64-67.
Liao C.D., et al., "The Evolution of MEMS Displays," IEEE Transactions on Industrial Electronics, Apr. 2009, vol. 56 (4), pp. 1057-1065.
Lippert T.M., "Chapter 6: Display Devices: RSD™ (Retinal Scanning Display)," The Avionics Handbook, CRC Press, 2001, 8 pages.
Majaranta P., et al., "Chapter 3: Eye Tracking and Eye-Based Human-Computer Interaction," Advances in Physiological Computing, Springer-Verlag London, 2014, pp. 39-65.
Merriam-Webster, "Radio Frequencies," download date Jul. 12, 2017, 2 pages, Retrieved from the Intemet: URL: https://www.merriam-webster.com/table/collegiate/radiofre.htm.
Morun C., et al., "Systems, Articles, and Methods for Capacitive Electromyography Sensors," U.S. Appl. No. 16/437,351, filed Jun. 11, 2019, 51 pages.
Non-Final Office Action mailed Mar. 1, 2018 for U.S. Appl. No. 14/553,657, filed Nov. 25, 2014, 29 Pages.
Non-Final Office Action mailed May 2, 2018 for U.S. Appl. No. 15/799,628, filed Oct. 31, 2017, 25 Pages.
Non-Final Office Action mailed Oct. 5, 2022 for U.S. Appl. No. 17/576,815, filed Jan. 14, 2022, 14 pages.
Non-Final Office Action mailed Nov. 6, 2018 for U.S. Appl. No. 16/057,573, filed Aug. 7, 2018, 14 Pages.
Non-Final Office Action mailed May 7, 2021 for U.S. Appl. No. 16/899,843, filed Jun. 12, 2020, 24 Pages.
Non-Final Office Action mailed Oct. 7, 2022 for U.S. Appl. No. 17/141,646, filed Jan. 5, 2021, 6 pages.
Non-Final Office Action mailed Sep. 11, 2019 for U.S. Appl. No. 14/465,194, filed Aug. 21, 2014, 72 Pages.
Non-Final Office Action mailed May 12, 2022 for U.S. Appl. No. 16/899,843, filed Jun. 12, 2020, 34 Pages.
Non-Final Office Action mailed Sep. 14, 2017 for U.S. Appl. No. 14/539,773, filed Nov. 12, 2014, 28 pages.
Non-Final Office Action mailed Aug. 15, 2018 for U.S. Appl. No. 14/465,194, filed Aug. 21, 2014, 64 Pages.
Non-Final Office Action mailed Jun. 15, 2020 for U.S. Appl. No. 16/292,609, filed Mar. 5, 2019, 26 Pages.
Non-Final Office Action mailed Aug. 17, 2017 for U.S. Appl. No. 14/465,194, filed Aug. 21, 2014, 81 Pages.
Non-Final Office Action mailed Dec. 17, 2018 for U.S. Appl. No. 16/137,960, filed Sep. 21, 2018, 10 pages.
Non-Final Office Action mailed Jan. 18, 2018 for U.S. Appl. No. 15/799,621, filed Oct. 31, 2017, 10 pages.
Non-Final Office Action mailed Jun. 22, 2017 for U.S. Appl. No. 14/461,044, filed Aug. 15, 2014, 21 Pages.
Non-Final Office Action mailed Feb. 25, 2021 for U.S. Appl. No. 14/461,044, filed Aug. 15, 2014, 17 Pages.
Non-Final Office Action mailed Aug. 28, 2018 for U.S. Appl. No. 16/023,276, filed Jun. 29, 2018, 10 pages.
Non-Final Office Action mailed Aug. 28, 2018 for U.S. Appl. No. 16/023,300, filed Jun. 29, 2018, 11 pages.
Non-Final Office Action mailed Jun. 28, 2021 for U.S. Appl. No. 16/550,905, filed Aug. 26, 2019, 5 Pages.
Non-Final Office Action received for U.S. Appl. No. 14/155,087 dated Aug. 16, 2016, 28 pages.
Non-Final Office Action received for U.S. Appl. No. 14/155,087 dated Aug. 7, 2017, 28 pages.
Non-Final Office Action received for U.S. Appl. No. 14/155,087 dated Feb. 17, 2016, 26 pages.
Non-Final Office Action received for U.S. Appl. No. 14/155,087 dated Mar. 31, 2015, 22 pages.
Non-Final Office Action received for U.S. Appl. No. 14/155,107 dated Aug. 17, 2016, 37 pages.
Non-Final Office Action received for U.S. Appl. No. 14/155,107 dated Aug. 7, 2017, 34 pages.
Non-Final Office Action received for U.S. Appl. No. 14/155, 107 dated Feb. 11, 2016, 42 pages.
Non-Final Office Action received for U.S. Appl. No. 14/155,107 dated Jul. 13, 2018, 45 pages.
Non-Final Office Action received for U.S. Appl. No. 14/155,107 dated Mar. 31, 2015, 26 pages.
Notice of Allowance mailed May 1, 2019 for U.S. Appl. No. 16/137,960, filed Sep. 21, 2018, 14 pages.
Notice of Allowance mailed Mar. 5, 2019 for U.S. Appl. No. 16/057,573, filed Aug. 7, 2018, 31 Pages.
Notice of Allowance mailed Feb. 8, 2019 for U.S. Appl. No. 16/023,276, filed Jun. 29, 2018, 15 pages.
Notice of Allowance mailed Mar. 11, 2020 for U.S. Appl. No. 14/465,194, filed Aug. 21, 2014, 29 Pages.
Notice of Allowance mailed Jun. 15, 2018 for U.S. Appl. No. 15/799,621, filed Oct. 31, 2017, 27 pages.
Notice of Allowance mailed Jul. 18, 2022 for U.S. Appl. No. 16/550,905, filed Aug. 26, 2019, 7 pages.
Notice of Allowance mailed Apr. 20, 2022 for U.S. Appl. No. 14/461,044, filed Aug. 15, 2014, 08 pages.
Notice of Allowance mailed Sep. 24, 2020 for U.S. Appl. No. 16/292,609, filed Mar. 5, 2019, 20 Pages.
Notice of Allowance mailed Mar. 25, 2022 for U.S. Appl. No. 16/550,905, filed Aug. 26, 2019, 7 pages.
Notice of Allowance mailed Sep. 25, 2018 for U.S. Appl. No. 14/553,657, filed Nov. 25, 2014, 25 Pages.
Notice of Allowance mailed Jan. 28, 2019 for U.S. Appl. No. 16/023,300, filed Jun. 29, 2018, 31 pages.
Notice of Allowance mailed Nov. 3, 2022 for U.S. Appl. No. 16/899,843, filed Jun. 12, 2020, 10 pages.
Notice of Allowance mailed Mar. 30, 2018 for U.S. Appl. No. 14/539,773, filed Nov. 12, 2014, 17 pages.
Notice of Allowance mailed Nov. 30, 2018 for U.S. Appl. No. 15/799,628, filed Oct. 31, 2017, 19 Pages.
Notice of Allowance received for U.S. Appl. No. 14/155,107 dated Aug. 30, 2019, 16 pages.

(56) References Cited

OTHER PUBLICATIONS

Office Action mailed Sep. 28, 2022 for Chinese Application No. 201780059093.7, filed Jul. 25, 2017, 16 pages.
Restriction Requirement mailed Aug. 8, 2017 for U.S. Appl. No. 14/553,657, filed Nov. 25, 2014, 7 Pages.
Schowengerdt B.T., et al., "Stereoscopic Retinal Scanning Laser Display With Integrated Focus Cues for Ocular Accommodation," Proceedings of SPIE-IS&T Electronic Imaging, 2004, vol. 5291, pp. 366-376.
Silverman N.L., et al., "58.5L: Late-News Paper: Engineering a Retinal Scanning Laser Display with Integrated Accommodative Depth Cues," SID 03 Digest, 2003, pp. 1538-1541.
Takatsuka Y., et al., "Retinal Projection Display Using Diffractive Optical Element," Tenth International Conference on Intelligent Information Hiding and Multimedia Signal Processing, IEEE, 2014, pp. 403-406.
Urey H., "Diffractive Exit-Pupil Expander for Display Applications," Applied Optics, Nov. 10, 2001, vol. 40 (32), pp. 5840-5851.
Urey H., et al., "Optical Performance Requirements for MEMS-Scanner Based Microdisplays," Conferences on MOEMS and Miniaturized Systems, SPIE, 2000, vol. 4178, pp. 176-185.
Viirre E., et al., "The Virtual Retinal Display: A New Technology for Virtual Reality and Augmented Vision in Medicine," Proceedings of Medicine Meets Virtual Reality, IOS Press and Ohmsha, 1998, pp. 252-257.
Wijk U., et al., "Forearm Amputee's Views of Prosthesis Use and Sensory Feedback," Journal of Hand Therapy, Jul. 2015, vol. 28 (3), pp. 269-278.
Written Opinion for International Application No. PCT/US2014/057029, mailed Feb. 24, 2015, 9 Pages.
Office Action mailed May 7, 2024 for European Patent Application No. 19743717.1, filed on Jan. 25, 2019, 9 pages.
Office Action mailed Jan. 16, 2025 for Chinese Application No. 202080082075.2, filed Nov. 19, 2020, 17 pages.
Amma C., et al., "Airwriting: A Wearable Handwriting Recognition System," Personal and Ubiquitous Computing, Springer Verlag, Jan. 1, 2014, vol. 18, No. 1, pp. 191-203.
European Search Report for European Patent Application No. 24203369.4, dated Mar. 20, 2025, 10 pages.
Non-Final Office Action mailed Apr. 18, 2025 for U.S. Appl. No. 18/415,563, filed Jan. 17, 2024, 20 pages.
Office Action mailed Jun. 18, 2024 for Japanese Patent Application No. 2022-500568, filed on Sep. 3, 2020, 6 pages.
Office Action mailed Jun. 24, 2024 for Chinese Application No. 202080026319.5, filed Mar. 30, 2020, 10 pages.
Non-Final Office Action mailed Oct. 21, 2025 for U.S. Appl. No. 19/031,332, filed Jan. 17, 2025, 17 pages.
Notice of Allowance mailed Oct. 15, 2025 for U.S. Appl. No. 18/415,563, filed Jan. 17, 2024, 7 pages.

* cited by examiner

METHODS AND APPARATUSES FOR LOW LATENCY BODY STATE PREDICTION BASED ON NEUROMUSCULAR DATA

CROSS REFERENCE TO RELATED APPLICATIONS

This application is a continuation-in-part of U.S. application Ser. No. 16/833,309, filed Mar. 27, 2020, which claims the benefit of U.S. Provisional Application No. 62/826,516, filed Mar. 29, 2019, and U.S. Provisional Application No. 62/841,054, filed Apr. 30, 2019, the disclosures of each of which are incorporated, in their entirety, by this reference. This application is also a continuation-in-part of U.S. application Ser. No. 17/228,351, filed Apr. 12, 2021, which is a continuation of U.S. application Ser. No. 15/659,072, filed Jul. 25, 2017, which claims the benefit of U.S. Provisional Application No. 62/366,421, filed Jul. 25, 2016, the disclosures of each of which are incorporated, in their entirety, by this reference. This application is also a continuation-in-part of U.S. application Ser. No. 15/659,504, filed Jul. 25, 2017, which claims the benefit of U.S. Provisional Application No. 62/366,426, filed Jul. 25, 2016, the disclosures of each of which are incorporated, in their entirety, by this reference. This application is also a continuation-in-part of U.S. application Ser. No. 16/862,050, filed Apr. 29, 2020, which is a continuation-in-part of U.S. application Ser. No. 16/258,279, filed Jan. 25, 2019, which claims the benefit of U.S. Provisional Application No. 62/621,829, filed Jan. 25, 2018, and which claims the benefit of U.S. Provisional Application No. 62/841,061, filed Apr. 30, 2019, the disclosures of each of which are incorporated, in their entirety, by this reference. This application is also a continuation-in-part of U.S. application Ser. No. 17/485,200, filed Sep. 24, 2021, which is a continuation of U.S. application Ser. No. 16/671,066, filed Oct. 31, 2019, which is a continuation of U.S. application Ser. No. 16/257,979, filed Jan. 25, 2019, which claims the benefit of U.S. Provisional Application No. 62/621,838, filed Jan. 25, 2018, the disclosures of each of which are incorporated, in their entirety, by this reference. This application is also a continuation-in-part of U.S. application Ser. No. 16/657,029, filed Oct. 18, 2019, which is a continuation of U.S. application Ser. No. 16/258,409, filed Jan. 25, 2019, which claims the benefit of U.S. Provisional Application No. 62/621,770, filed Jan. 25, 2018, the disclosures of each of which are incorporated, in their entirety, by this reference. This application is also a continuation-in-part of U.S. application Ser. No. 16/995,859, filed Aug. 18, 2020, which is a continuation of U.S. application Ser. No. 16/389,419, filed Apr. 19, 2019, which claims the benefit of U.S. Provisional Application No. 62/676,567, filed May 25, 2018, the disclosures of each of which are incorporated, in their entirety, by this reference. This application is also a continuation-in-part of U.S. application Ser. No. 17/555,064, filed Dec. 17, 2021, which is a continuation of U.S. application Ser. No. 15/974,430, filed May 8, 2018, the disclosures of each of which are incorporated, in their entirety, by this reference. This application is also a continuation-in-part of U.S. application Ser. No. 17/293,472, filed May 12, 2021, which is a National Stage of International Application No. PCT/US2019/061759, filed Nov. 15, 2019, which the benefit of U.S. Provisional Application No. 62/768,741, filed Nov. 16, 2018, the disclosures of each of which are incorporated, in their entirety, by this reference. This application is also a continuation-in-part of U.S. application Ser. No. 17/487,695, filed Sep. 28, 2021, which is a continuation of U.S. application Ser. No. 16/557,342, filed Aug. 30, 2019, which claims the benefit of U.S. Provisional Application No. 62/726,159, filed Aug. 31, 2018, the disclosures of each of which are incorporated, in their entirety, by this reference. This application is also a continuation-in-part of U.S. application Ser. No. 17/389,899, filed Jul. 30, 2021, which is a continuation of U.S. application Ser. No. 16/539,755, filed Aug. 13, 2019, which claims the benefit of U.S. Provisional Application No. 62/718,337, filed Aug. 13, 2018, the disclosures of each of which are incorporated, in their entirety, by this reference. This application is also a continuation-in-part of U.S. application Ser. No. 16/165,806, filed Oct. 19, 2018, which claims the benefit of U.S. Provisional Application No. 62/574,496, filed Oct. 19, 2017, the disclosures of each of which are incorporated, in their entirety, by this reference. This application is also a continuation-in-part of U.S. application Ser. No. 16/165,841, filed Oct. 19, 2018, which claims the benefit of U.S. Provisional Application No. 62/574,496, filed Oct. 19, 2017, the disclosures of each of which are incorporated, in their entirety, by this reference. This application is also a continuation-in-part of U.S. application Ser. No. 17/409,371, filed Aug. 23, 2021, which is a division of U.S. application Ser. No. 16/890,352, filed Jun. 2, 2020, which is a continuation of U.S. application Ser. No. 16/424,144, filed May 28, 2019, which claims the benefit of U.S. Provisional Application No. 62/696,242, filed Jul. 10, 2018, and U.S. Provisional Application No. 62/677,574, filed May 29, 2018, the disclosures of each of which are incorporated, in their entirety, by this reference. This application is also a continuation-in-part of U.S. application Ser. No. 17/409,375, filed Aug. 23, 2021, which is a division of U.S. application Ser. No. 16/890,352, filed Jun. 2, 2020, which is a continuation of U.S. application Ser. No. 16/424,144, filed May 28, 2019, which claims the benefit of U.S. Provisional Application No. 62/696,242, filed Jul. 10, 2018, and U.S. Provisional Application No. 62/677,574, filed May 29, 2018, the disclosures of each of which are incorporated, in their entirety, by this reference. This application is also a continuation-in-part of U.S. application Ser. No. 17/297,449, filed May 26, 2021, which is a National Stage of International Application No. PCT/US2019/063587, filed Nov. 27, 2019, which claims the benefit of U.S. Provisional Application No. 62/771,957, filed Nov. 27, 2018, the disclosures of each of which are incorporated, in their entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 20H illustrates a wearable portion of the computer-based system and FIG. 20I illustrates a dongle portion connected to a computer, wherein the dongle portion is configured to communicate with the wearable portion.

Figure 1:
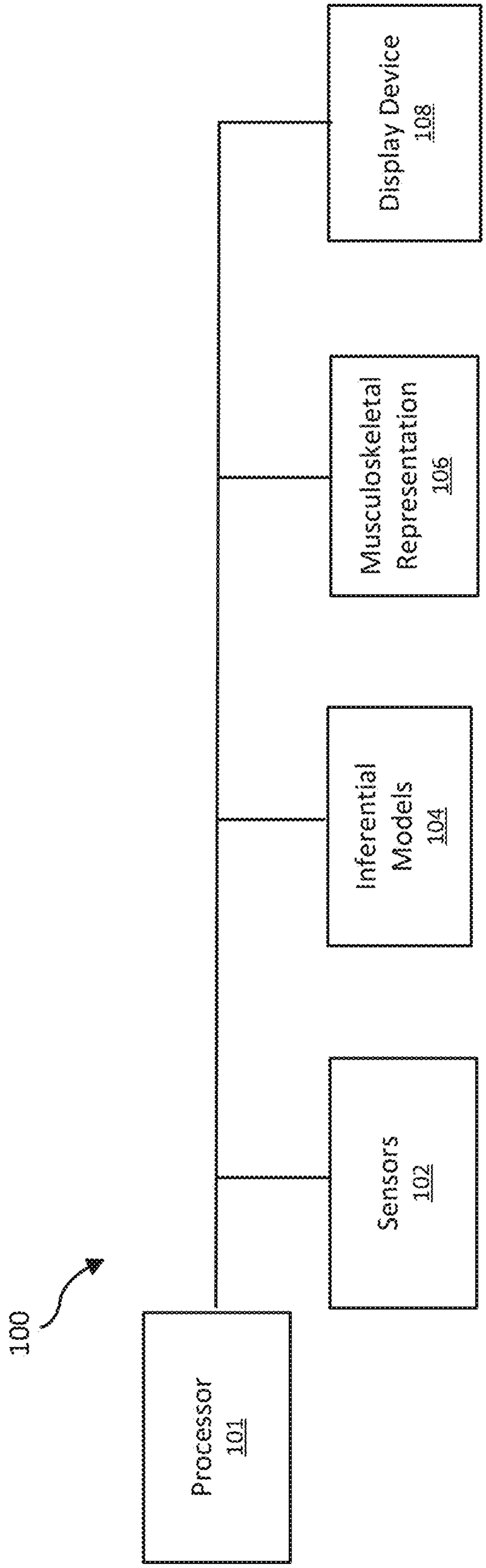
FIG. 1 is an illustration of an example block diagram of a system for predicting body state information, in accordance with embodiments of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to predicting body part states of a human user using trained inferential models. In some computer applications that generate musculoskeletal representations of the human body, it may be desirable for an application to know the spatial positioning, orientation, and movement of a user's body to provide a realistic representation of body movement to the application. For example, in an artificial-reality (AR) environment, tracking the spatial position of the user's hand may enable the application to accurately represent hand motion in the AR environment, which may allow the user to interact with (e.g., by grasping or manipulating) virtual objects within the AR environment. In a user interface application, detecting the presence or absence of a pose or gesture of the user may be used as a binary control input (e.g., mode switching) to a computer. An important feature of computer applications that generate musculoskeletal representations of the human body is low latency between a movement of the user's body and the representation of that movement by the computer application (e.g., displaying a visual representation to the user).

The time delay between onsets of neuromuscular activity (e.g., as indicated by electromyography (EMG) signals measured by a wearable device) and muscle contraction in a human body part may range from tens of milliseconds to hundreds of milliseconds or more, depending on physiological differences between individuals and the particular body part. Therefore, at any point in time, a neuromuscular activity signal corresponds to motion that may occur tens of milliseconds, or more, in the future.

Systems, methods, and apparatuses of the present disclosure for predicting a state of a body part, or a portion of a body part, based on neuromuscular activity data may achieve lower body state latency (e.g., the latency from recorded neuromuscular data to the output of a trained inferential model that predicts the state of the body part or the portion of the body part of the user) by temporally shifting neuromuscular activity signal data relative to ground truth measurements of body state. The temporally shifted data set may be used as an input for training an inferential model and/or as input to a previously trained inferential model.

In some embodiments, a method is provided that includes receiving neuromuscular activity signals in response to movement of a body part of a user via one or more neuromuscular sensors (e.g., neuromuscular sensors on a wearable device donned by the user), determining a ground truth (e.g., directly observed) measurement associated with a corresponding movement of the body part of the user, time shifting the neuromuscular activity signals to substantially align with a timing of the corresponding movement, and training an inferential model using the time shifted neuromuscular activity signals.

All or portions of the human musculoskeletal system may be modeled as a multi-segment articulated rigid body system, with joints forming the interfaces between the different segments and joint angles defining the spatial relationships between connected segments in the model. Constraints on the movement at the joints may be governed by the type of joint connecting the segments and the biological structures (e.g., muscles, tendons, ligaments, etc.) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. A musculoskeletal representation may be a multi-segment articulated rigid body system used to model portions of the human musculoskeletal system.

However, some segments of the human musculoskeletal system (e.g., the forearm), though approximated as a rigid body in the articulated rigid body system, may include multiple rigid structures (e.g., the ulna and radius bones of the forearm) that provide for more complex movement within the body segment that is not explicitly considered by rigid body models. Accordingly, a musculoskeletal representation may include body segments that represent a combination of body parts that are not strictly rigid bodies.

In some embodiments, a trained inferential model may be configured to predict a state of a portion of the body of a user. Such a body state may include a force, a movement, a pose, or a gesture of a body part or a portion of a body part. For example, the body state may include the positional relationships between body segments and/or force relationships for individual body segments and/or combinations of body segments in the musculoskeletal representation of the portion of the body of the user.

A predicted force may be associated with one or more segments of a musculoskeletal representation of the portion of the body of the user. Such predicted forces may include linear forces or rotational (e.g., torque) forces exerted by one or more segments of the musculoskeletal representation. Examples of linear forces include, without limitation, the force of a finger or a hand pressing on a solid object such as a table or a force exerted when two segments (e.g., two fingers) are squeezed together. Examples of rotational forces include, without limitation, rotational forces created when segments in the wrist and/or fingers are twisted and/or flexed. In some embodiments, the predicted body state may include, without limitation, squeezing force information, pinching force information, grasping force information, twisting force information, flexing force information, or information about co-contraction forces between muscles represented by the musculoskeletal representation.

A predicted movement may be associated with one or more segments of a musculoskeletal representation of the portion of the body of the user. Such predicted movements may include linear/angular velocities and/or linear/angular accelerations of one or more segments of the musculoskeletal representation. The linear velocities and/or the angular velocities may be absolute (e.g., measured with respect to a fixed frame of reference) or relative (e.g., measured with respect to a frame of reference associated with another segment or body part).

As used herein, the term "pose" may refer to a static configuration (e.g., the positioning) of one or more body parts. For example, a pose may include a fist, an open hand, statically pressing the index finger against the thumb, pressing the palm of a hand down on a solid surface, grasping a ball, or a combination thereof. As used herein, the term "gesture" may refer to a dynamic configuration of one or more body parts, the movement of the one or more body parts, forces associated with the dynamic configuration, or a combination thereof. For example, gestures may include waving a finger back and forth, throwing a ball, grasping a ball, or a combination thereof. Poses and/or gestures may be defined by an application configured to prompt a user to perform the pose and/or gesture. Additionally or alternatively, poses and/or gestures may be arbitrarily defined by a user.

In some embodiments, a body state may describe a hand of a user, which may be modeled as a multi-segment articulated body. The joints in the wrist and each finger may form the interfaces between the multiple segments in the model. In some embodiments, a body state may describe a combination of a hand with one or more arm segments of the user. The methods described herein are also applicable to musculoskeletal representations of portions of the body other than the hand including, without limitation, an arm, a leg, a foot, a torso, a neck, or a combination thereof.

Systems and methods of the present disclosure that compensate for electromechanical delay in the musculoskeletal system may achieve lower latency and/or increased accuracy in predicting body state as compared to traditional methods. Electromechanical delay in the musculoskeletal system may be defined as the time between the arrival of a motor neuron action potential at a neuromuscular synapse and force output (e.g., movement) of a part of the body directed by the motor neuron action potential. The time delay between onsets of neuromuscular activity (e.g., as indicated by EMG signals from a wearable device donned by the user) and muscle contraction may range from tens of milliseconds to more than hundreds of milliseconds, depending on the physiology of the user and the body part directed by the motor neuron action potential. Therefore, at any point in time, the EMG signals may correspond to motion of the body part that occurs tens of milliseconds, or more, in the future.

In some examples, an inferential model trained on neuromuscular signals temporally shifted relative to ground truth measurements of the body part state may evaluate the relationship between the neuromuscular signal and the body part's corresponding motion, rather than between the neuromuscular signal and motion corresponding to an earlier neuromuscular signal. Further, the introduction of this temporal shift may reduce the latency between the ground truth body state and the predicted body state output by the trained inferential model, thereby improving the user experience associated with the application (e.g., an artificial-reality application, a user interface application, etc.) because the body part representation (e.g., a visual representation on a head-mounted display) is more reactive to the user's actual motor control.

Electromechanical delays may vary between individuals and parts of a user's body (e.g., different delays for a hand vs. a leg due to their different sizes). In some examples, the amount that neuromuscular signals are shifted relative to ground truth data about the position of the arm, hand, wrist, and/or fingers may be optimized according to particular physiology shared between users (e.g., age or gender) or personalized for a specific user based on their personal electromechanical delay (e.g., for muscles of the forearm that control hand and finger movements). Training an inferential model using neuromuscular signals temporally shifted relative to ground truth measurements of the state may account for any or all factors known to influence electromechanical delays in the human neuromuscular system including, without limitation, body temperature, fatigue, circadian cycle, drug consumption, diet, caffeine consumption, alcohol consumption, gender, age, flexibility, muscle contraction level, or a combination thereof.

In some examples, an appropriate temporal shift may be identified by generating multiple training datasets with multiple temporal shifts. In some examples, the temporal shifts may be different respective time intervals. For example, a set of training datasets may be created with time intervals ranging from 5 ms to 100 ms in increments of 5 ms or from 10 ms to 150 ms in increments of 10 ms, or some other combination of starting time interval, ending time interval, and time increment. The multiple training datasets may be used to train multiple inferential models. The latency and accuracy of these models may then be assessed by comparing the models to the ground truth data. A model may be selected that exhibits a desired balance of latency and accuracy. The desired balance may depend on the task performed by the user. For example, a task prioritizing precise movement (e.g., tele-surgery) may accept greater latency in exchange for greater accuracy, while a task prioritizing rapid movement (e.g., a video game) may accept lower accuracy in exchange for lower latency.

In some examples, an inferential model trained using an appropriate delay time interval may be selected without generating multiple training datasets. For example, an inferential model may be trained using a known appropriate delay time interval. The known appropriate delay time interval may depend on a known electromechanical delay time and/or a known characteristic latency of the system. The known electromechanical delay time may be specific to a force, a movement, a pose, a gesture, a body part, a specific user, a user having a physiological characteristic (e.g., a specific age, sex, activity level, or other characteristic influencing electromechanical delays in the human neuromuscular system), or a combination thereof. The known electromechanical delay time may be directly determined by a clinician according to known methods for the particular user and/or estimated based on known electromechanical delay times for users sharing a physiological characteristic with the user.

In some examples, an appropriate delay time interval may be determined using a known electromechanical delay time for a body part, a user, and/or a category of users. For example, when the known electromechanical delay associated with the body part is 40 ms, the time intervals may be selected ranging from 20 to 60 ms. Prediction accuracies may be generated for inferential models trained using time-shifted training datasets generated using the selected time intervals. One or more of the inferential models may be selected for use in predicting body part state using the generated prediction accuracies. By selecting time intervals based on a known electromechanical delay time, the selection of the appropriate delay time interval may focus on time intervals likely to combine sufficient accuracy and low latency. As a result, fewer time intervals may be tested and/or a range of time intervals may be tested at a higher resolution (e.g., a 1 ms resolution rather than a 5 ms or a 10 ms resolution).

FIG. 1 illustrates a system 100 in accordance with embodiments of the present disclosure. The system 100 may include a plurality of sensors 102 configured to record signals resulting from the movement of portions of a human body. Sensors 102 may include autonomous sensors. In some examples, the term "autonomous sensors" may refer to sensors configured to measure the movement of body segments without requiring the use of external devices. In additional embodiments, sensors 102 may also include non-autonomous sensors in combination with autonomous sensors. In some examples, the term "non-autonomous sensors" may refer to sensors configured to measure the movement of body segments using external devices. Examples of non-autonomous sensors may include, without limitation, wearable (e.g., body-mounted) cameras, global positioning systems, laser scanning systems, radar ranging sensors, or a combination thereof.

Autonomous sensors may include a plurality of neuromuscular sensors configured to record signals arising from neuromuscular activity in muscles of a human body. The term "neuromuscular activity," as used herein, may refer to neural activation of spinal motor neurons that innervate a muscle, muscle activation, muscle contraction, or a combination thereof. Neuromuscular sensors may include one or more electromyography (EMG) sensors, one or more mechanomyography (MMG) sensors, one or more sonomyography (SMG) sensors, one or more sensors of any suitable type that are configured to detect neuromuscular signals, or a combination thereof. In some examples, sensors 102 may be used to sense muscular activity related to a movement of the body part controlled by muscles. Sensors 102 may be configured and arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which may measure a combination of physical aspects of motion, using, for example, an accelerometer, a gyroscope, a magnetometer, or a combination thereof. In some examples, IMUs may be used to sense information about the movement of the body part on which the IMU is attached and information derived from the sensed data (e.g., position and/or orientation information) may be tracked as the user moves over time. For example, one or more IMUs may be used to track movements of portions of a user's body proximal to the user's torso (e.g., arms, legs) as the user moves over time.

Some embodiments may include at least one IMU and a plurality of neuromuscular sensors. The IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). Autonomous sensors may be arranged in any suitable way, and embodiments of the present disclosure are not limited to any particular sensor arrangement. For example, at least one IMU and a plurality of neuromuscular sensors may be co-located on a body segment to track movements of the body segment using different types of measurements. In some examples, an IMU sensor and a plurality of EMG sensors may be arranged on a wearable device configured to be worn around the lower arm (e.g., the forearm) or wrist of a user. In such an arrangement, the IMU sensor may be configured to track movement information (e.g., position, velocity, acceleration, and/or orientation over time) associated with one or more arm segments. The movement information may determine, for example, whether the user has raised or lowered their arm. The EMG sensors may be configured to determine movement information associated with wrist or hand segments to determine, for example, whether the user has an open or closed hand configuration.

Each of the autonomous sensors may include one or more sensing components configured to sense information about a user. In the case of IMUs, the sensing components may include one or more accelerometers, gyroscopes, magnetometers, or any combination thereof, to measure characteristics of body motion. Examples of characteristics of body motion may include, without limitation, acceleration, angular velocity, linear velocity, and sensed magnetic field around the body. The sensing components of the neuromuscular sensors may include, without limitation, electrodes configured to detect electric potentials on the surface of the body (e.g., for EMG sensors), vibration sensors configured to measure skin surface vibrations (e.g., for MMG sensors), acoustic sensing components configured to measure ultrasound signals (e.g., for SMG sensors) arising from muscle activity, or a combination thereof.

In some examples, the output of sensors 102 may be processed using hardware signal processing circuitry (e.g., to perform amplification, filtering, and/or rectification). In some examples, at least some signal processing of the output of sensors 102 may be performed in software. Thus, signal processing of autonomous signals recorded by the autonomous sensors may be performed in hardware, software, or by any suitable combination of hardware and software, as embodiments of the present disclosure are not limited in this respect.

In some examples, the recorded sensor data from sensors 102 may be processed to compute additional derived measurements that may be provided as input to an inferential models 104, as described in more detail below. For example, recorded signals from an IMU sensor may be processed to derive an orientation signal that specifies the orientation of a rigid body segment over time. Autonomous sensors may implement signal processing using components integrated with the sensing components or a portion of the signal processing may be performed by one or more components in communication with, but not directly integrated with, the sensing components of the autonomous sensors.

In some examples, the plurality of autonomous sensors may be arranged as a portion of a wearable device configured to be worn (e.g., donned) on or around part of a user's body. For example, an IMU sensor and/or a plurality of neuromuscular sensors may be arranged circumferentially around an adjustable and/or elastic band such as a wristband or armband that is configured to be worn around a user's wrist or arm. In some examples, an IMU sensor and/or a plurality of neuromuscular sensors may be arranged and/or attached to a portion and/or multiple portions of the body including, without limitation, an ankle, a waist, a torso, a neck, a head, a foot, a shin, a shoulder, or a combination thereof. Additionally or alternatively, the autonomous sensors may be arranged on a wearable patch configured to be affixed to a portion of the user's body. In some examples, multiple wearable devices, each having one or more IMUs and/or neuromuscular sensors included thereon, may be used to predict musculoskeletal position information for movements that involve multiple parts of the body.

In some examples, sensors 102 may only include a plurality of neuromuscular sensors (e.g., EMG sensors). In some examples, sensors 102 may include a plurality of neuromuscular sensors and at least one "auxiliary" or additional sensor configured to continuously record a plurality of auxiliary signals. Examples of auxiliary sensors may include, without limitation, other autonomous sensors such as IMU sensors, non-autonomous sensors such as imaging devices (e.g., a camera), radar ranging sensors, radiation-based sensors, laser-scanning devices, and/or other types of sensors such as heart-rate monitors.

System 100 also may include at least one processor 101 programmed to communicate with sensors 102. For example, signals recorded by one or more of sensors 102 may be provided to processor 101, which may be programmed to execute one or more machine learning algorithms that process signals output by sensors 102 to train one or more inferential models 104. The trained (or retrained) inferential models 104 may be stored for later use in generating a musculoskeletal representation 106, as described in more detail below. Non-limiting examples of inferential models 104 that may be used to predict body state information based on recorded signals from sensors 102 are discussed in detail below.

System 100 may include a display device 108 configured to display a visual representation of a body state (e.g., a visual representation of a hand). As discussed in more detail below, processor 101 may use one or more trained inferential models 104 configured to predict body state information based, at least in part, on signals recorded by sensors 102. The predicted body state information may be used to update musculoskeletal representation 106, which may be used to render a visual representation on display device 108 (e.g., a head-mounted display). Real-time reconstruction of the current body state and subsequent rendering of a visual representation on display device 108 reflecting the current body state information in the musculoskeletal model may provide visual feedback to the user about the effectiveness of inferential model 104 to accurately represent an intended body state. In some examples, a metric associated with musculoskeletal representation 106 (e.g., a likelihood metric for one or more hand gestures or a quality metric that represents a confidence level of estimating a position, movement, and/or force of a segment of a multi-segment articulated rigid body system such as a hand) may be provided to a user or other third-party.

In some examples, a computer application configured to simulate an artificial-reality environment may be instructed to display a visual representation of the user's hand on display device 108. Positioning, movement, and/or forces applied by portions of the hand within the artificial-reality environment may be displayed based on the output of the trained inferential model(s). The visual representation of the user's positioning, movement, and/or force may be dynamically (e.g., in real-time) updated based on current reconstructed body state information as signals are continuously recorded by sensors 102 and processed by trained inferential models 104.

As discussed herein, some embodiments may be directed to using inferential models 104 for predicting musculoskeletal representation 106 based on signals recorded from sensors 102 (e.g., wearable autonomous sensors). Inferential models 104 may be used to predict the musculoskeletal position information without having to place sensors 102 on each segment of the rigid body that is to be represented in the computer-generated musculoskeletal representation 106. The types of joints between segments in a multi-segment articulated rigid body model may constrain movement of the rigid body. Additionally, different users may tend to move in individual ways when performing a task that may be captured in statistical patterns of individual user movement. At least some of these constraints on human body movement may be explicitly incorporated into inferential models 104 used for prediction. Additionally or alternatively, the constraints may be learned by inferential models 104 though training based on recorded data from sensors 102. Constraints imposed on the construction of inferential models 104 may be constraints set by the anatomy and physics of a user's body, while constraints derived from statistical patterns may be constraints set by human behavior for one or more users from which sensor measurements are recorded.

As discussed herein, some embodiments may be directed to using inferential models 104 for predicting body state information to enable the generation and/or real-time update of a computer-based musculoskeletal representation 106. Inferential models 104 may be used to predict the body state information based on signals from sensors 102 including, without limitation, IMU signals, neuromuscular signals (e.g., EMG, MMG, and SMG signals), external device signals (e.g., camera, radar, or laser-scanning signals), or a combination thereof, as a user performs one or more movements.

Figure 2A:
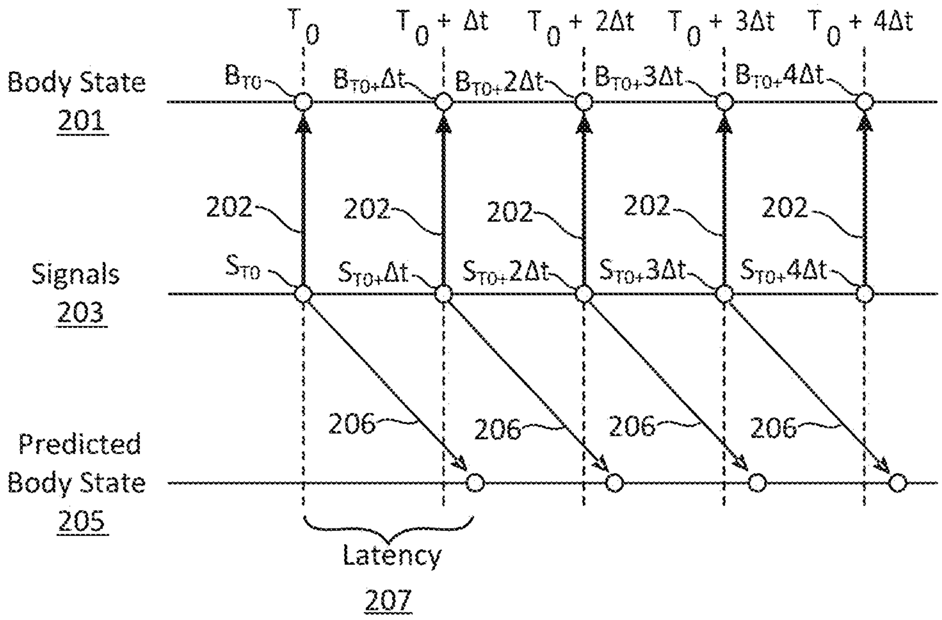
FIG. 2A is an illustration of an example chart depicting the effect of latency on predicting body state information, in accordance with embodiments of the present disclosure.

FIG. 2A illustrates an example chart depicting the effect of latency on predicting body state information, in accordance with embodiments of the present disclosure. A system may be configured to obtain repeated (e.g., periodic) measurements of neuromuscular signals 203 and body state 201 (e.g., ground truth body state) as a user performs one or more movements. For example, neuromuscular signals 203 and ground truth body state 201 may be time-series data (e.g., data recorded over a period of time), including explicitly and/or implicitly timestamped measurements (e.g., tuples of measurement value and measurement time, and/or a sequence of measurement values with a known sampling time interval and a known start time). The system may be configured to align samples of body state 201 and signals 203 based on acquisition time. The alignment of body state 201 and signals 203 samples may involve up-sampling, down-sampling, interpolation, other signal processing techniques, or a combination thereof. For example, the system may align body state samples $\{B_{T0}, B_{T0+\Delta t}, B_{T0+2\Delta t}, B_{T0+3\Delta t}, B_{T0+4\Delta t}, \ldots\}$ and signal samples $\{S_{T0}, S_{T0+\Delta t}, S_{T0+2\Delta t}, S_{T0+3\Delta t}, S_{T0+4\Delta t}, \ldots\}$ respectively as shown in FIG. 2A.

The system may be configured to train an inferential model(s) using body state 201 as ground truth data for signals 203. In some examples, the term "ground truth data" may be used interchangeably with the term "label time series data." Label time series data may be data collected over a period of time at a constant time interval or a variable time interval. A conventional system may be configured to predict the current body state sample using the current signal sample (e.g., predict $B_{T0}$ from $S_{T0}$ represented in FIG. 2A as arrow 202 connecting the signal sample to the body state at the same time). Due to electromechanical delay, the body state $B_{T0+\Delta t}$ may be the result of prior muscle activity. The body state $B_{T0+\Delta t}$ may therefore be more accurately predicted using an earlier signal sample (e.g., $S_{T0}$). Furthermore, prediction of body state from signal samples requires processing time. This processing time may include time delays associated with temporal integration of signals, signal recording and conditioning, transmission of signal data (e.g., from a wearable sensor to the processing system), memory access, processor instruction execution, and processing signal data using the inferential model. Such time delays may range between 10 ms and 100 ms, or greater.

Predicted body state 205 may depict when samples generated using signals 203 are output by the trained inferential model (as indicated by arrows 206 connecting samples of signals 203 with predicted body states 205). As shown in FIG. 2A, by the time the trained inferential model outputs predict body state $B_{T0}$, the most recently measured body part state may be $B_{T0+\Delta t}$. As used herein, latency may be a time period (e.g., an average time period, a median time period, or other suitable time period) between the measurement of a body state and the output of the corresponding predicted body state 205 (e.g., latency 207 between measured body state $B_{T0}$ and predicted body state $B_{T0}$). Latency may diminish the quality of the user experience, as a user may perceive the output of the system (e.g., a visual representation of the body state displayed on a head-mounted display (HMD)) to lag behind the user's actual movements.

Figure 2B:
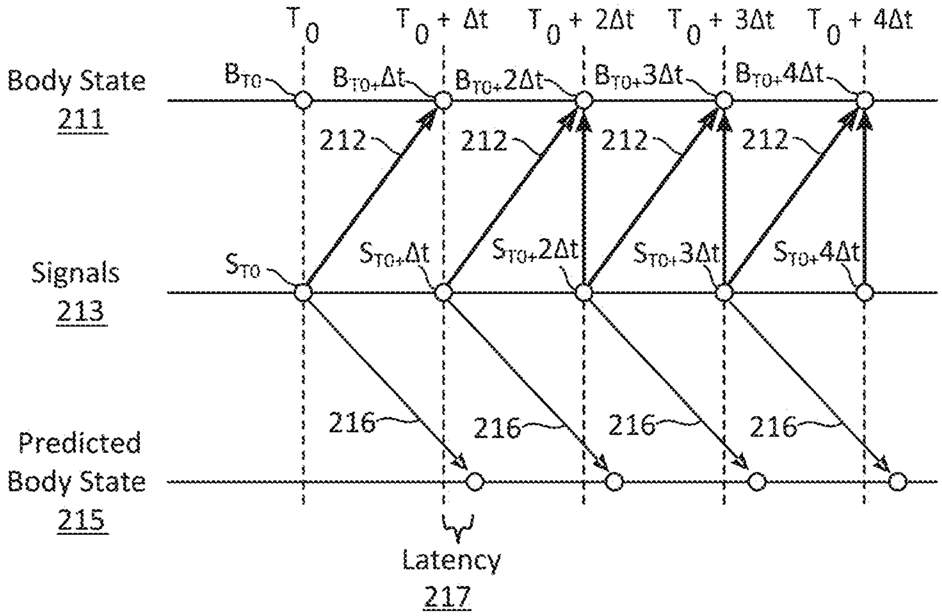
FIG. 2B is an illustration of an example chart depicting latency reduction in predicting body state information, in accordance with embodiments of the present disclosure.

FIG. 2B shows a chart depicting the effect on latency 217 of training an inferential model using time shifted training data, in accordance with embodiments of the present disclosure. As described herein with reference to FIG. 2A, the system may obtain multiple samples of body state 211 (e.g., ground truth body state) and signals 213. In some examples, rather than pairing samples of signals 213 and body state 211 acquired at the same time, the system may be configured to pair samples of signals 213 with samples of body state 211 acquired at later times (as indicated by arrows 212 connecting samples of signals 213 with samples of body state 211). For example, the system may pair signal sample $S_{T0}$ with body state sample $B_{T0+\Delta t}$. In this manner, the system may create a training dataset by time-shifting either the signals 213 or the ground truth body state 211. The system may be configured to train an inferential model using the time-shifted training dataset. For example, the inferential model may then be trained to predict body state 211 from the signals 213 using the time-shifted training dataset.

Predicted body state 215 depicts when samples generated using signals 213 are output by the trained inferential model (as indicated by arrows 216 connecting samples of signals 213 with predicted body states 215). In this example, by the time the trained inferential model outputs predicted body state $B_{T0+\Delta t}$, the most recently measured body part state is also $B_{T0+\Delta t}$. As shown, latency 217 between when body state $B_{T0+\Delta t}$ occurs and when the trained inferential model outputs predicted body state $B_{T0+\Delta t}$ may be reduced compared to latency 207 shown in FIG. 2A by predicting $B_{T0+\Delta t}$ from $S_{T0}$. As discussed herein, the inferential model may be trained to predict $B_{T0+\Delta t}$ from $S_{T0}$ at least in part because electromechanical delay causes signals measured at time $T_0$ to affect later occurring body states (e.g., the body state at $T_{0+\Delta t}$). Thus, for an appropriate choice of delay time interval Δt, training the inferential model to predict $B_{T0+\Delta t}$ from $S_{T0}$ may improve body state prediction accuracy. Example methods for choosing delay time interval Δt are discussed herein with reference to FIGS. 3 and 4.

Figure 3:
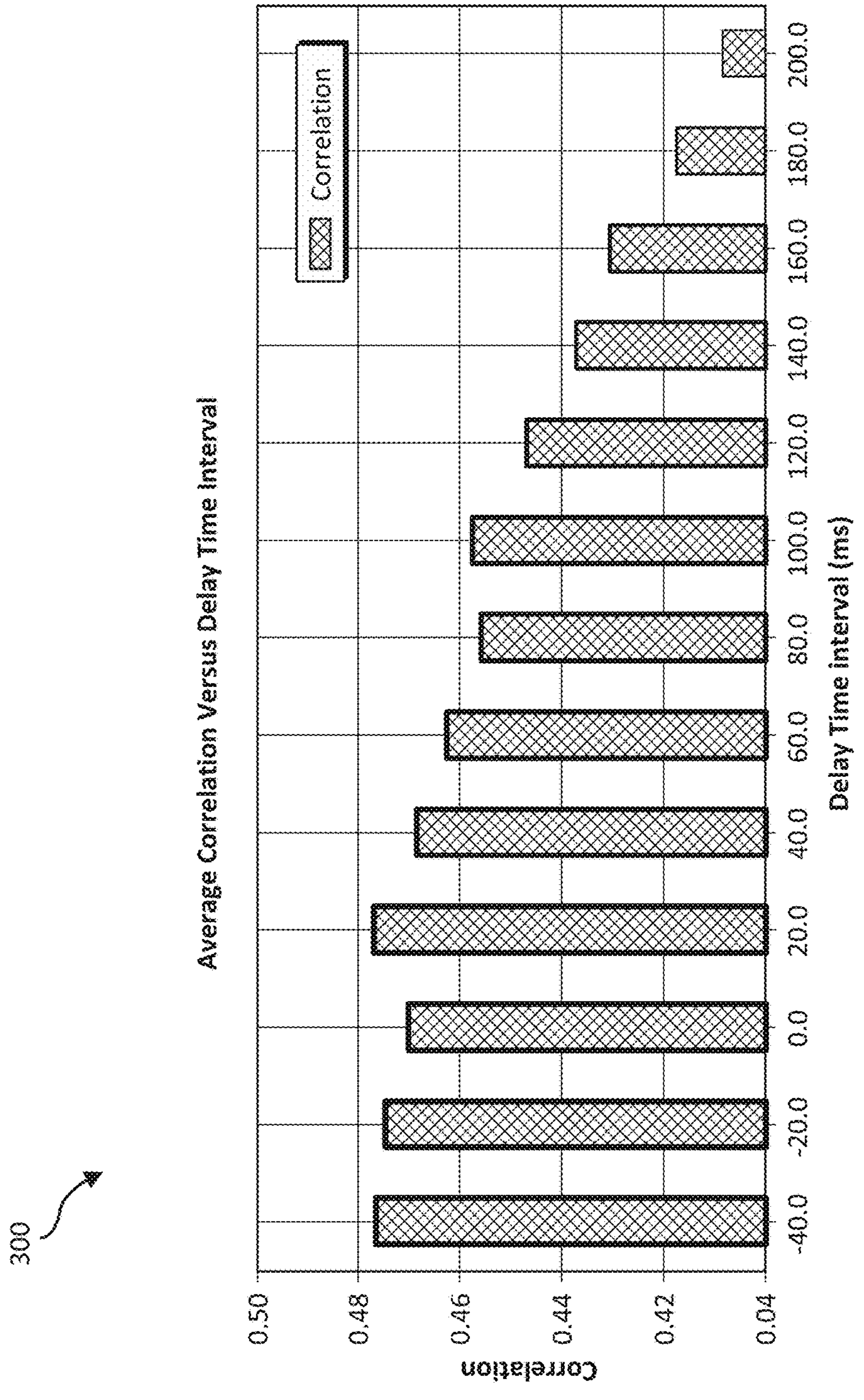
FIG. 3 is an illustration of an example chart depicting a relationship between delay time interval and body state prediction accuracy, in accordance with embodiments of the present disclosure.

FIG. 3 shows a chart 300 depicting an empirical relationship between delay time interval Δt and body state prediction accuracy, in accordance with embodiments of present disclosure. The empirical relationship may be used to select a trained inferential model that exhibits a desired balance of latency and body state prediction accuracy. The independent variable depicted in FIG. 3 is the delay time interval between a neuromuscular signal sample and a body state sample. Positive time interval values correspond to pairing the neuromuscular signal sample with a body state sample obtained after the neuromuscular signal sample. Negative time interval values correspond to pairing the neuromuscular signal sample with a body state sample obtained before the neuromuscular signal sample. The zero time interval (0.0 ms) value corresponds to pairing the signal sample with a body state sample obtained at the same time as the signal sample. The response variable depicted in the chart of FIG. 3 may be a measure of the prediction accuracy of a model trained using a training dataset time-shifted by the time interval. The depicted measure may be a correlation value between measured and predicted joint angles in a musculoskeletal representation of a hand. In some examples, other measures of the prediction accuracy may be used, such as a mean squared error between characteristic values of a musculoskeletal representation of a body part. Such characteristic values may include, without limitation, joint angles, forces, or spatial coordinates of a body part. Similarly, a likelihood of correctly predicting a known pose or gesture (e.g., a fist pose or transitioning from an open hand to a fist pose) may be used as measure of the prediction accuracy. For example, the body part states and the predicted body part states may be binary labels indicating the presence or absence of a pose or gesture. The trained inferential model may have a false positive, false negative, true positive, or true negative prediction rate. The measure of prediction accuracy may depend on at least one of these prediction rates.

As shown in chart 300, body state prediction accuracy (e.g., correlation between measured and predicted joint angles) may improve as the delay time interval value increases from zero to 20 milliseconds. Prediction accuracy decreases thereafter as the delay time interval value increases. As shown, shifting the measured signals relative to the body state labels by 40 ms reduces latency without reducing prediction accuracy. As described herein, depending on the task, an inferential model trained using a shorter or longer time interval (e.g., a time interval in the range 10 to 100 ms) may be selected for use in predicting body state.

In some examples, an inferential model may be selected for use in predicting body state based on a prediction accuracy criterion (e.g., correlation between measured and predicted joint angles) and the delay time interval Δt used to generate the training dataset for training the inferential model. For example, of the inferential models satisfying a prediction accuracy criterion (e.g., accuracy above a set threshold), the selected inferential model may be the inferential model trained using the training dataset generated using the largest time interval. For example, two inferential models may satisfy the accuracy criterion (e.g., both models having an accuracy above an acceptable threshold). The first model may have greater accuracy than the second model, but the time interval used to generate the training dataset for training the first model may be less than the time interval used to generate the training dataset for training the second model. In this example, the second inferential model may be selected to predict the body state, as this second inferential model may have acceptable prediction accuracy and lower latency than the first inferential model.

The accuracy criterion may depend on the greatest accuracy observed across the inferential models. For example, the accuracy criterion may be expressed as a deviation from an accuracy of the most accurate model. When the deviation in accuracy for an inferential model is less than a threshold value, the inferential model may satisfy the accuracy criterion. The threshold value may be an absolute difference in accuracy (e.g., the most accurate model has a prediction accuracy of 85% and the second model has at least an accuracy of 80%). The threshold value may alternatively be a relative difference in accuracy (e.g., the less accurate model is at least 95% as accurate as the most accurate model).

Figure 4:
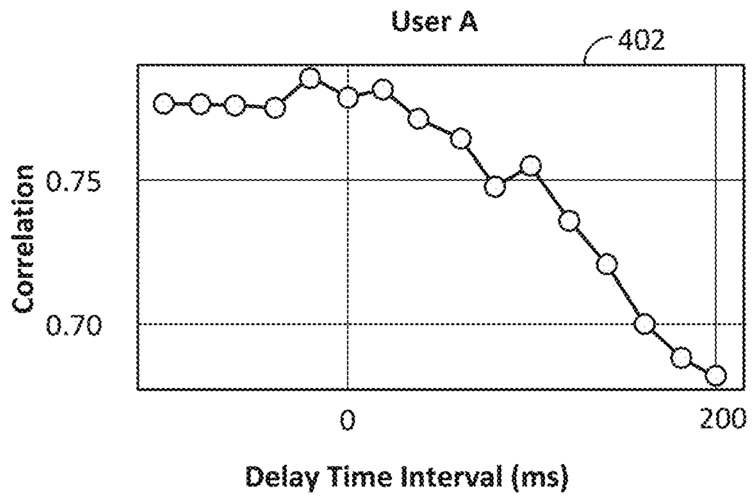
FIG. 4 illustrates two charts depicting user dependence in a relationship between delay time interval and body state prediction accuracy, in accordance with embodiments of the present disclosure.
Figure 4:
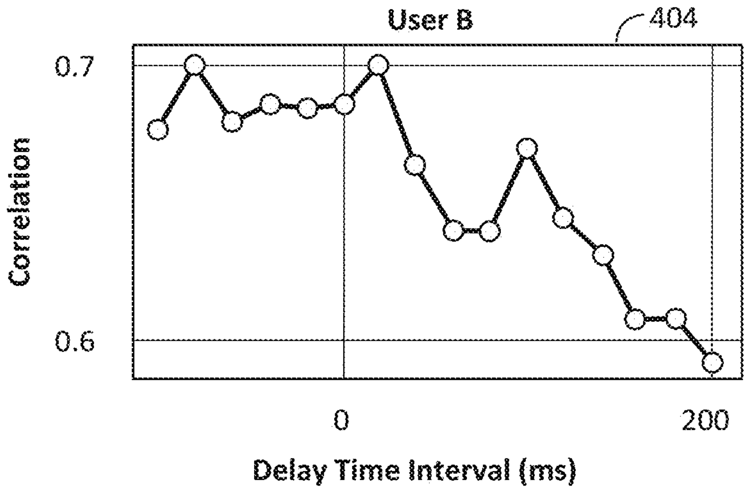

FIG. 4 shows two charts depicting user dependence in the empirical relationship between time interval and prediction accuracy, in accordance with embodiments of the present disclosure. The dependence of prediction accuracy on delay time interval may vary between users. As shown in the charts of FIG. 4, the dependence of prediction accuracy on delay time interval may vary between user A as shown in chart 402 and user B as shown in chart 404. Accordingly, a system may be personalized to a user by selecting an inferential model trained using a delay time interval appropriate for the user and/or training an inferential model using a training dataset generated with a delay time interval appropriate for the user. The appropriate delay time interval may depend on a known electromechanical delay time and/or a characteristic latency of the system. For example, user A and user B may have different electromechanical delay times depending on physiological characteristics (e.g., user age, sex, activity level, or other characteristic known to influence electromechanical delays in the human neuromuscular system).

Figure 5:
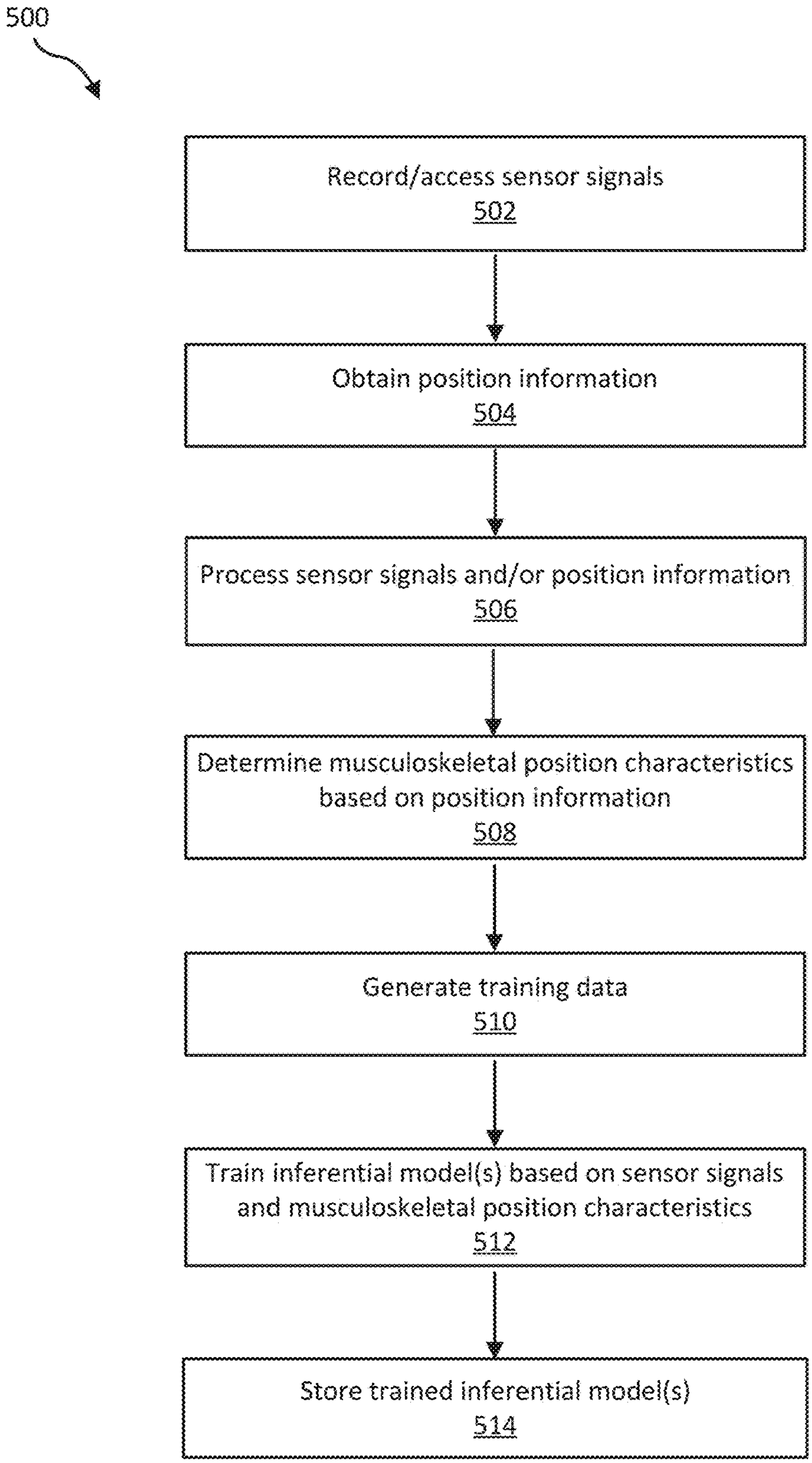
FIG. 5 is an illustration of a flowchart of an example method for generating an inferential model for predicting musculoskeletal position information using signals recorded from sensors, in accordance with embodiments of the present disclosure.

FIG. 5 describes a method 500 for generating (e.g., training) an inferential model using signals recorded from sensors (e.g., sensors 102). Method 500 may be executed using any suitable computing device(s), as embodiments of the present disclosure are not limited in this respect. For example, method 500 may be executed by one or more computer processors described with reference to FIGS. 1 and 7. As another example, one or more operations of method 500 may be executed using one or more servers (e.g., servers included as a part of a cloud computing environment). For example, at least a portion of the operations in method 500 may be performed using a cloud computing environment and/or a processor(s) of a wearable device such as wearable device 700 of FIG. 7, 810 of FIG. 8, 1100 of FIG. 11, 1200 of FIG. 12, 1320 of FIG. 13, 1404 of FIG. 14, or 1530 of FIG. 15. Although the operations of method 500 are shown in FIG. 5 as being performed in a certain order, the operations of method 500 may be performed in any order.

Method 500 may include operation 502, in which a plurality of sensor signals (e.g., neuromuscular signals, IMU signals, etc.) are obtained for one or more users performing one or more movements (e.g., playing an artificial-reality game). In some examples, the plurality of sensor signals may be recorded as part of method 500. Additionally or alternatively, the plurality of sensor signals may have been recorded prior to the execution of method 500 and are accessed (rather than recorded) at operation 502.

In some examples, the plurality of sensor signals may include sensor signals recorded for a single user performing a single movement and/or multiple movements. The user may be instructed to perform a sequence of movements for a particular task (e.g., grasping a game controller, providing a user input to a computer, etc.) and sensor signals corresponding to the user's movements may be recorded as the user performs the task that the user was instructed to perform. The sensor signals may be recorded by any suitable number and/or type of sensors located in any suitable location(s) to detect the user's movements that are relevant to the task performed. For example, after a user is instructed to perform a task with the fingers of the user's right hand, the sensor signals may be recorded by multiple neuromuscular sensors arranged (e.g., circumferentially) around the user's lower right arm to detect muscle activity in the lower right arm that causes the right hand movements and one or more IMU sensors arranged to predict the joint angle of the user's arm relative to the user's torso. As another example, after a user is instructed to perform a task with the user's leg (e.g., to kick an object), sensor signals may be recorded by multiple neuromuscular sensors arranged (e.g., circumferentially) around the user's leg to detect muscle activity in the leg that causes the movements of the foot and one or more IMU sensors arranged to predict the joint angle of the user's leg relative to the user's torso.

In some examples, the sensor signals obtained in operation 502 may correspond to signals from one type of sensor (e.g., one or more IMU sensors or one or more neuromuscular sensors) and an inferential model may be trained based on the sensor signals recorded using the particular type of sensor, resulting in a sensor-type specific trained inferential model. For example, the obtained sensor signals may include a plurality of EMG sensor signals arranged (e.g., circumferentially) around the lower arm or wrist of a user and the inferential model may be trained to predict musculoskeletal position information for movements of the wrist and/or hand during performance of a task such as grasping and turning an object such as a game controller or a doorknob.

In embodiments that provide predictions based on multiple types of sensors (e.g., IMU sensors, EMG sensors, MMG sensors, SMG sensors, etc.), a separate inferential model may be trained for each of the different types of sensors and the outputs of the sensor-type specific models may be combined to generate a musculoskeletal representation of the user's body. In some examples, the sensor signals obtained in operation 502 from two or more different types of sensors may be provided to a single inferential model that is trained based on the signals recorded from the different types of sensors. For example, an IMU sensor and a plurality of EMG sensors may be arranged on a wearable device configured to be worn around the forearm of a user, and signals recorded by the IMU and EMG sensors are collectively provided as inputs to an inferential model, as discussed in more detail below.

In some examples, a user may be instructed to perform a task multiple times and the sensor signals and position information may be recorded for each of multiple repetitions of the task by the user. In some examples, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task according to the instructions. When sensor signals are collected from multiple users and combined to generate an inferential model, an assumption may be made that different users employ similar musculoskeletal positions to perform the same movements. Collecting sensor signals and position information from a single user performing the same task repeatedly and/or from multiple users performing the same task one or multiple times facilitates the collection of sufficient training data to generate an inferential model that may accurately predict musculoskeletal position information associated with performance of the task.

In some examples, a user-independent inferential model may be generated based on training data corresponding to the recorded signals from multiple users, and as the system is used by a user, the inferential model may be trained based on recorded sensor data such that the inferential model learns the user-dependent characteristics to refine the prediction capabilities of the system and increase the prediction accuracy for the particular user.

In some examples, the plurality of sensor signals may include signals recorded for a user (or each of multiple users) performing each of multiple tasks one or multiple times. For example, a user may be instructed to perform each of multiple tasks (e.g., grasping an object, pushing an object, pulling open a door, etc.) and signals corresponding to the user's movements may be recorded as the user performs each of the multiple tasks the user(s) were instructed to perform. Collecting such signal data may facilitate developing an inferential model for predicting musculoskeletal position information associated with multiple different actions that may be performed by the user. For example, training data that incorporates musculoskeletal position information for multiple actions may facilitate generating an inferential model for predicting which of multiple possible movements a user may be performing.

As discussed herein, the sensor data obtained at operation 502 may be obtained by recording sensor signals as each of one or multiple users perform each of one or more tasks one or more times. In operation 504, ground truth data (e.g., label time series data) may be obtained by multiple sensors including, without limitation, an optical sensor, an inertial measurement sensor, a mutual magnetic induction measurement sensor, a pressure sensor, or a combination thereof. The ground truth data may indicate a body part state of the user(s). For example, as the user(s) perform the task(s), position information describing the spatial position of different body segments during performance of the task(s) may be obtained in operation 504. In some examples, the position information may be obtained using one or more external devices or systems that track the position of different points on the body during performance of a task. For example, a motion capture system, a laser scanner, a device to measure mutual magnetic induction, some other system configured to capture position information, or a combination thereof may be used. As one non-limiting example, a plurality of position sensors may be placed on segments of the fingers of the hand of a user and a motion capture system may be used to determine the spatial location of each of the position sensors as the user performs a task such as grasping an object. Additionally or alternatively, neuromuscular signals may be obtained at operation 502 and may be used alone or in combination with one or more images from the motion capture system or IMU signals to determine the spatial location(s) of user body parts (e.g., fingers) as the user performs a task. The sensor data obtained at operation 502 may be recorded simultaneously with recording of the position information obtained in operation 504. In this example, the position information indicating the position of each finger segment overtime as the grasping motion is performed is obtained.

Method 500 may proceed to operation 506, in which the sensor signals obtained in operation 502 and/or the position information obtained in operation 504 are optionally processed. For example, the sensor signals and/or the position information signals may be processed using, without limitation, amplification, filtering, rectification, other types of signal processing, or a combination thereof.

Method 500 may proceed to operation 508, in which musculoskeletal position characteristics are determined based on the position information (as collected in operation 504). In some examples, rather than using recorded spatial (e.g., x, y, z) coordinates corresponding to the position sensors as training data to train the inferential model, a set of derived musculoskeletal position characteristic values are determined based on the recorded position information, and the derived values are used as training data for training the inferential model. For example, using information about constraints between connected pairs of rigid segments in the articulated rigid body model, the position information may be used to determine joint angles between each connected pair of rigid segments at each of multiple time points during performance of a task. Accordingly, the position information obtained in operation 504 may be represented by a vector of n joint angles at each of a plurality of time points, where n is the number of joints or connections between segments in the articulated rigid body model.

Method 500 may proceed to operation 510, in which the time series information obtained at operations 502 and 508 may be combined to create training data used for training an inferential model. The obtained data may be combined using any suitable method. In some examples, each of the sensor signals obtained at operation 502 may be associated with a task or movement within a task corresponding to the musculoskeletal position characteristics (e.g., joint angles) determined based on the positional information obtained in operation 504 as the user performed the task or movement. In this way, the sensor signals may be associated with musculoskeletal position characteristics (e.g., joint angles) and the inferential model may be trained to predict that the musculoskeletal representation will be characterized by particular musculoskeletal position characteristics between different body segments when particular sensor signals are recorded during performance of a particular task.

In embodiments including sensors of different types (e.g., IMU sensors and neuromuscular sensors) that are configured to simultaneously record different types of movement information (e.g., position information, velocity information, acceleration information) during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the inferential model corresponds to time series data at the same time resolution (e.g., the time period between samples). Resampling at least some of the sensor data may be performed using any suitable method including, without limitation, using interpolation for up-sampling sensor data and using decimation for down-sampling sensor data.

Additionally or alternatively, some embodiments may employ an inferential model configured to accept multiple inputs asynchronously. For example, the inferential model may be configured to model the distribution of the "missing" values in the input data having a lower sampling rate. Additionally or alternatively, the timing of training of the inferential model may occur asynchronously as input from multiple sensor data measurements becomes available (e.g., after signal conditioning) as training data.

Combining the time series information obtained at operations 502 and 508 to create training data for training an inferential model at operation 510 may include generating one or more training datasets. As described herein, the one or more training datasets may be generated by time-shifting the sensor signals obtained at operation 502 or by time-shifting the ground truth data obtained at operation 504 or 508 by one or more time intervals.

Method 500 may proceed to operation 512, in which an inferential model for predicting musculoskeletal position information may be trained using the training data generated at operation 510. The inferential model being trained may use a sequence of data sets as an input, and each of the data sets in the sequence may include an n-dimensional vector of sensor data. The inferential model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the inferential model may use as input a sequence of vectors $\{xk|1\leq k\leq K\}$ generated using measurements obtained at time points t1, t2, . . . , tK, where the ith component of vector xj may be a value measured by the ith sensor at time tj and/or derived from the value measured by the ith sensor at time tj. In another non-limiting example, a derived value provided as input to the inferential model may include features extracted from the data for all, or a subset of, the sensors at and/or prior to time tj (e.g., a covariance matrix, a power spectrum, any other suitable derived representation, or a combination thereof). Based on such input, the inferential model may provide output indicating a probability that a musculoskeletal representation of the user's body will be characterized by a set of musculoskeletal position characteristics. As one non-limiting example, the inferential model may be trained to predict a set of joint angles for segments in the fingers of a hand overtime as a user grasps an object. In this example, the trained inferential model may output, a set of predicted joint angles for joints in the hand corresponding to the sensor input.

In some examples, the inferential model may be a neural network. In some examples, the inferential model may be a recurrent neural network. The recurrent neural network may be a long short-term memory (LSTM) neural network. However, the recurrent neural network is not limited to an LSTM neural network and may have any other suitable architecture. For example, the recurrent neural network may be, without limitation, a fully recurrent neural network, a recursive neural network, a variational autoencoder, a Hopfield neural network, an associative memory neural network, an Elman neural network, a Jordan neural network, an echo state neural network, a second order recurrent neural network, any other suitable type of recurrent neural network, or a combination thereof. In some examples, neural networks that are not recurrent neural networks may be used. For example, deep neural networks, convolutional neural networks, feedforward neural networks, or a combination thereof may be used.

In some examples in which the inferential model is a neural network, the output layer of the neural network may provide a set of output values corresponding to a respective set of possible musculoskeletal position characteristics (e.g., joint angles). In this example, the neural network may operate as a non-linear regression model configured to predict musculoskeletal position characteristics from raw and/or processed (e.g., conditioned) sensor measurements. In some examples, other suitable non-linear regression models may be used instead of a neural network, as the present disclosure is not limited in this respect.

In some examples, the neural network may be implemented based on multiple and/or different types of topologies and/or architectures including deep neural networks with fully connected (e.g., dense) layers, Long Short-Term Memory (LSTM) layers, convolutional layers, Temporal Convolutional Layers (TCL), other suitable types of deep neural network topology and/or architectures, or a combination thereof. The neural network may have different types of output layers including, without limitation, output layers with logistic sigmoid activation functions, hyperbolic tangent activation functions, linear units, rectified linear units, other suitable types of nonlinear units, or a combination thereof. In some examples, the neural network may be configured to represent the probability distribution over n different classes via a softmax function. In some examples, the neural network may include an output layer that provides a parameterized distribution (e.g., a mean and/or a variance of a Gaussian distribution).

Embodiments of the present disclosure are not limited to using neural networks as other types of inferential models may be employed. In some examples, the inferential model may include, without limitation, a hidden Markov model, a Markov switching model that allows switching among different dynamic systems, dynamic Bayesian networks, any other suitable graphical model having a temporal component, or a combination thereof. Any such inferential model may be trained at operation 512 using the sensor data obtained at operation 502.

As another example, the inferential model may use as input features derived from the sensor data obtained at operation 502. In such embodiments, the inferential model may be trained at operation 512 using features extracted from the sensor data obtained at operation 502. The inferential model may include, without limitation, a support vector machine, a Gaussian mixture model, a regression-based classifier, a decision tree classifier, a Bayesian classifier, any other suitable classifier, or a combination thereof. Input features to be provided as training data to the inferential model may be derived from the sensor data obtained at operation 502 using any suitable method. For example, the sensor data may be analyzed as time series data using, without limitation, wavelet analysis techniques (e.g., a continuous wavelet transform, a discrete-time wavelet transform, etc.), Fourier-analysis techniques (e.g., short-time Fourier transform, discrete-time Fourier transform, Fourier transform, etc.), any other suitable type of time-frequency analysis technique, or a combination thereof. As one non-limiting example, the sensor data may be transformed using a wavelet transform and the resulting wavelet coefficients may be provided as inputs to the inferential model.

In some examples, at operation 512, values for parameters of the inferential model may be estimated from the training data generated at operation 510. For example, when the inferential model is a neural network, parameters of the neural network (e.g., weights) may be estimated from the training data. Parameters of the inferential model may be estimated using, without limitation, gradient descent, stochastic gradient descent, any other suitable iterative optimization technique, or a combination thereof. In embodiments in which the inferential model is a recurrent neural network (e.g., an LSTM neural network), the inferential model may be trained using stochastic gradient descent and backpropagation through time. The training may employ a cross-entropy loss function and/or any other suitable loss function, as the present disclosure is not limited in this respect.

Method 500 may proceed to operation 514, in which the trained inferential model may be stored (e.g., in a datastore, a local database, a remote cloud database, a memory, etc.). The trained inferential model may be stored using any suitable format, device(s) and/or method. In this way, the inferential model generated during execution of method 500 may be used at a later time. For example, a state prediction system may be configured using the trained inferential model to predict body part state from neuromuscular activity time series data (e.g., predict musculoskeletal position information such as joint angles from a given set of input sensor data), as described below.

In some examples, sensor signals may be recorded from a plurality of sensors (e.g., arranged on or near the surface of a user's body) that record activity associated with movements of the body during performance of a task. The recorded signals may be optionally processed (e.g., conditioned) and provided as input to an inferential model trained using one or more techniques described herein in reference to FIG. 5. In some examples, autonomous signals may be continually recorded, and the continuously recorded signals (raw or processed) may be continuously and/or periodically provided as input to the trained inferential model for prediction of musculoskeletal position information (e.g., joint angles) for the given set of input sensor data. As discussed herein, in some examples, the trained inferential model may be a user-independent model trained based on autonomous sensor and position information measurements from a plurality of users. In some examples, the trained model may be a user-dependent model trained on data recorded from the individual user from which the data associated with the sensor signals is also acquired.

After the trained inferential model receives the sensor data as a set of input parameters, the predicted musculoskeletal position information may be output from the trained inferential model. As discussed herein, in some examples, the predicted musculoskeletal position information may include a set of musculoskeletal position information values (e.g., a set of joint angles) for a multi-segment articulated rigid body model representing at least a portion of the user's body. In some examples, the musculoskeletal position information may include a set of probabilities that the user is performing one or more movements from a set of possible movements.

In some examples, after musculoskeletal position information is predicted, a computer-based musculoskeletal representation of the user's body may be generated based, at least in part, on the musculoskeletal position information output from the trained inferential model. The computer-based musculoskeletal representation may be generated using any suitable method. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment, the palm of the hand may be represented by a third rigid body segment, and each of the fingers on the hand may be represented by at least one rigid body segment. A set of joint angles between connected rigid body segments in the musculoskeletal model may define the orientation of each of the connected rigid body segments relative to each other and a reference frame, such as the torso of the body. As new sensor data is measured and processed by the inferential model to provide new predictions of the musculoskeletal position information (e.g., an updated set of joint angles), the computer-based musculoskeletal representation of the user's body may be updated based on the updated set of joint angles determined based on the output of the inferential model. In this way, the computer-based musculoskeletal representation may be dynamically updated in real-time as sensor data is continuously recorded.

The computer-based musculoskeletal representation may be represented and stored using any suitable devices and methods. For example, the computer-based musculoskeletal representation may be stored in memory (e.g., memory 821 of FIG. 8). Although referred to herein as a "musculoskeletal" representation to reflect that muscle activity may be associated with the representation, some musculoskeletal representations may correspond to skeletal structures, muscular structures, or a combination of skeletal structures and muscular structures in the body.

In some examples, direct measurement of neuromuscular activity and/or muscle activity underlying the user's movements may be combined with the generated musculoskeletal representation. Measurements from a plurality of sensors placed on a user's body may be used to create a unified representation of muscle recruitment by superimposing the measurements onto a dynamically-posed skeleton. In some examples, muscle activity sensed by neuromuscular sensors and/or information derived from the muscle activity (e.g., force information) may be combined with the computer-generated musculoskeletal representation in real time.

Figure 6:
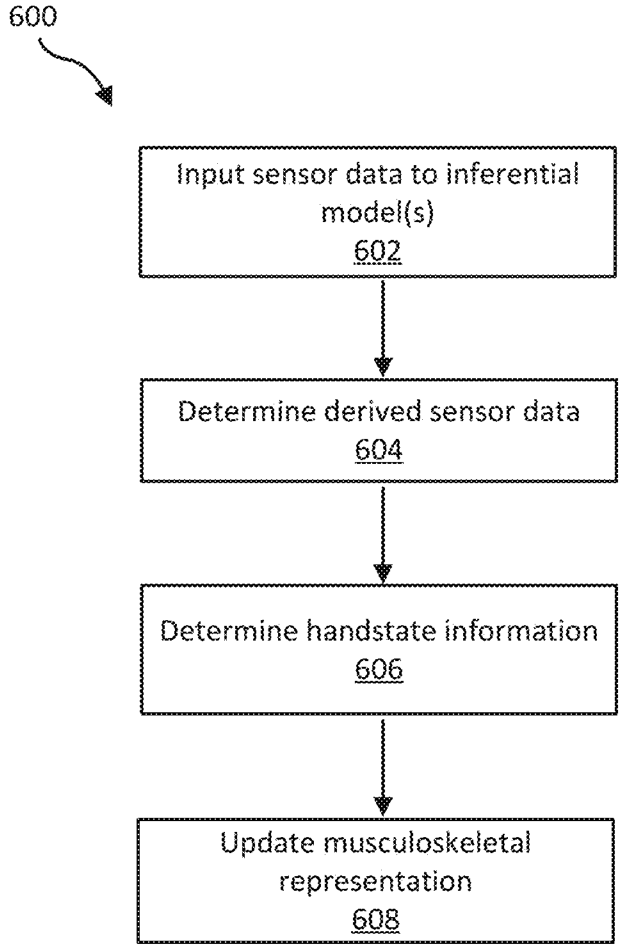
FIG. 6 is an illustration of a flowchart of an example method for determining body state information, in accordance with embodiments of the present disclosure.

FIG. 6 illustrates a method 600 for determining body state information based on recorded sensor data in accordance embodiments of the present disclosure. Although the operations of method 600 are shown in FIG. 6 as being performed in a certain order, the operations of method 600 may be performed in any order. In operation 602, sensor data may be recorded by one or more sensors and provided as input to one or more trained inferential models used to predict a body state, as described above. In some examples, the sensors may include a plurality of neuromuscular sensors (e.g., EMG sensors) arranged on a wearable device worn by a user. For example, EMG sensors may be arranged (e.g., circumferentially) on an elastic band configured to be worn around a wrist or forearm of the user to record neuromuscular signals from the user as the user exerts force and/or performs various movements, poses, and/or gestures. Examples of wearable devices that may be used in accordance with embodiments of the present disclosure include wearable device 700 of FIG. 7, 800 of FIG. 8, 1320 of FIG. 13, 1404 of FIG. 14, or 1530 of FIG. 15, which are described in more detail below.

Additionally or alternatively, some embodiments may include one or more auxiliary sensors configured to continuously record auxiliary signals that may also be provided as input to the one or more trained inferential models. Examples of auxiliary sensors may include, without limitation, IMU sensors, imaging devices, radiation detection devices (e.g., laser scanning devices), heart rate monitors, any other type of biosensors configured to continuously record biophysical information from the user during performance of one or more movements or gestures, or a combination thereof.

Method 600 may proceed to operation 604, in which derived signal data is optionally determined based on the signals recorded by the sensors. For example, accelerometer data recorded by one or more IMU sensors may be integrated and/or filtered to determine derived signal data associated with one or more muscles during performance of a gesture. The derived signal data may be provided as input to the trained inferential model(s) in addition to, or as an alternative to, raw signal data or otherwise processed raw signal data recorded by the sensors.

Method 600 may proceed to operation 606, in which body state information is determined based on the output of the trained inferential model(s). Gestures performed by the user may include discrete gestures, such as placing the user's hand palm down on a table, and/or continuous movement gestures, such as waving a finger back and forth. The neuromuscular signals may be recorded continuously during user movements including during performance of the gesture and may be provided continuously as input to the trained inferential model, resulting in real-time estimation of the positions and/or forces of the user's body part (e.g., body state information) as output of the trained inferential model(s). Method 600 may proceed to operation 608, in which the real-time body state predictions output from the trained inferential model(s) are used to update a musculoskeletal representation associated with a hand. In some examples, the musculoskeletal representation represents rigid segments within a hand and the joints connecting the rigid segments. In other embodiments, the musculoskeletal representation may include at least some rigid segments corresponding to an arm connected to the hand. Accordingly, the phrase "musculoskeletal representation associated with a hand" should be understood to include both musculoskeletal representations of the hand and/or musculoskeletal representations that include a representation of the hand and at least a portion of an arm connected to the hand.

Figure 7:
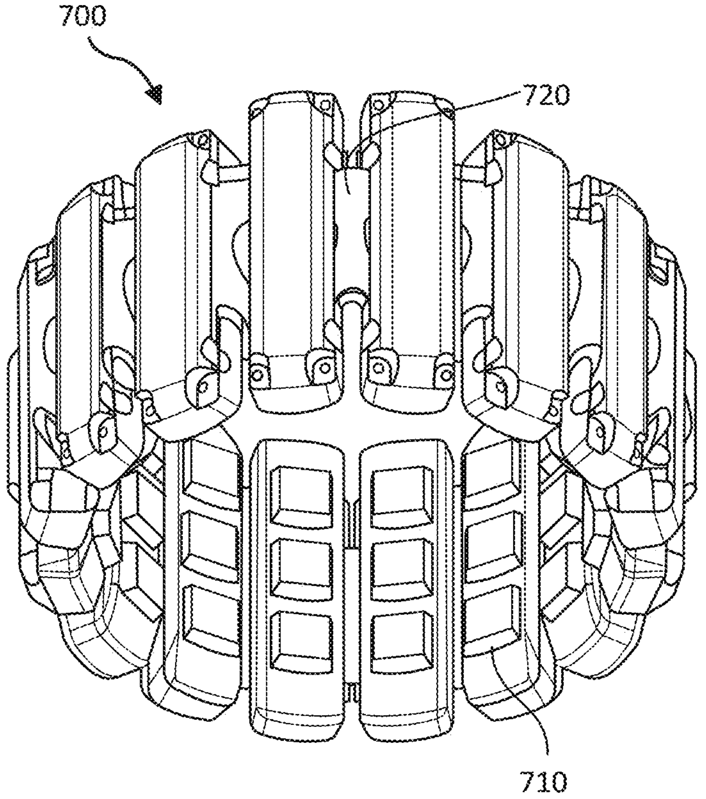
FIG. 7 is an illustration of a perspective view of an example wearable device with sensors, in accordance with embodiments of the present disclosure.

FIG. 7 illustrates a perspective view of an example wearable device 700 that includes sixteen sensors 710 (e.g., EMG sensors) arranged circumferentially around an elastic band 720 configured to be worn around a body part of a user (e.g., a user's lower arm or wrist). As shown, sensors 710 may be arranged circumferentially around elastic band 720. Any suitable number of sensors 710 may be used. The number and arrangement of sensors 710 may depend on the particular application for which the wearable device is used. For example, a wearable armband or wristband may be used to generate control information for controlling an artificial-reality system, a robot, a vehicle, scrolling through text, controlling a virtual avatar, or any other suitable control task.

In some examples, sensors 710 may include a set of neuromuscular sensors (e.g., EMG sensors). In other embodiments, sensors 710 may include a set of neuromuscular sensors and at least one "auxiliary" sensor configured to record (e.g., periodically, continuously, or on demand) auxiliary signals. Examples of auxiliary sensors may include, without limitation, other sensors such as IMU sensors, microphones, imaging sensors (e.g., a camera), radiation-based sensors, laser-scanning devices, or other types of sensors such as a heart-rate monitor.

In some examples, the output of one or more of the sensing components (e.g., sensors 710) may be processed using hardware signal processing circuitry (e.g., to perform amplification, filtering, and/or rectification). In some examples, at least some signal processing of the output of the sensing components may be performed in software. Thus, signal processing of signals sampled by the sensors may be performed in hardware, software, or by any suitable combination of hardware and software, as aspects of the technology described herein are not limited in this respect. Non-limiting examples of a signal processing system used to process data recorded from sensors 710 are discussed in more detail below in reference to FIG. 8.

Figure 8:
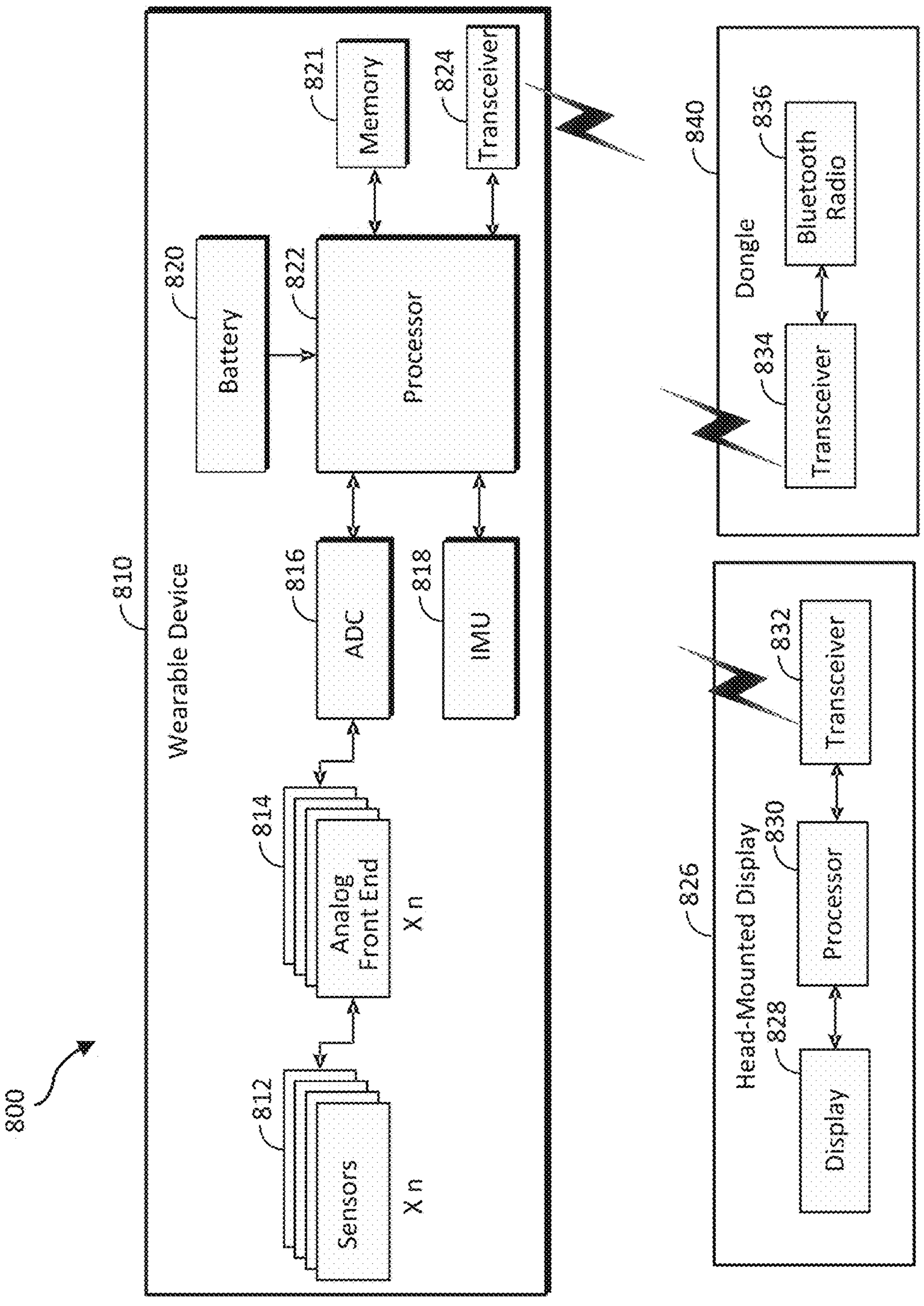
FIG. 8 is an illustration of an example block diagram of a wearable device and a head-mounted display, in accordance with embodiments of the present disclosure.

FIG. 8 illustrates an example block diagram of a wearable system 800 with multiple sensors, in accordance with embodiments of the present disclosure. As shown in FIG. 8, wearable system 800 may include a wearable device 810, a head-mounted display (HMD) 826 and a dongle 840. Wearable device 810, HMD 826, and dongle 840 may communicate to each other via wireless communication (e.g., via Bluetooth™ or other suitable short-range wireless communication technology) or wired communication. Wearable device 810 may include sensors 812 (e.g., EMG sensors), examples of which are described above in reference to FIGS. 5 and 6. Data from sensors 812 and/or data from sensors of HMD 826 may be used to generate the ground truth data (e.g., label time series data). The output of sensors 812 may be provided to analog front end 814 that may be configured to perform analog signal processing (e.g., noise reduction, filtering, amplification, etc.) on the recorded signals from sensors 812. The processed analog signals from analog front end 814 may be provided to analog-to-digital converter (ADC) 816, which may convert the analog signals to digital signals so that the signals may be processed by processor 822 and/or processor 830 of HMD 826.

Processor 822 and/or processor 830 (e.g., a microcontroller, a central processing unit, a digital signal processor, a graphics processor, etc.) may execute instructions stored in memory 821 that implement the methods of the present disclosure including, without limitation, generating one or more training datasets by time-shifting neuromuscular activity time series data and/or label time series data received from sensors 812 by one or more time intervals, training one or more inferential models based on the neuromuscular activity time series data using the one or more training datasets, and configuring a state prediction system to predict the body part state of a user using the trained inferential models. As shown in FIG. 8, processor 822 may also receive inputs from other sensors (e.g., IMU sensor 818, an image sensor, etc.) that may be configured to track a position of a body part of the user. Power may be provided to processor 822 and the other electronic components of wearable device 810 by battery 820. The output of the signal processing performed by processor 822 (e.g., a musculoskeletal representation of the user's body) may be provided to transceiver 824 for transmission to dongle 840 and/or HMD 826.

Dongle 840 may include transceiver 834 configured to communicate with transceiver 824 of wearable device 810 and/or transceiver 832 of HMD 826. Communication between transceivers 834, 824, and 828 may use any suitable wireless technology and protocol, non-limiting examples of which include WiFi, Near Field Communication, and/or Bluetooth™. Bluetooth™ radio 836 may be configured to act as a gateway device to coordinate communication among various wearable devices of system 800 including HMD 826 and wearable device 810. In additional embodiments, wearable device 810, HMD 826, and/or dongle 840 may communicate with each other via a wired connection.

Signals received from sensors 812 may be processed using inferential model(s) as described above to predict a body part state of the user's body. HMD 826 may receive the body part state from wearable device 810 and/or instructions executed on processor 830 of HMD 826 may determine the body part state using the trained one or more inferential models. Processor 830 of HMD 826 may generate a visual representation of the body part state of a user of wearable device 810 using the determined body part state. The visual representation of the user's body part state may be displayed to the user on display 828 of HMD 826. The visual representation of the user's body part state displayed to the user wearing HMD 826 may be in conjunction with an artificial-reality application. In some examples, HMD 826 may be eyewear device 1102 of FIG. 11, virtual-reality system 1200 of FIG. 12, HMD 1402 of FIG. 14, or augmented-reality glasses 1520 of FIG. 15

Figure 9:
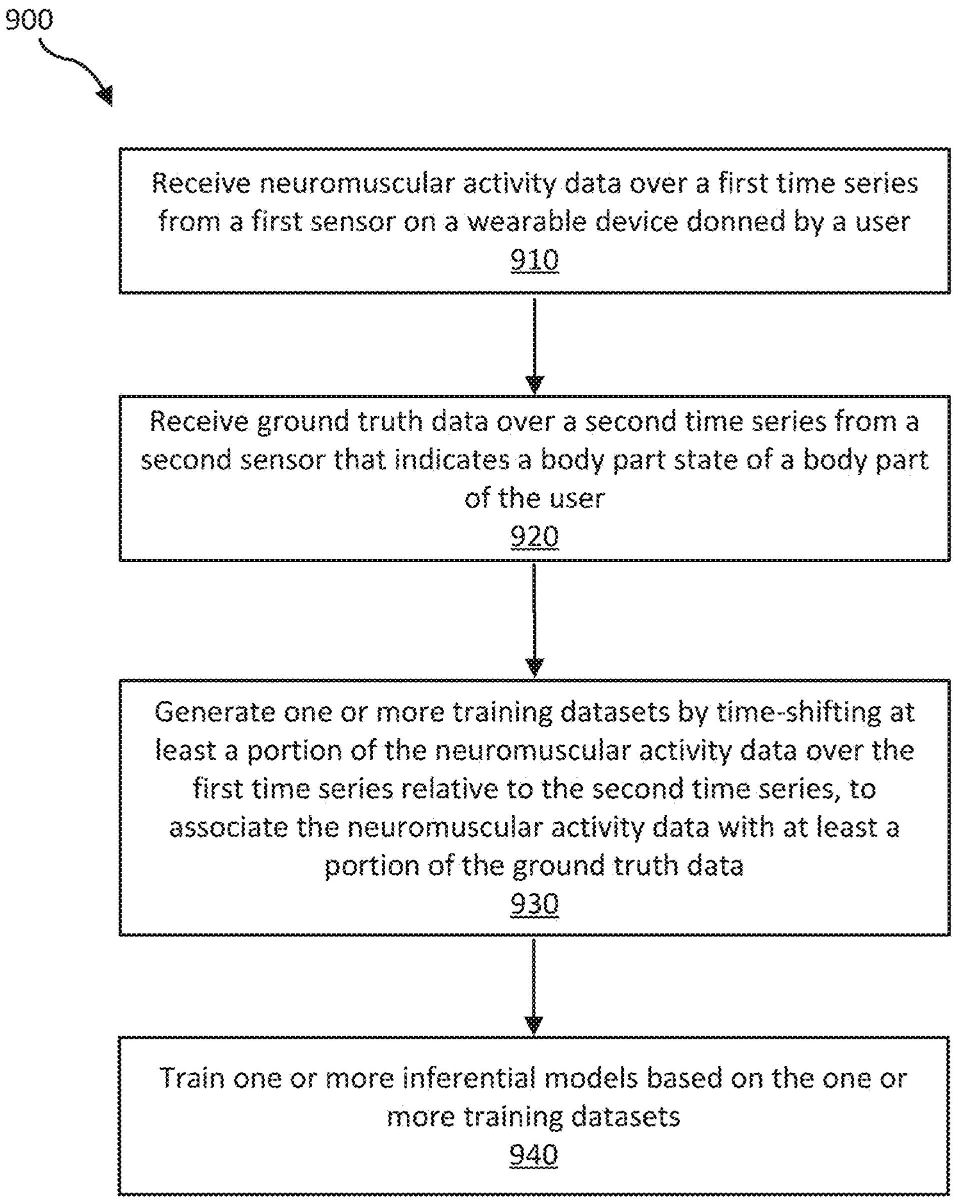
FIG. 9 is an illustration of a flowchart of an example method for predicting a body state based on neuromuscular data, in accordance with embodiments of the present disclosure.

FIG. 9 is a flow diagram illustrating an example method 900 of predicting a body state based on neuromuscular data. At operation 910, method 900 may include receiving neuromuscular activity data over a first time series from a first sensor on a wearable device donned by a user. Operation 910 may be performed in a variety of ways, for example, neuromuscular sensors of a wearable device may periodically generate time series data that indicates neuromuscular activity of the user.

At operation 920, method 900 may include receiving ground truth data from a second, different sensor that indicates a body part state of a body part of the user over a second time series. Operation 920 may be performed in a variety of ways. For example, the ground truth data may be label time series data that indicates a body part state of the user as the user performs a task. The body part state may be or include position information corresponding to the spatial position of different body segments of the user during performance of the task. The position information may be obtained using one or more external devices (e.g., a camera, an IMU) that tracks the position of different points on the user's body during performance of the task.

At operation 930, method 900 may include generating one or more training datasets by time-shifting at least a portion of the neuromuscular activity data over the first time series relative to the second time series, to associate the neuromuscular activity data with at least a portion of the ground truth data. Operation 930 may be performed in a variety of ways. For example, an appropriate time interval may be identified by generating multiple training datasets with multiple temporal shifts. The temporal shifts may be different respective time intervals based on factors including electromechanical delay time of the user (e.g., a user's muscle response time) and/or a known characteristic latency of the system. The time shift interval may determine system latency and may be based on the accuracy requirements of the task. For example, a task prioritizing precise movement (e.g., tele-surgery) may accept greater latency in exchange for greater accuracy, while a task prioritizing rapid movement (e.g., a video game) may accept lower accuracy in exchange for lower latency.

At operation 940, method 900 may include training one or more inferential models based on the one or more training datasets. Operation 940 may be performed in a variety of ways. For example, the inferential models may be trained using a sequence of data sets as input, and each of the data sets in the sequence may include an n-dimensional vector of sensor data (e.g., sensor data from neuromuscular sensors, IMU sensors, etc.). The inferential model may provide output that indicates, for each task or movement performed by a user, the likelihood that the musculoskeletal representation of the user's body will be characterized by a set of musculoskeletal position characteristics. The inferential model may be used to predict body states and create a musculoskeletal representation associated with body parts of a user. A visual representation of the body part of the user may be displayed to the user. For example, a visual representation of the body part of the user may be displayed to the user on a head-mounted display.

Accordingly, the present disclosure includes systems, methods, and apparatuses that may be employed to predict a body part state of a user. For example, an artificial-reality system may include a wearable device(s) that includes sensors and systems configured to predict a body part state of the user. A virtual representation of the predicted state of the body part (e.g., a hand) may be displayed to the user on an HMD. The HMD may also display a virtual object (e.g., a game controller, a sports object) being held by the virtual representation of the hand. The virtual representation of the predicted state of the body part displayed to the user in connection with audio/video content of an artificial-reality application may create a more compelling artificial-reality experience compared to conventional systems, such as by reducing a latency between predicted and actual body movements.

The above-described embodiments may be implemented in any of numerous ways. For example, the embodiments may be implemented using hardware, software or a combination thereof. When implemented in software, the software code may be executed on any suitable processor or collection of processors, whether provided in a single computer or distributed among multiple computers. It should be appreciated that any component or collection of components that perform the functions described above may be generically considered as one or more controllers that control the above-discussed functions. The one or more controllers may be implemented in numerous ways, such as with dedicated hardware or with one or more processors programmed using microcode or software to perform the functions recited above.

In this respect, it should be appreciated that one implementation of the embodiments of the present invention includes at least one non-transitory computer-readable storage medium (e.g., a computer memory, a portable memory, a compact disk, etc.) encoded with a computer program (e.g., a plurality of instructions), which, when executed on a processor, performs the above-discussed functions of the embodiments of the present invention. The computer-readable storage medium may be transportable such that the program stored thereon may be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that may be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
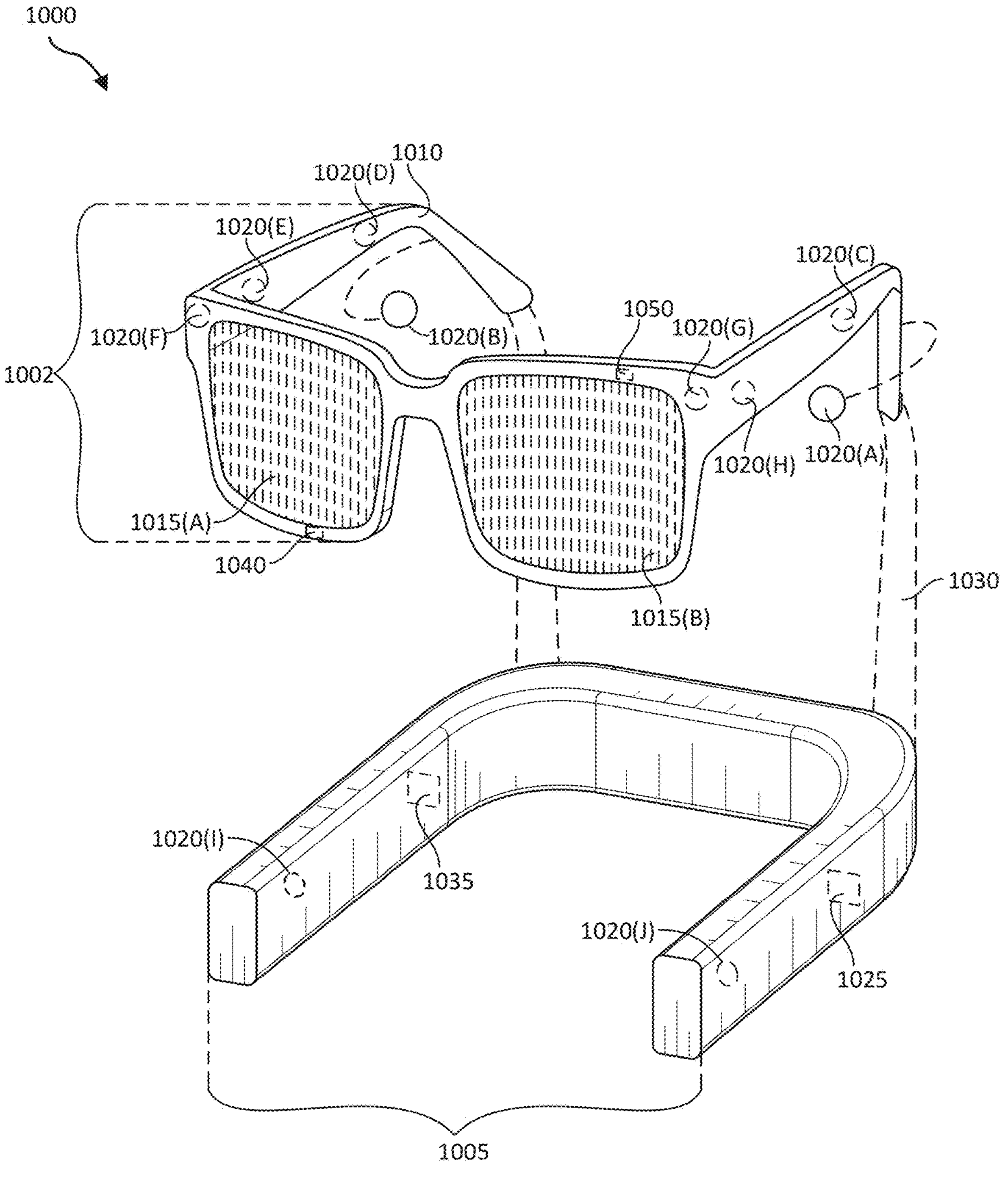
FIG. 10 is an illustration of example augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as a neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a standalone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

A power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 1000 and/or virtual-reality system 1100 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 101000, and/or virtual-reality system 1100 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 11, output audio transducers 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 1000 and 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG.

12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, a composite material, etc.

Figure 12:
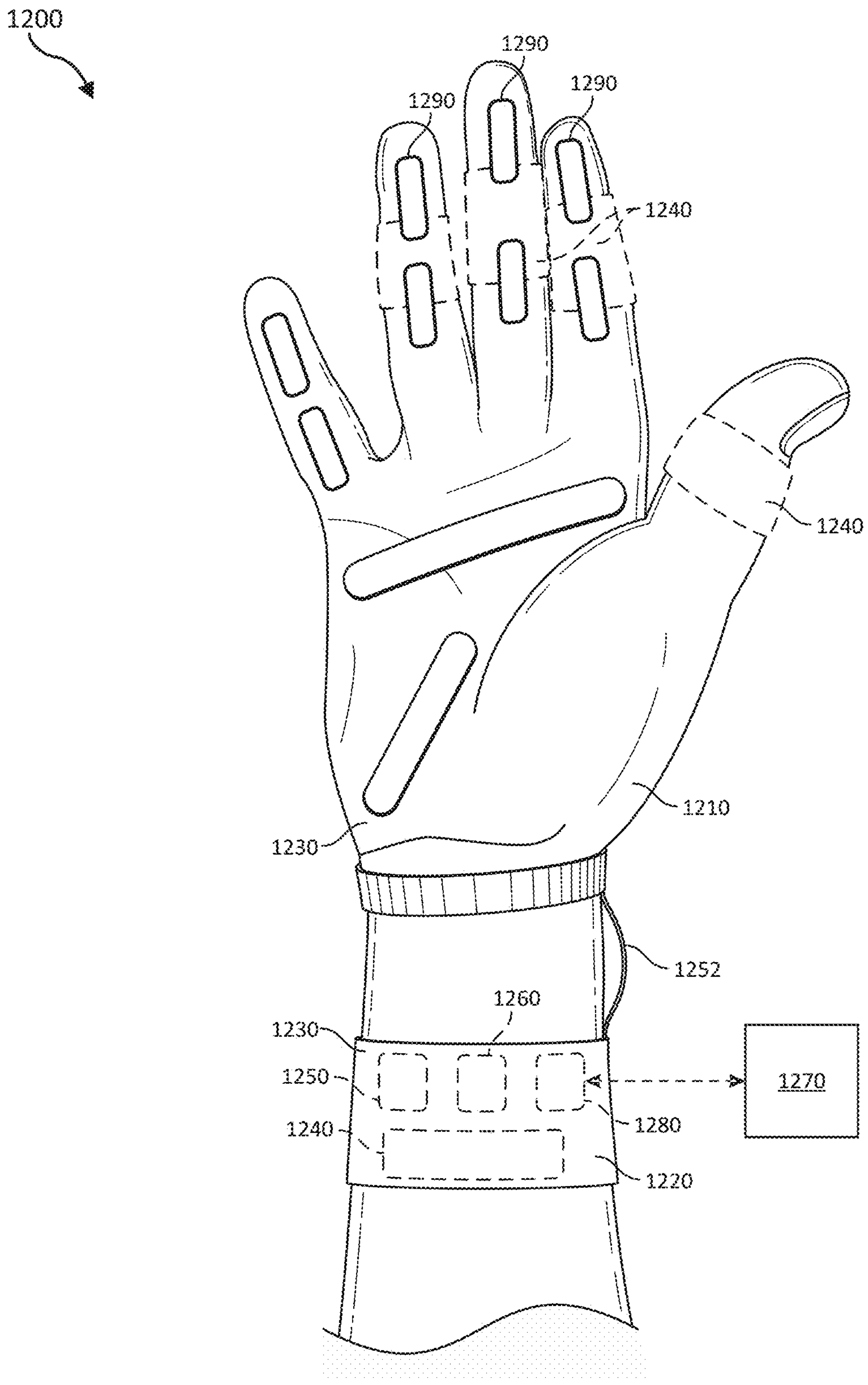
FIG. 12 is an illustration of example haptic devices that may be used in connection with embodiments of this disclosure.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned to be against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. A communications interface 1280 may enable communications between vibrotactile system 1200 and the other device or system 1270 via a wireless (e.g., Wi-Fi, Bluetooth, cellular, radio, etc.) link or a wired link. If present, communications interface 1280 may be in communication with processor 1260, such as to provide a signal to processor 1260 to activate or deactivate one or more of vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
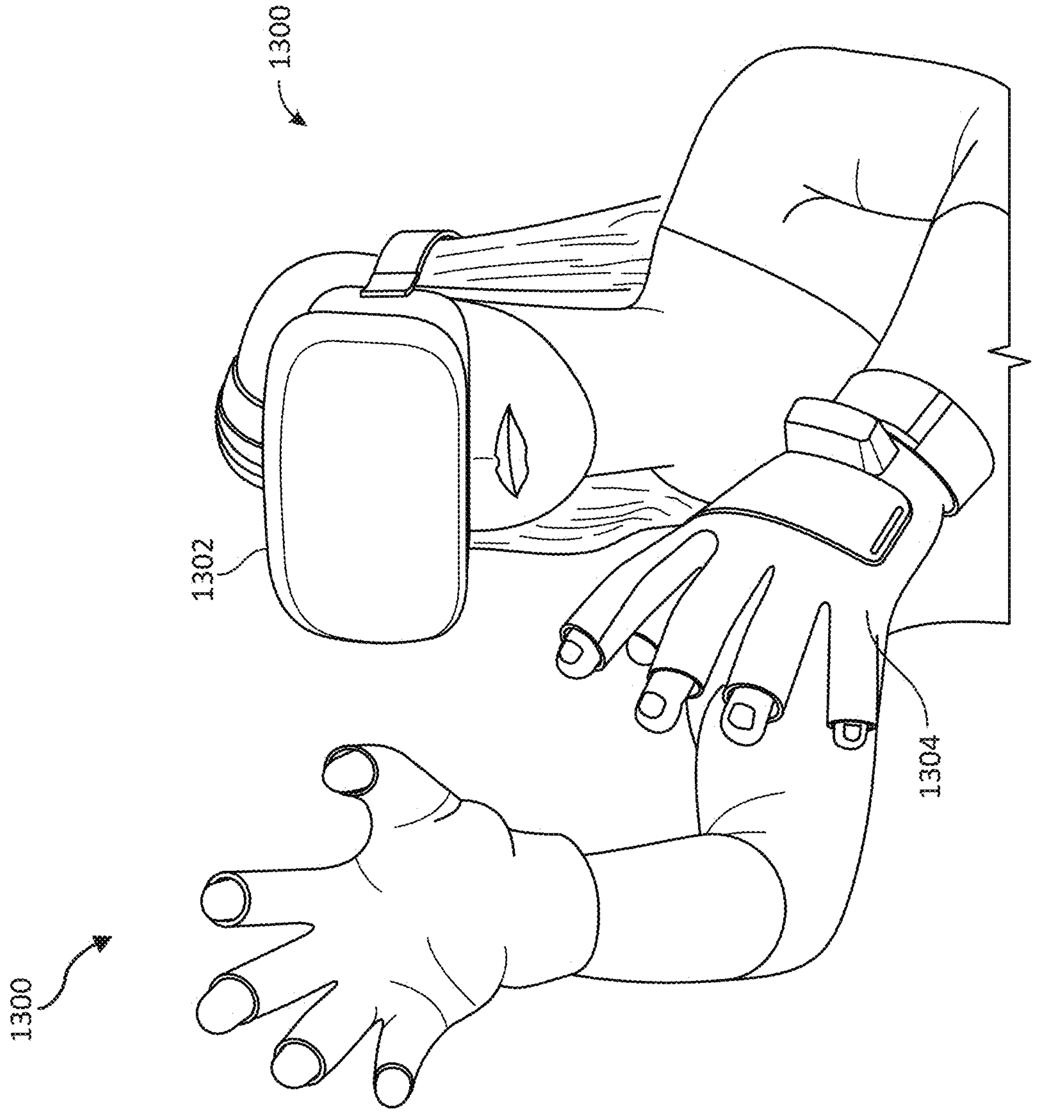
FIG. 13 is an illustration of an example virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 11:
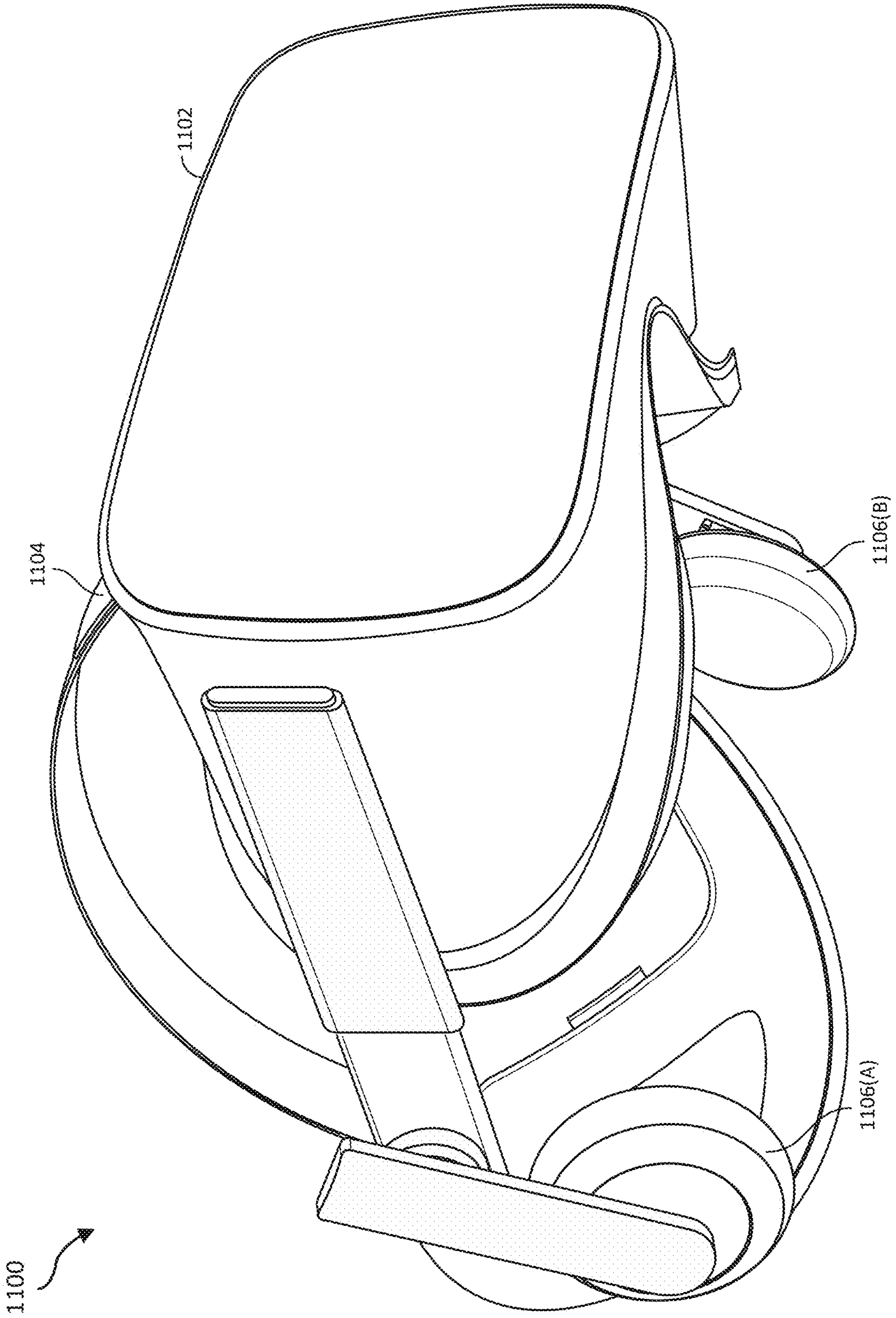
FIG. 11 is an illustration of an example virtual-reality headset that may be used in connection with embodiments of this disclosure.

Head-mounted display 1302 generally represents any type or form of virtual-reality system, such as virtual-reality system 1100 in FIG. 11. Haptic device 1304 generally represents any type or form of wearable device, worn by a use of an artificial-reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
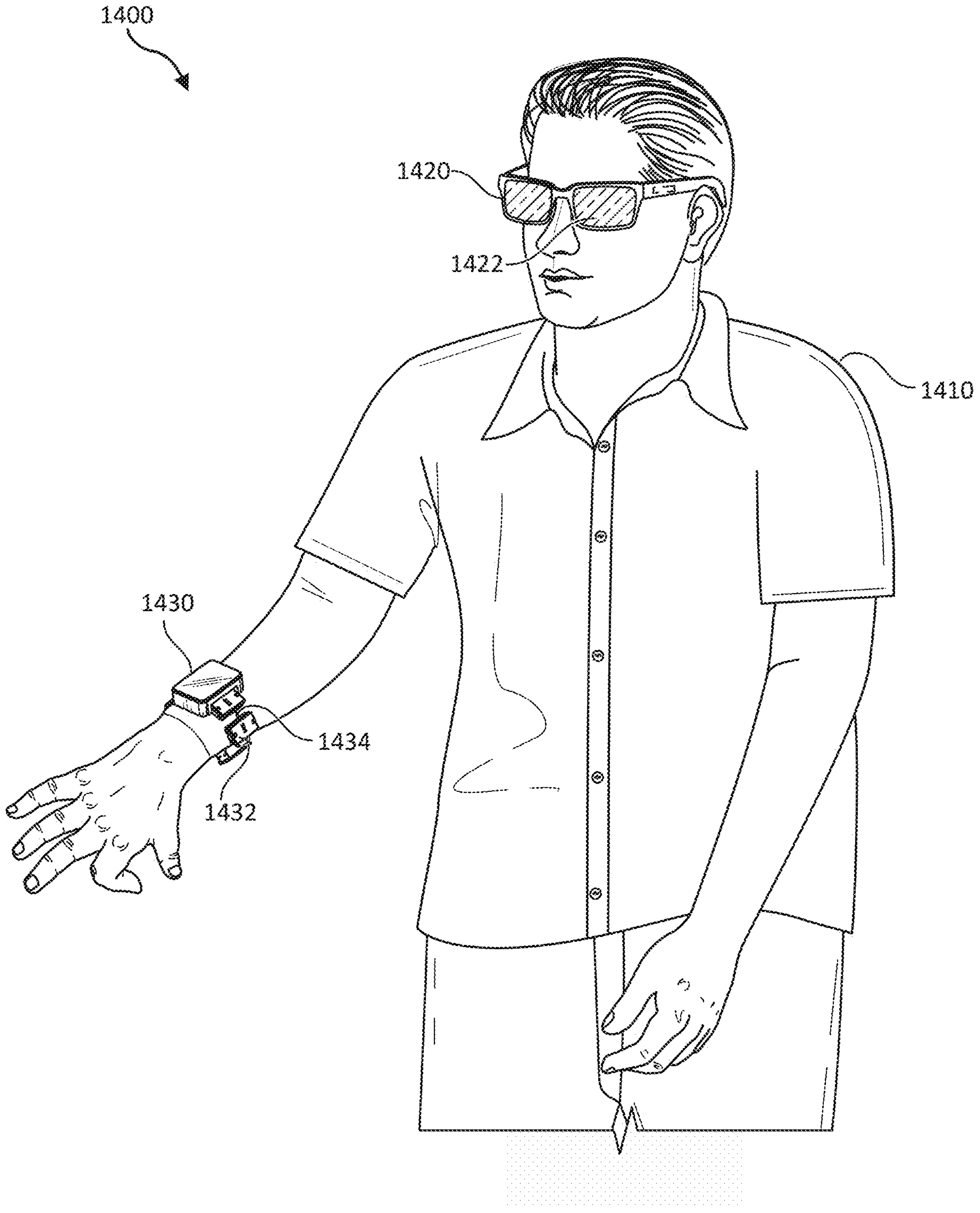
FIG. 14 is an illustration of an example augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view a user 1410 interacting with an augmented-reality system 1400. In this example, user 1410 may wear a pair of augmented-reality glasses 1420 that have one or more displays 1422 and that are paired with a haptic device 1430. Haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 15:
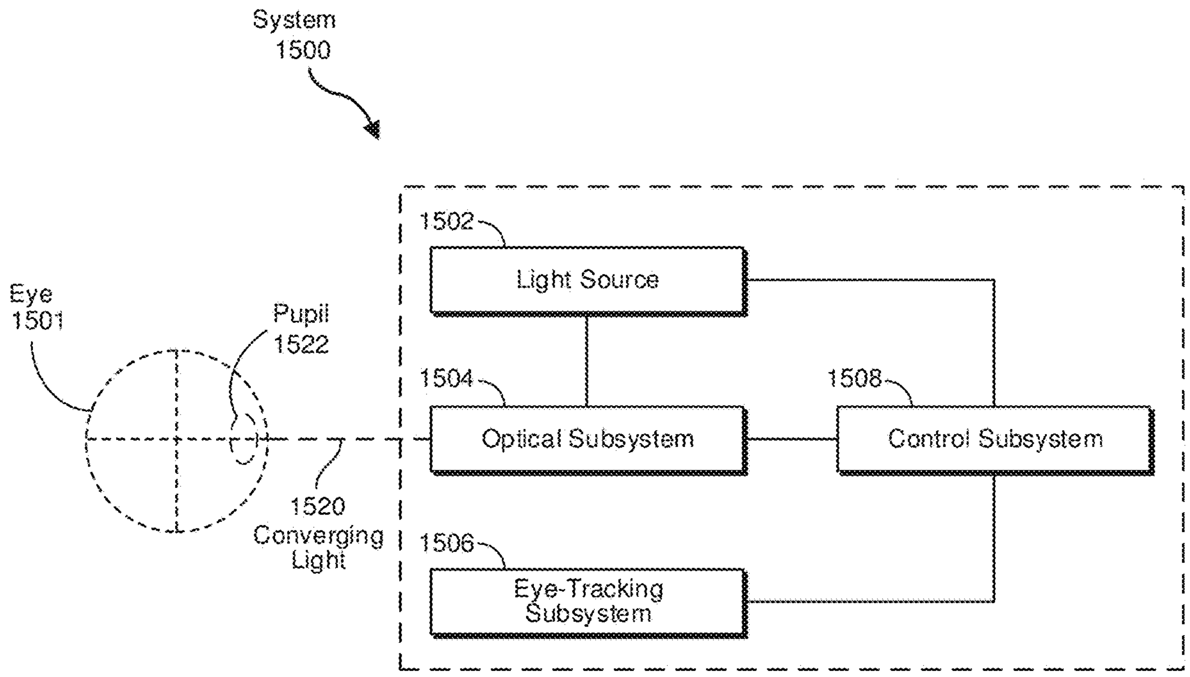
FIG. 15 an illustration of an exemplary system that incorporates an eye-tracking subsystem capable of tracking a user's eye(s).

FIG. 15 is an illustration of an exemplary system 1500 that incorporates an eye-tracking subsystem capable of tracking a user's eye(s). As depicted in FIG. 15, system 1500 may include a light source 1502, an optical subsystem 1504, an eye-tracking subsystem 1506, and/or a control subsystem 1508. In some examples, light source 1502 may generate light for an image (e.g., to be presented to an eye 1501 of the viewer). Light source 1502 may represent any of a variety of suitable devices. For example, light source 1502 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1504 may receive the light generated by light source 1502 and generate, based on the received light, converging light 1520 that includes the image. In some examples, optical subsystem 1504 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1520. Further, various mechanical couplings may serve to maintain the relative spacing and/or the orientation of the optical components in any suitable combination.

In one embodiment, eye-tracking subsystem 1506 may generate tracking information indicating a gaze angle of an eye 1501 of the viewer. In this embodiment, control subsystem 1508 may control aspects of optical subsystem 1504 (e.g., the angle of incidence of converging light 1520) based at least in part on this tracking information. Additionally, in some examples, control subsystem 1508 may store and utilize historical tracking information (e.g., a history of the tracking information over a given duration, such as the previous second or fraction thereof) to anticipate the gaze angle of eye 1501 (e.g., an angle between the visual axis and the anatomical axis of eye 1501). In some embodiments, eye-tracking subsystem 1506 may detect radiation emanating from some portion of eye 1501 (e.g., the cornea, the iris, the pupil, or the like) to determine the current gaze angle of eye 1501. In other examples, eye-tracking subsystem 1506 may employ a wavefront sensor to track the current location of the pupil.

Any number of techniques can be used to track eye 1501. Some techniques may involve illuminating eye 1501 with infrared light and measuring reflections with at least one optical sensor that is tuned to be sensitive to the infrared light. Information about how the infrared light is reflected from eye 1501 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1506 may be digitized (i.e., converted to an electronic signal). Further, the sensor may transmit a digital representation of this electronic signal to one or more processors (for example, processors associated with a device including eye-tracking subsystem 1506). Eye-tracking subsystem 1506 may include any of a variety of sensors in a variety of different configurations. For example, eye-tracking subsystem 1506 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1506 to track the movement of eye 1501. In another example, these processors may track the movements of eye 1501 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1506 may be programmed to use an output of the sensor(s) to track movement of eye 1501. In some embodiments, eye-tracking subsystem 1506 may analyze the digital representation generated by the sensors to extract eye rotation information from changes in reflections. In one embodiment, eye-tracking subsystem 1506 may use corneal reflections or glints (also known as Purkinje images) and/or the center of the eye's pupil 1522 as features to track over time.

In some embodiments, eye-tracking subsystem 1506 may use the center of the eye's pupil 1522 and infrared or near-infrared, non-collimated light to create corneal reflections. In these embodiments, eye-tracking subsystem 1506 may use the vector between the center of the eye's pupil 1522 and the corneal reflections to compute the gaze direction of eye 1501. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1506 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1501 may act as a retroreflector as the light reflects off the retina, thereby creating a bright pupil effect similar to a red-eye effect in photography. If the illumination source is offset from the optical path, then the eye's pupil 1522 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1508 may control light source 1502 and/or optical subsystem 1504 to reduce optical aberrations (e.g., chromatic aberrations and/or monochromatic aberrations) of the image that may be caused by or influenced by eye 1501. In some examples, as mentioned above, control subsystem 1508 may use the tracking information from eye-tracking subsystem 1506 to perform such control. For example, in controlling light source 1502, control subsystem 1508 may alter the light generated by light source 1502 (e.g., by way of image rendering) to modify (e.g., pre-distort) the image so that the aberration of the image caused by eye 1501 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 16:
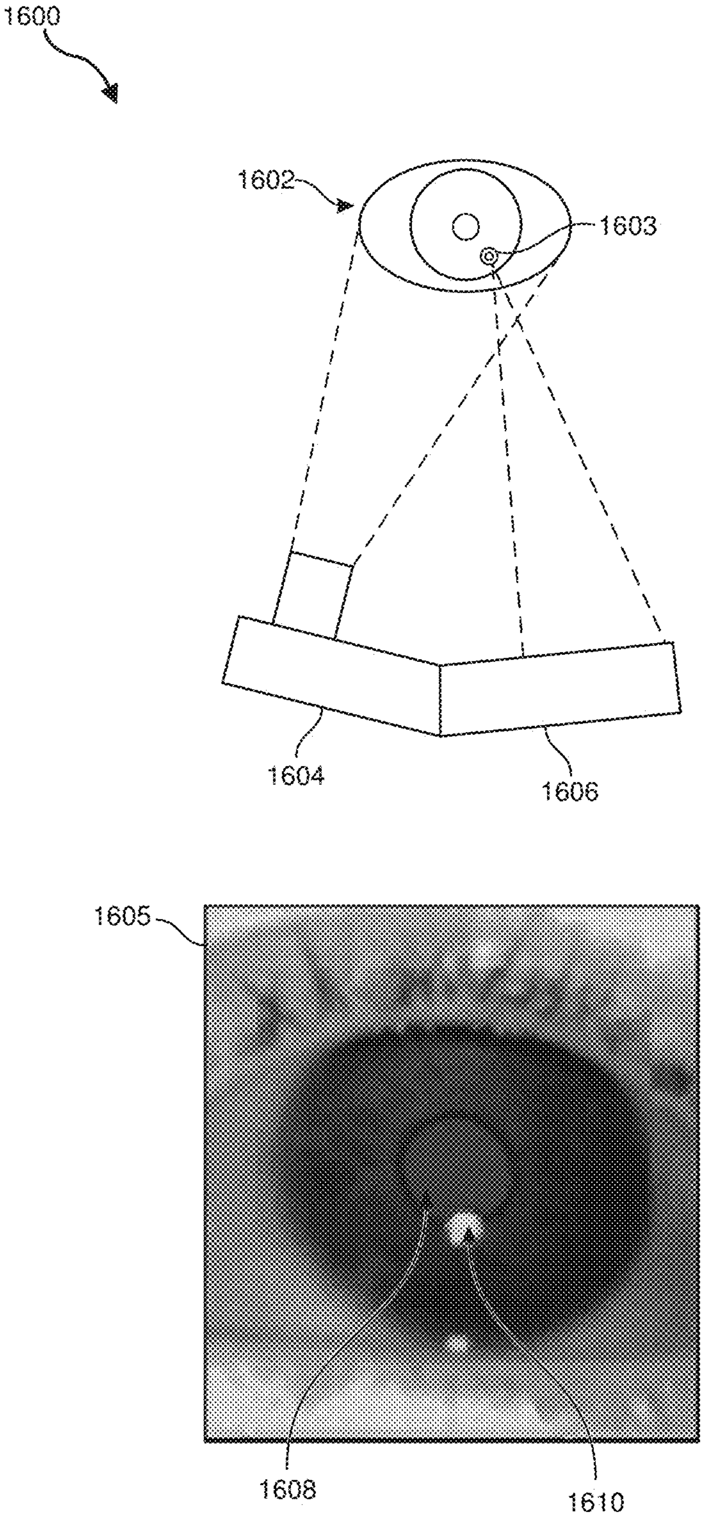
FIG. 16 is a more detailed illustration of various aspects of the eye-tracking subsystem illustrated in FIG. 15.

FIG. 16 is a more detailed illustration of various aspects of the eye-tracking subsystem illustrated in FIG. 15. As shown in this figure, an eye-tracking subsystem 1600 may include at least one source 1604 and at least one sensor 1606. Source 1604 generally represents any type or form of element capable of emitting radiation. In one example, source 1604 may generate visible, infrared, and/or near-infrared radiation. In some examples, source 1604 may radiate non-collimated infrared and/or near-infrared portions of the electromagnetic spectrum towards an eye 1602 of a user. Source 1604 may utilize a variety of sampling rates and speeds. For example, the disclosed systems may use sources with higher sampling rates in order to capture fixational eye movements of a user's eye 1602 and/or to correctly measure saccade dynamics of the user's eye 1602. As noted above, any type or form of eye-tracking technique may be used to track the user's eye 1602, including optical-based eye-tracking techniques, ultrasound-based eye-tracking techniques, etc.

Sensor 1606 generally represents any type or form of element capable of detecting radiation, such as radiation reflected off the user's eye 1602. Examples of sensor 1606 include, without limitation, a charge coupled device (CCD), a photodiode array, a complementary metal-oxide-semiconductor (CMOS) based sensor device, and/or the like. In one example, sensor 1606 may represent a sensor having predetermined parameters, including, but not limited to, a dynamic resolution range, linearity, and/or other characteristic selected and/or designed specifically for eye tracking.

As detailed above, eye-tracking subsystem 1600 may generate one or more glints. As detailed above, a glint 1603 may represent reflections of radiation (e.g., infrared radiation from an infrared source, such as source 1604) from the structure of the user's eye. In various embodiments, glint 1603 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 16 shows an example image 1605 captured by an eye-tracking subsystem, such as eye-tracking subsystem 1600. In this example, image 1605 may include both the user's pupil 1608 and a glint 1610 near the same. In some examples, pupil 1608 and/or glint 1610 may be identified using an artificial-intelligence-based algorithm, such as a computer-vision-based algorithm. In one embodiment, image 1605 may represent a single frame in a series of frames that may be analyzed continuously in order to track the eye 1602 of the user. Further, pupil 1608 and/or glint 1610 may be tracked over a period of time to determine a user's gaze.

In one example, eye-tracking subsystem 1600 may be configured to identify and measure the inter-pupillary distance (IPD) of a user. In some embodiments, eye-tracking subsystem 1600 may measure and/or calculate the IPD of the user while the user is wearing the artificial reality system. In these embodiments, eye-tracking subsystem 1600 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's interpupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1500 and/or eye-tracking subsystem 1600 may be incorporated into augmented-reality system 1000 in FIG. 10 and/or virtual-reality system 1100 in FIG. 11 to enable these systems to perform various eye-tracking tasks (including one or more of the eye-tracking operations described herein).

Figure 17:
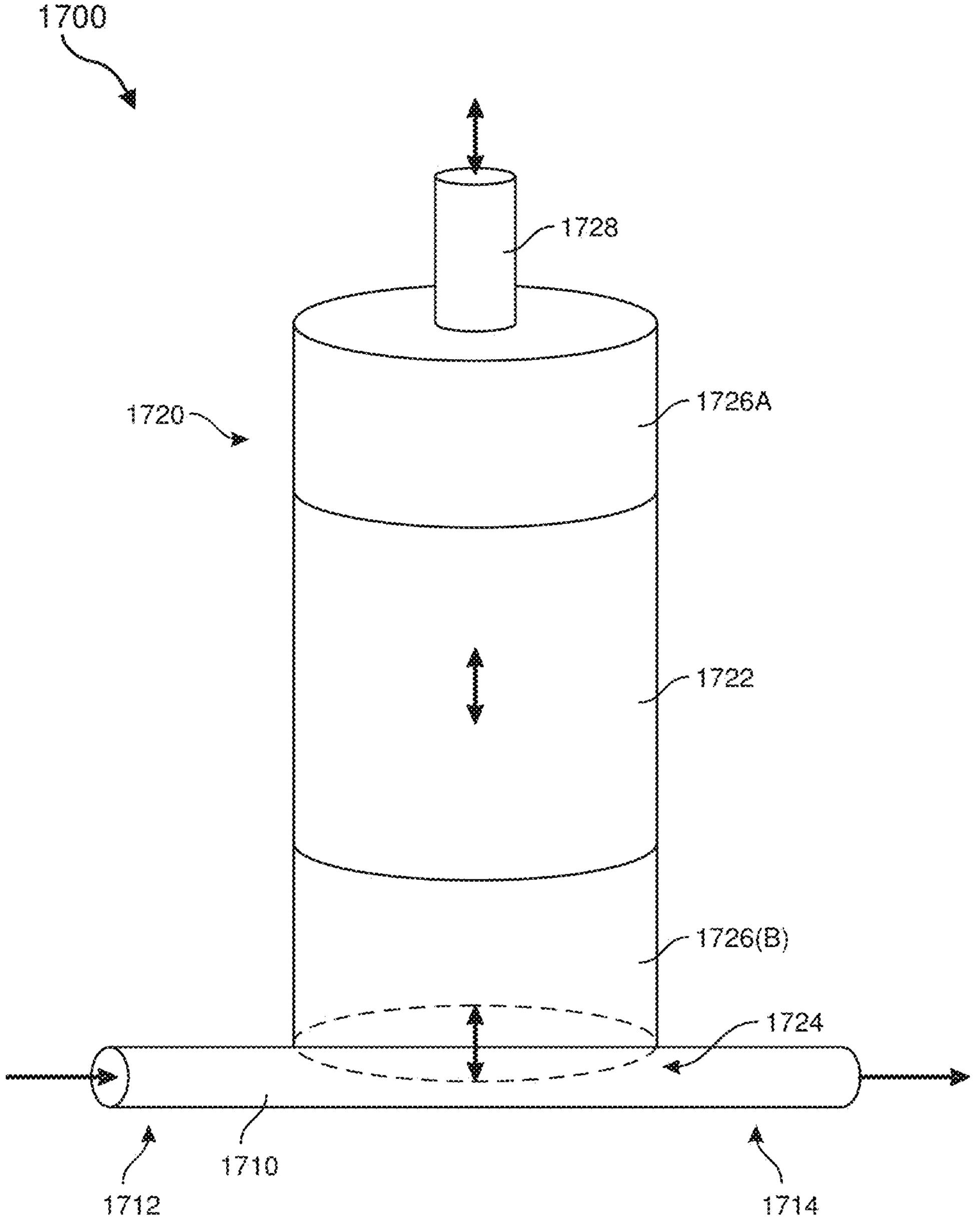
FIG. 17 is an illustration of an exemplary fluidic control system that may be used in connection with embodiments of this disclosure.

As noted above, the present disclosure may also include haptic fluidic systems that involve the control (e.g., stopping, starting, restricting, increasing, etc.) of fluid flow through a fluid channel. The control of fluid flow may be accomplished with a fluidic valve. FIG. 17 shows a schematic diagram of a fluidic valve 1700 for controlling flow through a fluid channel 1710, according to at least one embodiment of the present disclosure. Fluid from a fluid source (e.g., a pressurized fluid source, a fluid pump, etc.) may flow through the fluid channel 1710 from an inlet port 1712 to an outlet port 1714, which may be operably coupled to, for example, a fluid-driven mechanism, another fluid channel, or a fluid reservoir.

Fluidic valve 1700 may include a gate 1720 for controlling the fluid flow through fluid channel 1710. Gate 1720 may include a gate transmission element 1722, which may be a movable component that is configured to transmit an input force, pressure, or displacement to a restricting region 1724 to restrict or stop flow through the fluid channel 1710. Conversely, in some examples, application of a force, pressure, or displacement to gate transmission element 1722 may result in opening restricting region 1724 to allow or increase flow through the fluid channel 1710. The force, pressure, or displacement applied to gate transmission element 1722 may be referred to as a gate force, gate pressure, or gate displacement. Gate transmission element 1722 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 17, gate 1720 of fluidic valve 1700 may include one or more gate terminals, such as an input gate terminal 1726(A) and an output gate terminal 1726(B) (collectively referred to herein as "gate terminals 1726") on opposing sides of gate transmission element 1722. Gate terminals 1726 may be elements for applying a force (e.g., pressure) to gate transmission element 1722. By way of example, gate terminals 1726 may each be or include a fluid chamber adjacent to gate transmission element 1722. Alternatively or additionally, one or more of gate terminals 1726 may include a solid component, such as a lever, screw, or piston, that is configured to apply a force to gate transmission element 1722.

In some examples, a gate port 1728 may be in fluid communication with input gate terminal 1726(A) for applying a positive or negative fluid pressure within the input gate terminal 1726(A). A control fluid source (e.g., a pressurized fluid source, a fluid pump, etc.) may be in fluid communication with gate port 1728 to selectively pressurize and/or depressurize input gate terminal 1726(A). In additional embodiments, a force or pressure may be applied at the input gate terminal 1726(A) in other ways, such as with a piezoelectric element or an electromechanical actuator, etc.

In the embodiment illustrated in FIG. 17, pressurization of the input gate terminal 1726(A) may cause the gate transmission element 1722 to be displaced toward restricting region 1724, resulting in a corresponding pressurization of output gate terminal 1726(B). Pressurization of output gate terminal 1726(B) may, in turn, cause restricting region 1724 to partially or fully restrict to reduce or stop fluid flow through the fluid channel 1710. Depressurization of input gate terminal 1726(A) may cause gate transmission element 1722 to be displaced away from restricting region 1724, resulting in a corresponding depressurization of the output gate terminal 1726(B). Depressurization of output gate terminal 1726(B) may, in turn, cause restricting region 1724 to partially or fully expand to allow or increase fluid flow through fluid channel 1710. Thus, gate 1720 of fluidic valve 1700 may be used to control fluid flow from inlet port 1712 to outlet port 1714 of fluid channel 1710.

The following describes exemplary methods and apparatus for predicting musculo-skeletal position information using wearable autonomous sensors according to at least one embodiment of the present disclosure.

In some computer applications that generate musculo-skeletal representations of the human body, it is desirable for the application to know the spatial positioning, orientation and movement of a user's body to provide a realistic representation of body movement. For example, in a virtual reality (VR) environment, tracking the spatial position of the user's hand may enable the application to represent the hand motion in the VR environment, which allows the user to interact with (e.g., by grasping or manipulating) virtual objects within the VR environment.

Some embodiments are directed to predicting information about the positioning and movements of portions of a user's body represented as a multi-segment articulated rigid body system (e.g., a user's arm, hand, leg, etc.) in an autonomous manner, i.e., without requiring external sensors, such as cameras, lasers, or global positioning systems (GPS). Signals recorded by wearable autonomous sensors placed at locations on the user's body are provided as input to a statistical model trained to predict musculo-skeletal position information, such as joint angles between rigid segments of an articulated multi-segment rigid body model of the human body. As a result of the training, the statistical model implicitly represents the statistics of motion of the articulated rigid body under defined movement constraints. The output of the trained statistical model may be used to generate a computer-based musculo-skeletal representation of at least a portion of the user's body, which in turn can be used for applications such as rendering a representation of the user's body in a virtual environment, interaction with physical or virtual objects, and monitoring a user's movements as the user performs a physical activity to assess, for example, whether the user is providing the physical activity in a desired manner.

Some embodiments are directed to a system configured to aggregate measurements from a plurality of autonomous sensors placed at locations on a user's body. The aggregate measurements may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculo-skeletal representation in real time.

Some embodiments are directed to a computerized system for providing a dynamically-updated computerized musculo-skeletal representation comprising a plurality of rigid body segments connected by joints. The system comprises a plurality of autonomous sensors including a plurality of neuromuscular sensors, wherein the plurality of autonomous sensors are arranged on one or more wearable devices, wherein the plurality of neuromuscular sensors are configured to continuously record a plurality of neuromuscular signals from a user and at least one computer processor. The at least one computer processor is programmed to provide as input to a trained statistical model, the plurality of neuromuscular signals and/or information based on the plurality of neuromuscular signals, determine, based on an output of the trained statistical model, musculo-skeletal position information describing a spatial relationship between two or more connected segments of the plurality of rigid body segments of the computerized musculo-skeletal representation, and update the computerized musculo-skeletal representation based, at least in part, on the musculo-skeletal position information.

Other embodiments are directed to a method of providing a dynamically-updated computerized musculo-skeletal representation comprising a plurality of rigid body segments connected by joints. The method comprises recording, using a plurality of autonomous sensors arranged on one or more wearable devices, a plurality of autonomous signals from a user, wherein the plurality of autonomous sensors comprise a plurality of neuromuscular sensors configured to record a plurality of neuromuscular signals, providing as input to a trained statistical model, the plurality of neuromuscular signals and/or information based on the plurality of neuromuscular signals, determining, based on an output of the trained statistical model, musculo-skeletal position information describing a spatial relationship between two or more connected segments of the plurality of rigid body segments of the computerized musculo-skeletal representation, and updating the computerized musculo-skeletal representation based, at least in part, on the musculo-skeletal position information.

Other embodiments are directed to a computer-readable storage medium encoded with a plurality of instructions that, when executed by at least one computer processor, perform a method. The method comprises recording, using a plurality of autonomous sensors arranged on one or more wearable devices, a plurality of autonomous signals from a user, wherein the plurality of autonomous sensors comprise a plurality of neuromuscular sensors configured to record a plurality of neuromuscular signals, providing as input to a trained statistical model, the plurality of neuromuscular signals and/or information based on the plurality of neuromuscular signals, determining, based on an output of the trained statistical model, musculo-skeletal position information describing a spatial relationship between two or more connected segments of the plurality of rigid body segments of the computerized musculo-skeletal representation, and updating the computerized musculo-skeletal representation based, at least in part, on the musculo-skeletal position information.

Other embodiments are directed to a computer system for training a statistical model to predict musculo-skeletal position information based, at least in part, on autonomous signals recorded by a plurality of autonomous sensors, wherein the plurality of autonomous sensors include a plurality of neuromuscular sensors configured to record a plurality of neuromuscular signals. The computer system comprises an input interface configured to receive the neuromuscular signals recorded during performance of a task performed by one or more users, receive position information indicating a position of a plurality of rigid body segments of a computerized musculo-skeletal representation during performance of the task performed by the one or more users; and at least one storage device configured to store a plurality of instructions that, when executed by at least one computer processor perform a method. The method comprises generating training data based, at least on part, on the received neuromuscular signals and the received position information, training the statistical model using at least some of the generated training data to output a trained statistical model, and storing, by the at least one storage device, the trained statistical model, wherein the trained statistical model is configured to predict musculo-skeletal position information based, at least in part on continuously recorded signals from the neuromuscular sensors.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The human musculo-skeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model the human musculo-skeletal system. However, it should be appreciated that some segments of the human musculo-skeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the arm may be modeled as a two-segment articulated rigid body with an upper portion corresponding to the upper arm connected at a shoulder joint to the torso of the body and a lower portion corresponding to the forearm, wherein the two segments are connected at the elbow joint. As another example, the hand may be modeled as a multi-segment articulated body with the joints in the wrist and each finger forming the interfaces between the multiple segments in the model. In some embodiments, movements of the segments in the rigid body model can be simulated as an articulated rigid body system in which orientation and position information of a segment relative to other segments in the model are predicted using a trained statistical model, as described in more detail below.

Figure 18A:
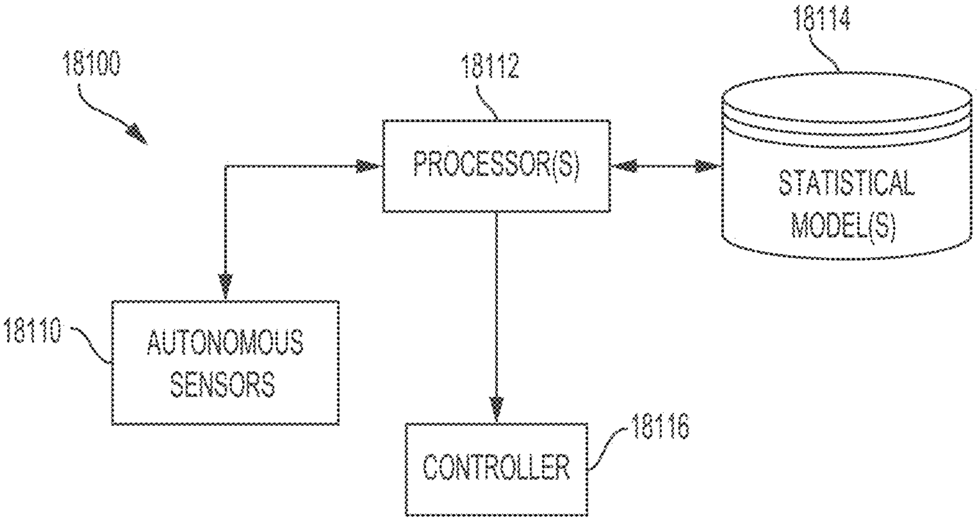
FIG. 18A is a schematic diagram of a computer-based system for predicting musculo-skeletal position information in accordance with some embodiments of the technology described herein.

FIG. 18A illustrates a system 18100 in accordance with some embodiments. The system includes a plurality of autonomous sensors 18110 configured to record signals resulting from the movement of portions of a human body. As used herein, the term “autonomous sensors” refers to sensors configured to measure the movement of body segments without requiring the use of external sensors, examples of which include, but are not limited to, cameras or global positioning systems. Autonomous sensors 18110 may include one or more Inertial Measurement Units (IMUs), which measure a combination of physical aspects of motion, using, for example, an accelerometer and a gyroscope. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso (e.g., arms, legs) as the user moves over time.

Autonomous sensors 18110 may also include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) describing the movement (e.g., for portions of the user's body distal to the user's torso, such as hands and feet) may be predicted based on the sensed neuromuscular signals as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso, whereas the neuromuscular sensors may be arranged to detect movements of one or more body segments distal to the torso. It should be appreciated, however, that autonomous sensors 18110 may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of autonomous sensors 18110 include one or more movement sensing components configured to sense movement information. In the case of IMUs, the movement sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the movement sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the movement sensing components may be processed using hardware signal processing circuitry (e.g., to perform amplification, filtering, and/or rectification). In other embodiments, at least some signal processing of the output of the movement sensing components may be performed in software. Thus, signal processing of autonomous signals recorded by autonomous sensors 18110 may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors 18110 may implement signal processing using components integrated with the movement sensing components, or at least a portion of the signal processing may be performed by one or more components in communication with, but not directly integrated with the movement sensing components of the autonomous sensors.

In some embodiments, at least some of the plurality of autonomous sensors 18110 are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body.

Figure 18B:
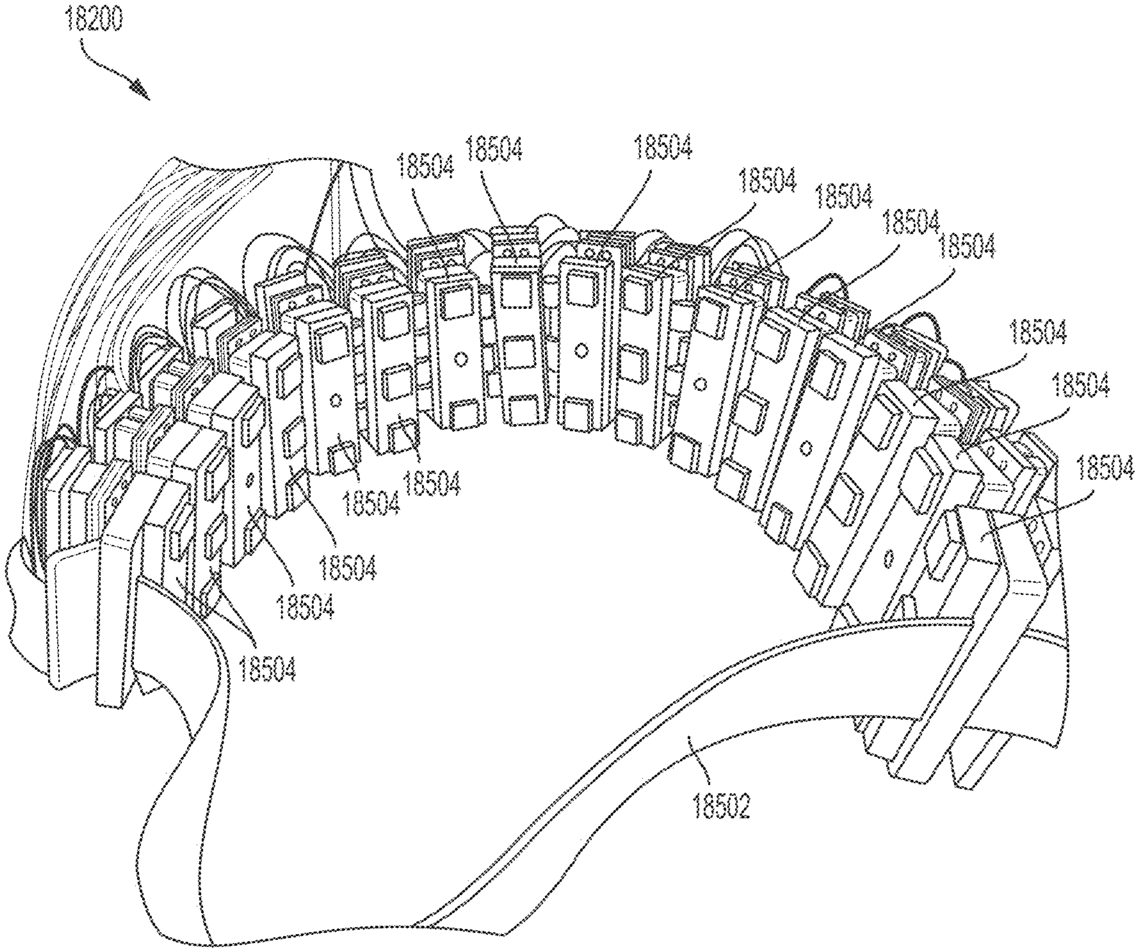
FIG. 18B illustrates a wristband having EMG sensors arranged circumferentially thereon, in accordance with some embodiments of the technology described herein.
Figure 18C:
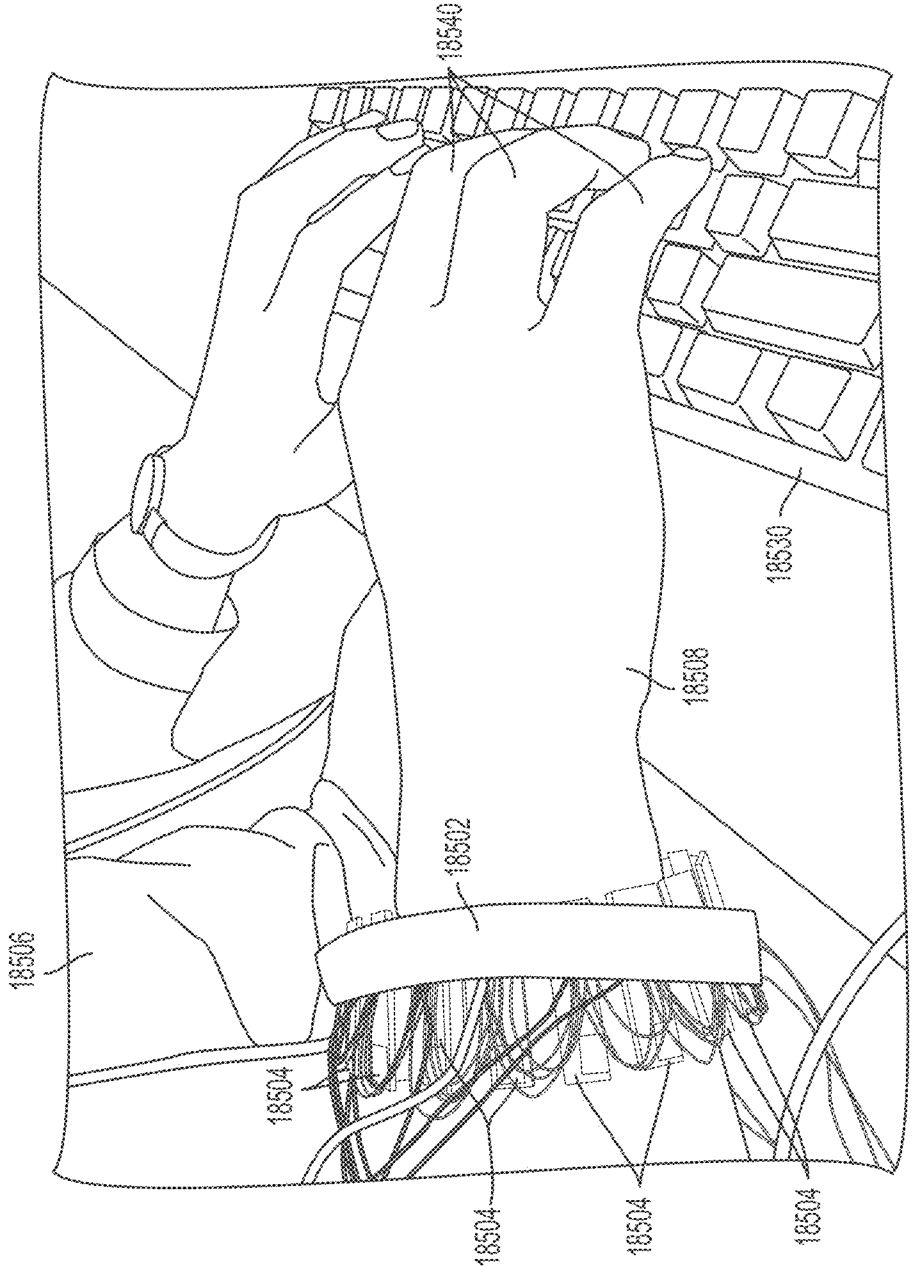
FIG. 18C illustrates a user wearing the wristband of FIG. 18B while typing on a keyboard, in accordance with some embodiments of the technology described herein.

In one implementation, 16 EMG sensors are arranged circumferentially around an elastic band configured to be worn around a user's lower arm. For example, FIG. 18B shows EMG sensors 18504 arranged circumferentially around elastic band 18502. It should be appreciated that any suitable number of neuromuscular sensors may be used and the number and arrangement of neuromuscular sensors used may depend on the particular application for which the wearable device is used. For example, a wearable armband or wristband may be used to predict musculo-skeletal position information for hand-based motor tasks such as manipulating a virtual or physical object, whereas a wearable leg or ankle band may be used to predict musculo-skeletal position information for foot-based motor tasks such as kicking a virtual or physical ball. For example, as shown in FIG. 18C, a user 18506 may be wearing elastic band 18502 on hand 18508. In this way, EMG sensors 18504 may be configured to record EMG signals as a user controls keyboard 18530 using fingers 18540. In some embodiments, elastic band 18502 may also include one or more IMUs (not shown), configured to record movement information, as discussed herein.

In some embodiments, multiple wearable devices, each having one or more IMUs and/or neuromuscular sensors included thereon may be used to predict musculo-skeletal position information for movements that involve multiple parts of the body.

System 18100 also includes one or more computer processors 18112 programmed to communicate with autonomous sensors 18110. For example, signals recorded by one or more of the autonomous sensors 18110 may be provided to processor(s) 18112, which may be programmed to perform signal processing, non-limiting examples of which are described above. Processor(s) 18112 may be implemented in hardware, firmware, software, or any combination thereof. Additionally, processor(s) 18112 may be co-located on a same wearable device as one or more of the autonomous sensors or may be at least partially located remotely (e.g., processing may occur on one or more network-connected processors).

System 18100 also includes datastore 18114 in communication with processor(s) 18112. Datastore 18114 may include one or more storage devices configured to store information describing a statistical model used for predicting musculo-skeletal position information based on signals recorded by autonomous sensors 18110 in accordance with some embodiments. Processor(s) 18112 may be configured to execute one or more machine learning algorithms that process signals output by the autonomous sensors 18110 to train a statistical model stored in datastore 18114, and the trained (or retrained) statistical model may be stored in datastore 18114 for later use in generating a musculo-skeletal representation. Non-limiting examples of statistical models that may be used in accordance with some embodiments to predict musculo-skeletal position information based on recorded signals from autonomous sensors are discussed in more detail below.

In some embodiments, processor(s) 18112 may be configured to communicate with one or more of autonomous sensors 18110, for example to calibrate the sensors prior to measurement of movement information. For example, a wearable device may be positioned in different orientations on or around a part of a user's body and calibration may be performed to determine the orientation of the wearable device and/or to perform any other suitable calibration tasks. Calibration of autonomous sensors 18110 may be performed in any suitable way, and embodiments are not limited in this respect. For example, in some embodiments, a user may be instructed to perform a particular sequence of movements and the recorded movement information may be matched to a template by virtually rotating and/or scaling the signals detected by the sensors (e.g., by the electrodes on EMG sensors). In some embodiments, calibration may involve changing the gain(s) of one or more analog to digital converters (ADCs), for example, in the case that the signals detected by the sensors result in saturation of the ADCs.

System 18100 also includes one or more controllers 18116 configured receive a control signal based, at least in part, on processing by processor(s) 18112. As discussed in more detail below, processor(s) 18112 may implement one or more trained statistical models 18114 configured to predict musculo-skeletal position information based, at least in part, on signals recorded by autonomous sensors 18110 worn by a user. One or more control signals determined based on the output of the trained statistical model(s) may be sent to controller 18116 to control one or more operations of a device associated with the controller. In some embodiments, controller 18116 comprises a display controller configured to instruct a visual display to display a graphical representation of a computer-based musculo-skeletal representation (e.g., a graphical representation of the user's body or a graphical representation of a character (e.g., an avatar in a virtual reality environment)) based on the predicted musculo-skeletal information. For example, a computer application configured to simulate a virtual reality environment may be instructed to display a graphical representation of the user's body orientation, positioning and/or movement within the virtual reality environment based on the output of the trained statistical model(s). The positioning and orientation of different parts of the displayed graphical representation may be continuously updated as signals are recorded by the autonomous sensors 18110 and processed by processor(s) 18112 using the trained statistical model(s) 18114 to provide a computer-generated representation of the user's movement that is dynamically updated in real-time. In other embodiments, controller 18116 comprises a controller of a physical device, such as a robot. Control signals sent to the controller may be interpreted by the controller to operate one or more components of the robot to move in a manner that corresponds to the movements of the user as sensed using the autonomous sensors 18110.

Controller 18116 may be configured to control one or more physical or virtual devices, and embodiments of the technology described herein are not limited in this respect. Non-limiting examples of physical devices that may be controlled via controller 18116 include consumer electronics devices (e.g., television, smartphone, computer, laptop, telephone, video camera, photo camera, video game system, appliance, etc.), vehicles (e.g., car, marine vessel, manned aircraft, unmanned aircraft, farm machinery, etc.), robots, weapons, or any other device that may receive control signals via controller 18116.

In yet further embodiments, system 18100 may not include one or more controllers configured to control a device. In such embodiments, data output as a result of processing by processor(s) 18112 (e.g., using trained statistical model(s) 18114) may be stored for future use (e.g., for analysis of a health condition of a user or performance analysis of an activity the user is performing).

In some embodiments, during real-time movement tracking, information sensed from a single armband/wristband wearable device that includes at least one IMU and a plurality of neuromuscular sensors is used to reconstruct body movements, such as reconstructing the position and orientation of both the forearm, upper arm, wrist and hand relative to a torso reference frame using a single arm/wrist-worn device, and without the use of external devices or position determining systems. For brevity, determining both position and orientation may also be referred to herein generally as determining movement.

As discussed herein, some embodiments are directed to using a statistical model for predicting musculo-skeletal information based on signals recorded from wearable autonomous sensors. The statistical model may be used to predict the musculo-skeletal position information without having to place sensors on each segment of the rigid body that is to be represented in a computer-generated musculo-skeletal representation of user's body. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model though training based on recorded sensor data. Constraints imposed in the construction of the statistical model are those set by anatomy and the physics of a user's body, while constraints derived from statistical patterns are those set by human behavior for one or more users from which sensor measurements are measured. As described in more detail below, the constraints may comprise part of the statistical model itself being represented by information (e.g., connection weights between nodes) in the model.

In some embodiments, system 18100 may be trained to predict musculo-skeletal information as a user moves. In some embodiments, the system 18100 may be trained by recording signals from autonomous sensors 18110 (e.g., IMU sensors, EMG sensors) and position information recorded from position sensors worn by one or more users as the user(s) perform one or more movements. The position sensors, described in more detail below, may measure the position of each of a plurality of spatial locations on the user's body as the one or more movements are performed during training to determine the actual position of the body segments. After such training, the system 18100 may be configured to predict, based on a particular user's autonomous sensor signals, musculo-skeletal position information (e.g., a set of joint angles) that enable the generation of a musculo-skeletal representation without the use of the position sensors.

In some embodiments, after system 18100 is trained to predict, based on a particular user's autonomous sensor signals, the musculo-skeletal position information, a user may utilize the system 18100 to perform a virtual or physical action without using position sensors. For example, when the system 18100 is trained to predict with high accuracy (e.g., at least a threshold accuracy), the musculo-skeletal position information, the predictions themselves may be used to determine the musculo-skeletal position information used to generate a musculo-skeletal representation of the user's body.

As discussed herein, some embodiments are directed to using a statistical model for predicting musculo-skeletal position information to enable the generation of a computer-based musculo-skeletal representation. The statistical model may be used to predict the musculo-skeletal position information based on IMU signals, neuromuscular signals (e.g., EMG, MMG, and SMG signals), or a combination of IMU signals and neuromuscular signals detected as a user performs one or more movements.

Figure 18D:
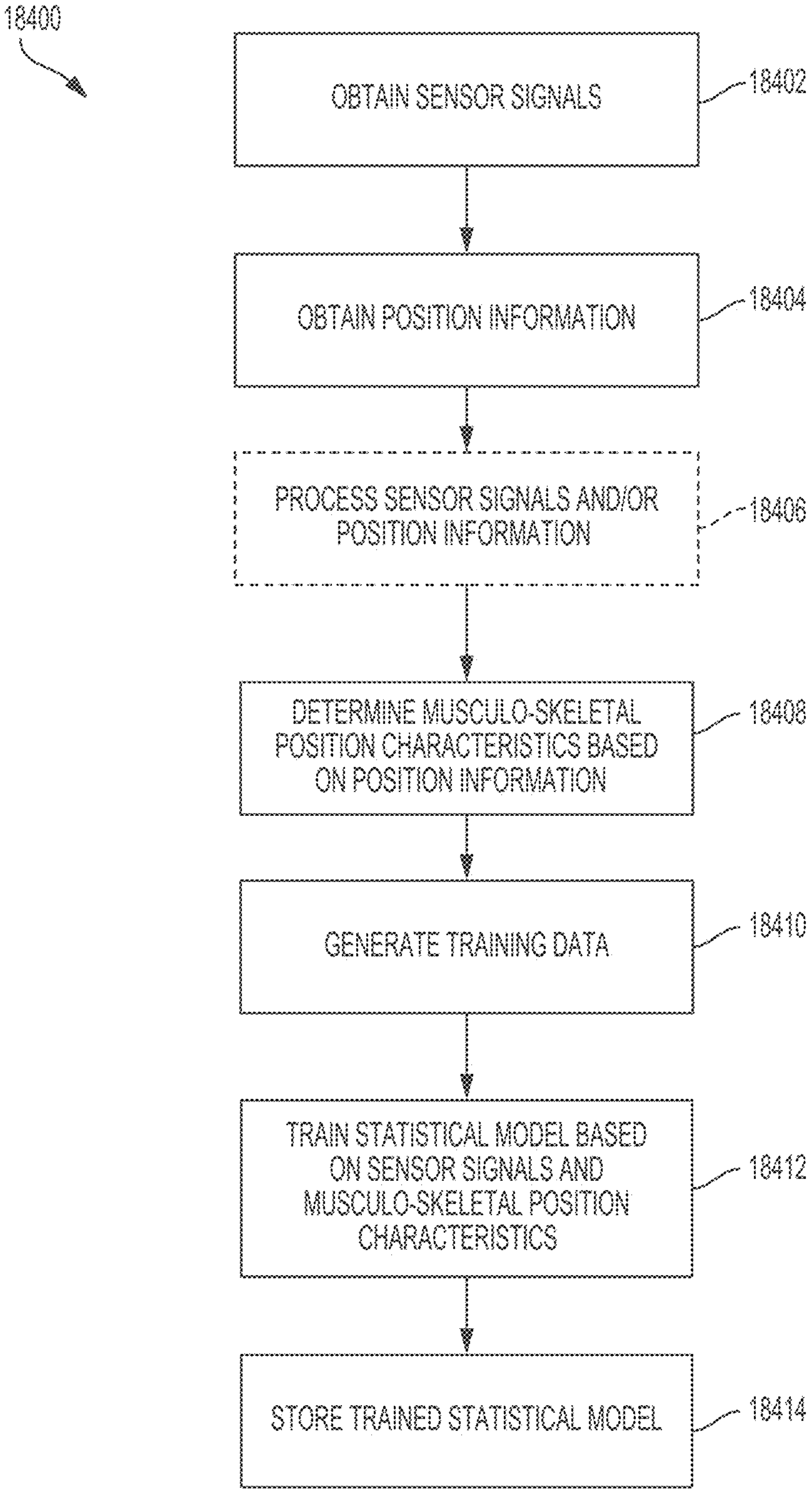
FIG. 18D is a flowchart of an illustrative process for generating a statistical model for predicting musculo-skeletal position information using signals recorded from autonomous sensors, in accordance with some embodiments of the technology described herein.

FIG. 18D describes a process 18400 for generating (sometimes termed "training" herein) a statistical model using signals recorded from autonomous sensors worn by one or more users. Process 18400 may be executed by any suitable computing device(s), as aspects of the technology described herein are not limited in this respect. For example, process 18400 may be executed by processors 18112 described with reference to FIG. 18A. As another example, one or more acts of process 18400 may be executed using one or more servers (e.g., servers included as a part of a cloud computing environment). For example, at least a portion of act 18410 relating to training of a statistical model (e.g., a neural network) may be performed using a cloud computing environment.

Process 18400 begins at act 18402, where a plurality of sensor signals are obtained for one or multiple users performing one or more movements (e.g., typing on a keyboard). In some embodiments, the plurality of sensor signals may be recorded as part of process 18400. In other embodiments, the plurality of sensor signals may have been recorded prior to the performance of process 18400 and are accessed (rather than recorded) at act 18402.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of autonomous sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 18402 correspond to signals from one type of autonomous sensor (e.g., one or more IMU sensors or one or more neuromuscular sensors) and a statistical model may be trained based on the sensor signals recorded using the particular type of autonomous sensor, resulting in a sensor-type specific trained statistical model. For example, the obtained sensor signals may comprise a plurality of EMG sensor signals arranged around the lower arm or wrist of a user and the statistical model may be trained to predict musculo-skeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate statistical model may be trained for each of the types of sensors and the outputs of the sensor-type specific models may be combined to generate a musculo-skeletal representation of the user's body. In other embodiments, the sensor signals obtained in act 18402 from two or more different types of sensors may be provided to a single statistical model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 18402 are recorded at multiple time points as a user performs one or multiple movements. As a result, the recorded signal for each sensor may include data obtained at each of multiple time points. Assuming that n autonomous sensors are arranged to simultaneously measure the user's movement information during performance of a task, the recorded sensor signals for the user may comprise a time series of K n-dimensional vectors $\{xk|1\leq k\leq K\}$ at time points t1, t2, . . . , tK during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculo-skeletal positions to perform the same movements. Collecting sensor signals and position information from a single user performing the same task repeatedly and/or from multiple users performing the same task one or multiple times facilitates the collection of sufficient training data to generate a statistical model that can accurately predict musculo-skeletal position information associated with performance of the task.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting musculo-skeletal position information associated with multiple different actions that may be taken by the user. For example, training data that incorporates musculo-skeletal position information for multiple actions may facilitate generating a statistical model for predicting which of multiple possible movements a user may be performing.

As discussed herein, the sensor data obtained at act 18402 may be obtained by recording sensor signals as each of one or multiple users performs each of one or more tasks one or more multiple times. As the user(s) perform the task(s), position information describing the spatial position of different body segments during performance of the task(s) may be obtained in act 18404. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 18402 may be recorded simultaneously with recording of the position information obtained in act 18404. In this example, position information indicating the position of each finger segment over time as the grasping motion is performed is obtained.

Next, process 18400 proceeds to act 18406, where the autonomous sensor signals obtained in act 18402 and/or the position information obtained in act 18404 are optionally processed. For example, the autonomous sensor signals or the position information signals may be processed using amplification, filtering, rectification, or other types of signal processing.

Next, process 18400 proceeds to act 18408, where musculo-skeletal position characteristics are determined based on the position information (as collected in act 18404 or as processed in act 18406). In some embodiments, rather than using recorded spatial (e.g., x, y, z) coordinates corresponding to the position sensors as training data to train the statistical model, a set of derived musculo-skeletal positon characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 18404 may be represented by a vector of n joint angles at each of a plurality of time points, where n is the number of joints or connections between segments in the articulated rigid body model.

Next, process 18400 proceeds to act 18410, where the time series information obtained at acts 18402 and 18408 is combined to create training data used for training a statistical model at act 18410. The obtained data may be combined in any suitable way. In some embodiments, each of the autonomous sensor signals obtained at act 18402 may be associated with a task or movement within a task corresponding to the musculo-skeletal position characteristics (e.g., joint angles) determined based on the positional information recorded in act 18404 as the user performed the task or movement. In this way, the sensor signals may be associated with musculo-skeletal position characteristics (e.g., joint angles) and the statistical model may be trained to predict that the musculo-skeletal representation will be characterized by particular musculo-skeletal position characteristics between different body segments when particular sensor signals are recorded during performance of a particular task.

In embodiments comprising autonomous sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 18400 proceeds to act 18412, where a statistical model for predicting musculo-skeletal position information is trained using the training data generated at act 18410. The statistical model being trained may take as input a sequence of data sets each of the data sets in the sequence comprising an n-dimensional vector of autonomous sensor data. The statistical model may provide output that indicates, for each of one or more tasks or movements that may be performed by a user, the likelihood that the musculo-skeletal representation of the user's body will be characterized by a set of musculo-skeletal position characteristics (e.g., a set of joint angles between segments in an articulated multi-segment body model). For example, the statistical model may take as input a sequence of vectors {xk|1≤k≤K} generated using measurements obtained at time points t1, t2, . . . , tK, where the ith component of vector xj is a value measured by the ith autonomous sensor at time tj and/or derived from the value measured by the ith autonomous sensor at time tj. Based on such input, the statistical model may provide output indicating, a probability that a musculo-skeletal representation of the user's body will be characterized by a set of musculo-skeletal position characteristics. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculo-skeletal position characteristics (e.g., joint angles). In this way, the neural network may operate as a non-linear regression model configured to predict musculo-skeletal position characteristics from raw or pre-processed sensor measurements. It should be appreciated that, in some embodiments, any other suitable non-linear regression model may be used instead of a neural network, as aspects of the technology described herein are not limited in this respect.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 18412 using the sensor data obtained at act 18402.

As another example, in some embodiments, the statistical model may take as input, features derived from the sensor data obtained at act 18402. In such embodiments, the statistical model may be trained at act 18412 using features extracted from the sensor data obtained at act 18402. The statistical model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the statistical model may be derived from the sensor data obtained at act 18402 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 18412, values for parameters of the statistical model may be estimated from the training data generated at act 18410. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In embodiments where the statistical model is a recurrent neural network (e.g., an LSTM), the statistical model may be trained using stochastic gradient descent and backpropagation through time. The training may employ a cross-entropy loss function and/or any other suitable loss function, as aspects of the technology described herein are not limited in this respect.

Next, process 18400 proceeds to act 18414, where the trained statistical model is stored (e.g., in datastore 18114). The trained statistical model may be stored using any suitable format, as aspects of the technology described herein are not limited in this respect. In this way, the statistical model generated during execution of process 18400 may be used at a later time, for example, in accordance with the process described with reference to FIG. 18E.

Figure 18E:
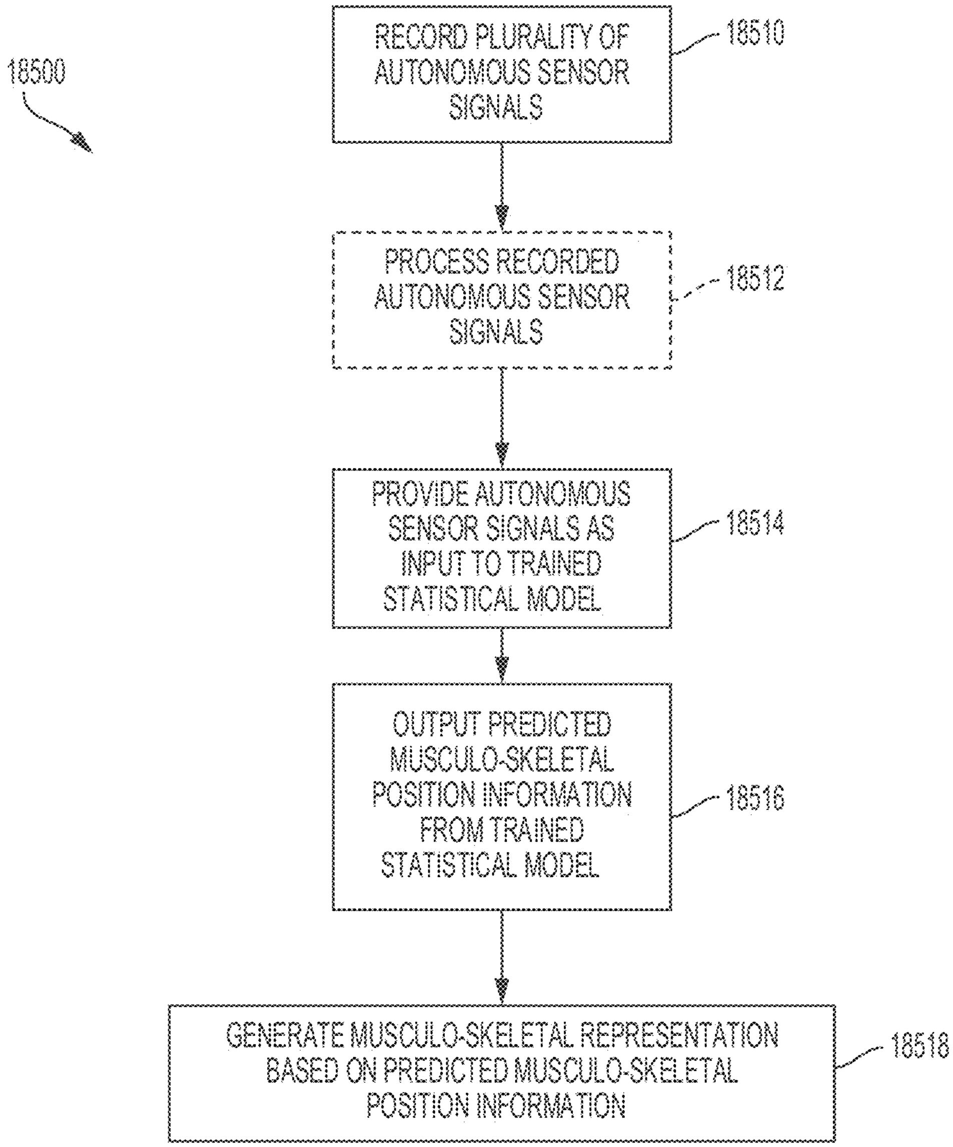
FIG. 18E is a flowchart of an illustrative process for using a trained statistical model to predict musculo-skeletal position information, in accordance with some embodiments of the technology described herein.

FIG. 18E illustrates a process 18500 for predicting musculo-skeletal position information based on recorded signals from a plurality of autonomous sensors and a trained statistical model in accordance with some embodiments. Although process 18500 is described herein with respect to IMU and EMG signals, it should be appreciated that process 18500 may be used to predict musculo-skeletal position information based on any recorded autonomous signals including, but not limited to, IMU signals, EMG signals, MMG signals, SMG signals, or any suitable combination thereof and a trained statistical model trained on such autonomous signals.

Process 18500 begins in act 18510, where signals are recorded from a plurality of autonomous sensors arranged on or near the surface of a user's body to record activity associated with movements of the body during performance of a task. In one example described above, the autonomous sensors comprise an IMU sensor and a plurality of EMG sensors arranged circumferentially (or otherwise oriented) on a wearable device configured to be worn on or around a part of the user's body, such as the user's arm. In some embodiments, the plurality of EMG signals are recorded continuously as a user wears the wearable device including the plurality of autonomous sensors. Process 18500 then proceeds to act 18512, where the signals recorded by the autonomous sensors are optionally processed. For example, the signals may be processed using amplification, filtering, rectification, or other types of signal processing. In some embodiments, filtering includes temporal filtering implemented using convolution operations and/or equivalent operations in the frequency domain (e.g., after the application of a discrete Fourier transform). In some embodiments, the signals are processed in the same or similar manner as the signals recorded in act 18402 of process 18400 described above and used as training data to train the statistical model.

Process 18500 then proceeds to act 18514, where the autonomous sensor signals are provided as input to a statistical model (e.g., a neural network) trained using one or more of the techniques described above in connection with process 18400. In some embodiments that continuously record autonomous signals, the continuously recorded autonomous signals (raw or processed) may be continuously or periodically provided as input to the trained statistical model for prediction of musculo-skeletal position information (e.g., joint angles) for the given set of input sensor data. As discussed herein, in some embodiments, the trained statistical model is a user-independent model trained based on autonomous sensor and position information measurements from a plurality of users. In other embodiments, the trained model is a user-dependent model trained on data recorded from the individual user from which the data recorded in act 18510 is also acquired.

After the trained statistical model receives the sensor data as a set of input parameters, process 18500 proceeds to act 18516, where predicted musculo-skeletal position information is output from the trained statistical model. As discussed herein, in some embodiments, the predicted musculo-skeletal position information may comprise a set of musculo-skeletal position information values (e.g., a set of joint angles) for a multi-segment articulated rigid body model representing at least a portion of the user's body. In other embodiments, the musculo-skeletal position information may comprises a set of probabilities that the user is performing one or more movements from a set of possible movements.

After musculo-skeletal position information is predicted in act 18516, process 18500 proceeds to act 18518, where a computer-based musculo-skeletal representation of the user's body is generated based, at least in part, on the musculo-skeletal position information output from the trained statistical model. The computer-based musculo-skeletal representation may be generated in any suitable way. For example, a computer-based musculo-skeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculo-skeletal model may define the orientation of each of the connected rigid body segments relative to each other and a reference frame, such as the torso of the body. As new sensor data is measured and processed by the statistical model to provide new predictions of the musculo-skeletal position information (e.g., an updated set of joint angles), the computer-based musculo-skeletal representation of the user's body may be updated based on the updated set of joint angles determined based on the output of the statistical model. In this way the computer-based musculo-skeletal representation is dynamically updated in real-time as autonomous sensor data is continuously recorded.

The computer-based musculo-skeletal representation may be represented and stored in any suitable way, as embodiments of the technology described herein are not limited with regard to the particular manner in which the representation is stored. Additionally, although referred to herein as a "musculo-skeletal" representation, to reflect that muscle activity may be associated with the representation in some embodiments, as discussed in more detail below, it should be appreciated that some musculo-skeletal representations used in accordance with some embodiments may correspond to skeletal structures, muscular structures or a combination of skeletal structures and muscular structures in the body.

As discussed herein, in some embodiments, one or more control signals may be sent to a controller based on the musculo-skeletal representation generated in act 18518 of process 18500. For example, when the controller is a display controller, the control signal(s) may instruct a display in communication with the display controller to display a graphical rendering based on the generated muscular-skeletal representation. For a computer application that provides a virtual reality environment, the graphical rendering may be a rendering of the user's body or another computer-generated character (e.g., an avatar) based on a current state of the musculo-skeletal representation. As sensor data is collected, the rendered character may be dynamically updated to provide an animation of the rendered character that mimics the movements of the user wearing the wearable device including the autonomous sensors. In a virtual reality environment, a result of the character's animation may be the ability of the animated character to interact with objects in the virtual reality environment, examples of which include, but are not limited to, grasping a virtual object.

In embodiments, in which the controller is configured to control a physical device (e.g., a robot), the control signal(s) sent to the controller may instruct the physical device to perform one or more actions corresponding to the generated musculo-skeletal representation. For example, when the device being controlled is a robot, the control signal(s) may instruct the controller of the robot to mimic the movements of the user or otherwise control an operation of the robot based on the generated musculo-skeletal representation.

In yet further embodiments, the generated musculo-skeletal representation may be used to track the user's movements over time and provide a control signal to a controller that provides feedback to the user about the tracked movements. For example, the generated and dynamically updated musculo-skeletal representation may track the position of the user's hands as the user is typing on a keyboard and provide feedback to the user when it is determined that the user is likely to experience muscle fatigue due to the position of their hands as they type. Recordings of muscle activity when used in combination with the generated musculo-skeletal representation, as discussed in more detail below with regard to FIG. 18F, may be used to track muscle performance (e.g., fatigue, activation) during performance of various tasks and feedback may be provided to instruct the user performance of the task may be improved using different musculo-skeletal positioning as the task is performed. The feedback may be provided in any suitable way using, for example, haptic feedback, audio feedback, and/or visual feedback as embodiments of the technology described herein are not limited based on how the feedback is provided.

In some embodiments at least some of the sensor data recorded during use of the system may be used as training data to train the statistical model to enable the model to continue to refine the statistical relationships between movement-based information recorded by the autonomous sensors and musculo-skeletal position information output by the statistical model. Continuous training of the statistical model may result in improved performance of the model in predicting musculo-skeletal positioning information for movements that are performed by the user in a consistent manner.

Although process 18500 is described herein as being performed after process 18400 has completed and a statistical model has been trained, in some embodiments, process 18400 and 18500 may be performed together. For example, the statistical model may be trained in real-time, as a user is performing movements to interact with a virtual or physical object, and the trained statistical model may be used as soon as the model has been trained sufficiently to provide reliable predictions. In some embodiments, this may be performed using a variational autoencoder.

In the embodiments described above, a times series of movement data recorded by autonomous sensors such as IMUs and neuromuscular sensors (EMG) is used to predict musculo-skeletal position information (e.g., a set of joint angles) that describe how the orientation of different segments of a computer-based musculo-skeletal representation change over time based on the user's movements. In this way, the neuromuscular activity recorded by neuromuscular sensors, which indirectly measures body motion through the activation of skeletal muscles, may nonetheless be used to predict how a user is moving through the use of trained statistical model that learns statistical relationships between the recorded neuromuscular signals and the user's movements.

The inventors have recognized and appreciated that in addition to being useful for predicting musculo-skeletal position information, as discussed herein, the neuromuscular activity directly recorded by the neuromuscular sensors may be combined with the generated musculo-skeletal representation to provide a richer musculo-skeletal representation that represents additional biophysical underpinnings involved in the user's movements compared to embodiments where only musculo-skeletal positioning/orientation overtime is represented. This dual use of the neuromuscular signals recorded by neuromuscular sensors on a wearable device—to directly measure neuromuscular activity and to indirectly predict musculo-skeletal position information, enables some embodiments to control virtual or physical devices in a manner that more closely resembles the movements of the user. For example, some embodiments are configured to use the neuromuscular activity information recorded by the neuromuscular sensors to modify the control signals used to control a virtual or physical device. As a non-limiting example, for an application that provides a virtual reality environment, the dynamically updated computer-based musculo-skeletal representation may track the movements of a user to grasp a virtual egg located within the virtual environment allowing a computer-generated character (e.g., an avatar) associated with the user to hold the virtual egg in its hand. As the user clenches their hand into a fist without substantially moving the spatial position of the their fingers, corresponding detected neuromuscular signals may be used to modify the control signals sent to the application such that rather than just holding the egg, the computer-generated character squeezes the egg with force and breaks the egg. For example, a force value may be derived based on the detected muscle activity sensed by the neuromuscular sensor, and the derived force value may be used to modify the control signals sent to the application. In this way, neuromuscular activity directly recorded by the EMG sensors and/or derived measurements based on the directly recorded EMG sensor data may be used to augment the generated musculo-skeletal representation predicted in accordance with some embodiments of the technology described herein. Further applications of combining neuromuscular activity and musculo-skeletal representations are discussed herein in connection with FIG. 18F.

Figure 18F:
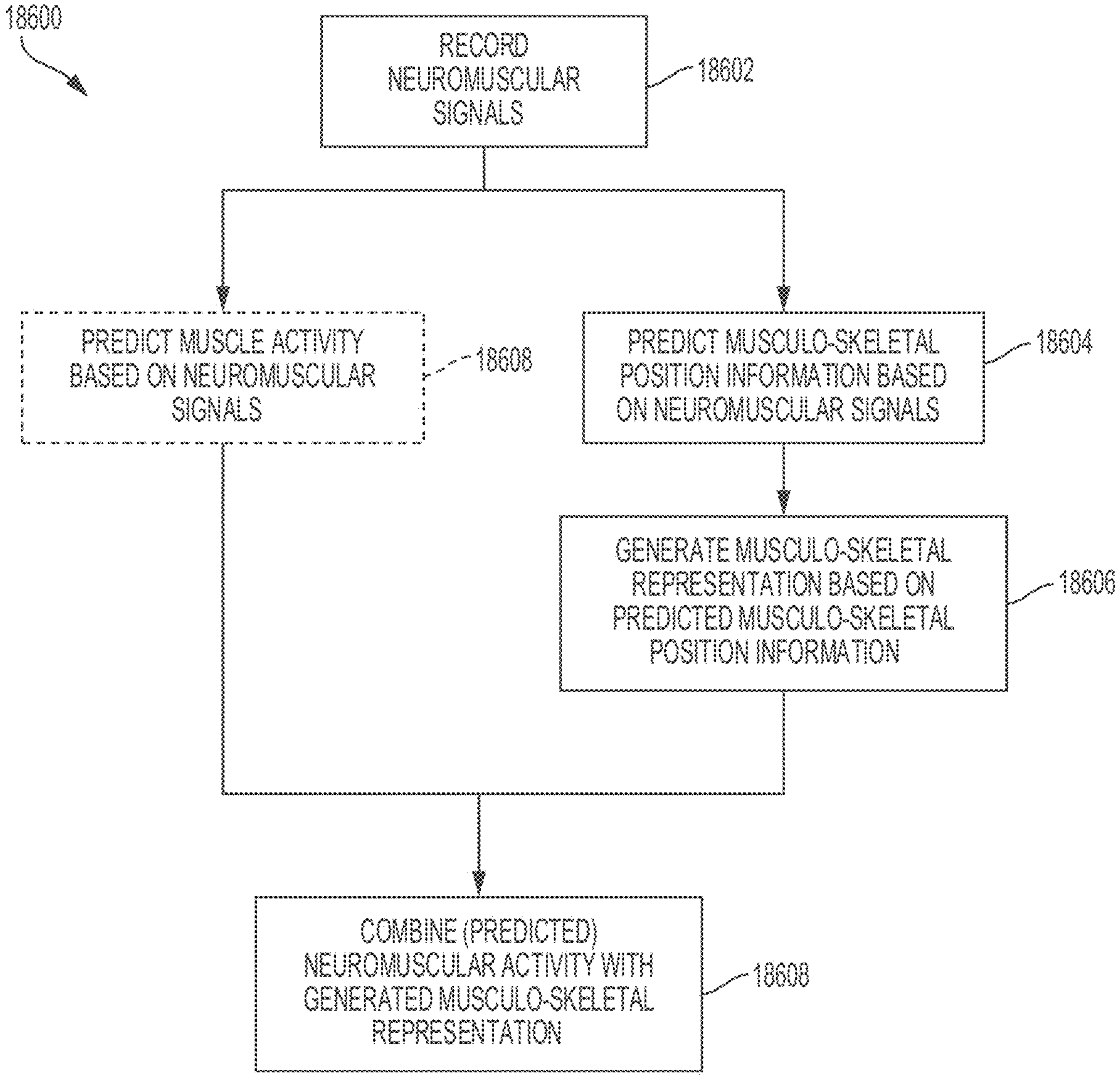
FIG. 18F is a flowchart of an illustrative process for combining neuromuscular signals with predicted musculo-skeletal position information in accordance with some embodiments of the technology described herein.

FIG. 18F illustrates a process 18600 for combining neuromuscular activity recorded with neuromuscular sensors with a musculo-skeletal representation generated, at least in part, from the neuromuscular activity, in accordance with some embodiments. In act 18602, neuromuscular signals are recorded from a plurality of neuromuscular sensors arranged near or on the surface of a user's body. In some embodiments, examples of which are described above, the plurality of neuromuscular sensors are integrated with a wearable device such as a flexible or adjustable band that may be worn around a portion of a user's body.

The process 18600 then proceeds to act 18604, where musculo-skeletal position information is predicted based, at least in part, on the recorded neuromuscular signals or signals derived from the neuromuscular signals. For example, as discussed herein in connection with process 18500, the recorded neuromuscular signals recorded by the neuromuscular signals may be processed using amplification, filtering, rectification, or any other suitable signal processing technique and the processed neuromuscular signals may be provided as input to a statistical model trained to output musculo-skeletal position information predicted based on the input provided to the statistical model. In some embodiments, examples, of which are described above, IMU signals recorded by one or more IMU sensors are also provided as input to the trained statistical model and the predicted musculo-skeletal position information output from the trained statistical model is based on both the IMU signals and the neuromuscular signals provided as input.

The process 18600 then proceeds to act 18606, where a computer-based musculo-skeletal representation is generated based on the predicted musculo-skeletal position information output from the trained statistical model. The processes of predicting musculo-skeletal position information using a trained statistical model and generating a musculo-skeletal representation based on predicted musculo-skeletal position information in accordance with some embodiments is described above in connection with process 18500 and is not repeated, for brevity. As should be appreciated from the foregoing, in acts 18604 and 18606 of process 18600, recorded neuromuscular activity is used in combination with a trained statistical model as an indirect way to estimate the movements of portions of a user's body without requiring the use of external sensors, such as cameras or global positioning systems.

The inventors have recognized that the neuromuscular signals, which provide a direct measurement of neuromuscular activity underlying the user's movements may be combined with a generated musculo-skeletal representation to provide an enriched musculo-skeletal representation. Accordingly, process 18600 proceeds to act 18608, where the neuromuscular activity and/or muscle activity predicted from the recorded neuromuscular activity are combined with the generated musculo-skeletal representation.

The neuromuscular activity may be combined with the generated musculo-skeletal representation in any suitable way. For example, as discussed herein, in some embodiments, the control signal(s) sent to a controller for interacting with a physical or virtual object may be modified based, at least in part, on the neuromuscular signals. In some embodiments, modifying the control signal(s) may be implemented by sending one or more additional control signals to the controller and/or by modifying one or more of the control signals generated based on the generated musculo-skeletal representation. In an application that provides a virtual reality environment, one or more characteristics of the neuromuscular signals may be used to determine how a character within the virtual reality environment interacts with objects in the virtual environment. In other embodiments, a visual representation of the neuromuscular activity may be displayed in combination with the character within the virtual reality environment. For example, muscle fatigue due to prolonged contraction of particular muscles and as sensed by the neuromuscular sensors may be shown on the rendering of the character in the virtual reality environment. Other visual representations of the neuromuscular activity may also be used, and embodiments of the technology described herein are not limited in this respect.

In yet other embodiments, feedback may be provided to the user based on a combination of the neuromuscular activity recorded by the neuromuscular sensors and the generated musculo-skeletal representation. For example, a system in accordance with some embodiments may track both the movements of a portion of the user's body as predicted using the generated musculo-skeletal representation and muscle activity that results in the movements to instruct the user about the proper way to perform a particular task. Applications in which such tracking of combined movement and muscle activity may be useful includes, but is not limited to, tracking performance of athletes to provide feedback on muscle engagement to reduce muscle fatigue, facilitating physical rehabilitation by providing instructional feedback to injured patients, and providing instructional feedback to users to teach desired ways of performing tasks that proactively prevent injuries.

As shown in FIG. 18F, process 18600 includes an optional act 18608 of using the neuromuscular signals to predict muscle activity. The inventors have recognized and appreciated that recorded neuromuscular signals precede the performance of the corresponding motor movements by hundreds of milliseconds. Accordingly, the neuromuscular signals themselves may be used to predict the onset of movement prior the movement being performed. Examples of using a trained statistical model to predict the onset of a movement are described in the co-pending patent application entitled, "Methods and Apparatus for Inferring User Intention," filed on the same day as the instant application, the entire contents of which is incorporated herein by reference. Accordingly, in some embodiments, muscle activity predicted based, at least in part, on the recorded neuromuscular signals in act 18608 is combined with the generated musculo-skeletal representation in act 18610. Due to the time delay between the recording of the neuromuscular signals and the performance of the actual movement, some embodiments are able to control a virtual or physical device with short latencies.

The following describes exemplary systems and methods for measuring the movements of articulated rigid bodies according to at least one embodiment of the present disclosure.

In some computer applications that generate musculo-skeletal representations of the human body, it is desirable for the application to know the spatial positioning, orientation and movement of a user's body to provide a realistic representation of body movement. For example, in a virtual reality (VR) environment, tracking the spatial position of the user's hand enables the application to represent the hand motion in the VR environment, which allows the user to interact with (e.g., by grasping or manipulating) virtual objects within the VR environment.

Some embodiments are directed to predicting information about the positioning and movements of portions of a user's body (e.g., a user's arm, hand, leg, etc.) represented as multi-segment articulated rigid body system in an autonomous manner, i.e., without requiring external sensors, such as cameras, lasers, or global positioning systems (GPS), and also without requiring sensors (e.g., inertial measurement units (IMUs)) to be positioned on each segment of the user's body.

Signals recorded by wearable autonomous sensors placed at locations on the user's body are provided as input to a statistical model trained to generate spatial information (e.g., position of, orientation of, joint angles between) for rigid segments of a multi-segment articulated rigid body model of the human body. As a result of the training, the statistical model implicitly represents the statistics of motion of the articulated rigid body under defined movement constraints. The output of the trained statistical model may in turn be used for applications such as rendering a representation of the user's body in a virtual environment, interaction with physical or virtual objects, and monitoring a user's movements as the user performs a physical activity to assess, for example, whether the user is providing the physical activity in a desired manner.

In some embodiments, movement data obtained by a single movement sensor positioned on a user (e.g., a user's wrist) may be provided as input (e.g., raw or after preprocessing) to a trained statistical model. Corresponding output generated by the trained statistical model may be used to determine spatial information for one or more segments of a multi-segment articulated rigid body model for the user. For example, the output may be used to determine the position and/or orientation of one or more segments in the multi-segment articulated rigid body model. As another example, the output may be used to determine angles between connected segments in the multi-segment articulated rigid body model.

Some embodiments provide fora computerized system for determining spatial information for a multi-segment articulated rigid body system having at least an anchored segment and a non-anchored segment connected to the anchored segment, each segment in the multi-segment articulated rigid body system representing a respective body part of a user. The computerized system comprises: a first autonomous movement sensor; at least one computer hardware processor; and at least one non-transitory computer-readable storage medium storing processor-executable instructions that, when executed by the at least one computer hardware processor, cause the at least one computer hardware processor to perform: obtaining signals recorded by the first autonomous movement sensor when the first movement sensor is coupled to a body part of the user represented by the non-anchored segment; providing the obtained signals as input to a trained statistical model and obtaining corresponding output of the trained statistical model; and determining, based on the corresponding output of the trained statistical model, spatial information for at least the non-anchored segment of the multi-segment articulated rigid body system. The spatial information may include position information for the non-anchored segment relative to an anchor point of the anchored segment and/or relative to any other suitable reference frame.

Some embodiments provide for a method for determining spatial information for a multi-segment articulated rigid body system having at least an anchored segment and a non-anchored segment connected to the anchored segment, each segment in the multi-segment articulated rigid body system representing a respective body part of a user, the method comprising: obtaining signals recorded by a first autonomous movement sensor when the first autonomous movement sensor is coupled to a body part of the user represented by the non-anchored segment; providing the obtained signals as input to a trained statistical model and obtaining corresponding output of the trained statistical model; and determining, based on the corresponding output of the trained statistical model, spatial information for at least the non-anchored segment of the multi-segment articulated rigid body system.

Some embodiments provide for at least one non-transitory computer-readable storage medium storing processor executable instructions that, when executed by a computer hardware processor, cause the computer hardware processor to perform a method for determining spatial information for a multi-segment articulated rigid body system having at least an anchored segment and a non-anchored segment connected to the anchored segment, each segment in the multi-segment articulated rigid body system representing a respective body part of a user. The method comprises: obtaining signals recorded by a first autonomous movement sensor when the first autonomous movement sensor is coupled to a body part of the user represented by the non-anchored segment; providing the obtained signals as input to a trained statistical model and obtaining corresponding output of the trained statistical model; and determining, based on the corresponding output of the trained statistical model, spatial information for at least the non-anchored segment of the multi-segment articulated rigid body system.

In some embodiments, including any of the preceding embodiments, the anchored segment is anchored to an anchor point, and determining the spatial information for at least the non-anchored segment comprises: determining the position of the non-anchored segment relative to the anchor point.

In some embodiments, including any of the preceding embodiments, the anchored segment is anchored to an anchor point, and determining the spatial information for at least the non-anchored segment comprises: determining a spatial relationship between the anchored segment and the non-anchored segment.

In some embodiments, including any of the preceding embodiments, determining the spatial relationship between the anchored segment and the non-anchored segment comprises: determining a set of one or more joint angles describing the spatial relationship between the anchored segment and the non-anchored segment.

In some embodiments, including any of the preceding embodiments, the first autonomous movement sensor comprises an inertial measurement unit (IMU).

In some embodiments, including any of the preceding embodiments, the first autonomous movement sensor comprises at least one sensor selected from the group consisting of a gyroscope, an accelerometer, and a magnetometer.

In some embodiments, including any of the preceding embodiments, the trained statistical model comprises a trained non-linear regression model. In some embodiments, including any of the preceding embodiments, the trained statistical model comprises a trained recurrent neural network. In some embodiments, including any of the preceding embodiments, the trained statistical model comprises a trained variational autoencoder.

In some embodiments, including any of the preceding embodiments, the first movement sensor is arranged on a single wearable device configured to be worn on or around a body part of the user.

In some embodiments, including any of the preceding embodiments, the single wearable device comprises a flexible or elastic band configured to be worn around the body part of the user.

In some embodiments, including any of the preceding embodiments, the processor-executable instructions, when executed by the at least one computer hardware processor, further cause the at least one computer hardware processor to perform: sending one or more control signals to a controller configured to instruct a device to perform an action based on the one or more control signals.

In some embodiments, including any of the preceding embodiments, the processor-executable instructions, when executed by the at least one computer hardware processor, further cause the at least one computer hardware processor to perform executing a computer application that provides a virtual reality environment, the controller comprises a display controller configured to instruct a display to display a visual representation of a character in the virtual reality environment, and the one or more control signals comprise signals to instruct the display controller to update in real time the visual representation of the character based, at least in part, on the determined spatial information.

In some embodiments, including any of the preceding embodiments, the virtual reality environment comprises a virtual object and updating the visual representation of the character based on the determined spatial information comprises updating the visual representation such that the character interacts with the virtual object.

In some embodiments, including any of the preceding embodiments, interacting with the virtual object comprises an action selected from the group consisting of grasping the virtual object, dropping the virtual object, pushing the virtual object, throwing the virtual object, pulling the virtual object, opening the virtual object, and closing the virtual object.

In some embodiments, including any of the preceding embodiments, the controller includes a control interface for a physical device, and wherein the one or more control signals comprise signals to instruct at least one component of the physical device to move based on the determined spatial information.

In some embodiments, including any of the preceding embodiments, the processor-executable instructions, when executed by the at least one computer hardware processor, further cause the at least one computer hardware processor to perform: updating a computer-generated representation of the multi-segment articulated rigid body system based, at least in part, on the determined spatial information; and storing, on the at least one non-transitory computer-readable storage medium, the updated computer-generated representation of the multi-segment articulated rigid body system.

Some embodiments provide a computerized system for training a statistical model for generating spatial information for a multi-segment articulated rigid body system having at least an anchored segment and a non-anchored segment connected to the anchored segment, each segment in the multi-segment articulated rigid body system representing a respective body part of a user, the computerized system comprising: a plurality of autonomous movement sensors; at least one computer hardware processor; and at least one non-transitory computer-readable storage medium storing processor-executable instructions that, when executed by the at least one computer hardware processor, causes the at least one computer hardware processor to perform: obtaining movement signals recorded by the plurality of autonomous movement sensors when each of the plurality of autonomous movement sensors is coupled to a body part of a first user represented by a respective segment in the multi-segment articulated rigid body system; generating training data using the obtained movement signals; training the statistical model using at least some of the generated training data to output a trained statistical model, wherein the trained statistical model is configured to generate spatial information for a multi-segment articulated rigid body system using movement signals obtained by a single autonomous movement sensor coupled to a body part of a second user; and storing the trained statistical model.

Some embodiments provide a method for training a statistical model for generating spatial information for a multi-segment articulated rigid body system having at least an anchored segment and a non-anchored segment connected to the anchored segment, each segment in the multi-segment articulated rigid body system representing a respective body part of a user, the method comprising: obtaining movement signals recorded by a plurality of autonomous movement sensors when each of the plurality of autonomous movement sensors is coupled to a body part of a first user represented by a respective segment in the multi-segment articulated rigid body system; generating training data using the obtained movement signals; training the statistical model using at least some of the generated training data to output a trained statistical model, wherein the trained statistical model is configured to generate spatial information for a multi-segment articulated rigid body system using movement signals obtained by a single autonomous movement sensor coupled to a body part of a second user; and storing the trained statistical model.

Some embodiments provide for at least one non-transitory computer-readable storage medium storing processor executable instructions that, when executed by a computer hardware processor, cause the computer hardware processor to perform a method for training a statistical model for generating spatial information for a multi-segment articulated rigid body system having at least an anchored segment and a non-anchored segment connected to the anchored segment, each segment in the multi-segment articulated rigid body system representing a respective body part of a user, the method comprising: obtaining movement signals recorded by a plurality of autonomous movement sensors when each of the plurality of autonomous movement sensors is coupled to a body part of a first user represented by a respective segment in the multi-segment articulated rigid body system; generating training data using the obtained movement signals; training the statistical model using at least some of the generated training data to output a trained statistical model, wherein the trained statistical model is configured to generate spatial information for a multi-segment articulated rigid body system using movement signals obtained by a single autonomous movement sensor coupled to a body part of a second user; and storing the trained statistical model on the at least one non-transitory storage medium.

In some embodiments, including any of the preceding embodiments, the first user and the second user are a same user.

In some embodiments, a statistical model may be trained, for example using tracking actual movement data measured from the articulated rigid body system, as that system may be constrained by certain physical (e.g., range of motion) and other constraints. As a result, the trained statistical model implicitly represents the statistics of motion of the articulated rigid body under the defined constraints. Once the model has learned the statistics of motion, real-time motion data (e.g., as received from a wrist-worn IMU) may be provided as input to the model. A computational system using the approach may determine the likely position and orientation of the articulated rigid body segment (e.g., the user's wrist) relative to a reference frame, without requiring sensors on one or more other segments (e.g., the user's upper arm), and without requiring use of external devices or supplemental position information. With respect to a user, the reference frame may be defined by the user's torso and the anchor point, e.g., the user's shoulder. The output from the trained statistical model represents a computationally-determined position and orientation of the rigid body segment of interest relative to the reference frame, and this output can then be used for many applications, such as rendering, interaction with virtual objects, or the like.

The computational approach of this disclosure preferably takes advantage of the constraints and statistical patterns under which the articulated rigid body system moves. The constraints are physical in nature (such as the user's arm is physically attached to the user's body thereby limiting its range of motion), and they can be either explicitly imposed in the construction of the model or learned from the data along with the statistical patterns of movement. The statistical patterns of movement arise from behavioral tendencies. An example of such a pattern may be that a pair of body elements is more often positioned at an angle to one another, as opposed to straight up and down. These statistical patterns can be imposed as explicit statistical priors or regularizations, or they can be implicitly captured in the model parameters learned from training data.

In a preferred but non-limiting embodiment, the technique uses a statistical model to computationally determine the relative (to the given reference frame) position and orientation of a segment of the articulated rigid body system operating under such constraints.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The human musculo-skeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the arm may be modeled as a two-segment articulated rigid body with an upper portion corresponding to the upper arm connected at a shoulder joint to the torso of the body and a lower portion corresponding to the forearm, wherein the two segments are connected at the elbow joint. Considering the shoulder as an anchor point of the two-segment articulated rigid body, the segment representing the upper arm is considered "anchored" and the segment corresponding to the lower arm is considered "un-anchored." As another example, the hand may be modeled as a multi-segment articulated body with the joints in the wrist and each finger forming the interfaces between the multiple segments in the model. In some embodiments, movements of the segments in the rigid body model can be simulated as an articulated rigid body system in which orientation and position information of a segment relative to other segments in the model are predicted using a trained statistical model, as described in more detail below.

As described herein, a multi-segment articulated rigid body system is used to model the human musculo-skeletal system. However, it should be appreciated that some segments of the human musculo-skeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

Some embodiments of the techniques described herein enable a computing system to determine time-varying orientation and position of the non-anchored segment relative to the anchored point on the first segment, e.g., to determine a configuration of the articulated rigid body system during the user's real-time movements (e.g., an interaction with an application such as a virtual reality game). In some embodiments, during the real-time movement tracking, just information sensed from a wrist-attached IMU may be used. More generally, techniques described herein allow for reconstruction of human movements from a small number of movement sensors. For example, some embodiments provide for techniques that allow for determining the position and/or orientation of both the forearm and upper arm relative to the torso reference frame using a single wrist-worn device, and without external devices or sensors.

As additional background, typically there are constraints and statistical patterns under which the articulated rigid body moves. The constraints under which the articulated rigid body moves are mechanical in nature (such as the user's arm is physically attached to the user's body thereby limiting its range of motion), and they can be either explicitly imposed in the construction of a statistical model, or they may be learned from the data along with statistical patterns of movement. The statistical patterns of movement typically arise from behavioral tendencies. An example of such a pattern may be that a pair of body elements is more often positioned at an angle to one another, as opposed to straight up and down. These statistical patterns can be imposed as explicit statistical priors or regularizations, or they can be implicitly captured in the model parameters learned from training data.

Generalizing, the articulated rigid body system (and any movement sensor attached thereto) thus can be said to be operating in a constrained manner, or under a set of one or more constraints. As will be described, the techniques described herein provide an approach that may be used to reconstruct spatial information of one or more segments of the multi-segment articulated rigid body system operating under such constraints. The spatial information may indicate position (e.g., in 3D space) of one or more segments, orientation of one or more segments, and/or angles between one or more pairs of connected segments, and/or any other suitable information about the spatial location of the segment(s) of the articulated rigid body system. The spatial position may be provided in any suitable reference frame including, by way of example, the torso relative frame (e.g., the reference frame defined by the user's torso). In some embodiments, the techniques described herein are used to train statistical models that leverage the existence of these constraints to facilitate generation of the movement data that models a non-anchored segment's relative position and orientation in 3D space. In some embodiments, the trained statistical models may represent these constraints through their parameters.

Figure 19A:
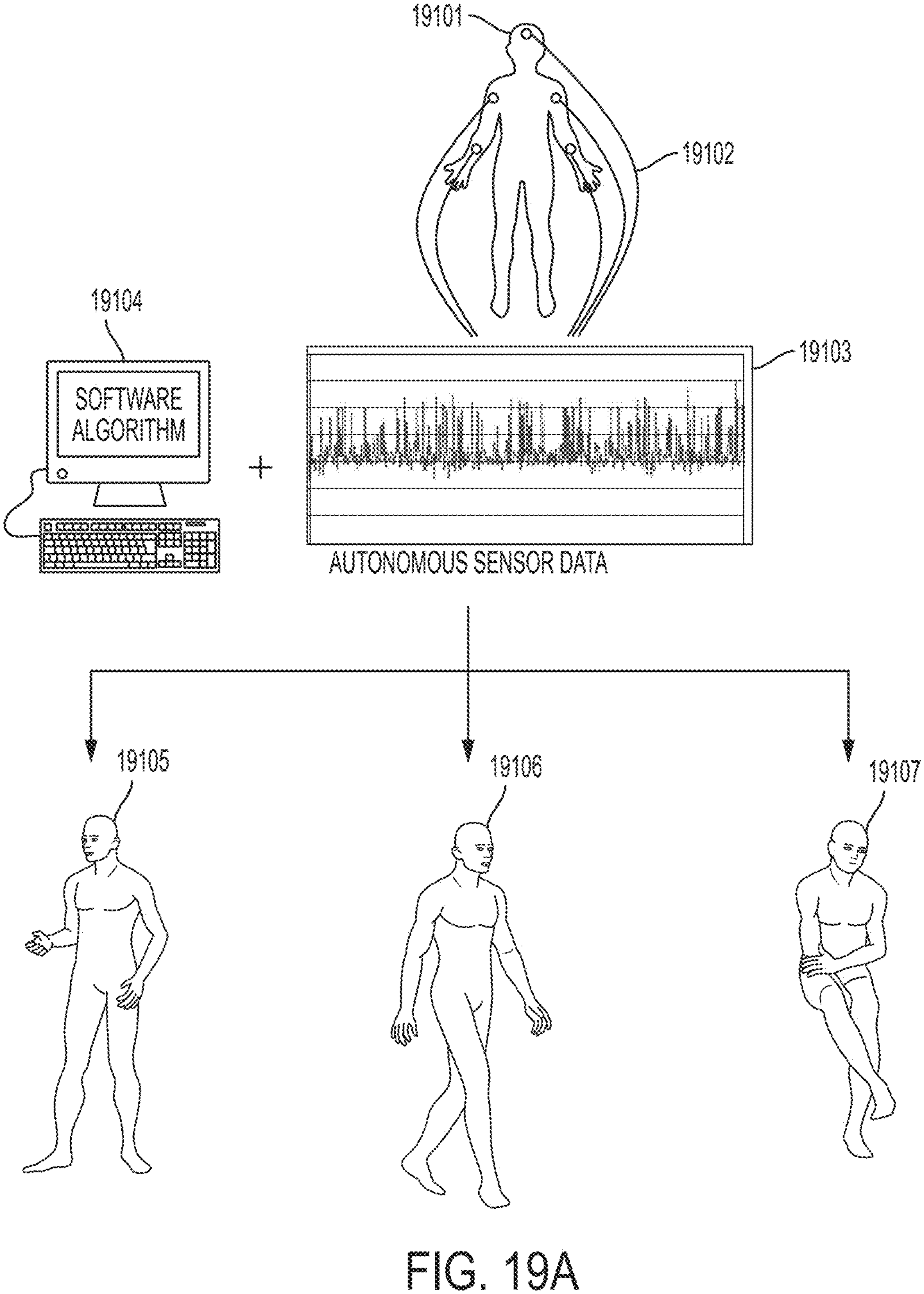
FIG. 19A depicts how IMU data is captured for a training phase in accordance with some embodiments of the technology described herein.

FIG. 19A depicts an illustrative approach, in accordance with some embodiments. In this example, and during a learning phase, a subject (19101) is connected to one or more autonomous sensors (19102), which sense the subject's movements and provide data from which the configuration dynamics of the subject can be generated. In some embodiments, the autonomous sensors 19102 may be IMUs that are positioned on the user's upper arm and forearm, and perhaps elsewhere. The measurement data (19103) is processed using algorithms (19104) to reconstruct the relative position and orientation of the subject, as seen in 19105, 19106, and 19107 in FIG. 19A. As will be described, the anatomy of particular interest here is the user's wrist, as a typical (but non-limiting) use case involves an application (such as virtual reality game) in which it is desired to computationally determine a relative position and orientation of the user's hand, e.g., to facilitate rendering and display of the user's hand in a VR simulation.

In some embodiments, an IMU may provide a set of measurement data d(t), such as acceleration over time a(t), angular velocity over time ω(t), and/or sensed magnetic field over time m(t). This information may be collected by the IMU component sensors, and the IMU may output that data individually or collectively. A sensor fusion algorithm may be used to process the sensed data in order to compute additional derived measurements, such as orientation over-time q(t). Thus, the IMU accumulates such data over time as a time-series. From these time-series data, the time-varying state of the rigid body may be determined by these measurements.

In some embodiments, a statistical model of the articulated rigid body system motion may be built using training data. The training data may be derived from the user whose movements are desired to be determined, from arm movements measured from one or more other users, by executing a "simulation" of movements of such a system, by augmenting data obtained from an actual user with data derived from a simulation, or combinations thereof. Depending on how the training data is to be captured or generated, one or more auxiliary devices or systems (e.g., a motion capture system, a laser scanner, a device to measure mutual magnetic induction, etc.) may be used. The statistical model may be generated in a pre-processing or off-line training phase. As a result of the training, the model implicitly represents the statistics of motion of the articulated rigid body system under the defined constraints, and the relationship between movement trajectories and IMU measurement time series. After the statistical model is built in the training phase, it is then used to facilitate a real-time (or substantially real-time) data analysis to determine computationally the relative position and orientation of the user's wrist. During the real-time data analysis phase, preferably an IMU is used only on the user's forearm. In use, real-time motion data (received from a user's wrist-worn IMU) is fed to the statistical model to enable the computing system to computationally know the relative position and orientation of the rigid body segment of interest.

Thus, in some embodiments, during a learning phase, an IMU is positioned, e.g., on an end of the user's forearm, herein referred to as the "wrist". Because the user's forearm is a segment of the multi-segment articulated body system, the IMU may be positioned anywhere on the forearm (segment). When the training data is generated using human user(s), an IMU also is positioned on the user's upper arm. As noted above, however, the training data may be generated in other ways, such as synthetically or semi-synthetically. In turn, a statistical model (e.g., a recurrent neural network, a variational autoencoder, etc.) may be trained using the training data. In some embodiments, the time-series data generated by the one or more IMUs may be used to train the statistical model from which estimates of the user's wrist position and orientation (and potentially the degree of uncertainty about the estimates) at a given time can be made or derived. In some embodiments, the statistical model may provide estimates of time-varying orientations and positions of the segments of a two-segment articulated rigid body, wherein one of the segments is anchored at one point to fix its position but not its orientation. The statistical model may be generated in a pre-processing or off-line training phase. In this manner, the user's real biophysical data is used to train the model. As a result of the training, the statistical model may implicitly represents the statistics of motion of the articulated rigid body under the defined constraints, and the relationship between movement trajectories and IMU measurement time series.

In some embodiments, the statistical model may be a long short-term memory (LSTM) recurrent neural network that is trained using the biophysical data sensed from the one or more IMU devices worn by the user as depicted in FIG. 19A. An LSTM may include a set of recurrently connected memory units that can persist information over extended numbers of update cycles. In a recurrent neural network, the connections within the network may form a directed cycle. This may create an internal network state that allows it to exhibit dynamic temporal behavior. Recurrent neural networks use their internal memory to process sequences of input having any suitable length. In some embodiments, an LSTM may be trained using gradient descent and backpropagation through time. In some embodiments, a number of LSTM RNN layers may be stacked together and trained to find connection parameters that maximize a probability of some output sequences in a training set, given the corresponding input sequences.

In some embodiments, a neural network model may be trained using mechanical motion data and, as noted above, the model may represent, implicitly, movement statistics and constraints due to the articulation of the user's arm relative to his or her torso, and the relation of the movements to the measured data. These movement statistics and relations to measurement data may be encoded in the values of the neural network model parameters (e.g., LSTM weights) that were obtained during training. In some embodiments, the statistical model may be trained and subsequently used without any external reference data (e.g., GPS data, captured image data, laser and other ranging information, etc.), for example by training a variational auto-encoder with a generative model. However, in other embodiments, the statistical model may be trained by using such external reference data.

In some embodiments, after the statistical model has been trained (during the learning phase), it may be used to determine (computationally) the relative position and orientation of a rigid body segment (e.g., as that segment interacts with the application of interest). For example, after the statistical model is trained, new movement data may be captured from the user's wrist-worn IMU (e.g., as the user interacts with a virtual reality application). The new movement data may represent movement of the user's forearm (represented by a non-anchored segment in a multi-segment articulated rigid body system). The new movement data may be provided as input to the trained statistical model and corresponding output may be obtained. The output may indicate the position and/or orientation of the user's forearm (represented by the non-anchored segment), the position and/or orientation of the user's upper arm (represented, in the articulated rigid body system by an anchored segment coupled to the non-anchored segment representing the forearm), information indicating the relative positions of the user's forearm and upper arm (e.g., by outputting a set of joint angles between the forearm and upper arm), and/or any other spatial information indicating how the user's arm may be situated in 3D space. In some embodiments, the output may indicate such spatial information directly (i.e., the spatial information may be provided as the actual output of the trained statistical model). In other embodiments, the output may indicate such spatial information indirectly (i.e., the spatial information may be derived from the output of the trained statistical model).

In some embodiments, the spatial information indicated by the output of the trained statistical model may be indicated with reference to a certain reference frame, for example, the torso reference frame of the user, the reference frame of the room in which the user is located, etc. In some embodiments, the anchored segment in the multi-segment articulated rigid body model may be attached to an anchor point (which may represent the user's shoulder, for example) and the spatial information indicated by the output of the trained statistical model may be indicated relative to the anchor point.

Figure 19B:
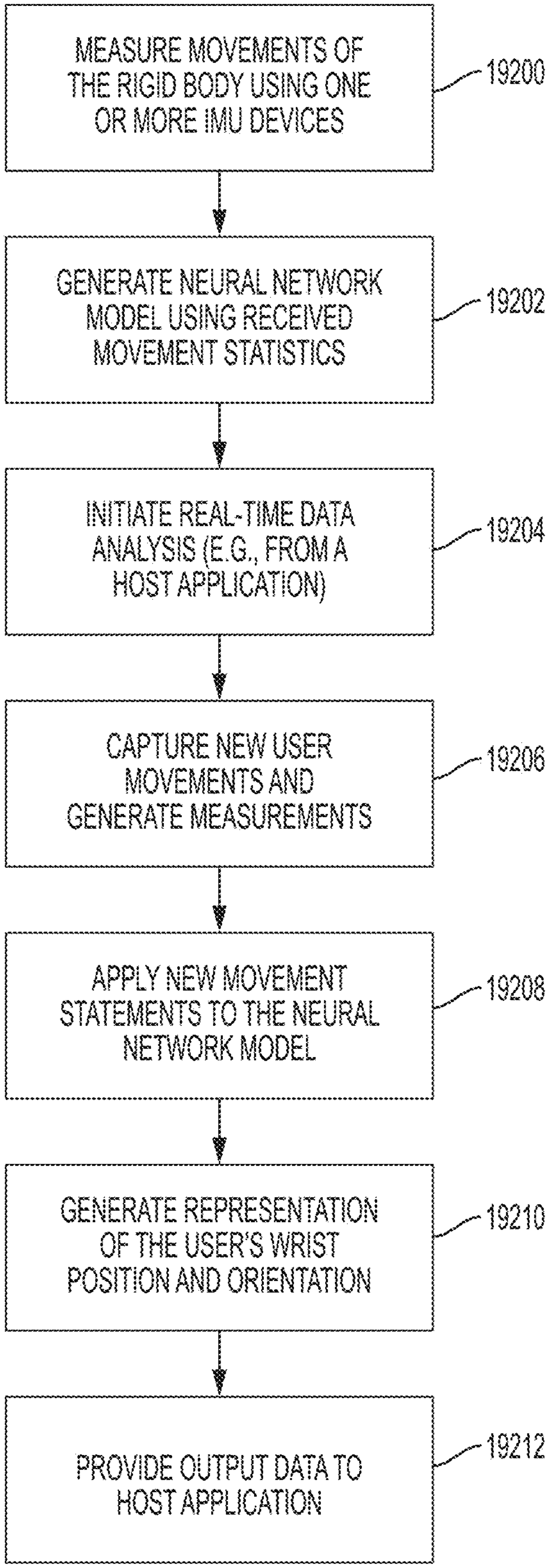
FIG. 19B is a flowchart of an illustrative process for generating and using a statistical model of user movement, in accordance with some embodiments of the technology described herein.

FIG. 19B is a flowchart of an illustrative process for generating and using a statistical model of user movement, in accordance with some embodiments of the technology described herein. This process may be implemented using any suitable computing device(s), as aspects of the technology described herein are not limited in this respect. At step 19200, the movements of the multi-segment articulated rigid body system (e.g., the user's arm) are measured, for example, using multiple IMU devices. At step 19202, and during the learning phase, a statistical model may be trained using the data collected by the multiple IMU devices. Thereafter, at step 19204, the real-time data analysis phase is initiated. In the real-time data analysis phase, a user wears an IMU on his or her wrist (or anywhere else on the forearm). New measurements are then captured by the user-worn IMU at step 19206. At step 19208, this new measurement data is applied to the trained statistical model. Based on the trained model, data representing an estimate of the position of the non-anchored segment relative to an anchor point of an anchored segment (namely, the user's upper arm that does not carry an IMU) is computed at step 19210. At step 19212, results of the computation may be provided to a host application (e.g., a virtual reality application or any other suitable application) to facilitate an operation associated with the application.

Figure 19C:
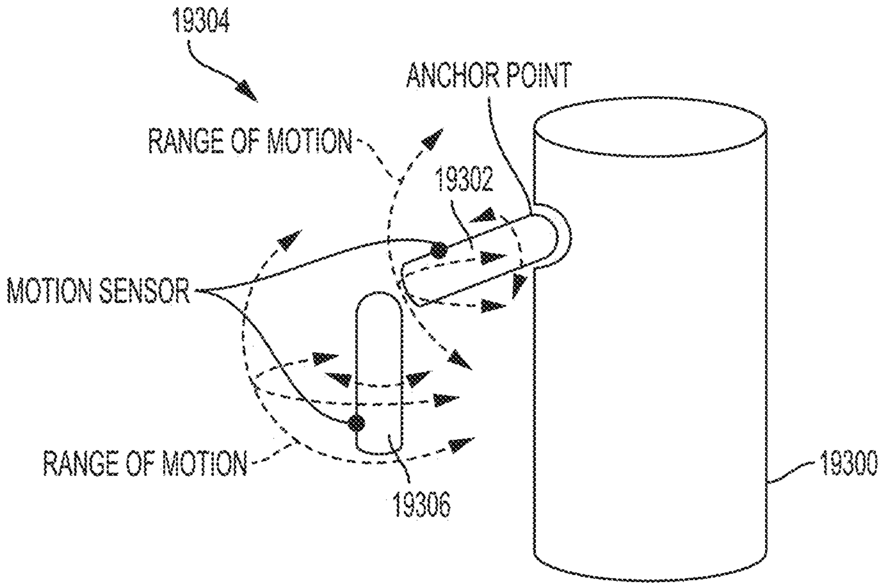
FIG. 19C illustrates a multi-segment articulated rigid body system, in accordance with some embodiments described herein.

FIG. 19C depicts a model of the multi-segment articulated rigid body system as described above. In this embodiment, the system comprises a rigid form 19300 representing the human torso, the first segment 19302 corresponding to the upper arm attached to the form 19300 at the anchor point 19304 (a ball-in-socket joint), and the second segment 19306 corresponding to the user's forearm. Movement sensors 19308 are attached to each of the first and second segments, and the range of motion for each segment also is shown. In this illustrative embodiment, the forearm has two degrees of freedom.

There is no limit or restriction on the use that may be made of the computation. Generalizing, the approach generates or obtains the statistical model that has learned the statistics of motion and their relation to measurements. The statistical model is then used during real-time data analysis on new motion data received by the computing system and representing motion of an articulated rigid body segment of interest; in particular, the computing system uses the statistical model to determine the position and orientation of the segment of the articulated rigid body.

One non-limiting use case of the approach described above is for rendering. To this end, there are well-known computer-implemented rendering techniques that computationally-render a user's hands and wrists, e.g., when the user puts on a VR headband. More specifically, and in connection with the user's interaction with the host application of this type, it is desired to generate a digital representation of the user's wrist position and orientation in 3D space. In the approach herein, this digital representation of the user's wrist position and orientation in effect is computed (predicted) by the model in real-time using only IMU data measured from movement of the one rigid body segment to which the IMU is attached. Thus, in an example use case, once a statistical model (e.g., a neural network) has been trained to implicitly learn the movement statistics and their relation to measurements (as they are encoded in its weight parameters), during the real-time data analysis phase, IMU information sensed from just the user's forearm is used by the neural network to predict the user's arm movement. Stated another way, when interacting with the application, the measured or sensed movement of the lower segment of the multi-segment articulated rigid body system may be used to predict the movement of that segment relative to the anchor point. With the resulting prediction, the application knows the absolute orientation and position of the user's wrist and hand relative to the user's torso, and it can then respond appropriately to the user's actions or commands depending on the nature and operation of the application.

The notion of a computing machine model implicitly learning the statistics of motion may be conceptualized as follows. In particular, the statistical model of the user's movements that is generated during the training phase provides an estimate of where the user's wrist is at a given time. Position estimates from integration of the IMU measurement data, while generally useful, may drift over time due to accumulation of noise. In the approach herein, however, the articulation constraints in the statistical model may counteract the accumulation of noise because accumulated drift results in movement trajectories that are incompatible with the constraints.

In some embodiments, the training data used to estimate parameters of the statistical model may be obtained from a single user or multiple users. In some embodiments, the training data may include training data obtained from a single user and the trained statistical model may be applied to generating spatial information for the same single user. In other embodiments, a statistical model applied to generating spatial information for a particular user may be trained using training data collected from one or more other users, in addition to or instead of the particular user.

In some embodiments, the techniques described herein may be used for controlling a virtual reality gaming application. However, the techniques described herein may be applied to controlling other virtual reality environments, augmented reality environments, remote device, computers, and/or any other suitable physical or virtual device, as aspects of the technology described herein are not limited in this respect.

Although not required, during both the learning and application-interaction phases, the sensed IMU data may be pre-processed in various ways, such as coordinate transformations to remove orientation-specific artifacts and to provide rotational invariance to the biophysical data. Other pre-processing may include signal filtering, and the like.

In some embodiments, the statistical model may be a recurrent neural network (e.g., an LSTM). However, in other embodiments, the statistical model may be a variational autoencoder, a non-linear regression model or any other suitable type of statistical model.

More generally, and for a multi-segment articulated rigid body system with up to n segments, the techniques described herein may be used to predict the position and/or orientation of multiple rigid body segments from information captured from sensors placed on only a subset (e.g., one) of the multiple segments. Thus, in one embodiment, for the human arm consisting of two segments, the techniques described herein may be used to determine positions and/or orientations of both the user's upper arm and forearm from movement information captured from only a single IMU coupled to the user's forearm.

Figure 19D:
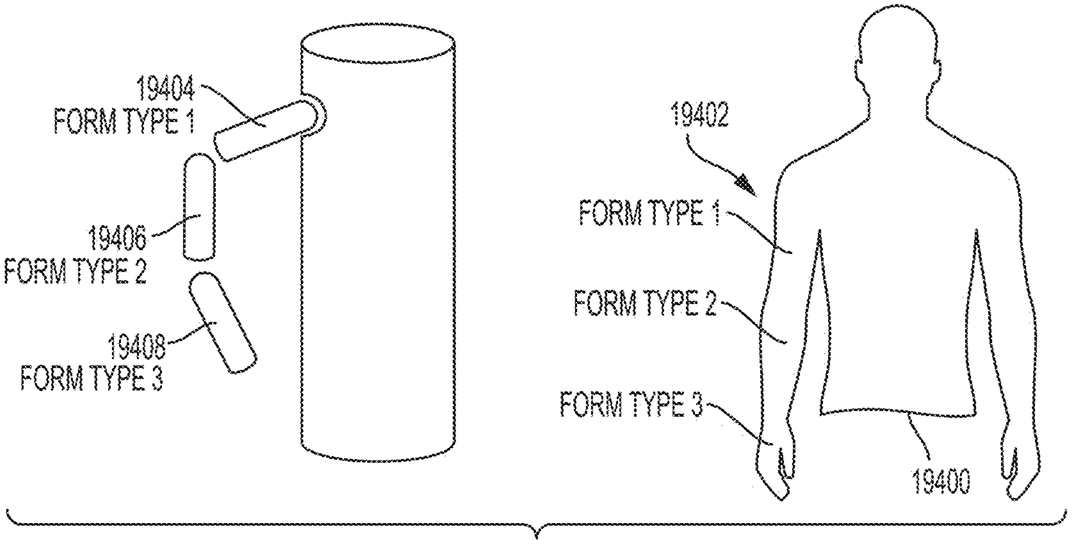
FIG. 19D illustrates a multi-segment rigid body system comprising segments corresponding to body parts of a user, in accordance with some embodiments described herein.
Figure 19E:
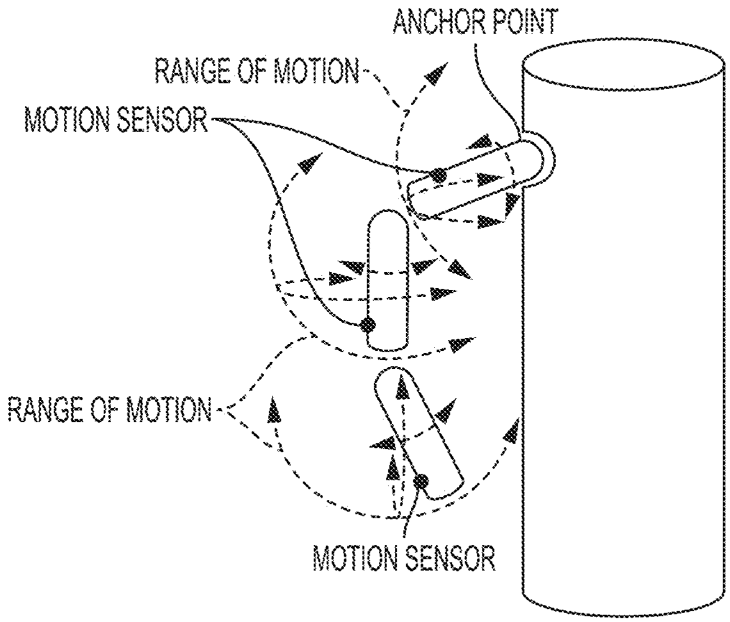
FIG. 19E depicts the various range of motion of each of the segments shown in FIG. 19D, in accordance with some embodiments of the technology described herein.

FIG. 19D depicts a multi-segment articulated rigid body system with more than two segments. Like FIG. 19C, this drawing again demonstrates how the human arm (in this case including the user's hand) is a segmented form fixed at the shoulder. In particular, as shown here the human torso 19400 and the user's right arm 19402 are represented by three (3) rigid forms 19404, 19406 and 19408 (each of a distinct type as indicated) corresponding to the user's upper arm, forearm, and hand. FIG. 19E depicts this rigid body system and the range of motion of each segment.

Figure 19F:
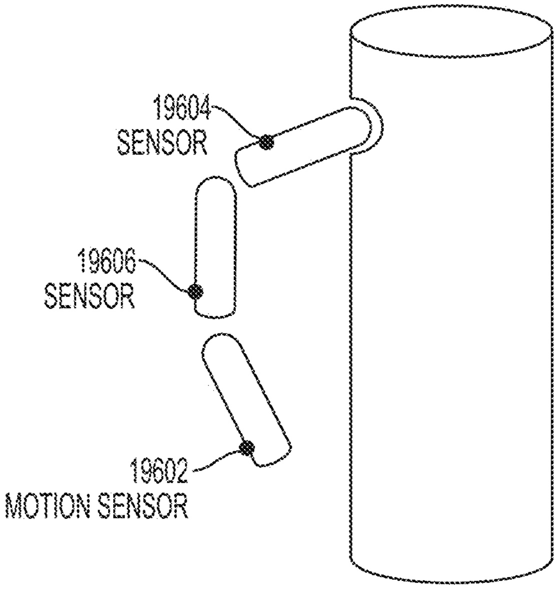
FIG. 19F depicts how movement sensors may be positioned on each segment to capture movement, in accordance with some embodiments of the technology described herein.

FIG. 19F depicts how movement sensors may be positioned on each segment to capture a user's movements, in some embodiments. As shown in FIG. 19F, the movement sensor 19602 may be an autonomous movement sensor, while the sensors 19604 and 19606 may be autonomous movement sensors and/or non-autonomous position sensors. In the latter case, an auxiliary motion tracking sub-system may be used during the training phase. Data collected by the movement sensors 19602, 19604, and 19606 may be used to train a statistical model for generating spatial information for segments in a multi-segment articulated rigid body system. For example, the signals obtained by the sensor 19602 may be provided as inputs (with or without pre-processing) to a statistical model being trained and signals generated by sensors 19604 and 19606 may be used to generate corresponding target outputs that the statistical model is to produce in response to application of the inputs. Such data sets comprising inputs (obtained or derived from measurements made by sensor 19602) and corresponding outputs (obtained or derived from measurements made by sensors 19604 and 19606) may be used to train a statistical model in accordance with some embodiments.

Figure 19G:
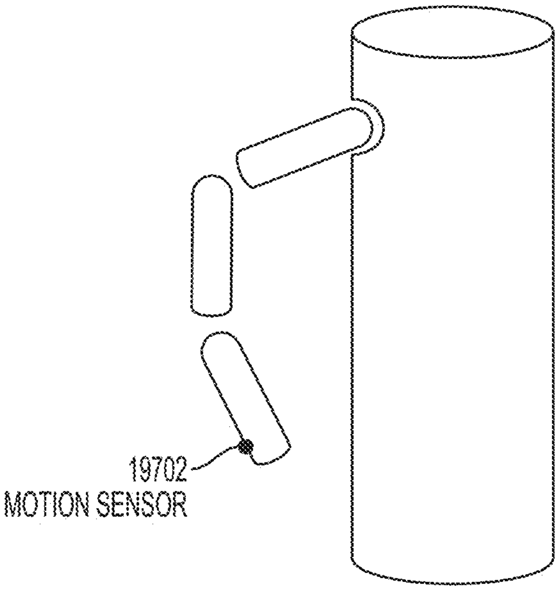
FIG. 19G illustrates an embodiment where measurements obtained by a smaller number of sensors than segments in an articulated rigid body system may be used in conjunction with a trained statistical model to generate spatial information, in accordance with some embodiments of the technology described herein.

FIG. 19G depicts an embodiment in which a single autonomous movement sensor 19702 is coupled to a lower segment. Measurements obtained by the sensor 19702 (with or without pre-processing) may be provided as inputs to a trained statistical model (e.g., a statistical model trained using data gathered by sensors 19602, 19604, and 19606) and the responsive output generated by the trained statistical model may be used to determine spatial information for one or more of the segments of the multi-segment articulated rigid body system. For example, the responsive output may indicate (or may be processed to determine) position and/or orientation for each of one or more segments of an articulated rigid body system. As one non-limiting example, movement sensor may be coupled to a user's wrist and the responsive output may indicate (or may be processed to determine) the position and/or orientation of the user's hand, forearm, and/or upper arm in 3D space (e.g., in a torso reference frame or any other suitable reference frame). As another example, the responsive output may indicate (or may be processed to determine) joint angles between two or more connected segments of the multi-segment articulated rigid body system. As one non-limiting example, movement sensor may be coupled to a user's wrist and the responsive output may indicate (or may be processed to determine) the joint angle between the user's hand and forearm and/or between the user's forearm and upper arm.

Although there only a single motion sensor shown in the illustrative example of FIG. 19G, in another example, there may be two movement sensors coupled to two of the three segments. Measurements obtained by two sensors (with or without pre-processing) may be provided as inputs to a trained statistical model (e.g., a statistical model trained using data gathered by sensors 19602, 19604, and 19606) and the responsive output generated by the trained statistical model may be used to determine spatial information for one or more of the segments of the multi-segment articulated rigid body system. For example, the responsive output may indicate (or may be processed to determine) position for each of one or more segments of an articulated rigid body system (e.g., relative to an anchor point of the anchored segment or with respect to any other suitable reference frame).

More generally, in some embodiments, an articulated rigid body system may have multiple segments and measurements obtained from autonomous movement sensors coupled to a proper subset of the segments (such that there are fewer autonomous movement sensors than there are segments) may be used to estimate spatial information for any segment(s) to which an autonomous movement sensor is not coupled to (e.g., to estimate position and/or orientation information for any segment(s) to which an autonomous movement sensor is not coupled to, estimate position information for any segment(s) to which an autonomous movement sensor is coupled to, etc.).

Figure 19H:
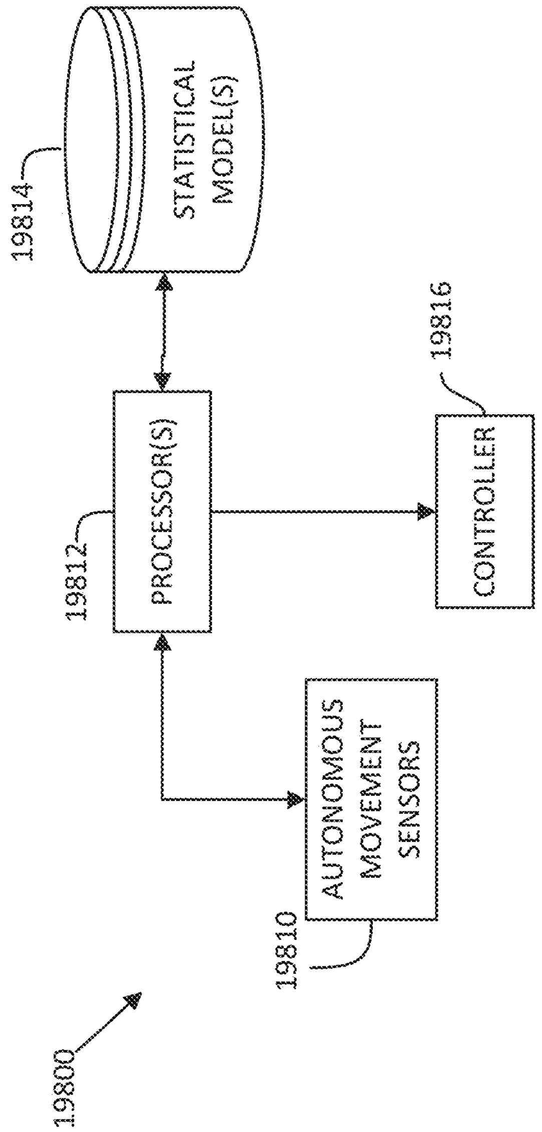
FIG. 19H is a schematic diagram of a computer-based system for generating spatial information in accordance with some embodiments of the technology described herein.

FIG. 19H is a schematic diagram of a system 19800 for generating spatial information in accordance with some embodiments of the technology described herein. The system includes a plurality of autonomous movement sensors 19810 configured to record signals resulting from the movement of portions of a human body. As used herein, the term "autonomous movement sensors" refers to sensors configured to measure the movement of body segments without requiring the use of external sensors, examples of which include, but are not limited to, cameras or global positioning systems. Autonomous movement sensors 19810 may include one or more Inertial Measurement Units (IMUs), which measure a combination of physical aspects of motion, using, for example, an accelerometer and a gyroscope. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso (e.g., arms, legs) as the user moves over time.

In some embodiments, autonomous movement sensors may be arranged on one or more wearable devices configured to be worn around the lower arm or wrist of a user. In such an arrangement, the autonomous movement sensor may be configured to track movement information (e.g., positioning and/or orientation over time) associated with one or more arm segments, to determine, for example whether the user has raised or lowered his or her arm.

Each of autonomous movement sensors 19810 may include one or more movement sensing components configured to sense movement information. In the case of IMUs, the movement sensing components may include one or more accelerometers, gyroscopes, magnetometers, or any combination thereof to measure characteristics of body motion, examples of which include, but are not limited to, acceleration, angular velocity, and sensed magnetic field around the body.

In some embodiments, the output of one or more of the movement sensing components may be processed using hardware signal processing circuitry (e.g., to perform amplification, filtering, and/or rectification). In other embodiments, at least some signal processing of the output of the movement sensing components may be performed in software. Thus, signal processing of autonomous signals recorded by autonomous movement sensors 19810 may be performed in hardware, software, or by any suitable combination of hardware and software, as aspects of the technology described herein are not limited in this respect.

In some embodiments, the recorded sensor data may be processed to compute additional derived measurements that are then provided as input to a statistical model. For example, recorded signals from an IMU sensor may be processed to derive an orientation signal that specifies the orientation of a rigid body segment over time. Autonomous movement sensors 19810 may implement signal processing using components integrated with the movement sensing components, or at least a portion of the signal processing may be performed by one or more components in communication with, but not bodily integrated with the movement sensing components of the autonomous sensors.

In some embodiments, at least some of the plurality of autonomous sensors 19810 are arranged as a portion of a wearable device configured to be worn on or around part of a user's body. For example, in one non-limiting example, one or more IMU sensors may be arranged on an adjustable and/or elastic band such as a wristband or armband configured to be worn around a user's wrist or arm. Alternatively, at least some of the autonomous sensors may be arranged on a wearable patch configured to be affixed to a portion of the user's body.

System 19800 also includes one or more computer processors 19812 programmed to communicate with autonomous movement sensors 19810. For example, signals recorded by one or more of the autonomous sensors 19810 may be provided to processor(s) 19812, which may be programmed to perform signal processing, non-limiting examples of which are described above. Processor(s) 19812 may be implemented in hardware, firmware, software, or any combination thereof. Additionally, processor(s) 19812 may be co-located on a same wearable device as one or more of the autonomous sensors or may be at least partially located remotely (e.g., processing may occur on one or more network-connected processors).

System 19800 also includes datastore 19814 in communication with processor(s) 19812. Datastore 19814 may include one or more storage devices configured to store information describing a statistical model used for generating spatial information for one or more segments of a multi-segment articulated rigid body system based on signals recorded by autonomous sensors 19810 in accordance with some embodiments. Processor(s) 19812 may be configured to execute one or more algorithms that process signals output by the autonomous movement sensors 19810 to train a statistical model stored in datastore 19814, and the trained (or retrained) statistical model may be stored in datastore 19814 for later use in generating spatial information. Non-limiting examples of statistical models that may be used in accordance with some embodiments to generate spatial information for articulated rigid body system segments based on recorded signals from autonomous sensors are discussed herein.

In some embodiments, processor(s) 19812 may be configured to communicate with one or more of autonomous movement sensors 19810, for example to calibrate the sensors prior to measurement of movement information. For example, a wearable device may be positioned in different orientations on or around a part of a user's body and calibration may be performed to determine the orientation of the wearable device and/or to perform any other suitable calibration tasks. Calibration of autonomous movement sensors 19810 may be performed in any suitable way, and embodiments are not limited in this respect. For example, in some embodiments, a user may be instructed to perform a particular sequence of movements and the recorded movement information may be matched to a template by virtually rotating and/or scaling the signals detected by the sensors. In some embodiments, calibration may involve changing the offset(s) of one or more accelerometers, gyroscopes, or magnetometers.

System 19800 also includes one or more controllers 19816 configured to receive a control signal based, at least in part, on processing by processor(s) 19812. As discussed in more detail below, processor(s) 19812 may implement one or more trained statistical models 19814 configured to predict spatial information based, at least in part, on signals recorded by one or more autonomous sensors 19810 worn by a user. One or more control signals determined based on the output of the trained statistical model(s) may be sent to controller 19816 to control one or more operations of a device associated with the controller. In some embodiments, controller 19816 comprises a display controller configured to instruct a visual display to display a graphical representation of a computer-based musculo-skeletal representation (e.g., a graphical representation of the user's body or a graphical representation of a character (e.g., an avatar in a virtual reality environment)) based on the predicted spatial information. For example, a computer application configured to simulate a virtual reality environment may be instructed to display a graphical representation of the user's body orientation, positioning and/or movement within the virtual reality environment based on the output of the trained statistical model(s). The positioning and orientation of different parts of the displayed graphical representation may be continuously updated as signals are recorded by the autonomous movement sensors 19810 and processed by processor(s) 19812 using the trained statistical model(s) 19814 to provide a computer-generated representation of the user's movement that is dynamically updated in real-time. In other embodiments, controller 19816 comprises a controller of a physical device, such as a robot. Control signals sent to the controller may be interpreted by the controller to operate one or more components of the robot to move in a manner that corresponds to the movements of the user as sensed using the autonomous movement sensors 19810.

Controller 19816 may be configured to control one or more physical or virtual devices, and embodiments of the technology described herein are not limited in this respect. Non-limiting examples of physical devices that may be controlled via controller 19816 include consumer electronics devices (e.g., television, smartphone, computer, laptop, telephone, video camera, photo camera, video game system, appliance, etc.), vehicles (e.g., car, marine vessel, manned aircraft, unmanned aircraft, farm machinery, etc.), robots, weapons, or any other device that may receive control signals via controller 19816.

In yet further embodiments, system 19800 may not include one or more controllers configured to control a device. In such embodiments, data output as a result of processing by processor(s) 19812 (e.g., using trained statistical model(s) 19814) may be stored for future use (e.g., for analysis of a health condition of a user or performance analysis of an activity the user is performing).

In some embodiments, during real-time movement tracking, information sensed from a single armband/wristband wearable device that includes at least one IMU is used to reconstruct body movements, such as reconstructing the position and orientation of both the forearm and upper arm relative to a torso reference frame using the single arm/wrist-worn device, and without the use of external devices or position determining systems. For brevity, determining both position and orientation may also be referred to herein generally as determining movement.

Some embodiments are directed to using a statistical model for predicting spatial information for segments of an articulated rigid body system representing body parts of a user based on signals recorded from wearable autonomous sensors. The statistical model may be used to predict the spatial information without having to place sensors on each segment of the rigid body that is to be represented in a computer-generated musculo-skeletal representation of user's body. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model though training based on recorded sensor data. As described in more detail below, the constraints may comprise part of the statistical model itself being represented by information (e.g., connection weights between nodes) in the model.

In some embodiments, system 19800 may be trained to predict spatial information as a user moves. In some embodiments, the system 19800 may be trained by recording signals from autonomous movement sensors 19810 (e.g., IMU sensors) and position information recorded from position sensors worn by one or more users as the user(s) perform one or more movements. The position sensors may measure the position of each of a plurality of spatial locations on the user's body as the one or more movements are performed during training to determine the actual position of the body segments. After such training, the system 19800 may be configured to predict, based on a particular user's autonomous sensor signals, spatial information (e.g., a set of joint angles) that enable the generation of spatial information and using the spatial information to generate a musculo-skeletal representation without the use of the position sensors.

In some embodiments, after system 19800 is trained to predict, based on a particular user's autonomous sensor signals, the spatial information, a user may utilize the system 19800 to perform a virtual or physical action without using position sensors. For example, when the system 19800 is trained to predict with high accuracy (e.g., at least a threshold accuracy), the spatial information, the predictions themselves may be used to determine the musculo-skeletal position information used to generate a musculo-skeletal representation of the user's body.

As discussed herein, some embodiments are directed to using a statistical model for generation of spatial information to enable the generation of a computer-based musculo-skeletal representation. In some embodiments, the statistical model may be used to predict the spatial musculo-skeletal position information based on signals gathered by a single IMU sensor worn by the user (e.g., on his wrist) as the user performs one or more movements.

Figure 19I:
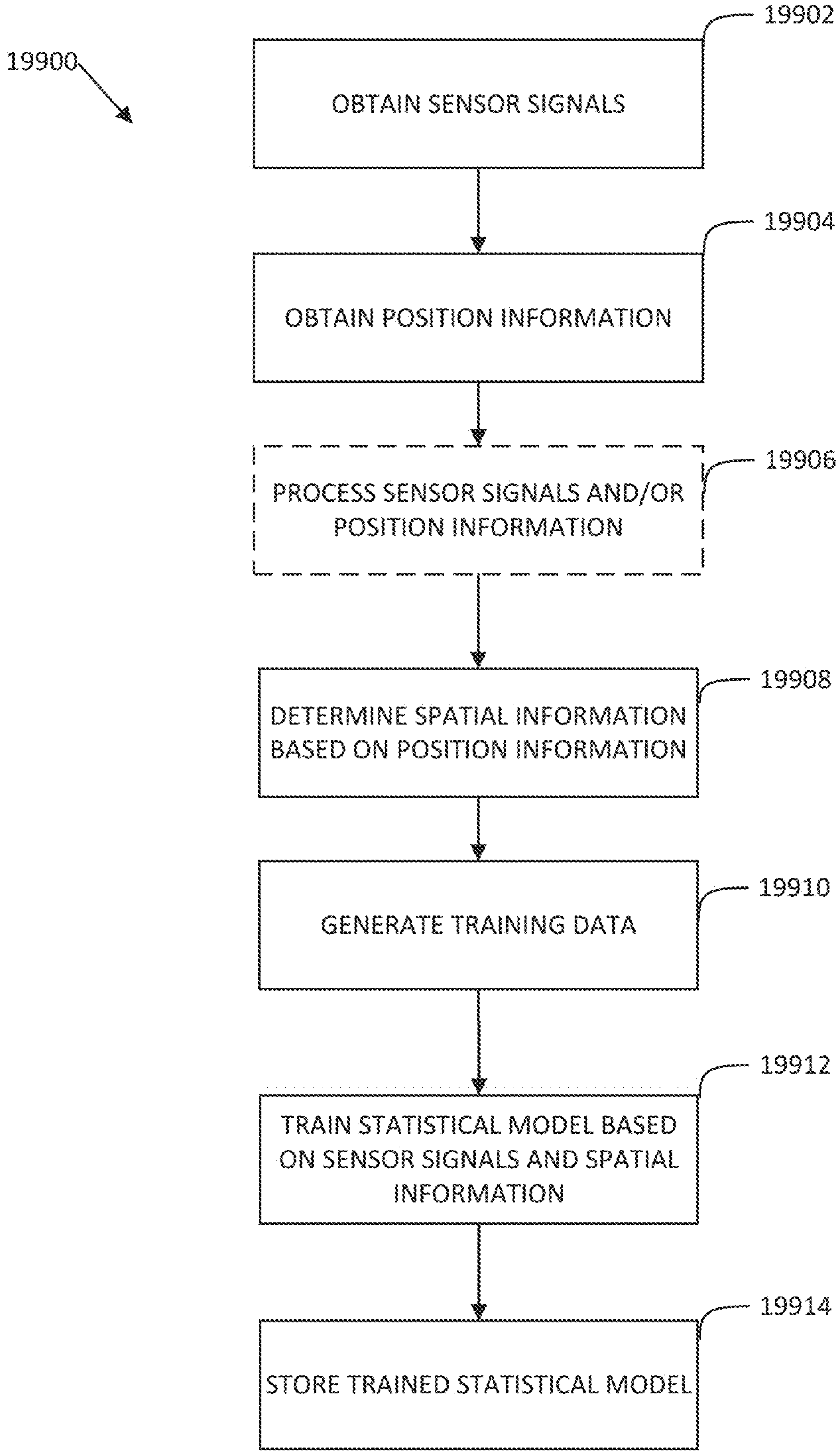
FIG. 19I is a flowchart of an illustrative process for training a statistical model for generating spatial information, in accordance with some embodiments of the technology described herein.

FIG. 19I describes a process 19900 for generating (sometimes termed "training" herein) a statistical model using signals recorded from autonomous sensors worn by one or more users. Process 19900 may be executed by any suitable computing device(s), as aspects of the technology described herein are not limited in this respect. For example, process 19900 may be executed by processors 19812 described with reference to FIG. 19H. As another example, one or more acts of process 19900 may be executed using one or more servers (e.g., servers included as a part of a cloud computing environment). For example, at least a portion of act 19912 relating to training of a statistical model (e.g., a neural network) may be performed using a cloud computing environment.

Process 19900 begins at act 19902, where a plurality of sensor signals are obtained for one or multiple users performing one or more movements (e.g., typing on a keyboard, moving a video game controller, moving a virtual reality controller). In some embodiments, the plurality of sensor signals may be recorded as part of process 19900. In other embodiments, the plurality of sensor signals may have been recorded prior to the performance of process 19900 and are accessed (rather than recorded) at act 19902.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of autonomous movement sensors located in any suitable location(s) to detect the user's movements that are relevant to the task performed. For example, after a user is instructed to perform a task with his/her right hand, the sensor signals may be recorded by one or more IMU sensors arranged to predict the joint angle of the user's arm relative to the user's torso. As another example, after a user is instructed to perform a task with his/her leg (e.g., to kick an object), sensor signals may be recorded by one or more IMU sensors arranged to predict the joint angle of the user's leg relative to the user's torso.

In some embodiments, the sensor signals obtained in act 19902 correspond to signals obtained from one or multiple IMU sensors and a statistical model may be trained based on the sensor signals recorded using the IMU sensor(s). The trained statistical model may be trained, using the recorded sensor signal, to predict spatial information for one or more of the user's limbs which may be moving as the user performs a task (e.g., position and/or orientation of the user's hand, forearm, upper arm, and/or wrist, and/or one or more joint angles between the hand, forearm and/or upper arm). For example, the statistical model may be trained to predict spatial information for the wrist and/or hand during performance of a task such as grasping and twisting an object such as a doorknob.

In some embodiments, the sensor signals obtained at act 19902 may be obtained from multiple IMU sensors, but the statistical model being trained may be configured to receive input from a subset of the multiple IMU sensors (e.g., only a single IMU sensor, which for example may be worn on a user's wrist). In such embodiments, during training, sensor signals obtained from a subset of the multiple IMUs may be provided (with or without pre-processing) as input to the statistical model being trained while sensor signals obtained from the other of the multiple IMUs (i.e., the IMUs not in the subset) may be used (with or without pre-processing) to generate data representing the target (or "ground truth") output that the statistical model is to produce in response to the input signals. As further described below, in some embodiments, the sensor signals obtained by the other of the multiple IMUs may be combined together with position data obtained by one or more autonomous or non-autonomous position or movement sensors to generate data representing the target output. In this way, data from a first set of one or more autonomous movement sensors and one or more other sensors (e.g., one or more non-autonomous position sensors alone or in combination with one or more autonomous movement sensors not in the first set) may be used to train a statistical model, in some embodiments.

In some embodiments, the sensor signals obtained in act 19902 are recorded at multiple time points as a user performs one or multiple movements. As a result, the recorded signal for each sensor may include data obtained at each of multiple time points. Assuming that n autonomous sensors are arranged to simultaneously measure the user's movement information during performance of a task, the recorded sensor signals for the user may comprise a time series of K m-dimensional vectors $\{xk|1\leq k\leq K\}$ at time points t1, t2, . . . , tK during performance of the movements. In some embodiments, n may be different from m.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. Collecting sensor signals and position information from a single user performing the same task repeatedly and/or from multiple users performing the same task one or multiple times facilitates the collection of sufficient training data to generate a statistical model that can accurately predict spatial information for segments of an articulated rigid body model of a user during performance of the task by the user.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user, for example when using a variational autoencoder with a generative model.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting spatial information associated with multiple different actions that may be taken by the user. For example, training data that incorporates spatial information for multiple actions may facilitate generating a statistical model for predicting spatial information.

As discussed herein, the sensor data obtained at act 19902 may be obtained by recording sensor signals as each of one or multiple users performs each of one or more tasks one or more multiple times. As the user(s) perform the task(s), position information describing the spatial position of different body segments during performance of the task(s) may be obtained in act 19904. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 19902 may be recorded simultaneously with recording of the position information obtained in act 19904. In this example, position information indicating the position of each finger segment over time as the grasping motion is performed is obtained.

Next, process 19900 proceeds to act 19906, where the autonomous sensor signals obtained in act 19902 and/or the position information obtained in act 19904 are optionally processed. For example, the autonomous sensor signals and/or the position information signals may be processed using amplification, filtering, rectification, and/or other types of signal processing techniques. As another example, the autonomous sensor signals and/or the position information signals may be transformed using one or more spatial (e.g., coordinate) transformations, angle transformations, time derivatives, etc.

In embodiments where multiple sensors are used to obtain data ((e.g., multiple IMU sensors, at least one IMU sensor and at least one non-autonomous position sensor, etc.) configured to simultaneously record information during performance of a task, the sensor data for the sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 19900 proceeds to act 19908, where spatial information is determined based on the position information (as collected in act 19904 or as processed in act 19906) and/or at least some of the sensed signals obtained at act 19902. In some embodiments, rather than using recorded spatial (e.g., x, y, z) coordinates corresponding to the position sensors as training data to train the statistical model, a set of derived spatial values are determined based on the recorded position information, and the derived values are used as training data for training the statistical model.

For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 19904 may be represented by a vector of n joint angles at each of a plurality of time points, where n is the number of joints or connections between segments in the articulated rigid body model.

Next, process 19900 proceeds to act 19910, where the time series information obtained at acts 19902 and 19908 is combined to create training data used for training a statistical model at act 19910. The obtained data may be combined in any suitable way. In some embodiments, each of the autonomous sensor signals obtained at act 19902 may be associated with a task or movement within a task corresponding to the spatial information (e.g., positions, orientations, and/or joint angles) determined based on the sensed signals obtained at act 19902 and/or positional information recorded in act 19904 as the user performed the task or movement. In this way, at least some of the sensor signals obtained at act 19902 may be associated with corresponding spatial information (e.g., positions, orientations, and joint angles) and the statistical model may be trained to predict such spatial information when particular sensor signals are recorded during performance of a particular task, as described below with reference to FIG. 19J.

Next, process 19900 proceeds to act 19912, where a statistical model for generating spatial information for one or more segments of an articulated rigid body system is trained using the training data generated at act 19910. The statistical model being trained may take as input a sequence of data sets each of the data sets in the sequence comprising an n-dimensional vector of autonomous sensor data. The statistical model may provide output that indicates, for each of one or more tasks or movements that may be performed by a user, information that indicates (directly or indirectly) spatial information (e.g., position of, orientation of, joint angles between) for one or more segments of a multi-segment articulated rigid body model of the human body. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculo-skeletal position characteristics (e.g., positions of one or more segments, orientation of one or more segments, joint angles between any connected segments). In this way, the neural network may operate as a non-linear regression model configured to predict musculo-skeletal position characteristics from raw or pre-processed sensor measurements. It should be appreciated that, in some embodiments, any other suitable non-linear regression model may be used instead of a neural network, as aspects of the technology described herein are not limited in this respect.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 19912 using the sensor data obtained at act 19902.

In some embodiments, a generative statistical model (e.g., a graphical model) may be employed and spatial information may be obtained from the generative statistical model by application of one or more online inference algorithms. In some embodiments, the generative statistical model may not require a priori training. Non-limiting examples of online inference algorithms include Kalman filtering, extended Kalman filtering, unscented Kalman filtering, and particle filtering.

As another example, in some embodiments, the statistical model may take as input, features derived from the sensor data obtained at act 19902. In such embodiments, the statistical model may be trained at act 19912 using features extracted from the sensor data obtained at act 19902. Input features to be provided as training data to the statistical model may be derived from the sensor data obtained at act 19902 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model, which may be a neural network or any other suitable type of non-linear regression model, in some embodiments. As another non-limiting example, the sensor data may be transformed using one or more spatial transformations (e.g., coordinate transformations), conversions between angles and quaternia, time derivatives, relative angles, etc.

In some embodiments, at act 19912, values for parameters of the statistical model may be estimated from the training data generated at act 19910. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In some embodiments where the statistical model is a recurrent neural network (e.g., an LSTM), the statistical model may be trained using stochastic gradient descent and backpropagation through time. The training may employ a mean squared error loss function and/or any other suitable loss function, as aspects of the technology described herein are not limited in this respect.

Next, process 19900 proceeds to act 19914, where the trained statistical model is stored (e.g., in datastore 19814). The trained statistical model may be stored using any suitable format, as aspects of the technology described herein are not limited in this respect. In this way, the statistical model generated during execution of process 19900 may be used at a later time, for example, in accordance with the process described below with reference to FIG. 19J.

Figure 19J:
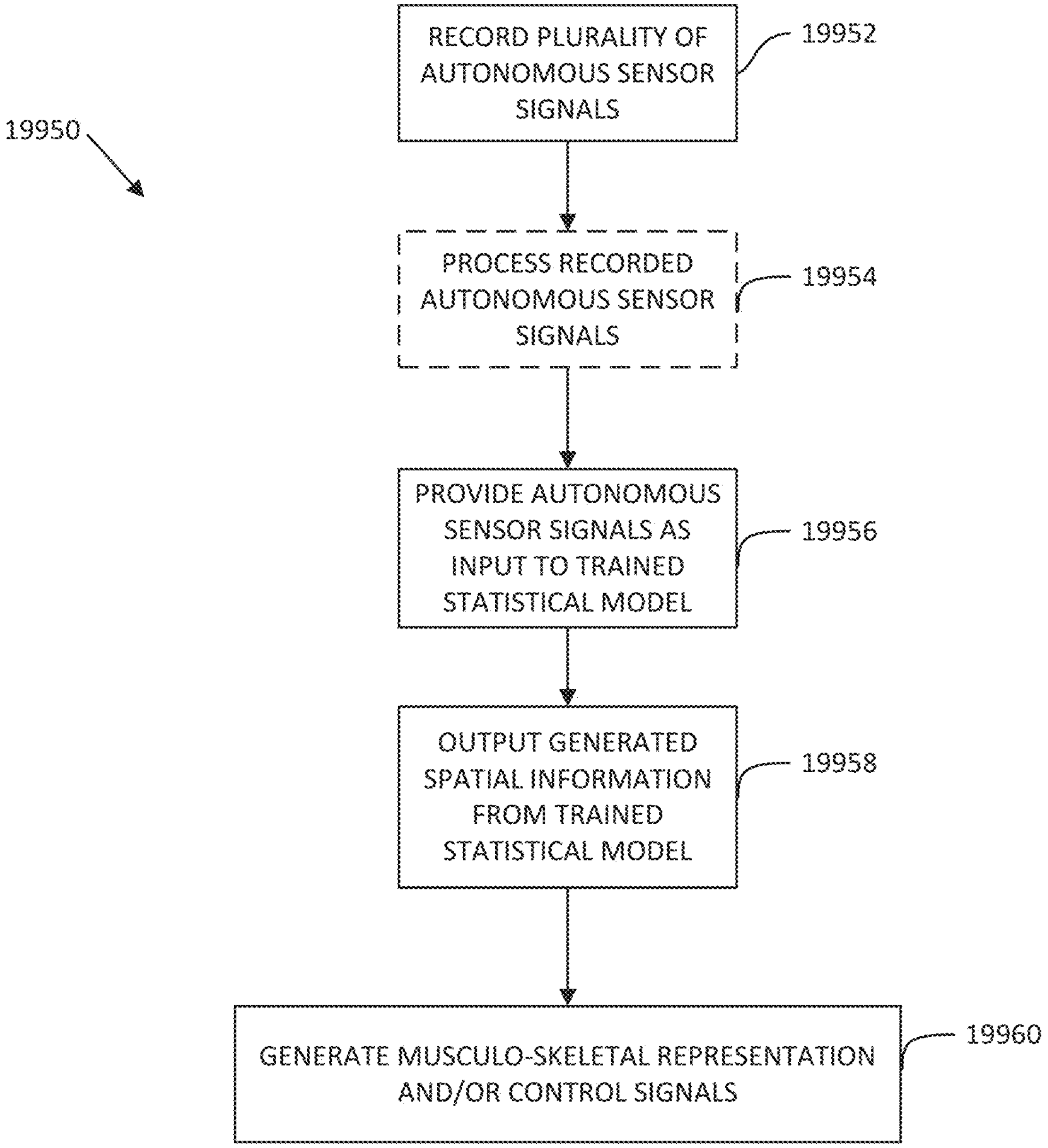
FIG. 19J is a flowchart of an illustrative process for generating spatial information by providing movement sensor measurements to a trained statistical model, in accordance with some embodiments of the technology described herein.

FIG. 19J is a flowchart of an illustrative process 19950 for generating spatial information by using recorded movement sensor measurements from at least one (and, in some embodiments, a single) autonomous sensor and a trained statistical model, in accordance with some embodiments of the technology described herein.

Process 19950 begins in act 19952, where signals are obtained from one or more of autonomous movement sensors arranged on or near the surface of a user's body to record activity associated with movements of the body during performance of a task. In some embodiments, the autonomous movement sensor(s) consist of a single IMU sensor. In other embodiments, the autonomous movement sensors consist of multiple IMU sensors. In some embodiments, the autonomous movement sensor(s) comprise one or more accelerometers, one or more gyroscopes, and/or one or more magnetometers. The autonomous movement sensor(s)

may be arranged on a wearable device configured to be worn on or around a part of the user's body, such as the user's arm or leg.

Process 19950 then proceeds to act 19954, where the signals recorded by the autonomous sensors are optionally processed. For example, the signals may be processed using amplification, filtering, rectification, and/or other types of signal processing techniques. As another example, the signals may be processed using one or more spatial transformations (e.g., coordinate transformations), conversions between angles and quaternia, and/or time derivatives.

In some embodiments, filtering includes temporal filtering implemented using convolution operations and/or equivalent operations in the frequency domain (e.g., after the application of a discrete Fourier transform). In some embodiments, the signals are processed in the same or similar manner as the signals recorded in act 19902 of process 19900 described above and used as training data to train the statistical model.

Process 19950 then proceeds to act 19956, where the autonomous sensor signals are provided as input to a statistical model (e.g., a neural network) trained using one or more of the techniques described above in connection with process 19900. In some embodiments that continuously record autonomous signals, the continuously recorded autonomous signals (raw or processed) may be continuously or periodically provided as input to the trained statistical model for prediction of spatial information (e.g., positions of one or more segments, orientation of one or more segments, joint angles between any connected segments) for the given set of input sensor data. As discussed herein, in some embodiments, the trained statistical model is a user-independent model trained based on autonomous sensor and position information measurements from a plurality of users. In other embodiments, the trained model is a user-dependent model trained on data recorded from the individual user from which the data recorded in act 19952 is also acquired.

After the trained statistical model receives the sensor data as a set of input parameters, process 19900 proceeds to act 19958, where generated spatial information is output from the trained statistical model. As discussed herein, in some embodiments, the generated spatial information may comprise position, orientation, and/or angular information (e.g., a set of joint angles) for segments of a multi-segment articulated rigid body model representing at least a portion of the user's body.

After spatial information is generated at act 19958, process 19950 proceeds to act 19960, where the spatial information may be used in any of numerous ways. For example, in some embodiments, the spatial information may be used to generate a computer-based musculo-skeletal representation based on the spatial information generated at act 19958. The computer-based musculo-skeletal representation may be generated in any suitable way. For example, a computer-based musculo-skeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculo-skeletal model may define the orientation of each of the connected rigid body segments relative to each other and a reference frame, such as the torso of the body. As new sensor data is measured and processed by the statistical model to provide new predictions of the spatial information (e.g., an updated set of joint angles), the computer-based musculo-skeletal representation of the user's body may be updated based on the updated set of joint angles determined based on the output of the statistical model. In this way the computer-based musculo-skeletal representation is dynamically updated in real-time as autonomous sensor data is continuously recorded.

The computer-based musculo-skeletal representation may be represented and stored in any suitable way, as embodiments of the technology described herein are not limited with regard to the particular manner in which the representation is stored. Additionally, although referred to herein as a "musculo-skeletal" representation, to reflect that muscle activity may be associated with the representation in some embodiments, as discussed in more detail below, it should be appreciated that some musculo-skeletal representations used in accordance with some embodiments may correspond to skeletal structures only, muscular structures only or a combination of skeletal structures and muscular structures in the body.

As another example, in some embodiments, the spatial information may be used to generate one or more control signals which may be sent to a controller as part of act 19960 of process 19950. For example, when the controller is a display controller, the control signal(s) may instruct a display in communication with the display controller to display a graphical rendering based on the generated spatial representation. For a computer application that provides a virtual reality environment, the graphical rendering may be a rendering of the user's body or another computer-generated character (e.g., an avatar) based on a current state of the musculo-skeletal representation. As sensor data is collected, the rendered character may be dynamically updated to provide an animation of the rendered character that mimics the movements of the user wearing the wearable device including the autonomous sensors. In a virtual reality environment, a result of the character's animation may be the ability of the animated character to interact with objects in the virtual reality environment, examples of which include, but are not limited to, grasping a virtual object.

In some embodiments, in which the controller is configured to control a physical device (e.g., a robot), the control signal(s) sent to the controller may instruct the physical device to perform one or more actions corresponding to the generated spatial information. For example, when the device being controlled is a robot, the control signal(s) may instruct the controller of the robot to mimic the movements of the user or otherwise control an operation of the robot based on the generated spatial information.

In yet further embodiments, the generated spatial information may be used to track the user's movements over time and provide a control signal to a controller that provides feedback to the user about the tracked movements. For example, the generated and dynamically updated spatial information may track the position of the user's hands as the user is typing on a keyboard and provide feedback to the user when it is determined that the user is likely to experience muscle fatigue due to the position of their hands as they type. The feedback may be provided in any suitable way using, for example, haptic feedback, audio feedback, and/or visual feedback as embodiments of the technology described herein are not limited based on how the feedback is provided.

In some embodiments at least some of the sensor data recorded during use of the system may be used as training data to train the statistical model to enable the model to continue to refine the statistical relationships between movement-based information recorded by the autonomous sensors and spatial information output by the statistical model. Continuous training of the statistical model may result in improved performance of the model in generating spatial information for movements that are performed by the user in a consistent manner.

Although process 19950 is described herein as being performed after process 19900 has completed and a statistical model has been trained, in some embodiments, process 19900 and 19950 may be performed together. For example, the statistical model may be trained in real-time, as a user is performing movements to interact with a virtual or physical object, and the trained statistical model may be used as soon as the model has been trained sufficiently to provide reliable predictions. In some embodiments, this may be performed using a variational autoencoder.

In some embodiments, during the learning phase the measurement data generated from movement sensors affixed to the non-anchored segment may be augmented with additional measurement data. This additional measurement data may be data generated from any secondary measurement system and, which may be used to precisely establish the position and orientation of the non-anchored segment. In some embodiments, the secondary measurement system may be an external system, such as GPS, LIDAR, or the like. In some embodiments, the additional measurement data may be generated from an IMU coupled to the anchored segment together with measurements or estimates of segment lengths. It should be appreciated, however, that such additional measurement data is not required and may be used, when available, to augment already available measurement data.

In some embodiments, in the scenario involving a user's arm movement, the statistical model can take on different forms. For example, in some embodiments, the statistical model may be trained to determine the position of the sensor on the wrist from orientation information of the forearm, which may be obtained from a single IMU (e.g., using sensor fusion techniques); from this information, inverse kinematics may be used to determine aspects of the orientation of the upper arm. As another example, the statistical model may be trained to determine the orientation of the upper arm; from this information, forward kinematics may be used to determine the position of the wrist. Converting between the two viewpoints (wrist position to upper arm orientation, or vice versa) may requires additional information, such as information specifying arm segment lengths. Such information may be provided separately or, in some embodiments, may be inferred from the measurement data.

In some embodiments, a movement device may be an inertial measurement unit (IMU). The IMU may be of any suitable type, as aspects of the technology described herein are not limited in this respect. In some embodiments, an IMU may comprise one or more accelerometers, one or more gyroscopes, one or magnetometers, and/or any other suitable device for measuring movement. In some embodiments, the IMU may be a nine-axis device. In some embodiments, the IMU may be a commercially-available IMU sensor, or it may be some other wearable technology (e.g., an Apple® watch, the FitBit™ activity tracker, and many others) that provides (or is augmented to provide) the relevant IMU-type data.

As described herein, in some embodiments, a trained statistical model may be used to generate spatial information data. In some embodiments, where the trained statistical model is a neural network, the neural network may be trained at least in part by using commercially-available or open source software libraries, such as the Theano Python library.

The techniques described herein provide significant advantages. As has been described, in some embodiments, a movement sensor (e.g., an IMU) may be positioned on a user's wrist and may be configured to generate a stream of measurements. In turn, the generated measurements may be used together with the statistical models described herein to estimate the position and/or orientation of the user's wrist in 3D space. In some embodiments, the estimated position may be relative to a fixed point such as the user's shoulder.

Thus, it should be appreciated that the approach herein discloses a system that reconstructs the configuration dynamics of a mechanical system consisting of articulated rigid body segments without measuring the absolute position and without affixing a sensor to each segment of the rigid body system. In some embodiments, the mechanical system may be a human skeleton, though the techniques described herein may be used with any rigid body mechanical system wherein it is desired to measure the absolute position of a set of segments that comprise the articulated rigid body system without necessarily using a sensor on each segment during the real-time analysis phase. Thus, in some embodiments, training data may be collected by placing one or more devices with autonomous sensors on a subset of the rigid body system. Such sensors may include one or more IMUs, one or more accelerometers, one or more gyroscopes, and/or one or more magnetometers.

In some embodiments, measurement data collected using movement sensors may be used in conjunction with a trained statistical model to obtain spatial information for segments of an articulated rigid body system (e.g., position of one or more segments, orientation of one or more segments, angles between one or more pairs of segments, etc.). The statistical model may be used to obtain spatial information for segments that do not have any attached sensors. In some embodiments, the subject matter herein can use algorithms that use explicit articulation constraints and patterns of rigid body system movements, such as model-based approaches, constraints, and statistical priors. In some embodiments, the techniques can use statistical models that encode articulation constraints and patterns of rigid body system movements learned from data. Non-limiting examples of such statistical models include recurrent neural networks, long short-term memory neural networks, and/or any other suitable type of neural networks. Non-limiting examples of applications of the disclosed subject matter include uses for reconstructing human movements with wearable devices, such as reconstructing the movement of both the forearm and upper arm using a single wrist-worn device.

It should be appreciated that, although the techniques described herein may be applied for controlling virtual reality applications, the techniques described herein are not limited to only such applications. For example, the techniques described herein may be used for controlling a robot.

The techniques herein generally provide for the above-described improvements to a technology or technical field (namely, motion sensing devices, systems and methods), as well as the specific technological improvements to other kinematics-based interfaces and process, such as described above.

Figure 19K:
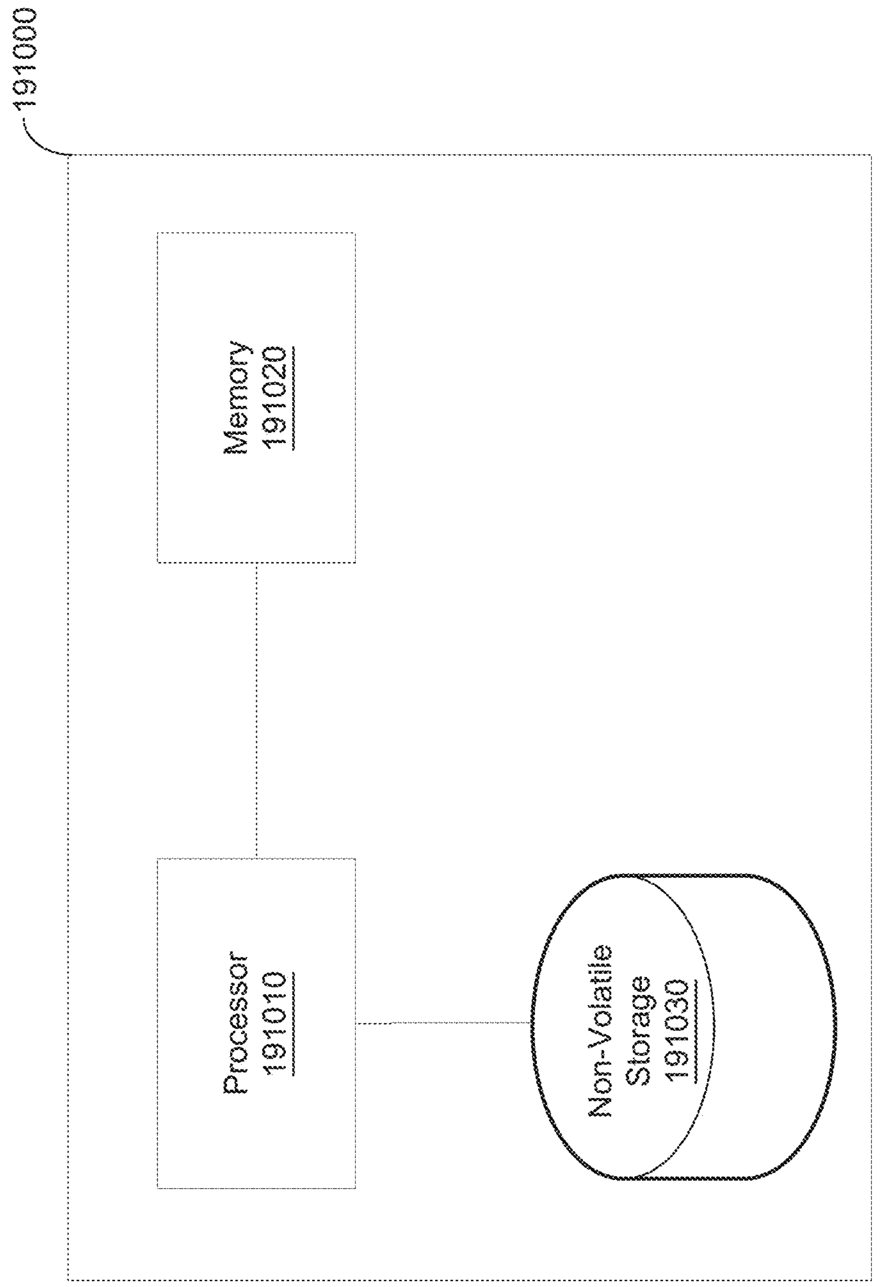
FIG. 19K is a diagram of an illustrative computer system that may be used in implementing some embodiments of the technology described herein.

An illustrative implementation of a computer system 191000 that may be used in connection with any of the embodiments of the disclosure provided herein is shown in FIG. 19K. The computer system 191000 may include one or more processors 191010 and one or more articles of manufacture that comprise non-transitory computer-readable storage media (e.g., memory 191020 and one or more non-volatile storage media 191030). The processor 191010 may control writing data to and reading data from the memory 191020 and the non-volatile storage device 191030 in any suitable manner. To perform any of the functionality described herein, the processor 191010 may execute one or more processor-executable instructions stored in one or more non-transitory computer-readable storage media (e.g., the memory 191020), which may serve as non-transitory computer-readable storage media storing processor-executable instructions for execution by the processor 191010.

The terms "program" or "software" are used herein in a generic sense to refer to any type of computer code or set of processor-executable instructions that can be employed to program a computer or other processor to implement various aspects of embodiments as discussed herein. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIGS. 19B, 19I, and 19J) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

According to some aspects of the technology described herein a method of determining orientations and positions of segments of a multi-segment articulated rigid body system is provided, wherein one of the segments is anchored at an anchor point. In some embodiments, the method comprises: during a learning phase, receiving a first set of measurement data generated from movement sensors affixed to a non-anchored segment together with additional measurement data for determining an orientation and/or position of the non-anchored segment relative to the anchor point; processing, via a learning algorithm, the first set of measurement data and the additional measurement data to fit parameters of a statistical model from which estimates of the orientation and positioning of the non-anchored segment relative to the anchor point are derivable; during an analysis phase, receiving a second set of measurement data generated from the movement sensors affixed to the non-anchored segment of the articulated rigid body system; and applying the second set of measurement data against the statistical model to determine time-varying orientation and position of the non-anchored segment relative to the anchor point on the first segment.

In some embodiments, the movement sensors are one of: wearable electronic devices, and models (e.g. in the case of training with data from simulated sensors) of such wearable electronic devices.

In some embodiments, the statistical model is a neural network. In some embodiments, the neural network may be a recurrent neural network (e.g., a long short-term memory recurrent neural network). In some embodiments, the neural network may be a variational autoencoder.

In some embodiments, the non-anchored segment of the two-segment articulated rigid body system corresponds to a user's forearm, and the segment of the articulated rigid body system that is anchored at the anchor point corresponds to the user's upper arm.

In some embodiments, the first and second set of measurement data are associated with a same user. In some embodiments, the first set of measurement data is associated with a first user, and the second set of measurement data is associated with a second user that differs from the first user.

In some embodiments, the analysis phase occurs after the learning phase and in real-time.

In some embodiments, the method further includes providing to a host application, as an output, the position and orientation of the non-anchored segment of the multi-segment articulated rigid body system.

In some embodiments, the first set of measurement data is received from a first sensor affixed to a first segment of the articulated rigid body system, together with a second sensor affixed to a second segment of the articulated rigid body system.

Some embodiments provide for a method of determining the time-varying orientations and positions of segments of a two-segment articulated rigid body system, wherein a first segment is anchored at an anchor point to fix its position but not its orientation, and a second segment is connected for articulation relative to the first segment, the second segment being non-anchored, the method comprising: retrieving a statistical model, the statistical model having been generated during a training phase using a first set of measurement data generated from movement sensors affixed to at least the non-anchored segment, the statistical model having parameters that are fitted from the first set of measurement data and from which estimates of an orientation and position of the non-anchored segment relative to the anchor point are derivable; during an analysis phase, receiving a second set of measurement data generated from movement sensors affixed to the non-anchored segment of the two-segment articulated rigid body system; and applying the second set of measurement data against the statistical model to determine time-varying orientation and position of the non-anchored segment relative to the anchor point on the first segment.

In some embodiments, the parameters of the statistical model represent one or more constraints under which the articulated rigid body moves.

In some embodiments, the one or more constraints are biophysical constraints. In some embodiments, at least one constraint is imposed on the statistical model by anatomy. In some embodiments, at least one constraint is imposed on the statistical model by a statistical pattern of movement. In some embodiments, the statistical model is trained to determine a position of a movement sensor on the non-anchored segment, and wherein the method further includes using inverse kinematics to determine at least one aspect of an orientation of the first segment.

In some embodiments, the statistical model is trained to determine an orientation of the anchored segment, wherein the method further includes using forward kinematics to determine a position of the non-anchored segment.

Some embodiments provide for a multi-segment articulated rigid body system with up to n segments, a method to predict a position and orientation of at least one non-anchored rigid body segment, the method comprising: receiving measurement data generated from real or simulated sensors placed on only a subset of the segments; training a neural network based on the received measurement data; and using the neural network model, and in real-time, determining a time-varying orientation and position of the non-anchored rigid body segment relative to an anchor point.

The following describes exemplary calibration techniques for handstate representation modeling using neuromuscular signals according to at least one embodiment of the present disclosure.

Some embodiments are directed to predicting information about the positioning and movements of portions of a user's body (e.g., arm and/or hand) represented as a multi-segment articulated rigid body system with joints connecting the multiple segments of the rigid body system. Signals recorded by wearable neuromuscular sensors placed at locations on the user's body are provided as input to a statistical model trained to predict estimates of the position (e.g., absolute position, relative position, orientation) and forces associated with a plurality of rigid segments in a computer-based representation (e.g., a musculoskeletal representation associated with a hand) when a user performs one or more movements. The combination of position information and force information associated with segments of a musculoskeletal representation associated with a hand is colloquially referred to herein as a "handstate" of the musculoskeletal representation. As a user performs different movements, a trained statistical model interprets neuromuscular signals recorded by the wearable neuromuscular sensors into position and force estimates (handstate information) that are used to update the computer-based representation. As the neuromuscular signals are continuously recorded, the computer-based representation is updated in real time and a visual representation (e.g., of a hand within a virtual reality environment) is optionally rendered based on the current handstate estimates.

Other embodiments are directed to a computerized system configured to calibrate performance of one or more statistical models used to generate a musculoskeletal representation. The system comprises a user interface configured to instruct a user to perform at least one gesture while wearing a wearable device having a plurality of neuromuscular sensors arranged thereon, and at least one computer processor. The at least one computer processor is programmed to control presentation of instructions via the user interface to instruct the user to perform the at least one gesture; and update at least one parameter of the one or more statistical models based, at least in part on a plurality of neuromuscular signals recorded by the plurality of neuromuscular sensors during performance of the at least one gesture by the user.

Other embodiments are directed to a computerized system configured to calibrate performance of one or more statistical models used to generate a musculoskeletal representation. The system comprises at least one computer processor programmed to identify, based on an output of the one or more statistical models, at least one gesture characteristic that the one or more statistical model is poor at estimating, initiate a calibration routine to update at least one parameter of the one or more statistical models to improve the performance of the one or more statistical models to accurately predict the at least one identified gesture characteristic, receive a plurality of neuromuscular signals recorded by a plurality of neuromuscular sensors during performance of at least one gesture that includes the at least one gesture characteristic, and update the at least one parameter of the one or more statistical models based, at least in part on a plurality of neuromuscular signals recorded by the neuromuscular sensors during performance of the at least one gesture by the user.

In one aspect, the at least one computer processor is further programmed to update at least one parameter of the one or more statistical models based, at least in part, on predetermined estimates of one or more of position information, force information, and neuromuscular information for the at least one gesture.

In another aspect, the at least one computer processor is further programmed to: control at least one external device to capture at least one measurement of position and/or force information during performance of the at least one gesture; and update the at least one parameter of the one or more statistical models based, at least in part, on the at least one measurement of position and/or force information.

In another aspect, the at least one external device comprises an imaging device configured to capture at least one image, and the at least one measurement of position is determined based, at least in part, on the at least one image.

In another aspect, the at least one external device comprises an inertial measurement unit.

In another aspect, the at least one external device comprises a plurality of external devices, each of which is configured to capture at least one measurement of position and/or force information during performance of the at least one gesture, and the at least one computer processor is further programmed to: combine the at least one measurement of position and/or force information captured by each of the plurality of external devices; and update the at least one parameter of the one or more statistical models based, at least in part, on the combined measurements of position and/or force.

In another aspect, updating the at least one parameter of the one or more statistical models comprises training the one or more statistical models based, at least in part, on the plurality of neuromuscular signals recorded by the neuromuscular sensors during performance of the at least one gesture by the user.

In another aspect, the one or more statistical models include a trained statistical model, and updating the at least one parameter of the one or more statistical models comprises adjusting one or more parameters provided as input to the trained statistical model without retraining the trained statistical model.

In another aspect, the at least one computer processor is further programmed to provide feedback to the user, and the feedback indicates to the user whether the performance of the at least one gesture has been performed as instructed.

In another aspect, providing feedback to the user comprises providing visual feedback.

In another aspect, instructing the user to perform at least one gesture comprises instructing the user to perform a predetermined set of gestures.

In another aspect, controlling presentation of the instructions via the user interface comprises instructing the user to perform the gestures of the predetermined set in succession.

In another aspect, the at least one computer processor is further programmed to select a new gesture to be performed by the user.

In another aspect, selecting a new gesture to be performed by the user comprises randomly selecting the new gesture from a set of gestures.

In another aspect, selecting a new gesture to be performed by the user comprises selecting a gesture previously performed by the user.

In another aspect, the at least one computer processor is further programmed to: identify, based on an output of the one or more statistical models, at least one gesture characteristic that the one or more statistical model is poor at estimating; and select the new gesture to be performed by the user based on the identified at least one gesture characteristic.

In another aspect, the at least one gesture characteristic comprises a plurality of gesture characteristics, and selecting the new gesture to be performed by the user based on the identified at least one gesture characteristic comprises selecting a new gesture that includes the plurality of gesture characteristics.

In another aspect, each of a first gesture and a second gesture in a set of gestures includes at least two of the plurality of gesture characteristics, and selecting the new gesture to be performed by the user comprises selecting the first gesture as the new gesture when the first gesture includes more of the plurality of gesture characteristics than the second gesture.

In another aspect, the at least one computer processor is further programmed to: control presentation of instructions via the user interface to instruct the user to perform the new gesture; and update at least one parameter of the one or more statistical models based, at least in part on the plurality of neuromuscular signals recorded by the neuromuscular sensors during performance of the new gesture by the user.

In another aspect, the instructions provided via the user interface includes at least one user-interpretable instruction.

In another aspect, the at least one user-interpretable instruction comprises a percentage of force exerted by one or more portions of a hand of the user.

In another aspect, the at least one user-interpretable instruction comprises a percentage of maximum force exerted by pinching at least two fingers of the hand.

In another aspect, the at least one computer processor is further programmed to provide feedback to the user, wherein the feedback indicates to the user a response of the one or more statistical models to performance of the at least one gesture by the user based on the user-interpretable instruction.

In another aspect, the at least one computer processor is further programmed to render a visual representation associated with the hand based on an output of the one or more statistical models.

In another aspect, the output of the one or more statistical models comprises position and force estimates, and rendering the visual representation associated with the hand comprises rendering at least one force metric based on the force estimates on the visual representation associated with the hand.

In another aspect, the at least one computer processor is further programmed to provide feedback to the user describing information about the accuracy and/or completeness of the at least one gesture.

In another aspect, the visual representation is rendered during the updating of the at least one parameter of the one or more statistical models.

In another aspect, the at least one computer processor is further programmed to: continuously track a calibration of a performance of the one or more statistical models during usage of the one or more statistical models following training; and initiate a calibration routine when the calibration of the performance deviates from an acceptable calibration threshold by a particular amount.

In another aspect, initiating a calibration routine comprises: controlling presentation of instructions via the user interface to instruct the user to perform one or more additional gestures that includes at least one gesture characteristic for which performance of the one or more statistical models is poor, and updating at least one parameter of at least one of the one or more statistical models based, at least in part, on the plurality of neuromuscular signals recorded by the neuromuscular sensors during performance of the one or more additional gestures by the user.

In another aspect, the musculoskeletal representation is a musculoskeletal representation associated with a hand, and the one or more statistical model are configured to output position and force estimates used to update the musculoskeletal representation associated with the hand.

In another aspect, updating at least one parameter of the one or more statistical models comprises updating a plurality of model parameters, and the at least one computer processor is further programmed to: store a user profile that includes user-specific calibration parameters, wherein the user-specific calibration parameters includes a subset of the plurality of model parameters.

In another aspect, the user-specific calibration parameters include at least one joint stiffness parameter.

Other embodiments are directed to a computerized system configured to calibrate performance of one or more statistical models used to generate a musculoskeletal representation, the system comprising: at least one computer processor programmed to: identify, based on an output of the one or more statistical models, at least one gesture characteristic that the one or more statistical model is poor at estimating; initiate a calibration routine to update at least one parameter of the one or more statistical models to improve the performance of the one or more statistical models to accurately predict the at least one identified gesture characteristic; receive a plurality of neuromuscular signals recorded by a plurality of neuromuscular sensors during performance of at least one gesture that includes the at least one gesture characteristic; and update the at least one parameter of the one or more statistical models based, at least in part, on a plurality of neuromuscular signals recorded by the neuromuscular sensors during performance of the at least one gesture by the user.

Other embodiments are directed to a method of calibrating performance of one or more statistical models used to generate a musculoskeletal representation. The method comprises controlling presentation of instructions via a user interface to instruct the user to perform the at least one gesture, and updating at least one parameter of the one or more statistical models based, at least in part, on a plurality of neuromuscular signals recorded by a plurality of neuromuscular sensors during performance of the at least one gesture by the user.

Other embodiments are directed to a computer-readable medium encoded with a plurality of instructions that, when executed by at least one processor, perform a method. The method comprises controlling presentation of instructions via a user interface to instruct the user to perform the at least one gesture, and updating at least one parameter of the one or more statistical models based, at least in part, on a plurality of neuromuscular signals recorded by a plurality of neuromuscular sensors during performance of the at least one gesture by the user.

Other embodiments are directed to a computerized system configured to calibrate performance of one or more statistical models used to generate a musculoskeletal representation, the system comprising: a plurality of neuromuscular sensors configured to continuously record a plurality of neuromuscular signals, wherein the plurality of neuromuscular sensors are arranged on at least one wearable device; and at least one computer processor is programmed to: process at least some of the plurality of neuromuscular signals using a statistical model to generate the musculoskeletal representation; determine based, at least in part, on at least one aspect of the musculoskeletal representation, that calibration of the statistical model used to generate the musculoskeletal model is needed; initiate a calibration session in response to determining that calibration is needed; update a statistical model configuration based, at least in part, on a plurality of neuromuscular signals recorded by the plurality of neuromuscular sensors and ground-truth data representing position information and/or force information recorded during the calibration session, to produce an updated statistical model; process at least some of the plurality of neuromuscular signals using the updated statistical model to generate an updated musculoskeletal representation; determine, based, at least in part, on the at least one aspect of the updated musculoskeletal representation whether further calibration of the statistical model is needed; and end the calibration session in response to determining that further calibration is not needed.

In one aspect, updating the statistical model configuration comprises selecting a different statistical model to generate the updated musculoskeletal representation than the statistical model used to generate to the musculoskeletal representation.

Other embodiments are directed to a method of calibrating performance of one or more statistical models used to generate a musculoskeletal representation, the method comprising: instructing, via a user interface, a user to perform at least one gesture while wearing a wearable device having a plurality of neuromuscular sensors arranged thereon; controlling presentation of instructions via the user interface to instruct the user to perform the at least one gesture; updating at least one parameter of the one or more statistical models based, at least in part, on a plurality of neuromuscular signals recorded by the plurality of neuromuscular sensors during performance of the at least one gesture by the user; identifying, based on an output of the one or more statistical models, a plurality of gesture characteristics that the one or more statistical model is poor at estimating; selecting a new gesture for the user to perform that includes the identified plurality of gesture characteristics; controlling presentation of instructions via the user interface to instruct the user to perform the new gesture; and updating at least one parameter of the one or more statistical models based, at least in part on the plurality of neuromuscular signals recorded by the neuromuscular sensors during performance of the new gesture by the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Robustness, consistency, and reliability are important features of a system for estimating the position, movement, and force exerted by a part of the human body, in part, because such features support realistic highly-immersive experiences in virtual environments and support the use of gesture-based machine control frameworks. Some conventional systems use neuromuscular signals to estimate the position and movement of a portion of a user's body represented as a multi-segment articulated rigid body system (e.g., a user's arm, hand, leg, etc.) in an autonomous manner. System calibration is typically performed in such systems using a sequence of prescribed movements or by changing the gain of signal amplification circuitry, though these systems generally have limited capabilities with respect to tuning, personalization, and retraining.

Some conventional camera-based systems for tracking a user's hand perform system calibration by calibrating imaging sensors or by configuring the system to distinguish individual users. Camera-based systems have some limitations relative to systems that use neuromuscular sensors to infer the position or movement of a part of the body, particularly with regard to occlusion and limited spatial functionality for fixed-camera based systems.

Neuromuscular signals contain information about motor-unit activity levels which determine the movements of joints and exerted forces. The degree to which estimates of joint angles and exerted forces generalize across users is limited by, variability between people with regard to characteristics such as joint stiffness, joint segment moments and inertia, and the relationship between motor unit activity and joint torque. When variations in such characteristics are not taken into consideration when predicting estimates of joint angles and forces from neuromuscular data, the models used to make the predictions may perform sub-optimally. To this end, some embodiments are directed to techniques for tuning model parameters based on neuromuscular data collected during a calibration procedure to account for user-specific physiological and anatomical differences.

All or portions of the human musculoskeletal system can be logically represented in a model implemented in a multi-segment articulated rigid body system. Such a model may be partitioned into multiple data structures including segments, logical interfaces, and other suitable data structures which, in ensemble, emulate biological functions and properties of the human musculoskeletal system. For instance, segments can represent rigid parts of the musculoskeletal system and logical interfaces can represent joints of the musculoskeletal system. Each of the data structures (e.g., segments and logical interfaces) can include attributes (variable and constant) denoting properties of the biological part that such data structure represents. As described in more detail below, the multi-segment articulated rigid body system may be configured to emulate biological functions and properties of the human musculoskeletal system.

All or portions of the human musculoskeletal system can be modeled as a multi-segment articulated rigid body system, with joint interfaces between different segments and joint angles defining the spatial relationships between connected segments in the model. Constraints on the movement at the joints are governed by the type of joint connecting the segments and the biological structures (e.g., muscles, tendons, ligaments, and other biological structures) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, the multi-segment articulated rigid body system can be used to model portions of the human musculoskeletal system. Some segments of the human musculoskeletal system (e.g., the forearm segment), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, a hand can be modeled as a multi-segment articulated body with the joints in the wrist and each finger forming the interfaces between the multiple segments in the model. Movements of the segments in the rigid body model can be emulated as an articulated rigid body system in which position (e.g., actual position, relative position, or orientation) information of a segment relative to other segments in the model are predicted using a trained statistical model, as described in more detail below.

In some implementations, the multi-segment articulated rigid body system emulates portions of the human body, for example, a hand or a combination of a hand with one or more portions of an arm. Information used to describe position relationships between segments and force relationships for individual segments or combinations of segments in the musculoskeletal representation is referred to herein as the handstate of the musculoskeletal representation. The techniques described herein are also applicable to musculoskeletal representations of portions of the body other than the hand including, but not limited to, an arm, a leg, a foot, a torso, a neck, or any combination of the foregoing.

In addition to spatial information (e.g., position and orientation), in some implementations the multi-segment articulated rigid body system is configured to predict force information associated with one or more segments of the musculoskeletal representation. For example, the multi-segment articulated rigid body system can compute linear forces or rotational (torque) forces exerted by one or more segments. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed.

In some implementations, a handstate can further include force information determined as a portion of a current handstate estimate that includes one or more of pinching force information, grasping force information, or information about co-contraction forces between muscles represented by the musculoskeletal representation.

Figure 20A:
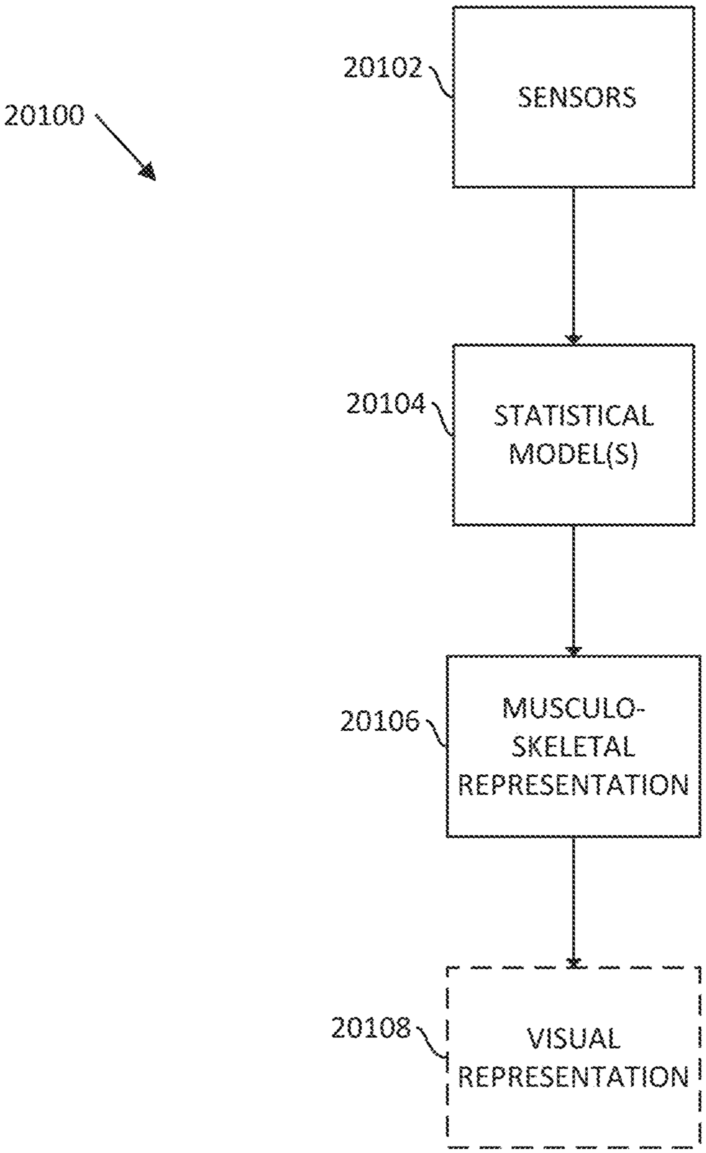
FIG. 20A is a schematic diagram of a computer-based system for generating a musculoskeletal representation based on neuromuscular sensor data in accordance with some embodiments of the technology described herein.

FIG. 20A illustrates a system 20100 in accordance with some embodiments. The system includes a plurality of sensors 20102 configured to record signals resulting from the movement of portions of a human body. Sensors 20102 may include autonomous sensors. As used herein, the term "autonomous sensors" refers to sensors configured to measure the movement of body segments without requiring the use of external devices. In some embodiments, sensors 20102 may also include one or more auxiliary (e.g., non-autonomous) sensors in combination with autonomous sensors. Non-limiting examples of auxiliary sensors include, but are not limited to, wearable (e.g. body-mounted) cameras, global positioning systems, or laser scanning systems.

Autonomous sensors may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that autonomous sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the autonomous sensors includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 20102 only includes a plurality of neuromuscular sensors (e.g., EMG sensors). In other embodiments, sensors 20102 includes a plurality of neuromuscular sensors and at least one "auxiliary" sensor configured to continuously record a plurality of auxiliary signals. Examples of auxiliary sensors include, but are not limited to, other autonomous sensors such as IMU sensors, and auxiliary sensors such as an imaging device (e.g., a camera), a radiation-based sensor for use with a radiation-generation device (e.g., a laser-scanning device), or other types of sensors such as a heart-rate monitor.

System 20100 also includes one or more computer processors programmed to communicate with sensors 20102. For example, signals recorded by one or more of the sensors may be provided to the processor(s), which may be programmed to execute one or more machine learning algorithms that process signals output by the sensors 20102 to train one or more statistical models 20104, and the trained (or retrained) statistical model(s) 20104 may be stored for later use in generating a musculoskeletal representation 20106, as described in more detail below.

In some embodiments, the statistical model may be implemented using one or more neural networks. Such neural network(s) may be implemented as one or more recurrent neural networks. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

The neural network(s) used in accordance with some embodiments may be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network(s) may have different types of output layers including output layers with logistic sigmoid activation functions, hyperbolic tangent activation functions, linear units, rectified linear units, or other suitable type of nonlinear unit. Additionally, the neural network(s) may be configured to represent the probability distribution over n different classes via, for example, a softmax function or include an output layer that provides a parameterized distribution e.g., mean and variance of a Gaussian distribution. Other non-limiting examples of statistical models that may be used in accordance with some embodiments to predict handstate information based on recorded signals from sensors 20102 are discussed in more detail below in connection with FIG. 20E.

System 20100 also optionally includes a display controller configured to display a visual representation 20108 (e.g., of a hand). As discussed in more detail below, one or more computer processors may implement one or more trained statistical models configured to predict handstate information based, at least in part, on signals recorded by sensors 20102. The predicted handstate information is used to update the musculoskeletal representation 20106, which is then optionally used to render a visual representation 20108 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained statistical model to accurately represent an intended handstate. Not all embodiments of system 20100 include components configured to render a visual representation. For example, in some embodiments, handstate estimates output from the trained statistical model and a corresponding updated musculoskeletal representation are used to determine a state of a user's hand (e.g., in a virtual reality environment) even though a visual representation based on the updated musculoskeletal representation is not rendered.

In some embodiments, a computer application configured to simulate a virtual reality environment may be instructed to display a visual representation of the user's hand. Positioning, movement, and/or forces applied by portions of the hand within the virtual reality environment may be displayed based on the output of the trained statistical model(s). The visual representation may be dynamically updated based on current reconstructed handstate information as continuous signals are recorded by the sensors 20102 and processed by the trained statistical model(s) 20104 to provide an updated computer-generated representation of the user's position, movement, and/or force that is updated in real-time.

As discussed herein, some embodiments are directed to using a statistical model for predicting musculoskeletal information based on signals recorded from wearable autonomous sensors. The statistical model may be used to predict the musculoskeletal position information without having to place sensors on each segment of the rigid body that is to be represented in the computer-generated musculoskeletal representation. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model though training based on recorded sensor data. Constraints imposed in the construction of the statistical model are those set by anatomy and the physics of a user's body, while constraints derived from statistical patterns are those set by human behavior for one or more users from which sensor measurements are measured. The constraints may comprise part of the statistical model itself being represented by information (e.g., connection weights between nodes) in the model.

As discussed herein, some embodiments are directed to using a statistical model for predicting handstate information to enable the generation and/or real-time update of a computer-based musculoskeletal representation. The statistical model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

As described above, statistical models that predict estimates (e.g., handstate estimates) for updating a musculoskeletal representation include some constraints imposed in the construction of the statistical model set by anatomy and physics of a user's body and other constraints derived from statistical patterns set by human behavior for one or more users from which sensor measurements are measured. The constraints derived from statistical patterns set by human behavior may be initially learned by a statistical model by training the model using training data collected from a plurality of users to produce a user-independent model. Such a user-independent model may perform well in estimating position and/or force information (e.g., handstate estimates) based on recorded neuromuscular signals for some (e.g., simple) gestures, and may perform poorly in estimating such information for other (e.g., complex) gestures. To improve user-specific performance of the model, one or more parameters of the user-independent model may be updated based on user-specific data. Updating parameter(s) of a statistical model for a particular user and/or for usage during a particular recording session is referred to herein as "calibration" of the model performance.

Figure 20B:
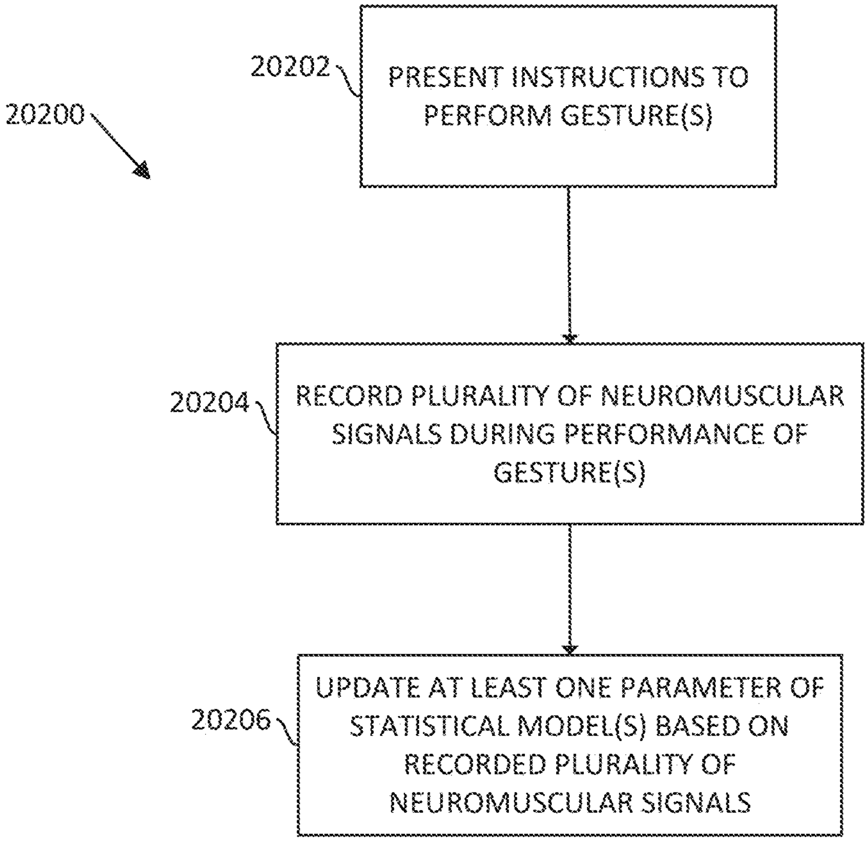
FIG. 20B is a flowchart of an illustrative process for calibrating performance of one or more statistical models in accordance of some embodiments of the technology described herein.

FIG. 20B illustrates a process 20200 for calibrating performance of a statistical model that may be used in accordance with system 20100, described in connection with FIG. 20A. In some embodiments, the performance of one or more statistical models is calibrated by presenting the user with explicit instructions to perform one or more gestures. For example, the system may include a user interface configured to present instructions to the user to perform one or more gestures while wearing a wearable device on which a plurality of neuromuscular sensors are arranged and configured to record a plurality of neuromuscular signals. The user interface may be a visual interface, an audio interface, or any other suitable type of user interface for presenting the instructions to the user for performing one or more gestures. When the user interface is a visual interface, the instructions may be presented using text, static visual representations (e.g., images), dynamic visual representations (e.g., videos, animations), or any combination of the foregoing.

As used herein, the term "gestures" refers to a static or dynamic configuration of one or more body parts including the position of the one or more body parts and forces associated with the configuration. For example, gestures include discrete gestures, such as pressing the palm of a hand down on a solid surface or grasping a ball, continuous gestures, such as a waving a finger back and forth or throwing a ball, or a combination of discrete and continuous gestures such as grasping and throwing a ball. Gestures may be defined by an application configured to prompt a user to perform the gestures or, alternatively, gestures may be arbitrarily defined by a user.

After instructions are presented to the user to perform one or more gestures, process 20200 proceeds to act 20204, where a plurality of neuromuscular signals are recorded by a plurality of neuromuscular sensors arranged on the body of a user during performance of the gesture(s) in accordance with the presented instructions. As discussed herein, the plurality of neuromuscular sensors may be arranged on one or wearable devices configured to be worn by a user during performance of one or more gestures. Process 20200 then proceeds to act 20206, where the statistical model configuration used to generate a musculoskeletal representation is updated based on the recorded plurality of neuromuscular signals. For example, in some embodiments, the statistical model configuration may be updated by selecting a different statistical model used to generate the musculoskeletal model. In other embodiments, at least one parameter of a statistical model may be updated based on the recorded plurality of neuromuscular signals. The one or more parameters of the statistical model may be updated in any suitable way. In some embodiments, one or more parameters of the statistical model may be updated by training the statistical model based, at least in part, on the recorded neuromuscular signals. In other embodiments, the one or more parameters of the statistical model may be updated without training or re-training the model. For example, the statistical model may receive as input the one or more parameters and updating the one or more parameters may comprise providing different values of the one or more parameters as input to the model. In yet further embodiments, the statistical model may be characterized by one or more parameters that are not provided as input to the model, but are nonetheless configurable, such that the parameter(s) may be updated based on neuromuscular signals recorded during performance of a gesture. For example, the configurable parameters may include a scaling factor by which recorded neuromuscular signals are scaled prior to being provided as input to the model.

Figure 20C:
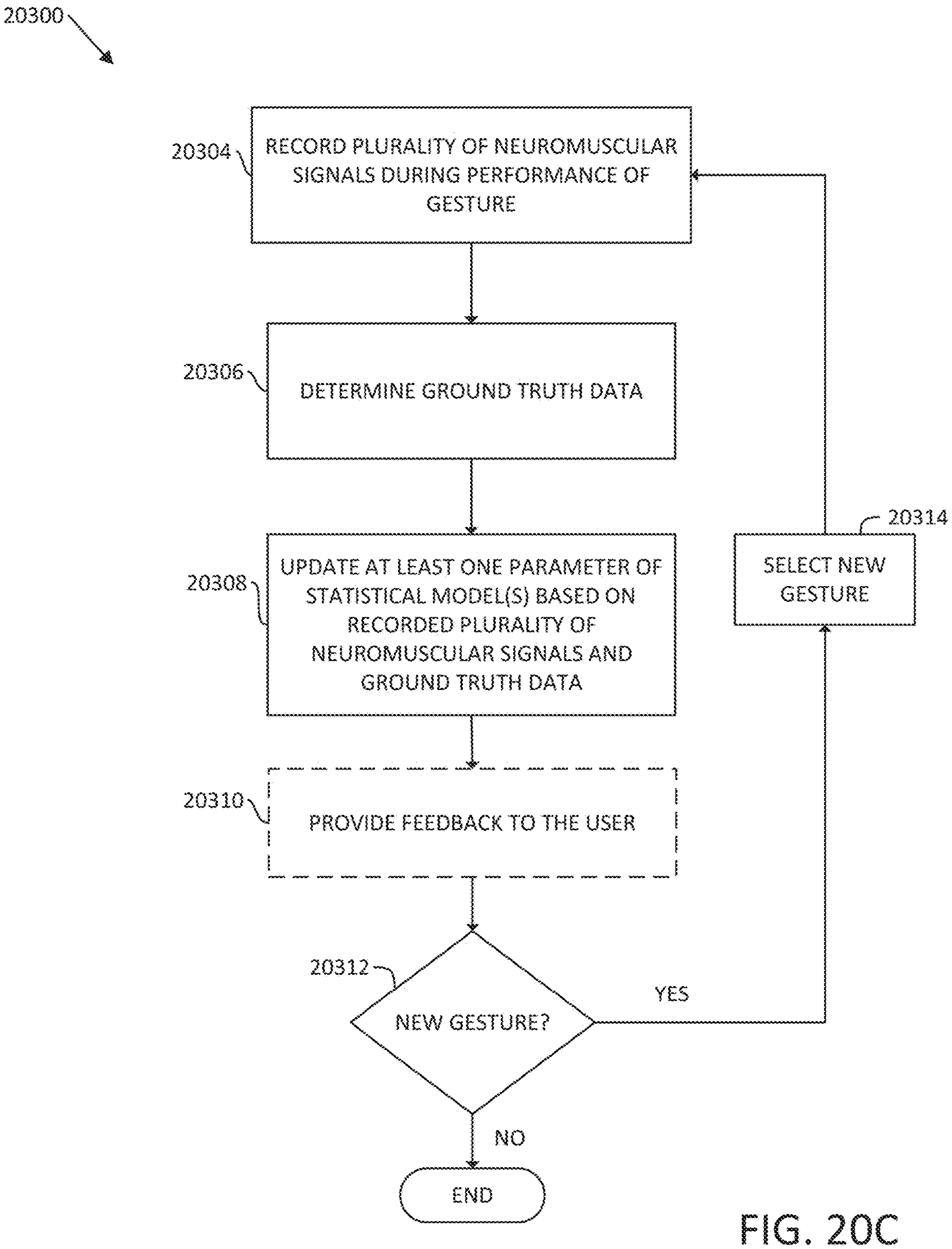
FIG. 20C is a flowchart of an illustrative process for calibrating performance of a statistical model in accordance with some embodiments of the technology described herein.

FIG. 20C illustrates a process 20300 for updating one or more parameters of a statistical model in accordance with some embodiments. In act 20304, a plurality of neuromuscular signals are recorded during performance of a gesture. As described above in connection with process 20200, the neuromuscular signals may be recorded in response to prompting the user to perform one or more gestures as part of a training or retraining protocol to train the model. For example, a user may be instructed to hold their fingers out, orient their wrist parallel to their arm (e.g., not flexed or extended), and move their wrist with an ulnar deviation (e.g., towards their pinky finger). Alternatively, the plurality of neuromuscular signals may be recorded during runtime usage of the system after the model has been trained, and the performance of the model to accurately predict estimates may be tracked and used to determine whether to perform "online" calibration of the model, as discussed in more detail below.

In embodiments where updating the at least one parameter of the statistical model involves training or retraining the model, ground truth data representing the expected estimates output from the model in response to particular inputs are determined in act 20306. In the simplest case, the ground truth data may be predetermined and defined based on the particular gesture that the user is instructed to perform. For example, when the estimates output from the model are handstate estimates that include a set of joint angles and forces for a musculoskeletal representation associated with a hand, a gesture may be defined by a particular set of joint angles and forces. In such a situation, the ground truth data may be determined as the particular set of joint angles and forces that define the gesture. Additionally or alternatively, the ground truth data may be determined based on neuromuscular information for the gesture. For example, the gesture may be characterized by a generic neuromuscular signal shape which may be used, at least in part, to determine the ground truth data.

In other embodiments, the ground truth data may be determined by one or more measurements captured by one or more external devices, examples of which include imaging devices (e.g., cameras) and inertial measurement units (IMUs). For example, when the external device is an imaging device configured to capture images, the imaging device may be controlled to capture at least one image as the user performs the gesture as the neuromuscular signals are recorded, and the one or more measurements may be determined based on the captured image(s).

In some embodiments that determine ground truth data from external devices, multiple external devices are used to determine the ground truth data. For example, an IMU may be used to determine some position/orientation such as large joint angles in the arm and wrist and an imaging device may be used to capture other position/orientation information such as smaller joint angles in the fingers. Other combinations of external devices may alternatively be used to determine position and/or force information as ground truth data, and embodiments are not limited in this respect. When measurements from multiple external devices are used to determine the ground truth data, the measurements from the multiple devices may be combined in any suitable way, and the statistical model may be updated based on the combined measurements.

Process 20300 then proceeds to act 20308, where at least one parameter of the statistical model is updated based on the plurality of neuromuscular signals recorded in act 20304 and the ground truth data determined in act 20306. Non-limiting examples of updating parameter(s) of a statistical model are described above in connection with act 20206 of process 20200.

Process 20300 then proceeds to act 20310, where feedback is optionally presented to the user to provide the user with information about whether the user's performance of the gesture was performed correctly as instructed (when instructions are provided). The feedback may be provided audibly, visually, using haptic feedback, or using any combination of the foregoing. When presented visually, the feedback may be provided as a static or dynamic visual representation of the gesture performed by the user to enable the user to compare how the model interpreted the user's performance of the gesture. In some embodiments, the feedback may illustrate a comparison between how the model estimates the user's performance of the gesture and how the gesture was intended to be performed based on the instructions provided. The feedback may then be interpreted by the user to determine whether the gesture was performed correctly and/or whether the model predicted the handstate estimates correctly based on the performed gesture. When it is determined that the model estimates were not accurate for the performed gesture, acts 20304-20310 may be repeated until the system and/or the user is satisfied that the model output can be used to accurately represent the performed gesture.

Process 20300 then proceeds to act 20312, where it is determined whether the process should be repeated with a new gesture. When it is determined to repeat the process with a new gesture, process 20300 proceeds to act 20314 where a new gesture is selected. Otherwise, the process ends.

Determining whether acts 20304-20310 of process 20300 should be repeated with a new gesture may be determined in any suitable way. In a passive calibration procedure, the user may be instructed to perform a predetermined set of gestures and determining whether to perform a new gesture may be determined based on whether all of the gestures in the set have been performed. This calibration procedure is referred to as "passive" herein as the gestures performed are not actively determined (e.g., based on the performance of the model), but are predetermined based on the gestures in the set. Passive calibration may be used, for example, when a user first uses the system to provide user-specific initial training of the statistical model or when the user uses the system to control a new application that associates particular gestures with control commands in the application. Passive calibration may be used to ensure that the statistical model is trained on a base set of uniform gestures relevant to a particular application. When using a passive calibration procedure, the gestures in the set may be selected in act 20314 randomly from the set for performance by the user during calibration or the user may be instructed to perform at least some of the gestures in the set in a particular order. For example, the particular order may specify that the model be trained on simple gestures prior to training the model on more complex gestures.

As an alternative to passive calibration, some embodiments employ an active calibration procedure, where a new gesture to be performed is not determined based on a predetermined set of gestures, but instead selection of a new gesture is informed based on performance of the model. In an active calibration procedure, new gestures to perform are actively suggested to the user based on an online (e.g., Bayesian) estimation of the model performance. For example, it may be determined that the model performs well for estimating certain gesture characteristics but performs poorly for estimating other gesture characteristics. As discussed herein, each gesture may be defined by a plurality of gesture characteristics (e.g., joint angles and forces), and the gesture that is selected during an active calibration procedure may be selected based on the gesture characteristic(s) that the model estimates poorly and gestures that include the gesture characteristic(s).

In some implementations of an active calibration procedure, a new gesture may be selected randomly from a set of gestures having gesture characteristics which the model estimates poorly. In other implementations of an active calibration procedure, a new gesture to be performed by the user may be selected as a gesture previously performed by the user, but on which performance of the model is poorly calibrated. In yet further implementations of an active calibration procedure, a new gesture is selected based, at least in part, on whether the particular gesture is defined by multiple gesture characteristics that the model estimates poorly. In some embodiments, a gesture that includes a maximum number of gesture characteristics for which the model performs poorly may be selected.

When either a passive calibration procedure or an active calibration procedure is used, the user may be provided with explicit instructions explaining the gesture to be performed by, for example, displaying on a user interface a static or dynamic visual representation of the gesture to be performed. Alternatively, the instructions provided to the user may include at least one user-interpretable instruction that may be subjectively interpreted by the user to perform the gesture. In such a procedure, the user actively participates in the calibration by determining, at least in part, how to perform the gesture. As an example, the user may be provided with a series of prompts that instructs the user to pinch two fingers at different percentages (e.g., 25%, 50%, 75%, 100%) of force exerted between the fingers relative to the maximum exertion. Using such a technique, the user defines how a percentage of maximal force maps to the neuromuscular signals recorded during performance of the gesture. Other examples of user-interpretable instruction include, but are not limited to, moving a slider along a bar or line, interacting (e.g., clenching) with an object, and pressing against a surface.

As discussed herein, in connection with act 20310 of process 20300, feedback may be provided to a user during a passive or active calibration procedure when user-interpretable instructions are included. The feedback may include rendering a visual representation associated with a hand. Additionally, in some embodiments, the visual representation may include force metrics to provide feedback on exerted forces to the user. Force metrics may be provided to the user in any suitable way, examples of which include, but are not limited to, using different colors, bar plots, scatter-plots, time series plots, etc. In some embodiments, metrics in addition to or as an alternative to force metrics may also be provided as feedback to a user. For example, additional metrics may include the extent to which the gesture is completed or the degree to which the gesture is completed (e.g., 50% completed), metrics describing whether the completed or partially-completed gesture is accurate, or any other suitable metrics that provide feedback to the user as the user is performing the gesture may be provided.

As discussed briefly above, the calibration procedures described herein may be performed at different times. For example, training or retraining the model may occur prior to use of the system by a new user and/or for a new application. Such calibration individualizes the statistical model(s) based on user-specific physiological and/or anatomical characteristics. Additionally or alternatively, the calibration procedures may be performed as the user is using the system.

Figure 20D:
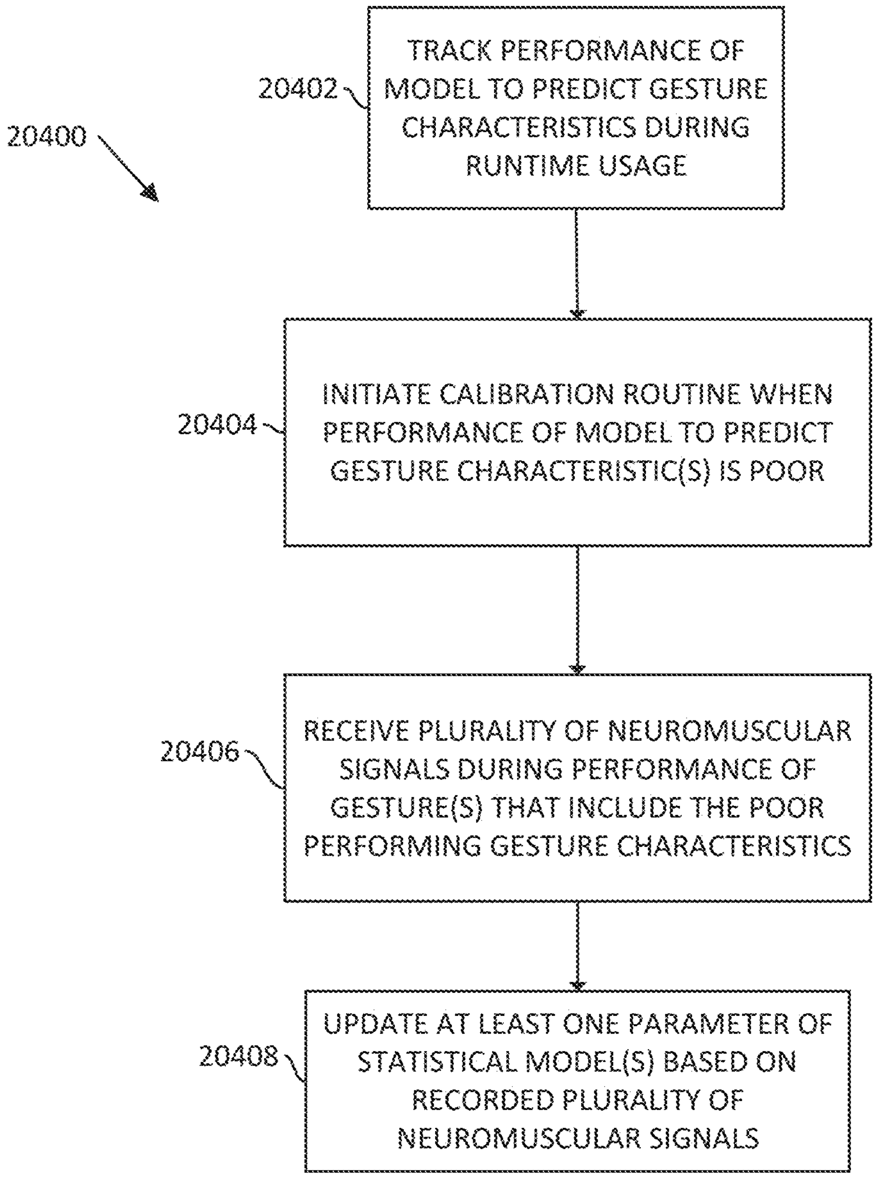
FIG. 20D is a flowchart of an illustrative process for initiating a calibration routine to update parameters of a trained statistical model during runtime in accordance with some embodiments of the technology described herein.

FIG. 20D illustrates a process 20400 for performing calibration during normal use of the system. In act 20402, the performance of the model is tracked to predict the performance of the model in accurately predicting gestures and/or gesture characteristics during runtime. When it is determined that the model should be calibrated based on reduced model performance for one or more gestures or gesture characteristics, process 20400 proceeds to act 20404, where a calibration routine is initiated. The determination to initiate a calibration routine may be made in any suitable way. For example, one or more quality measures may be determined for model estimates corresponding to gestures or gesture characteristics and it may be determined to initiate a calibration routine when the quality measure(s) fall below a threshold for the gestures/gesture characteristics. In one non-limiting example, a calibration routine may be initiated if the probabilities among several possible gestures exhibits relatively high entropy. In contrast, a well-calibrated statistical model may calculate the likelihood of one gesture to be high (e.g., greater than 0.8, greater than 0.9, close to 1) and the posterior probabilities for other gestures to be small. In another example, if the model frequently identifies gestures with low likelihood (generally indicating the presence or estimation of many 'long tail' gestures), a calibration routine may be initiated or a user notification may be presented to the user to determine whether the user was in fact initiating uncommon hand gestures.

In some cases, a calibration routine may be used to account for a user's anatomy. For example, a detector circuit may be configured to detect whether a user has the palmaris longus muscle in their arm. One way to determine if a user has a palmaris longus muscle is to instruct the user to pinch the fingertips of their pinky and thumb while flexing their wrist. In response to a determination that the user does have the palmaris longus muscle in their arm, an appropriate calibration routine may be initiated that is specifically configured to calibrate for individuals with a palmar longus muscle. In another example, a calibration routine may be initiated to account for the effect of a user's anatomy on the conductive profile of the user's body (e.g., their arm). One factor that affects the conduction of electrical currents in the body is the location and amount of adipose tissue in the arm. Adipose tissue affects the filtering of neuromuscular activity recorded by electromyography at the skin surface, so a calibration routine optimized for improving a statistical model based on the location and amount of adipose tissue may be initiated. One skilled in the art will recognize that the location and amount of adipose tissue in a user may be measured or estimated in various ways, including via ultrasonography. In another example, the effect of a particular muscle activation on the movement of a part of the body (e.g., the hand) depends on individual anatomy, including the size of the arm or hand and properties of the user's joints (e.g., joint stiffness, joint segment moments and inertia, and the relationship between motor unit activity and joint torque), and variations in individual anatomy that affect how joints move based on a given muscle activation may cause degraded model performance and cause a calibration routine to be initiated.

Initiation of a calibration routine may be made apparent to the user by, for example, the system entering a "calibration mode" where the user is prompted with instructions to perform one or more gestures to calibrate performance of the model, as discussed herein. Halting usage of the system and entering a calibration mode may enable the model performance to improve quickly by having the user focus on performing gestures with characteristics that the model estimates poorly.

Alternatively, initiation of a calibration routine may occur during routine usage of the system without the user becoming aware that calibration is being performed. For example, the system may identify gestures and/or gesture characteristics for which model calibration is desired, and when gestures/gesture characteristics are performed by the user during ordinary usage of the system, calibration may be performed using neuromuscular signals recorded during performance of such gestures. By not making the calibration procedure apparent to the user, the user's use of the system is not interrupted, and the model adapts through normal use of the system.

After initiating a calibration routine, process 20400 proceeds to act 20406, where a plurality of neuromuscular signals are recorded during performance of gestures that include the identified gesture characteristic(s) on which the model performs poorly. Process 20400 then proceeds to act 20408, where at least one parameter of the model is updated based on the recorded plurality of neuromuscular signals. As discussed herein, updating the parameter(s) of a statistical model may be implemented by training/retraining the model, modifying inputs to the model or changing other configurable parameters of the model. In some embodiments, some simple updates to the parameter(s) of the model may occur during runtime usage of the model, whereas more complex updates (e.g., retraining the model) may occur offline when the system is not being used by the user. When the model updates happen is not a limitation of the technology described herein.

Some model parameters, examples of which include, but are not limited to, a user's muscular anatomical features, a location of single muscles, muscle gain, and joint stiffness, are not expected to change substantially from session to session. Such model parameters may be stored in a user profile for the user, and the user profile may be accessed each time the user uses the system in a new session. In some embodiments, a user's user profile is updated with each new calibration session, for example, to track a user's long-term changes in physiology and/or anatomy. Other model parameters may be both user dependent and session dependent. For example, the placement of the neuromuscular sensors on the user's body may change from session to session or may even change during a session resulting in varying model estimates. For example, the placement of neuromuscular sensors in an armband may be rotated circumferentially around the arm; the armband may be placed on the arm oriented to be facing either proximally or distally; the armband may be placed on a different arm relative to an earlier calibration session; or the armband may be shifted along the proximal-distal axis of the arm (e.g., closer to the hand or closer to the shoulder). In another example, a user may experience muscle fatigue during a session, causing the pattern of motor unit activation to change, and a calibration session may be useful to account for the changing pattern of motor unit activation. Model parameters relating to session-dependent events may need to be updated each session and as such, may not be stored in the user's profile. However, some session-dependent events may be characteristic of a user (e.g., propensity of a muscle to experience fatigue) and as such, may be stored in the user's profile. In some embodiments, a determination is made during or at the end of a session regarding which model parameter updates made during the session should persist and be stored in the user's profile and which model parameter updates made during the session are session dependent and should be discarded following the session. The determination may be made based on the type of update, examples of which are described above.

Figure 20E:
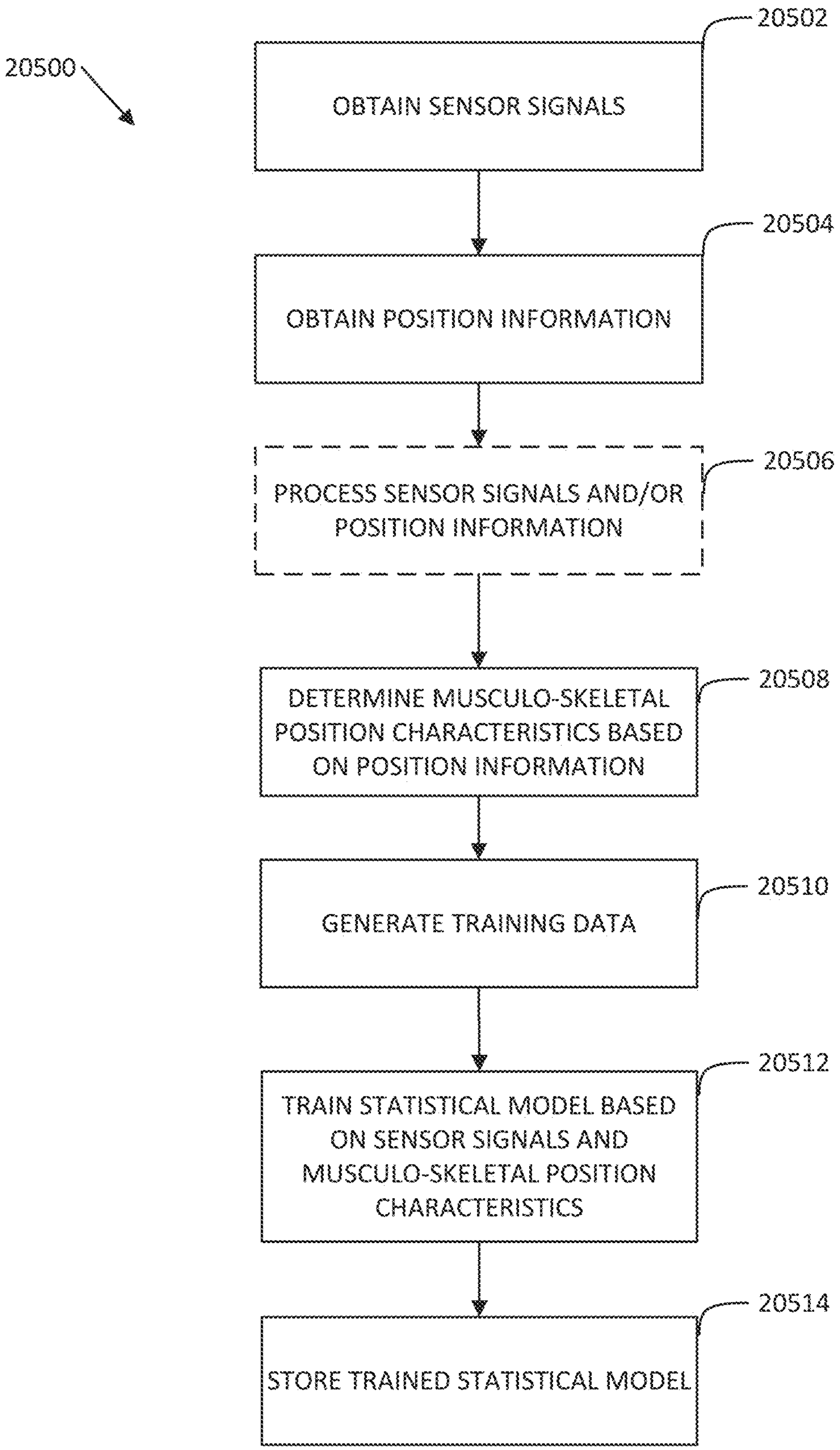
FIG. 20E is a flowchart of an illustrative process for generating a statistical model for predicting musculoskeletal position information using signals recorded from sensors, in accordance with some embodiments of the technology described herein.

FIG. 20E describes a process 20500 for generating (sometimes termed "training" herein) a statistical model using signals recorded from sensors 20102. Process 20500 may be executed by any suitable computing device(s), as aspects of the technology described herein are not limited in this respect. For example, process 20500 may be executed by one or more computer processors described with reference to FIGS. 20H and 20I. As another example, one or more acts of process 20500 may be executed using one or more servers (e.g., servers included as a part of a cloud computing environment). For example, at least a portion of act 20510 relating to training of a statistical model (e.g., a neural network) may be performed using a cloud computing environment.

Process 20500 begins at act 20502, where a plurality of sensor signals are obtained for one or multiple users performing one or more movements (e.g., typing on a keyboard). In some embodiments, the plurality of sensor signals may be recorded as part of process 20500. In other embodiments, the plurality of sensor signals may have been recorded prior to the performance of process 20500 and are accessed (rather than recorded) at act 20502.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 20502 correspond to signals from one type of sensor (e.g., one or more IMU sensors or one or more neuromuscular sensors) and a statistical model may be trained based on the sensor signals recorded using the particular type of sensor, resulting in a sensor-type specific trained statistical model. For example, the obtained sensor signals may comprise a plurality of EMG sensor signals arranged around the lower arm or wrist of a user and the statistical model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate statistical model may be trained for each of the types of sensors and the outputs of the sensor-type specific models may be combined to generate a musculoskeletal representation of the user's body. In other embodiments, the sensor signals obtained in act 20502 from two or more different types of sensors may be provided to a single statistical model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 20502 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{xk|1 \leq k \leq K\}$ at time points t1, t2, . . . , tK during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate a statistical model that can accurately predict musculoskeletal position information associated with performance of the task.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting musculoskeletal position information associated with multiple different actions that may be taken by the user. For example, training data that incorporates musculoskeletal position information for multiple actions may facilitate generating a statistical model for predicting which of multiple possible movements a user may be performing.

As discussed herein, the sensor data obtained at act 20502 may be obtained by recording sensor signals as each of one or multiple users performs each of one or more tasks one or more multiple times. As the user(s) perform the task(s), position information describing the spatial position of different body segments during performance of the task(s) may be obtained in act 20504. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 20502 may be recorded simultaneously with recording of the position information obtained in act 20504. In this example, position information indicating the position of each finger segment over time as the grasping motion is performed is obtained.

Next, process 20500 proceeds to act 20506, where the sensor signals obtained in act 20502 and/or the position information obtained in act 20504 are optionally processed. For example, the sensor signals or the position information signals may be processed using amplification, filtering, rectification, or other types of signal processing.

Next, process 20500 proceeds to act 20508, where musculoskeletal position characteristics are determined based on the position information (as collected in act 20504 or as processed in act 20506). In some embodiments, rather than using recorded spatial (e.g., x, y, z) coordinates corresponding to the position sensors as training data to train the statistical model, a set of derived musculoskeletal position characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 20504 may be represented by a vector of n joint angles at each of a plurality of time points, where n is the number of joints or connections between segments in the articulated rigid body model.

Next, process 20500 proceeds to act 20510, where the time series information obtained at acts 20502 and 20508 is combined to create training data used for training a statistical model at act 20510. The obtained data may be combined in any suitable way. In some embodiments, each of the sensor signals obtained at act 20502 may be associated with a task or movement within a task corresponding to the musculoskeletal position characteristics (e.g., joint angles) determined based on the positional information recorded in act 20504 as the user performed the task or movement. In this way, the sensor signals may be associated with musculoskeletal position characteristics (e.g., joint angles) and the statistical model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 20500 proceeds to act 20512, where a statistical model for predicting musculoskeletal position information is trained using the training data generated at act 20510. The statistical model being trained may take as input a sequence of data sets each of the data sets in the sequence comprising an n-dimensional vector of sensor data. The statistical model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the statistical model may take as input a sequence of vectors $\{xk|1 \leq k \leq K\}$ generated using measurements obtained at time points t1, t2, . . . , tK, where the ith component of vector xj is a value measured by the ith sensor at time tj and/or derived from the value measured by the ith sensor at time tj. In another non-limiting example, a derived value provided as input to the statistical model may comprise features extracted from the data from all or a subset of the sensors at and/or prior to time tj (e.g., a covariance matrix, a power spectrum, a combination thereof, or any other suitable derived representation). Based on such input, the statistical model may provide output indicating, a probability that a musculoskeletal representation of the user's body will be characterized by a set of musculoskeletal position characteristics. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 20512 using the sensor data obtained at act 20502.

As another example, in some embodiments, the statistical model may take as input, features derived from the sensor data obtained at act 20502. In such embodiments, the statistical model may be trained at act 20512 using features extracted from the sensor data obtained at act 20502. The statistical model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the statistical model may be derived from the sensor data obtained at act 20502 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 20512, values for parameters of the statistical model may be estimated from the training data generated at act 20510. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In embodiments where the statistical model is a recurrent neural network (e.g., an LSTM), the statistical model may be trained using stochastic gradient descent and backpropagation through time. The training may employ a cross-entropy loss function and/or any other suitable loss function, as aspects of the technology described herein are not limited in this respect.

Next, process 20500 proceeds to act 20514, where the trained statistical model is stored (e.g., in datastore—not shown). The trained statistical model may be stored using any suitable format, as aspects of the technology described herein are not limited in this respect. In this way, the statistical model generated during execution of process 20500 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to a statistical model trained using one or more techniques described above in connection with FIG. 20E. In some embodiments that continuously record autonomous signals, the continuously recorded signals (raw or processed) may be continuously or periodically provided as input to the trained statistical model for prediction of musculoskeletal position information (e.g., joint angles) for the given set of input sensor data. As discussed herein, in some embodiments, the trained statistical model is a user-independent model trained based on autonomous sensor and position information measurements from a plurality of users. In other embodiments, the trained model is a user-dependent model trained on data recorded from the individual user from which the data associated with the sensor signals is also acquired.

After the trained statistical model receives the sensor data as a set of input parameters, the predicted musculoskeletal position information is output from the trained statistical model. As discussed herein, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained statistical model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the statistical model to provide new predictions of the musculoskeletal position information (e.g., an updated set of joint angles), the computer-based musculoskeletal representation of the user's body may be updated based on the updated set of joint angles determined based on the output of the statistical model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculoskeletal representation in real time.

Figure 20F:
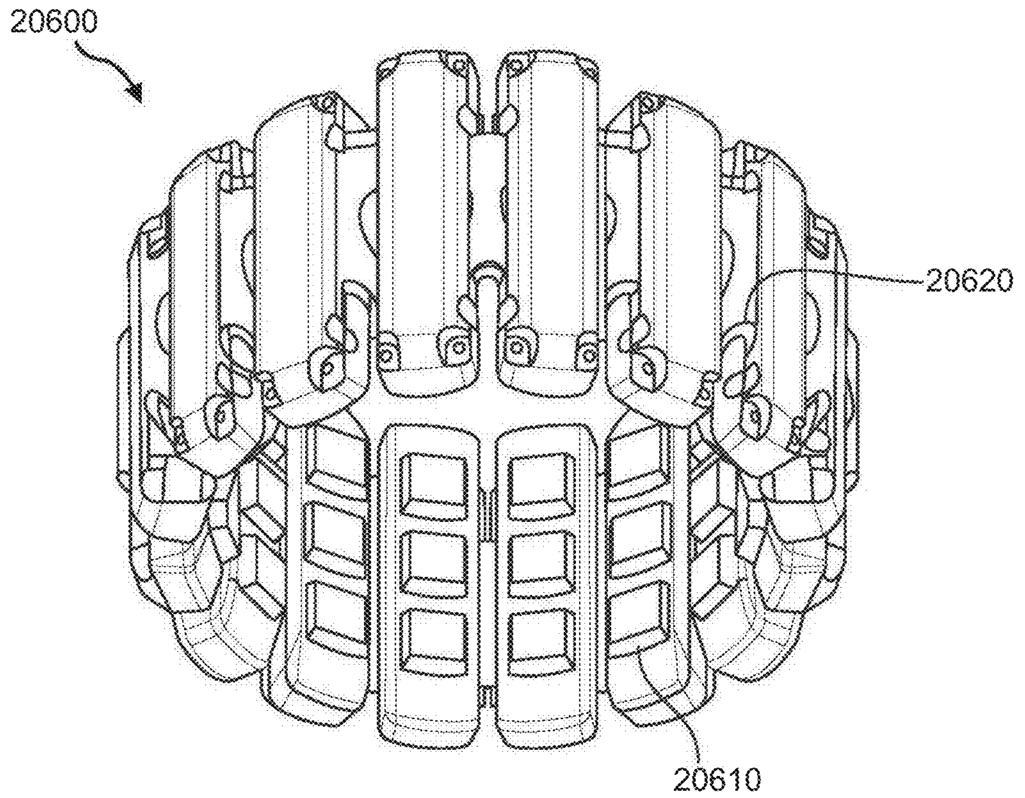
FIG. 20F illustrates a wearable system with sixteen EMG sensors arranged circumferentially around an elastic band configured to be worn around a user's lower arm or wrist, in accordance with some embodiments of the technology described herein.

FIG. 20F illustrates a wearable system with sixteen neuromuscular sensors 20610 (e.g., EMG sensors) arranged circumferentially around an elastic band 20620 configured to be worn around a user's lower arm or wrist. As shown, EMG sensors 20610 are arranged circumferentially around elastic band 20620. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

Figure 20G:
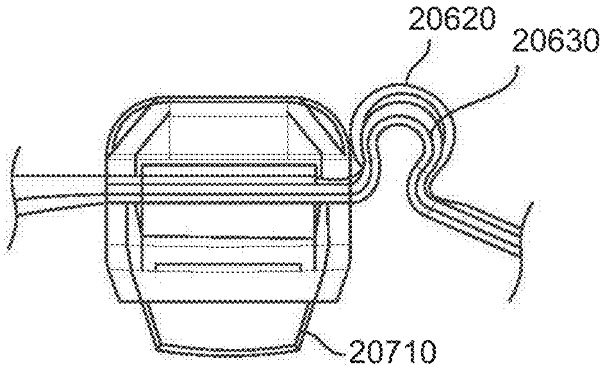
FIG. 20G is a cross-sectional view through one of the sixteen EMG sensors illustrated in FIG. 20F.

In some embodiments, sensors 20610 includes a set of neuromuscular sensors (e.g., EMG sensors). In other embodiments, sensors 20610 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 20610 may be coupled together using flexible electronics 20630 incorporated into the wearable device. FIG. 20G illustrates a cross-sectional view through one of the sensors 20610 of the wearable device shown in FIG. 20F.

Figure 20H:
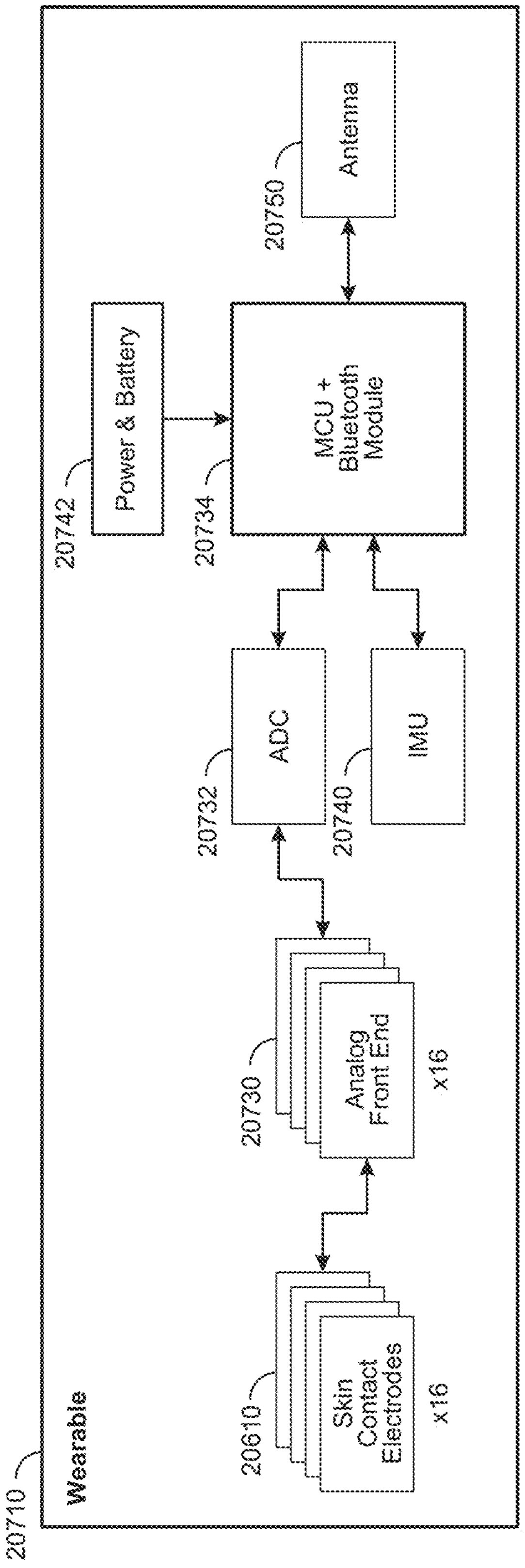
FIGS. 20H and 20I schematically illustrate components of a computer-based system on which some embodiments are implemented.
Figure 20I:
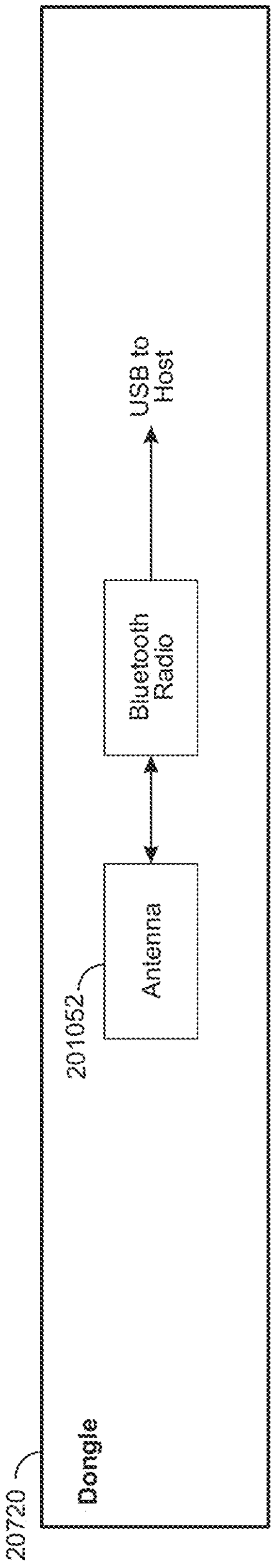

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 20610 is discussed in more detail below in connection with FIGS. 20H and 20I FIGS. 20H and 20I illustrate a schematic diagram with internal components of a wearable system with sixteen EMG sensors, in accordance with some embodiments of the technology described herein. As shown, the wearable system includes a wearable portion 20710 (FIG. 20H) and a dongle portion 20720 (FIG. 20I) in communication with the wearable portion 20710 (e.g., via Bluetooth or another suitable short range wireless communication technology). As shown in FIG. 20H, the wearable portion 20710 includes the sensors 20610, examples of which are described in connection with FIGS. 20F and 20G. The output of the sensors 20610 is provided to analog front end 20730 configured to perform analog processing (e.g., noise reduction, filtering, etc.) on the recorded signals. The processed analog signals are then provided to analog-to-digital converter 20732, which converts the analog signals to digital signals that can be processed by one or more computer processors. An example of a computer processor that may be used in accordance with some embodiments is microcontroller (MCU) 20734 illustrated in FIG. 20H. As shown, MCU 20734 may also include inputs from other sensors (e.g., IMU sensor 20740), and power and battery module 20742. The output of the processing performed by MCU may be provided to antenna 20750 for transmission to dongle portion 20720 shown in FIG. 20I.

Dongle portion 20720 includes antenna 201052 configured to communicate with antenna 20750 included as part of wearable portion 20710. Communication between antenna 20750 and 201052 may occur using any suitable wireless technology and protocol, non-limiting examples of which include radiofrequency signaling and Bluetooth. As shown, the signals received by antenna 201052 of dongle portion 20720 may be provided to a host computer for further processing, display, and/or for effecting control of a particular physical or virtual object or objects.

The following describes exemplary user-controlled tuning of handstate representation model parameters according to at least one embodiment of the present disclosure.

In some computer applications that generate musculoskeletal representations of the human body, it is appreciated that it is desirable for the application to provide a more realistic representation of body position, movement, and force. In an example in the VR environment, tracking the spatial position of the user's hand enables virtually rendering a hand, and rendering that realistically approximates natural kinematics and gestures may enhance immersion for the user in the virtual environment. Although some camera-based systems attempt to track movement a user's body, it is appreciated that such interpretations may be improved by using wearable neuromuscular sensors for physiological measurements and modeling based on human anatomy.

Some embodiments are directed to predicting information about the positioning and movements of portions of a user's arm and/or hand represented as a multi-segment articulated rigid body system with joints connecting the multiple segments of the rigid body system. Signals recorded by wearable neuromuscular sensors placed at locations on the user's body are provided as input to a statistical model trained to predict estimates of the position (e.g., absolute position, relative position, orientation) and forces associated with a plurality of rigid segments in a computer-based musculoskeletal representation associated with a hand when a user performs one or more movements. The combination of position information and force information associated with segments of a musculoskeletal representation associated with a hand is colloquially referred to herein as a "handstate" of the musculoskeletal representation. As a user performs different movements, a trained statistical model interprets neuromuscular signals recorded by the wearable neuromuscular sensors into position and force estimates (handstate information) that are used to update the musculoskeletal representation. As the neuromuscular signals are continuously recorded, the musculoskeletal representation is updated in real time (or near real-time) and a visual representation of a hand (e.g., within a virtual reality environment) is optionally rendered based on the current handstate estimates.

Other embodiments are directed to a computerized system configured to enable a user to adjust one or more parameters of one or more statistical models used to generate a musculoskeletal representation. The system comprises a user interface configured to instruct a user to perform at least one gesture while wearing a wearable device having a plurality of neuromuscular sensors arranged thereon, and at least one computer processor. The at least one computer processor is programmed to provide as input to the one or more statistical models, a plurality of neuromuscular signals recorded by the neuromuscular sensors during performance of the at least one gesture by the user, render at least one visual representation based on an output of the one or more statistical models, receive user input to adjust one or more parameters of the one or more statistical models based on the rendered at least one visual representation, and adjust one or more parameters of the one or more statistical models based on the received user input.

In one aspect, the one or more statistical models comprises a first statistical model and a second statistical model.

In another aspect, providing as input to the one or more statistical models, comprises providing the plurality of neuromuscular signals as input to the first statistical model and the second statistical model.

In another aspect, rendering at least one visual representation comprises rendering a first visual representation based on an output of the first statistical model, and rendering a second visual representation based on an output of the second statistical model, and receiving user input comprises receiving a selection associated with the first visual representation or the second visual representation.

In another aspect, rendering the first visual representation comprises rendering the first visual representation based on a first musculoskeletal representation generated based on output of the first statistical model, and rendering the second visual representation comprises rendering the second visual representation based on a second musculoskeletal representation generated based on output of the second statistical model.

In another aspect, the at least one computer processor is further programmed to repeatedly switch between displaying the first visual representation and the second visual representation prior to receiving the user input.

In another aspect, the at least one computer processor is further programmed to prompt the user to select a choice from each of a plurality of binary choices associated with different rendered visual representations, and receive user input associated with the plurality of binary choices.

In another aspect, the at least one computer processor is further programmed to aggregate the received user input associated with the plurality of binary choices.

In another aspect, adjusting the one or more parameters of the one or more statistical models comprises adjusting the one or more parameters based on the aggregated user input.

In another aspect, the at least one computer processor is further programmed to overlay the first visual representation with the second visual representation, wherein the first and second visual representations are rendered using different colors.

In another aspect, the at least one computer processor is further programmed to display the first visual representation and the second visual representation at a same time.

In another aspect, the at least one computer processor is further programmed to render the first visual representation and the second visual representation side-by-side.

In another aspect, the user selection associated with the first visual representation or the second visual representation is based on one or more anatomical characteristics of the user.

In another aspect, the at least one gesture comprises a discrete gesture.

In another aspect, receiving the user input comprises receiving the user input during display of the rendered at least one visual representation, wherein the at least one visual representation is rendered based on at least one musculoskeletal representation that is dynamically updated in real-time.

In another aspect, the at least one gesture comprises a continuous gesture, and rendering at least one visual representation comprises generating at least one animation representing the at least one gesture, wherein the at least one animation comprises the at least one visual representation rendered at a plurality of points in time.

In another aspect, receiving the user input comprises receiving the user input during replay of at least a portion of the at least one animation.

In another aspect, the at least one computer processor is further programmed to: receive a selection of one of the plurality of points in time of the animation, and receiving the user input comprises receiving the user input subsequent to receiving the selection of one of the plurality of points in time of the animation.

In another aspect, the at least one computer processor is further programmed to: display at least one user interface control configured to enable the user to adjust one or more parameters of the one or more statistical models, and receiving the user input comprises receiving the user input based on a user interaction with the at least one user interface control.

In another aspect, the at least one user interface control includes a slider or a dial.

In another aspect, the one or more parameters includes a smoothness of the one or more statistical models or a responsiveness of the one or more statistical models.

In another aspect, the at least one computer processor is further programmed to: output from the one or more statistical models, position estimates and/or force estimates associated with the musculoskeletal representation; update the musculoskeletal representation based on the position estimates and/or force estimates; and render the at least one visual representation based on the updated musculoskeletal representation.

In another aspect, the musculoskeletal representation is a musculoskeletal representation associated with a hand, and the position estimates and/or force estimates comprise handstate estimates.

In another aspect, the user interface is a graphical user interface configured to visually instruct the user to perform the at least one gesture.

Other embodiments are directed to a method for enabling a user to adjust one or more parameters of one or more statistical models used to generate a musculoskeletal representation. The method comprises providing as input to the one or more statistical models, a plurality of neuromuscular signals recorded by a plurality of neuromuscular sensors during performance of at least one gesture by a user, wherein the at least one gesture is performed by the user while wearing a wearable device having the plurality of neuromuscular sensors arranged thereon, rendering at least one visual representation based on an output of the one or more statistical models, receiving user input to adjust one or more parameters of the one or more statistical models based on the rendered at least one visual representation, and adjusting one or more parameters of the one or more statistical models based on the received user input.

Other embodiments are directed to a computer-readable medium encoded with a plurality of instructions that, when executed by at least one computer processor, performs a method. The method comprises providing as input to the one or more statistical models, a plurality of neuromuscular signals recorded by a plurality of neuromuscular sensors during performance of at least one gesture by a user, wherein the at least one gesture is performed by the user while wearing a wearable device having the plurality of neuromuscular sensors arranged thereon, rendering at least one visual representation based on an output of the one or more statistical models, receiving user input to adjust one or more parameters of the one or more statistical models based on the rendered at least one visual representation, and adjusting the one or more parameters of the one or more statistical models based on the received user input.

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained statistical model, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

Figure 21A:
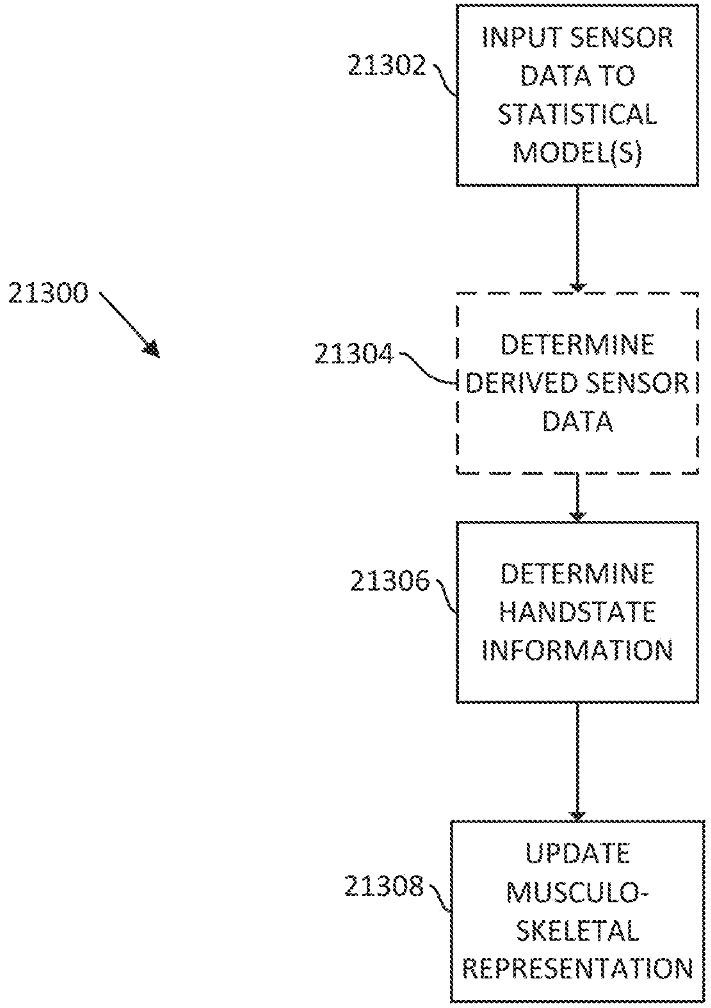
FIG. 21A is a flowchart of a process for determining handstate information in accordance with some embodiments of the technology described herein.

FIG. 21A illustrates a process 21300 for determining handstate information based on recorded sensor data in accordance with some embodiments. In act 20502, sensor data recorded by one or more sensors is provided as input to one or more trained statistical models used to generate estimates of handstate information, as described briefly above. In some embodiments, the sensors include a plurality of neuromuscular sensors (e.g., EMG sensors) arranged on a wearable device worn by a user. For example, EMG sensors may be arranged on an elastic band configured to be worn around a wrist or forearm of the user to record neuromuscular signals from the user as the user performs various movements or gestures. An example wearable device that may be used in accordance with some embodiments is shown in FIGS. 20F and 20G, which are described in more detail herein.

As used herein, the term "gestures" refers to a static or dynamic configuration of one or more body parts including the position of the one or more body parts and forces associated with the configuration. For example, gestures include discrete gestures, such as pressing the palm of a hand down on a solid surface or grasping a ball, continuous gestures, such as a waving a finger back and forth or throwing a ball, or a combination of discrete and continuous gestures such as grasping and throwing a ball. Gestures may be defined by an application configured to prompt a user to perform the gestures or, alternatively, gestures may be arbitrarily defined by a user. In some cases, hand and arm gestures may be symbolic and used to communicate according to cultural standards.

In addition to a plurality of neuromuscular sensors, some embodiments include one or more auxiliary sensors configured to continuously record auxiliary signals that may also be provided as input to the one or more trained statistical models. Examples of auxiliary sensors include IMU sensors, imaging devices, radiation detection devices (e.g., laser scanning devices), heart rate monitors, or any other type of biosensors configured to continuously record biophysical information from the user during performance of one or more movements or gestures.

Process 21300 then proceeds to act 21304, where derived signal data is optionally determined based on the signals recorded by the sensors. For example, accelerometer data recorded by one or more IMU sensors may be integrated and/or filtered to determine derived signal data associated with one or more muscles during performance of a gesture. The derived signal data may be provided as input to the trained statistical model(s) in addition to or as an alternative to raw signal data or otherwise processed raw signal data recorded by the sensors.

Process 21300 then proceeds to act 21306, where handstate information is determined based on the output of the trained statistical model(s). The gestures performed by the user include discrete gestures, such as placing the hand palm down on a table, and continuous gestures, such as waving a finger back and forth. The neuromuscular signals are recorded continuously during user movements including during performance of the gesture and are provided continuously as input to the trained statistical model, resulting in real-time estimation of the positions and/or forces of the user's hand (i.e., handstate information) as output of the trained statistical model(s). Process 21300 then proceeds to act 21308, where the real-time handstate estimates output from the trained statistical model(s) are used to update a musculoskeletal representation associated with a hand. In some embodiments, the musculoskeletal representation represents rigid segments within a hand and the joints connecting the rigid segments. In other embodiments, the musculoskeletal representation includes at least some rigid segments corresponding to an arm connected to the hand. Accordingly, the phrase "musculoskeletal representation associated with hand" should be understood to include both musculoskeletal representations of the hand and musculoskeletal representations that include a representation of the hand and at least a portion of an arm connected to the hand.

The inventors have recognized that individual users of systems such as those described in connection with FIG. 20A may have different needs or preferences regarding how the statistical model should be tuned or optimized to produce estimates that represent a movement, position, and/or force of a part of the body (e.g., the hand) or a desired response (e.g., a gesture-based response) based on a movement, position, and/or force of a part of the body (e.g., the hand). The inventors have further recognized that it may be advantageous to account for user-specific physiological and anatomical differences in order to optimize the model performance for individual users. The inventors have appreciated that enabling a user to select a particular statistical model from a number of available models and/or to have control over the tuning or adjustment of various parameters of the models may enable usage of statistical model(s) 20104 that more accurately represent the user's preferences and/or physiological and anatomical characteristics. Embodiments where a user may select a statistical model and/or tune a parameter of the statistical model for tracking their own body part may be referred to as "self-tuning" or "self-actuated tuning". For example, some users may differ with regard to the presence or absence of the palmaris longus muscle, which changes the recorded sensor data (e.g., neuromuscular signals) when performing gestures. By selecting a statistical model that is trained to predict handstate information while accounting for differing anatomical characteristics, a visual representation rendered based on the output of the selected statistical model may more accurately reflect the performance of the gesture(s) as performed by individual users.

The inventors have further recognized that conventional machine learning models, after training and tuning, generally run in an open-loop and automated fashion. In some cases, a developer of a machine learning model may tune the parameters of the model or alter the architecture of the model to optimize its behavior. However, these efforts require specific and technical expertise that is not broadly available and thus limits the ability of the machine learning model to be deployed inexpensively and at scale. Embodiments described herein enable a non-technical user to select an appropriate statistical model and/or tune parameters of a model, thereby enhancing the scalability and accuracy with which the model can estimate handstate information for the user. In addition, techniques described herein leverage third party feedback, such as feedback from trained experts, in model refinement as such experts may provide additional contributions by understanding how to change models/parameters to improve performance.

More accurate estimation of handstate allows for enhanced immersion for applications wherein handstate is virtually rendered. Another benefit of improving models for estimating handstate is improved reliability and sensitivity (e.g. reducing false positive and false negative for gesture identification) activate specific gestures in various gesture control schemes. For example, improved models can reliably identify a specific gesture mapped to one or more control signals to control various aspects of a VR environment.

In some embodiments, a third-party other than the user may be enabled to select a particular statistical model from a number of available models and/or to have control over the tuning or adjustment of various parameters of the models in order to more accurately represent the user's preferences and/or physiological and anatomical characteristics. The third-party user may be referred to as a "model selection and tuning expert" or a "handstate technician" and may be physically present with the user whose body part (e.g. hand) is being tracked via a system such as that described in connection with FIG. 20A. Alternatively or additionally, the handstate technician may be remote from the individual whose body part is being tracked. In such embodiments, the remote handstate technician is able to remotely and in real-time (or approximately in real-time) view outputs of a statistical model for estimating a movement, position, and/or force of the hand (or other body part) of the user, and to select among a plurality of statistical models or tune one or more model parameters remotely. In order to select among statistical models and/or tune a model parameter, the remote handstate technician may access data about the user via a computerized user interface (e.g., via a computer, tablet, or smartphone) to view real-time data collected from the user which may include: raw or processed neuromuscular activity data (e.g., data recorded via EMG sensors), confidence levels or other metrics reflecting an estimate of handstate or detection of a gesture used in a machine control scheme, a virtual rendering of the user's body part (e.g. hand), and/or a video or image of the user from a camera. Systems and methods that enable remote access for model selection and/or parameter tuning are advantageous, because they enable a third-party with specialized skills or training to support a user in optimizing or otherwise configuring a system for tracking a movement, position, and/or force of a body part (e.g. hand). For example, a prosthetist may provide a tuning or optimization service for amputees using a myocontrol interface or prosthetic arm controlled through tracking a body part. Myocontrol prosthetics are controlled by a user (e.g. an amputee) by contracting one or more muscles. The identity of the muscles used in a myocontrol prosthetic may be personalized based on the specific retained anatomy and function of the user. A myocontrol interface may be used to program or optimize the control of a prosthetic by a user based on a pattern of neuromuscular activity.

Figure 21B:
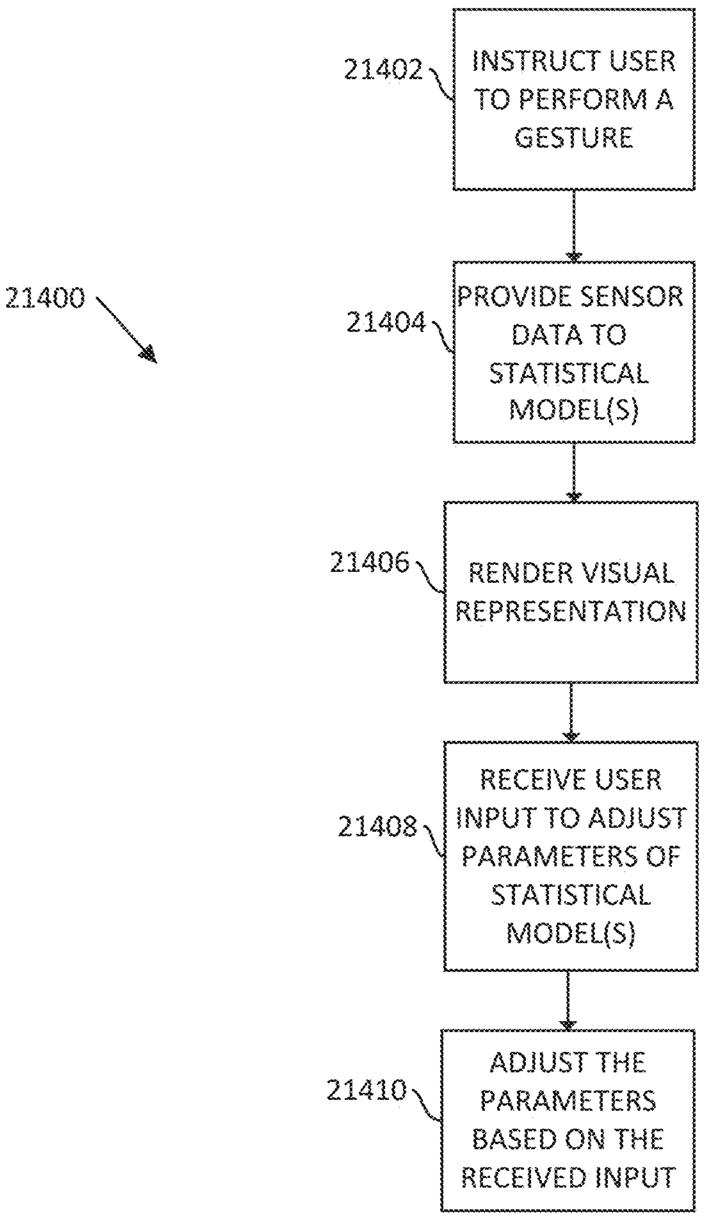
FIG. 21B is a flowchart of a process for enabling a user to adjust one or more parameters of statistical model(s) in accordance with some embodiments of the technology described herein.

FIG. 21B illustrates a process 21400 for enabling a user or third-party (e.g., handstate technician) to adjust one or more parameters of one or more statistical model(s) 20104, in accordance with some embodiments. In act 21402 of process 21400, the one or more computer processors of system 20100 may be programmed to cause a user interface (e.g., a graphical user interface) to present one or more instructions to a user to perform one or more gestures, for example, while the user is wearing the one more wearable devices described herein. In some embodiments, the user may be instructed to perform particular gestures, whereas in other embodiments the user may be instructed to perform any movements that they choose as a "user-defined" gesture. The gestures performed by the user may include discrete gestures, such as placing a hand palm down on a table, and continuous gestures, such as waving a finger back and forth. In some embodiments, a non-autonomous sensor such as a camera may be used to detect a particular gesture during performance of "user-defined" gestures. The wearable devices may have a plurality of neuromuscular sensors arranged thereon that record neuromuscular signals from the user as the user performs the gestures, as described above.

Process 21400 then proceeds to act 21404, where the recorded neuromuscular signals are provided as input to one or more statistical models 20104 that are used to generate estimates of the handstate information. As described above, the neuromuscular signals are recorded during performance of the gestures and are provided continuously as input to the statistical models, resulting in real-time estimation of the positions and/or forces of the user's hand (e.g., handstate information) as output of the trained statistical model(s). These real-time handstate estimates output from the trained statistical model(s) are used to update a musculoskeletal representation associated with a hand.

Process 21400 then proceeds to act 21406, where at least one visual representation of the hand is rendered based on the output of the statistical models 20104. In some embodiments, the visual representation of the hand is rendered based on the updated musculoskeletal representation associated with the hand. Real-time updating of the musculoskeletal representation as the user is performing a gesture and subsequent rendering of the visual representation reflecting the updated musculoskeletal model provides visual feedback to the user about the effectiveness of the trained statistical model to accurately represent the intended gesture. For a user or third-party, viewing the actual movements of a body part (e.g. hand, wrist, and/or arm) leverages innate human abilities to recognize natural movements and to compare the output of one or more statistical models to actual movements of a body part (e.g., a handstate).

In some embodiments, the recorded neuromuscular signals are provided as input to at least two different statistical models at act 21404. Each of the two different statistical models may be configured to output handstate estimates based on the input neuromuscular signals. The handstate estimates output by the different statistical models may be used to update different musculoskeletal representations of a hand, and in act 21306, different visual representations may be rendered based on the outputs of the updated musculoskeletal representations. In other words, a first visual representation may be rendered based on an output of a first statistical model and a second visual representation may be rendered based on an output of a second statistical model. It will be appreciated that while two statistical models and corresponding visual representations are described herein, any number of models and corresponding visual representations may alternatively be used without departing from the scope of this disclosure.

Process 21400 then proceeds to act 21408, where user input (e.g., input from the user or third-party) is received to adjust one or more parameters of the statistical models 20104. In some embodiments, receiving the user input includes receiving a selection associated with the first visual representation corresponding to the first statistical model or the second visual representation corresponding to the second statistical model. In some implementations, the first and second statistical models have different parameters associated therewith.

In some embodiments, receiving the user input comprises receiving input to adjust/tune parameters associated with a particular class of statistical models. The parameters of the statistical models that may be adjusted include, but are not limited to, a smoothness of the models, a responsiveness of the models, and/or other tunable parameters. The user input may include a user selection of the parameters that are to be adjusted and respective values of the parameters indicative of the adjustment. In some implementations, the computer processors may be programmed to display at least one user interface control (e.g., on the user interface) that enables the user or third-party to adjust the parameter(s) of the statistical models and/or select values for the parameters. In these implementations, the user input may be received based on a user interaction with the user interface control. Examples of the user interface control include a dial, a slider, a drop-down menu, and/or any other user interface control element. In some embodiments, the user input may be received during display of the rendered one or more visual representations, as discussed in more detail below.

In some implementations, the user interface may present one or more confidence levels or other metrics concerning the output of a particular class of statistical model. In some embodiments, the confidence levels or other metrics may be displayed with visual representation(s) generated based on the output of statistical model(s). In some embodiments, the selection of a particular model from a number of available models and/or parameter adjustment of the models may be performed based on these metrics. For example, the metrics may be provided for each of the different available models and the user or third-party may select a particular model with a metric indicative of a higher confidence level than another model with a metric indicative of a lower confidence level.

Process 21400 then proceeds to act 21410, where the one or more parameters of the statistical models 20104 are adjusted based on the received user input. In some embodiments, adjusting the parameters of the statistical models includes adjusting the parameter(s) of the statistical models based on the received values of the parameters. In other embodiments, adjusting the parameter(s) of the statistical models include selecting the first statistical model used to generate a first visual representation or the second statistical model used to generate a second visual representation based on the received user input.

In some implementations, after selection of the first or the second statistical model at act 21410, the process returns to act 21408, where further user input may be received to adjust parameters of the selected model. In some embodiments, a confidence level or other metric reflecting the adjusted parameters may be provided to the user or third-party. Model selection, parameter adjustment or any combination of model selection and parameter adjustment may occur at each iteration of acts 21408 and 21410. Acts 21408 and 21410 may be repeated until the user or third-party is satisfied that the selected and tuned statistical model is accurate (e.g., via an indication through a user interface that a particular gesture has been identified or a visual representation rendered based on the output of the selected statistical model).

According to some embodiments, the one or more computer processors may be programmed to display the rendered first visual representation and the rendered second visual representation at the same time. The first and second visual representations may be displayed at the same time in any suitable way. For example, the first and second visual representations may be displayed side-by-side. Alternatively, the first and second visual representations may be overlaid on each other, with the visual representations being rendered using different colors, thereby enabling the user or third-party to readily distinguish and select between the two representations.

In some embodiments, the one or more computer processors may be programmed to display the first and second visual representations at different times. For example, the one or more computer processors may be programmed to repeatedly switch between displaying the first visual representation and the second visual representation until user or third-party input is received and/or in response to a user or third-party command to switch between the two visual representations.

In some implementations, the one or more computer processors may be programmed to prompt the user or third-party to select a choice from each of a plurality of binary choices associated with different rendered visual representations and to receive user input associated with the plurality of binary choices. The user input when presented with a binary choice may indicate the user's preference for using a first statistical model with first parameters compared to a second statistical model with second parameters. In these implementations, the one or more computer processors may be programmed to aggregate the received user input associated with the binary choices and the one or more parameters of the statistical model may adjusted based on the aggregated user input.

In some embodiments, the user input reflecting a selection of a model or model parameter may be stored to a non-transitory computer-readable storage medium (e.g., a computer memory, a portable memory, a compact disk, etc.). In related embodiments, previous selections of a model or model parameter by the user or third-party may be accessed from a non-transitory computer-readable storage medium and provided to the user third-party via a user interface. Alternatively or additionally, aggregated historical data from other users may be provided to the user or third-party. For example, statistical models and model parameters selected by other individuals sharing some characteristic with the user (e.g. demographic, anatomical, physiological, etc.) may be provided via a user interface.

In some embodiments, a user selection associated with the first visual representation of the hand or the second visual representation of the hand may be based on one or more anatomical characteristics of the user. In some implementations, the one or more computer processors may include or communicate with one or more detector circuits that are programmed to analyze or process the signals recorded by sensors 20102 to identify or detect these anatomical characteristics based on the signals. For example, a detector circuit may be configured to detect whether a user has the palmaris longus muscle in their arm. In some implementations, to determine whether a user has the palmaris longus muscle, the user may be instructed to pinch the fingertips of their pinky and thumb while flexing their wrist. In response to a determination that the user does have the palmaris longus muscle in their arm, the computer processor(s) may be programmed to identify at least two models (e.g., a first and second statistical model) to be used to generate the handstate estimates used to update a musculoskeletal representation. The computer processor(s) may be further programmed to prompt the user or third-party to select either a first visual representation of the hand or a second visual representation of the hand, wherein the first and second visual representations of the hand are rendered based on output from the first and second statistical models, respectively.

According to some embodiments, user input is received during display of the rendered one or more visual representations of the hand. In some implementations, the visual representations are continuously updated based on real-time estimates of the positions and/or forces of the user's hand (e.g., handstate information). For example, both the first and second visual representations of the hand may be continuously updated based on respective outputs of the first and second trained statistical models. The user input (e.g., user or third-party selection of one of the models and/or user adjustment to parameters of one or both models) may be received during the display of the continuously updated visual representations.

In some embodiments, the user input may be received during replay of an animation of the rendered one or more visual representations of the hand. When a user performs a gesture, the first and second visual representations (corresponding to the first and second statistical models) of the hand performing the gesture may be rendered. The first and second visual representations may be replayed repeatedly, for example, in response to a user or third-party selection of a replay button displayed on a user interface. In other words, the user or third-party may replay an animation of the representations when adjusting the model parameters or selecting one of the models.

In some embodiments, the one or more computer processors may be programmed to receive a user or third-party selection of one of a plurality of points in time of an animation corresponding to a visual representation. For example, the selected point in time may represent part of the animation in which the model estimates poorly represent the intended movement or gesture. User or third-party input may then be received subsequent to receiving the selection of the point in time of the animation during which the model estimates poorly represent the intended movement or gesture. For example, when the user performs a gesture, the first and second visual representations (corresponding to the first and second statistical models) of the hand performing the gesture may be rendered. The user or third-party may pause the replay of the first and/or second representation (e.g., in response to a user selection of a pause button) to inspect one or more points in time in which the model estimates poorly estimate the intended gesture. The user or third-party may adjust the model parameters to correct the representation at the selected point in time, and then replay the complete representation (i.e., the whole time interval with a plurality of points in time) to assess the effects of the parameter change at other points in time.

In some embodiments, the one or more computer processors may be programmed to display visual representations associated with two or more statistical models optimized for particular categorical user types and may optionally provide a likelihood or other confidence metric indicating that the user is associated with a particular user category. In one non-limiting example, the system may analyze the signals recorded by a plurality of neuromuscular sensors (e.g., EMG sensors) and categorize users based on variations in muscle activity due to a location and amount of adipose tissue in the arm. Adipose tissue affects the filtering of neuromuscular activity recorded by electromyography at the skin surface, so categorizing users according to adipose tissue may improve the quality of handstate rendering and/or detection of a particular gesture. The location and amount of adipose tissue in a user may be measured or estimated in various ways, including via ultrasonography. In another non-limiting example, variations in individual anatomy may be used to categorize users. For example, the effect of a particular muscle activation on the movement of a part of the body (e.g. the hand) depends on individual anatomy, including the size of the arm or hand and the stiffness of joints, and variations in individual anatomy that affect how joints move based on a particular muscle activation may be used to categorize users and the model parameters best suited to them.

In some embodiments, a user or third-party may select a statistical model and/or a model parameter value based on a particular task or use case. For example, statistical models used to track the position of a body part (e.g., to estimate handstate) may exhibit tradeoffs between accuracy and latency. For some applications, the system may be configured to track a body part (e.g., the hand) to reduce accuracy in order to reduce the latency of estimating position (e.g., a virtual rendering of the position of the hand or the detection of a particular gesture). In another example, statistical models used to track the position of a body part (e.g., to estimate handstate) may exhibit tradeoffs between accuracy and dimensionality. Thus, for some applications, the system may be configured to reduce the dimensionality of tracking in order to improve accuracy (e.g., to reduce the number of finger joint angles estimated).

In some cases, a user may exhibit idiosyncrasies in their performance of a particular movement, and selection of a statistical model or a model parameter may be optimized such that a particular movement (e.g., a handstate gesture) is recognized by the system with high reliability and sensitivity in order to enable effective machine control.

The following describes exemplary systems and methods for improved speech recognition using neuromuscular information according to at least one embodiment of the present disclosure.

Automated speech recognition systems may transform recorded audio including speech into recognized text. The speech recognition systems may convert the input audio into text using one or more acoustic or language models that represent the mapping from audio input to text output using language-based constructs such as phonemes, syllables, or words. The models used for speech recognition may be speaker independent or speaker dependent and may be trained or refined for use by a particular user as the user uses the system and feedback is provided to retrain the models. Increased usage of the system by the particular user typically results in improvements to the accuracy and/or speed by which the system is able to produce speech recognition results as the system learns the user's speech characteristics and style Systems and methods are described herein for providing an improved speech recognition system in which speech data provided as input to the system is augmented with neuromuscular signals (e.g., recorded using electromyography (EMG)). The improved speech recognition system may exhibit better performance (e.g., accuracy, speed) compared to speech recognition systems that receive only speech data as input. For example, a musculo-skeletal representation (including, but not limited to, body position information and biophysical quantities such as motor unit and muscle activation levels and forces) determined based on the neuromuscular signals may encode contextual information represented in a user's movements or activation of their muscles, that may be used to enhance speech recognition performance. In another example, the described systems and methods may interpret parts of speech from the user's movements or activations to enhance speech recognition performance. In some embodiments, the described systems and methods provide for modifying an operation of a speech recognition system (e.g., by enabling and disabling speech recognition with a wake word/phrase or gesture, applying formatting such as bold, italics, underline, indent, etc., entering punctuation, and other suitable modifications). In some embodiments, the described systems and methods provide for using recognized neuromuscular information, e.g., for one or more gestures, to change an interaction mode (e.g., dictation, spelling, editing, navigation, or another suitable mode) with the speech recognition system or speech recognizer. In some embodiments, the described systems and methods provide for using EMG-based approaches (e.g. EMG-based scrolling and clicking) to select text for editing, error corrections, copying, pasting, or another suitable purpose. In some embodiments, the described systems and methods provide for selection of options from list of choices, e.g., with audio feedback for "eyes-busy" situations like driving ("did you mean X or Y?"). In some embodiments, the described systems and methods provide for a hybrid neuromuscular/speech input that gracefully switches from one mode to the other, and uses both modes when available to increase accuracy and speed. In some embodiments, the described systems and methods provide for text input using a linguistic token, such as phonemes, characters, syllables, words, sentences, or another suitable linguistic token, as the basic unit of recognition.

Some embodiments are directed to a system for using neuromuscular information to improve speech recognition. The system includes a plurality of neuromuscular sensors arranged on one or more wearable devices. The plurality of neuromuscular sensors is configured to continuously record a plurality of neuromuscular signals from a user. The system further includes at least one storage device configured to store one or more trained statistical models and at least one computer processor. The computer processor is programmed to provide as an input to the one or more trained statistical models. The plurality of neuromuscular signals or signals are derived from the plurality of neuromuscular signals. The computer processor is further programmed to determine based, at least in part, on an output of the one or more trained statistical models, at least one instruction for modifying an operation of a speech recognizer and provide the at least one instruction to the speech recognizer. In some embodiments, the instruction for modifying the operation of the speech recognizer is determined directly from the plurality of neuromuscular signals. For example, the instruction may be output from a trained statistical model after applying the plurality of neuromuscular signals as inputs to the trained statistical model. In some embodiments, a musculo-skeletal representation of the user is determined based on the output of the one or more trained statistical models, and the instruction for modifying the operation of the speech recognizer is determined based on the musculo-skeletal representation.

Some embodiments are directed to a system for using neuromuscular information to improve speech recognition. The system includes a plurality of neuromuscular sensors arranged on one or more wearable devices. The plurality of neuromuscular sensors is configured to continuously record a plurality of neuromuscular signals from a user. The system further includes at least one storage device configured to store one or more trained statistical models for determining text based on the audio input and the plurality of neuromuscular signals. The system further includes at least one input interface configured to receive the audio input and at least one computer processor. The computer processor is programmed to obtain the audio input from the input interface and obtain the plurality of neuromuscular signals from the plurality of neuromuscular sensors. The computer processor is further programmed to provide as input to the one or more trained statistical models, the audio input and the plurality of neuromuscular signals or signals derived from the plurality of neuromuscular signals. The computer processor is further programmed to determine the text based, at least in part, on an output of the one or more trained statistical models.

Some embodiments are directed to a system for text input based on neuromuscular information. The system includes a plurality of neuromuscular sensors arranged on one or more wearable devices. The plurality of neuromuscular sensors is configured to continuously record a plurality of neuromuscular signals from a user. The system further includes at least one storage device configured to store one or more trained statistical models and at least one computer processor. The computer processor is programmed to obtain the plurality of neuromuscular signals from the plurality of neuromuscular sensors and provide the plurality of neuromuscular signals, or signals derived from the plurality of neuromuscular signals, as input to the one or more trained statistical models. The computer processor is further programmed to determine one or more linguistic tokens based, at least in part, on an output of the one or more trained statistical models.

Automated speech recognition (ASR) is a computer-implemented process for converting speech to text using mappings between acoustic features extracted from input speech and language-based representations such as phonemes. Some ASR systems take as input, information other than speech to improve the performance of the ASR system. For example, an ASR system may take as input both visual information (e.g., images of a user's face) and audio information (e.g., speech) and may determine a speech recognition result based one or both of the types of inputs.

The inventors have recognized and appreciated that existing techniques for performing speech recognition may be improved by using musculo-skeletal information about the position and/or movement of a user's body (including, but not limited to, the user's arm, wrist, hand, neck, throat, tongue, or face) derived from recorded neuromuscular signals to augment the analysis of received audio when performing speech recognition.

The human musculo-skeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model the human musculo-skeletal system. However, it should be appreciated that some segments of the human musculo-skeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the arm may be modeled as a two-segment articulated rigid body with an upper portion corresponding to the upper arm connected at a shoulder joint to the torso of the body and a lower portion corresponding to the forearm, wherein the two segments are connected at the elbow joint. As another example, the hand may be modeled as a multi-segment articulated body with the joints in the wrist and each finger forming the interfaces between the multiple segments in the model. In some embodiments, movements of the segments in the rigid body model can be simulated as an articulated rigid body system in which orientation and position information of a segment relative to other segments in the model are predicted using a trained statistical model, as described in more detail below.

Figure 22A:
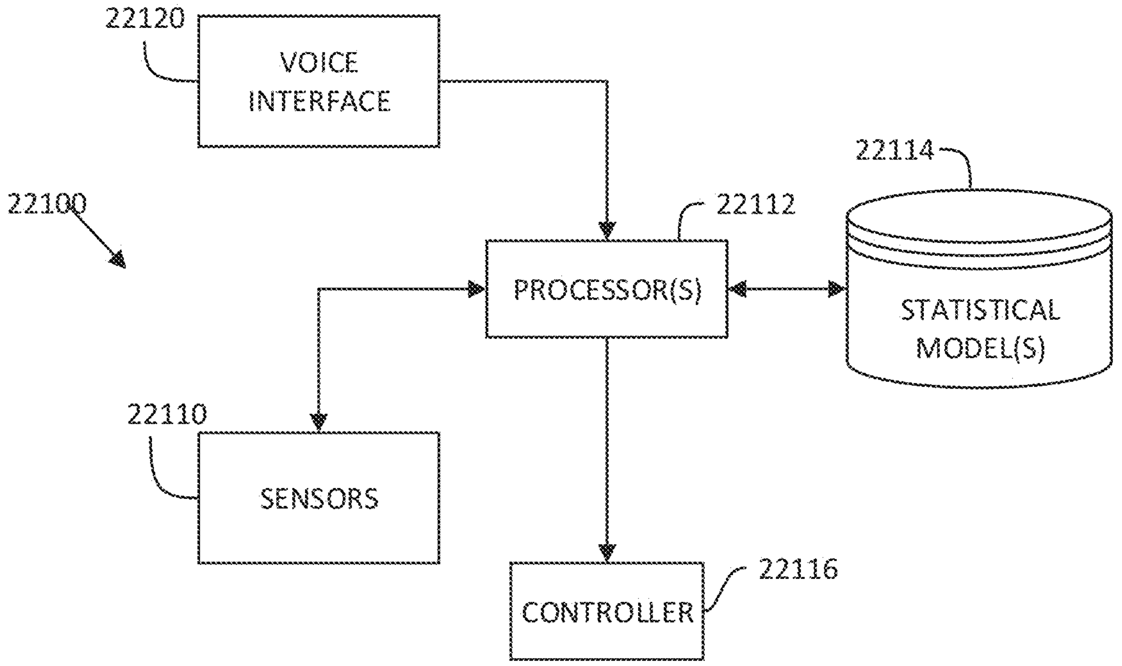
FIG. 22A is a schematic diagram of a computer-based system for using neuromuscular information to improve speech recognition in accordance with some embodiments of the technology described herein.

FIG. 22A illustrates a system 22100 in accordance with some embodiments. The system includes a plurality of autonomous sensors 22110 configured to record signals resulting from the movement of portions of a human body (including, but not limited to, the user's arm, wrist, hand, neck, throat, tongue, or face). As used herein, the term "autonomous sensors" refers to sensors configured to measure the movement of body segments without requiring the use of external sensors, examples of which include, but are not limited to, cameras or global positioning systems. Autonomous sensors 22110 may include one or more Inertial Measurement Units (IMUs), which measure a combination of physical aspects of motion, using, for example, an accelerometer and a gyroscope. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso (e.g., arms, legs) as the user moves over time.

Autonomous sensors 22110 may also include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) describing the movement (e.g., for portions of the user's body distal to the user's torso, such as hands and feet) may be predicted based on the sensed neuromuscular signals as the user moves over time.

In embodiments that include at least one IMU and a plurality of neuromuscular sensors, the IMU(s) and neuromuscular sensors may be arranged to detect movement or activation of different parts of the human body (including, but not limited to, the user's arm, wrist, hand, neck, throat, tongue, or face). For example, the IMU(s) may be arranged to detect movements of one or more body segments proximal to the torso, whereas the neuromuscular sensors may be arranged to detect movements of one or more body segments distal to the torso. It should be appreciated, however, that autonomous sensors 22110 may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation, an IMU sensor and a plurality of EMG sensors are arranged on a wearable device configured to be worn around the user's neck and/or proximate to the user's face. In one implementation described in more detail below, an IMU sensor and a plurality of EMG sensors are arranged on a wearable device configured to be worn around the lower arm or wrist of a user. In such an arrangement, the IMU sensor may be configured to track movement or activation information (e.g., positioning and/or orientation over time) associated with one or more arm segments, to determine, for example whether the user has raised or lowered their arm, whereas the EMG sensors may be configured to determine movement or activation information associated with wrist or hand segments to determine, for example, whether the user has an open or closed hand configuration.

Each of autonomous sensors 22110 includes one or more sensing components configured to sense movement information or activation information from the user. The movement or activation sensed by the autonomous sensors 22110 may correspond to muscle activation at a fixed point in time (e.g., the user making a thumbs up gesture or tensing arm muscles) or may correspond to the user performing a movement over a period of time (e.g., the user moving their arm in an arc). The autonomous sensors 22110 may sense movement information when the user performs a movement, such as a gesture, a movement of a portion of the user's body (including, but not limited to, the user's arm, wrist, hand, neck, throat, tongue, or face), or another suitable movement. The autonomous sensors 22110 may sense activation information when the user performs an activation, such as forces applied to external objects without movement, balanced forces (co-contraction), activation of individual muscle fibers (e.g., muscle fibers too weak to cause noticeable movement), or another suitable activation. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by autonomous sensors 22110 may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors 22110 may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors 22110 are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively or additionally, at least some of the autonomous sensors may be arranged on a wearable patch configured to be affixed to a portion of the user's body.

In one implementation, 16 EMG sensors are arranged circumferentially around an elastic band configured to be worn around a user's lower arm. For example, FIG. 18B shows EMG sensors 18504 arranged circumferentially around elastic band 18502. It should be appreciated that any suitable number of neuromuscular sensors may be used and the number and arrangement of neuromuscular sensors used may depend on the particular application for which the wearable device is used. For example, a wearable armband or wristband may be used to predict musculo-skeletal position information for hand-based motor tasks, whereas a wearable leg or ankle band may be used to predict musculo-skeletal position information for foot-based motor tasks. For example, as shown in FIG. 18C, a user 18506 may be wearing elastic band 18502 on hand 18508. In this way, EMG sensors 18504 may be configured to record EMG signals as a user controls keyboard 18510 using fingers 18512. In some embodiments, elastic band 18502 may also include one or more IMUs (not shown), configured to record movement or activation information, as discussed herein.

In some embodiments, multiple wearable devices, each having one or more IMUs and/or neuromuscular sensors included thereon may be used to predict musculo-skeletal position information for movements that involve multiple parts of the body.

System 22100 also includes voice interface 22120 configured to receive audio input. For example, voice interface 22120 may include a microphone that, when activated, receives speech data, and processor(s) 22112 may perform automatic speech recognition (ASR) based on the speech data. Audio input including speech data may be processed by an ASR system, which converts audio input to recognized text. The received speech data may be stored in a datastore (e.g., local or remote storage) associated with system 22100 to facilitate the ASR processing. In some embodiments, ASR processing may be performed in whole or in part by one or more computers (e.g., a server) remotely located from voice interface 22120. For example, in some embodiments, speech recognition may be performed locally using an embedded ASR engine associated with voice interface 22120, a remote ASR engine in network communication with voice interface 22120 via one or more networks, or speech recognition may be performed using a distributed ASR system including both embedded and remote components. Additionally, it should be appreciated that computing resources used in accordance with the ASR engine may also be located remotely from voice interface 22120 to facilitate the ASR processing described herein, as aspects of the invention related to ASR processing are not limited in any way based on the particular implementation or arrangement of these components within system 22100.

System 22100 also includes one or more computer processor(s) 22112 programmed to communicate with autonomous sensors 22110 and/or voice interface 22120. For example, signals recorded by one or more of the autonomous sensors 22110 may be provided to processor(s) 22112, which may be programmed to perform signal processing, non-limiting examples of which are described above. In another example, speech data recorded by voice interface 22120 may be provided to processor(s) 22112, which may be programmed to perform automatic speech recognition, non-limiting examples of which are described above. Processor(s) 22112 may be implemented in hardware, firmware, software, or any combination thereof. Additionally, processor(s) 22112 may be co-located on a same wearable device as one or more of the autonomous sensors or the voice interface or may be at least partially located remotely (e.g., processing may occur on one or more network-connected processors).

System 22100 also includes datastore 22114 in communication with processor(s) 22112. Datastore 22114 may include one or more storage devices configured to store information describing a statistical model used for predicting musculo-skeletal position information based on signals recorded by autonomous sensors 22110 in accordance with some embodiments. Processor(s) 22112 may be configured to execute one or more machine learning algorithms that process signals output by the autonomous sensors 22110 to train a statistical model stored in datastore 22114, and the trained (or retrained) statistical model may be stored in datastore 22114 for later use in generating a musculo-skeletal representation. Non-limiting examples of statistical models that may be used in accordance with some embodiments to predict musculo-skeletal position information based on recorded signals from autonomous sensors are discussed in more detail below.

In some embodiments, a set of training data, including sensor data from the autonomous sensors 22110 and/or speech data from the voice interface 22120, is obtained for training the statistical model. This training data may also be referred to as ground truth data. The training data may be obtained by prompting the user at certain times to perform a movement or activation and capturing the corresponding sensor data and/or speech data. Alternatively or additionally, the training data may be captured when the user is using a device, such as a keyboard. For example, the captured training data may include the user's EMG signal data and the user's corresponding key presses from a key logger. Alternatively or additionally, the training data may include ground truth joint angles corresponding to the user's movement or activation. The ground truth joint angles may be captured using, e.g., a camera device, while the user performs the movement or activation. Alternatively or additionally, the training data may include sensor data corresponding to a movement or activation performed by the user and annotated with speech data corresponding to the user speaking at the same time as performing the movement or activation. For example, the user may perform a gesture, such as a thumbs up gesture, and speak a word, such as "edit," to indicate that the gesture relates to an edit function. Alternatively or additionally, the training data may be captured when the user is using a writing implement or instrument, such as a pen, a pencil, a stylus, or another suitable writing implement or instrument. For example, the captured training data may include EMG signal data recorded when the user is prompted to write one or more characters, words, shorthand symbols, and/or another suitable written input using a pen. Optionally, the motion of the writing implement or instrument may be recorded as the user writes. For example, an electronic stylus (or another device configured to record motion) may record motion of the electronic stylus as the user writes a prompted word using the electronic stylus. Accordingly, the captured training data may include recorded EMG signal data and the corresponding recorded motion of the writing implement or instrument as the user writes one or more letters, words, shorthand symbols, and/or another suitable written input using the writing implement or instrument.

In some embodiments, processor(s) 22112 may be configured to communicate with one or more of autonomous sensors 22110, for example, to calibrate the sensors prior to measurement of movement or activation information. For example, a wearable device may be positioned in different orientations on or around a part of a user's body and calibration may be performed to determine the orientation of the wearable device and/or to perform any other suitable calibration tasks. Calibration of autonomous sensors 22110 may be performed in any suitable way, and embodiments are not limited in this respect. For example, in some embodiments, a user may be instructed to perform a particular sequence of movements or activations and the recorded movement or activation information may be matched to a template by virtually rotating and/or scaling the signals detected by the sensors (e.g., by the electrodes on EMG sensors). In some embodiments, calibration may involve changing the gain(s) of one or more analog to digital converters (ADCs), for example, in the case that the signals detected by the sensors result in saturation of the ADCs.

System 22100 optionally includes one or more controllers 22116 configured to receive a control signal based, at least in part, on processing by processor(s) 22112. As discussed in more detail below, processor(s) 22112 may implement one or more trained statistical models 22114 configured to predict musculo-skeletal position information based, at least in part, on signals recorded by autonomous sensors 22110 worn by a user. One or more control signals determined based on the output of the trained statistical model(s) may be sent to controller 22116 to control one or more operations of a device associated with the controller. In some embodiments, system 22100 does not include one or more controllers configured to control a device. In such embodiments, data output as a result of processing by processor(s) 22112 (e.g., using trained statistical model(s) 22114) may be stored for future use or transmitted to another application or user.

In some embodiments, during real-time tracking, information sensed from a single armband/wristband wearable device that includes at least one IMU and a plurality of neuromuscular sensors is used to reconstruct body movements, such as reconstructing the position and orientation of both the forearm, upper arm, wrist and hand relative to a torso reference frame using a single arm/wrist-worn device, and without the use of external devices or position determining systems. For brevity, determining both position and orientation may also be referred to herein generally as determining movement.

As discussed herein, some embodiments are directed to using a statistical model for predicting musculo-skeletal position information based on signals recorded from wearable autonomous sensors. The statistical model may be used to predict the musculo-skeletal position information without having to place sensors on each segment of the rigid body that is to be represented in a computer-generated musculo-skeletal representation of user's body. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model through training based on recorded sensor data. Constraints imposed in the construction of the statistical model are those set by anatomy and the physics of a user's body, while constraints derived from statistical patterns are those set by human behavior for one or more users from which sensor measurements are measured. As described in more detail below, the constraints may comprise part of the statistical model itself being represented by information (e.g., connection weights between nodes) in the model.

In some embodiments, system 22100 may be trained to predict musculo-skeletal position information as a user moves or activates muscle fibers. In some embodiments, the system 22100 may be trained by recording signals from autonomous sensors 22110 (e.g., IMU sensors, EMG sensors) and position information recorded from position sensors worn by one or more users as the user(s) perform one or more movements. The position sensors, described in more detail below, may measure the position of each of a plurality of spatial locations on the user's body as the one or more movements are performed during training to determine the actual position of the body segments. After such training, the system 22100 may be configured to predict, based on a particular user's autonomous sensor signals, musculo-skeletal position information (e.g., a set of joint angles) that enable the generation of a musculo-skeletal representation without the use of the position sensors.

As discussed herein, some embodiments are directed to using a statistical model for predicting musculo-skeletal position information to enable the generation of a computer-based musculo-skeletal representation. The statistical model may be used to predict the musculo-skeletal position information based on IMU signals, neuromuscular signals (e.g., EMG, MMG, and SMG signals), or a combination of IMU signals and neuromuscular signals detected as a user performs one or more movements.

Figure 22B:
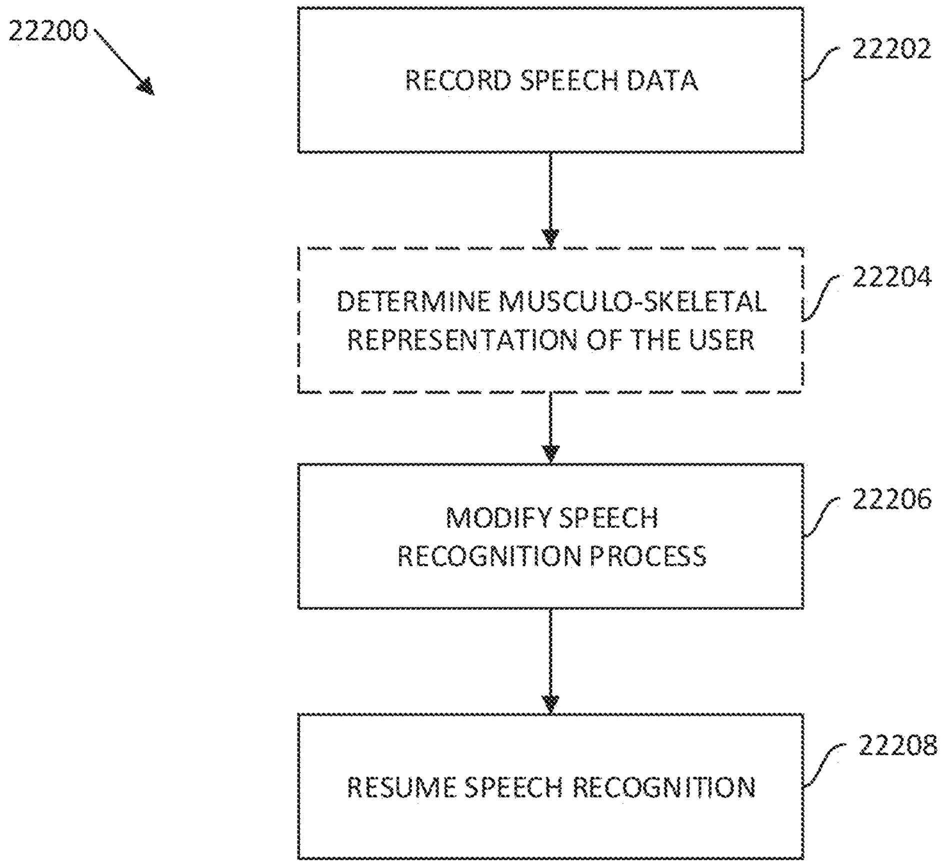
FIG. 22B is a flowchart of an illustrative process for using neuromuscular information to improve speech recognition, in accordance with some embodiments of the technology described herein.

FIG. 22B describes a process 22200 for using neuromuscular information to improve speech recognition. Process 22200 may be executed by any suitable computing device(s), as aspects of the technology described herein are not limited in this respect. For example, process 22200 may be executed by processor(s) 22112 described with reference to FIG. 22A. As another example, one or more acts of process 22200 may be executed using one or more servers (e.g., servers included as a part of a cloud computing environment). For example, at least a portion of act 22204 relating to determining a musculo-skeletal representation of the user may be performed using a cloud computing environment. Although process 22200 is described herein with respect to processing IMU and EMG signals, it should be appreciated that process 22200 may be used to predict neuromuscular information based on any recorded autonomous signals including, but not limited to, IMU signals, EMG signals, MMG signals, SMG signals, or any suitable combination thereof and a trained statistical model trained on such autonomous signals.

Process 22200 begins at act 22202, where speech data is obtained for one or multiple users from voice interface 22120. For example, voice interface 22120 may include a microphone that samples audio input at a particular sampling rate (e.g., 16 kHz), and recording speech data in act 22202 may include sampling audio input by the microphone. Sensor data for a plurality of neuromuscular signals may be obtained from sensors 22110 in parallel, prior to, or subsequent to obtaining the speech data from voice interface 22120. For example, speech data corresponding to a word from the user may obtained at the same time as sensor data corresponding to a gesture from the user to change the formatting of the word. In another example, speech data corresponding to a word from the user may obtained, and at a later time, sensor data may be obtained corresponding to a gesture from the user to delete the word. In yet another example, sensor data may be obtained corresponding to a gesture from the user to change the formatting for text output in the future, and at a later time, speech data corresponding to a word from the user may obtained and formatted accordingly. Optionally, process 22200 proceeds to act 22204, where the plurality of neuromuscular signals from sensors 22110, or signals derived from the plurality of neuromuscular signals, are provided as input to one or more trained statistical models and a musculo-skeletal representation of the user is determined based, at least in part, on an output of the one or more trained statistical models.

In some embodiments, signals are recorded from a plurality of autonomous sensors arranged on or near the surface of a user's body to record activity associated with movements or activations of the body during performance of a task. In one example, the autonomous sensors comprise an IMU sensor and a plurality of EMG sensors arranged circumferentially (or otherwise oriented) on a wearable device configured to be worn on or around a part of the user's body, such as the user's arm. In some embodiments, the plurality of EMG signals are recorded continuously as a user wears the wearable device including the plurality of autonomous sensors.

In some embodiments, the signals recorded by the autonomous sensors are optionally processed. For example, the signals may be processed using amplification, filtering, rectification, or other types of signal processing. In some embodiments, filtering includes temporal filtering implemented using convolution operations and/or equivalent operations in the frequency domain (e.g., after the application of a discrete Fourier transform). In some embodiments, the signals are processed and used as training data to train the statistical model.

In some embodiments, the autonomous sensor signals are provided as input to a statistical model (e.g., a neural network) trained using any suitable number of layers and any suitable number of nodes in each layer. In some embodiments that continuously record autonomous signals, the continuously recorded autonomous signals (raw or processed) may be continuously or periodically provided as input to the trained statistical model for prediction of a musculo-skeletal representation for the given set of input sensor data. In some embodiments, the trained statistical model is a user-independent model trained based on autonomous sensor and position information measurements from a plurality of users. In other embodiments, the trained model is a user-dependent model trained on data recorded from the individual user from which the data recorded in act 22204 is also acquired.

In some embodiments, after the trained statistical model receives the sensor data as a set of input parameters, a predicted musculo-skeletal representation is output from the trained statistical model. In some embodiments, the predicted musculo-skeletal representation may comprise a set of body position information values (e.g., a set of joint angles) for a multi-segment articulated rigid body model representing at least a portion of the user's body. In other embodiments, the musculo-skeletal representation may comprise a set of probabilities that the user is performing one or more movements or activations from a set of possible movements or activations.

Next, process 22200 proceeds to act 22206, where an instruction for modifying an operation of a speech recognizer is determined, and the instruction is provided to the speech recognizer. In embodiments where process 22200 does not include act 22204, the instruction for modifying the operation of the speech recognizer is determined based, at least in part, on an output of the one or more trained statistical models. For example, the one or more trained statistical models may directly map sensor data, e.g., EMG signal data, to the instruction for modifying the operation of the speech recognizer. In embodiments where process 22200 includes act 22204, the instruction for modifying the operation of the speech recognizer is determined based on the musculo-skeletal representation determined in act 22204. In some embodiments, process 22200 modifies the speech recognition process. For example, process 22200 may modify at least a portion of text output from the speech recognizer, where the modification may relate to punctuation, spelling, formatting, or another suitable modification of the text. In another example, process 22200 may change a caps lock mode of the speech recognizer. In yet another example, process 22200 may change a language mode of the speech recognizer. For example, the speech recognizer may be instructed to change from recognizing English to recognizing French. Some embodiments include a communications interface configured to provide the instruction from a processor, e.g., processor(s) 22112, to the speech recognizer. In some embodiments, a processor, e.g., processor(s) 22112, is programmed to execute the speech recognizer. Process 22200 proceeds to step 22208, where speech recognition is resumed, e.g., for speech data recorded at act 22202 or other suitable audio input.

Figure 22C:
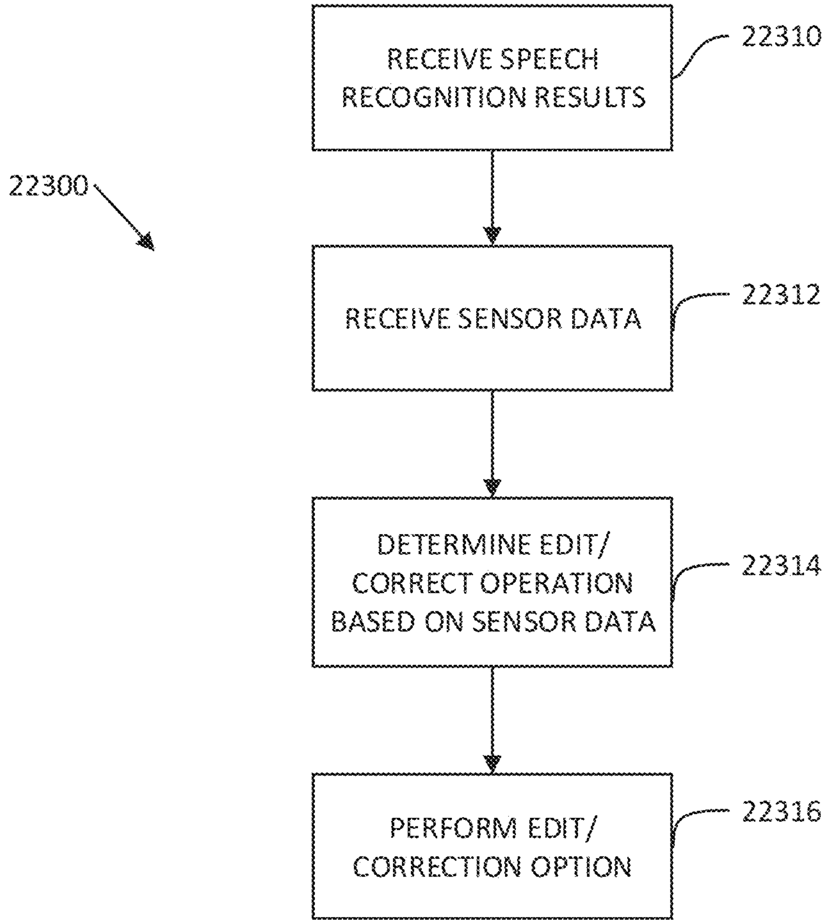
FIG. 22C is a flowchart of another illustrative process for using neuromuscular information to improve speech recognition, in accordance with some embodiments of the technology described herein.

FIG. 22C describes a process 22300 for using neuromuscular information to improve speech recognition. Process 22300 may be executed by any suitable computing device(s), as aspects of the technology described herein are not limited in this respect. For example, process 22300 may be executed by processor(s) 22112 described with reference to FIG. 22A. As another example, one or more acts of process 22300 may be executed using one or more servers (e.g., servers included as a part of a cloud computing environment). For example, at least a portion of act 22314 relating to determining an edit and/or correct operation based on sensor data may be performed using a cloud computing environment. Although process 22300 is described herein with respect to IMU and EMG signals, it should be appreciated that process 22300 may be used to predict neuromuscular information based on any recorded autonomous signals including, but not limited to, IMU signals, EMG signals, MMG signals, SMG signals, or any suitable combination thereof and a trained statistical model trained on such autonomous signals.

Process 22300 begins at act 22310, where speech recognition results are obtained, e.g., from speech data received from voice interface 22120. In some embodiments, processor(s) 22112 may perform ASR based on the speech data to generate the speech recognition results. In some embodiments, audio input including speech data may be processed by an ASR system, which produces speech recognition results by converting audio input to recognized text. The received speech data may be stored in a datastore (e.g., local or remote storage) associated with system 22100 to facilitate the ASR processing.

Next, at act 22312, sensor data is received, for example, from sensors 22110. The sensor data may be recorded and processed as described with respect to the process of FIG. 22B. The sensor data may include a plurality of neuromuscular signals and/or signals derived from the plurality of neuromuscular signals. The sensor data may be provided as input to one or more trained statistical models and the musculo-skeletal representation of the user may be determined based, at least in part, on an output of the one or more trained statistical models. Process 22300 then proceeds to act 22314, where an edit and/or correct operation is determined based on the sensor data. An instruction relating to the edit and/or correct operation of the speech recognizer is determined based on the determined musculo-skeletal representation, and the instruction is provided to the speech recognizer.

Next, process 22300 proceeds to act 22316 where the edit and/or correct operation is performed on the speech recognition results. For example, the edit and/or correct operation may be performed on the speech recognition results by allowing a user to edit and correct speech recognition results by selecting possibilities from a list. In another example, the edit and/or correct operation may be performed on the speech recognition results by allowing the user to initiate a spelling mode and correct spellings for one or more words in the speech recognition results. In yet another example, the edit and/or correct operation may be performed on the speech recognition results by allowing the user to delete one or more words in the speech recognition results. In another example, the edit and/or correct operation on the speech recognition results may be performed by allowing the user to scroll through the speech recognition results and insert one or more words at a desired insertion point in the speech recognition results. In another example, the edit and/or correct operation may be performed on the speech recognition results by allowing the user to select and replace one or more words in the speech recognition results. In another example, the edit and/or correct operation may be performed on the speech recognition results by auto-completing a frequently used phrase in the speech recognition results or allowing the user to select from a list of suggested completions for a phrase in the speech recognition results.

Figure 22D:
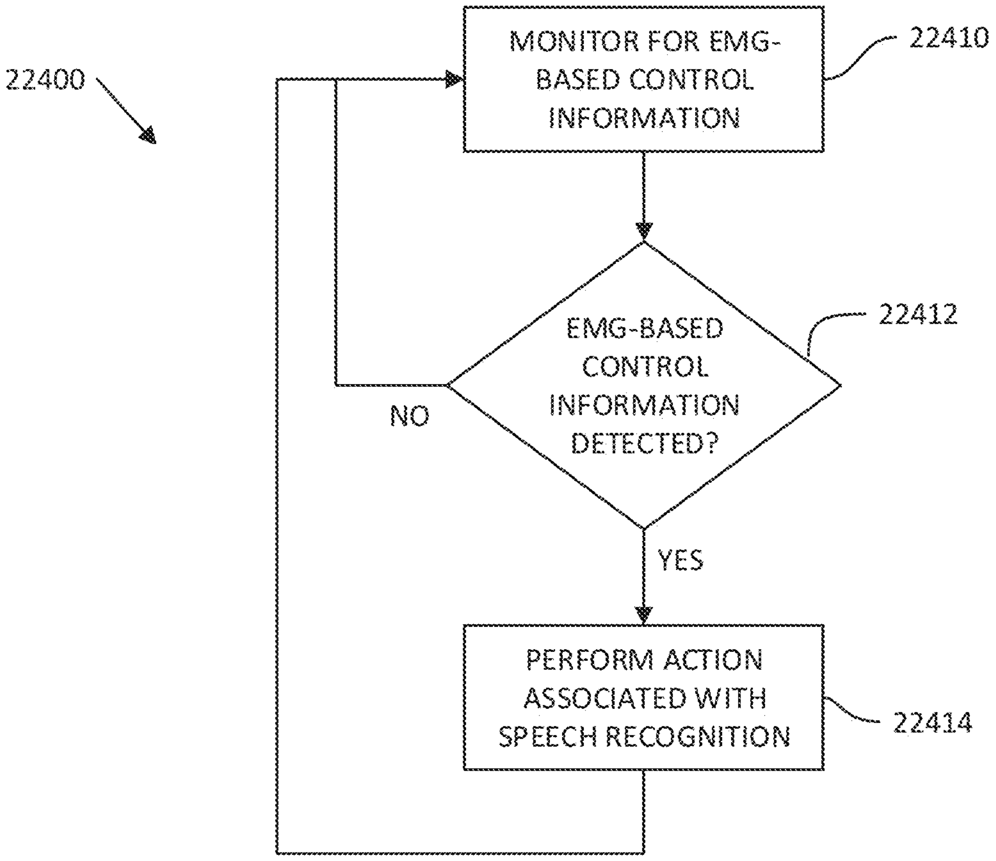
FIG. 22D is a flowchart of yet another illustrative process for using neuromuscular information to improve speech recognition, in accordance with some embodiments of the technology described herein.

FIG. 22D describes a process 22400 for using neuromuscular information to improve speech recognition. Process 22400 may be executed by any suitable computing device(s), as aspects of the technology described herein are not limited in this respect. For example, process 22400 may be executed by processor(s) 22112 described with reference to FIG. 22A. As another example, one or more acts of process 22400 may be executed using one or more servers (e.g., servers included as a part of a cloud computing environment). For example, at least a portion of act 22412 relating to detecting EMG-based control information may be performed using a cloud computing environment. Although process 22400 is described herein with respect to IMU and EMG signals, it should be appreciated that process 22400 may determine neuromuscular information based on any recorded autonomous signals including, but not limited to, IMU signals, EMG signals, MMG signals, SMG signals, or any suitable combination thereof and a trained statistical model trained on such autonomous signals.

Process 22400 begins at act 22410, where control information is monitored, e.g., for one or more movements or activations performed by the user. For example, process 22400 may monitor one or more EMG signals relating to neuromuscular information while speech data is obtained for one or multiple users from voice interface 22120. Voice interface 22120 may include a microphone that samples audio input at a particular sampling rate (e.g., 16 kHz). Sensor data relating to the control information may be received from sensors 22110. The sensor data may include a plurality of neuromuscular signals and/or signals derived from the plurality of neuromuscular signals.

Next, process 22400 proceeds to act 22412, where it is determined whether control information relating to a particular movement or activation is detected. The sensor data may be provided as input to one or more trained statistical models and control information of the user may be determined based, at least in part, on an output of the one or more trained statistical models. The sensor data may be provided as input to a trained statistical model to determine control information as described with respect to FIG. 22B.

If it is determined that control information for a particular movement or activation is detected, process 22400 proceeds to act 22414, where an action associated with speech recognition, and determined based on the detected control information, is performed. Otherwise, process 22400 returns to act 22410 to continue monitoring for control information. Performing an action with speech recognition may include, but is not limited to, altering a mode of the speech recognizer, starting or stopping the speech recognizer, or another suitable action associated with the speech recognizer. In another example, the user may perform a specific gesture to toggle the speech recognizer on and off, hold the gesture to keep the speech recognizer on, or hold a mute gesture to mute the speech recognizer. Determining an instruction for performing an action for the speech recognizer may be based on the determined control information, and the instruction may be provided to the speech recognizer. For example, the action associated with speech recognition may be performed by allowing a user to start or stop speech recognition, e.g., by making a gesture imitating a press of a button on a tape recorder. In another example, the action associated with speech recognition may be performed by allowing a user to initiate a spell check mode. In yet another example, the action associated with speech recognition may be performed by allowing a user to change the language of input by making a related gesture.

Figure 22E:
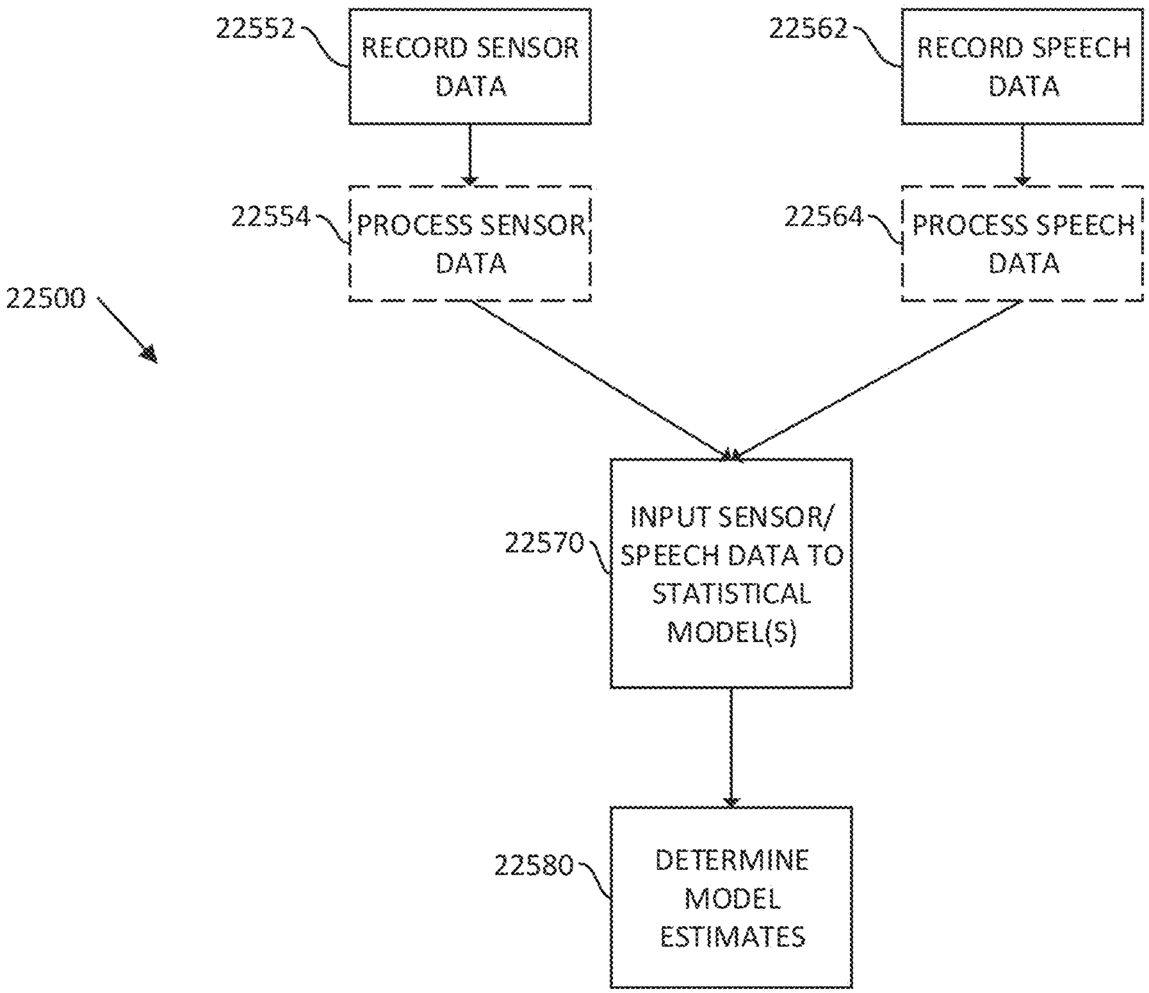
FIG. 22E is a flowchart of an illustrative process for using neuromuscular information to improve speech recognition in accordance with some embodiments of the technology described herein.

FIG. 22E describes a process 22500 for using neuromuscular information to improve speech recognition. Process 22500 may be executed by any suitable computing device(s), as aspects of the technology described herein are not limited in this respect. For example, process 22500 may be executed by processor(s) 22112 described with reference to FIG. 22A. As another example, one or more acts of process 22500 may be executed using one or more servers (e.g., servers included as a part of a cloud computing environment). For example, at least a portion of act 22580 relating to determining model estimates may be performed using a cloud computing environment. Although process 22500 is described herein with respect to IMU and EMG signals, it should be appreciated that process 22500 may determine neuromuscular information based on any recorded autonomous signals including, but not limited to, IMU signals, EMG signals, MMG signals, SMG signals, or any suitable combination thereof and a trained statistical model trained on such autonomous signals.

In some embodiments, process 22500 provides for a hybrid neuromuscular and speech input interface where a user may fluidly transition between using speech input, using neuromuscular input or using both speech input and neuromuscular input to perform speech recognition. The neuromuscular input may track body position information, movement, hand state, gestures, activations (e.g., from muscle fibers too weak to cause noticeable movement) or other suitable information relating to the plurality of recorded neuromuscular signals. In some embodiments, the speech input and neuromuscular input are used to provide for lower error rates in speech recognition. In other embodiments, the speech input and the neuromuscular input may be used selectively where one mode of input is preferable over the other. For example, in situations where it is not possible to speak aloud, only the neuromuscular input may be used to perform recognition.

At act 22552 of process 22500, sensor data is recorded, e.g., from sensors 22110, and at act 22554, the recorded sensor data is optionally processed. The sensor data may include a plurality of neuromuscular signals and/or signals derived from the plurality of neuromuscular signals. At act 22562 of process 22500, speech data is recorded, e.g., from one or multiple users from voice interface 22120, and at act 22564, the recorded speech data is optionally processed. Voice interface 22120 may include a microphone that samples audio input at a particular sampling rate (e.g., 16 kHz), and the speech data may be recorded by sampling audio input received by the microphone.

At act 22570 of process 22500, one or both of the processed or unprocessed sensor data and speech data is provided as input to one or more trained statistical models. In some embodiments, both sensor data and speech data are input to the trained statistical model(s) to provide for lower speech recognition error rates. The statistical model(s) may be trained on both inputs used in parallel. In some embodiments, only one of the sensor data or the speech data may be provided as input to the trained statistical models. The statistical models trained on both inputs may be configured to gracefully transition between speech-only mode, sensor-mode, and combined speech+sensor data mode based on particular conditions of the system use, for example, when only one input is available. In some embodiments, both the speech data, e.g., audio input, and the sensor data, e.g., a plurality of neuromuscular signals, are provided as input to the one or more trained statistical models. The audio input may be provided as input to the one or more trained statistical models at a first time and the plurality of neuromuscular signals is provided as input to the one or more trained statistical models at a second time different from the first time. Alternatively, the speech data and the sensor data may be provided as input to the one or more trained statistical models simultaneously or at a substantially same time.

At act 22580 of process 22500, a speech recognition result (e.g., text) for the input sensor and/or speech data is determined based, at least in part, on an output of the one or more trained statistical models. In some embodiments, the speech recognition result is determined by processing the audio input to determine a first portion of the text, and by processing the plurality of neuromuscular signals to determine a second portion of the text. In some embodiments, the one or more trained statistical models include a first trained statistical model for determining the text based on the audio input and a second trained statistical model for determining the text based on the plurality of neuromuscular signals.

The speech recognition result may be determined for at least a first portion of the text based on a first output of the first trained statistical model. In some embodiments, the text is further determined for at least a second portion of the text based on a second output of the second trained statistical model. In some embodiments, the first portion and the second portion are overlapping. For example, the first three-quarters of the text may be determined using speech input whereas the second three-quarters of the text may be determined using neuromuscular input, with the middle of the text being determined using both speech and neuromuscular input. In this example, the user may have provided both speech input and neuromuscular input from the one-quarter mark to the three-quarter mark, while only providing speech input or neuromuscular input otherwise. In some embodiments, the first portion and the second portion are non-overlapping. For example, the first half of the text may be determined using speech input whereas the second half of the text may be determined using neuromuscular input.

In some embodiments, one or more statistical models for a hybrid neuromuscular and speech input interface are provided such that a first statistical model is trained for determining the text based on the audio input and a second statistical model is trained for determining the text based on the plurality of neuromuscular signals. Such a model implementation may be advantageous for faster training of new movements or activations because only the second statistical model need be updated in the training process. It is noted that the model implementation for the hybrid neuromuscular and speech input interface need not be limited to the described implementation. For example, such systems may employ one model for processing both neuromuscular and speech inputs or multiple models for processing each of the neuromuscular and speech inputs. Further details on how to combine the outputs of such models are provided below.

In some embodiments, an ASR model is provided and subsequently trained to personalize the ASR model according to EMG-based sensor data received for the user. For example, the ASR model may be provided as an artificial neural network with one or more layers, each layer including nodes with assigned weights. A layer of the artificial neural network may receive input in the form of EMG-based sensor data to learn the movements or activations from the user and corresponding output, e.g., text. Alternatively or additionally, the weights in one or more layers of the artificial neural network may be adapted to learn the movements or activations from the user and corresponding output. In some embodiments, a single model receives both speech data and EMG-based sensor data as inputs and the model is trained to generate output corresponding to these inputs. For example, the model may be provided with data collected as the user speaks, e.g., a phrase, and performs a corresponding movement or activation. In some embodiments, an engineered combination of models is provided where EMG-based sensor data relating to neuromuscular information is used to switch between one or more trained statistical models trained on speech data. For example, the EMG-based sensor data may be used to determine when a user makes a movement or activation to switch a language mode of the speech recognizer. Accordingly, if it is determined that the user desires a different language mode, the trained statistical model corresponding to the desired language mode is selected.

In some embodiments, the output predictions of a first statistical model (trained for determining text based on speech data, also referred to as a language model) and a second statistical model (trained for determining text based on sensor data, such as EMG signals) are combined as described below.

For notation, P(A|B) is defined as the conditional probability of A given B. The language model may give a prior distribution P(text) over the possible text utterances. Bayes rule may be applied to calculate the probability of the text given the observed speech and EMG sensor data, according to the following formula:

$$P(\text{text}|\text{speech,EMG})=P(\text{speech,EMG}|\text{text})*P(\text{text})/P(\text{speech,EMG})$$

For optimizing the output predictions, i.e., text, the term P(speech, EMG) may be ignored and the combination may focus on the proportionality relationship, according to the following formula:

$$P(\text{text}|\text{speech,EMG}) \sim P(\text{speech,EMG}|\text{text}) * P(\text{text})$$

The speech data and the EMG data may be assumed to be conditionally independent given the output text, according to the following formula:

$$P(\text{speech,EMG}|\text{text}) = P(\text{speech}|\text{text}) * P(\text{EMG}|\text{text})$$

This assumption yields following formula:

$$P(\text{text}|\text{speech,EMG}) \sim P(\text{speech}|\text{text}) * P(\text{EMG}|\text{text}) * P(\text{text})$$

In embodiments where the individual models have a stage at which they output these conditional probabilities, the above formula may be applied directly.

In embodiments where the models output the P(text|speech) and P(text|EMG), Bayes rule may be applied, according to the following formulas:

$$P(\text{speech}|\text{text}) = P(\text{text}|\text{speech}) * P(\text{speech}) / P(\text{text}), \text{ and}$$

$$P(\text{EMG}|\text{text}) = P(\text{text}|\text{EMG}) * P(\text{EMG}) / P(\text{text})$$

These two equations may be substituted into the formula derived above, according to the following formula:

$$P(\text{text}|\text{speech,EMG}) \sim P(\text{text}|\text{speech}) * P(\text{speech}) * P(\text{text}|\text{EMG}) * P(\text{EMG}) / P(\text{text})$$

Finally, the terms with just speech and EMG may be dropped because output predictions are being optimized over text, according to the following formula:

$$P(\text{text}|\text{speech,EMG}) \sim P(\text{text}|\text{speech}) * P(\text{text}|\text{EMG}) / P(\text{text})$$

This formula combines a speech model that gives P(text|speech) with an EMG model that gives P(text|EMG).

In some embodiments, only one of the substitutions may be applied if a model gives P(EMG|text), according to the following formula:

$$P(\text{text}|\text{speech,EMG}) \sim P(\text{text}|\text{speech}) * P(\text{EMG}|\text{text})$$

In some embodiments, the prior distribution of words/phrases in the language model is altered, e.g., when the gesture provides context for interpreting the speech. For example, the gesture may be a natural gesture a user makes in a given context to switch modes, such as a making a fist gesture to switch to a proper noun mode. In proper noun mode, the language model output is biased such that proper nouns have a higher prior probability. If the language model is made aware of the upcoming input of a proper noun, the output of the model is more likely to be text for a proper noun. For example, the prior probability of proper nouns may be multiplied by a number greater than one to increase the bias for proper nouns. The language model may function in the same manner as before the switch to proper noun mode, except for applying a higher prior probability to proper nouns.

In some embodiments, the described systems and methods allow for obtaining one or more neuromuscular signals (e.g., EMG signals) in parallel with or substantially at the same time as obtaining speech data for one or multiple users. The neuromuscular information derived from the signals may be used to modify the behavior of the speech recognizer, e.g., switch to another mode of the speech recognizer. For example, neuromuscular information derived from neuromuscular signals from a user may indicate that the user wishes to activate a "spell mode" of the speech recognizer. Accordingly, the neuromuscular information may be used to switch the mode of the speech recognizer to character-based text entry. The user may make movements or activations and the corresponding neuromuscular information may be used to interpret the characters the user wishes to enter. Subsequently, neuromuscular information derived from neuromuscular signals from the user may indicate that the user wishes to deactivate the "spell mode" of the speech recognizer. In this manner, the user may alternate between speech input (e.g., to enter words) and neuromuscular input (e.g., to enter characters) in order to enter the desired text. In some embodiments, when switching to "spell mode," the speech recognizer swaps a language model suitable for speech input (e.g., to enter words) with another language model suitable for neuromuscular input (e.g., to enter characters). In some embodiments, when switching to "spell mode," the language model output is biased towards character-based text entry. For example, a prior distribution in the language model is selected to better recognize character-based entry. If the language model is made aware of the upcoming input of character-based text entry, the output of the model is more likely to recognize the characters as spelling out one or more words.

Some embodiments of the systems and methods described herein provide for determining text input with model(s) that use a linguistic token, such as phonemes, characters, syllables, words, sentences, or another suitable linguistic token, as the basic unit of recognition. An advantage of using phonemes as the linguistic token may be that using a phoneme-based representation is more similar to the natural speech language processing than character-based typing. Additionally, using a phoneme-based model may provide faster recognition performance than a character-based model approach because the phoneme-based approach uses a denser encoding compared to using characters.

For the implementation using phonemes as the linguistic token, the inventors have recognized that creating a phoneme-based vocabulary that is easy to learn and recognize may be challenging in part because the number of phonemes in a language (e.g., 36 phonemes for English) may be larger than the number of characters in the language (e.g., 26 characters). In some embodiments, the text input may be performed using an adaptive movement or activation information recognizer instead of a fixed phoneme vocabulary. In some embodiments, a speech synthesizer provides audio feedback to the user while the user trains the adaptive system to create a mapping between body position information (e.g., movement, hand states, and/or gestures) and phonemes. In some embodiments, the training system may be presented to the user as a game, e.g. a mimicry game. Language models may be applied to the input, similar to a speech recognizer, to decode EMG signals through soft phoneme predictions into text.

In some embodiments, the described systems and methods allow for the user to "speak" with their hands by providing hand states that correspond to different linguistic tokens, such as phonemes. For example, some gesture-based language techniques, such as American Sign Language, map gestures to individual characters (e.g., letters) or entire words. Some embodiments are directed to allowing the user to "speak" with their hands using an intermediate level of representation between characters and entire words, that more closely represents speech production. For example, a phoneme representation may be used and a model may map the user's hand states to particular phonemes. A phoneme-based system may provide a measure of privacy because a user may perform the movement or activation, such as the gesture, without moving or with little motion. It is noted that such movement-free or limited-movement systems need not be limited to using phonemes as their linguistic token. For example, such systems may use another linguistic token, such as characters. Such a system may also enable the user to provide input faster than they could using individual characters, but without having to learn movements or activations for a large vocabulary of words. For example, a phoneme-based system may provide for a speed of 200 words per minute, which is faster than a typical character typing rate. It is noted that such systems may additionally or alternatively use another linguistic token, such as common letter combinations found on a stenographer's keyboard.

In some embodiments, the described systems and methods allow for the user to "speak" with their hands by providing movement or activation that correspond to different linguistic tokens, such as characters. In using such a character representation, a model may map EMG signals for the user's hand states to particular characters. For example, the user may type on a flat surface as if it were a keyboard and perform hand states for keys corresponding to the characters the user wishes to enter. Such a character-based text entry (e.g., via detection of EMG signals) may be combined with speech-based text entry. The user may use speech-based text entry for initial text but, for example at a later point in time, switch modes to character-based text entry (e.g. enter "spell mode") and input hand states corresponding to the characters the user wishes to enter. In other embodiments, speech-based entry may be processed in parallel with text entry, such as using a speech command to change entry mode while typing (e.g., changing to all capitals, executing a control key operation, etc.) or modify a current input from or output to another device (e.g., a keyboard, a heads-up display, etc.). Any combination of entry using speech-based recognition and EMG signal processing may be performed to derive one or more multi-dimensional input/output mode(s) according to various embodiments.

In some embodiments, the described systems and methods allow for adaptive training of one or more statistical models to map neuromuscular information to linguistic tokens, such as phonemes. For example, the user may be asked to produce one or more simple words using hand states corresponding to phonemes. In some embodiments, the training may not be directed to explicitly generating neuromuscular information, e.g., for a gesture, to phoneme mappings for the user. Instead, the user may be asked to produce hand states for one or more words and the statistical models may be adapted based on the information learned from this process. For example, the user may be presented with a user interface that displays a training "game," where the user earns points for every correct hand state made to produce one or more target words. In some embodiments, a speech synthesizer may provide audio feedback to the user based on the phonemes produced by the user's hand states. The feedback may provide the user understanding on how to improve his or her hand states to produce the correct phonemes for the target words.

In some embodiments, the described systems and methods allow for the user to define an individualized mapping from neuromuscular information to linguistic tokens such as phonemes, by selecting what hand state, gesture, movement, or activation to use for each phoneme. For example, the user may train the one or more statistical models using small finger movements or muscle activations detectable by sensors 22110. If two movements are close to each other, the user may be asked to make the movement slightly differently to distinguish between the two movements. In some embodiments, feedback may be provided by the system to the user to encourage the user to produce movements or activations that are distinct from each other to enable the system to learn a better mapping from movement or activation to phoneme.

In some embodiments, a pre-trained fixed mapping, analogous to typing on a regular keyboard may be provided and the pre-trained mapping may be adapted or individualized to the user's movement or activation characteristics as the user uses the system. In such an adaptive system, the user may be able to minimize their movement over time to achieve the same system performance, such that smaller and smaller movements may be sufficient to produce neuromuscular signals mapped to different phonemes recognizable by the system. The system may be configured to adapt to the user's movements or activations in the background as the user is performing typical everyday tasks. For example, the system may be configured to track keys pressed by a user (e.g., using a key logger) as the user wears the wearable device of the system while typing on a keyboard, and the system may be configured to determine mappings between neuromuscular information, as the user types, and the recorded keystrokes.

Moreover, the system may not be limited to training in a phase separate from use of the system. In some embodiments, the system is configured to adapt a pre-trained mapping or another suitable mapping based on information from tracking a signal from the user indicating an erroneous text entry. For example, the signal may include a voice command (e.g., "backspace," "undo," "delete word," or another suitable voice command indicating an error was made), one or more neuromuscular signals (e.g., a gesture relating to a command, such as "backspace," "undo," "delete word," or another suitable command indicating an error was made), a signal from the user accepting an auto-correction of an erroneous text entry, or another suitable user signal indicating an erroneous text entry. The system may adapt a pre-trained mapping or another suitable mapping to the user based on this tracked information.

In some embodiments, the system is configured to adapt a pre-trained mapping or another suitable mapping based on consistency with a language model. For example, in absence of the adaptation to the language model, the system may determine output text to be "she yikes to eat ice cream," instead of "she likes to eat ice cream." The language model may include prior probabilities of certain combinations of words, phrases, sentences, or another suitable linguistic token, and the system may select the output text corresponding to a higher probability in the language model. For example, the language model may indicate that the phrase "likes to eat" has a higher probability than the phrase "yikes to eat." Accordingly, to be consistent with the language model, the system may adapt the pre-trained mapping or another suitable mapping and select output text having the higher probability, e.g., "she likes to eat ice cream."

In some embodiments, the system is configured to map neuromuscular information (derived from one or more neuromuscular signals, e.g., EMG signals) to an error indication from the user. For example, the user may tense one or more muscles after the system erroneously interprets a word the user spoke correctly. The neuromuscular signals relating to that movement or activation from the user may be mapped as an error indication from the user. In this manner, the user is not required to provide a training signal particularly relating to an error indication. In some embodiments, when the system detects neuromuscular information relating to the error indication, the system automatically corrects the error. For example, the system may automatically delete the last interpreted word. In another example, the system may provide the user with one or more options to correct the last interpreted word. In yet another example, the system may automatically replace the last interpreted word with another interpretation based on a language model. In some embodiments, the system may further adapt the pre-trained mapping or another suitable mapping based on the detected error indication. For example, the system may modify a language model associated with the speech recognizer to implement the correct interpretation. The system having been configured to detect the error indication may be able to differentiate between a case when the user made an error (e.g., the user spoke the wrong word) and a case when the speech recognizer made an error (e.g., the user spoke the correct word, but the speech recognizer interpreted it incorrectly). For example, the user may speak the word "yike" instead of "like," and the speech recognizer may interpret the word correctly as "yike." In this case, the system may detect the error to be a user error. In another example, the user may speak the word "like," but the speech recognizer may interpret the word incorrectly as "yike." The system may leverage the capability to separately detect these two types of errors to improve further adaptation of the pre-trained mapping or another suitable mapping to the user.

The following describes exemplary feedback from neuromuscular activation within various types of virtual and/or augmented reality environments according to at least one embodiment of the present disclosure.

According to aspects of the present technology, a computerized system for providing feedback to a user based on neuromuscular signals sensed from the user is described. The system may comprise a plurality of neuromuscular sensors and at least one computer processor. The plurality of neuromuscular sensors, which may be configured to sense a plurality of neuromuscular signals from the user, are arranged on one or more wearable devices. The least one computer processor may be programmed to: process the plurality of neuromuscular signals using one or more inference or statistical models; and provide feedback to the user based on one or both of: the processed plurality of neuromuscular signals, and information derived from the processed plurality of neuromuscular signals. The feedback may comprise visual feedback that includes information relating to one or both of: a timing of an activation of at least one motor unit of the user, and an intensity of the activation of the at least one motor unit of the user.

In an aspect, the feedback may comprise auditory feedback, or haptic feedback, or both auditory feedback and haptic feedback. The auditory feedback and the haptic feedback may relate to one or both of: the timing of the activation of the at least one motor unit of the user, and the intensity of the activation of the at least one motor unit of the user.

In another aspect, the visual feedback may further include a visualization relating to one or both of: the timing of the activation of the at least one motor unit of the user, and the intensity of the activation of the at least one motor unit of the user. The visualization may be provided within an augmented reality (AR) environment generated by an AR system or a virtual reality (VR) environment generated by a VR system. The visualization may depict at least one body part, with the at least one body part comprising any one or any combination of: a forearm of the user, a wrist of the user, and a leg of the user.

In a variation of this aspect, the at least one computer processor may be programmed to provide to the user a visualization of at least one target neuromuscular activity state. The at least one target neuromuscular activity state may be associated with performing a particular task.

In another variation of this aspect, the at least one computer processor may be programmed to determine, based on one or both of: the plurality of neuromuscular signals and information derived from the plurality of neuromuscular signals, deviation information from the at least one target neuromuscular activity state. The feedback provided to the user may comprise feedback based on the deviation information.

In yet another variation of this aspect, the at least one computer processor may be programmed to calculate a measure of muscle fatigue from one or both of: the plurality of neuromuscular signals and information derived from the plurality of neuromuscular signals. The visual feedback provided to the user may comprise a visual indication of the measure of muscle fatigue.

In an aspect, the at least one computer processor may be programmed to predict an outcome of a task or activity performed by the user based, at least in part, on one or both of: the plurality of neuromuscular signals and information derived from the plurality of neuromuscular signals. The feedback may comprise an indication of the predicted outcome.

In a variation of this aspect, the task or activity may be associated with an athletic movement or a therapeutic movement.

As will be appreciated, the present technology may encompass methods performed by or utilizing the systems of these aspects, and may further encompass computer-readable storage media storing code for the methods.

According to aspects of the present technology, a computerized system for providing feedback to a user based on neuromuscular signals sensed from the user is described. The system may comprise a plurality of neuromuscular sensors and at least one computer processor. The plurality of neuromuscular sensors, which may be configured to sense a plurality of neuromuscular signals from the user, may be arranged on one or more wearable devices. The at least one computer processor may be programmed to: process the plurality of neuromuscular signals using one or more inference or statistical models; and provide feedback to the user based on the processed plurality of neuromuscular signals. The feedback may be associated with one or more neuromuscular activity states of the user. The plurality of neuromuscular signals may relate to an athletic movement or a therapeutic movement performed by the user.

In an aspect, the feedback may comprise any one or any combination of: audio feedback, visual feedback, and haptic feedback.

In another aspect, the feedback may comprise visual feedback within an augmented reality (AR) environment generated by an AR system or a virtual reality (VR) environment generated by a VR system.

In a variation of this aspect, the visual feedback may comprise a visualization of one or both of: a timing of an activation of at least one motor unit of the user, and an intensity of the activation of the at least one motor unit of the user. The visualization may depict at least one body part, with the at least one body part comprising any one or any combination of: a forearm of the user, a wrist of the user, and a leg of the user. For example, the visualization may comprise a virtual representation or an augmented representation of the body part of the user, and the virtual representation or the augmented representation may depict the body part of the user acting with a greater activation force or moving with a larger degree of rotation than a reality-based activation force or a reality-based degree of rotation of the body party of the user.

In another variation of this aspect, the at least one computer processor may be programmed to provide to the user a visualization of at least one target neuromuscular activity state. The at least one target neuromuscular activity state may be associated with performing the athletic movement or the therapeutic movement. The visualization may comprise a virtual representation or an augmented representation of a body part of the user, and the virtual representation or the augmented representation may depict the body part of the user acting with a greater activation force or moving with a larger degree of rotation than a reality-based activation force or a reality-based degree of rotation of the body party of the user.

In variations of this aspect, the at least one computer processor may be programmed to determine, based on one or both of: the plurality of neuromuscular signals and information derived from the plurality of neuromuscular signals, deviation information from the at least one target neuromuscular activity state. The feedback may comprise a visualization based on the deviation information. In an implementation, the deviation information may be derived from a second plurality of neuromuscular signals processed by the at least one computer processor. In another implementation, the at least one computer processor may be programmed to predict an outcome of the athletic movement or the therapeutic movement performed by the user based, at least in part, on the deviation information, and the feedback may comprise an indication of the predicted outcome.

As will be appreciated, the present technology may encompass methods performed by or utilizing the systems of these aspects, and may further encompass computer-readable storage media storing code for the methods.

For example, according to an aspect of the present technology, a method for providing feedback to a user based on neuromuscular signals sensed from the user is described. The method, which may be performed by a computerized system, may comprise: receiving a plurality of neuromuscular signals sensed from the user using a plurality of neuromuscular sensors arranged on one or more wearable devices worn by the user; processing the plurality of neuromuscular signals using one or more inference or statistical models; and providing feedback to the user based on one or both of: the processed neuromuscular signals and information derived from the recorded neuromuscular signals. The feedback may comprise visual feedback that includes information relating to one or both of: a timing of an activation of at least one motor unit of the user, and an intensity of the activation of the at least one motor unit of the user.

In a variation of this aspect, the visual feedback may be provided within an augmented reality (AR) environment generated by an AR system or a virtual reality (VR) environment generated by a VR system.

In another variation of this aspect, the feedback may comprises auditory feedback or haptic feedback or auditory feedback and haptic feedback that relates to one or both of: the timing of the activation of the at least one motor unit of the user, and the intensity of the activation of the at least one motor unit of the user.

According to aspects of the present technology, a computerized system for providing feedback to a user based on neuromuscular signals sensed from the user is described. The system may comprise a plurality of neuromuscular sensors and at least one computer processor. The plurality of neuromuscular sensors, which may be configured to sense a plurality of neuromuscular signals from the user, may be arranged on one or more wearable devices. The at least one computer processor may be programmed to provide feedback to the user associated with one or both of: a timing of one or both of: a motor-unit activation and a muscle activation of the user, and an intensity of one or both of: the motor-unit activation and the muscle activation of the user. The feedback may be based on one or both of: the plurality of neuromuscular signals, and information derived from the plurality of neuromuscular signals.

In an aspect, the feedback may comprise audio feedback, or haptic feedback, or audio feedback and haptic feedback.

In another aspect, the feedback may comprise visual feedback.

In a variation of this aspect, the visual feedback may be provided within an augmented reality (AR) environment generated by an AR system or a virtual reality (VR) environment generated by a VR system. In one implementation, the feedback may comprise an instruction to the AR system to project, within the AR environment, a visualization of the timing or the intensity or the timing and the intensity on one or more body parts of the user. In another implementation, the feedback may comprise an instruction to the VR system to display, within the VR environment, a visualization of the timing or the intensity or the timing and the intensity on a virtual representation of one or more body parts of the user.

In an aspect, the at least one computer processor may be programmed to predict an outcome of a task based, at least in part, on one or both of: the plurality of neuromuscular signals and information derived from the plurality of neuromuscular signals. The feedback may comprise an indication of the predicted outcome.

In an aspect, the feedback may be provided during sensing of the plurality of neuromuscular signals.

In another aspect, the feedback may be provided in real-time.

In variations of this aspect, the plurality of neuromuscular signals may be sensed as the user is performing a particular task, and the feedback may be provided before the user completes performing the particular task. The particular task may be associated with an athletic movement or a therapeutic movement. For example, the therapeutic movement may be associated with monitoring a recovery associated with an injury. In another example, the feedback may be based, at least in part, on ergonomics associated with performing the particular task.

In an aspect, the at least one computer processor may be programmed to store one or both of: the plurality of neuromuscular signals and the information derived from the plurality of neuromuscular signals. The feedback may be based on one or both of: the stored plurality of neuromuscular signals and the stored information derived from the plurality of neuromuscular signals.

In a variation of this aspect, the feedback may be provided at a time when the plurality of neuromuscular signals are not being sensed.

In another aspect, the at least one computer processor may be programmed to provide to the user a visualization of a target neuromuscular activity associated with performing a particular task.

In a variation of this aspect, the target neuromuscular activity may comprise one or both of: a target timing of motor-unit activation or muscle activation or motor-unit and muscle activation of the user, and a target intensity of motor-unit activation or muscle activation or motor-unit and muscle activation of the user.

In another variation of this aspect, the visualization of the target neuromuscular activity may comprise a projection of the target neuromuscular activity onto one or more body parts of the user in an augmented reality (AR) environment generated by an AR system.

In yet another variation of this aspect, the visualization of the target neuromuscular activity may comprise an instruction to a virtual reality (VR) system to display a visualization of a timing of motor-unit activation or muscle activation or motor-unit and muscle activation of the user, or an intensity of the motor-unit activation or the muscle activation or the motor-unit activation and the muscle activation of the user, or both the timing and the intensity of the motor-unit activation or the muscle activation or the motor-unit action and the muscle activation of the user, within a VR environment generated by the VR system.

In a variation of this aspect, the at least one computer processor may be programmed to determine, based on one or both of: the plurality of neuromuscular signals and information derived from the plurality of neuromuscular signals, deviation information from the target neuromuscular activity. The feedback may comprise feedback based on the deviation information. In an implementation, the feedback based on the deviation information may comprise a visualization of the deviation information. For example, the visualization of the deviation information may comprise a projection of the deviation information onto one or more body parts of the user in an augmented reality (AR) environment generated by an AR system. In another example, the visualization of the deviation information may comprise an instruction provided to a virtual reality (VR) system to display the visualization of the deviation information on a virtual representation of one or more body parts of the user within a VR environment generated by the VR reality system. In yet another implementation, the at least one computer processor may be programmed to predict an outcome of a task based, at least in part, on the deviation information, and the feedback based on the deviation information may comprise an indication of the predicted outcome.

In an aspect, the at least one computer processor may be programmed to generate the target neuromuscular activity for the user based, at least in part, on one or both of: neuromuscular signals and information derived from the neuromuscular signals sensed during one or more performances of the particular task by the user or by a different user.

In a variation of this aspect, the at least one computer processor may be programmed to determine, based on one or more criteria, for each of the one or more performances of the particular task by the user or by the different user, a degree to which the particular task was performed well. The target neuromuscular activity may be generated for the user based on the degree to which each of the one or more performances of the particular task was performed well. The one or more criteria may include an indication from the user or from the different user about the degree to which the particular task was performed well.

In another variation of this aspect, the at least one computer processor may be programmed to determine, based on one or more criteria, for each of the one or more performances of the particular task by the user or by a different user, a degree to which the particular task was performed poorly. The target neuromuscular activity may be generated for the user based on the degree to which each of the one or more performances of the particular task was performed poorly. The one or more criteria may include an indication from the user or the different user about the degree to which the particular task was performed poorly.

In another aspect, the at least one computer processor may be programmed to calculate a measure of muscle fatigue from one or both of: the plurality of neuromuscular signals and information derived from the plurality of neuromuscular signals. The feedback may comprise an indication of the measure of muscle fatigue.

In a variation of this aspect, a calculation of the measure of muscle fatigue by the at least one computer processor may comprise determining spectral changes in the plurality of neuromuscular signals.

In another variation of this aspect, the indication of the measure of muscle fatigue may comprise a projection of the indication of the measure of muscle fatigue onto one or more body parts of the user in an augmented reality (AR) environment generated by an AR system.

In another variation of this aspect, the indication of the measure of muscle fatigue may comprise an instruction provided to a virtual reality (VR) system to display the indication of the measure of muscle fatigue within a VR environment generated by the VR system.

In another variation of this aspect, the at least one computer processor may be programmed to determine, based at least in part on the measure of muscle fatigue, an instruction to provide to the user to change a behavior of the user. The feedback may comprise an instruction to the user.

In another variation of this aspect, the at least one computer processor may be programmed to determine, based on the measure of muscle fatigue, whether a level of fatigue of the user is greater than a threshold level of muscle fatigue. The indication of the measure of muscle fatigue may comprise an alert about the level of fatigue, if the level of fatigue is determined to be greater than the threshold level of muscle fatigue.

In an aspect, the plurality of neuromuscular sensors may include at least one inertial measurement unit (IMU) sensor. The plurality of neuromuscular signals may comprise at least one neuromuscular signal sensed by the at least one IMU sensor.

In another aspect, the system may further comprise at least one auxiliary sensor configured to sense position information for one or more body parts of the user. The feedback may be based on the position information.

In a variation of this aspect, the at least one auxiliary sensor may comprise at least one camera.

In an aspect, the feedback provided to the user may comprise information associated with a performance of a physical task by the user.

In a variation of this aspect, the information associated with the performance of the physical task may comprise an indication of whether a force applied to a physical object during performance of the physical task was greater than a threshold force.

In another variation of this aspect, the information associated with the performance of the physical task may be provided to the user before the performance of the physical task is completed.

As will be appreciated, the present technology may encompass methods performed by or utilizing the systems of these aspects, and may further encompass computer-readable storage media storing code for the methods.

For example, according to an aspect of the present technology, a method for providing feedback for providing feedback to a user based on neuromuscular signals sensed from the user is described. The method, which may be performed by a computerized system, may comprise: using a plurality of neuromuscular sensors arranged on one or more wearable devices to sense a plurality of neuromuscular signals from the user; and providing feedback to the user associated with one or both of: a timing of a motor-unit activation of the user or a muscle activation of the user or both the motor-unit activation and the muscle activation of the user, and an intensity of a motor-unit activation of the user or a muscle activation of the user or both the motor-unit activation and the muscle activation of the user. The feedback may be based on one or both of: the sensed neuromuscular signals and information derived from the sensed neuromuscular signals.

In another example, according to an aspect of the present technology, a non-transitory computer-readable storage medium storing a program code for this method is described. That is, the program code, when executed by a computer, causes the computer to perform this method.

It is appreciated that there may be difficulty observing, describing, and communicating about neuromuscular activity, such as that performed by a person by moving one or more body part(s), such as an arm, a hand, a leg, a foot, etc. In particular, it may be difficult to process a timing and/or an intensity of motor-unit activations and muscle activations in such body part(s) in order to provide feedback to a person who performed or is performing certain movements of his or her body part(s). Skilled motor acts to be performed by humans may require precise coordinated activations of motor units and muscles, and learning such skilled acts may be hindered by difficulties in observing and communicating about motor-unit activations and muscle activations. Difficulty communicating about these activations can also be a hindrance to coaches, trainers (both human and automated/semi-automated ones), medical providers, and others who instruct humans to perform certain acts in athletics, performing arts, rehabilitation, and other areas. As will be appreciated, precise feedback regarding these activations is desirable for people learning to use neuromuscular control technology to control one or more system(s) (e.g., robotic systems, industrial control systems, gaming systems, AR systems, VR systems, other XR systems, etc.).

In some embodiments of the present technology described herein, systems and methods are provided for performing sensing and/or measurement(s) of neuromuscular signals, identification of activation of one or more neuromuscular structure(s), and delivering feedback to a user to provide information about the user's neuromuscular activation(s). In some embodiments, such feedback may be provided as any one or any combination of a visual display, an XR display (e.g., a MR, AR, and/or VR display), haptic feedback, an auditory signal, a user interface, and other types of feedback able to assist the user in performing certain movements or activities. Further, neuromuscular signal data may be combined with other data to provide more accurate feedback to the user. Such feedback to the user may take various forms, e.g., timing(s), intensity(ies), and/or muscle activation(s) relating to the neuromuscular activations of the user. Feedback may be delivered to the user instantaneously (e.g., in real-time or near real-time with minimal latency) or at some point in time after completing the movements or activities.

As will be appreciated, some systems of the present technology described herein may be used within an AR environment and/or a VR environment to provide such feedback to users. For instance, visualization of muscle and motor-unit activation(s) can be projected over a user's body within a display produced by an AR or VR system. Other feedback types, such as, for example, auditory tones or instructions, haptic buzzes, electrical feedback, etc., may be provided alone or in combination with visual feedback. Some embodiments of the present technology may provide a system that is capable of measuring or sensing a user's movement(s) through neuromuscular signals, comparing the movement(s) to a desired movement or movements, and providing feedback to the user about any differences or similarities between the desired movement(s) and the measured or sensed (i.e., actual) movement(s) of the user.

In some embodiments of the technology described herein, sensor signals may be used to predict information about a position and/or a movement of one or more portion(s) of a user's body (e.g., a leg, an arm, and/or a hand), which may be represented as a multi-segment articulated rigid-body system with joints connecting the multiple segments of the rigid-body system. For example, in the case of a hand movement, signals sensed by wearable neuromuscular sensors placed at locations on the user's body (e.g., the user's arm and/or wrist) may be provided as input to one or more inference model(s) trained to predict estimates of the position (e.g., absolute position, relative position, orientation) and the force(s) associated with a plurality of rigid segments in a computer-based musculoskeletal representation associated with a hand, for example, when the user performs one or more hand movements. The combination of position information and force information associated with segments of the musculoskeletal representation associated with a hand may be referred to herein as a "handstate" of the musculoskeletal representation. As a user performs different movements, a trained inference model may interpret neuromuscular signals sensed by the wearable neuromuscular sensors into position and force estimates (handstate information) that are used to update the musculoskeletal representation. Because the neuromuscular signals may be continuously sensed, the musculoskeletal representation may be updated in real-time, and a visual representation of one or more portion(s) of the user's body may be rendered (e.g., a hand within an AR or VR environment) based on current estimates of the handstate determined from the neuromuscular signals. As will be appreciated, an estimate of the user's handstate, determined using the user's neuromuscular signals, may be used to determine a gesture being performed by the user and/or to predict a gesture that the user will perform.

In some embodiments of the present technology, a system that senses neuromuscular signals may be coupled with a system that performs XR (e.g., AR or VR or MR) functions. For example, a system that senses neuromuscular signals used for determining a position of a body part (e.g., a hand, an arm, etc.) of a user may be used in conjunction with an AR system, such that the combined system may provide an improved AR experience for the user. Information gained by these systems may be used to improve the overall AR experience for the user. In one implementation, a camera included in the AR system may capture data that is used to improve an accuracy of a model of a musculoskeletal representation and/or to calibrate the model. Further, in another implementation, muscle activation data obtained by the system via sensed neuromuscular signals may be used to generate a visualization that may be displayed to the user in an AR environment. In yet another implementation, information displayed in the AR environment may be used as feedback to the user to permit the user to more accurately perform, e.g., gestures, or poses, or movements, etc., used for musculoskeletal input to the combined system. Further, control features may be provided in the combined system, which may permit predetermined neuromuscular activity to control aspects of the AR system.

In some embodiments of the present technology, musculoskeletal representations (e.g., handstate renderings) may include different types of representations that model user activity at different levels. For instance, such representations may include any one or any combination of an actual visual representation of a biomimetic (realistic) hand, a synthetic (robotic) hand, a low-dimensional embedded-space representation (e.g., by utilizing Principal Component Analysis (PCA), Isomaps, Local Linear Embedding (LLE), Sensible PCA, and/or another suitable technique to produce a low-dimensional representation), as well as an "internal representation" that may serve as input information for a gesture-based control operation (e.g., to control one or more function(s) of another application or another system, etc.). That is, in some implementations, hand-position information and/or force information may be provided as inputs for downstream algorithms but need not be directly rendered. As mentioned above, data captured by a camera may be used to assist in creating actual visual representations (e.g., improving an XR version of the user's hand using a hand image captured by the camera).

As discussed herein, it may be beneficial to measure (e.g., sense and analyze) neuromuscular signals, to determine identifications of an activation of one or more neuromuscular structure(s), and to deliver feedback to the user to provide information about the user's neuromuscular activations. In some embodiments of the technology described herein, in order to obtain a reference for determining human movement, a system may be provided for measuring and modeling a human musculoskeletal system. All or portions of the human musculoskeletal system can be modeled as a multi-segment articulated rigid body system, with joints forming the interfaces between the different segments and joint angles defining the spatial relationships between connected segments in the model.

Constraints on the movement at a joint are governed by the type of joint connecting the segments and the biological structures (e.g., muscles, tendons, ligaments) that may restrict the range of movement at the joint. For example, the shoulder joint connecting the upper arm to a torso or a human subject, and a hip joint connecting an upper leg to the torso, are ball and socket joints that permit extension and flexion movements as well as rotational movements. By contrast, an elbow joint connecting the upper arm and a lower arm (or forearm), and a knee joint connecting the upper leg and a lower leg of the human subject, allow for a more limited range of motion. In this example, a multi-segment articulated rigid body system may be used to model portions of the human musculoskeletal system. However, it should be appreciated that although some segments of the human musculoskeletal system (e.g., the forearm) may be approximated as a rigid body in the articulated rigid body system, such segments may each include multiple rigid structures (e.g., the forearm may include ulna and radius bones), which may enable more complex movements within the segment that is not explicitly considered by the rigid body model. Accordingly, a model of an articulated rigid body system for use with some embodiments of the technology described herein may include segments that represent a combination of body parts that are not strictly rigid bodies. It will be appreciated that physical models other than the multi-segment articulated rigid body system may be used to model portions of the human musculoskeletal system without departing from the scope of this disclosure.

Continuing with the example above, in kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body, with the joints in the wrist and each finger forming interfaces between the multiple segments in the model. Movements of the segments in the rigid body model can be simulated as an articulated rigid body system in which position (e.g., actual position, relative position, or orientation) information of a segment relative to other segments in the model are predicted using a trained inference model, as described in more detail below.

For some embodiments of the present technology, the portion of the human body approximated by a musculoskeletal representation may be a hand or a combination of a hand with one or more arm segments. The information used to describe a current state of the positional relationships between segments, force relationships for individual segments or combinations of segments, and muscle and motor-unit activation relationships between segments in the musculoskeletal representation is referred to herein as the "handstate" of the musculoskeletal representation (see other discussions of handstate herein). It should be appreciated, however, that the techniques described herein are also applicable to musculoskeletal representations of portions of the body other than the hand, including, hut not limited to, an arm, a leg, a foot, a torso, a neck, or any combination of the foregoing.

In addition to spatial (e.g., position and/or orientation) information, some embodiments of the present technology enable a prediction of force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when a segment, such as in a wrist or a finger, is twisted or flexed relative to another segment. In some embodiments, the force information determined as a portion of a current handstate estimate includes one or more of: pinching force information, grasping force information, and information about co-contraction forces between muscles represented by the musculoskeletal representation. It should be appreciated that there may be multiple forces associated with a segment of a musculoskeletal representation. For example, there are multiple muscles in a forearm segment, and force acting on the forearm segment may be predicted based on an individual muscle or based on one or more group(s) of muscles (e.g., flexors, extensors, etc.).

As used herein, the term "gestures" may refer to a static or dynamic configuration of one or more body parts including a position of the one or more body parts and forces associated with the configuration. For example, gestures may include discrete gestures, such as placing or pressing the palm of a hand down on a solid surface, or grasping a ball, or pinching two fingers together (e.g., to form a pose); or continuous gestures, such as waving a finger back and forth, grasping and throwing a ball, rotating a wrist in a direction; or a combination of discrete and continuous gestures. Gestures may include covert gestures that may be imperceptible to another person, such as slightly tensing a joint by co-contracting opposing muscles or using sub-muscular activations. In training an inference model, gestures may be defined using an application configured to prompt a user to perform the gestures or, alternatively, gestures may be arbitrarily defined by a user. The gestures performed by the user may include symbolic gestures (e.g., gestures mapped to other gestures, interactions, or commands, for example, based on a gesture vocabulary that specifies the mapping). In some cases, hand and arm gestures may be symbolic and used to communicate according to cultural standards.

In accordance with some embodiments of the technology described herein, signals sensed by one or more wearable sensor(s) may be used to control an XR system. The inventors have discovered that a number of muscular activation states of a user may be identified from such sensed signals and/or from information based on or derived from such sensed signals to enable improved control of the XR system. Neuromuscular signals may be used directly as an input to an XR system (e.g. by using motor-unit action potentials as an input signal) and/or the neuromuscular signals may be processed (including by using an inference model as described herein) for the purpose of determining a movement, a force, and/or a position of a part of the user's body (e.g. fingers, hand, wrist, leg, etc.). Various operations of the XR system may be controlled based on identified muscular activation states. An operation of the XR system may include any aspect of the XR system that the user can control based on sensed signals from the wearable sensor(s). The muscular activation states may include, but are not limited to, a static gesture or pose performed by the user, a dynamic gesture or motion performed by the user, a sub-muscular activation state of the user, a muscular tensing or relaxation performed by the user, or any combination of the foregoing. For instance, control of the XR system may include control based on activation of one or more individual motor units, e.g., control based on a detected sub-muscular activation state of the user, such as a sensed tensing of a muscle. Identification of one or more muscular activation state(s) may allow a layered or multi-level approach to controlling operation(s) of the XR system. For instance, at a first layer/level, one muscular activation state may indicate that a mode of the XR system is to be switched from a first mode (e.g., an XR interaction mode) to a second mode (e.g., a control mode for controlling operations of the XR system); at a second layer/level, another muscular activation state may indicate an operation of the XR system that is to be controlled; and at a third layer/level, yet another muscular activation state may indicate how the indicated operation of the XR system is to be controlled. It will be appreciated that any number of muscular activation states and layers may be used without departing from the scope of this disclosure. For example, in some embodiments, one or more muscular activation state(s) may correspond to a concurrent gesture based on activation of one or more motor units, e.g., the user's hand bending at the wrist while pointing the index finger. In some embodiments, one or more muscular activation state(s) may correspond to a sequence of gestures based on activation of one or more motor units, e.g., the user's hand bending at the wrist upwards and then downwards. In some embodiments, a single muscular activation state may both indicate to switch into a control mode and indicate the operation of the XR system that is to be controlled. As will be appreciated, the phrases "sensed and recorded", "sensed and collected", "recorded", "collected", "obtained", and the like, when used in conjunction with a sensor signal comprises a signal detected or sensed by the sensor. As will be appreciated, the signal may be sensed and recorded or collected without storage in a nonvolatile memory, or the signal may be sensed and recorded or collected with storage in a local nonvolatile memory or in an external nonvolatile memory. For example, after detection or being sensed, the signal may be stored at the sensor "as-detected" (i.e., raw), or the signal may undergo processing at the sensor prior to storage at the sensor, or the signal may be communicated (e.g., via a Bluetooth technology or the like) to an external device for processing and/or storage, or any combination of the foregoing.

According to some embodiments of the present technology, the muscular activation states may be identified, at least in part, from raw (e.g., unprocessed) sensor signals obtained (e.g., sensed) by one or more wearable sensor(s). In some embodiments, the muscular activation states may be identified, at least in part, from information based on the raw sensor signals (e.g., processed sensor signals), where the raw sensor signals obtained by the one or more wearable sensor(s) are processed to perform, e.g., amplification, filtering, rectification, and/or other form of signal processing, examples of which are described in more detail below. In some embodiments, the muscular activation states may be identified, at least in part, from an output of one or more trained inference model(s) that receive the sensor signals (raw or processed versions of the sensor signals) as input(s).

As noted above, muscular activation states, as determined based on sensor signals in accordance with one or more of the techniques described herein, may be used to control various aspects and/or operations of an XR system. Such control may reduce the need to rely on cumbersome and inefficient input devices (e.g., keyboards, mouses, touchscreens, etc.). For example, sensor data (e.g., signals obtained from neuromuscular sensors or data derived from such signals) may be obtained and muscular activation states may be identified from the sensor data without the user having to carry a controller and/or other input device, and without having the user remember complicated button or key manipulation sequences. Also, the identification of the neuromuscular activation states (e.g., poses, gestures, varying degrees of force associated with the neuromuscular activation states, etc.) from the sensor data can be performed relatively fast, thereby reducing the response times and latency associated with controlling the XR system. Signals sensed by wearable sensors placed at locations on the user's body may be provided as input to an inference model trained to generate spatial and/or force information for rigid segments of a multi-segment articulated rigid-body model of a human body, as mentioned above. The spatial information may include, for example, position information of one or more segments, orientation information of one or more segments, joint angles between segments, and the like. Based on the input, and as a result of training, the inference model may implicitly represent inferred motion of the articulated rigid body under defined movement constraints. The trained inference model may output data useable for applications such as applications for rendering a representation of the user's body in an XR environment, in which the user may interact with physical and/or virtual objects, and/or applications for monitoring the user's movements as the user performs a physical activity to assess, for example, whether the user is performing the physical activity in a desired manner. As will be appreciated, the output data from the trained inference model may be used for applications other than those specifically identified herein. For instance, movement data obtained by a single movement sensor positioned on the user (e.g., on the user's wrist or arm) may be provided as input data to a trained inference model. Corresponding output data generated by the trained inference model may be used to determine spatial information for one or more segments of a multi-segment articulated rigid body model for the user. For example, the output data may be used to determine the position and/or the orientation of one or more segments in the multi-segment articulated rigid body model. In another example, the output data may be used to determine angles between connected segments in the multi-segment articulated rigid-body model.

Figure 23A:
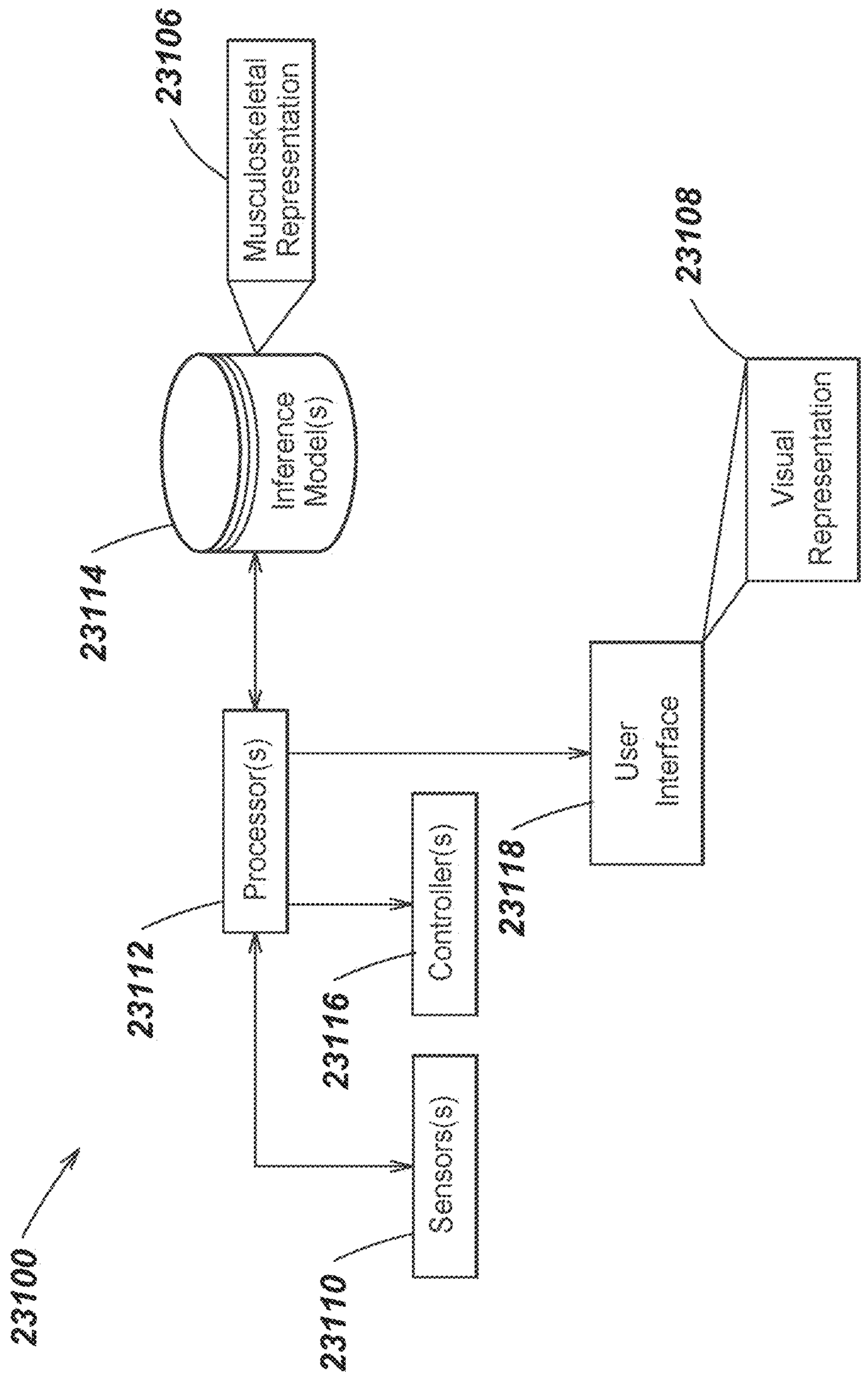
FIG. 23A is a schematic diagram of a computer-based system for processing neuromuscular sensor data, such as signals obtained from neuromuscular sensors, to generate a musculoskeletal representation, in accordance with some embodiments of the technology described herein.

Turning now to the figures, FIG. 23A schematically illustrates a system 23100, for example, a neuromuscular activity system, in accordance with some embodiments of the technology described herein. The system may comprise one or more sensor(s) 23110 configured to sense (e.g., detect, measure, and/or record) signals resulting from activation of motor units within one or more portion(s) of a human body. Such activation may involve a visible movement of the portion(s) of the human body, or a movement that may not be readily seen with a naked eye. The sensor(s) 23110 may include one or more neuromuscular sensor(s) configured to sense signals arising from neuromuscular activity in skeletal muscle of a human body (e.g., carried on a wearable device) without requiring the use of auxiliary devices (e.g., cameras, global positioning systems, laser scanning systems) and also without requiring the use of an external sensor or device (i.e., not carried on the wearable device), as discussed herein with reference to FIGS. 18B and 20F. As will be appreciated, although not required, one or more auxiliary device(s) may be used in conjunction with the neuromuscular sensor(s).

The term "neuromuscular activity" as used herein refers to neural activation of spinal motor neurons or units that innervate a muscle, muscle activation, muscle contraction, or any combination of the neural activation, muscle activation, and muscle contraction. The one or more neuromuscular sensor(s) may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type able to detect neuromuscular signals. In some embodiments of the present technology, information relating to an interaction of a user with a physical object in an XR environment (e.g., an AR, MR, and/or VR environment) may be determined from neuromuscular signals sensed by the one or more neuromuscular sensor(s). Spatial information (e.g., position and/or orientation information) and force information relating to the movement may be predicted based on the sensed neuromuscular signals as the user moves over time. In some embodiments, the one or more neuromuscular sensor(s) may sense muscular activity related to movement caused by external objects, for example, movement of a hand being pushed by an external object.

The term "neuromuscular activity state" or "neuromuscular activation state" may comprise any information relating to one or more characteristics of a neuromuscular activity, including but not limited to: a strength of a muscular or sub-muscular contraction, an amount of force exerted by a muscular or sub-muscular contraction, a performance of a pose or a gesture and/or any varying amount of force(s) associated with that performance, spatio-temporal positioning of one or more body parts or segments, a combination of position information and force information associated with segments of a musculoskeletal representation associated with a hand (e.g., handstate) or other body part, any pattern by which muscles become active and/or increase their firing rate, and angles between connected segments in a multi-segment articulated rigid-body model. Accordingly, the term "neuromuscular activity state" or "neuromuscular activation state" is meant to encompass any information relating to sensed, detected, and/or recorded neuromuscular signals and/or information derived from those neuromuscular signals.

The one or more sensor(s) 23110 may include one or more auxiliary sensor(s), such as one or more photoplethysmography (PPG) sensors, which detect vascular changes (e.g., changes in blood volume) and/or one or more Inertial Measurement Unit(s) or IMU(s), which measure a combination of physical aspects of motion, using, for example, an accelerometer, a gyroscope, a magnetometer, or any combination of one or more accelerometers, gyroscopes and magnetometers. In some embodiments, one or more IMU(s) may be used to sense information about movement of the part of the body on which the IMU(s) is or are attached, and information derived from the sensed IMU data (e.g., position and/or orientation information) may be tracked as the user moves over time. For example, one or more IMU(s) may be used to track movements of portions (e.g., arms, legs) of a user's body proximal to the user's torso relative to the IMU(s) as the user moves over time.

In embodiments that include at least one IMU and one or more neuromuscular sensor(s), the IMU(s) and the neuromuscular sensor(s) may be arranged to detect movement of different parts of a human body. For example, the IMU(s) may be arranged to detect movements of one or more body segments proximal to the torso (e.g., movements of an upper arm), whereas the neuromuscular sensors may be arranged to detect motor unit activity within one or more body segments distal to the torso (e.g., movements of a lower arm (forearm) or a wrist). It should be appreciated, however, that the sensors (i.e., the IMU(s) and the neuromuscular sensor(s)) may be arranged in any suitable way, and embodiments of the technology described herein are not limited based on the particular sensor arrangement. For example, in some embodiments, at least one IMU and a plurality of neuromuscular sensors may be co-located on a body segment to track motor unit activity and/or movements of the body segment using different types of measurements. In one implementation, an IMU and a plurality of EMG sensors may be arranged on a wearable device structured to be worn around the lower arm or the wrist of a user. In such an arrangement, the IMU may be configured to track, over time, movement information (e.g., positioning and/or orientation) associated with one or more arm segments, to determine, for example, whether the user has raised or lowered his/her arm, whereas the EMG sensors may be configured to determine finer-grained or more subtle movement information and/or sub-muscular information associated with activation of muscular or sub-muscular structures in muscles of the wrist and/or the hand.

As the tension of a muscle increases during performance of a motor task, the firing rates of active neurons increase, and additional neurons may become active, which is a process referred to as motor-unit recruitment. A motor unit is made up of a motor neuron and skeletal muscle fibers innervated by that motor neuron's axonal terminals. Groups of motor units often work together to coordinate a contraction of a single muscle; all of the motor units within a muscle are considered a motor pool.

The pattern by which neurons become active and increase their firing rate may be stereotyped, such that the expected motor unit recruitment patterns may define an activity manifold associated with standard or normal movement. In some embodiments, sensor signals may identify activation of a single motor unit or a group of motor units that are "off-manifold," in that the pattern of motor-unit activation is different than an expected or typical motor-unit recruitment pattern. Such off-manifold activation may be referred to herein as, "sub-muscular activation" or "activation of a sub-muscular structure," where a sub-muscular structure refers to the single motor unit or the group of motor units associated with the off-manifold activation. Examples of off-manifold motor-unit recruitment patterns include, but are not limited to, selectively activating a high-threshold motor unit without activating a lower-threshold motor unit that would normally be activated earlier in the recruitment order and modulating the firing rate of a motor unit across a substantial range without modulating the activity of other neurons that would normally be co-modulated in typical motor-unit recruitment patterns. The one or more neuromuscular sensor(s) may be arranged relative to the human body to sense sub-muscular activation without observable movement, i.e., without a corresponding movement of the body that can be readily observed by naked eyes. Sub-muscular activation may be used, at least in part, to provide information to an AR or VR system and/or to interact with a physical object in an AR or VR environment produced by the AR or VR system.

Some or all of the sensor(s) 23110 may each include one or more sensing components configured to sense information about a user. In the case of IMUs, the sensing component(s) of an IMU may include one or more: accelerometer, gyroscope, magnetometer, or any combination thereof, to measure or sense characteristics of body motion, examples of which include, but are not limited to, acceleration, angular velocity, and a magnetic field around the body during the body motion. In the case of neuromuscular sensors, the sensing component(s) may include, but are not limited to, electrodes that detect electric potentials on the surface of the body (e.g., for EMG sensors), vibration sensors that measure skin surface vibrations (e.g., for MMG sensors), acoustic sensing components that measure ultrasound signals (e.g., for SMG sensors) arising from muscle activity, or any combination thereof. Optionally, the sensor(s) 23110 may include any one or any combination of: a thermal sensor that measures the user's skin temperature (e.g., a thermistor); a cardio sensor that measure's the user's pulse, heart rate, a moisture sensor that measures the user's state of perspiration, and the like. Exemplary sensors that may be used as part of the one or more sensor(s) 23110, in accordance with some embodiments of the technology disclosed herein, are described in more detail in U.S. Pat. No. 10,409,371 entitled "METHODS AND APPARATUS FOR INFERRING USER INTENT BASED ON NEUROMUSCULAR SIGNALS," which is incorporated by reference herein in its entirety.

In some embodiments, the one or more sensor(s) 23110 may comprise a plurality of sensors 23110, and at least some of the plurality of sensors 23110 may be arranged as a portion of a wearable device structured to be worn on or around part of a user's body. For example, in one non-limiting example, an IMU and a plurality of neuromuscular sensors are arranged circumferentially around an adjustable and/or elastic band, such as a wristband or an armband structured to be worn around a user's wrist or arm, as described in more detail below. In some embodiments, multiple wearable devices, each having one or more IMU(s) and/or one or more neuromuscular sensor(s) included thereon, may be used to determine information relating to an interaction of a user with a physical object based on activation from muscular and/or sub-muscular structures and/or based on movement that involves multiple parts of the body. Alternatively, at least some of the sensors 23110 may be arranged on a wearable patch configured to be affixed to a portion of the user's body. FIGS. 23L-23O show various types of wearable patches. FIG. 23L shows a wearable patch 231202 in which circuitry for an electronic sensor may be printed on a flexible substrate that is structured to adhere to an arm, e.g., near a vein to sense blood flow in the user. The wearable patch 231202 may be an RFID-type patch, which may transmit sensed information wirelessly upon interrogation by an external device. FIG. 23M shows a wearable patch 231204 in which an electronic sensor may be incorporated on a substrate that is structured to be worn on the user's forehead, e.g., to measure moisture from perspiration. The wearable patch 231204 may include circuitry for wireless communication, or may include a connector structured to be connectable to a cable, e.g., a cable attached to a helmet, a heads-mounted display, or another external device. The wearable patch 231204 may be structured to adhere to the user's forehead or to be held against the user's forehead by, e.g., a headband, skullcap, or the like. FIG. 23N shows a wearable patch 231206 in which circuitry for an electronic sensor may be printed on a substrate that is structured to adhere to the user's neck, e.g., near the user's carotid artery to sense flood flow to the user's brain. The wearable patch 231206 may be an RFID-type patch or may include a connector structured to connect to external electronics. FIG. 23O shows a wearable patch 231208 in which an electronic sensor may be incorporated on a substrate that is structured to be worn near the user's heart, e.g., to measure the user's heartrate or to measure blood flow to/from the user's heart. As will be appreciated, wireless communication is not limited to RFID technology, and other communication technologies may be employed. Also, as will be appreciated, the sensors 23110 may be incorporated on other types of wearable patches that may be structured differently from those shown in FIGS. 23L-23O.

In one implementation, the sensor(s) 23110 may include sixteen neuromuscular sensors arranged circumferentially around a band (e.g., an adjustable strap, an elastic band, etc.) structured to be worn around a user's lower arm (e.g., encircling the user's forearm). For example, FIG. 18B shows an embodiment of a wearable system 18500 in which neuromuscular sensors 18504 (e.g., EMG sensors) are arranged circumferentially around a hand 18502. It should be appreciated that any suitable number of neuromuscular sensors may be used, and the number and arrangement of neuromuscular sensors used may depend on the particular application for which the wearable system is used. For example, a wearable armband or wristband may be used to generate control information for controlling an XR system, controlling a robot, controlling a vehicle, scrolling through text, controlling a virtual avatar, or any other suitable control task. In some embodiments, the band 18502 may also include one or more IMUs (not shown) for obtaining movement information, as discussed herein.

FIGS. 20F-20G and 20H-20I show other embodiments of wearable systems of the present technology. In particular, FIG. 20F illustrates a wearable system 20600 with a plurality of sensors 20610 arranged circumferentially around an elastic band 20620 structured to be worn around a user's lower arm or wrist. The sensors 20610 may be neuromuscular sensors (e.g., EMG sensors). As shown, there may be sixteen sensors 20610 arranged circumferentially around the elastic band 20620 at a regular spacing. It should be appreciated that any suitable number of sensors 20610 may be used, and the spacing need not be regular. The number and arrangement of the sensors 20610 may depend on the particular application for which the wearable system is used. For instance, the number and arrangement of the sensors 20610 may differ when the wearable system is to be worn on a wrist in comparison with a thigh. A wearable system (e.g., armband, wristband, thighband, etc.) can be used to generate control information for controlling a robot, controlling a vehicle, scrolling through text, controlling a virtual avatar, and/or performing any other suitable control task.

In some embodiments, the sensors 20610 may include only a set of neuromuscular sensors (e.g., EMG sensors). In other embodiments, the sensors 20610 may include a set of neuromuscular sensors and at least one auxiliary device. The auxiliary device(s) may be configured to continuously sense and record one or a plurality of auxiliary signal(s). Examples of auxiliary devices include, but are not limited to, IMUs, microphones, imaging devices (e.g., cameras), radiation-based sensors for use with a radiation-generation device (e.g., a laser-scanning device), heart-rate monitors, and other types of devices, which may capture a user's condition or other characteristics of the user. As shown in FIG. 20F, the sensors 20610 may be coupled together using flexible electronics 20630 incorporated into the wearable system. FIG. 20G illustrates a cross-sectional view through one of the sensors 20610 of the wearable system 20600 shown in FIG. 20F.

In some embodiments, the output(s) of one or more sensing component(s) of the sensors 20610 can be processed using hardware signal-processing circuitry (e.g., to perform amplification, filtering, and/or rectification). In other embodiments, at least some signal processing of the output(s) of the sensing component(s) can be performed using software. Thus, signal processing of signals sensed or obtained by the sensors 20610 can be performed by hardware or by software, or by any suitable combination of hardware and software, as aspects of the technology described herein are not limited in this respect. A non-limiting example of a signal-processing procedure used to process data obtained by the sensors 20610 is discussed in more detail below in connection with FIG. 20H-20I.

FIGS. 20H-20I illustrates a schematic diagram with internal components of a wearable system with sixteen sensors (e.g., EMG sensors), in accordance with some embodiments of the technology described herein. As shown, the wearable system includes a wearable portion 20710 and a dongle portion 20720. Although not illustrated, the dongle portion 20720 is in communication with the wearable portion 20710 (e.g., via Bluetooth or another suitable short range wireless communication technology). The wearable portion 20710 includes the sensors 20610, examples of which are described above in connection with FIGS. 20F and 20G. The sensors 20610 provide output (e.g., signals) to an analog front end 20730, which performs analog processing (e.g., noise reduction, filtering, etc.) on the signals. Processed analog signals produced by the analog front end 20730 are then provided to an analog-to-digital converter 20732, which converts the processed analog signals to digital signals that can be processed by one or more computer processors. An example of a computer processor that may be used in accordance with some embodiments is a microcontroller (MCU) 20734. The MCU 20734 may also receive inputs from other sensors (e.g., an IMU 20740) and from a power and battery module 20742. As will be appreciated, the MCU 20734 may receive data from other devices not specifically shown. A processing output by the MCU 20734 may be provided to an antenna 20750 for transmission to the dongle portion 20720.

The dongle portion 20720 includes an antenna 201052 that communicates with the antenna 20750 of the wearable portion 20710. Communication between the antennas 20750 and 201052 may occur using any suitable wireless technology and protocol, non-limiting examples of which include radiofrequency signaling and Bluetooth. As shown, the signals received by the antenna 201052 of the dongle portion 20720 may be provided to a host computer for further processing, for display, and/or for effecting control of a particular physical or virtual object or objects (e.g., to perform a control operation in an AR environment).

Although the examples provided with reference to FIGS. 20F, 20G, and 20H-20I are discussed in the context of interfaces with EMG sensors, it is to be understood that the wearable systems described herein can also be implemented with other types of sensors, including, but not limited to, mechanomyography (MMG) sensors, sonomyography (SMG) sensors, and electrical impedance tomography (EIT) sensors.

Returning to FIG. 23A, in some embodiments, sensor data or signals obtained by the sensor(s) 23110 may be processed to compute additional derived measurements, which may then be provided as input to an inference model, as described in more detail below. For example, signals obtained from an IMU may be processed to derive an orientation signal that specifies the orientation of a segment of a rigid body over time. The sensor(s) 23110 may implement signal processing using components integrated with the sensing components of the sensor(s) 23110, or at least a portion of the signal processing may be performed by one or more components in communication with, but not directly integrated with the sensing components of the sensor(s) 23110.

The system 23100 also includes one or more computer processor(s) 23112 programmed to communicate with the sensor(s) 23110. For example, signals obtained by one or more of the sensor(s) 23110 may be output from the sensor(s) 23110 and provided to the processor(s) 23112, which may be programmed to execute one or more machine learning algorithm(s) to process the signals output by the sensor(s) 23110. The algorithm(s) may process the signals to train (or retrain) one or more inference model(s) 23114, and the trained (or retrained) inference model(s) 23114 may be stored for later use in generating a musculoskeletal representation. As will be appreciated, in some embodiments of the present technology, the inference model(s) 23114 may include at least one statistical model. Non-limiting examples of inference models that may be used in accordance with some embodiments of the present technology to predict, e.g., handstate information based on signals from the sensor(s) 23110 are discussed in U.S. patent application Ser. No. 15/659,504 filed Jul. 25, 2017, entitled "SYSTEM AND METHOD FOR MEASURING THE MOVEMENTS OF ARTICULATED RIGID BODIES," which is incorporated by reference herein in its entirety. It should be appreciated that any type or combination of types of inference model(s) may be used, such as ones that are pre-trained, ones that are trained with user input, and/or ones that are periodically adapted or retrained based on further input.

Some inference models may have a long-standing focus on producing inferences achieved through building and fitting probability models to compute quantitative measures of confidence to determine relationships that are unlikely to result from noise or randomly. Machine-learning models may strive to produce predictions by identifying patterns, often in rich and unwieldy datasets. To some extent, robust machine-learning models may depend on datasets used during a training phase, which may be inherently related to data analysis and statistics. Accordingly, as used herein, the term "inference model" should be broadly construed to encompass inference models, machine-learning models, statistical models, and combinations thereof built to produce inferences, predictions, and/or otherwise used in the embodiments described herein.

In some embodiments of the present technology, the inference model(s) 23114 may include a neural network and, for example, may be a recurrent neural network. In some embodiments, the recurrent neural network may be a long short-term memory (LSTM) neural network. It should be appreciated, however, that the recurrent neural network is not limited to be an LSTM neural network and may have any other suitable architecture. For example, in some embodiments, the recurrent neural network may be any one or any combination of: a fully recurrent neural network, a gated recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some embodiments of the present technology, the inference model(s) 23114 may produce one or more discrete output(s). Discrete outputs (e.g., classification labels) may be used, for example, when a desired output is to know whether a particular pattern of activation (including individual biologically produced neural spiking events) is currently being performed by a user, as detected via neuromuscular signals obtained from the user. For example, the inference model(s) 23114 may be trained to estimate whether the user is activating a particular motor unit, activating a particular motor unit at a particular timing, activating a particular motor unit with a particular firing pattern, and/or activating a particular combination of motor units. On a shorter timescale, a discrete classification may be output and used in some embodiments to estimate whether a particular motor unit fired an action potential within a given amount of time. In such a scenario, estimates from the inference model(s) 23114 may then be accumulated to obtain an estimated firing rate for that motor unit.

In embodiments of the present technology in which an inference model is implemented as a neural network configured to output a discrete output (e.g., a discrete signal), the neural network may include a softmax layer, such that the outputs of the inference model add up to one and may be interpreted as probabilities. For instance, outputs of the softmax layer may be a set of values corresponding to a respective set of control signals, with each value indicating a probability that the user wants to perform a particular control action. As one non-limiting example, the outputs of the softmax layer may be a set of three probabilities (e.g., 0.92, 0.05, and 0.03) indicating the respective probabilities that a detected pattern of activity is one of three known patterns.

It should be appreciated that when an inference model is a neural network configured to output a discrete output (e.g., a discrete signal), the neural network is not required to produce outputs that add up to one. For example, instead of a softmax layer, the output layer of the neural network may be a sigmoid layer, which does not restrict the outputs to probabilities that add up to one. In such embodiments of the present technology, the neural network may be trained with a sigmoid cross-entropy cost. Such an implementation may be advantageous in cases where multiple different control actions may occur within a threshold amount of time and it is not important to distinguish an order in which these control actions occur (e.g., a user may activate two patterns of neural activity within the threshold amount of time). In some embodiments, any other suitable non-probabilistic multi-class classifier may be used, as aspects of the technology described herein are not limited in this respect.

In some embodiments of the technology described herein, an output of the inference model(s) 23114 may be a continuous signal rather than a discrete output (e.g., a discrete signal). For example, the model(s) 23114 may output an estimate of a firing rate of each motor unit, or the model(s) 23114 may output a time-series electrical signal corresponding to each motor unit or sub-muscular structure. Further, the model may output an estimate of a mean firing rate of all of the motor units within a designated functional group (e.g., within a muscle or a group of muscles).

It should be appreciated that aspects of the technology described herein are not limited to using neural networks, as other types of inference models may be employed in some embodiments. For example, in some embodiments, the inference model(s) 23114 may comprise a Hidden Markov Model (HMM), a switching HMM in which switching allows for toggling among different dynamic systems, dynamic Bayesian networks, and/or any other suitable graphical model having a temporal component. Any of such inference models may be trained using sensor signals obtained by the sensor(s) 23110.

As another example, in some embodiments of the present technology, the inference model(s) 23114 may be or may include a classifier that takes, as input, features derived from the sensor signals obtained by the sensor(s) 23110. In such embodiments, the classifier may be trained using features extracted from the sensor signals. The classifier may be, e.g., a support vector machine, a Gaussian mixture model, a regression-based classifier, a decision-tree classifier, a Bayesian classifier, and/or any other suitable classifier, as aspects of the technology described herein are not limited in this respect. Input features to be provided to the classifier may be derived from the sensor signals in any suitable way. For example, the sensor signals may be analyzed as time-series data using wavelet analysis techniques (e.g., continuous wavelet transform, discrete-time wavelet transform, etc.), covariance techniques, Fourier-analytic techniques (e.g., short-time Fourier transform, Fourier transform, etc.), and/or any other suitable type of time-frequency analysis technique. As one non-limiting example, the sensor signals may be transformed using a wavelet transform and the resulting wavelet coefficients may be provided as inputs to the classifier.

In some embodiments, values for parameters of the inference model(s) 23114 may be estimated from training data. For example, when the inference model(s) is or includes a neural network, parameters of the neural network (e.g., weights) may be estimated from the training data. In some embodiments, parameters of the inference model(s) 23114 may be estimated using gradient descent, stochastic gradient descent, and/or any other suitable iterative optimization technique. In embodiments where the inference model(s) 23114 is or includes a recurrent neural network (e.g., an LSTM), the inference model(s) 23114 may be trained using stochastic gradient descent and backpropagation through time. The training may employ any one or any combination of: a squared-error loss function, a correlation loss function, a cross-entropy loss function and/or any other suitable loss function, as aspects of the technology described herein are not limited in this respect.

The system 23100 also may include one or more controller(s) 23116. For example, the controller(s) 23116 may include a display controller configured to display a visual representation (e.g., a representation of a hand) on a display device (e.g., a display monitor). As discussed herein, the processor(s) 23112 may implement one or more trained inference model(s) that receive, as input, sensor signals obtained by the sensor(s) 23110 and that provide, as output, information (e.g., predicted handstate information) used to generate control signals that may be used to control, for example, an AR or VR system.

The system 23100 also may include a user interface 23118. Feedback determined based on the signals obtained by the sensor(s) 23110 and processed by the processor(s) 23112 may be provided to the user via the user interface 23119 to facilitate the user's understanding of how the system 23100 is interpreting the user's muscular activity (e.g., an intended muscle movement). The user interface 23118 may be implemented in any suitable way, including, but not limited to, an audio interface, a video interface, a tactile interface, and electrical stimulation interface, or any combination of the foregoing. The user interface 23118 may be configured to produce a visual representation 23108 (e.g., of a hand, an arm, and/or other body part(s) or a user), which may be displayed via a display device associated with the system 23100.

As discussed herein, the computer processor(s) 23112 may implement one or more trained inference model(s) configured to predict handstate information based, at least in part, on sensor signals obtained by the sensor(s) 23110. The predicted handstate information may be used to update a musculoskeletal representation or model 23106, which may be used to render the visual representation 23108 (e.g., a graphical representation) based on the updated musculoskeletal representation or model 23106. Real-time reconstruction of a current handstate and subsequent rendering of the visual representation 23108 reflecting current handstate information in the musculoskeletal representation or model 23106 may be used to provide visual feedback to the user about the effectiveness of the trained inference model(s), to enable the user to, e.g., make adjustments in order to represent an intended handstate accurately. As will be appreciated, not all embodiments of the system 23100 include components configured to render the visual representation 23108. For example, in some embodiments, handstate estimates output from the trained inference model and a corresponding updated musculoskeletal representation 23106 may be used to determine a state of the user's hand (e.g., in a VR environment) even though no visual representation based on the updated musculoskeletal representation 23106 is rendered.

The system 23100 may have an architecture that may take any suitable form. Some embodiments of the present technology may employ a thin architecture in which the processor(s) 23112 is or are included as a portion of a device separate from and in communication with the sensor(s) 23110 arranged on one or more wearable device(s). The sensor(s) 23110 may be configured to wirelessly stream, in substantially real-time, sensor signals and/or information derived from the sensor signals to the processor(s) 23112 for processing. The device separate from and in communication with the sensors(s) 23110 may be, for example, any one or any combination of: a remote server, a desktop computer, a laptop computer, a smartphone, a wearable electronic device such as a smartwatch, a health monitoring device, smart glasses, and an AR system.

Some embodiments of the present technology may employ a thick architecture in which the processor(s) 23112 may be integrated with one or more wearable device(s) on which the sensor(s) 23110 is or are arranged. In some embodiments, processing of sensed signals obtained by the sensor(s) 23110 may be divided between multiple processors, at least one of which may be integrated with the sensor(s) 23110, and at least one of which may be included as a portion of a device separate from and in communication with the sensor(s) 23110. In such an implementation, the sensor(s) 23110 may be configured to transmit at least some of the sensed signals to a first computer processor remotely located from the sensor(s) 23110. The first computer processor may be programmed to train, based on the transmitted signals obtained by the sensor(s) 23110, at least one inference model of the inference model(s) 23114. The first computer processor may then be programmed to transmit the trained at least one inference model to a second computer processor integrated with the one or more wearable devices on which the sensor(s) 23110 is or are arranged. The second computer processor may be programmed to determine information relating to an interaction between the user who is wearing the one or more wearable device(s) and a physical object in an AR environment using the trained at least one inference model transmitted from the first computer processor. In this way, the training process and a real-time process that utilizes the trained at least one model may be performed separately by using different processors.

In some embodiments of the present technology, a computer application configured to simulate an XR environment (e.g., a VR environment, an AR environment, and/or an MR environment) may be instructed to display a visual representation of the user's hand (e.g., via the controller(s) 23116). Positioning, movement, and/or forces applied by portions of the hand within the XR environment may be displayed based on an output of the trained inference model(s). The visual representation may be dynamically updated based on current reconstructed handstate information using continuous signals obtained by the sensor(s) 23110 and processed by the trained inference model(s) 23114 to provide an updated computer-generated representation of the user's movement and/or handstate that is updated in real-time.

Information obtained by or provided to the system 23100 (e.g., inputs from an AR camera, inputs from the sensor(s) 23110 (e.g., neuromuscular sensor inputs), inputs from one or more auxiliary sensor(s) (e.g., IMU inputs), and/or any other suitable inputs) can be used to improve user experience, accuracy, feedback, inference models, calibration functions, and other aspects in the overall system. To this end, in an AR environment for example, the system 23100 may include or may operate in conjunction with an AR system that includes one or more processors, a camera, and a display (e.g., the user interface 23118, or another interface via AR glasses or another viewing device) that provides AR information within a view of the user. For example, the system 23100 may include system elements that couple the AR system with a computer-based system that generates the musculoskeletal representation based on sensor data (e.g., signals from at least one neuromuscular sensor). In this example, the systems may be coupled via a special-purpose or other type of computer system that receives inputs from the AR system and the system that generates the computer-based musculoskeletal representation. Such a computer-based system may include a gaming system, robotic control system, personal computer, medical device, or another system that is capable of interpreting AR and musculoskeletal information. The AR system and the system that generates the computer-based musculoskeletal representation may also be programmed to communicate directly. Such information may be communicated using any number of interfaces, protocols, and/or media.

As discussed herein, some embodiments of the present technology are directed to using an inference model 23114 for predicting musculoskeletal information based on signals obtained by wearable sensors. Also as discussed briefly above, the types of joints between segments in a multi-segment articulated rigid body model constrain movement of the rigid body. The inference model 23114 may be used to predict the musculoskeletal position information without having to place a sensor on each segment of the rigid body that is to be represented in the computer-generated musculoskeletal representation. Additionally, different individuals tend to move in characteristic ways when performing a task that can be captured in statistical or data patterns of individual user behavior. At least some of these constraints on human body movement may be explicitly incorporated in one or more inference model(s) (e.g., the model(s) 23114) used for prediction of user movement, in accordance with some embodiments. Additionally or alternatively, the constraints may be learned by the inference model(s) 23114 though training based on sensor data obtained from the sensor(s) 23110. Constraints imposed on a construction of an inference model may be those set by human anatomy and by physics of a human body, while constraints derived from statistical or data patterns may be those set by human behavior for one or more users from which sensor data has been obtained. Constraints may comprise part of the inference model itself being represented by information (e.g., connection weights between nodes) in the inference model.

As mentioned above, some embodiments of the present technology are directed to using an inference model for predicting information to generate a computer-based musculoskeletal representation and/or to update in real-time a computer-based musculoskeletal representation. For example, the predicted information may be predicted handstate information. The inference model may be used to predict the handstate information based on IMU signals, neuromuscular signals (e.g., EMG, MMG, and/or SMG signals), external or auxiliary device signals (e.g., camera or laser-scanning signals), or a combination of IMU signals, neuromuscular signals, and external device signals detected as a user performs one or more movements. For instance, as discussed herein, a camera associated with an AR system may be used to capture data of an actual position of a human subject of the computer-based musculoskeletal representation, and such actual-position information may be used to improve the accuracy of the representation. Further, outputs of the inference model may be used to generate a visual representation of the computer-based musculoskeletal representation in an XR environment. For example, a visual representation of muscle groups firing, force being applied, text being entered via movement, or other information produced by the computer-based musculoskeletal representation may be rendered in a visual display of an XR system. In some embodiments, other input/output devices (e.g., auditory inputs/outputs, haptic devices, etc.) may be used to further improve the accuracy of the overall system and/or to improve user experience. As mentioned above, XR may encompass any one or any combination of AR, VR, MR, and other machine-produced-reality technologies.

Figure 23B:
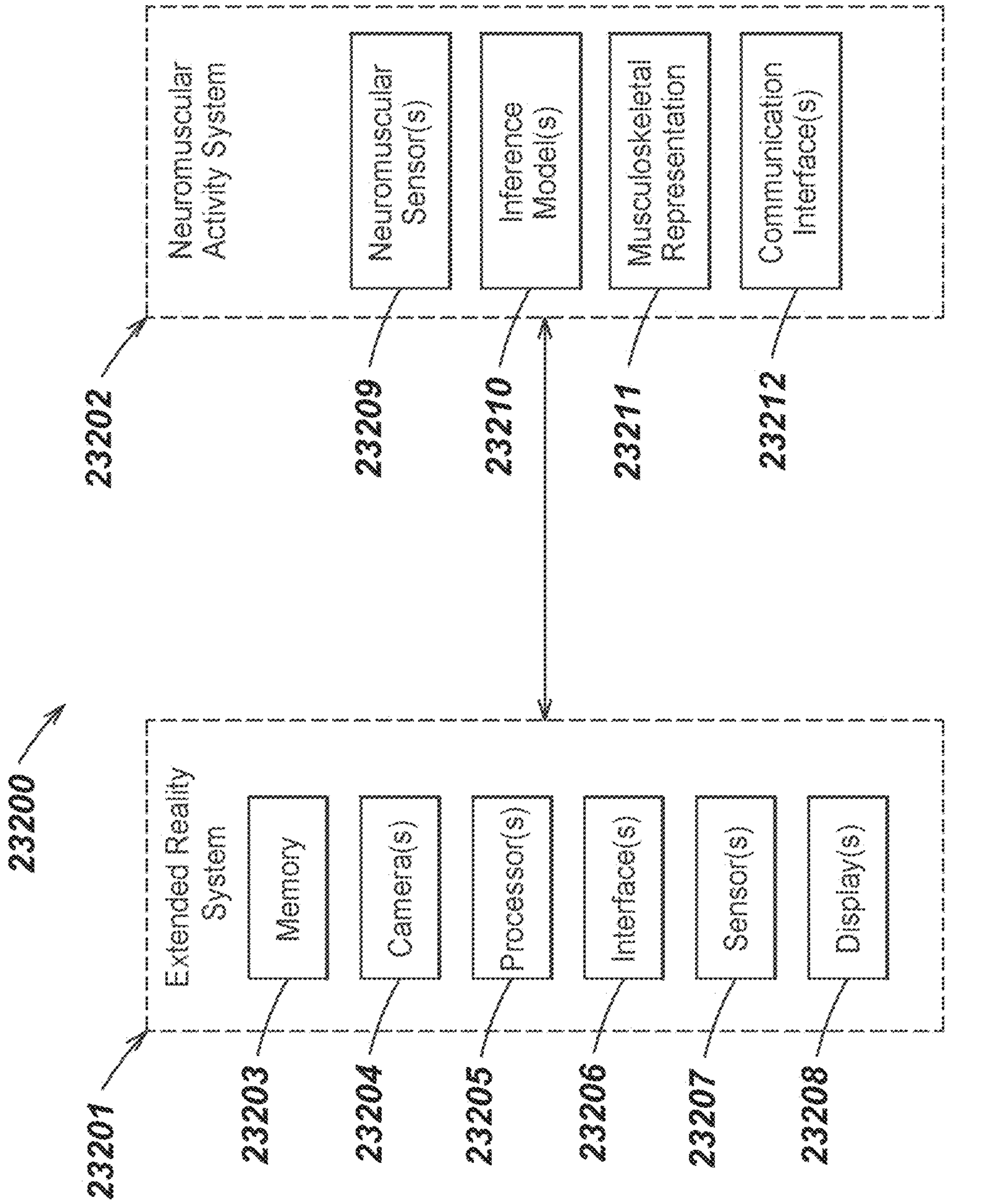
FIG. 23B is a schematic diagram of a distributed computer-based system that integrates an AR system with a neuromuscular activity system, in accordance with some embodiments of the technology described herein.

FIG. 23B illustrates a schematic diagram of an XR-based system 23200 according to some embodiments of the present technology. The XR-based system may be a distributed computer-based system that integrates an XR system 23201 with a neuromuscular activity system 23202. The neuromuscular activity system 23202 may be similar to the system 23100 described above with respect to FIG. 23A. As will be appreciated, instead of the XR system 23201, the XR-based system 23200 may comprise an AR system, a VR system, or a MR system.

Generally, the XR system 23201 may take the form of a pair of goggles or glasses or eyewear, or other type of device that shows display elements to a user that may be superimposed on "reality." This reality in some cases could be the user's view of the environment of his or her own body part(s) (e.g., arms and hands, legs and feet, etc., as viewed through the user's eyes), or those of another person or an avatar, or a captured view (e.g., by camera(s)) of the user's environment. In some embodiments, the XR system 23201 may include one or more camera(s) 23204, which may be mounted within a device worn by the user, that captures one or more views experienced by the user in the user's environment, including the user's own body part(s). The XR system 23201 may have one or more processor(s) 23205 operating within the device worn by the user and/or within a peripheral device or computer system, and such processor(s) 23205 may be capable of transmitting and receiving video information and other types of data (e.g. sensor data). As discussed herein, captured video(s) of the user's body part(s) (e.g., hands and fingers) may be used as additional inputs to inference models, so that the inference models can more accurately predict the user's handstates, movements, and/or gestures. For example, information obtained from the captured video(s) can be used to train the inference models to recognize neuromuscular activation patterns or other motor-control signals, including by mapping or otherwise associating recorded images in the video(s) with the neuromuscular patterns detected during any one or more movement(s), gestures(,) and/or pose(s) as recorded.

The XR system 23201 may also include one or more sensor(s) 23207, such as microphones, GPS elements, accelerometers, infrared detectors haptic feedback elements, or any other type of sensor, or any combination thereof, that would be useful to provide any form of feedback to the user based on the user's movements and/or motor activities. In some embodiments, the XR system 23201 may be an audio-based or auditory XR system, and the one or more sensor(s) 23207 may also include one or more headphones or speakers. Further, the XR system 23201 may also have one or more display(s) 23208 that permit the XR system 23201 to overlay and/or display information to the user in addition to the users' reality view. The XR system 23201 may also include one or more communication interface(s) 23206, which enable information to be communicated to one or more computer systems (e.g., a gaming system or other systems capable of rendering or receiving XR data). XR systems can take many forms and are provided by a number of different manufacturers. For example, various embodiments may be implemented in association with one or more types of XR systems or platforms, such as HoloLens™ holographic reality glasses available from the Microsoft Corporation (Redmond, Wash., USA); Lightwear™ AR headsets from Magic Leap™ (Plantation, Fla., USA); Google Glass™ AR glasses available from Alphabet (Mountain View, Calif., USA); R-7 Smartglasses System available from Osterhout Design Group (also known as ODG; San Francisco, Calif., USA); Oculus™ headsets (e.g., Quest, Rift, and Go) and/or Spark AR Studio gear available from Facebook (Menlo Park, Calif., USA); or any other type of XR device. Although discussed by way of example, it should be appreciated that one or more embodiments may be implemented within one type or a combination different types of XR systems (e.g., AR, MR, and/or VR systems).

The XR system 23201 may be operatively coupled to the neuromuscular activity system 23202 through one or more communication schemes or methodologies, including but not limited to: the Bluetooth protocol, Wi-Fi, Ethernet-like protocols, or any number of connection types, wireless and/or wired. It should be appreciated that, for example, the systems 23201 and 23202 may be directly connected or coupled through one or more intermediate computer systems or network elements. The double-headed arrow in FIG. 23B represents the communicative coupling between the systems 23201 and 23202.

As mentioned above, the neuromuscular activity system 23202 may be similar in structure and function to the system 23100 described above with reference to FIG. 23A. In particular, the system 23202 may include one or more neuromuscular sensor(s) 23209, one or more inference model(s) 23210, and may create, maintain, and store a musculoskeletal representation 23211. In some embodiments of the present technology, similar to one discussed herein, the system 23202 may include or may be implemented as a wearable device, such as a band that can be worn by a user, in order to collect (i.e., obtain) and analyze neuromuscular signals from the user. Further, the system 23202 may include one or more communication interface(s) 23212 that permit the system 23202 to communicate with the XR system 23201, such as by Bluetooth, Wi-Fi, and/or another communication method. Notably, the XR system 23201 and the neuromuscular activity system 23202 may communicate information that can be used to enhance user experience and/or allow the XR system 23201 to function more accurately and effectively. In some embodiments, the systems 23201 and 23202 may cooperate to determine a user's neuromuscular activity and to provide real-time feedback to the user regarding the user's neuromuscular activity.

Although FIG. 23B describes a distributed computer-based system 23200 that integrates the XR system 23201 with the neuromuscular activity system 23202, it will be understood integration of these systems 23201 and 23202 may be non-distributed in nature. In some embodiments of the present technology, the neuromuscular activity system 23202 may be integrated into the XR system 23201 such that the various components of the neuromuscular activity system 23202 may be considered as part of the XR system 23201. For example, inputs of neuromuscular signals obtained by the neuromuscular sensor(s) 23209 may be treated as another of the inputs (e.g., from the camera(s) 23204, from the sensor(s) 23207) to the XR system 23201. In addition, processing of the inputs (e.g., sensor signals) obtained from the neuromuscular sensor(s) 23209 as well as from one or more inference model(s) 23210 can be performed by the XR system 23201.

Figure 23C:
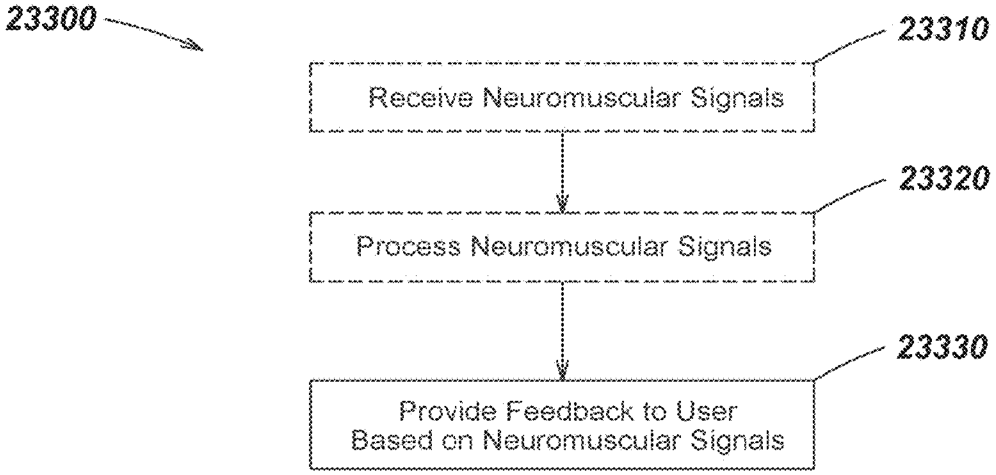
FIG. 23C shows a flowchart of a process for using neuromuscular signals to provide feedback to a user, in accordance with some embodiments of the technology described herein.

FIG. 23C shows a flowchart of a process 23300 for using neuromuscular signals to provide feedback to a user, in accordance with some embodiments of the present technology. As discussed herein, there are challenges involved with observation, detection, measurement, processing, and/or communication of neuromuscular activity. The systems and methods disclosed herein are capable of obtaining (e.g., detecting, measuring, and/or recording) and processing neuromuscular signals to determine muscular or sub-muscular activations (e.g., signal characteristics and/or patterns) and/or other suitable data from motor-unit and muscular activities, and providing feedback regarding such activations to the user. In some embodiments, a computer system may be provided along with one or more sensor(s) for obtaining (e.g., detecting, measuring, and/or recording) neuromuscular signals. As discussed herein, the sensor(s) may be provided on a band that can be placed on an appendage of the user, such as an arm or wrist of the user. In some embodiments, the process 23300 may be performed at least in part by the neuromuscular activity system 23202 and/or the XR system 23201 of the XR-based system 23200.

At block 23310, the system obtains neuromuscular signals. The neuromuscular signals may comprise one or more muscular activation state(s) of the user, and these states may be identified based on raw signals obtained by one or more sensor(s) of the neuromuscular activity system 23202 and/or processed signals (collectively "sensor signals") and/or information based on or derived from the sensor signals (e.g., handstate information). In some embodiments, one or more computer processor(s) (e.g., the processor(s) 23112 of the system 23100, or the processor(s) 23205 of the XR-based system 23201) may be programmed to identify the muscular activation state(s) based on any one or any combination of: the sensor signals, the handstate information, static gesture information (e.g., pose information, orientation information), dynamic gesture information (movement information), information on motor-unit activity (e.g., information on sub-muscular activation), etc.

In some embodiments, the sensor(s) 23209 of the neuromuscular activity system 23202 may include a plurality of neuromuscular sensors 23209 arranged on a wearable device worn by a user. For example, the sensors 23209 may be EMG sensors arranged on an adjustable band configured to be worn around a wrist or a forearm of the user to sense and record neuromuscular signals from the user as the user performs muscular activations (e.g., movements, gestures). In some embodiments, the EMG sensors may be the sensors 18504 arranged on the band 18502, as shown in FIG. 18B; in some embodiments, the EMG sensors may be the sensors 20610 arranged on the elastic band 20620, as shown in FIG. 20F. The muscular and/or sub-muscular activations performed by the user may include static gestures, such as placing the user's hand palm down on a table; dynamic gestures, such as waving a finger back and forth; and covert gestures that are imperceptible to another person, such as slightly tensing a joint by co-contracting opposing muscles, or using sub-muscular activations. The muscular activations performed by the user may include symbolic gestures (e.g., gestures mapped to other gestures, interactions, or commands, for example, based on a gesture vocabulary that specifies the mapping).

In addition to the plurality of neuromuscular sensors 23209, in some embodiments of the technology described herein, the neuromuscular activity system 23202 may include one or more auxiliary sensor(s) configured to obtain (e.g., sense and/or record) auxiliary signals that may also be provided as input to the one or more trained inference model(s), as discussed herein. Examples of auxiliary sensors include IMUs, imaging devices, radiation detection devices (e.g., laser scanning devices), heart rate monitors, or any other type of biosensors able to sense biophysical information from a user during performance of one or more muscular activations. Further, it should be appreciated that some embodiments of the present technology may be implemented using camera-based systems that perform skeletal tracking, such as, for example, the Kinect™ system available from the Microsoft Corporation (Redmond, Wash., USA) and the LeapMotion™ system available from Leap Motion, Inc. (San Francisco, Calif., USA). It should be appreciated that any combination of hardware and/or software may be used to implement various embodiments described herein.

The process 23300 then proceeds to block 23320, the neuromuscular signals are processed. At block 23330, feedback is provided to the user based on the processed neuromuscular signals. It should be appreciated that, in some embodiments of the present technology, the neuromuscular signals may be recorded; however, even in such embodiments, the processing and the providing of feedback may occur continuously, such that the feeding may be presented to the user in near real-time. Feedback that is provided in real-time or near real-time may be used advantageously in situations where the user is being trained, e.g., real-time visualizations provided to the user and/or a coach or trainer to train the user to perform particular movements or gestures properly. In some other embodiments, the neuromuscular signals may be recorded and analyzed at later times, and then presented to the user (e.g., during a review of a performance of a previous task or activity). In these other embodiments, the feedback (e.g., visualizations) may be provided much later, e.g. when analyzing a log of neuromuscular activity for the purposes of diagnoses and/or for tracking ergonomic/fitness/skill/compliance/relaxation. In skill-training scenarios (e.g. athletics, performing arts, industry), information regarding neuromuscular activity can be provided as feedback for training the user to perform one or more particular skill(s). In some cases, a target or desired pattern of neuromuscular activation may also be presented together with the feedback, and/or deviations of the user's actual or realized pattern from the target pattern may be presented or emphasized, such as by providing the user an auditory tone, a haptic buzz, a visual indication, template comparison feedback, or another indication. The target pattern for a task (e.g., a movement, etc.) may be produced from one or more previous pattern(s) of activation of the user or another person, such as during one or more instance(s) when the user or another individual performed particularly the task well (e.g., sat at a desk with his or her arms and hands in an ergonomic position to minimize wrist stain; threw a football or shot a basketball using proper technique; etc.). Further, it should be appreciated that comparison feedback to a target model or deviation information may be provided to the user in real-time, or later (e.g., in an offline review), or both. In certain embodiments, the deviation information can be used to predict an outcome of a task or activity, such as whether the user "sliced" a trajectory of a golf ball with a bad swing, hit a tennis ball with too much force and/or at too steep of an angle to cause the ball to land out-of-bounds, etc.

In some embodiments of the present technology, feedback is provided in the form of a visual display to convey musculoskeletal and/or neuromuscular activation information to a user. For instance, within an XR display, indications may be displayed to the user that identify a visualization of the activations or some other representation indicating that the neuromuscular activity performed by the user is acceptable (or not). In one example, in an XR implementation, visualization of muscular activation and/or motor-unit activation may be projected over the user's body. In this implementation, visualization of activated muscles within, e.g., an arm of the user may be displayed over the arm of the user within an XR display so the user can visualize various ranges of motions for his or her arm via an XR headset. For instance, as depicted in FIG. 23P, a user 231602 may observe a visualization of muscular activations and/or motor-unit activations in the user's arm 231604 during throwing of a ball, by looking at the arm 231604 through an XR headset 231606 during the throwing. The activation are determined from the user's neuromuscular signals sensed by sensors of a wearable system 231608 (e.g., the wearable system 20600) during the throwing.

In another example, in an AR implementation, another person (e.g., a coach, a trainer, a physical therapist, an occupational therapist, etc.) may wear an AR headset to observe the user's activity while the user wears, e.g., an arm band on which neuromuscular sensors are attached (e.g., to observe while the user pitches a baseball, writes or draws on a canvas, etc.). For instance, as depicted in FIG. 23Q, a coach 231702 may observe a visualization of muscular activations and/or motor-unit activations in one or both arm(s) 231704 of a golfer 231706 during swinging of a golf club by the golfer. The activations are determined from the golfer's neuromuscular signals sensed by sensors of a wearable system 231708 (e.g., the wearable system 20600) worn by the golfer 231706. The visualizations may be seen by the coach 231702 via an AR headset 231710.

In some embodiments of the present technology, the feedback may be visual and may take many one or more form(s), and may be combined with other types of feedback, such as non-visual feedback. For instance, auditory, haptic, electrical, or other feedback may be provided to the user in addition to visual feedback.

Figure 23D:
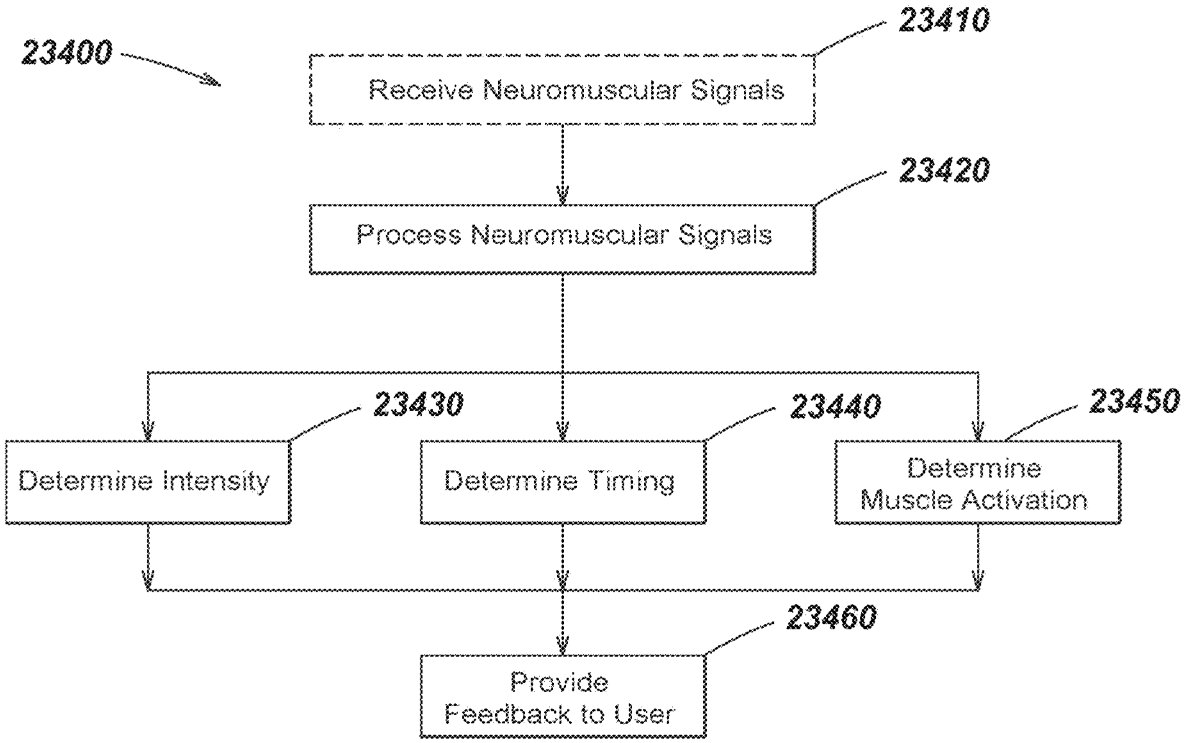
FIG. 23D shows a flowchart of a process for using neuromuscular signals to determine intensity, timing, and/or muscle activation, in accordance with some embodiments of the technology described herein.

FIG. 23D shows a flowchart of a process 23400 in which neuromuscular signals are used to determine intensity, timing, and/or occurrence of one or more muscle activation(s), in accordance with some embodiments of the technology described herein. Systems and methods according to these embodiments may help overcome the difficulty in observing, describing, and/or communicating about neuromuscular activity, such as a timing and/or an intensity of motor-unit and/or muscle activations. Skilled motor acts may require precise coordinated activations of motor units and/or muscles, and learning to perform skilled acts may be hindered by difficulties with observing and communicating about such activations. Further, difficulty communicating about such activations can be a hindrance to coaches and medical providers. As will be appreciated, feedback regarding a person's performance of skilled motor acts is needed in neuromuscular control technology, where the person may use neuromuscular signals to control one or more devices.

In some embodiments of the present technology, the process 23400 may be performed at least in part by a computer-based system such as the neuromuscular activity system 23202 and/or the XR system 23201 of the XR-based system 23200. More specifically, neuromuscular signals may be obtained from a user wearing one or more neuromuscular sensor(s), and, at block 23410, the neuromuscular signals may be received by the system. For example, the sensor(s) may be arranged on or within a band (e.g., the bands of the wearable systems 18200 and 20600) and positioned over an area of the user's body, such as an arm or a wrist. At block 23420, the received neuromuscular signals are processed to determine one or more aspects of these signals. For example, at block 23430, the system may determine an intensity of an activation (e.g., a contraction) of a particular motor unit or an intensity of one or more group(s) of motor units of the user. In this example, the system may determine a firing rate of the motor unit(s) and/or associated force(s) generated by the motor unit(s). The system may provide information about the determined intensity as feedback to the user, at act 23460, and this feedback may be provided alone or in combination with other information derived from the neuromuscular signals. At block 23440, the system may determine a timing of activities of a particular motor unit. In certain embodiments, maximal muscular activation or contraction states of a particular user can be previously recorded and used as a comparator to current muscular activation or contraction states of the user as detected and recorded during the user's performance of a movement or exercise. For example, if the user's maximal velocity for throwing a baseball is 100 mph, i.e., a fastball, the muscular activation or contraction states of the user's arm and shoulder muscles, as detected during such throwing of a fastball, can be used to visually compare the previously recorded muscular-activation or contraction states with the currently recorded states during the user's successive performances of throwing a fastball. In another example, a user with motor neuropathy can be monitored in real-time during treatment by a medical provider by comparing previously recorded forearm muscular activation states with current muscular activation states detected as the user, e.g., draws on a canvas, and such real-time comparison feedback of current versus previous muscular activation states can be presented to the user and/or the medical provider. At block 23440, the system may also determine a timing of one or more particular motor-unit activation(s). For example, how the motor unit(s) function over a period of time may be determined from the neuromuscular signals, and feedback regarding such a timing determination may be provided to the user (e.g., at block 23460). For instance, a sequence and timing of activities of particular motor unit(s) may be presented to the user, alone or in conjunction with model or target information previously collected from the user or from a different person. Also, specific information relating to, e.g., one or more particular muscle activation(s) may be determined at block 23450 and presented to the user as feedback at block 23460. As will be appreciated, the blocks 23430, 23440, and 23450 may be performed concurrently or sequentially or, in some embodiments, only one or two of these acts may be performed while the other one or two of these acts may be omitted.

Figure 23E:
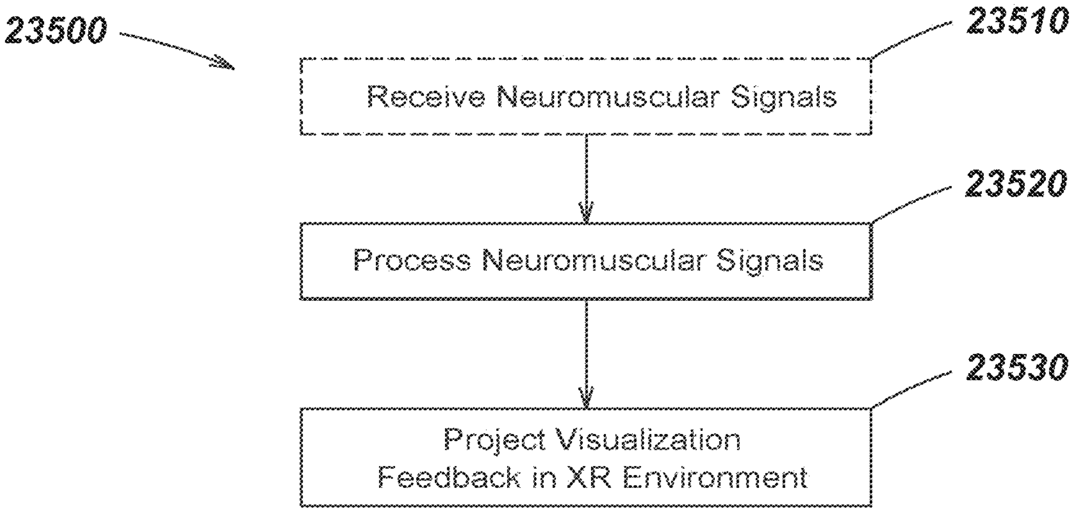
FIG. 23E shows a flowchart of a process for using neuromuscular signals to provide a projected visualization feedback in an AR environment, in accordance with some embodiments of the technology described herein.

FIG. 23E shows a flowchart of a process 23500 in which neuromuscular signals are processed to produce a visualization, which may be projected in an XR environment, in accordance with some embodiments of the technology presented herein. In particular, in the XR environment, the visualization may be projected over a body part of the user, such as an arm of the user, to provide the user with feedback information that may involve the body part. For instance, in one implementation, the projection may include a visual indication that shows muscle-group activations and/or degrees of joint angles within the projected feedback information. In one such scenario, a muscular representation (e.g., an animated view of muscle activations) may be projected over a view of the user's arm, and indications of particular activations and/or joint angles as measured by the received and processed neuromuscular signals may be shown by the muscular representation. The user then may adjust his/her movement to achieve a different result. In an exercise scenario, the user may use the XR visualization as feedback to slightly vary his/her intensity or movement to achieve a desired muscle activation (e.g., to activate a certain muscle group to be exercised) at a certain intensity level) and may do so at a given joint angle as provided in the feedback. In this way, the user can monitor and control the intensity of his or her muscular activation(s) or track ranges of motion of one or more joints. It can be appreciated that such feedback would be advantageous in other scenarios, including but not limited to: physical rehabilitation scenarios where the user works to strengthen muscles and/or surrounding ligaments, tendons, tissues, etc., or to increase a joint's range of motion; athletic performance scenarios, such as throwing a baseball, shooting a basketball, swinging a golf club or tennis racquet, etc.; and coaching or instructional scenarios where another person alone, or in combination with the user, views the user's muscular activation and/or joint-angle feedback and provides corrective instruction to the user.

Figure 23F:
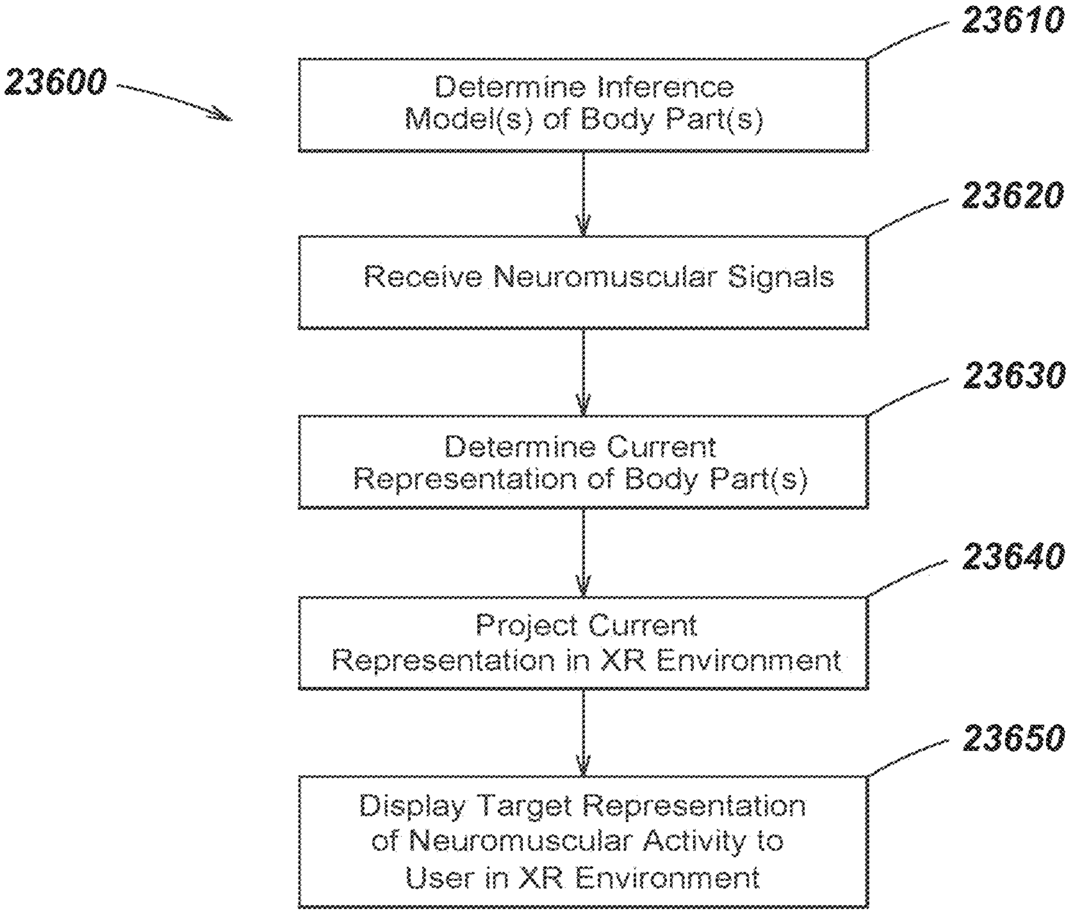
FIG. 23F shows a flowchart of a process for using neuromuscular signals to provide current and target musculoskeletal representations in an AR environment, in accordance with some embodiments of the technology described herein.

FIG. 23F shows a flowchart for a process 23600 in which neuromuscular signals are processed to produce a visualization, which may be displayed in an XR environment, in accordance with some embodiments of the present technology. In particular, the process 23600 may be executed to enable the user to view a visualization of a target or desired neuromuscular activity within the XR environment as well as a visualization of a realized neuromuscular activity performed by the user. The process 23600 may be executed at least in part by a computer-based system such as the neuromuscular activity system 23202 and/or the XR system 23201 of the XR-based system 23200. In skill-training scenarios (e.g. athletics, performing arts, industry, etc.), information regarding a target neuromuscular activity can be provided as extra feedback for the user. In some cases, a target pattern of neuromuscular activation may be presented to the user in a display (e.g., within an XR display, or another type of display) and/or deviations of a realized pattern obtained from the user's neuromuscular signals from the target pattern may be presented or emphasized. Such deviations may be presented to the user in one or more form(s), such as an auditory tone, a haptic buzz, a visual indication (e.g., a visual representation of the realized pattern superimposed to a visual representation of the target pattern in which deviations are highlighted), and the like. It can be appreciated that in some instances deviations between the realized pattern and the targeted pattern can be generated and provided to the user in real-time or near real-time, while in other instances such deviations can be provided "offline" or after fact, such as upon the user's request at a later time.

One way to create the target pattern may be from one or more previously performed realized pattern(s) of activation during one or more instance(s) when the user or another individual performed a desired activation task particularly well. For example, in one scenario, an expert (e.g., an athlete) may perform the desired activation task well, and neuromuscular signals may be obtained from the expert during performance of that task. The neuromuscular signals may be processed to obtain visual target neuromuscular activations, which may be displayed as feedback to the user within, e.g., a display in an XR environment. In various embodiments of the present technology, the feedback can be shown to the user as a separate example display, as activations that are grafted or projected onto the user's appendage(s), and/or as activations that may be compared to the user's actual or realized activations.

In FIG. 23F, at block 23610, the system determines an inference model built according to the user's body or body part (e.g., hand, arm, wrist, leg, foot, etc.). The inference model may be or may include one or more neural network model(s), as discussed herein, trained to classify and/or assess neuromuscular signals captured from a user. The inference model may be trained to recognize one or more pattern(s) that characterize a target neuromuscular activity. At block 23620, the system receives neuromuscular signals from one or more sensor(s) worn by the user during performance of a task corresponding to the target neuromuscular activity, and at block 23630, the system determines a current representation of one or more part(s) of the user's body (e.g., appendage(s) and/or other body part(s)) based on the received neuromuscular signals and the inference model.

At block 23640, the system projects the current representation of the user's body part(s) within the XR environment. For example, the XR display may display a graphical representation of the user's body over an actual view of the body part(s) (e.g., of an arm) or an avatar can be presented that mimics the user's appearance in the XR environment. Further, neuromuscular status information may be displayed within this representation, such an indication of muscular activity within one or more muscle groups. At block 23650, the XR display may also display a target representation of neuromuscular activity. For instance, the target representation may be displayed on the same display as the current representation of the user's body part(s), and may be shown as an image that is projected onto a view of the user, e.g., an actual appendage of the user or onto the user's avatar or through some other representation of the user's appendage, which need not connect directly to the user. As discussed herein, such feedback may be provided to the user by itself or in combination with other types of feedback indicating the user's performance of the task, such as haptic feedback, audio feedback, and/or other types of feedback.

Figure 23G:
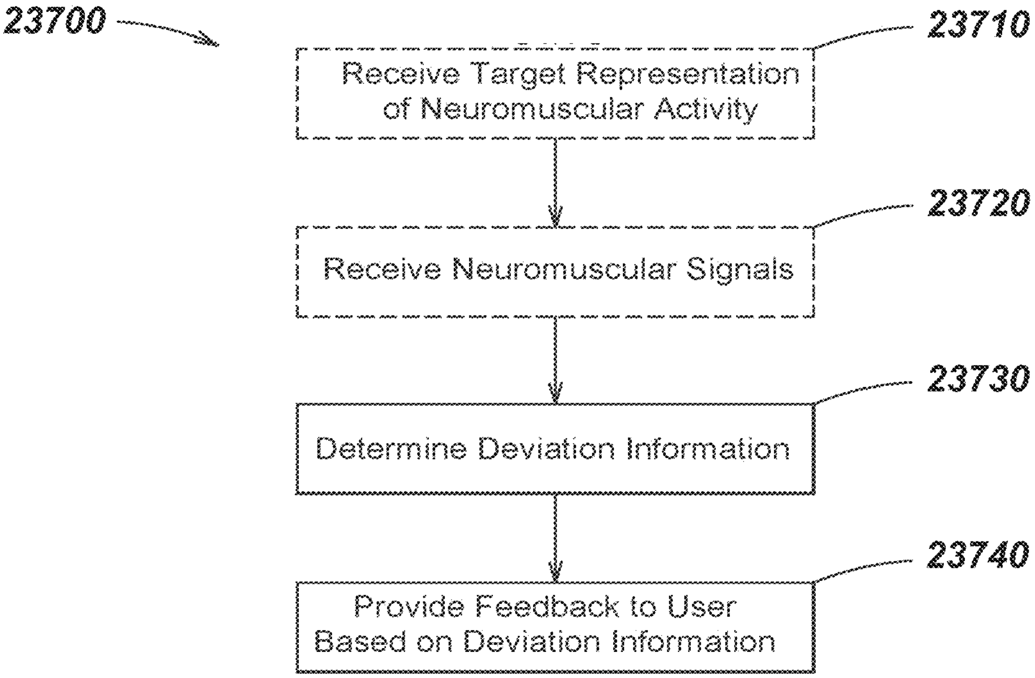
FIG. 23G shows a flowchart of a process for using neuromuscular signals to determine deviations from a target musculoskeletal representation, and to provide feedback to a user, in accordance with some embodiments of the technology described herein.

FIG. 23G shows a flowchart for another process 23700 in which neuromuscular signals, which are obtained from a user during performance of a task (e.g., a movement), are processed to determine deviations of the user's performance from a target performance, and providing feedback to the user in the form of deviation information, in accordance with some embodiments of the present technology. Such deviation information, resulting from the process 23700, may help the user achieve or perform, e.g., a desired movement that closely resembles the target performance. In one implementation, deviation information may be input into the system automatically and may be derived from previously processed inputs relating to a correct or best way of performing a given task, activity, or movement. In another implementation, in addition to or alternative to the automatically input deviation information, deviation information may be manually input by the user to help the user achieve movement(s) closer to a target for the given task, activity, or movement. For instance, deviations of a realized pattern, determined from the user's performance, from a target pattern, corresponding to a target performance, may be presented or emphasized to the user as feedback in the form of, e.g., an auditory tone that increases in loudness according to a deviation amount, a haptic buzz that increases in amplitude according to the deviation amount, or a visual indication showing the deviation amount) and/or the user can update deviation information manually by, e.g., make a drawing or an annotation within the XR environment.

The process 23700 may be executed at least in part by a computer-based system such as the neuromuscular activity system 23202 and/or the XR system 23201 of the XR-based system 23200. At block 23710, the system may receive a target representation of neuromuscular activity. For instance, the target representation may identify a target movement and/or one or more target muscle activation(s). The target representation of neuromuscular activity may be a recorded signal provided to the system and used as a reference signal. At block 23720, the system may receive neuromuscular signals obtained from a user wearing one or more neuromuscular sensor(s) while performing an act (e.g., a movement, a gesture, etc.) to be evaluated. For instance, the user may wear a band (e.g., the bands in FIGS. 18B and 20F) carrying sensors that sense the neuromuscular signals from the user and provides the sensed neuromuscular signals to the system in real time and provide feedback to the user (in real time, near-real time, or at a later period (e.g., in a review session)). At block 23730, the system may determine deviation information derived by comparing a target activity to a measured activity based on the received neuromuscular signals. The feedback provided to the user may include parameters that determine a quality measure of an entire act performed by the user (e.g., a complex movement comprising multiple muscle activations and/or physical movement) and/or specific elements of the act (e.g., a specific muscle activation). In some embodiments, joint angles, motor-unit timing(s), intensity(ies), and/or muscle activation(s) relating to the user's neuromuscular activations may be measured in relation to the target activity. In particular, comparisons may be performed between models (e.g., a target model and a user model to be evaluated). Further, in some embodiments, the target model may be adapted to specifics of the user model to provide more accurate comparisons (e.g., normalizing the target model to a specific user based on differences in sizes between the user and a model performer of the target model).

At block 23740, feedback can be provided to the user based on the deviation information. In particular, the deviation information may indicate to the user that an activity or task was performed correctly or incorrectly, or was performed to some measured quality within a range. Such feedback may be visual, such as by an indication within an XR display that a particular muscle group was not activated via a projection on the user's arm (e.g., a projection of a muscle group colored red on the user's arm) or that the particular muscle group was only partially activated (e.g., activated to 75% as opposed to an intended 90% of maximal contraction). Also, a display of timing(s), intensity(ies), and/or muscle activation(s) relating to the user's neuromuscular activations may be displayed to the user within the XR display (e.g., as projection onto the user's body or onto the user's avatar). As discussed herein, the visual feedback may be provided alone or in combination with other feedback, such as auditory (e.g., by a voice indication that the user's movement is unsatisfactory), haptic (such as a haptic buzz, resistive tension, etc.), and/or other feedback. Such deviation information may be helpful for the user to improve his or her performance of the activity or task and to more accurately track the target activity. This type of feedback could assist users developing their ability to use control systems involving neuromuscular signals. For example, visualization of neuromuscular activations could help a user learn to activate atypical combinations of muscles or motor units.

Figure 23H:
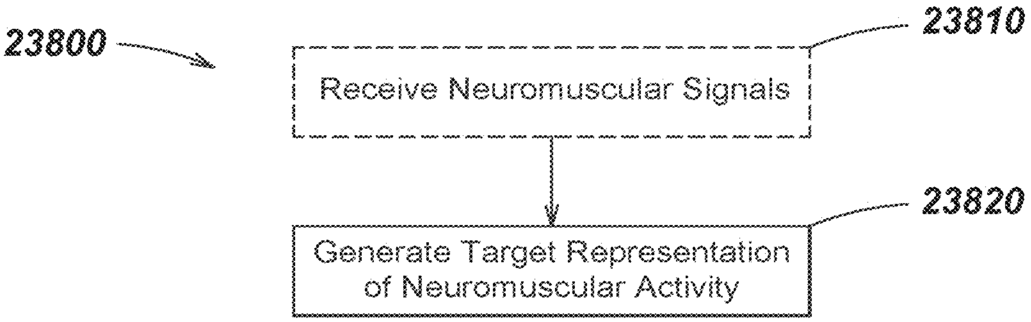
FIG. 23H shows a flowchart of a process for using neuromuscular signals to obtain target neuromuscular activity, in accordance with some embodiments of the technology described herein.

FIG. 23H shows a flowchart for a process 23800 for generating a target neuromuscular activity based on received neuromuscular signals, in accordance with some embodiments of the present technology. The process 23800 may be executed at least in part by a computer-based system such as the XR-based system 23200. As discussed herein, the system may use a target activity as a reference by which the user's activity may be assessed or measured. To elicit such a target activity, a neuromuscular system or other type of system (e.g., the neuromuscular activity system 23202) may receive neuromuscular signals (e.g., at block 23810) and may generate a model of a target neuromuscular activity based on these signals. Such neuromuscular signals may be used in addition to other types of signals and/or data such as, for example, camera data. Such neuromuscular signals may be sampled from an expert performer (e.g., an athlete, a trainer, or another suitably skilled person) and modeled for use as the target activity. For instance, a golf swing activity may be captured from one or more golfing professional(s), modeled, and stored as a target activity for use in a golf training exercise, game, or other system.

In some instances, neuromuscular signals sampled from the user's previous performances of an activity can be used to assess user's progress over time, based on computed deviations between user's previous performances and a current performance of the user (e.g., for training and/or rehabilitation over time). In this way, the system can track the user's performance progress in relation to a reference activity.

Figure 23I:
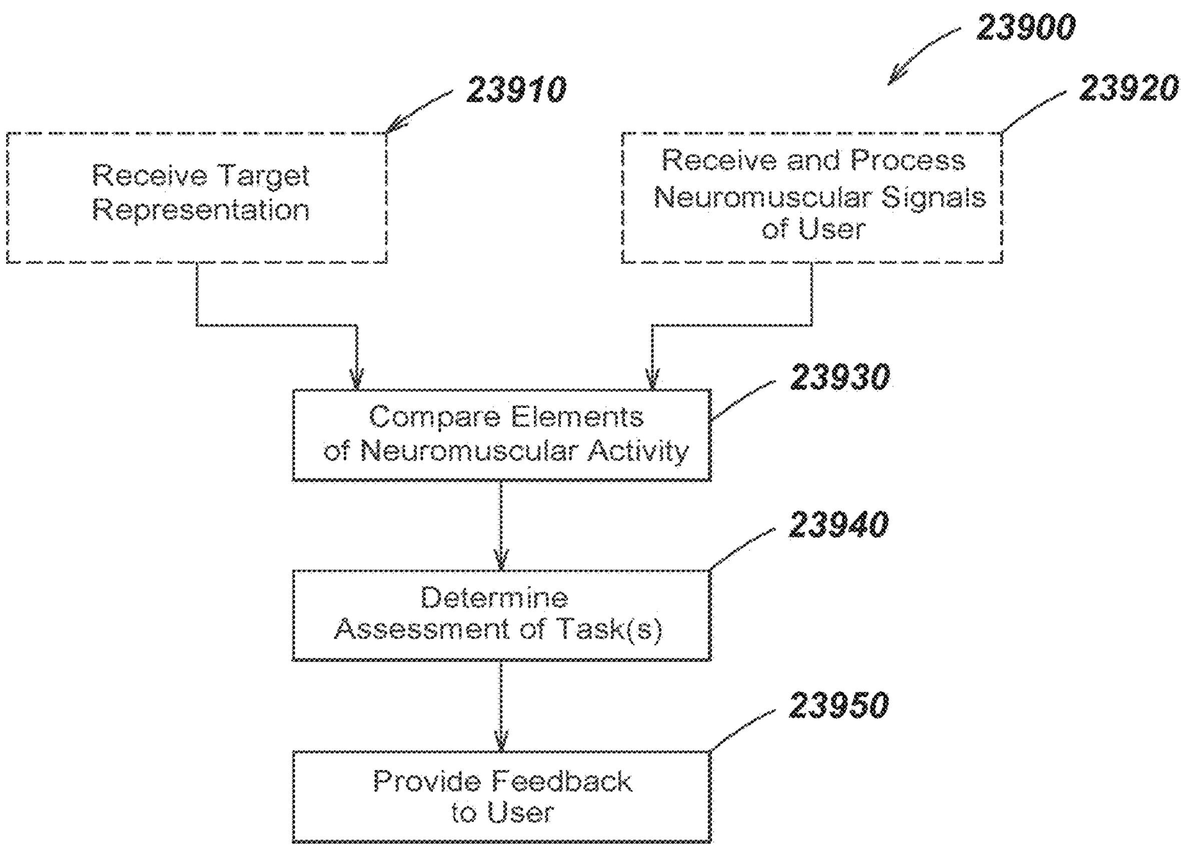
FIG. 23I shows a flowchart of a process for using neuromuscular activity to assess one or more task(s) and to provide feedback, in accordance with some embodiments of the technology described herein.

FIG. 23I shows a flowchart for a process 23900 for assessing one more task(s) based on compared neuromuscular activity, in accordance with some embodiments of the present technology. The process 23900 may be executed at least in part by a computer-based system such as the XR-based system 23200. As discussed herein, inference models may be trained and used to model a user's neuromuscular activity as well as a target or model activity. Also, as discussed herein with reference to FIG. 23H, the system may be capable of receiving a target neuromuscular activity (e.g., at block 23910) to be used as a reference. Such target activity may be preprocessed and stored in memory (e.g., within a processing system, a wearable device, etc.) for future comparisons. At block 23920, the system may receive and process neuromuscular signals of the user being monitored. For example, sensors of a wearable system (e.g., 18200 shown in FIG. 18B, 20600 shown in FIG. 20F-20G) may be worn by the user to sense the neuromuscular signals from the user, and the neuromuscular signals may be provided to the system for processing (e.g., processing via one or more inference model(s), as discussed herein). At block 23930, the system may compare elements of neuromuscular activity from the sensed signals to the stored reference.

At block 23940, the system may determine an assessment of one or more task(s). The assessment may be an overall assessment of a complex movement and/or an assessment of one or more specific element(s), such as a muscle movement. At block 23950, feedback may be provided to the user by the system (e.g., in an XR display with or without other feedback channels, as described above).

In some implementations, the feedback provided to the user be provided in real-time or near real-time, as is advantageous for training. In other implementations, the feedback (e.g., a visualization) may be provided at a later time, e.g., when analyzing a log of neuromuscular activity for purposes of diagnoses and/or for ergonomic/fitness/skill/compliance/relaxation tracking. In some embodiments, such as monitoring (in real-time) a compliance-tracking task, the user may receive feedback in near real-time. For example, the user may be instructed to tighten a screw, and, based on the user's neuromuscular activity, the system could estimate how tightly the user turned the screw and provide feedback to adjust his or her performance of this task accordingly (e.g., by presenting text and/or an image in an XR environment signaling that the user needs to continue tightening the screw). Further, although a target activity may require a high level of skill to be performed well (e.g., to hit a golf ball accurately), it should be appreciated that the system may be used to measure any activity requiring any level of skill.

In some embodiments of the technology described herein, information about the user's muscle activations may be available long before the user would otherwise get feedback about his or her performance of a task corresponding to the muscle activations. For example, a golfer may have to wait multiple seconds for an outcome of a swing (e.g., waiting to see whether a ball hit by the golfer deviates from a desired trajectory), and a tennis player may have to wait for an outcome of a swing (e.g., waiting to see ball to hit the ground before learning whether a serve was in play or out of hounds). In cases such as these, the system may present immediate feedback derived from neuromuscular data (possibly in conjunction with other data such as that from one or more auxiliary sensor(s)), for example, a tone to indicate that the system has detected that the serve will land out of bounds. Advance feedback such as this can be used to, e.g., abort a performance of the task when permissible (e.g., if an error is detected during the golfer's backswing) or to facilitate training with more immediate feedback. The system can be trained, for example, by having the user indicate (e.g., with voice) whether each instance of a motor act (a completed golf swing in this example) was successful, to provide supervised training data.

In some embodiments, feedback presented to a user during performance of a task or after completion of the task may relate to the user's ability to perform the task accurately and/or efficiently. For example, neuromuscular signals recorded during a performance of the task (e.g., tightening a bolt) may be used to determine whether the user performed the task accurately and/or optimally, and feedback may be provided to instruct the user about how to improve performance of the task (e.g., provide more force, position hands and/or fingers in an alternate configuration, adjust hands and/or arms and/or fingers relative to each other, etc.). In some embodiments, the feedback regarding the performance of the task may be provided to the user before the task has been completed, in order to guide the user through proper performance of the task. In other embodiments, the feedback may be provided to the user, at least in part, after the task has been completed to allow the user to review his or her performance of the task, in order to learn how to perform the task correctly.

In some other embodiments relating to physical skill training, augmentation and instrumentations, the system may be used to monitor, assist, log, and/or help the user in a variety of scenarios. For example, the system may be used in a following (e.g., counting) activity, such as knitting or an assembly-line activity. In such cases, the system may be adapted to follow along the user's movements, align his or her activities with instruction(s), step(s), pattern(s), recipe(s), etc.

Further, the system may be adapted to provide error detection and/or alerting functions. For instance, the system can prompt the user with help, documents, and/or other feedback to make the user more efficient and to keep the user on track with performing a task. After the task has been performed, the system may compute metrics about task performance (e.g., speed, accuracy).

In some embodiments of the present technology, the system may be capable of providing checklist monitoring to assist the user in performing an overall activity or set of tasks. For instance, surgeons, nurses, pilots, artists, etc., who perform some types of activities may benefit by having an automated assistant that is capable of determining whether certain tasks for an activity were performed correctly. Such a system may be capable of determining whether all tasks (e.g., physical-therapy steps) on a checklist were executed properly, and may be capable of providing some type of feedback to the user that tasks on the checklist were completed.

Aspects described herein may be used in conjunction with control assistants. For instance, control assistants may be provided for smoothing input actions of the user in order to achieve a desired output control, such as within a surgical mechanical device to smooth shaky hands (e.g., Raven), within a CAD program (e.g., AutoCAD) to control drafting input, within a gaming application, as well as within some other type(s) of applications.

Aspects described herein may be used in other applications such as life logging applications or other applications where activity detection is performed and tracked. For instance, various elements may be implemented by systems (e.g., activity trackers such as Fitbit® available from Fitbit, Inc., (San Francisco, Calif., USA), and the like) that can detect and recognize different activities, such as eating, walking, running, biking, writing, typing, brushing teeth, etc. Further, various implementations of such system may be adapted to determine, e.g., how often, how long, how much the recognized activities were performed. The accuracy of such systems may be improved using neuromuscular signals, as neuromuscular signals may be more accurately interpreted than existing inputs recognized by these systems. Some further implementations of such systems may include applications that assist users to learn physical skills. For example, a user's performance of activities requiring physical skills such as performing music, athletics, controlling a yoyo, knitting, magic tricks, etc.) may be improved by a system that can detect and provide feedback on the user's performance of such skills. For instance, in some implementations, the system may provide visual feedback and/or feedback that may be presented to the user in a gamified form. In some implementations, feedback may be provided to the user in the form of coaching (e.g., by an artificial-intelligence inference engine and/or an expert system), which may assist the user in learning and/or performing a physical skill.

Figure 23J:
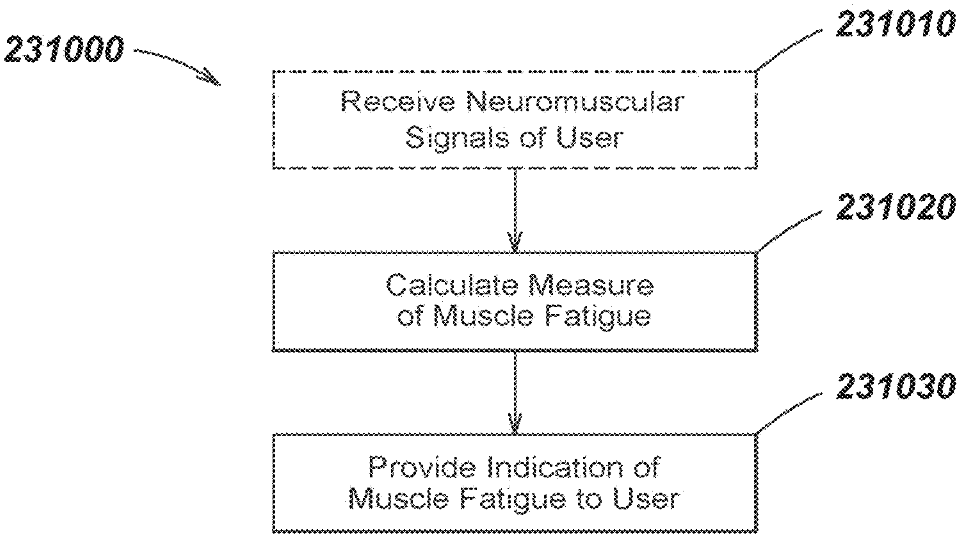
FIG. 23J shows a flowchart of a process for using neuromuscular signals to monitor muscle fatigue, in accordance with some embodiments of the technology described herein.

FIG. 23J shows a flowchart for process 231000 for monitoring muscle fatigue, in accordance with some embodiments of the technology described herein. In particular, it is realized that there may be a benefit in observing muscle fatigue in a user and providing indications of muscle fatigue to the user (or to another system, or to another person (e.g., trainer), etc.). The process 231000 may be executed at least in part by a computer-based system such as the XR-based system 23200. At block 231010, the system receives neuromuscular signals of the user being monitored via one or more sensor(s) (e.g., on the wearable systems 18200 and 20600 shown in FIGS. 18B and 20F, or another sensor arrangement). At block 231020, the system may calculate or determine a measure of muscle fatigue from the user's neuromuscular signals. For instance, fatigue may be calculated or determined as a function of spectral changes in EMG signals over time, using historical neuromuscular signals collected for the user. Alternatively, fatigue may be assessed based on a firing pattern of one or more motor unit(s) of the user. Other methods for calculating or determining fatigue based on neuromuscular signals may be used, such as an inference model that translates neuromuscular signals into a subjective fatigue score. At block 231030, the system may provide an indication of muscle fatigue to the user (or to another system, a third party (e.g., a trainer, medical provider), or another entity (e.g., a vehicle that monitors muscle fatigue)). For instance, the indication can be provided visually (e.g., by a projection in an XR environment, or another type of visual indication), audibly (e.g., a voice indicating fatigue is occurring), or another type of indication. In this way, more detailed information regarding the user may be collected and presented as feedback.

For example, in safety or ergonometric applications, the user may be provided with immediate feedback (e.g., a warning) indicating, e.g., muscle activation and fatigue level, which can be detected by spectral changes in data captured by EMG sensors or another suitable type of sensor, and the user also may be provided with an historical view of a log of the user's muscle activations and fatigue levels, potentially within a postural context. The system may provide as feedback a suggestion to change a technique (for physical tasks) or to change a control scheme (for virtual tasks) as a function of the user's fatigue. For instance, the system may be used to alter a physical rehabilitation training program, such as by increasing an amount of time to a next session, based on a fatigue score determined within a current rehabilitation session. A measure of fatigue may be used in association with other indicators to warn the user or others of one or more issue(s) relating to the user's safety. For instance, the system may help in determining ergonometric issues (e.g., to detect whether the user is lifting too much weight, or typing inappropriately or with too much force, etc.) and recovery monitoring (e.g., to detect whether the user is pushing himself or herself too hard after an injury). It should be appreciated that various embodiments of the system may use fatigue level as an indicator or as input for any purpose.

In some embodiments of the present technology, systems and methods are provided for assisting, treating, or otherwise enabling a patient with an injury or a disorder that affects his or her neuromuscular system by delivering feedback about the patient's neuromuscular activity (i.e. in an immersive experience such as via XR displays, haptic feedback, auditory signals, user interfaces, and/or other feedback types to assist the patient in performing certain movements or activities). For a patients taking part in neuro-rehabilitation, which may be required due to injury (e.g., peripheral nerve injury and/or spinal cord injury), stroke, cerebral palsy, or another cause, feedback about patterns of neuromuscular activity may be provided that permit the patients to gradually increase neuromuscular activity or otherwise improve their motor-unit outputs. For example, a patient may only be able to activate a small number of motor units during an early phase of therapy, and the system may provide feedback (e.g., 'high-gain feedback') showing a virtual or augmented part of the patient's body moving a greater degree than actually occurs. As therapy progresses, the gain provided for feedback can be reduced as the patient achieves better motor control. In other therapeutic examples, a patient may have a motor disorder such as a tremor and be guided through feedback specific to the patient's neuromuscular impairment (e.g. that shows less tremor in the feedback). Thus, feedback may be used to show small incremental changes in neuromuscular activation (e.g., each increment being recognized as achievable by the patient), to encourage the patient's rehabilitation progress.

Figure 23K:
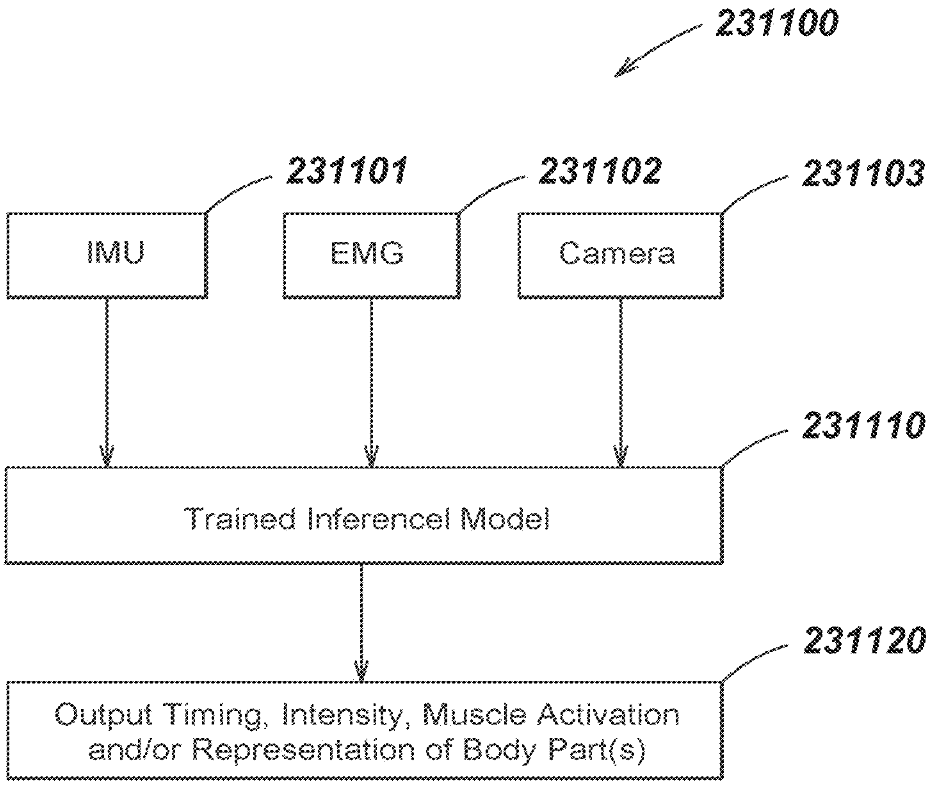
FIG. 23K shows a flowchart of a process for providing data to a trained inference model to obtain musculoskeletal information, in accordance with some embodiments of the technology described herein.
Figure 23L:
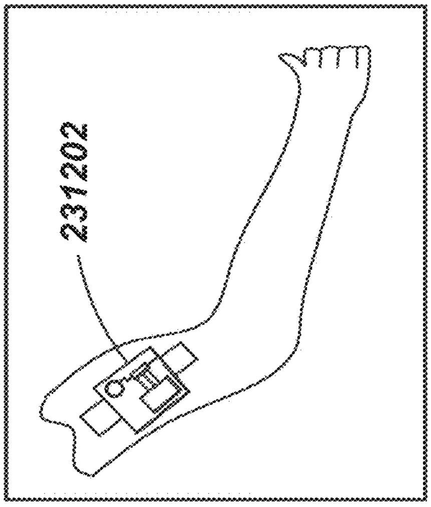
FIGS. 23L, 23M, 23N, and 23O schematically illustrate patch type wearable systems with sensor electronics incorporated thereon, in accordance with some embodiments of the technology described herein.
Figure 23M:
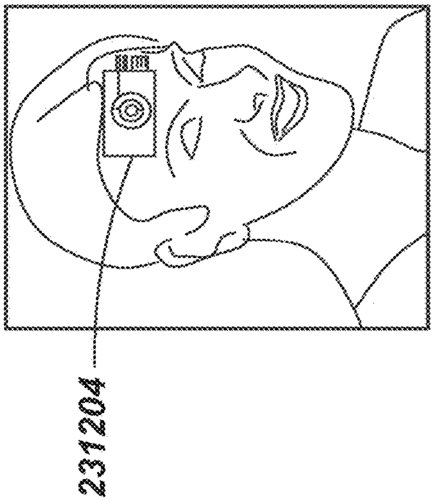
Figure 23N:
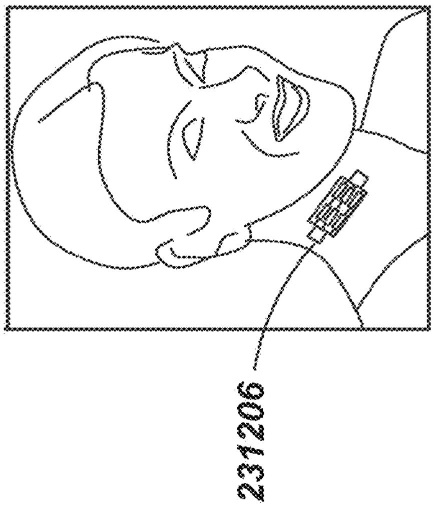
Figure 23O:
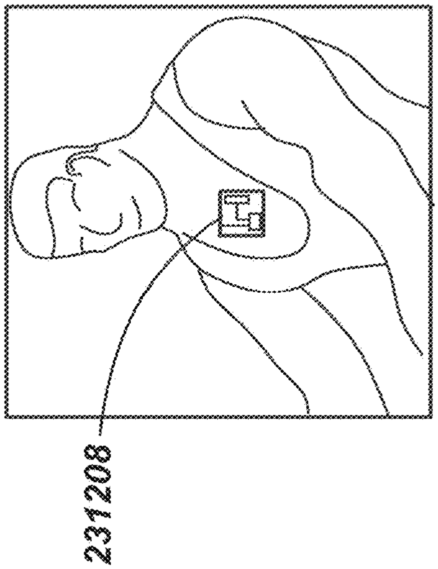
Figure 23P:
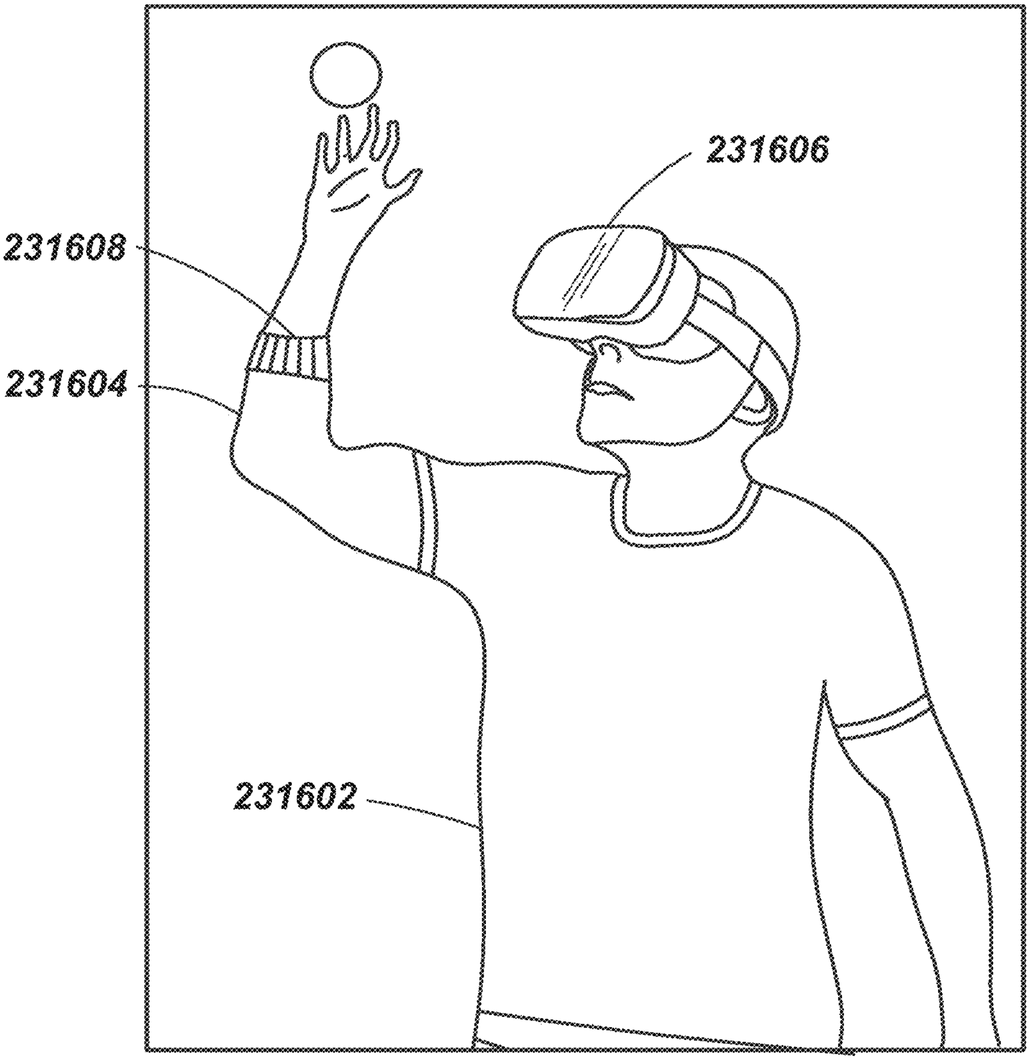
FIG. 23P shows an example of an XR implementation in which feedback about a user may be provided to the user via an XR headset.
Figure 23Q:
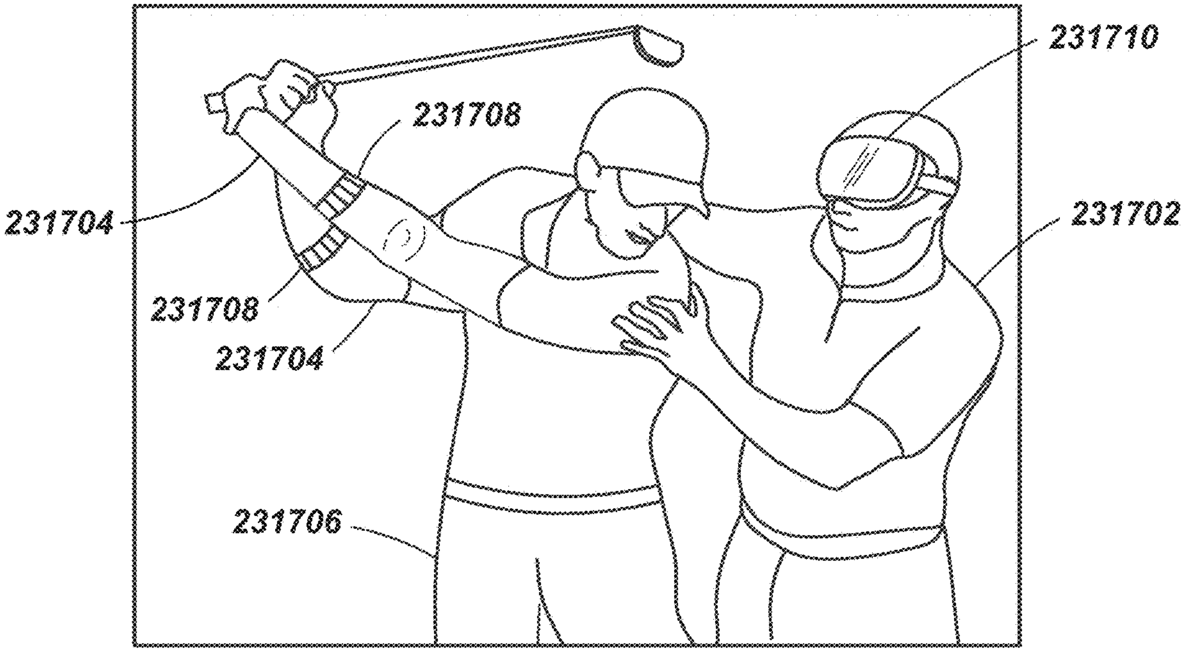
FIG. 23Q shows an example of an XR implementation in which feedback about a user may be provided to another person assisting the user.

FIG. 23K shows a flowchart of a process 231100 in which inputs are provided to a trained inference model, in accordance with some embodiments of the technology described herein. For example, the process 231100 may be executed at least in part by a computer-based system such as the XR-based system 23200. In various embodiments of the present technology, a more accurate musculoskeletal representation may be obtained by using IMU inputs (231101), EMG inputs (231102), and camera inputs (231103). Each of these inputs may be provided to a trained inference model 231110. The inference model may be capable of providing one or more outputs such as position, force, and/or a representation of the musculoskeletal state. Such outputs may be utilized by the system or provided to other systems to produce feedback for the user. It should be appreciated that any of the inputs may be used in any combination with any other input to derive any output, either alone or in combination with any output list or any other possible output. For instance, forearm positional information may be derived based on a combination of IMU data and camera data. In one implementation, an estimate of forearm position may be generated based on IMU data and adjusted based on ground-truth camera data. Also, forearm position and/or forearm orientation may be derived using camera data alone without IMU data. In another scenario, EMG signals may be used to derive force-only information to augment posture-only information provided by a camera-model system. Other combinations of inputs and output are possible and within the scope of various embodiments descried herein.

It should also be appreciated that such outputs may be derived with or without generating any musculoskeletal representation. It should also be appreciated that one or more outputs may be used as control inputs to any other system, such as an EMG-based control that is used to control an input mode of an XR system, or vice-versa.

It is appreciated that any embodiment described herein may be use alone or in any combination with any other embodiment described herein. Further embodiments are described in more detail in U.S. patent application Ser. No. 16/257,979 filed Jan. 25, 2019, entitled "CALIBRATION TECHNIQUES FOR HANDSTATE REPRESENTATION MODELING USING NEUROMUSCULAR SIGNALS," which is incorporated by reference herein in its entirety.

The following describes exemplary systems and methods for identifying biological structures associated with neuromuscular source signals according to at least one embodiment of the present disclosure.

Some embodiments are directed to a system comprising: a plurality of neuromuscular sensors, each of which is configured to record a time-series of neuromuscular signals from a surface of a user's body; at least one computer hardware processor; and at least one non-transitory computer-readable storage medium storing processor-executable instructions that, when executed by the at least one computer hardware processor, cause the at least one computer hardware processor to perform: applying a source separation technique to the time series of neuromuscular signals recorded by the plurality of neuromuscular sensors to obtain a plurality of neuromuscular source signals and corresponding mixing information; providing features, obtained from the plurality of neuromuscular source signals and/or the corresponding mixing information, as input to a trained statistical classifier and obtaining corresponding output; and identifying, based on the output of the trained statistical classifier, and for each of one or more of the plurality of neuromuscular source signals, an associated set of one or more biological structures.

Some embodiments are directed to a method comprising using at least one computer hardware processor to perform: applying a source separation technique to the time series of neuromuscular signals recorded by a plurality of neuromuscular sensors to obtain a plurality of neuromuscular source signals and corresponding mixing information; providing features, obtained from the plurality of neuromuscular source signals and/or the corresponding mixing information, as input to a trained statistical classifier and obtaining corresponding output; and identifying, based on the output of the trained statistical classifier, and for each of one or more of the plurality of neuromuscular source signals, an associated set of one or more biological structures.

Some embodiments are directed to at least one non-transitory computer-readable storage medium storing processor-executable instructions that, when executed by the at least one computer hardware processor, cause the at least one computer hardware processor to perform: applying a source separation technique to the time series of neuromuscular signals recorded by a plurality of neuromuscular sensors to obtain a plurality of neuromuscular source signals and corresponding mixing information; providing features, obtained from the plurality of neuromuscular source signals and/or the corresponding mixing information, as input to a trained statistical classifier and obtaining corresponding output; and identifying, based on the output of the trained statistical classifier, and for each of one or more of the plurality of neuromuscular source signals, an associated set of one or more biological structures.

Some embodiments are directed to a system comprising: a plurality of neuromuscular sensors, each of which is configured to record a time-series of neuromuscular signals from a surface of a user's body; at least one computer hardware processor; and at least one non-transitory computer-readable storage medium storing processor-executable instructions that, when executed by the at least one computer hardware processor, cause the at least one computer hardware processor to perform: applying a source separation technique to the time series of neuromuscular signals recorded by the plurality of neuromuscular sensors to obtain a plurality of neuromuscular source signals and corresponding mixing information; aligning the plurality of neuromuscular source signals to a plurality of template neuromuscular source signals, the aligning comprising: determining, using a cost function, a distance between first features and second features, the first features obtained from the plurality of neuromuscular source signals and/or the corresponding mixing information, the second features obtained from the template neuromuscular source signals and/or corresponding template mixing information; and identifying, based on results of the aligning and for each of one or more of the plurality of neuromuscular source signals, an associated set of one or more biological structures.

Some embodiments are directed to a method, comprising using at least one computer hardware processor to perform: applying a source separation technique to the time series of neuromuscular signals recorded by the plurality of neuromuscular sensors to obtain a plurality of neuromuscular source signals and corresponding mixing information; aligning the plurality of neuromuscular source signals to a plurality of template neuromuscular source signals, the aligning comprising: determining, using a cost function, a distance between first features and second features, the first features obtained from the plurality of neuromuscular source signals and/or the corresponding mixing information, the second features obtained from the template neuromuscular source signals and/or corresponding template mixing information; and identifying, based on results of the aligning and for each of one or more of the plurality of neuromuscular source signals, an associated set of one or more biological structures.

Some embodiments are directed to at least one non-transitory computer-readable storage medium storing processor-executable instructions that, when executed by at least one computer hardware processor, cause the at least one computer hardware processor to perform: applying a source separation technique to the time series of neuromuscular signals recorded by the plurality of neuromuscular sensors to obtain a plurality of neuromuscular source signals and corresponding mixing information; aligning the plurality of neuromuscular source signals to a plurality of template neuromuscular source signals, the aligning comprising:

determining, using a cost function, a distance between first features and second features, the first features obtained from the plurality of neuromuscular source signals and/or the corresponding mixing information, the second features obtained from the template neuromuscular source signals and/or corresponding template mixing information; and identifying, based on results of the aligning and for each of one or more of the plurality of neuromuscular source signals, an associated set of one or more biological structures.

The inventors have appreciated that neuromuscular signals detected by neuromuscular sensors depend on a variety of factors including, but not limited to, the precise positions of the neuromuscular sensors on a user, movement of the sensors during recording, and the quality of the contact between the sensors and the users. As these factors often change over time, between uses, and between users, the neuromuscular signals detected by the sensors change as well, which makes it difficult to use neuromuscular signals detected by the sensors for various applications (e.g., controlling physical devices, predicting onset of a motor task, and applications described herein) in a robust and reliable way.

The inventors have also appreciated that recorded neuromuscular signals are formed as a superposition of neuromuscular source signals, each of which may be generated by a corresponding biological structure (e.g., a muscle or muscle group, tendon, motor unit) and that the neuromuscular source signals are less sensitive to the positions, motion, and contact quality of the neuromuscular sensors. Accordingly, the inventors have developed techniques for recovering neuromuscular source signals from recorded neuromuscular signals using source separation and identifying associated biological structures for the neuromuscular source signals such that, with the identification, the neuromuscular source signals may be used for various control and other applications instead of the raw neuromuscular signals themselves. The neuromuscular source signals obtained using the methods described herein exhibit greater stability over time, between different uses by the same user, and between users, than do the raw neuromuscular signals themselves. One important reason for this is anatomical and physiological—the distribution of muscles, motor units, and innervation points/structure is very similar among people.1

[1]One exception is the palmaris longus muscle, which is missing in about 14% of the population. The techniques described herein can be used to identify the presence or absence of this muscle in human subjects, which could help further reduce the variability within each of these two groups of people (those with the muscle and those without), and thus aid generalization performance of the methods described herein.

The inventors have appreciated that a need exists for reactive systems that can decompose neuromuscular signals, identify, and selectively capture electrical activity produced by specific biological structures using robust and reliable techniques.

Accordingly, some embodiments involve: (1) recording neuromuscular signals using multiple (e.g., wearable) neuromuscular sensors positioned on a user's body (e.g., EMG, MMG, and SMG sensors); (2) applying a source separation technique (e.g., independent components analysis or non-negative matrix factorization) to the recorded neuromuscular signals to obtain neuromuscular source signals and corresponding mixing information (e.g., a mixing matrix or an unmixing matrix); and (3) identifying, for each of one or more of the neuromuscular source signals, an associated set of one or more biological structures (e.g., one or more muscles, one or more tendons, and/or one or more motor units) whose neuromuscular activity gave rise to the neuromuscular source signal. The identification step may be performed using one or more features derived from the mixing information, the neuromuscular source signals, and/or the recorded neuromuscular signals. Additionally, one or more non-neural features (e.g., experimental design information indicating which biological structures are likely to be most active during an experiment) may be used to perform the identification step, in some embodiments. The biological structures so identified are "device-independent" in that their association with the neuromuscular source signals may be independent of (or at least largely insensitive to) the placement of the sensors and from the types of sensors utilized.

In some embodiments, the above-described acts may be performed in near or real-time, for example, in less than 100 milliseconds, less than 500 milliseconds, less than one second, or less than 5 seconds. In some embodiments, the above-described acts may be performed within a threshold amount of time of the detection of a voltage potential by one or more neuromuscular (e.g., EMG, SMG, or MMG) sensors located on the surface of the body.

Figure 24A:
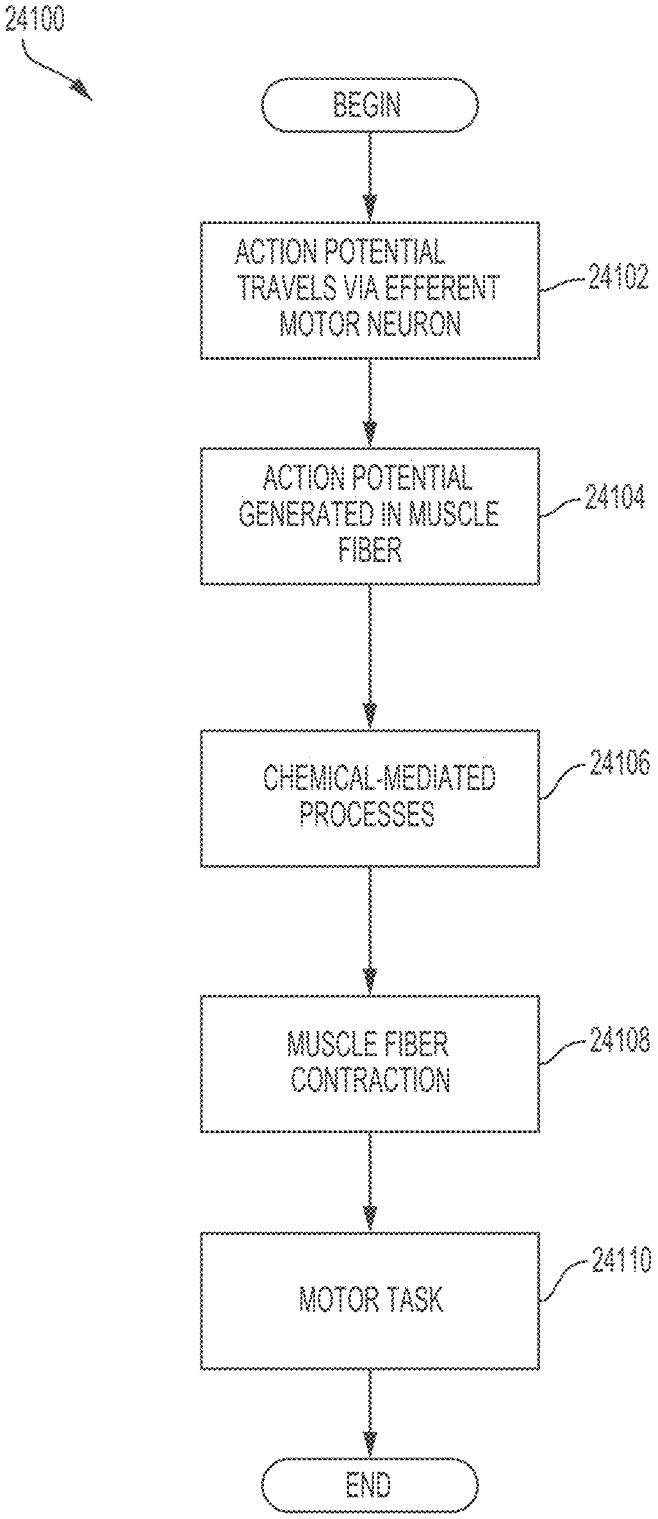
FIG. 24A is a flowchart of a biological process for performing a motor task in accordance with some embodiments of the technology described herein.
Figure 24B:
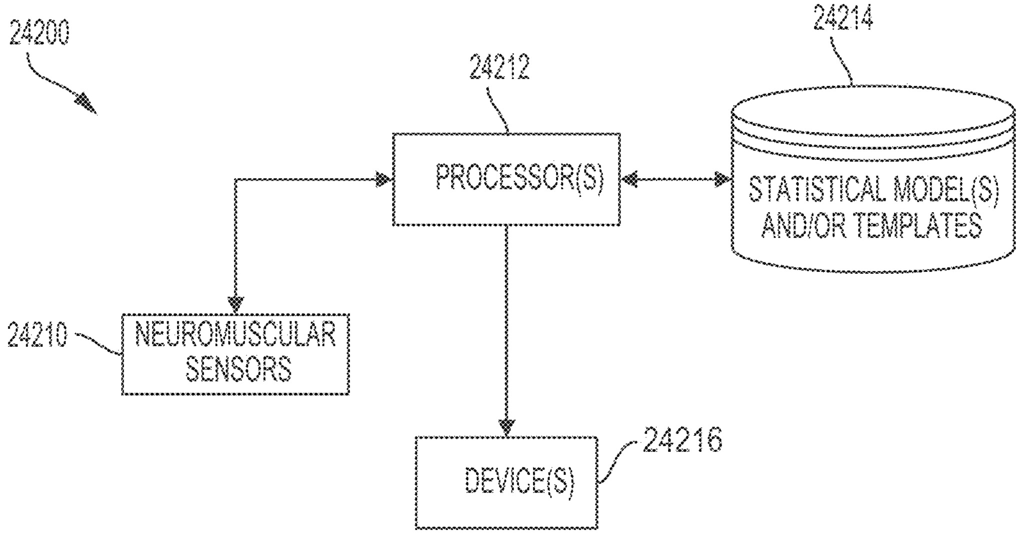
FIG. 24B is a schematic diagram of a computer-based system for separating recorded neuromuscular signals into neuromuscular source signals and identifying biological structures associated with the neuromuscular source signals, in accordance with some embodiments of the technology described herein.
Figure 24C:
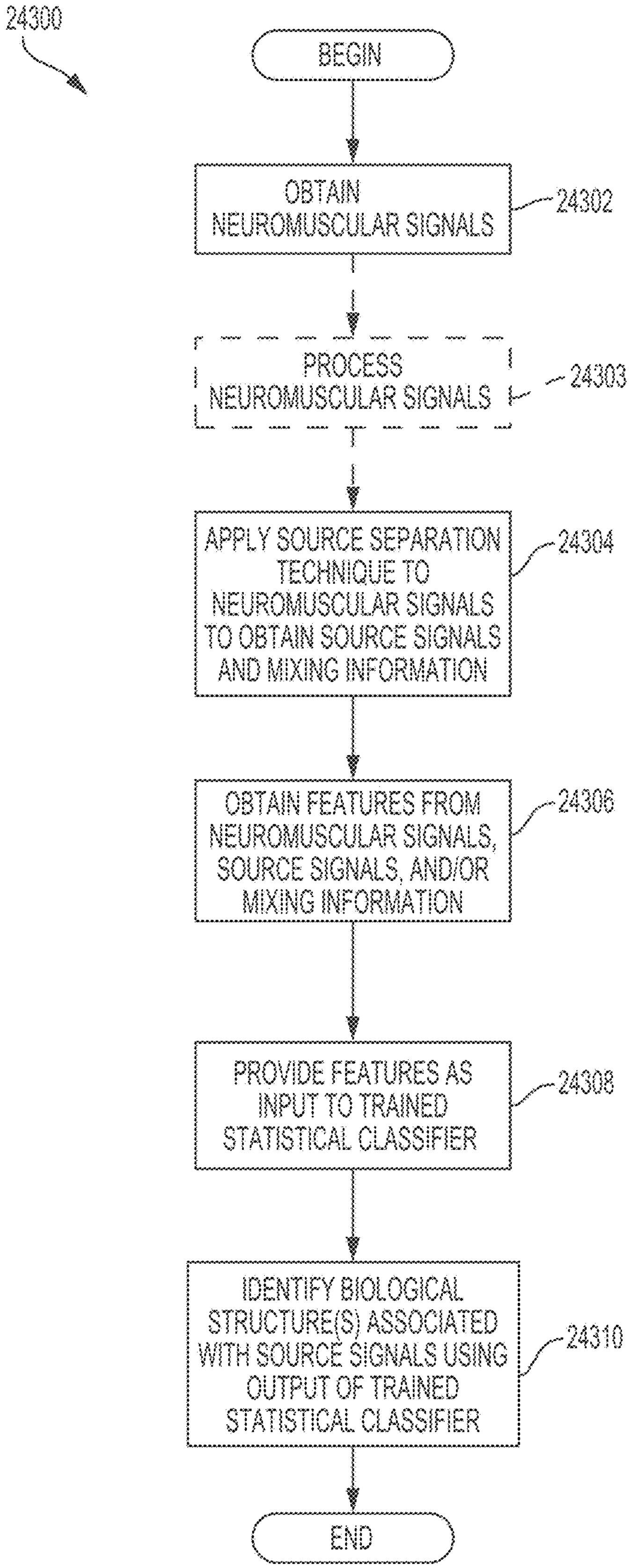
FIG. 24C is a flowchart of an illustrative process for separating recorded neuromuscular signals into neuromuscular source signals and identifying biological structures associated with the neuromuscular source signals, in accordance with some embodiments of the technology described herein.
Figure 24D:
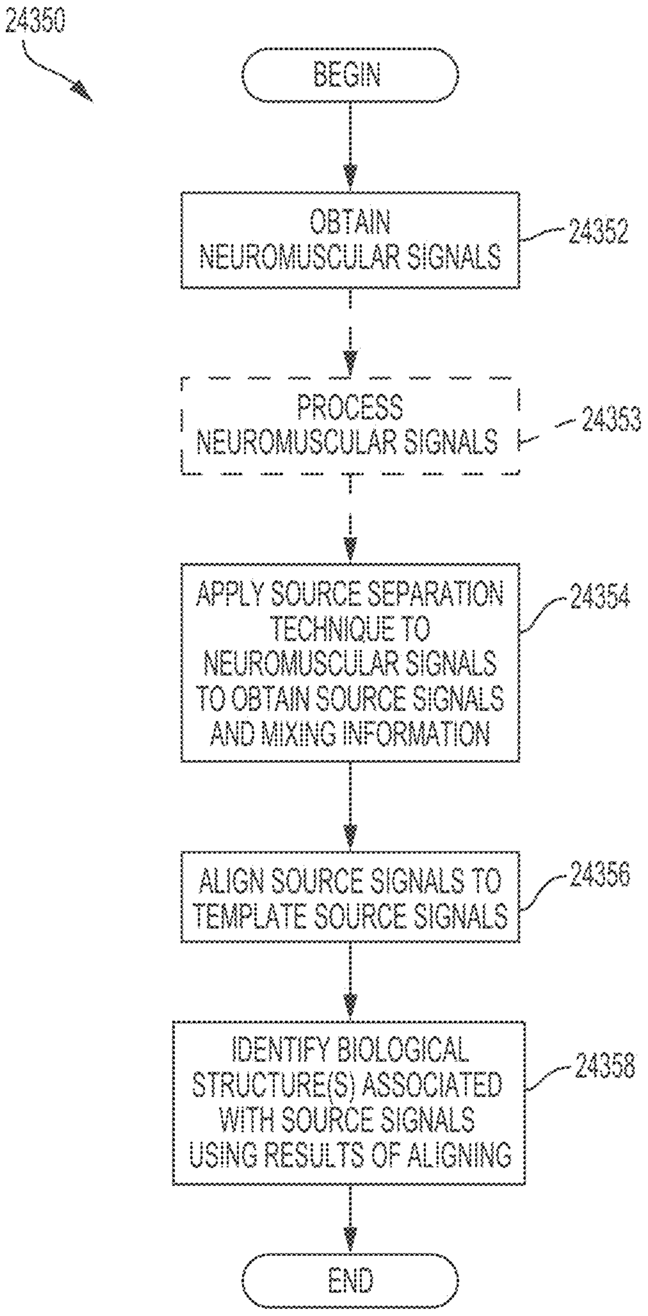
FIG. 24D is a flowchart of another illustrative process for separating recorded neuromuscular signals into neuromuscular source signals and identifying biological structures associated with the neuromuscular source signals, in accordance with some embodiments of the technology described herein.
Figure 24E:
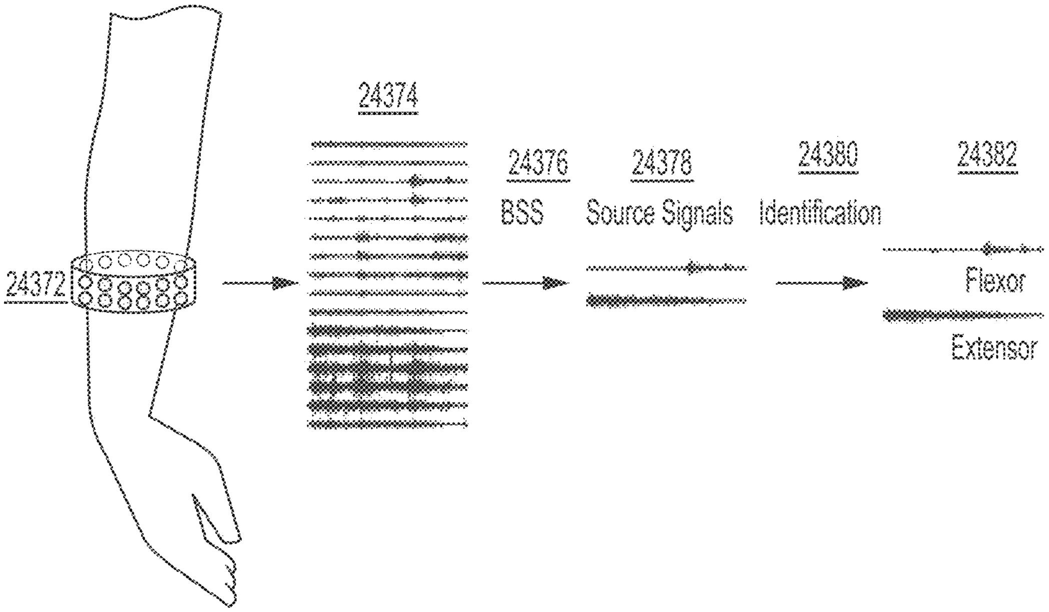
FIG. 24E is a diagram illustrating a process separating recorded neuromuscular signals into two neuromuscular source signals and identifying biological structures associated with the two neuromuscular source signals, in accordance with some embodiments of the technology described herein.

One example of the above-described acts is illustrated in FIG. 24E. As shown in FIG. 24E, neuromuscular signals 24374 may be recorded by neuromuscular sensors 24372 circumferentially arranged on a wearable wristband worn on a user's arm. A source separation technique 24376 may be applied to the neuromuscular signals 24374 to generate neuromuscular source signals 24378 and corresponding mixing information (not shown). An associated set of one or more biological structures may be identified 24380 for each of the two neuromuscular source signals using any of the techniques described herein. As a result, it may be determined, as shown by labels 24382, that the first neuromuscular source signal was generated based, at least in part, on neuromuscular activity in at least one flexor muscle and that the second neuromuscular source signal was generated based, at least in part, on neuromuscular activity in at least one extensor muscle.

Associating a set of one or more biological structures with a neuromuscular source signal may provide an indication that the neuromuscular source signal was generated based, at least in part, on neuromuscular activity of the biological structures in the set. The association may be implemented in any suitable way and, for example, by assigning a label to each of the neuromuscular source signals. In some embodiments, a label may identify (directly or indirectly) a set of biological structures so that the constituent structures (e.g., specific muscles, tendons, etc.) may be identified. For example, as shown by labels 24382 in FIG. 24E, one source signal may be labeled with a label that indicates the source signal was generated by neuromuscular activity of at least one extensor muscle and another source signal may be labeled with a label that indicates the other source signal was generated by neuromuscular activity of at least one flexor muscle.

In other embodiments, however, a label may not identify a set of biological structures in a way that allows for the constituent muscles, tendons, and/or motor units to be determined. For example, a label may be a number. Rather, in such cases, different labels merely signify that different neuromuscular source signals correspond to different sets of biological structures. In this context, applying the same label to one neuromuscular source signal (e.g., obtained from one set of EMG measurements of a user) and to another neuromuscular source signal (e.g., obtained from another set of EMG measurements of the same user recorded at a later time) indicates that both neuromuscular source signals were generated by neuromuscular activity in the same set of one or more biological structures (even if the constituent structures in the set are partially or fully unknown).

In some embodiments, multiple source signals may be assigned a same label. This may indicate, for example, that the multiple source signals are associated with (e.g., emanate from) the same underlying biological structure. For example, source signals emanating from different muscle fibers may be assigned the same label, which may indicate that the fibers are part of the same muscle. As another example, source signals emanating from different motor units may be assigned the same label, which may indicate that the motor units are part of the same muscle.

In some embodiments, identifying, for each of one or more of the neuromuscular source signals, an associated set of one or more biological structures may be performed by a trained statistical classifier (e.g., a neural network). The trained statistical classifier may receive, as input, one or more features derived from the mixing information, the neuromuscular source signals, and/or the recorded neuromuscular signals. Responsive to the input, the trained statistical classifier may provide as output, for each set i of one or more biological structures source signal and each neuromuscular source signal j, a probability pij that the jth source signal is to be associated with the ith set of one or more biological structures.

In some embodiments, the trained statistical classifier may be updated or retrained, in real time, by using information obtained from the time-series of neuromuscular signals recorded by the plurality of neuromuscular sensors. For example, the trained statistical classifier may be used to identify biological structures associated with neuromuscular source signals and, subsequently, the neuromuscular source signals, corresponding mixing information, and/or any information derived therefrom may be used to update one or more parameters of the trained statistical classifier. As one example, in some embodiments, classification metrics (e.g., cross entropy, mutual information, etc.) may be used to update one or more parameters of the trained statistical classifier.

In other embodiments, identifying, for each of one or more of the neuromuscular source signals, an associated set of one or more biological structures may be performed by using a set of template source signals each associated with a known set of one or more biological structures. In some embodiments, neuromuscular source signals may be aligned to template neuromuscular source signals and identifying, based on results of the aligning, an associated set of one or more biological structures for each of one or more neuromuscular source signals. For example, if a particular neuromuscular source signal were aligned to a template source signal already associated with a particular group of muscles, then the particular neuromuscular source signal would also be associated with the particular group of muscles.

In some embodiments, aligning neuromuscular source signals to template neuromuscular source signals comprises determining, using a cost function, a distance between first features and second features, the first features obtained from the neuromuscular source signals and/or the corresponding mixing information, the second features obtained from the template neuromuscular source signals and/or corresponding template mixing information.

In some embodiments, the aligning comprises determining, using a cost function, a distance between the corresponding mixing information and the corresponding template mixing information.

In some embodiments, the aligning comprises determining, using a cost function, a distance between the neuromuscular source signals and the template neuromuscular source signals. This may be done in any suitable way and, for example, may be done by: (1) smoothing and/or rectifying the neuromuscular source signals to obtain first processed neuromuscular source signals; (2) smoothing and/or rectifying the template neuromuscular source signals to obtain a second processed neuromuscular source signals; and (3) determining a distance between the first processed neuromuscular source signals and the second processed neuromuscular source signals. In some embodiments, the distance may be computed between the processed neuromuscular source signals directly and/or between features derived therefrom.

In some embodiments, the obtained neuromuscular source signals along with the identification information may be used for any of numerous applications including, but not limited to, prediction of onset of a motor task, control of one or more physical devices, control of one or more virtual representations, and providing a dynamically-updated musculo-skeletal representation comprising a plurality of rigid body segments connected by joints. Any of these tasks may be performed offline or in real-time (e.g., in less than 100 milliseconds, in less than 500 milliseconds, in less than 1 second, or in less than 5 seconds).

For example, in some embodiments, the neuromuscular source signals may be provided as input to a trained statistical model having at least a first input associated with the first set of one or more biological structures and second input associated with the second set of one or more biological structures. This may include: (1) providing the first neuromuscular source signal or data derived from the first neuromuscular source signal to the first input of the trained statistical model (e.g., a recurrent neural network); (2) providing the second neuromuscular source signal or data derived from the second neuromuscular source signal to the second input of the trained statistical model; and (3) controlling at least one device based, at least in part, on output of the trained statistical model.

In some embodiments, controlling of the at least one device includes predicting, based on an output of the trained statistical model, whether an onset of a motor action will occur within a threshold amount of time; and when it is predicted that the onset of the motor action will occur within the threshold amount of time, sending a control signal to the at least one device prior to completion of the motor action by the user.

It should be appreciated that the techniques introduced above and discussed in greater detail below may be implemented in any of numerous ways, as the techniques are not limited to any manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Coordinated movements of skeletal muscles in the human body that collectively result in the performance of a motor task originate with neural signals arising in the central nervous system. The neural signals travel from the central nervous system to muscles via spinal motor neurons, each of which has a body in the spinal cord and axon terminals on one or more muscle fibers. In response to receiving the neural signals, the muscle fibers contract resulting in muscle movement.

FIG. 24A illustrates a flowchart of a biological process 24100 for initiating a motor task by the coordinated movement of one or more muscles. In act 24102, action potentials are generated in one or more efferent spinal motor neurons. The motor neurons carry the neuronal signal away from the central nervous system and toward skeletal muscles in the periphery. For each motor neuron in which an action potential is generated, the action potential travels along the axon of motor neuron from its body in the spinal cord where the action potential is generated to the axon terminals of the motor neuron that innervate muscle fibers included in skeletal muscles.

A chemical synapse formed at the interface between an axon terminal of a spinal motor neuron and a muscle fiber is called a neuromuscular junction. As an action potential transmitted along the axon of a motor neuron reaches the neuromuscular junction, process 24100 proceeds to act 24104, where an action potential is generated in the muscle fiber as a result of chemical activity at the neuromuscular junction. In particular, Acetylcholine released by the motor neuron diffuses across the neuromuscular junction and binds with receptors on the surface of the muscle fiber triggering a depolarization of the muscle fiber. Although neuromuscular signals sensed on the body surface generated by individual muscle fibers are small (e.g., less than 100 μV), the collective action of multiple muscle fibers conducting simultaneously results in a detectable voltage potential that may be recorded by neuromuscular (e.g., EMG, SMG, or MMG) sensors located on the surface of the body.

Following generation of an action potential in the muscle fiber, process 24100 proceeds to act 24106, where the propagation of the action potential in the muscle fiber results in a series of chemical-mediated processes within the muscle fiber. For example, depolarization of a muscle fiber results in an influx of calcium ions into the muscle fiber. Calcium ions inside the muscle fiber bind with troponin complexes causing the troponin complexes to separate from myosin binding sites on actin filaments in the muscle fiber, thereby exposing the myosin binding sites.

Following these chemical-mediated processes, process 24100 proceeds to act 24108, where the muscle fiber contracts. Muscle fiber contraction is achieved due to the binding of exposed myosin heads with actin filaments in the muscle fiber creating cross-bridge structures. Process 24100 then proceeds to act 24110, where the collective contraction of muscle fibers in one or more muscles results in the performance of a motor task. The motor task may be a simple task such as a button press, which involves only a few muscles in a finger and/or wrist, a more complex task such as grasping and turning a doorknob involving several muscles of the hand, wrist and arm, or a motor task of any other complexity, as embodiments of the technology described herein are not limited in this respect.

Neural activity, muscle fiber recruitment, muscle contraction and joint movement all precede the completion of a motor task. For example, the chemical-mediated and mechanical processes involved in acts 24106 and 24108 of process 24100 are not instantaneous, but occur over a time period, which may be on the order of hundreds of milliseconds. Accordingly, there is a time delay between when neuromuscular sensors placed on or near the body surface record the generation of action potentials in the muscle fibers at act 24104 in process 24100 and when the motor task is performed in act 24110. In some embodiments, rather than waiting until the intentional action is performed, signals recorded from neuromuscular sensors may be used to predict the motor task to be performed in advance of the task actually being performed by the wearer of the sensors. As discussed herein, in some embodiments, neuromuscular signals recorded by neuromuscular sensors may be processed to obtain neuromuscular source signals and the neuromuscular source signals, rather than the neuromuscular signals themselves, may be used to predict the onset of a motor task to be performed by the wearer of the sensors.

FIG. 24B is a schematic diagram of a computer-based system 24200 for separating recorded neuromuscular signals into neuromuscular source signals and identifying biological structures associated with the neuromuscular source signals, in accordance with some embodiments of the technology described herein. System 24200 includes a plurality of neuromuscular sensors 24210 configured to record signals arising from neuromuscular activity in skeletal muscle of a human body. Neuromuscular sensors 24210 may include one or more EMG sensors, one or more MMG sensors, one or more SMG sensors, and/or one or more sensors of any other suitable type that are configured to detect neuromuscular signals.

In some embodiments, EMG sensors include electrodes which detect electric potentials on the surface of the body and hardware processing circuitry that processes the raw EMG signal to perform amplification, filtering (e.g., low pass, high pass, band pass, shaping, narrow band, wide band, temporal etc.), and/or any other suitable type of signal processing (e.g., rectification). Some embodiments employ EMG sensors including hardware signal processing circuitry for processing recorded EMG signals. Other embodiments employ EMG sensors, where at least some of the processing circuitry is performed by one or more circuits in communication with, but not directly integrated with the electrodes that record the signals. In other embodiments, at least some (e.g., all) of the signal processing (e.g., amplification, filtering, rectification, etc.) may be implemented using software rather than by using hardware signal processing circuitry. Thus, signal processing of EMG signals (e.g., amplification, filtering, and rectification) may be performed in hardware only, in software only, or by any combination of hardware and software, as aspects of the technology described herein are not limited in this respect.

In some embodiments, neuromuscular sensors 24210 include one or more MMG sensors and/or one or more SMG sensors in addition to or instead of one or more EMG sensors. When used, MMG and SMG sensors may be of any suitable type, as aspects of the technology described herein are not limited in this respect. Some embodiments employ MMG and/or SMG sensors that include hardware signal processing circuitry for performing signal processing (e.g., amplification, filtering, and rectification) on recorded MMG and/or SMG signals. In other embodiments, at least some signal processing of the MMG and/or SMG signals may be performed in software. Thus, signal processing of MMG and/or SMG signals may be performed in hardware only, in software only, or by any suitable combination of hardware and software, as aspects of the technology described herein are not limited in this respect.

In some embodiments, the plurality of neuromuscular sensors 24210 includes one or more pairs of neuromuscular sensors arranged as a portion of a wearable device configured to be worn on or around part of a user's body. For example, in one non-limiting example, a plurality of neuromuscular sensors may be arranged circumferentially around an adjustable and/or elastic band such as a wristband or armband configured to be worn around a user's wrist or arm.

In one illustrative implementation, sixteen (16) neuromuscular sensors are arranged circumferentially around an elastic band configured to be worn around a user's lower arm. For example, FIG. 18B shows neuromuscular sensors 18504, which may be EMG sensors in some embodiments, arranged circumferentially around elastic band 18502. It should be appreciated that any suitable number of neuromuscular sensors may be used and the particular number and arrangement of neuromuscular sensors used may depend on the particular application for which the wearable device is used. For example, a wearable armband or wristband may be used to predict hand-based motor tasks such as pressing button or moving a joystick, whereas a wearable leg or ankle band may be used to predict foot-based motor tasks such as pressing the gas or brake pedal on a vehicle such as a real or virtual car. For example, as shown in FIG. 18C, a user 18506 may be wearing elastic band 18502 on hand 18508. In this way, neuromuscular sensors 18504 may be configured to record EMG signals as a user controls keyboard 18512 using fingers 18510.

In some embodiments, multiple wearable devices, each having one or more neuromuscular sensors included thereon may be used to predict the onset of complex motor tasks that involve multiple parts of the body.

System 24200 also includes one or more computer processors 24212 programmed to communicate with sensors 24210. For example, neuromuscular signals recorded by neuromuscular sensors 24210 may be provided to processor(s) 24212 for processing. Processor(s) 24212 may be implemented in hardware, firmware, software, or any combination thereof. Additionally, processor(s) 24212 may be co-located on the same wearable device as the neuromuscular sensors 24210 or may be at least partially located remotely (e.g., processing may occur on one or more network-connected processors).

In some embodiments, processor(s) 24212 may be configured to communicate with neuromuscular sensors 24210, for example to calibrate the neuromuscular sensors 24210 prior to measurement of neuromuscular signals. For example, a wearable device may be positioned in different orientations on or around a part of a user's body and calibration may be performed to determine the orientation of the wearable device and/or to perform any other suitable calibration tasks. Calibration of neuromuscular sensors 24210 may be performed in any suitable way, and embodiments are not limited in this respect. For example, in some embodiments, a user may be instructed to perform a particular sequence of movements and the recorded neuromuscular activity may be matched to a template by virtually rotating and/or scaling the signals detected by the sensors (e.g., by the electrodes on EMG sensors). In some embodiments, calibration may involve changing the gain(s) of one or more analog to digital converters (ADCs), for example, in the case that the signals detected by the sensors result in saturation of the ADCs.

In some embodiments, processor(s) 24212 may be configured to obtain neuromuscular signals from neuromuscular sensors 24210 and process the neuromuscular signals using a source separation technique (e.g., non-negative matrix factorization, independent components analysis, etc.) to obtain neuromuscular source signals and corresponding mixing information. For example, as shown in FIG. 24G, EMG signals shown in the top panel may be processed using a source separation technique to obtain neuromuscular source signals including the source signals shown in the second, third, and fourth panels of FIG. 24G. The processor(s) 24212 may then associate one or more biological structures associated with each of the neuromuscular source signals using neuromuscular signals, neuromuscular source signals, mixing information and/or any information derived therefrom.

In turn, the neuromuscular source signals may be used to predict the onset of motor tasks and/or for any other suitable applications, examples of which are provided herein. For example, in some embodiments, the neuromuscular source signals may be provided as inputs to a trained statistical model (e.g., a neural network, such as a long short term memory neural network or any other suitable machine learning model or machine learning technique) used for prediction of the onset of motor tasks. The trained statistical model may have an input for each of multiple biological structures and the information identifying which neuromuscular source signal is associated with which biological structure can be used to determine which inputs of the trained statistical model should receive which neuromuscular source signals. This is described in more detail herein including with reference to FIG. 24F.

System 24200 also includes datastore 24214 in communication with processor(s) 24212. Datastore 24214 may include one or more storage devices configured to store information that may be used by processor(s) to identify biological structures associated with the neuromuscular source signals. For example, in some embodiments, datastore 24214 may store one or more trained statistical models that may be used to identify biological structures associated with the neuromuscular source signals as described herein, including with reference to FIG. 24C. As another example, in some embodiments, datastore 24214 may store templates (obtained from one or more reference sets of neuromuscular signals), which templates may be used to identify biological structures associated with the neuromuscular source signals as described herein, including with reference to FIG. 24D.

Additionally, in some embodiments, datastore 24214 may store one or more statistical models used for prediction of the onset of motor tasks in accordance with some embodiments. It should be appreciated that statistical models used for prediction of the onset of motor tasks are different from the statistical models used for identifying biological structures associated with neuromuscular source signals.

System 24200 also includes one or more devices 24216 configured to be controlled based, at least in part, on processing by processor(s) 24212. As discussed herein below, processor(s) 24212 may implement a trained statistical model 24214 configured to predict the onset of a motor task based, at least in part, on neuromuscular source signals generated from neuromuscular signals recorded by sensors 24210 (e.g., EMG sensors, MMG sensors, and SMG sensors), and one or more control signals determined based on the predicted onset of the motor task may be sent to device 24216 to control one or more operations of the device with a latency shorter than would be achieved if the control signal was not sent until motor task completion. In some embodiments, device 24216 may be controlled with a latency of a duration that is not perceptible, difficult to perceive, or unlikely to be perceived by humans, or with a latency of a duration that is imperceptible to a person with ordinary sensory perception.

Devices 24216 may include any device configured to receive control signals through a control interface. Non-limiting examples of devices include consumer electronics devices (e.g., television, smartphone, computer, laptop, telephone, video camera, photo camera, video game system, appliance, etc.), vehicles (e.g., car, marine vessel, manned aircraft, unmanned aircraft, farm machinery, etc.), robots, weapons, or any other device that may receive control signals through one or more control interfaces.

A device 24216 may be controlled through any suitable type of control interface. A control interface may be implemented using hardware, software, or any suitable combination thereof. For example, a device 24216 may be a video game system which may be controlled through a game controller. As another example, a device 24216 may be a computing device, which may be controlled through a keyboard, keypad, and/or a mouse. As another example, a device may be a computing device, which may be touch controlled through a graphical user interface generated by a touch-screen display. As another example, a device may be a vehicle (e.g., a car, an aircraft, a marine vessel, an unmanned aerial vehicle, etc.), which may be controlled through one or more mechanical control devices (e.g., pedals, wheel, joystick, paddles, levers, knobs, etc.).

In some embodiments, system 24200 may be trained to predict the onset of one or more motor actions performed by the user. The motor actions may include control actions a user takes with respect to a control interface of a device of devices 24216. For example, when the control interface of a device includes one or more buttons, the system 24200 may be trained to predict whether a user will press one or more of the buttons within a threshold amount of time. In some embodiments, the system 24200 may be trained by recording the neuromuscular signals of one or more users as the user(s) provide input through a control interface of a device and training a statistical model with source signals obtaining by performing source separation on the recorded neuromuscular source signals. After such training, the system 24200 may be configured to predict, based on a particular user's neuromuscular source signals derived therefrom, whether the user will perform one or more control actions with respect to the control interface.

In some embodiments, after system 24200 is trained to predict, based on a particular user's neuromuscular source signals, whether the user will perform one or more control actions with respect to the control interface of a device, a user may utilize the system 24200 to control the device without the control interface. For example, when the system 24200 is trained to predict the control actions that the user intends to take with high accuracy (e.g., at least a threshold accuracy), the predictions themselves may be used to control the device.

In some embodiments, a user may utilize a combination of the system 24200 and the control interface to control a device. For example, when the system 24200 generates a prediction of the control action that the user will take with respect to the control interface and the prediction is generated with at least a threshold amount of confidence and/or within a threshold amount of time of when the predicted action is to take place, the prediction may be used to generate a control signal and the system 24200 may control the device. On the other hand, if the prediction is generated with lower than a threshold confidence or is generated too far in advance, the system 24200 may be configured to not use such a prediction to control the device. In that case, the user may control the device directly through the control interface.

It should be appreciated that system 24200 is not limited to using neuromuscular source signals (and associated labels indicating biological structures) for predicting onset of a motor task. For example, in some embodiments, the neuromuscular source signals may be used for providing a dynamically-updated computerized musculo-skeletal representation comprising a plurality of rigid body segments connected by joints. The neuromuscular source signals may be used (in conjunction with a trained statistical model) to determine musculo-skeletal position information describing a spatial relation (e.g., one or more angles) between two or more connected segments of the rigid body segments in the musculo-skeletal representation, which information, in turn, may be used to update the musculo-skeletal representation. Such techniques for providing a dynamically-updated computerized musculo-skeletal representation may be used to control a visual representation of a character in a virtual reality environment (e.g., when the character is interacting with an object), to control a physical device, and/or various other applications. Techniques for providing a dynamically-updated computerized musculo-skeletal representation using neuromuscular signals is described in U.S. patent application Ser. No. 15/659,072, titled, "METHODS AND APPARATUS FOR PREDICTING MUSCULO-SKELETAL POSITION INFORMATION USING WEARABLE AUTONOMOUS SENSORS", filed on Jul. 25, 2017, which is incorporated by reference in its entirety herein.

In some embodiments, neuromuscular source signals (rather than raw neuromuscular signals themselves) may be used as part of any of the systems described in U.S. patent application Ser. No. 15/659,018, titled "METHODS AND APPARATUS FOR INFERRING USING INTENT BASED ON NEUROMUSCULAR SIGNALS," and filed Jul. 25, 2017, which is incorporated by reference in its entirety herein and/or any systems described in U.S. patent application Ser. No. 15/659,487, titled "ADAPTIVE SYSTEM FOR DERIVING CONTROL SIGNALS FROM MEASUREMENTS OF NEUROMUSCULAR ACTIVITY," and filed on Jul. 25, 2017, which is incorporated by reference in its entirety herein.

As discussed herein, some embodiments are directed to identifying biological structures associated with neuromuscular source signals using a trained statistical model. Neuromuscular source signals, obtained by applying a source separation technique to recorded neuromuscular signals, may be provided as inputs to the trained statistical model, and the model may produce output indicative of which biological structures are associated with which neuromuscular source signals. FIG. 24C is a flowchart of an illustrative process 24300 for separating recorded neuromuscular signals into neuromuscular source signals and identifying biological structures associated with the neuromuscular source signals, in accordance with some embodiments of the technology described herein.

Process 24300 may be executed by any suitable computing device(s), as aspects of the technology described herein are not limited in this respect. For example, process 24300 may be executed by processors 24212 described with reference to FIG. 24B. As another example, one or more acts of process 24300 may be executed using one or more servers (e.g., servers part of a cloud computing environment).

Process 24300 begins at act 24302, where neuromuscular signals are obtained for a user. In some embodiments, the neuromuscular signals may be recorded by neuromuscular sensors positioned on the surface of a user's body as part of process 24300. In other embodiments, the neuromuscular signals may have been recorded prior to the performance of process 24300 and are accessed (rather than recorded) at act 24302.

In some embodiments, the neuromuscular signals may include EMG, MMG, and/or SMG signals recorded for a single user performing one or multiple motor tasks. The user may be instructed to perform a motor task (e.g., pressing one of two buttons) and neuromuscular signals corresponding to the user's neuromuscular activity may be recorded as the user performs the motor task he/she was instructed to perform. The neuromuscular signals may be recorded by any suitable number of neuromuscular sensors located in any suitable location(s) to detect the user's neuromuscular activity that is relevant to the motor task. For example, after a user is instructed to perform a motor task with the fingers of his/her right hand, the neuromuscular signals may be recorded by multiple neuromuscular (e.g., EMG) sensors circumferentially (or otherwise) arranged around the user's lower right arm. As another example, after a user is instructed to perform a motor task with his/her leg (e.g., to push one of two pedals, for example, either a gas or brake pedal in a car), the neuromuscular signals may be recorded by multiple neuromuscular sensors circumferentially (or otherwise) arranged around the user's leg.

In some embodiments, the neuromuscular signals may be recorded at multiple time points as a user performs a motor task. As a result, the recorded neuromuscular signals may include neuromuscular data obtained by multiple neuromuscular sensors at each of multiple time points. Assuming that n neuromuscular sensors are arranged to simultaneously measure the user's neuromuscular activity during performance of the motor task, the recorded neuromuscular signals for the user may comprise a time series of K n-dimensional vectors $\{xk|1 \leq k \leq K\}$ at time points t1, t2, . . . , tK.

Next, process 24300 proceeds to act 24303, where the neuromuscular signals are preprocessed. In some embodiments, the neuromuscular signals obtained at act 24302 may be pre-processed using amplification, filtering, rectification, and/or any other suitable type of signal processing technique. In some embodiments, the filtering may comprise temporal filtering implemented using convolution operations and/or equivalent operations in the frequency domain (e.g., after the application of a discrete Fourier transform). As indicated by the dashed lines in FIG. 24C, act 24303 is optional and may be omitted, in some embodiments.

Next, process 24300 proceeds to act 24304 where a source separation technique is applied to the neuromuscular signals obtained at act 24302 to obtain neuromuscular source signals and corresponding mixing information. The source separation technique applied at act 24304 may be a blind source separation technique. In some embodiments, independent component analysis (ICA) may be applied to the neuromuscular signals obtained at act 24302 to obtain neuromuscular source signals and corresponding mixing information. Independent component analysis may be implemented using any of numerous techniques including, but not limited to, projection pursuit, maximum likelihood estimation, and information maximization.

As another example, in some embodiments, non-negative matrix factorization (NNMF) may be applied to the neuromuscular signals obtained at act 24302 to obtain neuromuscular source signals and corresponding mixing information. In some embodiments, the non-negative matrix factorization may be implemented using any of numerous approximate techniques such as, for example, the multiplicative update rule method, alternative non-negative least squares, regularized least squares, gradient descent methods, the active set method, the optimal gradient method, the block principal pivoting method, and/or any other suitable technique. In some embodiments, non-negative matrix factorization may be implemented using an algorithm that's provably exact (rather than approximate) provided certain constraints are met by the matrix encoding the neuromuscular signals obtained at act 24302 and, optionally, pre-processed at act 24303.

It should be appreciated that while, in some embodiments, ICA, NNMF or variants thereof may be used to perform source separation, different source separation and/or deconvolution techniques may be applied in other embodiments, as aspects of the technology described herein are not limited in this respect. For example, principal component analysis (PCA), stationary subspace analysis, or singular value decomposition may be used in other embodiments. As another example, beamforming, convolutive kernel compensation, common spatial pattern (CSM) method, stationary subspace analysis, and/or dependent component analysis may be used in some embodiments. It should also be appreciated that the source separation technique applied at act 24302 is not limited to being a blind source separation technique. For example, informative priors or other information may be used in some embodiments.

As described herein, a source separation technique may be applied to the obtained and, optionally, pre-processed neuromuscular signals (mixed neuromuscular signals) to obtain neuromuscular source signals (unmixed neuromuscular signals) and corresponding mixing information. In some embodiments, the mixing information may indicate how to combine the neuromuscular source signals to obtain the mixed neuromuscular source signals or an approximation to the mixed neuromuscular source signals. In some embodiments, the mixing information may specify a mixing transformation that, when applied to the neuromuscular source signals, generates the mixed neuromuscular signals or an approximation thereto. In some embodiments, the transformation may be embodied in a matrix, which may be referred to as a mixing matrix.

For example, in some embodiments, m mixed neuromuscular signals each having n measurements may be organized in an m×n matrix A. Such signals may be obtained by each of m neuromuscular sensors recording a time series of n measurements. Applying a source separation technique to the data in matrix A, to unmix the data into k sources, may generate an m×k matrix B and a k×n matrix C. In this example, the matrix C includes the k neuromuscular source signals, each of which consists of n measurements. The neuromuscular source signals are rows of the matrix C. In this example, the matrix B is the mixing matrix indicating how to combine the source signals to obtain the mixed neuromuscular signals or an approximation thereto. A row i ($1 \leq i \leq m$) of the matrix B indicates the relative contributions (sometimes called "weights" or "loadings") of each of the k neuromuscular source signals toward the unmixed neuromuscular source signal recorded by the ith neuromuscular sensor. The loadings capture the degree of influence that a particular source signal (which is generated through action of a particular muscle, muscle group, etc.) has on the signal recorded by a particular neuromuscular sensor.

In some embodiments, the mixing information may indicate how to separate the mixed neuromuscular signals to obtain the unmixed neuromuscular source signals. In some embodiments, the mixing information may specify an unmixing transformation that, when applied to the mixed neuromuscular signals, generates the unmixed neuromuscular source signals or an approximation thereto. In some embodiments, the transformation may be embodied in a matrix, which may be referred to as an unmixing matrix.

As described herein, a source separation technique may be applied to N neuromuscular source signals to obtain k neuromuscular source signals. In some embodiments, the number of sources k may be determined in advance prior to performing process 24300. The number of sources may be determined in any suitable way. For example, the number of sources may be selected such that applying the mixing transformation to that number of sources generates a good approximation (e.g., via an autoencoder, via a generative statistical model for each value of k) of the mixed neuromuscular signals recorded by the neuromuscular sensors in a training set. As another example, the number of sources may be determined by considering where the neuromuscular sensor(s) are to be placed and determining, from the anatomy and the placement, how many muscles would be accessible to the sensors. The number of sources may be set based on (e.g., equal to, to be less than) the number of accessible muscles. As another example, the number of sources may be selected as the number that results in a fitted model with the highest likelihood of held out validation data. As yet another example, the number of source may be selected as large as possible (e.g., all of the independent components from ICA), but then discarding sources that do not meet one or more quality control metrics (e.g., expected temporal autocorrelation, spatial distribution of weights on electrodes conforms to expectations given sensor positioning, etc.).

Next, process 24300 proceeds to act 24306, where one or more features are obtained from: (1) the mixed neuromuscular signals obtained at act 24302 and, optionally, processed at act 24303; (2) the neuromuscular source signals obtained at act 24304; and/or (3) the mixing information obtained at act 24304. The features obtained at act 24306 are then applied as inputs to a trained statistical classifier at act 24308. The output of the trained statistical classifier is obtained at act 24310 and used to associate one or more biological structures (examples of which are provided herein) with the neuromuscular source signals.

Any suitable features may be obtained at act 24306. For example, in some embodiments, the features obtained at act 24306 may include at least some information specifying the mixing transformation (e.g., the mixing matrix) and/or the unmixing transformation (e.g., the unmixing matrix). As one specific example, the features obtained at act 24306 may include an unmixing matrix. As another example, the features obtained at act 24306 may include at least a subset (e.g., all) of the mixed neuromuscular signals and/or statistics derived therefrom. As yet another example, the features obtained at act 24306 may include at least a subset (e.g., all) of the unmixed neuromuscular source signals and/or statistics derived therefrom. In some embodiments, the features obtained at act 24306 may include any combination of the foregoing features. For example, in some embodiments, the features obtained at act 24306 may include the unmixing matrix, statistics computed from the mixed neuromuscular signals (e.g., correlations between raw signals, correlations between smoothed and/or rectified signals, etc.), and statistics computed from the unmixed neuromuscular source signals (e.g., correlations between raw signals, correlations between smoothed and/or rectified signals, etc.).

The features obtained at act 24306 are provided as inputs to a trained statistical classifier at act 24308. In some embodiments, the trained statistical classifier may be a neural network. The neural network may be a multi-layer neural network, a feedforward neural network, a convolutional neural network, or a recurrent neural network (e.g., a long short-term memory neural network, a fully recurrent neural network, a recursive neural network, a Hopfield neural network, an associative memory neural network, an Elman neural network, a Jordan neural network, an echo state neural network, a second order recurrent neural network, and/or any other suitable type of recurrent neural network).

In some embodiments, where the trained statistical model is a neural network, the output layer of the neural network may be configured to output a matrix of numbers Oij, with the entry (i,j) in the matrix indicating a likelihood or probability that the jth neuromuscular source signal is to be associated with biological structure i. In such embodiments, each entry in the matrix Oij may be computed by a corresponding output node in the output layer of the neural network. As a result, the output nodes may be grouped into rows and columns based on which entries in the output matrix they produce.

In some embodiments, the rows of the output matrix are normalized to 1 and represent probabilities. In such embodiments, the neural network may include a softmax transformation along rows of output nodes. In other embodiments, the columns of the output matrix may be normalized to 1 and represent probabilities. In such embodiments, the neural network may include a softmax transformation along columns of output nodes.

It should be appreciated, however, that the trained statistical classifier is not limited to being a neural network and may be any other suitable trained statistical classifier configured to generate, for each neuromuscular source signal, a plurality of likelihoods or probabilities that the neuromuscular source signal is to be associated with a respective plurality of biological structures. For example, in some embodiments, the trained statistical classifier may be a graphical model, a Gaussian mixture model, a support vector machine, a regression-based classifier, a decision tree classifier and/or any other suitable classifier, as aspects of the technology described herein are not limited in this respect.

Regardless of the type of trained statistical classifier employed at act 24308, the output of the trained statistical classifier may be used, at act 24310, to associate each of the neuromuscular source signals with a corresponding biological structure or structures. In some embodiments, the probabilities output by the trained statistical classifier may be used to assign or label each neuromuscular source signal with a corresponding biological structure. For example, biological structures may be assigned to the neuromuscular source signals in a way that maximizes the product of the estimated probabilities that the assignment (ordering) is correct. If the number of source signals is too large to check all possibilities, an approximate (e.g., greedy) algorithm may be used to assign biological structures to source signals.

The statistical classifier used in process 24300 as part of act 24308 may be trained prior to the execution of process 24300 using training data. The training data may be obtained by: (1) obtaining a large number of neuromuscular signals (e.g., making recordings, rescaling existing recordings, permuting recordings made by a set of electrodes, for example, by rotating the electrodes, etc.); (2) applying a source separation technique to the neuromuscular signals (e.g., the source separation technique described with reference to act 24304) to obtain neuromuscular source signals and corresponding mixing information; (3) extracting input features use for training the statistical classifier (e.g., extracting the same features as described with reference to act 24306); and (4) determining for each of the neuromuscular source signals an associated biological structure. This last step of labeling neuromuscular source signals with corresponding biological structures may be performed by hand, using a biophysical model of the human anatomy, using any of the template matching techniques described herein with reference to FIG.

24D, or in any other suitable way. The features and labels so obtained may be used to train the statistical classifier. In the case of a neural network, the features and labels may be used to estimate the weights of the neural network (e.g., using gradient descent, backpropagation, etc.).

It should be appreciated that process 24300 is illustrative and that there are variations. For example, in some embodiments, one or more features not derived from neuromuscular signals obtained at act 24302 may be used to identify the biological structure(s) associated with the source signals. For example, in some embodiments, information about the design of the experiment during which the neuromuscular source signals are obtained may be used. For example, one or more features indicating which biological structures are likely to be most active during the experiment may be used as inputs (or parameters) to the trained statistical classifier.

As another example, in some embodiments, output of the trained statistical classifier not only may indicate a biological structure to associated with a neuromuscular source signal, but also may provide information about the biological structure. For example, when the biological structure includes a motor unit, the information may include information about features associated with the motor unit (e.g., frequency, count, or other time-series features corresponding to the motor unit). As another example, information about a muscle's time-dependent activity may be obtained. As yet another example, information indicating the number of distinct observable motor units in a muscle may be obtained.

It should be appreciated that the number k of neuromuscular source signals in the case of illustrative process 24300 may change over time, in some embodiments. For example, as a greater number of neuromuscular signals is gathered, the techniques described herein may be able to detect the presence of more biological structures with higher accuracy. In such instances, the number of neuromuscular source signals may be increased. Conversely, the number of neuromuscular source signals may decrease if the neuromuscular signals gathered become unreliable or otherwise corrupted (e.g., when a sensor becomes damaged). Such functionality may be implemented in any suitable way. In some embodiments, for example, multiple trained statistical classifiers (e.g., with each one configured to receive features generated from a respective number k of neuromuscular source signals) may be maintained and output from only the trained classifier corresponding to the "current" value of k may be used.

FIG. 24D is a flowchart of an illustrative process 24350 for separating recorded neuromuscular signals into neuromuscular source signals and identifying biological structures associated with the neuromuscular source signals, in accordance with some embodiments of the technology described herein.

Process 24350 may be executed by any suitable computing device(s), as aspects of the technology described herein are not limited in this respect. For example, process 24350 may be executed by processors 24212 described with reference to FIG. 24B. As another example, one or more acts of process 24350 may be executed using one or more servers (e.g., servers part of a cloud computing environment).

Process 24350 begins at acts 24352 and 24353 where neuromuscular signals are obtained and processed. Acts 24352 and 24353 may be performed in any suitable way including in any of the ways described herein with reference to acts 24302 and 24303 of process 24300.

Next, process 24350 proceeds to act 24354, where a source separation technique is applied to neuromuscular signals obtained at act 24352 (and optionally processed at act 24353) to obtain neuromuscular source signals and corresponding mixing information. Act 24354 may be performed in any suitable way including in any of the ways described herein with reference to act 24304 of process 24300.

Next, process 24350 proceeds to act 24356, where the neuromuscular source signals obtained at act 24354 are aligned to template neuromuscular source signals. The template source signals may be obtained in any suitable way and, for example, may be obtained by applying the same source separation technique as applied to source signals to a reference dataset. The template source signals may be labeled in any suitable way. In some embodiments, the template source signals may be simply numbered (e.g., 1, 2, 3, etc.) or associated with any suitable identifiers. In some embodiments, identifiers assigned to the template source signals may have anatomical significance. Such anatomically-meaningful labels may be obtained by: (1) using invasive intramuscular EMG recordings in which electrodes are inserted into identified muscles; (2) using auxiliary information (e.g., motion tracking, prior knowledge of which muscles are involved in which movements, etc.); and/or in any other suitable way.

In some embodiments, the neuromuscular source signals may be aligned to template neuromuscular source signals by using a cost function. The cost function may reflect the degree of alignment between neuromuscular source signals and template neuromuscular source signals. For example, in some embodiments, a cost function may be used to compute the distance between a first features and second features. The first features may be derived from the neuromuscular source signals obtained at act 24354, the corresponding mixing information, and/or the unmixed neuromuscular signals from which the neuromuscular source signals were obtained. The second features may be derived from the template neuromuscular source signals, the corresponding template mixing information, and/or the unmixed template neuromuscular signals from which the template neuromuscular source signals were obtained. Thus, the value of the cost function may depend on any of the above-described data. For example, in some embodiments, the cost function may depend on the raw neuromuscular signals, the unmixing matrix, and/or the unmixed source signals.

For example, in some embodiments, the aligning may be performed by using a cost function that depends on the mixing information for the neuromuscular source signals and the template mixing information for the template neuromuscular source signals. One example of such a cost function is given by:

$$C(A)=\min_i\|\mathrm{rot}(A,i)-A_t\|^2,$$

where the matrix A is an unmixing matrix obtained at act 24354, At is the unmixing matrix for the template neuromuscular signals, rot( ) is the rotation operator cycling columns of the matrix A, and || || denotes the Euclidean norm. Optimizing (e.g., minimizing) this cost function over possible rotations of the electrodes may be performed by cycling the columns of the matrix A. The minimizing (or otherwise optimizing) rotation provides an alignment between the neuromuscular source signals and the corresponding template source signals.

In some embodiments, the above cost function may additionally or alternatively include a term that relates the covariances of smoothed and rectified versions of the neuromuscular source signals and template neuromuscular source signals (e.g., ||Cov(S)−Cov(St)||2) where S denotes the set of neuromuscular source signals, St denotes the set of template neuromuscular source signals, and Cov( ) is the covariance operator. In some embodiments, the cost function could also involve a term based on activity patterns during a calibration routine. The cost function could take the form of a negative likelihood in the case of a probabilistic model.

In some embodiments, other second-order statistical quantities may be employed instead of a covariance. For example, in some embodiments, cross-correlation, time-lagged covariances, cross-spectral densities, and/or any other quantities derived from such statistical quantities may be employed.

In some embodiments, minimizing the cost function may be computationally expensive since the number of possible alignments increases exponentially with the number of source signals to align. In such instances, approximate techniques for minimizing the cost function may be utilized including, for example, stochastic minimization methods such as Gibbs sampling or simulated annealing.

Next, process 24350 proceeds to act 24358, where each of one or of the neuromuscular source signals is associated with a corresponding set of one or more biological structures based on results of the alignment. For example, if a particular neuromuscular source signal were aligned to a template source signal already associated with a particular group of muscles, then the particular neuromuscular source signal would also be associated with the particular group of muscles.

In some embodiments, an association between a neuromuscular source signal and a corresponding biological structure may be associated with a confidence measure (e.g., a value indicating the confidence in the accuracy of the association). Associations of different neuromuscular signals to respective biological structures may have different confidences. For example, a first neuromuscular source signal may be associated with a first biological structure and that association may have a first confidence, a second neuromuscular source signal may be associated with a second biological structure and that association may have a second confidence, and the first and second confidences may be different from one another.

It should be appreciated that process 24400 is illustrative and that there are variations. For example, in some embodiments, one or more features not derived from neuromuscular signals obtained at act 24402 may be used to identify the biological structure(s) associated with the source signals. For example, in some embodiments, information about the design of the experiment during which the neuromuscular source signals are obtained may be used. For example, one or more features indicating which biological structures are likely to be most active during the experiment may be used to weight the scores for alignments performed at act 24358 or in any other way.

It should be appreciated that, in some embodiments, techniques other than those described with reference to FIG. 24C and FIG. 24D may be used to identify biological structures associated with source signals. As one non-limiting example, in the case when there are two source signals obtained from the recorded neuromuscular signals, the identification may be performed based on asymmetries in the corresponding mixing information.

As a simple non-limiting example, applying non-negative matrix factorization to neuromuscular signals obtained (by EMG sensors disposed circumferentially on a wristband) when a user performed wrist flexion and extension results in two neuromuscular source signals and associated mixing information that includes the loading coefficients. The loading coefficients may be used to identify one source signal with one or more flexor muscles and another source signal with one or more extensor muscles based on rotational asymmetry of the loading coefficients. In particular, one source signal has larger loading coefficients (due to higher levels of activity) than the other, and spatially the peaks of the two components were not offset 180 degrees from each other, but rather were closer together such that, if one were to go around the electrode clockwise, one would encounter a large gap, then the peak of component A, then a small gap, then the peak of component B. In such instances, the source signals may be identified by: (1) identifying the peaks of the loading coefficients for each of the two neuromuscular source signals; and (2) label the components as A and B such that going clockwise, there is a smaller gap from the peak of A to the peak of B while there is a larger gap from the peak of B to the peak of A. As another example, the components may be oriented based on the spatial peak around the electrodes and then aligned relative to the peak activity when a certain gesture is involved.

Figure 24F:
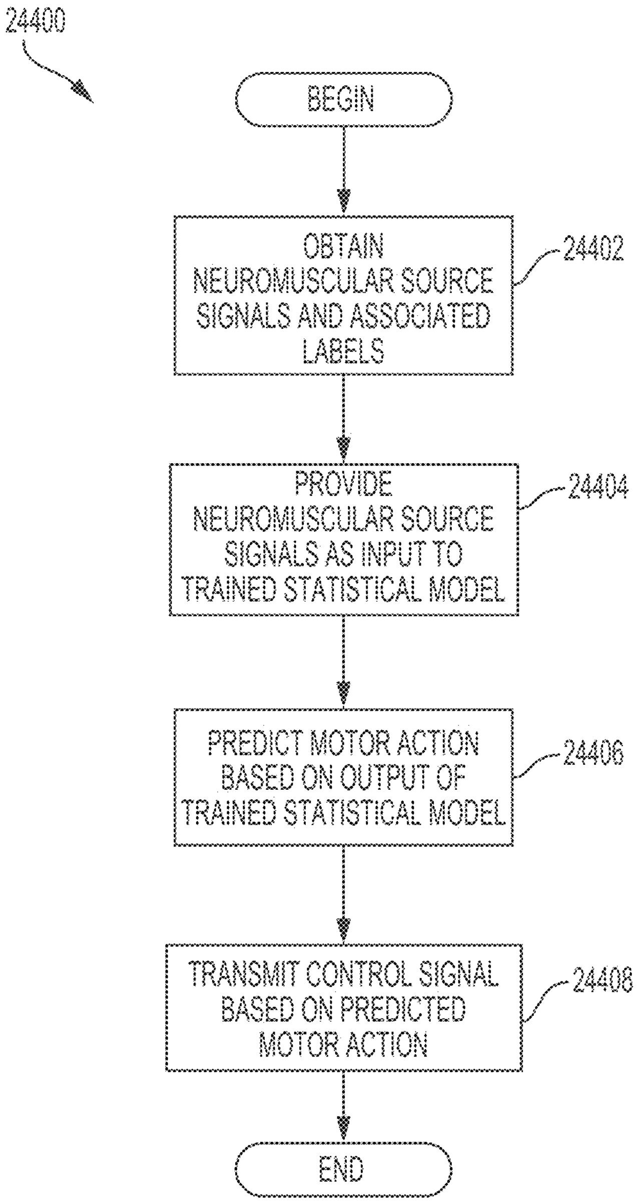
FIG. 24F is a flowchart of an illustrative process for using a trained statistical model to predict the onset of one or more motor tasks using neuromuscular source signals obtained using the process described with reference to FIG. 24C or with reference to FIG. 24D, in accordance with some embodiments of the technology described herein.
Figure 24G:
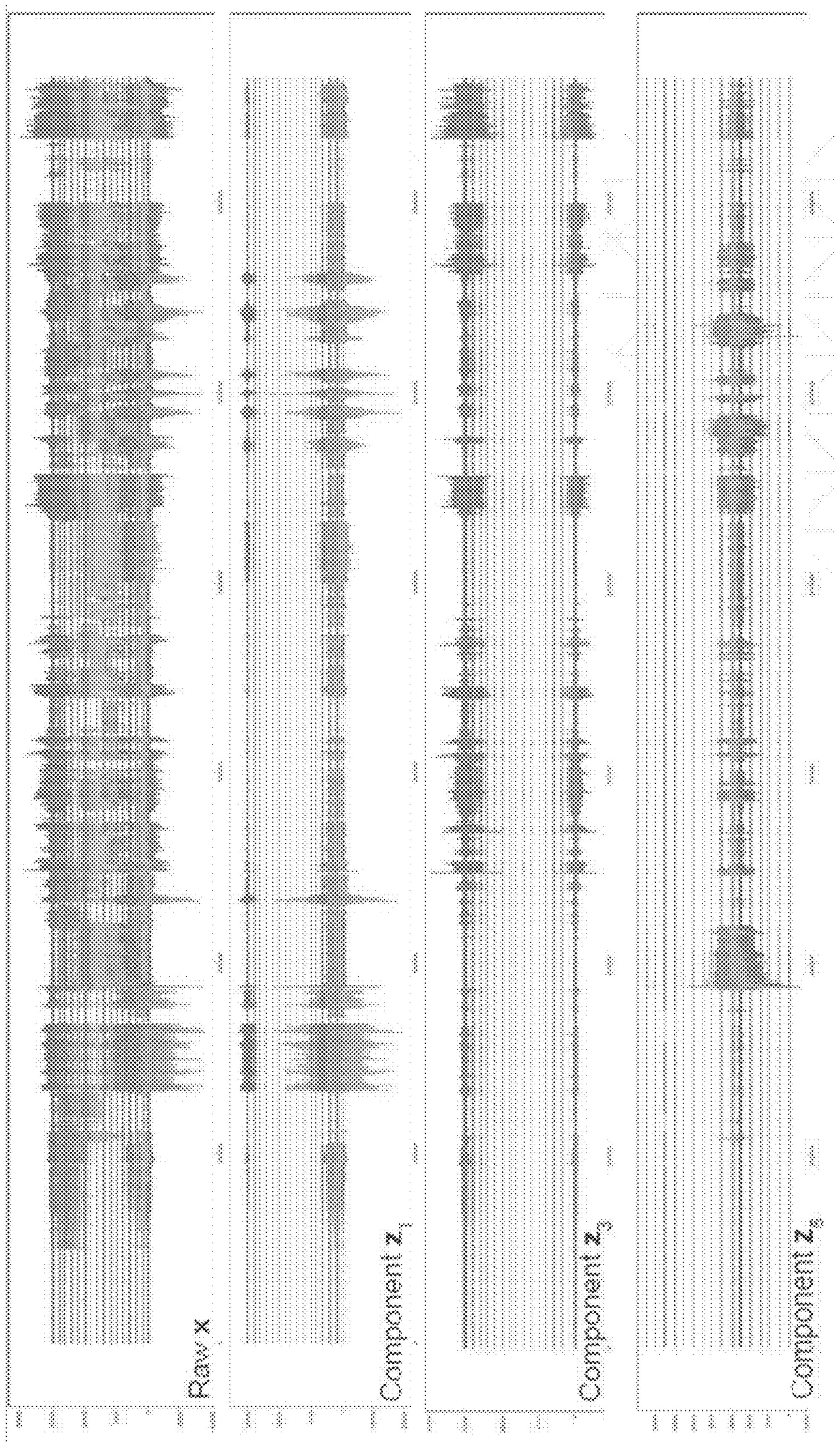
FIG. 24G illustrates neuromuscular signals recorded by multiple neuromuscular sensors and corresponding neuromuscular source signals obtained by using a source separation technique, in accordance with some embodiments of the technology described herein.

FIG. 24F is a flowchart of an illustrative process 24400 for using a trained statistical model to predict the onset of one or more motor tasks using neuromuscular source signals obtained using either of the processes described with reference to FIG. 24C and FIG. 24D, in accordance with some embodiments of the technology described herein. Process 24400 may be used to predict the onset of a motor task based on recorded neuromuscular signals with short latency. In some embodiments, recorded neuromuscular signals may be unmixed using a source separation technique (e.g., a blind source separation technique) to generate neuromuscular source signals and the source signals may be labeled as being associated with respective biological structures, as described with reference to FIGS. 24C and 24D. In turn, the neuromuscular source signals may be provided as inputs to a trained statistical model (in the appropriate order implied by the labeling—as the trained statistical model will have certain inputs that correspond to particular biological structures) that can predict the onset of a task.

As a non-limiting example, process 24400 may be used to predict, based on a plurality of neuromuscular source signals, a likelihood that a button will be pressed prior to the user actually pressing the button. In some embodiments the prediction can be made 10 milliseconds prior to the action being performed, in other embodiments the prediction can be made 50 milliseconds, 100 milliseconds, 200 milliseconds, or 250 milliseconds prior to the task being performed. The prediction may be made 50-100 milliseconds, 100-200 milliseconds, or 200-300 milliseconds prior to the task being performed in some embodiments. The prediction of a user's intention to perform a motor task in accordance with some embodiments can be used to control devices at short latency, as discussed in more detail below.

Process 24400 begins at act 24402 where neuromuscular source signals and associated labels are obtained. The labels may indicate which biological structures the source signals are associated with. The labels need not have any particular nomenclature. In some embodiments, the labels may specify a numerical ordering. For example, the first source signal may be labeled #3, the second source signal may be labeled #1, the third source signal may be labeled #2, etc. This ordering may indicate which biological structures have been associated with which source signals. For instance, in the above example, the first source signal has been identified as being generated by neuromuscular activity of biological structure #3, the second source signal has been identified as being generated by neuromuscular activity of biological structure #1, and the third source signal has been identified as being generated by neuromuscular activity of biological structure #2.

In some embodiments, the neuromuscular source signals and respective labels identifying associated biological structures may be obtained using a trained statistical classifier, as described herein including with reference to FIG. 24C. In other embodiments, the neuromuscular source signals and respective labels identifying associated biological structures may be obtained using template-based methods, as described herein including with reference to FIG. 24D.

Next, process 24400 proceeds to act 24404 where the neuromuscular source signals are provided as inputs to a trained statistical model for predicting the onset of a motor task. The trained statistical model may be of any suitable type, including of any suitable type described in U.S. patent application Ser. No. 15/659,018, titled "METHODS AND APPARATUS FOR INFERRING USING INTENT BASED ON NEUROMUSCULAR SIGNALS," and filed Jul. 25, 2017, which is incorporated by reference in its entirety herein. For example, the trained statistical model may be a long short-term memory recurrent neural network.

The trained statistical model may have a plurality of inputs, each of the inputs being for source signals generated by neuromuscular activity by a respective biological structure or information derived from such source signals. As such, the labels of the neuromuscular source signals provide an indication as to which inputs of the trained statistical model are to receive which neuromuscular source signals.

For example, a trained statistical model having two sets of inputs—one set of one or more inputs for neuromuscular source signals generated by neuromuscular activity of the flexor muscle (and/or information derived therefrom) and another set of one or more inputs for neuromuscular source signals generated by neuromuscular activity of the extensor muscle (and/or information derived therefrom). Neuromuscular signals collected by a group of (e.g., 16) EMG sensors may be processed to obtain 2 neuromuscular source signals. The first source signal may be labeled as #2, indicating that the first source signal is generated as a result of neuromuscular activity by the extensor muscle. The second source signal may be labeled as #1, indicating that the second source signal is generated as a result of neuromuscular activity by the flexor muscle. As a result, the second source signal (and/or any information derived therefrom) may be applied as inputs to the first set of inputs of the trained statistical model. The first source signal (and/or any information derived therefrom) may be applied as inputs to the second set of inputs of the trained statistical model.

After the trained statistical model receives the neuromuscular source signals as inputs, process 24400 proceeds to act 24406, where the probability of one or more motor actions occurring within a particular time threshold is output from the trained statistical model. In some embodiments, the output of the trained statistical model may be a set of probability values (e.g., 0.8, 0.15, and 0.05) indicating the respective probabilities that the user will perform a respective action within a threshold amount of time in the future. The prediction of whether and/or what motor action the user will perform within the threshold amount of time may be determined by comparing the output set of probability values with an operating threshold set for a particular task or application.

After a motor action is predicted in act 24406, process 24400 proceeds to act 24408, where a control signal is transmitted to a device based, at least in part, on the predicted motor action. Preferably the control signal is transmitted to the device as soon as possible following the prediction in act 24406 to increase the amount of time between when the control signal based on the prediction is sent to the device and the time when the control signal would have been sent had the control signal been sent in response to completion of the motor action.

Various aspects of the technology described herein may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of some embodiments of the technology described herein comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments. The computer-readable storage medium can be transportable such that the program stored thereon can be loaded onto any computer resource to implement the aspects of the technology discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the technology described herein.

An illustrative implementation of a computer system 191000 that may be used in connection with any of the embodiments of the disclosure provided herein is shown in FIG. 19K. For example, the processes described with reference to FIGS. 24C and 24D may be implemented on and/or using computer system 191000. The computer system 191000 may include one or more processors 191010 and one or more articles of manufacture that comprise non-transitory computer-readable storage media (e.g., memory 191020 and one or more non-volatile storage media 191030). The processor 191010 may control writing data to and reading data from the memory 191020 and the non-volatile storage device 191030 in any suitable manner, as the aspects of the disclosure provided herein are not limited in this respect. To perform any of the functionality described herein, the processor 191010 may execute one or more processor-executable instructions stored in one or more non-transitory computer-readable storage media (e.g., the memory 191020), which may serve as non-transitory computer-readable storage media storing processor-executable instructions for execution by the processor 191010.

The following describes exemplary shielding techniques for noise reduction in surface electromyography signal measurement and related systems and methods according to at least one embodiment of the present disclosure.

According to some aspects, a wearable device is provided comprising amplification circuitry comprising at least a first differential amplifier, at least two sEMG electrodes electrically connected to the amplification circuitry, at least one auxiliary conductor not electrically connected to the amplification circuitry, wherein the at least one auxiliary conductor is configured to be electrically coupled to a wearer of the wearable device, and an electromagnetic shield surrounding the wearable device at least in part and electrically connected to the at least one auxiliary conductor.

According to some aspects, a method of attenuating noise in a wearable device is provided, the wearable device comprising amplification circuitry, at least two sEMG electrodes electrically connected to inputs of the amplification circuitry, and an electromagnetic shield surrounding the wearable device at least in part, the method comprising electrically coupling the at least two sEMG electrodes to a wearer of the wearable device, and electrically coupling the electromagnetic shield to the wearer without electrically coupling the electromagnetic shield to the amplification circuitry except via the wearer and via air between the electromagnetic shield and the amplification circuitry.

Obtaining consistent high-quality sEMG signals using sEMG electrodes and conventional signal conditioning and processing techniques is challenging, in part due to the low voltages produced by muscle fibers. Moreover, obtaining high-quality sEMG signals from dry sEMG electrodes is generally more challenging than with wet sEMG electrodes, because wet sEMG electrodes generally have a lower impedance conductive path between the electrode and the skin via an intervening gel. With dry sEMG electrodes, however, there may be various low conductivity materials between the electrode and the skin, such as air, body hair and/or moisture, resulting in inconsistent electrode signals that may exhibit considerable noise. For applications that require near real-time analysis of sEMG signals with dry electrodes, the acquisition of consistent high-quality signals with reliable devices is important, both from a user experience perspective and from a development perspective. As referred to herein, sEMG signals are signals produced by one or more sEMG electrodes, and are typically produced by the electrodes in response to electrical signals produced by one or more muscles or groups of muscles.

The inventors have recognized and appreciated that sEMG signals are low amplitude in nature (e.g., in the range of several μV to several mV) and particularly susceptible to external noise sources, which can capacitively couple through the air to a circuit containing sEMG electrodes. For instance, external noise may couple through the air to inputs of an sEMG data acquisition system, particularly in the case of high impedance inputs. External sources of noise may include, for example, AC power lines and AC-powered devices, which may produce sources of 50 Hz or 60 Hz noise. While the capacitance of the air is comparatively small (e.g., on the order of femtofarads), the voltages of sEMG signals may be sufficiently low such that even a heavily attenuated source of external noise can produce a signal that interferes with accurate measurement of the sEMG signals.

The inventors have further recognized and appreciated that conventional approaches to shielding circuits function poorly in sEMG devices (that is, a device that includes one or more sEMG electrodes). For instance, conventional shielding techniques typically place a conductor around a circuit and directly connect the conductor to the circuit ground or some other well-defined potential. It has been observed by the inventors, however, that such an approach does not appreciably suppress signals produced within an sEMG device by external sources of noise, and in some cases may even increase the amount of noise in the sEMG signals.

Some embodiments are directed to techniques for suppressing signals produced within an sEMG device by external sources of noise by electrically coupling a shielding structure to the skin of the wearer of a wearable device that includes sEMG sensors arranged thereon. The shielding structure acts to substantially suppress signals produced within an sEMG device by external sources of noise. Such suppression of noise may occur even though the body of the wearer provides a ground that is generally not well-defined, nor necessarily at a stable potential.

Figure 25A:
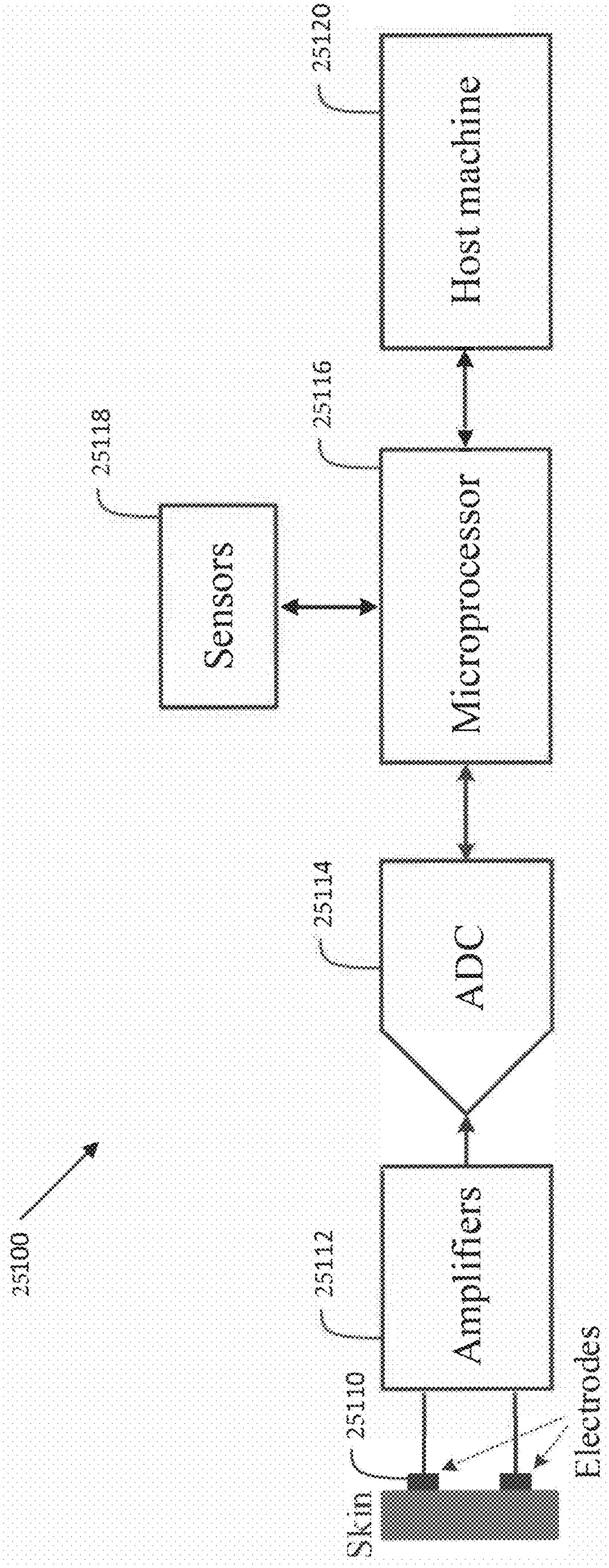
FIG. 25A is a schematic diagram of components of an sEMG system in accordance with some embodiments of the technology described herein.

FIG. 25A schematically depicts components of an illustrative sEMG system 25100, in accordance with some embodiments. System 25100 includes a pair of sEMG electrodes 25110, which may include any combination of wet and/or dry sEMG electrodes. In some embodiments, electrodes 25110 may be arranged as a portion of a wearable device configured to be worn on or around part of a user's body. For example, in one non-limiting example, a plurality of sEMG sensors including sEMG electrodes (e.g., electrodes 25110) are arranged circumferentially around an adjustable and/or elastic band such as a wristband or armband configured to be worn around a user's wrist or arm. Alternatively, at least some of the sEMG sensors may be arranged on a wearable patch configured to be affixed to a portion of the user's body.

In some embodiments, the sEMG electrodes may be minimally invasive and may include one or more conductive components placed in or through all or part of the dermis of the user. In at least some cases of the above-described arrangement, the resulting EMG signals may not, in a strict technical sense, be considered "surface" EMG signals. Nonetheless, reducing external sources of noise is also a fundamental challenge for minimally invasive EMG recordings.

Figure 25B:
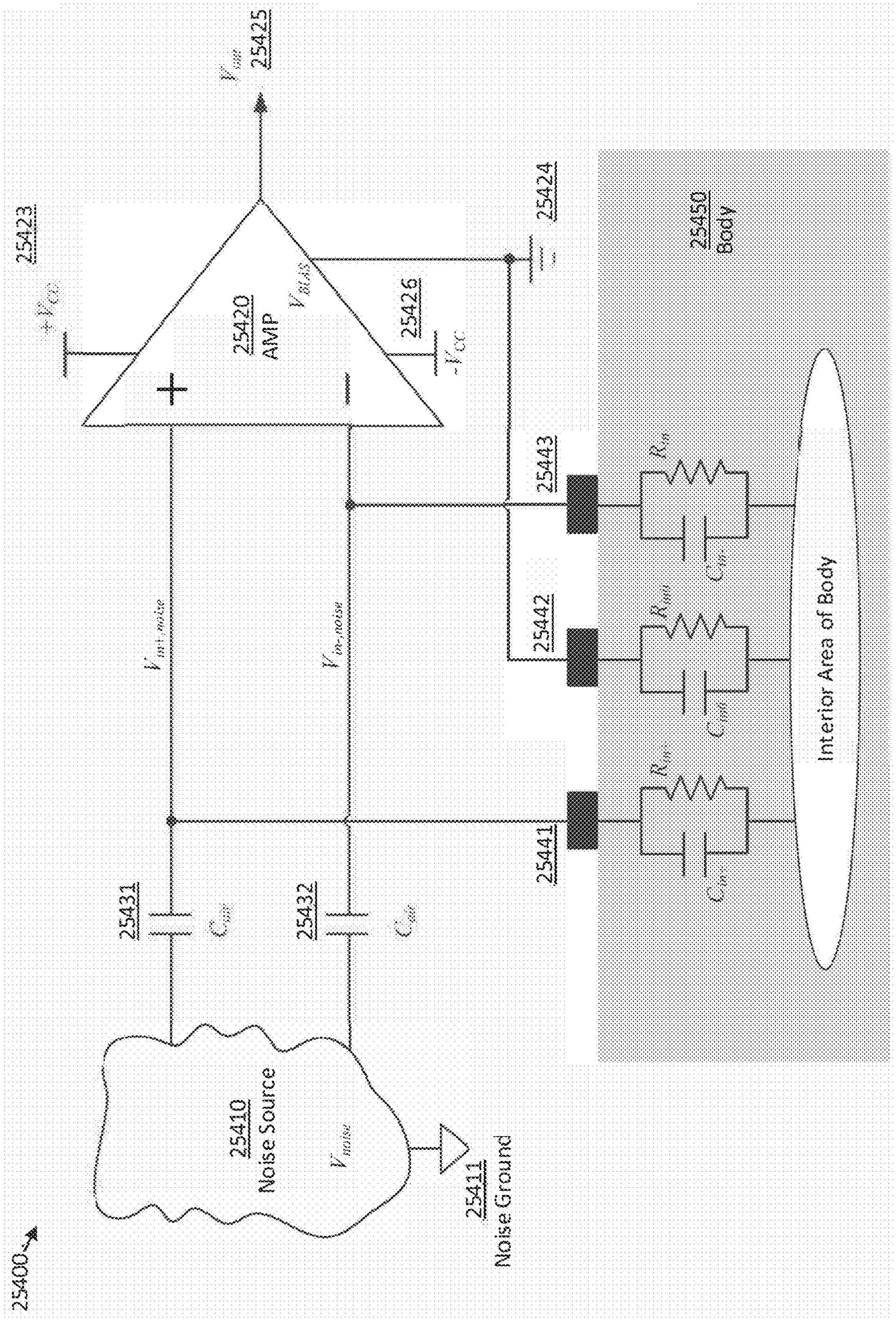
FIG. 25B depicts an illustrative amplifier of an sEMG device, according to some embodiments.
Figure 25C:
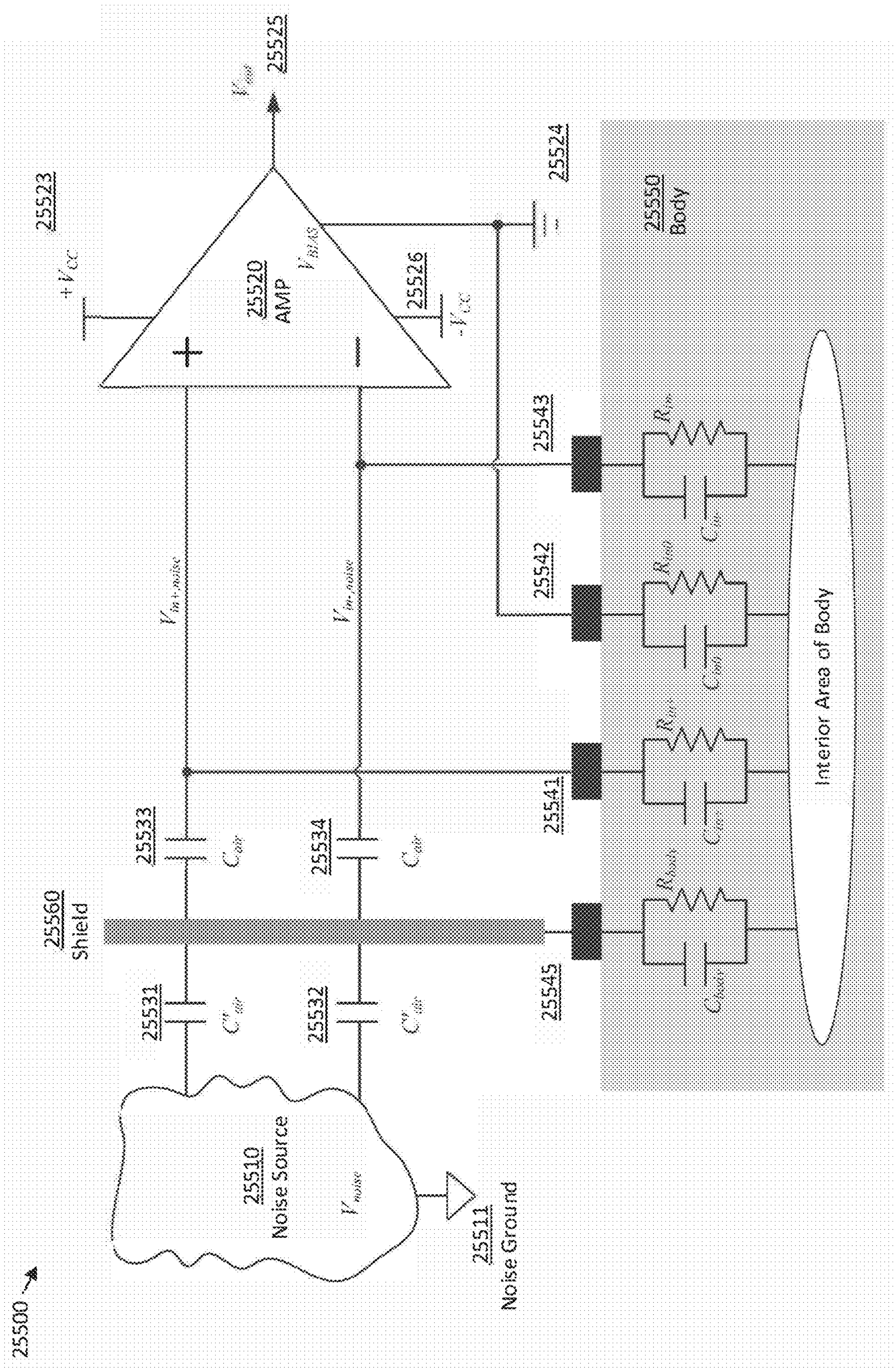
FIG. 25C depicts an illustrative amplifier of an sEMG device in which a shield mitigates interference produced by sources of external noise, according to some embodiments.

In one implementation, sixteen sEMG sensors including sEMG electrodes are arranged circumferentially around an elastic band configured to be worn around a user's lower arm. For example, FIG. 18B shows sEMG sensors 18504 arranged circumferentially around elastic band 18502. It should be appreciated that any suitable number of sEMG sensors having any suitable number of sEMG electrodes (including wet and/or dry sEMG electrodes) may be used and the number and arrangement of sensors/electrodes may depend on the particular application for which the wearable device is used. For example, as shown in FIG. 18B, some of the sEMG sensors 18504 include two sEMG electrodes, whereas others of the sEMG sensors 18504 include three sEMG electrodes, with the middle of the three electrodes being a ground electrode. The ground electrode may be included on one or more of the sEMG sensors 18504 to, for example, further bias the skin potential and/or to filter out noise. Although the schematic diagrams in FIGS. 25A, 25B and 25C illustrate only two or three electrodes being connected to an amplifier, it should be appreciated that for sEMG sensors 18504 in which three (or more) electrodes are used, a corresponding number of connections between the electrodes and the amplification circuitry would be included. In one example application of the technology described herein, FIG. 18C shows a user 18506 wearing elastic band 18502 on hand 18508. In this way, sEMG sensors 18504 may be configured to record sEMG signals as a user controls keyboard 18512 using fingers 18510.

Surface potentials recorded by sEMG electrodes are typically small and amplification of the signals recorded by the sEMG electrodes is typically desired. As shown in FIG. 25A, sEMG electrodes 25110 are coupled to amplification circuitry 25112, configured to amplify the sEMG signals recorded by the electrodes. The output of the amplification circuitry 25112 is provided to analog-to-digital converter (ADC) circuitry 25114, which converts the amplified sEMG signals to digital signals for further processing by microprocessor 25116. Microprocessor 25116 may be implemented by one or more hardware processors. The processed signals output from microprocessor 25116 may be interpreted by host machine 25120, examples of which include, but are not limited to, a desktop computer, a laptop computer, a smartwatch, a smartphone, or any other computing device. In some implementations, host machine 25120 may be configured to output one or more control signals for controlling a physical or virtual device based, at least in part, on an analysis of the signals output from microprocessor 25116.

As shown, sEMG system 25100 also includes sensors 25118, which may be configured to record types of information about a state of a user other than sEMG information. For example, sensors 25118 may include, but are not limited to, temperature sensors configured to measure skin/electrode temperature, inertial measurement unit (IMU) sensors configured to measure movement information such as rotation and acceleration, humidity sensors, heart-rate monitor sensors, and other bio-chemical sensors configured to provide information about the user and/or the user's environment.

One illustrative implementation of amplification circuitry 25112 shown in FIG. 25A is illustrated in FIG. 25B, according to some embodiments. In the example of the sEMG device 25400 shown in FIG. 25B, sEMG electrodes 25441, 25442 and 25443 (which are, for example, instances of electrodes 25110 shown in FIG. 25A, and which may include any combination of wet and/or dry sEMG electrodes) are electrically coupled to a user's body 25450. Due to the nature of contact afforded by sEMG electrodes, the coupling between each of the electrodes 25441, 25442, 25443 and the body 25450 is associated with resistances Rin+, Rin0, Rin−, respectively, and capacitances Cin+, Cin0, Cin−, respectively. The values of these resistances and capacitances may be expected to vary between the electrodes due to, for example, one or more of: variation in skin conditions (e.g., hydration levels, amounts of intervening body hair), differing amounts of physical contact between the respective electrode and skin, and/or manufacturing variations between electrodes 25441, 25442 and 25443.

In the example of FIG. 25B, signals sensed by the electrodes 25441 and 25443 are provided to inputs of the differential amplifier 25420, which is powered using a dual power supply with voltage +VCC (25423) as a positive supply and voltage −VCC (25426) as a negative supply with respect to ground (25424). An amplified signal produced by the amplifier 25420 is output at 25425. Electrode 25442 is connected to circuit ground 25424. In at least some cases, the connection of electrode 25442 to circuit ground 25424 may act to bias the body 25450; for example, the connection may stabilize the body DC potential at circuit ground.

As discussed herein, in some cases external noise sources can couple through the air to sEMG devices. For instance, in the example of FIG. 25B, the noise source 25410 may couple to the inputs of the amplifier circuit through the air, represented in FIG. 25B by the capacitors 25431 and 25432 which represent the parasitic capacitance between noise source 25410 and inputs of amplifier 25420. Unwanted noise may thereby be produced in output 25425.

For example, based on the illustrated parasitic capacitances of the air and amplifier inputs from electrodes 25441 and 25443 shown in FIG. 25B, and ignoring the resistances Rin+, Rin0, Rin− for simplicity, the voltage signals that the noise source 25410 produces as input to the amplifier 25420 may be expressed as: V in +, noise=(C air C air+C in +)×V noise (Eqn. 1) V in −, noise=(C air C air+C in −)×V noise (Eqn. 2) where Vnoise is the noise signal produced by the noise source 25410 (e.g., a 60 Hz signal produced by an AC power cable and/or AC-powered device). Note that the voltages Vin+, noise and Vin−, noise are voltage signals input to the amplifier 25420 in addition to sEMG voltage signals sensed by the electrodes 25441 and 25443 from the body 25450. Moreover, it should be appreciated that in some cases the capacitance of the air may not be identical in each of the above equations due to minor differences in distance between the noise source and the amplifier, but is treated as so for simplicity.

As Eqns. 1 and 2 illustrate, noise signal Vnoise is attenuated by the air, but since Cin+ and Cin− are generally not equal, Vin+, noise and Vin−, noise are also not equal. As a result, a differential noise input is produced at the inputs of amplifier 25420. In addition, although the capacitance of the air may be on the order of femtofarads, the capacitances Cin+ and Cin− may generally be on the order of nanofarads. As a result, the attenuation factors in Eqns. 1 and 2 may be on the order of 10-6. For many devices, such a level of attenuation of the noise signal (e.g., resulting in a noise signal of order 1 μV) results in noise far below the level of the signals within the device. However, for sEMG electrode devices the voltages recorded by the electrodes are also generally small (on the order of μV or smaller), so that even the attenuated noise signals are problematic and interfere with the sEMG signals input to the amplifier 25420. Moreover, since sEMG devices are often used in environments containing multiple electronic devices (e.g., AC mains devices, computer processors, displays, etc.) multiple sources of such noise can compound this problem.

FIG. 25C depicts an illustrative amplifier 25520 of an sEMG device 25500 in which a shield 25560 is arranged to mitigate interference caused by external noise, according to some embodiments. Shield 25560 may be referred to as an "electromagnetic shield" in that it mitigates electromagnetic interference, although it may be appreciated that, in at least some cases, the shield may not interact with both electric and magnetic fields when shielding external sources of interference.

As with the example of FIG. 25B, in device 25500 an external source of noise 25510 produces noise signals Vin+, noise and Vin−, noise at the inputs to amplifier 25520. To reduce the effect of this noise, a shield 25560 is arranged between the noise source 25510 and the amplifier 25520, and is coupled to the user's body 25550. Shield 25560 produces additional attenuation of the noise signal Vnoise, as described in more detail below. Shield 25560 may comprise any suitable conductive material or materials, including, but not limited to, one or more metals and/or alloys (e.g., aluminum, copper, and/or mu-metals), conductive paint (e.g., silver and/or carbon-based paint), conductive fabric (e.g., silver nanowire), conductive polymers (e.g., carbon or graphene filled polylactic acid (PLA)), conductive plastics, conductive rubbers, conductive silicones, or combinations thereof. Shield 25560 may also include one or more non-conductive components that may be combined with any one or more conductive components, such as the aforementioned examples.

Based on the illustrated parasitic capacitances of the air (Cair and C'air), amplifier inputs from electrodes 25541 and 25543 shown in FIG. 25C, and the capacitance Cbody representing the coupling of the shield 25560 to the user's body 25550, the voltage signals that the noise source 25510 produces as input to the amplifier 25520 may be expressed as: V in +, noise=(C air' C air'+C body)×(C air C air+C in +)×V noise (Eqn. 3) V in −, noise=(C air' C air'+C body)×(C air C air+C in −)×V noise (Eqn. 4), where once again the resistances Rbody, Rin+, Rin0, Rin− are ignored for simplicity.

The magnitude of Cbody may be expected to be on the order of nanofarads, and as such the additional attenuation factor of (C air' C air'+C body) present in Eqns. 3 and 4 compared with the single attenuation factor in Eqns. 1 and 2 leads to a greater attenuation of the noise at the inputs of the amplifier 25520 using the circuit configuration shown in the example of FIG. 25C.

It will be appreciated that the parasitic capacitances of the air 25531 and 25532 may not be identical to one another in all cases due to minor differences in environment between the noise source and the shield but is treated as so in the discussion above for simplicity. Similarly, it will be appreciated that the parasitic capacitances of the air 25533 and 25534 may not be identical to one another in all cases due to minor differences in environment between the shield and the amplifier, but is treated as so in the discussion above for simplicity.

It will be appreciated that shield 25560 may be arranged between noise source 25510 and the amplifier 25520 in numerous ways, and that shield 25560 may have any suitable geometry to enable such an arrangement. In some embodiments, shield 25560 encloses (e.g., completely surrounds) the amplifier so that the shield is arranged between the amplifier and the external noise sources. In some embodiments, shield 25560 may surround the amplifier so that the shield is arranged between the amplifier and noise sources that may be incident on the amplifier from some directions, but where the shield does not completely enclose the amplifier. It will also be appreciated that shield 25560 may completely surround or partially surround an entire sEMG system, such as sEMG system 25100 shown in FIG. 25A.

For example, in the case of the illustrative sEMG device shown in FIGS. 18B and 18C, shield 25560 may be implemented as a conductive layer that surrounds the sEMG sensors 18504 and/or 18504 without the shield being located between the sEMG sensors 18504 and/or 18504 and the wearer's skin. Such an arrangement may enable attenuation of noise by coupling the shield to the wearer's body in any of various ways, examples of which are discussed herein.

In addition, while in the example of FIG. 25C the shield 25560 is coupled to the wearer's body via sEMG electrode 25545, the shield may in general be electrically coupled to the wearer's body in any suitable way using any number of auxiliary conductors (that is, conductors other than sEMG electrodes connected to one or more amplifier inputs of the device). For instance, the shield may be electrically coupled to the wearer's body via one or more electrodes other than an sEMG electrode and/or via one or more other conductors. In some implementations, an auxiliary conductor may be part of the shield itself.

Shield 25560 may be electrically coupled to any suitable part or parts of the wearer's body. In the case of an sEMG device configured to be worn on an arm, for example, the shield may be configured to electrically couple to the same arm, including the ventral and/or dorsal sides of the arm, and/or to other parts of the body (e.g., the other arm). The presence of body hair on surface of the body is a complicating factor for achieving a good electrical contact with the body for surface-mounted electrodes. Electrically coupling the shield to the ventral side of the arm may be advantageous, as the ventral side of the arm typically has less body hair than the dorsal side resulting in a better coupling of the shield to the body. It should be appreciated that a desired or optimal placement of the electrode/conductor connected to shield 25560 on a user's body may vary from user to user depending on one or more factors including, but not limited to, density of body hair, type of wearable sEMG device, and user preference.

Although the techniques discussed herein in relation to FIG. 25A, FIG. 18B, FIG. 18C, FIG. 25B and FIG. 25C are discussed in the context of differential input amplifiers, it will be appreciated that the shielding techniques described herein can also be implemented with other types of amplifiers, such as single-ended input amplifiers, in place of the differential input amplifier in the above-described examples. As may be noted from Eqns. 3 and 4 above, the amplitude of the noise may be attenuated at each individual input of an amplifier, which may also be the case for amplifiers other than differential input amplifiers.

Figure 25D:
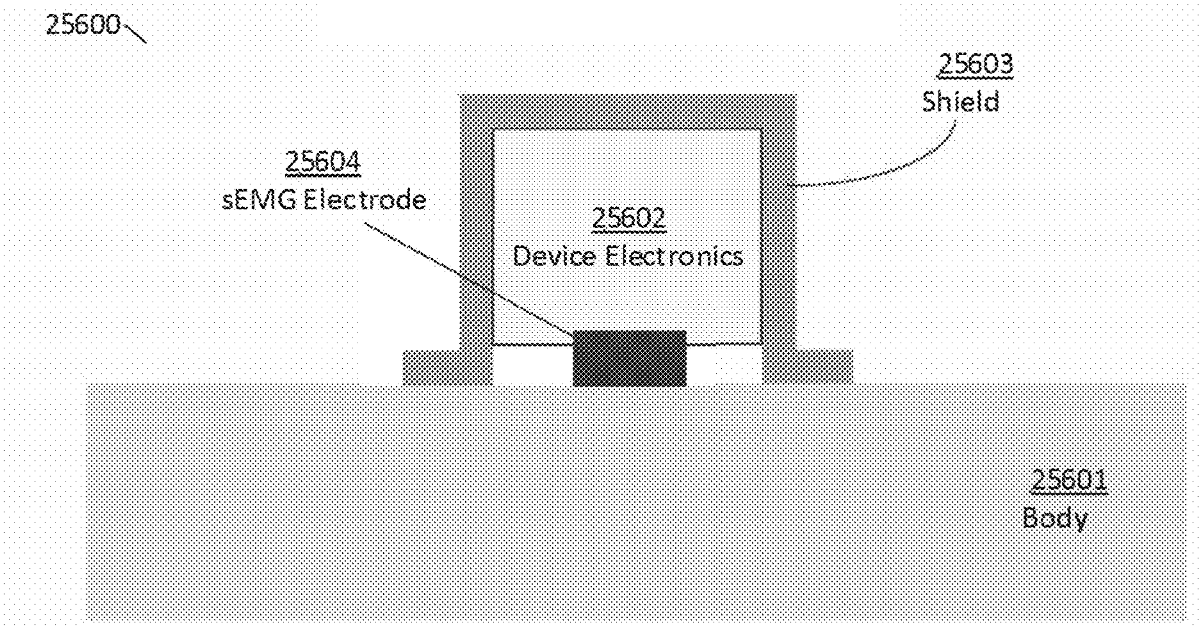
FIGS. 25D-25G depict illustrative cross-sectional views of sEMG devices that include a shield surrounding electronics of the sEMG device, according to some embodiments.
Figure 25E:
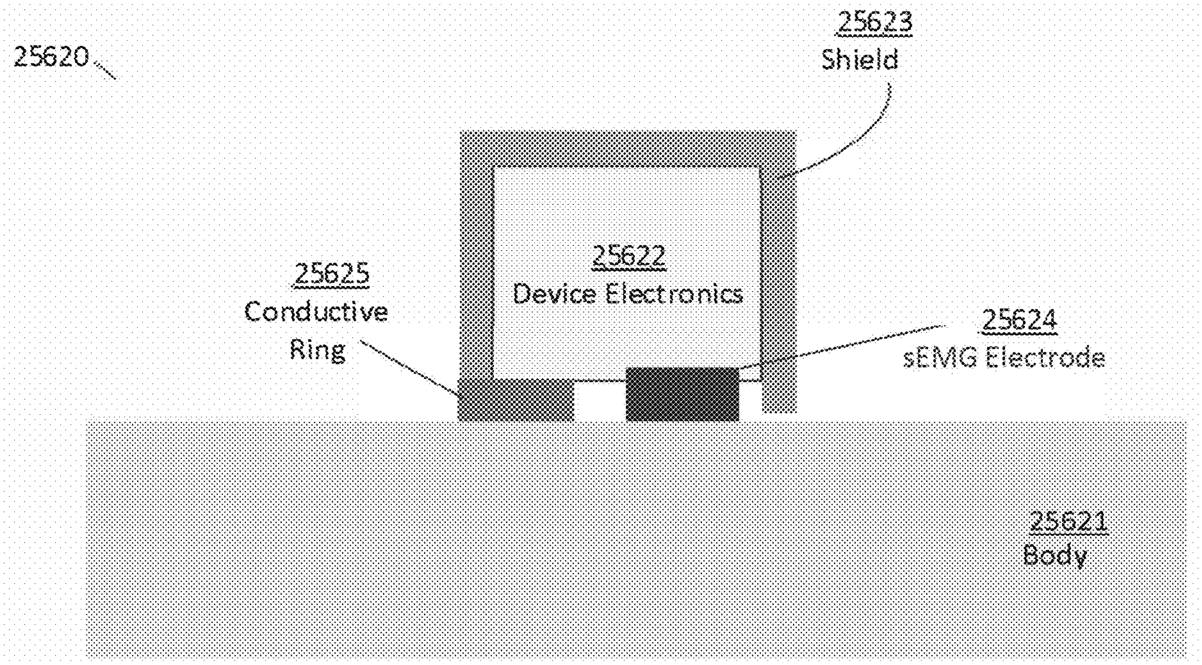
Figure 25F:
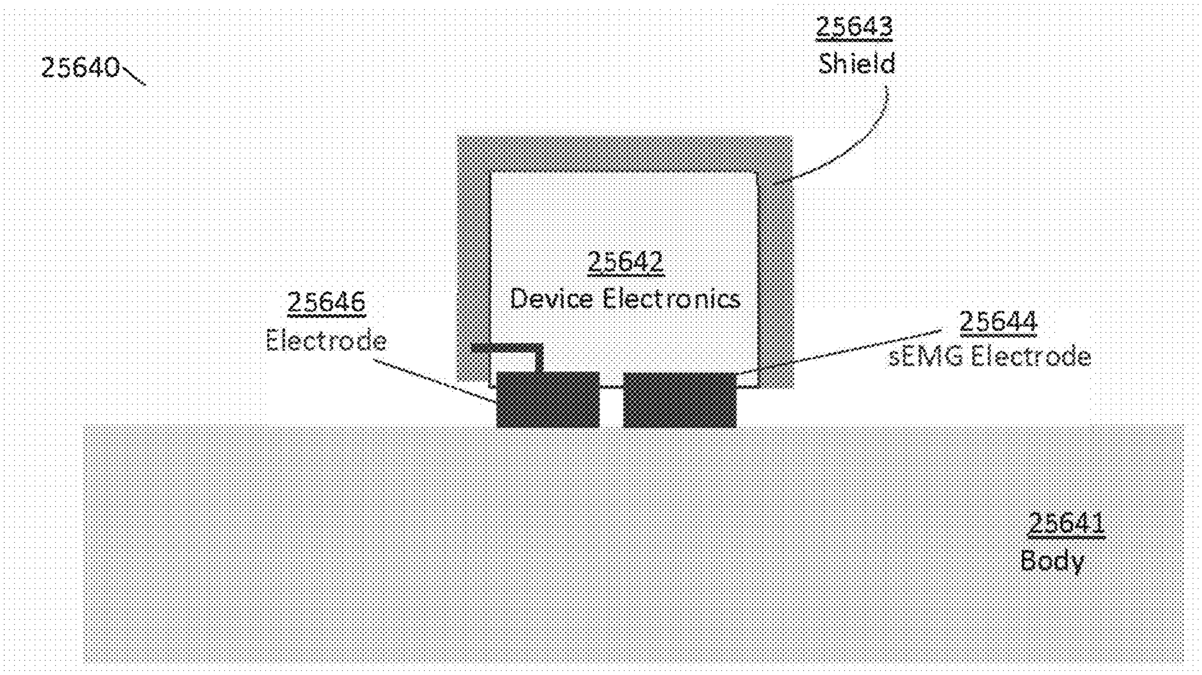

FIGS. 25D-25F depict illustrative cross-sectional views of sEMG devices that include a shield completely or partially surrounding electronics of the sEMG device (e.g., one or more amplifiers or even an entire sEMG system), according to some embodiments. In the example of FIG. 25D, sEMG device 25600 includes a shield 25603 that surrounds device electronics 25602 and an sEMG electrode 25604. Shield 25603 extends onto the wearer's body 25601 to electrically couple the shield to the body as discussed herein in relation to FIG. 25C. As a result, the shield 25603 attenuates external sources of noise (not pictured) that may couple to aspects of the device electronics 25602.

According to some embodiments, shield 25603 may include and/or may form part of the housing of sEMG device 25600. As non-limiting examples, the shield 25603 may comprise a rigid conductor that forms a housing around device electronics 25602 and contacts the body 25601; the shield 25603 may comprise a conductive material that is arranged on the exterior, interior and/or embedded within a housing around device electronics 25602 such that the conductive material contacts the body 25601 (e.g., a conductive paint applied to the housing); and/or the shield 25603 may comprise a conductive fabric which may, or may not, be attached to a housing around device electronics 25602.

In the example of FIG. 25E, sEMG device 25620 includes a shield 25623 that surrounds device electronics 25622 and an sEMG electrode 25624, and further includes a conductive ring 25625 (shown in cross section) connected to the shield that electrically couples the shield to the body as discussed herein in relation to FIG. 25C. As a result, the shield 25623 attenuates external sources of noise (not pictured) that may couple to aspects of the device electronics 25622. In some embodiments, the conductive ring may be a metal ring that extends partially, or completely, around the body 25621 of the wearer.

According to some embodiments, shield 25623 may include and/or may form part of the housing of sEMG device 25620. As non-limiting examples, the shield 25623 may comprise a rigid conductor that forms a housing around device electronics 25622 and contacts the body 25621; the shield 25623 may comprise a conductive material that is arranged on the exterior, interior and/or embedded within a housing around device electronics 25622 such that the conductive material contacts the body 25621 (e.g., a conductive paint applied to the housing); and/or the shield 25623 may comprise a conductive fabric which may, or may not, be attached to a housing around device electronics 25622.

In the example of FIG. 25F, sEMG device 25640 includes a shield 25643 that surrounds device electronics 25642 and an sEMG electrode 25644, and further includes an electrode 25646 connected to the shield that electrically couples the shield to the body as discussed herein in relation to FIG. 25C. As a result, the shield 25643 attenuates external sources of noise (not pictured) that may couple to aspects of the device electronics 25642. In some embodiments, the electrode 25646 may be an sEMG electrode.

According to some embodiments, shield 25643 may include and/or may form part of the housing of sEMG device 25640. As non-limiting examples, the shield 25643 may comprise a rigid conductor that forms a housing around device electronics 25642 and contacts the body 25641; the shield 25643 may comprise a conductive material that is arranged on the exterior, interior and/or embedded within a housing around device electronics 25642 such that the conductive material contacts the body 25641 (e.g., a conductive paint applied to the housing); and/or the shield 25643 may comprise a conductive fabric which may, or may not, be attached to a housing around device electronics 25642.

Figure 25G:
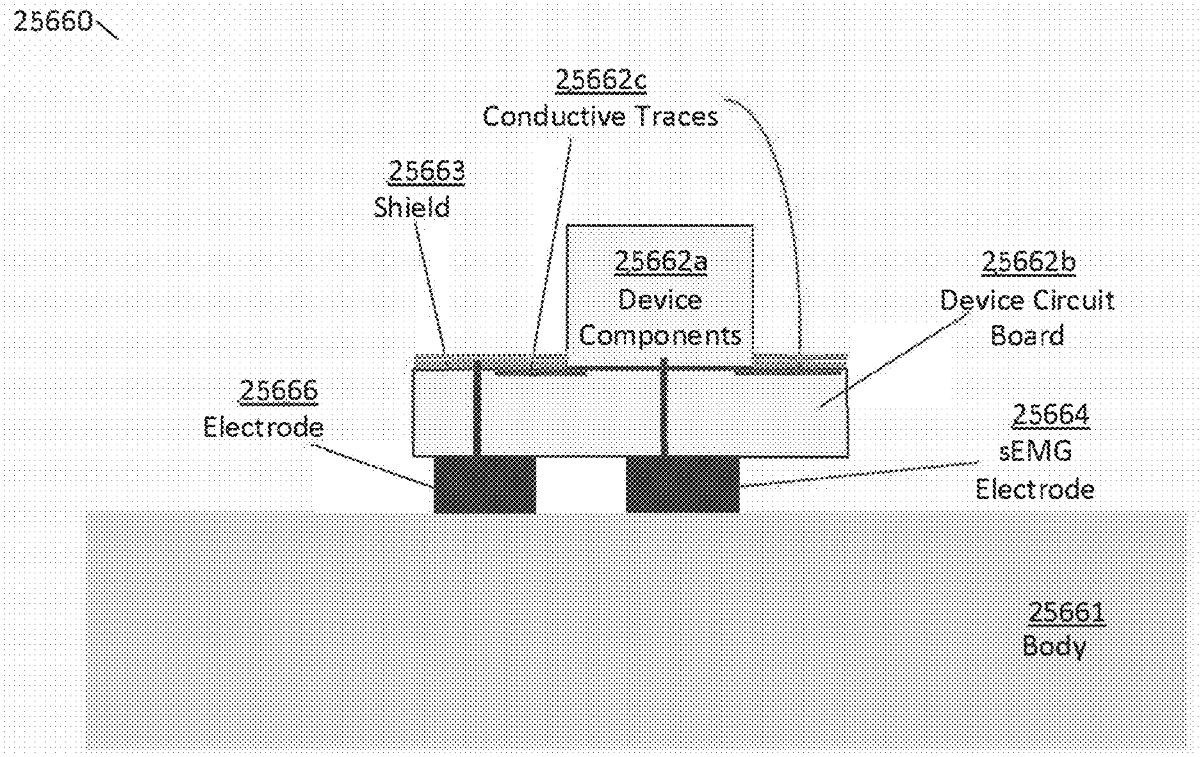

In the example of FIG. 25G, components 25662 *a* and circuit board(s) 25662 *b* of the device electronics are illustrated as separate elements, with conductive traces 25662 *c* of the circuit board 25662 *b* also being illustrated. Illustrative sEMG device 25660 includes a shield 25663 that covers the device circuit board(s) 25662 *b* and conductive traces 25662 *c* that are routed on the circuit board(s) 25662 *b*. The device 25660 also includes an sEMG electrode 25664 and an electrode 25666 connected to the shield that electrically couples the shield to the body as discussed herein in relation to FIG. 25C. As a result, the shield 25663 attenuates external sources of noise (not pictured) that may couple to the conductive traces 25662 *c*. In some embodiments, the electrode 25666 may be an sEMG electrode. As a non-limiting example, the shield 25663 may be implemented as a shielding film layer that is laminated onto the circuit board(s) 25662 *b*. In the example of FIG. 25G, therefore, the shield is arranged around part of the device electronics (i.e., the device circuit board 25662 *b*), but may not necessarily be arranged around the components 25662 *a* of the device electronics in order for the shield to attenuate external sources of noise.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

As used herein, elements referred to as being electrically coupled to one another are arranged such that changes in electrical potential in one element may cause changes in electrical potential in the other element. In this manner, the noise source 25510 in the example of FIG. 25C is electrically coupled to the amplifier 25520 and to the shield 25560. Further, as used herein elements referred to as being electrically connected to one another are arranged so that an electrical conductor directly connects the elements together. For instance, the electrode 25545 in the example of FIG. 25C may be electrically connected to the shield 25560.

The implementations of DC-coupled amplification circuitry described herein employ discrete analog circuit components. However, it should be appreciated that all or portions of the amplification circuitry and/or associated circuitry in the signal chain may alternatively be implemented using AC-coupled amplification circuitry, one or more application specific integrated circuits (ASICs), and/or any commercial or custom silicon implementation, as embodiments are not limited in this respect. Moreover, it will be appreciated that in some embodiments amplification circuitry may not be included in an sEMG device but rather analog-to-digital converters (ADCs) may directly acquire sEMG signals.

Although the above-discussed examples are discussed in the context of interfaces with EMG sensors, it is understood that the shielding techniques described herein for noise reduction could also be implemented in wearable interfaces with other types of sensors including, but not limited to, electrocardiography (ECG), electroencephalogram (EEG), mechanomyography (MMG) sensors, sonomyography (SMG) sensors, and electrical impedance tomography (EIT) sensors.

The following describes exemplary methods and apparatus for autocalibration of a wearable electrode sensor system according to at least one embodiment of the present disclosure.

Some embodiments are directed to a system for calibrating the position and/or orientation of a wearable device configured to be worn on a wrist or forearm of a user. The system comprises a plurality of sensors arranged on the wearable device, wherein the plurality of sensors are configured to continuously sense a plurality of neuromuscular signals from the user, and at least one computer processor. The at least one computer processor is programmed to provide the plurality of neuromuscular signals and/or signals derived from the plurality of neuromuscular signals as inputs to one or more trained autocalibration models, determine based, at least in part, on the output of the one or more trained autocalibration models, a current position and/or orientation of the wearable device on the user, and generate a control signal based, at least in part, on the current position and/or orientation of the wearable device on the user and the plurality of neuromuscular signals.

In one aspect, the at least one computer processor is programmed to determine the current position and/or orientation of the wearable device on the user without the user performing a particular pose or gesture during sensing of the plurality of neuromuscular signals.

In another aspect, the at least one computer processor is programmed to process the sensed plurality of neuromuscular signals prior to providing the processed neuromuscular signals to the one or more autocalibration models.

In another aspect, the at least one programmed processor is further programmed to generate calibrated neuromuscular signals based, at least in part, on the current position and/or orientation of the wearable device and the plurality of neuromuscular signals, and generating a control signal comprises generating a control signal based, at least in part, on the calibrated neuromuscular signals.

In another aspect, the at least one programmed processor is further programmed to select or modify one or more inference models based, at least in part, on the current position and/or orientation of the wearable device, and provide the plurality of neuromuscular signals as input to the selected or modified one or more inference models, and generating a control signal is further based, at least in part, on an output of the selected or modified one or more inference models.

In another aspect, the one or more autocalibration models used to determine the current position and/or orientation of the wearable device on the user include a neural network. In another aspect, the neural network is an LSTM neural network.

In another aspect, the LSTM neural network includes at least one pooling layer.

In another aspect, the at least one pooling layer comprises a max pooling layer.

In another aspect, the at least one pooling layer provides rotation invariance of ±1 sensor locations.

In another aspect, the one or more autocalibration models are trained to identify the orientation and/or location of the wearable device based on neuromuscular signals obtained from a plurality of users.

In another aspect, the neuromuscular signals obtained from a plurality of users were obtained as each of the plurality of users performed a plurality of hand gestures and/or poses while the wearable device was oriented and/or positioned in multiple different configurations on a forearm and/or wrist of the user.

In another aspect, the plurality of neuromuscular sensors comprises a plurality of electromyography (EMG) sensors.

In another aspect, the at least one computer processor is further programmed to identify that at least a portion of the wearable device has moved on the wrist or forearm of the user, and determine the current position and/or orientation of the wearable device on the user in response to identifying that at least a portion of the wearable device has moved on the wrist or forearm of the user.

In another aspect, identifying the at least a portion of the wearable device has moved on the wrist or forearm of the user comprises determining that the wearable device has rotated around and/or translated along the user's wrist or forearm.

In another aspect, identifying the at least a portion of the wearable device has moved on the wrist or forearm of the user comprises detecting one or more movement artifacts in the sensed plurality of neuromuscular signals.

In another aspect, the system further comprises at least one inertial measurement unit (IMU) sensor, and identifying the at least a portion of the wearable device has moved on the wrist or forearm of the user is based, at least in part, on at least one signal sensed by the at least one IMU sensor.

In another aspect, determining the current position and/or orientation of wearable device comprises determining a rotation of the wearable device relative to a virtual reference orientation of the wearable device.

In another aspect, the control signal is a control signal to control one or more operations of or within a virtual reality system or an augmented reality system.

Some embodiments are directed to a method for calibrating the position and/or orientation of a wearable band on a user. The method comprises sensing a plurality of neuromuscular signals from the user using a plurality of sensors arranged on the wearable device, providing the plurality of neuromuscular signals and/or signals derived from the plurality of neuromuscular signals as inputs to one or more trained autocalibration models, determining based, at least in part, on the output of the one or more trained autocalibration models, a current position and/or orientation of the wearable device on the user, and generating a control signal based, at least in part, on the current position and/or orientation of the wearable device on the user and the plurality of neuromuscular signals.

In one aspect, determining the current position and/or orientation of the wearable device comprises determining the current position and/orientation of the wearable device without the user performing a particular pose or gesture during sensing of the plurality of neuromuscular signals.

In another aspect, the method further comprises processing the sensed plurality of neuromuscular signals prior to providing the processed neuromuscular signals to the one or more autocalibration models.

In another aspect, the method further comprises generating calibrated neuromuscular signals based, at least in part, on the current position and/or orientation of the wearable device and the plurality of neuromuscular signals, and generating a control signal comprises generating a control signal based, at least in part, on the calibrated neuromuscular signals. In another aspect, the method further comprises selecting or modifying one or more inference models based, at least in part, on the current position and/or orientation of the wearable device, and providing the plurality of neuromuscular signals as input to the selected or modified one or more inference models, wherein generating a control signal is further based, at least in part, on an output of the selected or modified one or more inference models.

In another aspect, the one or more autocalibration models used to determine the current position and/or orientation of the wearable device on the user include a neural network. In another aspect, the one or more autocalibration models are trained to identify the orientation and/or location of the wearable device based on neuromuscular signals obtained from a plurality of users.

In another aspect, the neuromuscular signals obtained from a plurality of users were obtained as each of the plurality of users performed a plurality of hand gestures and/or poses while the wearable device was oriented and/or positioned in multiple different configurations on a forearm and/or wrist of the user.

In another aspect, determining the current position and/or orientation of wearable device comprises determining a rotation of the wearable device relative to a virtual reference orientation of the wearable device.

In another aspect, the method further comprises identifying that at least a portion of the wearable device has moved on the wrist or forearm of the user, and determining the current position and/or orientation of the wearable device on the user in response to identifying that at least a portion of the wearable device has moved on the wrist or forearm of the user.

In another aspect, identifying the at least a portion of the wearable device has moved on the wrist or forearm of the user comprises determining that the wearable device has rotated around and/or translated along the user's wrist or forearm.

In another aspect, identifying the at least a portion of the wearable device has moved on the wrist or forearm of the user comprises detecting one or more movement artifacts in the sensed plurality of neuromuscular signals.

In another aspect, the method further comprises identifying the at least a portion of the wearable device has moved on the wrist or forearm of the user is based, at least in part, on at least one signal sensed by at least one inertial measurement unit (IMU) sensor.

Some embodiments are directed to a method for training an inference model for autocalibration of a wearable device. The method comprises receiving neuromuscular signals sensed from a plurality of users as the wearable device was worn by each of the users while performing a plurality of hand gestures and/or poses, wherein for each of the plurality of hand gestures and/or poses, the wearable device was oriented or positioned differently on the user, labeling the received neuromuscular signals for each of the plurality of hand gestures and/or poses based on the orientation or position of the wearable device during sensing of the corresponding neuromuscular signals, and training one or more autocalibration models based, at least in part, on the labeled neuromuscular signals.

In one aspect, the method further comprises extracting from the received neuromuscular signals, a plurality of templates, where each of the plurality of templates corresponds to one of the plurality of hand gestures and/or poses, and generating calibrated neuromuscular signals based, at least on the extracted plurality of templates, and training the one or more autocalibration models comprises training the one or more autocalibration models based, at least in part, on the calibrated neuromuscular signals.

In another aspect, the method further comprises predicting a plurality of rotation offsets of the wearable device using a plurality of simulations of different orientations.

In another aspect, the one or more autocalibration models include a neural network.

In another aspect, the neural network is an LSTM neural network.

Some embodiments are directed to a non-transitory computer-readable storage medium encoded with a plurality of processor-executable instructions that, when executed by one or more computer processors perform one or more of the foregoing methods.

The disclosed methods and apparatus herein relate to autocalibration of sensor systems such that the systems perform well when the sensors are worn by users in various orientations and/or locations on a body part In some embodiments of the technology described herein, sensor signals may be used to predict information about a position and/or a movement of one or more portions of a user's body (e.g., a leg, an arm, and/or a hand), which may be represented as a multi-segment articulated rigid-body system with joints connecting the multiple segments of the rigid-body system. For example, in the case of a hand movement, signals sensed by wearable neuromuscular sensors placed at locations on the user's body (e.g., the user's arm and/or wrist) may be provided as input to one or more inference models trained to predict estimates of the position (e.g., absolute position, relative position, orientation) and the force(s) associated with a plurality of rigid segments in a computer-based musculoskeletal representation associated with a hand, for example, when the user performs one or more hand movements. The combination of position information and force information associated with segments of the musculoskeletal representation associated with a hand may be referred to herein as a "handstate" of the musculoskeletal representation. As a user performs different movements, a trained inference model may interpret neuromuscular signals sensed by the wearable neuromuscular sensors into position and force estimates (handstate information) that are used to update the musculoskeletal representation.

In certain embodiments, processed neuromuscular signals and/or neuromuscular signal patterns (e.g., EMG signals and/or EMG signal patterns) are collected from multiple users, and the processed signals and/or signal patterns are used to generate generalized models to predict the orientation and/or location of an armband containing EMG sensors. For example, spatiotemporal patterns of EMG signals can be obtained as users perform different handstate configurations with or without system supervision (e.g., gestures or poses comprising various pinches and wrist movements in the four cardinal directions) when the armband is positioned on the forearm and/or oriented in various ways, and these signals can be used to train generalized inference models to predict the user's gestures based on detected EMG signals. In certain embodiments, the systems and methods disclosed herein comprise identifying a "virtual" reference electrode and mapping the specific orientation of an armband to an offset value associated with an electrode and the "virtual" reference electrode.

As used herein, the term "gestures" may refer to a static or dynamic configuration of one or more body parts including a position of the one or more body parts and forces associated with the configuration. For example, gestures may include discrete gestures, such as placing or pressing the palm of a hand down on a solid surface, or grasping a ball, or pinching two fingers together (e.g., to form a pose); or continuous gestures, such as waving a finger back and forth, grasping and throwing a ball, rotating a wrist in a direction; or a combination of discrete and continuous gestures. Gestures may include covert gestures that may be imperceptible to another person, such as slightly tensing a joint by co-contracting opposing muscles or using sub-muscular activations, or "off-manifold" activations. In training an inference model, gestures may be defined using an application configured to prompt a user to perform the gestures or, alternatively, gestures may be arbitrarily defined by a user. The gestures performed by the user may include symbolic gestures (e.g., gestures mapped to other gestures, interactions, or commands, for example, based on a gesture vocabulary that specifies the mapping). In some cases, hand and arm gestures may be symbolic and used to communicate according to cultural standards.

Following autocalibration of the system(s), in various embodiments, a number of muscular activation states of a user may be identified from the recorded and/or detected signals and/or information based on the signals, to enable improved selection and/or control of objects in the user's environment when those objects are configured to receive control signals. The control of the objects can be performed directly from a neuromuscular activity device or indirectly via another system such as an augmented reality (AR) system or any extended or cross reality system (XR system or environment), including but not limited to mixed reality (MR), virtual reality (VR), etc.

The description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently disclosed subject matter. Reference in the specification to "one case", "some cases", "other cases", or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 26A:
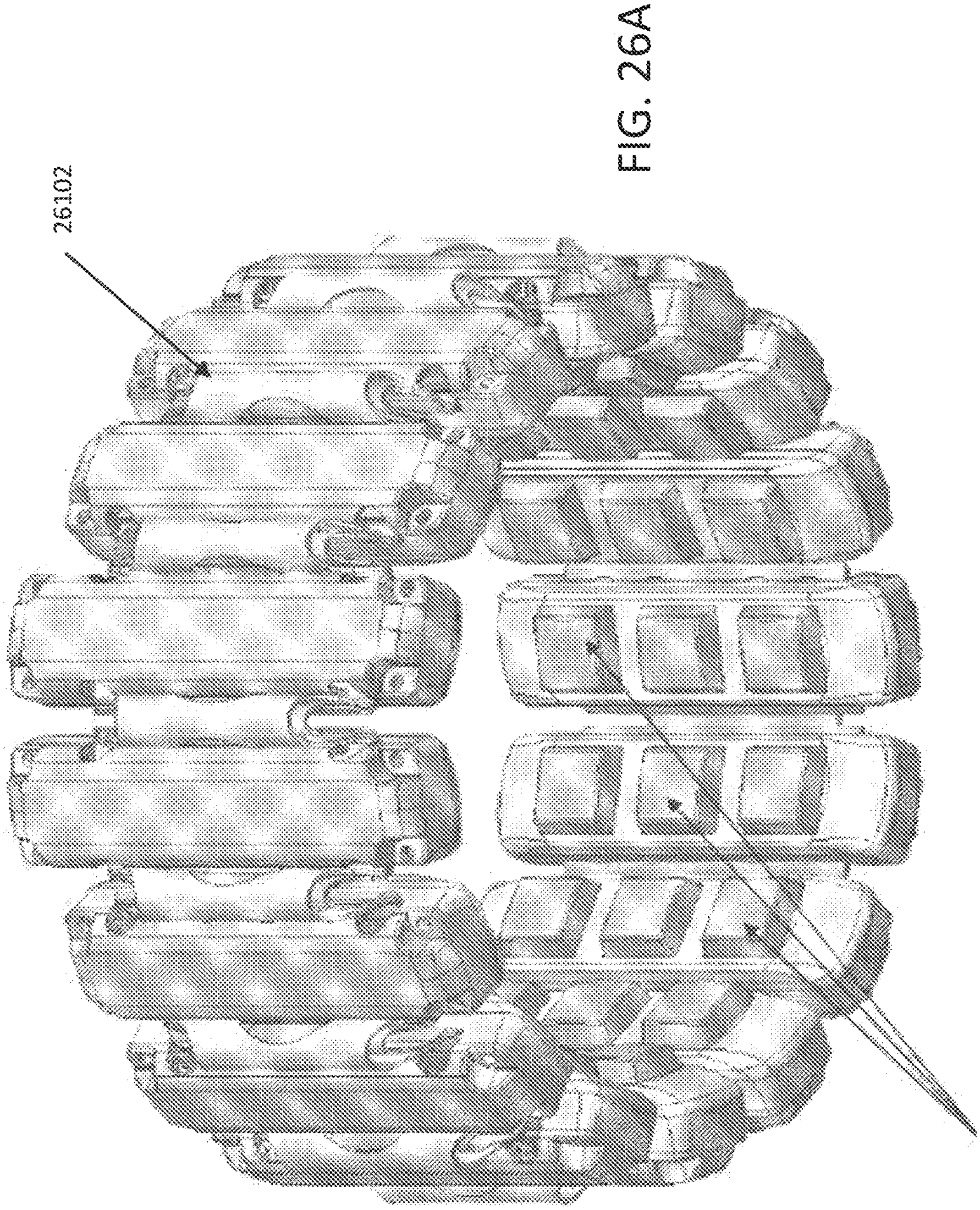
FIG. 26A illustrates a wearable system with sixteen EMG sensors arranged circumferentially around a band configured to be worn around a user's lower arm or wrist, in accordance with some embodiments of the technology described herein.

FIG. 26A illustrates a band system with sixteen EMG sensors arranged circumferentially around an elastic band 26102 configured to be worn around a user's lower arm. For example, FIG. 26A shows EMG sensors 26101 arranged circumferentially (e.g., symmetrically spaced) around elastic band 26102. It should be appreciated that any suitable number of neuromuscular sensors may be used and the number and arrangement of neuromuscular sensors used may depend on the particular application for which the wearable device is used. For example, a wearable armband or wristband may be used to generate control information for controlling an augmented reality system, a robot, controlling a vehicle, scrolling through text, controlling a virtual avatar, or any other suitable control task. Further, the band system can be configured to be worn around other parts of a user's body, such as their thigh or calf, for example.

In some embodiments, sensors 26101 only includes a plurality of neuromuscular or muscular sensors or electrodes (e.g., EMG electrodes/sensors, MMG electrodes/sensors, SMG electrodes/sensors, etc.). In other embodiments, sensors 26101 includes a plurality of neuromuscular sensors and at least one "auxiliary" sensor configured to continuously record a plurality of auxiliary signals. Examples of auxiliary sensors include, but are not limited to, other sensors such as inertial measurement unit (IMU) sensors, microphones, imaging devices (e.g., a camera), radiation based sensors for use with a radiation-generation device (e.g., a laser-scanning device), or other types of sensors such as a heart-rate monitor.

In some embodiments, the output of one or more of the sensors may be optionally processed using hardware signal processing circuitry (e.g., to perform amplification, filtering, and/or rectification). In other embodiments, at least some signal processing of the output of the sensors may be performed in software. Thus, signal processing of signals sensed by the sensors may be performed in hardware, software, or by any suitable combination of hardware and software, as aspects of the technology described herein are not limited in this respect. A non-limiting example of a signal-processing procedure used to process recorded data from the sensors 26101 is discussed in more detail below in connection with FIGS. 26B and 26C.

Figure 26B:
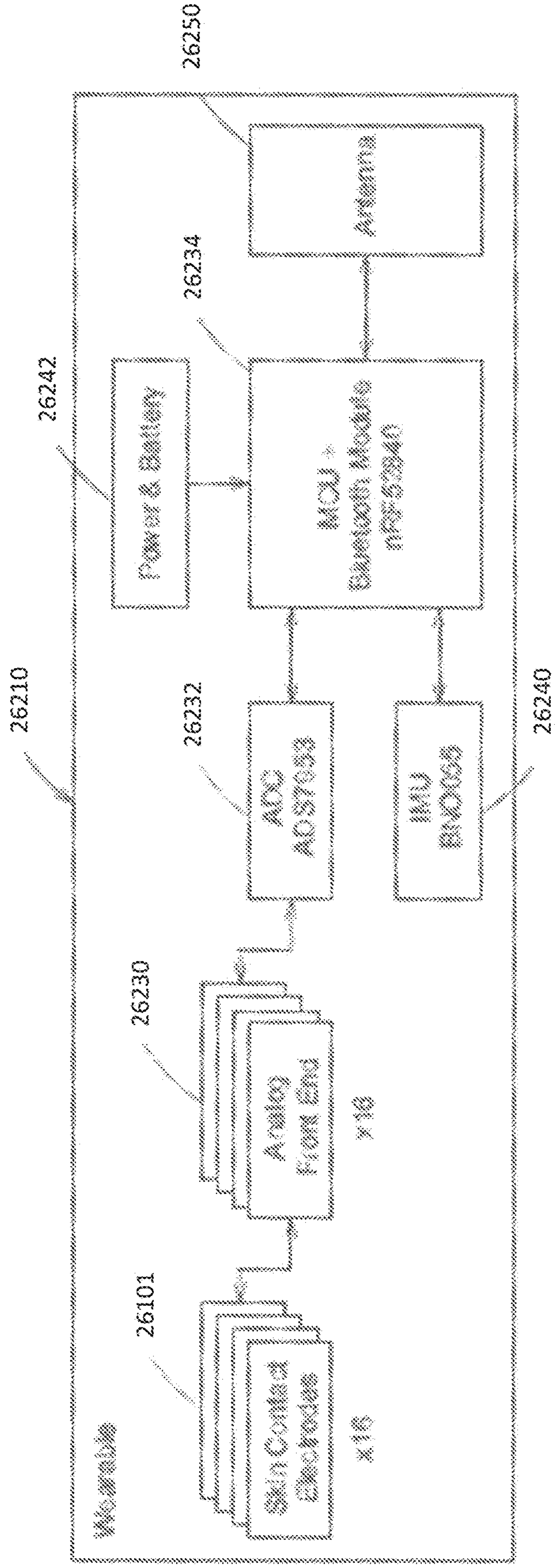
FIGS. 26B and 26C schematically illustrate a computer-based system that includes a wearable portion and a dongle portion, respectively, in accordance with some embodiments of the technology described herein.
Figure 26C:
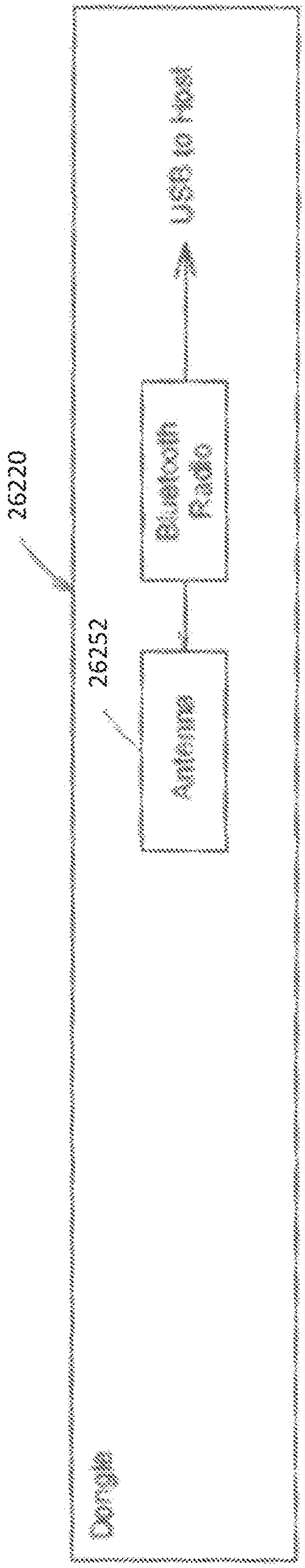

FIGS. 26B and 26C illustrate a schematic diagram with internal components of a wearable system with sixteen sensors (e.g., EMG sensors), in accordance with some embodiments of the technology described herein. As shown, the wearable system includes a wearable portion 26210 (FIG. 26B) and a dongle portion 26220 (FIG. 26C). Although not illustrated, the dongle portion 26220 is in communication with the wearable portion 26210 (e.g., via Bluetooth or another suitable short range wireless communication technology). As shown in FIG. 26B, the wearable portion 26210 includes the sensors 26101, examples of which are described above in connection with FIG. 26A. The sensors 26101 provide output (e.g., sensed signals) to an analog front end 26230, which performs analog processing (e.g., noise reduction, filtering, etc.) on the sensed signals. Processed analog signals produced by the analog front end 26230 are then provided to an analog-to-digital converter 26232, which converts the processed analog signals to digital signals that can be processed by one or more computer processors. An example of a computer processor that may be used in accordance with some embodiments is a microcontroller (MCU) 26234. As shown in FIG. 26B, the MCU 26234 may also receive inputs from other sensors (e.g., an IMU 26240) and from a power and battery module 26242. As will be appreciated, the MCU 26234 may receive data from other devices not specifically shown. A processing output by the MCU 26234 may be provided to an antenna 26250 for transmission to the dongle portion 26220, shown in FIG. 26C.

The dongle portion 26220 includes an antenna 26252 that communicates with the antenna 26250 of the wearable portion 26210. Communication between the antennas 26250 and 26252 may occur using any suitable wireless technology and protocol, non-limiting examples of which include radiofrequency signaling and Bluetooth. As shown, the signals received by the antenna 26252 of the dongle portion 26220 may be provided to a host computer for further processing, for display, and/or for effecting control of a particular physical or virtual object or objects (e.g., to perform a control operation in an AR or VR environment).

Although the examples provided with reference to FIGS. 26A, 26B, and 26C are discussed in the context of interfaces with EMG sensors, it is to be understood that the wearable systems described herein can also be implemented with other types of sensors, including, but not limited to, mechanomyography (MMG) sensors, sonomyography (SMG) sensors, and electrical impedance tomography (EIT) sensors.

As described above in connection with FIGS. 26B and 26C, the wearable system may include one or more computer processors (e.g., MCU 26234) programmed to communicate with the sensors (e.g., neuromuscular sensors 26101 and/or IMU sensor(s) 26240). For example, signals recorded by one or more of the sensors may be provided to the processor(s), which may be programmed to execute one or more trained inference models or machine learning models that process signals captured by the sensors.

In some embodiments, the trained inference model(s) may comprise a neural network and, for example, may comprise a recurrent neural network. In some embodiments, the recurrent neural network may be a long short-term memory (LSTM) neural network. It should be appreciated, however, that the recurrent neural network is not limited to be an LSTM neural network and may have any other suitable architecture. For example, in some embodiments, the recurrent neural network may be a fully recurrent neural network, a gated recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used. In some implementations, the inference model(s) can comprise an unsupervised machine learning model, i.e., users are not required to perform a predetermined set of handstate configurations for which an inference model was previously trained to predict or identify. In other embodiments, the inference model(s) can comprise one or more supervised machine learning models wherein users performed specific gestures or handstate configurations in response to instructions, and the detected and processed signals from the electrodes or sensors have been associated with the performed gestures or handstate configurations.

In some embodiments, one or more inference models (e.g., a neural network as discussed herein) can be implemented to classify sets of EMG signals or patterns characterized by unique spatio-temporal patterns that vary in amplitude for different amounts of forces generated by users' muscles or motor units. The processed EMG signals and/or patterns can be associated with a manner or way a user wears the band system during signal sensing (e.g., the orientation and/or positioning of the band on user's forearm). Accordingly, in one embodiment, the inference model (s) can associate one or more unique EMG signals or patterns with a specific orientation and/or location of the neuromuscular armband on the user (e.g., in a manner in which the electrodes are in contact with certain areas of the user's skin). Likewise, the inference model(s) can associate one or more unique EMG signals or patterns with a rotated orientation of the armband and/or with a re-located positioning of the armband when the user moves the armband from a lower forearm position to an upper forearm position (or the other way around, i.e., from an upper forearm position to a lower forearm position). Thus, the inference model(s) can be trained to associate various armband rotations and/or positional offsets with detected and processed EMG signals or signal patterns. Once the system can identify the specific orientation and/or positioning of the band on the user, the system can select and apply one or more previously-trained inference model(s) at that specific orientation and/or positioning in order to predict, for example, user handstate configurations with a higher level of accuracy compared to other inference model(s) that may have been previously trained using different orientations and/or positions of the band on users. Differently stated, in certain embodiments, the armband system can be calibrated via selection of particular inference model(s) such that the system adapts to any rotation and/or arm position offset without interfering with the user experience, also referred to herein as autocalibration. In other embodiments, the detected offset in orientation and/or relative difference in location of the band on the user compared to the orientation and/or positioning of the band used to train one or more inference models can be used to "normalize" the orientation and/or location of the band for input into the inference model(s). A virtual reference electrode (e.g., the "0" electrode) may be defined, and a rotation offset relative to the virtual reference electrode may be used to normalize the orientation and/or location of the band. For example, it may be determined based on the detected and processed EMG signals that the band has a rotational offset of three electrodes from the virtual reference electrode. In such an instance, the detected EMG signals can be further processed to account for this particular offset (either before or after being input into the trained inference models).

In some implementations, the armband system can be autocalibrated such that, the armband system adapts to users that may have injured or missing muscles, different adipose tissue or fat, and other anatomic variables. Although discussed herein in the context of multiple trained inference models, it is appreciated that the embodiments discussed herein can in some instances be implemented as a single or sole trained inference model or machine learning model. It is also appreciated that at least some of the inference models may be trained from data collected from multiple users. For instance, data can be collected from recorded EMG signals of multiple users while they perform one or more handstate configurations, e.g., poses or gestures.

In one embodiment, the inference model that classifies EMG patterns can be created as follows: 1) build a new inference model/experiment class that takes as input(s) a set of preprocessed EMG signals; 2) generate training data by randomly applying a rotation offset to the preprocessed EMG signals; 3) produce positive labels when the augmented offset is 0, and null otherwise; 4) calibrate the training data to have calibrated data at offset=0; and 5) train an inference model using the calibrated training data, and evaluate the performance of the trained inference model by testing different rotation offsets.

Figure 26D:
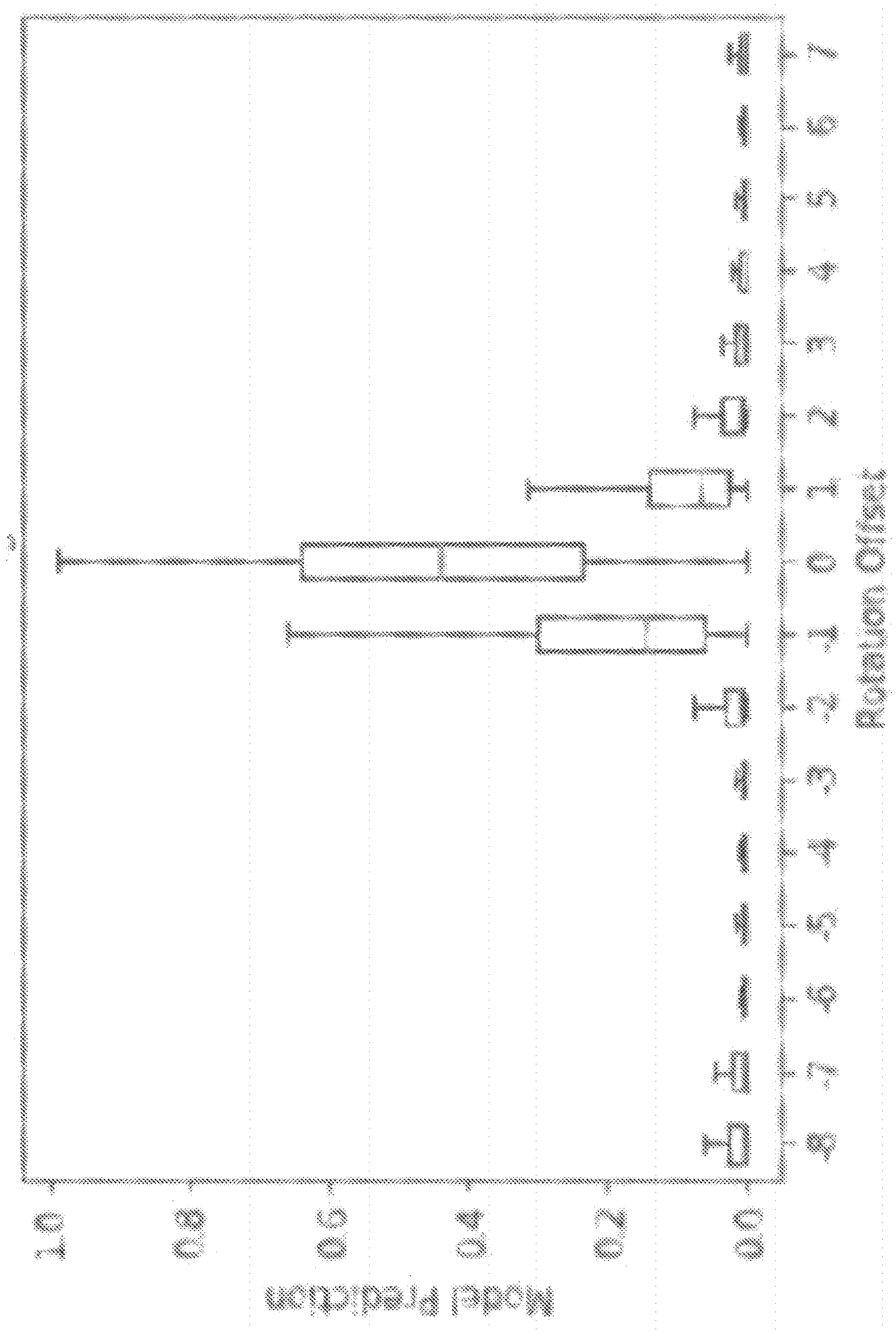
FIG. 26D is a plot illustrating an example distribution of outputs generated by an autocalibration model trained in accordance with some embodiments. The distribution of outputs is generated across a dataset with data collected from different users.
Figure 26E:
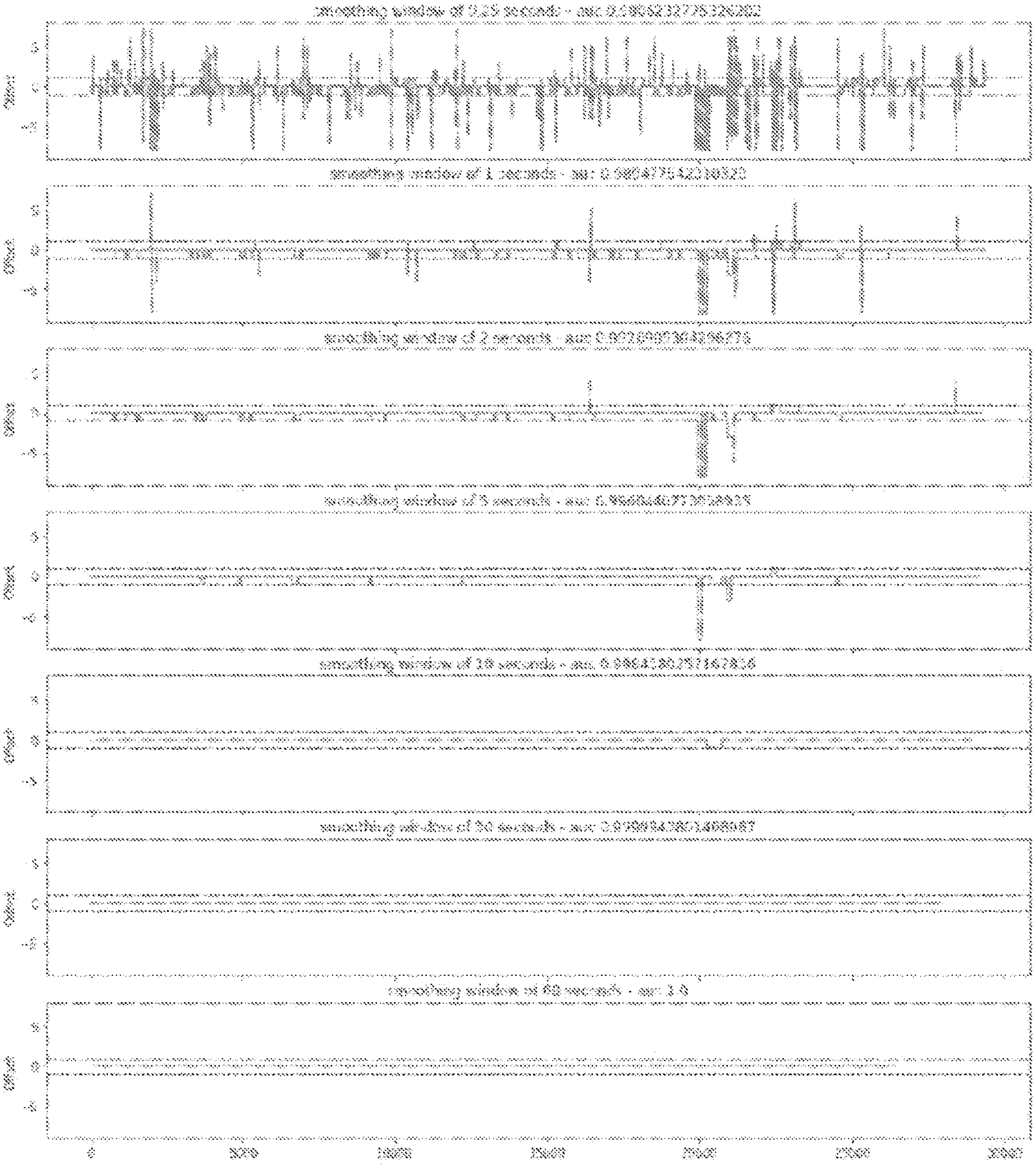
FIG. 26E shows predicted values output from an autocalibration model trained in accordance with some embodiments. The predicted value are averaged across time which result in model predictions with greater confidence values.
Figure 26F:
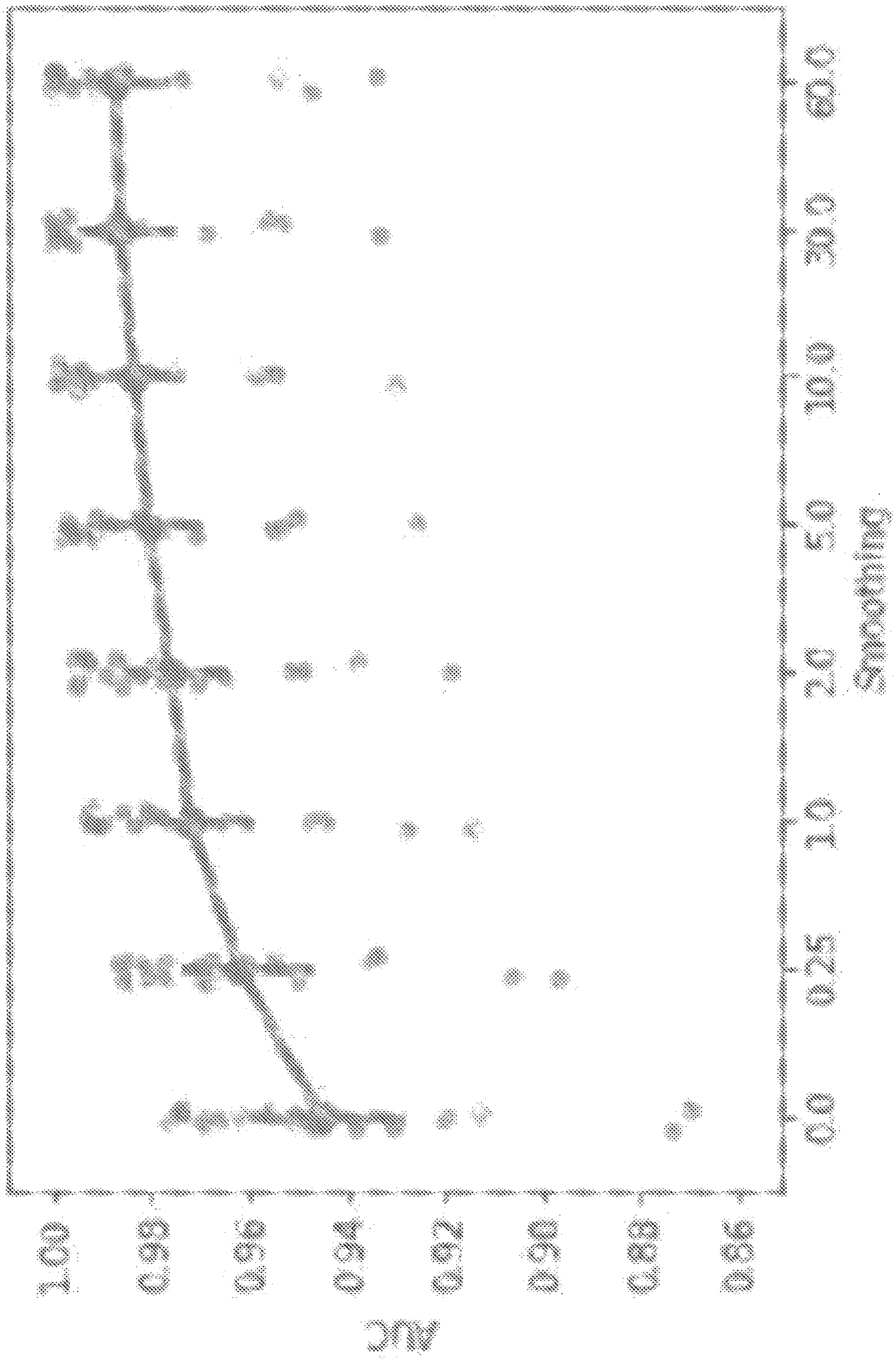
FIG. 26F shows a plot of the accuracy of an autocalibration model trained in accordance with some embodiments. The accuracy is expressed in an Area Under the Receiver Operating Characteristic Curve (AUC).

An example of a distribution of outputs generated by a trained inference model across a dataset with data collected from different users is shown in FIG. 26D. It can be appreciated that on average the trained model outputs show higher confidence values when the training data is calibrated (i.e., offset=0) compared to when the training data is not calibrated. In this example, the trained model produces a prediction for every 80 millisecond (ms) chunk of collected EMG data, however, other time intervals can be analogously used. Also, in this example, a binary classifier is used to determine whether the band is calibrated at the "0" electrode in the preferred orientation. FIG. 26E shows predicted values averaged across time which result in predictions with greater confidence values. It can be appreciated that by applying a smoothing factor of 10 seconds the predicted offset can be acquired with more accuracy e.g., an accuracy at the ±1 electrode range. FIG. 26F shows the accuracy of the model expressed in Area Under the Receiver Operating Characteristic Curve (AUC).

Figure 26G:
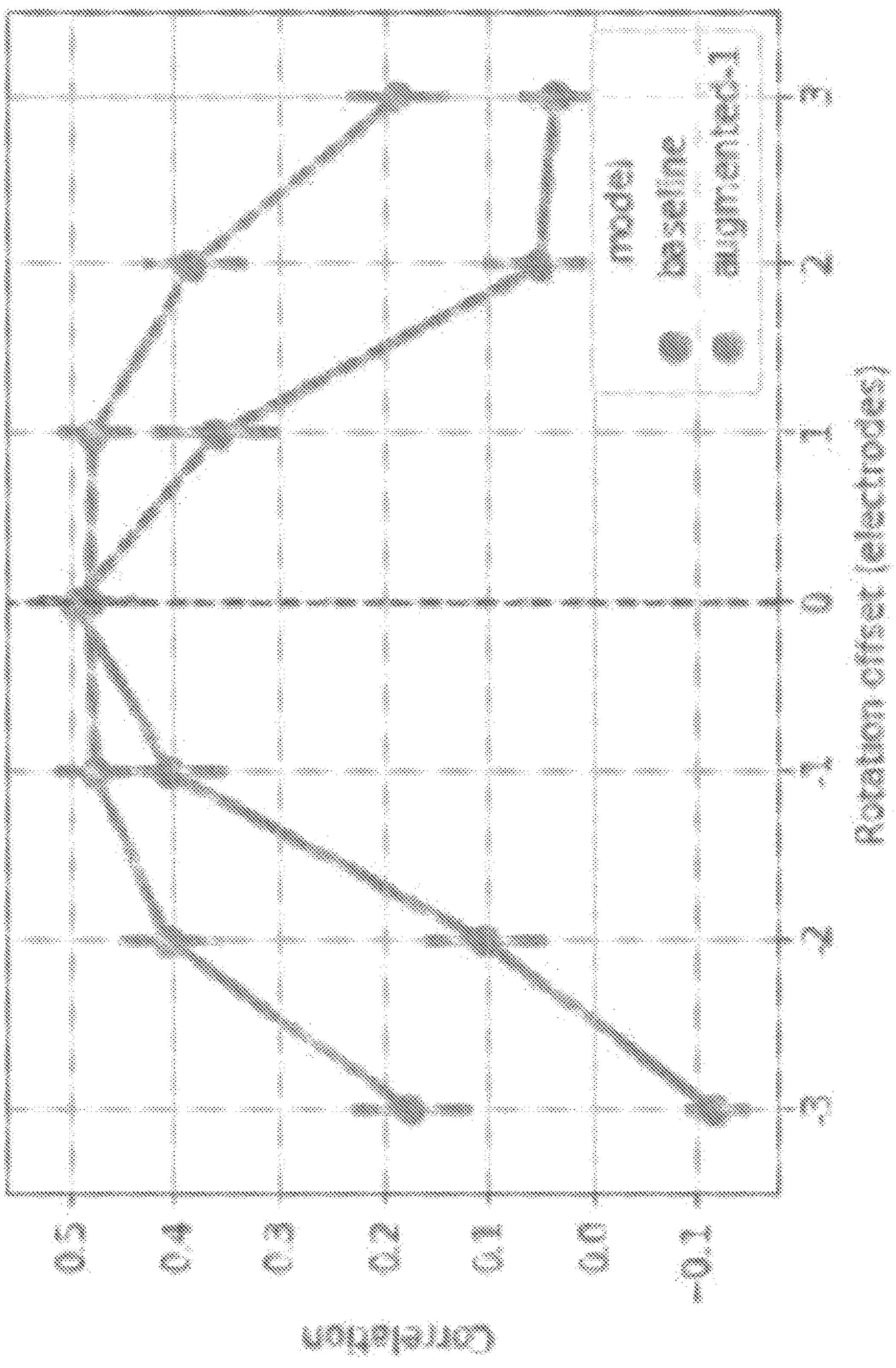
FIG. 26G shows a plot of a correlation between a baseline model and an augmented model for autocalibrating sensors of a wearable device in accordance with some embodiments.
Figure 26H:
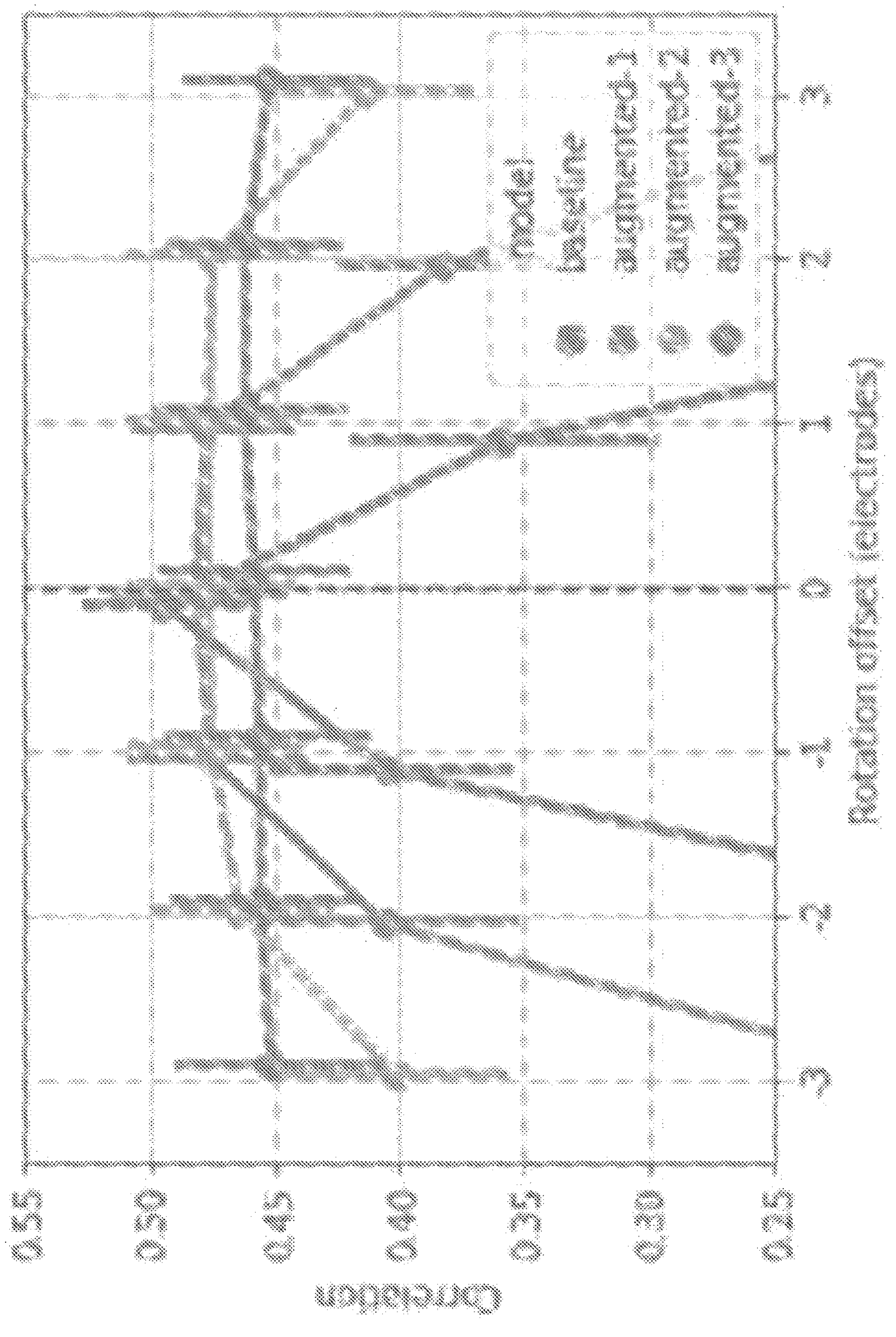
FIG. 26H shows a plot of correlations of augmented inference models trained with electrode invariances set to ±1, ±2, and ±3 along with the baseline model in accordance with some embodiments.

In some implementations, an electrode invariance factor associated with a small offset error can be provided as an input to an inference model, e.g., during the training phase. Such an inference model is also referred herein as an augmented inference model. The augmented inference model can be implemented by, for instance, expanding a batch of training data and creating a new dimension for each sample in a training data batch. The new dimension includes concatenations of different versions of the same feature vector with different electrode rotations. For example, given a feature vector of dimension 384, an invariance of ±1 electrode can be set by providing as input to the augmented inference model a feature tensor of dimension 3×384. Such a feature tensor includes the extra dimension containing the same feature vector with the three rotation offsets [−1, 0, 1]. Then, the augmented inference model may be initiated with a first input dense layer and this extra dimension may be reduced by pooling across the extra dimension, for instance, by taking the maximum activation over the extra dimension. Accordingly, the augmented inference model applies the same set of coefficients (for the first dense layer) for each of the three offsets, then selects for each filter the largest activation over the three proposed offsets. FIG. 26G illustrates a correlation between a baseline model and the augmented inference model. It should be appreciated that the baseline model is more sensitive to the offset errors, as it sharply drops performance when is not calibrated (i.e., offset !=0). FIG. 26H illustrates correlations of augmented inference models trained with electrode invariances set to 1, 2, and ±3 along with the baseline model.

Figure 26I:
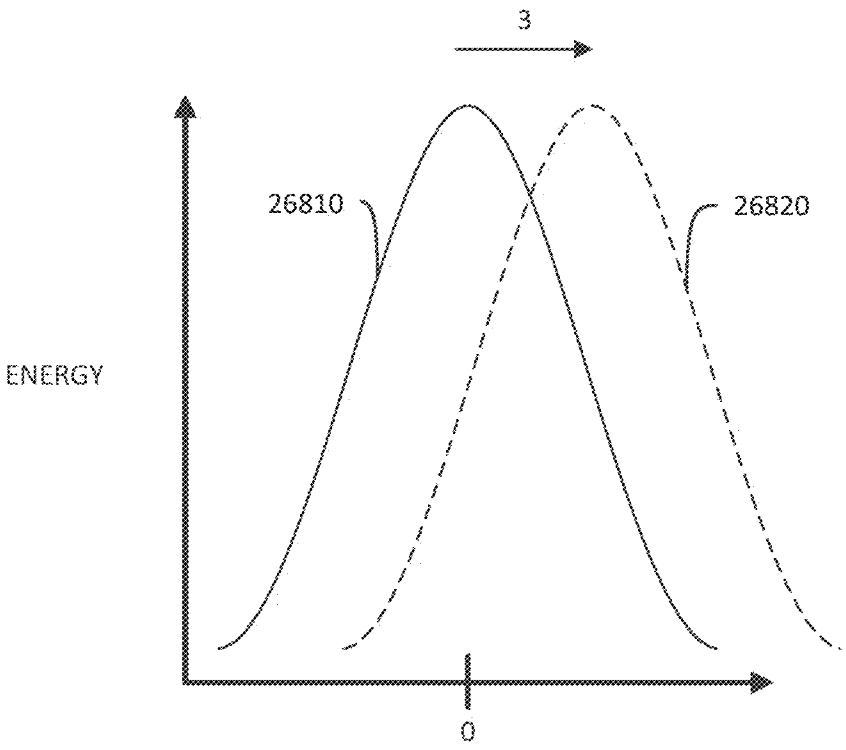
FIG. 26I schematically illustrates a visualization of an energy plot for a single EMG electrode on a wearable device at a first position and a second position in which the wearable device has been rotated.

In another embodiment, the autocalibration process comprises numerically aligning the band position (e.g., rotation, location on the forearm, and/or orientation) via common reference point(s) across different users and their forearms and/or wrists, so that the system can identify virtual reference point(s) for each electrode and can consistently represent the same part of the forearm and/or wrist irrespective of the band position. For example, this can be done by applying an electrode permutation (e.g., reversing the order of the electrodes depending on the band orientation as applied to the forearm, or as applied to the left or right forearms) and applying a circular rotation to the electrodes. FIG. 26I schematically shows a visualization of an energy plot for a single EMG electrode “0” at a first position 26810, and at a second position 26820 in which the EMG electrode is rotated three positions. The disclosed systems and methods herein can utilize the difference(s) in such energy plots in order to achieve the autocalibration results as described herein.

In some embodiments, the user need not perform a specific calibration gesture to register the band position. Instead, an autocalibration model can be trained to recognize and predict the specific electrode permutation that generated a given set of EMG signals or patterns. Data augmentation techniques can be implemented on data sets obtained in a supervised machine learning fashion. For example, offline EMG data can be collected from a set of users who performed a set of canonical gestures or poses comprising various pinches and wrist movements in the four cardinal directions to register the band rotations based on the collected and processed EMG data associated with those gestures or poses. With this process, the system can generate labels to train a model (e.g., an autocalibration model) to recognize different simulated band rotations and/or orientations (e.g., data augmentation). The number of gestures or poses upon which the autocalibration model is trained can vary, but may comprise approximately eight gestures. In this embodiment, the autocalibration task can be regarded as a classification task, and more collected and labeled data may lead to better precision on the predicted offset of the electrode(s). During this offline training, the band can be rotated and additional data can be collected from users in each of the rotated positions. For example, if the band has 16 electrode channels, data can be collected from the same user or across multiple users at each of 16 different orientations. Some embodiments employ an autocalibration model to predict that the wearable system is rotated into one of multiple (e.g., 16) positions.

Figure 26J:
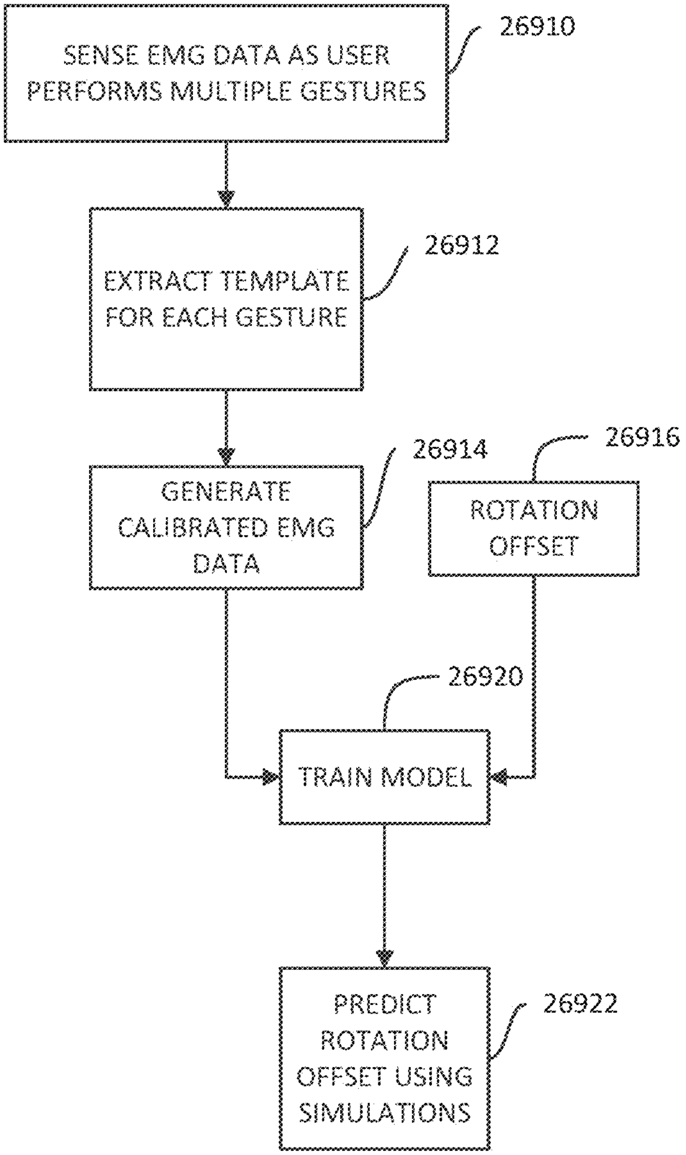
FIG. 26J illustrates a flowchart of a process for offline training of an autocalibration model based on neuromuscular signals recorded from a plurality of users in accordance with some embodiments.

FIG. 26J shows an example of a flowchart for offline training of an autocalibration model in accordance with some embodiments. In act 26910 EMG data is sensed as one or more users are performing multiple gestures or poses with different band orientations. As discussed herein, any suitable number of gestures or poses (e.g., 8 gestures or poses) may be used. The process then proceeds to act 26912, where templates are extracted for each gesture or pose, wherein each of the templates corresponds to spatio-temporal patterns of the sensed EMG signals. The process then proceeds to act 26914, where the extracted templates are used to generate calibrated EMG data. Any given electrode channel can be designated the “0” channel electrode at which the system is set to by default process and interpret EMG inputs to predict handstate configurations.

In act 26916, each of the band orientations during data collection is assigned an offset value depending on the degree of rotation of the armband when the data was collected. In this way, each labeled data set collected and processed for the specific gestures and/or poses can be further be labeled with an offset value depending on the band orientation and associated simulation position can be generated for the band. The labeled data for calibrated EMG signals, which have been assigned to gestures and/or poses, and EMG signals identified based on specific electrode channel orientation(s) can be input into an autocalibration model in act 26920 to train the model. In some embodiments, the autocalibration model is a neural network (such as an LSTM, for example), and the autocalibration model is trained to predict the orientation of the armband based on received EMG signal data. Once properly trained, the process proceeds to act 26922 where the autocalibration model can be implemented for any user to predict the orientation and/or rotation offset of the band (e.g., with respect to the “0” channel) based on received EMG data from the user and simulations of the band positioning and/or orientation based on previously-collected user EMG data. In some embodiments, the model may be trained such that it can predict the degree of rotation or offset to an error of +/−1 electrode channel. After the autocalibration model has been suitably trained to predict the orientation of the band within an error of +/−1 electrode channel, the autocalibration model can be used “online” to predict the band orientation on any given user during the user’s performance of one or more motor actions or intended motor actions.

Figure 26K:
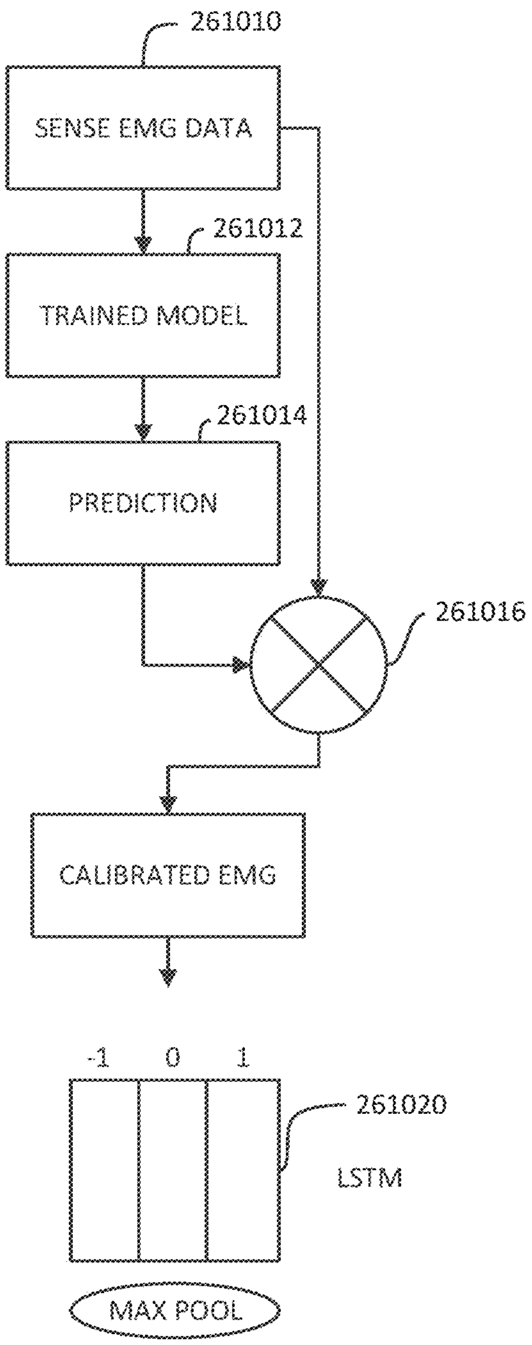
FIG. 26K illustrates a flowchart of a process for using the trained autocalibration model to calibrate the position and/or orientation of sensors on a wearable device in accordance with some embodiments.

By contrast to techniques that require the user to perform a specific gesture or pose for calibration, some embodiments use autocalibration to automatically detect the position of the wearable device on a body part using an autocalibration model that does not require the user to perform a specific calibration gesture or pose. Such embodiments permit continuous or periodic autocalibration of the device as the user wears the device without requiring the user to stop what they are doing and perform a particular calibration gesture or pose. FIG. 26K illustrates a flowchart for online usage of a trained autocalibration model in accordance with some embodiments. In act 261010, EMG data is sensed from a user wearing the wearable device (e.g., the wearable device shown in FIG. 26A). In act 261012, the sensed EMG data is provided to a trained autocalibration model (e.g., the autocalibration model trained in act 26920 of the process in FIG. 26J). The process of FIG. 26K then proceeds to act 261014 where the output of the model is used to predict a position and/or orientation of the wearable device by, for example, classifying the EMG signal or signal patterns into one of multiple (e.g., 16) rotation positions. The process then proceeds to act 261016 where a correction based on the predicted output of the autocalibration model is applied to the sensed EMG data to generate calibrated EMG data. In other embodiments, the sensed EMG data is not corrected, and the sensed EMG data is provided as input to selected inferential models trained at the detected orientation(s) and/or position(s) or provided as input to models that have been modified to interpret the sensed EMG data and accurately output handstate configurations, poses, and/or gestures.

As described above, in some embodiments, the autocalibration model may be implemented as an LSTM neural network. In certain embodiments, it is desirable to address the +/−1 electrode channel error rate for the rotation offset (see FIG. 26G showing an augmented model performing equally well for +/−1 electrode offset, but the baseline model performing not as well for a +/−1 electrode offset). This can be done by implementing a pooling layer within the neural network as shown schematically in act 261020 of FIG. 26K. For example, the pooling layer may be a max pooling layer where the max pooling layer can be configured to determine the location of the "0" electrode channel (e.g., based on a probabilistic calculation for each of the three electrode locations), so the system can virtually label a specific electrode channel as the "0" reference channel out of a possible set of three channels initially identified by the autocalibration model. It should be understood that other types of pooling layers can be used that are well known in the art, e.g., average or mean pooling layers.

In certain embodiments, the band detects and analyzes EMG signals or EMG signal patterns either continuously for a certain period of time or at discrete time points. In either case, during this defined period of time or at discrete time points, the autocalibration model(s) can be used to determine the orientation and/or positioning of the band on the user's body part, e.g., forearm. In certain embodiments, the band detects and processes EMG signals or EMG signal patterns initially upon the user putting the band on and/or in response to detecting band movement subsequent to initial placement of the band. For example, the system may identify that at least a portion of the wearable device (e.g., one or more EMG sensors) has moved, e.g., rotated around and/or translated along the wrist or forearm of the user, and in response to determining that the at least a portion of the wearable device (e.g., the band) has moved, the system may perform autocalibration by determining a current position and/or orientation of the wearable device in accordance with one or more of the autocalibration techniques described herein. By automatically restarting calibration after identifying movement of the wearable device, re-calibration can be performed in an efficient and timely manner.

Movement of the wearable device on the user can be detected in any suitable manner. In some embodiments, detection of movement of the wearable device is based on one or more detected movement artifacts identified in the neuromuscular signals sensed by the plurality of neuromuscular sensors. In other embodiments that include at least one inertial measurement unit (IMU) sensor, movement of the wearable device may be detected based at least in part, on at least one signal sensed by the at least one IMU sensor. In yet other embodiments, detection of movement of the wearable device may be based, at least in part, on signals from multiple types of sensors (e.g., at least one EMG sensor and at least one IMU sensor) and/or sensors included on or external to the wearable device (e.g., at least one camera sensor).

Using the techniques described herein, the system may be able to calibrate the orientation and/or position of the armband in less than 10 seconds based on one or more sampling rates or frequencies. In other embodiments, due to settling time of the EMG electrodes (e.g., from skin-electrode interactions) after band movements, which can lead to an initially degraded signal quality, it may take a little longer to get a reliable estimation of the band position. For example, the system can initiate an autocalibration sequence upon detection of band movement, and the sequence can run for approximately 30 seconds to get a more reliable prediction of band orientation and/or position. Shorter time periods can be used to run the autocalibration sequences provided that the settling time can be reduced and little to no band movement is detected during the autocalibration sequence. In certain embodiments, the autocalibration sequence can be initiated and re-run upon the detection of any band movements no matter how slight in order to maximize the accuracy of the predictions associated with EMG signals or EMG signal patterns.

In other embodiments, the techniques described herein can be used to identify a specific position on the user's body part, e.g., how far up the band is sitting on the user's forearm as it relates to the distances between the band and the user's elbow joint or wrist joint. Similar to the embodiment described above (e.g., in FIG. 26J) in which a generalized, offline model is generated and trained from labeled EMG signal or EMG signal pattern data with users performing different gestures and/or poses at different orientations of the band, in other embodiments additional data can be collected from users performing gestures and/or poses at different or the same orientations of the band but at different positions on the user's body part (e.g., along portions of the forearm). In this way, one or more generalized models can be trained to predict not only the specific orientation (e.g., rotation) of the band, but also its positioning on the user's body part (e.g., relative to a reference point such as the elbow joint or wrist joint). Such embodiments can be used to better predict user handstate configurations given potential variability in EMG signals or EMG signal patterns depending on the specific location of the band on the user. Given neuroanatomical constraints and specific user neuroanatomy, it may be advantageous to analyze EMG signals on more distal or more proximal points of the user's body part (e.g., along different portions of the forearm or wrist). In certain embodiments, the autocalibration model can detect a specific positioning of the band on the user's forearm, and generate an input signal to an interface to instruct the user to reposition the band in a more distal or more proximal location depending on the specific outcome desired (e.g., to move the band farther up the arm so that relatively more EMG data can be collected or farther down the arm because certain input models to be used were trained on collected data from users with the band closer to their wrists).

By way of non-limiting examples, the following embodiments are included in the present disclosure.

Example 1: A method comprising receiving neuromuscular activity data over a first time series from a first sensor on a wearable device donned by a user, receiving ground truth data over a second time series from a second sensor that indicates a body part state of a body part of the user, generating one or more training datasets by time-shifting, at least, a portion of the neuromuscular activity data over the first time series relative to the second time series, to associate the neuromuscular activity data with at least a portion of the ground truth data, and training one or more inferential models based on the one or more training datasets.

Example 2: The method of Example 1, further comprising time-shifting the portion of the neuromuscular activity data by one or more time intervals based on an electromechanical delay associated with a specific body part of the user.

Example 3: The method of Examples 1 or 2, wherein the one or more inferential models comprises multiple inferential models and the method further comprises determining a prediction accuracy for each of the multiple inferential models, selecting a first inferential model from the multiple inferential models based on the determined prediction accuracy for each of the multiple inferential models, and predicting the body part state of the user using the first inferential model.

Example 4: The method of any of Examples 1 through 3, wherein the first inferential model is selected further based on a characteristic latency associated with a specific body part of the user.

Example 5: The method of any of Examples 1 through 4, wherein determining the prediction accuracy for each of the multiple inferential models comprises determining a likelihood of correctly estimating the body part state using each of the multiple inferential models.

Example 6: The method of any of Examples 1 through 5, wherein determining the prediction accuracy for each of the multiple inferential models comprises determining error values between known characteristic latencies associated with the body part state of the user and latencies associated with the body part state of the user that are predicted using each of the multiple inferential models.

Example 7: The method of any of Examples 1 through 6, further comprising predicting the body part state of the user based on the one or more inferential models.

Example 8: The method of any of Examples 1 through 7, further comprising determining that the predicted body part state of the user corresponds to a particular gesture and performing an action in an artificial-reality environment in response to determining that the predicted body part state of the user corresponds to the particular gesture.

Example 9: The method of any of Examples 1 through 8, further comprising determining prediction accuracies for two inferential models of the one or more inferential models, wherein the two inferential models correspond to two different time intervals, determining that the prediction accuracies for the two inferential models satisfy a threshold value, selecting one of the two inferential models corresponding to a greater of the two different time intervals, and predicting the body part state of the user using the selected one of the two inferential models.

Example 10: The method of any of Examples 1 through 9, wherein the threshold value is at least one of an absolute difference in the prediction accuracies for the two inferential models or a relative difference in prediction accuracy between a more accurate one of the two inferential models and a less accurate one of the two inferential models.

Example 11: The method of any of Examples 1 through 10, wherein selecting one of the two inferential models is further based on a task-dependent accuracy level.

Example 12: The method of any of Examples 1 through 11, wherein the is second sensor is part of a head-mounted display and the second sensor comprises at least one of an optical sensor, an inertial measurement sensor, a mutual magnetic induction measurement sensor, or a pressure sensor.

Example 13: The method of any of Examples 1 through 12, wherein the body part state of the user is represented as a binary label indicating a presence or an absence of at least one of a pose or a gesture.

Example 14: The method of any of Examples 1 through 13, wherein the body part state includes at least one of a force associated with the body part, a movement of the body part, a pose associated with the body part, a gesture associated with the body part, or a gesture associated with a portion of the body part.

Example 15: A wearable device, comprising one or more neuromuscular sensors configured to record a plurality of neuromuscular signals from a user donning the wearable device and one or more processors programmed to receive neuromuscular activity data over a time series from the one or more neuromuscular sensors wherein the neuromuscular activity data corresponds to the neuromuscular signals recorded by the one or more neuromuscular sensors, receive position data that indicates a state of a body part of a user over the time series, generate one or more training datasets by time-shifting at least one of the neuromuscular activity data or the position data by one or more time intervals, train one or more inferential models based on at least the one or more training datasets, and predict the user's body part state based on the trained one or more inferential models.

Example 16: The wearable device of Example 15, wherein the one or more processors are further programmed to select the one or more time intervals based on an electromechanical delay associated with the body part of the user.

Example 17: The wearable device of Example 15 or Example 16, wherein the one or more inferential models comprise multiple inferential models and the one or more processors is further programmed to determine a prediction accuracy for each of the multiple inferential models, selecting a first inferential models from the multiple inferential models based on the determined prediction accuracy for each of the multiple inferential models, and predicting the body part state of the user using the first inferential model.

Example 18: The wearable device of any of Examples 15 through 17, wherein the one of the multiple inferential models is selected further based on a characteristic latency of the user's body part.

Example 19: The wearable device of any of Examples 15 through 18, wherein determining the prediction accuracy for each of the multiple inferential models comprises determining a likelihood of correctly estimating a known body part state using each of the multiple inferential models.

Example 20: An artificial-reality system comprising a head-mounted display and a wearable device, comprising one or more neuromuscular sensors configured to record a plurality of neuromuscular signals from a user donning the wearable device, and one or more processors programmed to receive neuromuscular activity data over a time series from the neuromuscular sensors configured to record the plurality of neuromuscular signals, receive position data that indicates a body part state of a body part of the user over the time series, generate one or more training datasets by time-shifting at least one of the neuromuscular activity data or the position data by one or more time intervals, train one or more inferential models based on at least the neuromuscular activity time series data using the one or more training datasets, and predict the body part state of the user using the trained one or more inferential models, wherein the head-mounted display is configured to display a visual representation of the body part of the user.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

accessing neuromuscular sensor data at a first time generated by a neuromuscular sensor on a wearable device donned by a user;

inputting the neuromuscular sensor data accessed at the first time into a trained inferential model that is configured to predict body state of a body part of the user;

predicting, based on the neuromuscular sensor data accessed at the first time, body state information for a second time that is a specified time interval after the first time for the body part of the user based on one or more outputs of the trained inferential model such that a temporal latency between the predicted body state information for the second time and an actual body state for the second time is less than a threshold amount of latency;

generating a visual representation of the body part of the user based on the predicted body state information; and displaying the visual representation of the body part of the user via a pair of augmented-reality glasses.

2. The computer-implemented method of claim 1, wherein the wearable device includes a plurality of neuromuscular sensors arranged in a circumferential array.

3. The computer-implemented method of claim 2, wherein the plurality of neuromuscular sensors of the wearable device record neuromuscular signals from the user as the user exerts force or performs at least one of movements, poses, or gestures.

4. The computer-implemented method of claim 1, wherein the wearable device includes one or more auxiliary sensors configured to continuously record auxiliary signals that are implemented as inputs to the trained inferential model.

5. The computer-implemented method of claim 1, wherein the body state information is further predicted based on derived signal data.

6. The computer-implemented method of claim 5, wherein the derived signal data is integrated or filtered to determine movement of one or more muscles of the user during performance of a gesture.

7. The computer-implemented method of claim 1, wherein the neuromuscular sensor data generated by the neuromuscular sensor on the wearable device represents a discrete gesture performed by the user.

8. The computer-implemented method of claim 7, wherein the visual representation of the body part of the user includes the discrete gesture.

9. The computer-implemented method of claim 1, wherein the neuromuscular sensor data generated by the neuromuscular sensor on the wearable device represents a continuous movement gesture performed by the user.

10. The computer-implemented method of claim 9, wherein inputting the neuromuscular sensor data into the trained inferential model includes providing continuous, real-time inputs to the inferential model as neuromuscular signals generated by the user are being recorded.

11. The computer-implemented method of claim 9, wherein body state information is predicted for the user's body part in real-time, resulting in a real-time estimation of positions or forces of the user's body part.

12. The computer-implemented method of claim 11, wherein the visual representation of the users' body part includes the continuous movement gesture.

13. A system comprising:

at least one physical processor; and physical memory comprising computer-executable instructions that, when executed by the physical processor, cause the physical processor to:

access neuromuscular sensor data at a first time generated by a neuromuscular sensor on a wearable device donned by a user;

input the neuromuscular sensor data accessed at the first time into a trained inferential model that is configured to predict body state of a body part of the user;

predict, based on the neuromuscular sensor data accessed at the first time, body state information for a second time that is a specified time interval after the first time for the body part of the user based on one or more outputs of the trained inferential model such that a temporal latency between the predicted body state information for the second time and an actual body state for the second time is less than a threshold amount of latency;

generate a visual representation of the body part of the user based on the predicted body state information; and display the visual representation of the body part of the user via a pair of augmented-reality glasses.

14. The system of claim 13, wherein the wearable device includes a plurality of neuromuscular sensors arranged in a circumferential array, and the plurality of neuromuscular sensors of the wearable device record neuromuscular signals from the user as the user exerts force or performs at least one of movements, poses, or gestures.

15. The system of claim 13, wherein the wearable device includes one or more auxiliary sensors configured to continuously record auxiliary signals that are implemented as inputs to the trained inferential model.

16. The system of claim 13, wherein the body state information is further predicted based on derived signal data.

17. The system of claim 16, wherein the derived signal data is integrated or filtered to determine movement of one or more muscles during performance of a gesture.

18. The system of claim 13, wherein the neuromuscular sensor data generated by the neuromuscular sensor on the wearable device represents a discrete gesture performed by the user.

19. A non-transitory computer-readable medium comprising one or more computer-executable instructions that, when executed by at least one processor of a computing device, cause the computing device to:

access neuromuscular sensor data at a first time generated by a neuromuscular sensor on a wearable device donned by a user;

input the neuromuscular sensor data accessed at the first time into a trained inferential model that is configured to predict body state of a body part of the user;

predict, based on the neuromuscular sensor data accessed at the first time, body state information for a second time that is a specified time interval after the first time for the body part of the user based on one or more outputs of the trained inferential model such that a temporal latency between the predicted body state information for the second time and an actual body state for the second time is less than a threshold amount of latency;

generate a visual representation of the body part of the user based on the predicted body state information; and display the visual representation of the body part of the user via a pair of augmented-reality glasses.

20. The method of claim 1, further comprising:

accessing inertial sensor data generated by an inertial measuring unit, wherein the inertial sensor data is distinct from the neuromuscular sensor data and the inertial measuring unit is distinct from the neuromuscular sensor; and wherein inputting the neuromuscular sensor data accessed at the first time into the trained inferential model includes inputting the inertial sensor data into the trained inferential model.

* * * * *